US010694129B2

(12) United States Patent
Cote et al.

(10) Patent No.: US 10,694,129 B2
(45) Date of Patent: Jun. 23, 2020

(54) RAW SCALER WITH CHROMATIC ABERRATION CORRECTION

(71) Applicant: Apple Inc., Cupertino, CA (US)

(72) Inventors: Guy Cote, San Jose, CA (US); Simon Wolfenden Butler, San Rafael, CA (US); Joseph Anthony Petolino, Jr., Palo Alto, CA (US); Joseph P. Bratt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 14/679,126

(22) Filed: Apr. 6, 2015

(65) Prior Publication Data

US 2015/0341604 A1 Nov. 26, 2015

Related U.S. Application Data

(62) Division of application No. 13/485,024, filed on May 31, 2012, now abandoned.

(51) Int. Cl.
*G06K 9/00* (2006.01)
*H04N 5/367* (2011.01)
(Continued)

(52) U.S. Cl.
CPC ............ *H04N 5/367* (2013.01); *G06T 5/001* (2013.01); *H04N 1/60* (2013.01);
(Continued)

(58) Field of Classification Search
CPC .......... G06T 5/00; G06T 5/001; G06T 5/002; G06T 5/20; G06T 2207/20024; H04N 1/387; H04N 1/46; H04N 1/50; H04N 1/502; H04N 1/504; H04N 1/506; H04N 1/56; H04N 1/60; H04N 1/6002; H04N 1/6008; H04N 5/21; H04N 5/217; H04N 5/2173; H04N 5/2175; H04N 5/2176; H04N 5/2178; H04N 5/357; H04N 5/3572; H04N 5/359; H04N 5/3595; H04N 5/365;
(Continued)

(56) References Cited

U.S. PATENT DOCUMENTS

| | | | | |
|---|---|---|---|---|
| 6,323,934 B1 * | 11/2001 | Enomoto | G06T 5/006 | 382/299 |
| 6,747,766 B1 * | 6/2004 | Kamisuwa | H04N 1/486 | 358/1.9 |

(Continued)

*Primary Examiner* — Eric Rush

(74) *Attorney, Agent, or Firm* — Robert C. Kowert; Kowert, Hood, Munyon, Rankin & Goetzel, P.C.

(57) ABSTRACT

Systems and methods for down-scaling are provided. In one example, a method for processing image data includes determining a plurality of output pixel locations using a position value stored by a position register, using the current position value to select a center input pixel from the image data and selecting an index value, selecting a set of input pixels adjacent to the center input pixel, selecting a set of filtering coefficients from a filter coefficient lookup table using the index value, filtering the set of source input pixels to apply a respective one of the set of filtering coefficients to each of the set of source input pixels to determine an output value for the current output pixel at the current position value, and correcting chromatic aberrations in the set of source input pixels.

20 Claims, 175 Drawing Sheets

(51) Int. Cl.

| | |
|---|---|
| ***H04N 9/04*** | (2006.01) |
| ***H04N 9/64*** | (2006.01) |
| ***H04N 5/232*** | (2006.01) |
| ***H04N 5/365*** | (2011.01) |
| ***H04N 1/60*** | (2006.01) |
| ***G06T 5/00*** | (2006.01) |
| ***H04N 9/77*** | (2006.01) |

(52) U.S. Cl.
CPC ..... *H04N 5/23212* (2013.01); *H04N 5/23229* (2013.01); *H04N 5/23254* (2013.01); *H04N 5/365* (2013.01); *H04N 9/045* (2013.01); *H04N 9/64* (2013.01); *H04N 9/646* (2013.01); *H04N 9/77* (2013.01)

(58) Field of Classification Search
CPC ........ H04N 5/3651; H04N 9/64; H04N 9/646; H04N 9/68; H04N 9/77; H04N 9/79; H04N 5/23212; H04N 5/23229; H04N 5/23254; H04N 5/367; H04N 9/045
USPC ................ 382/162, 167, 254, 260, 274–276; 358/518; 348/222.1, 223.1, 224.1, 229.1, 348/230.1, 242, 253, 266, 272–274, 348/300–302, 326, 576, 577, 607, 608, 348/612, 624, 707–709
See application file for complete search history.

(56) References Cited

U.S. PATENT DOCUMENTS

| | | | | | |
|---|---|---|---|---|---|
| 6,853,400 | B1 * | 2/2005 | Matama | H04N 1/401 | 348/222.1 |
| 7,142,238 | B1 * | 11/2006 | Sawada | H04N 1/00002 | 348/252 |
| 7,227,574 | B2 * | 6/2007 | Yamanaka | H04N 9/045 | 348/242 |
| 7,995,108 | B2 * | 8/2011 | Utsugi | G06T 7/90 | 382/167 |
| 8,368,968 | B2 * | 2/2013 | Hamano | G06T 5/006 | 358/448 |
| 8,493,401 | B2 * | 7/2013 | Hasegawa | H04N 9/3105 | 345/589 |
| 8,525,895 | B2 | 9/2013 | Cote et al. | | |
| 8,525,904 | B2 * | 9/2013 | Mitsuya | H04N 5/3572 | 348/241 |
| 8,730,357 | B2 * | 5/2014 | Nishio | H04N 9/045 | 348/208.11 |
| 2002/0051639 | A1 | 5/2002 | Enomoto | | |
| 2002/0071039 | A1 | 6/2002 | Hamaski et al. | | |
| 2005/0168614 | A1 * | 8/2005 | Okada | H04N 5/23248 | 348/335 |
| 2007/0242897 | A1 * | 10/2007 | Bushell | G06T 5/006 | 382/274 |
| 2008/0007630 | A1 * | 1/2008 | Hara | H04N 9/045 | 348/223.1 |
| 2008/0260291 | A1 * | 10/2008 | Alakarhu | G06T 3/4015 | 382/298 |
| 2008/0284869 | A1 * | 11/2008 | Utsugi | G06T 7/90 | 382/162 |
| 2009/0189997 | A1 | 7/2009 | Stec et al. | | |
| 2009/0231472 | A1 * | 9/2009 | Kasahara | G06T 7/80 | 382/167 |
| 2009/0295981 | A1 * | 12/2009 | Watanabe | H04N 9/04511 | 348/345 |
| 2010/0019129 | A1 * | 1/2010 | Ishigaki | H04N 9/045 | 250/208.1 |
| 2010/0214446 | A1 * | 8/2010 | Watarai | H04N 5/772 | 348/231.99 |
| 2011/0058064 | A1 * | 3/2011 | Hatano | G06T 5/002 | 348/223.1 |
| 2011/0090380 | A1 * | 4/2011 | Cote | G06T 3/4015 | 348/246 |
| 2011/0149103 | A1 * | 6/2011 | Hatakeyama | G06T 5/003 | 382/167 |
| 2011/0157432 | A1 * | 6/2011 | Han | H04N 5/217 | 348/241 |
| 2011/0280479 | A1 * | 11/2011 | Yamada | H04N 9/045 | 382/167 |
| 2011/0317047 | A1 * | 12/2011 | Stanhill | G06T 1/20 | 382/167 |
| 2012/0155761 | A1 * | 6/2012 | Matsuoka | G06T 5/006 | 382/167 |

* cited by examiner

<table>
<tr><th>FORMAT</th><th>31</th><th>30</th><th>29</th><th>28</th><th>27</th><th>26</th><th>25</th><th>24</th><th>23</th><th>22</th><th>21</th><th>20</th><th>19</th><th>18</th><th>17</th><th>16</th><th>15</th><th>14</th><th>13</th><th>12</th><th>11</th><th>10</th><th>09</th><th>08</th><th>07</th><th>06</th><th>05</th><th>04</th><th>03</th><th>02</th><th>01</th><th>00</th></tr>
<tr><td>RAW8</td><td colspan="8">P3[7:0]</td><td colspan="8">P2[7:0]</td><td colspan="8">P1[7:0]</td><td colspan="8">P0[7:0]</td></tr>
<tr><td>RAW10</td><td colspan="6"></td><td colspan="10">P1[9:0]</td><td colspan="6"></td><td colspan="10">P0[9:0]</td></tr>
<tr><td>RAW12</td><td colspan="4"></td><td colspan="12">P1[11:0]</td><td colspan="4"></td><td colspan="12">P0[11:0]</td></tr>
<tr><td>RAW14</td><td colspan="2"></td><td colspan="14">P1[13:0]</td><td colspan="2"></td><td colspan="14">P0[13:0]</td></tr>
<tr><td>RAW16</td><td colspan="16">P1[15:0]</td><td colspan="16">P0[15:0]</td></tr>
</table>

FIG. 25

<table>
<tr><th></th><th>31</th><th>30</th><th>29</th><th>28</th><th>27</th><th>26</th><th>25</th><th>24</th><th>23</th><th>22</th><th>21</th><th>20</th><th>19</th><th>18</th><th>17</th><th>16</th><th>15</th><th>14</th><th>13</th><th>12</th><th>11</th><th>10</th><th>09</th><th>08</th><th>07</th><th>06</th><th>05</th><th>04</th><th>03</th><th>02</th><th>01</th><th>00</th></tr>
<tr><td>00h</td><td colspan="8">P3[9:2]</td><td colspan="8">P2[9:2]</td><td colspan="8">P1[9:2]</td><td colspan="8">P0[9:2]</td></tr>
<tr><td>01h</td><td colspan="8">P6[9:2]</td><td colspan="8">P5[9:2]</td><td colspan="8">P4[9:2]</td><td colspan="2">P3[1:0]</td><td colspan="2">P2[1:0]</td><td colspan="2">P1[1:0]</td><td colspan="2">P0[1:0]</td></tr>
<tr><td>02h</td><td colspan="8">P9[9:2]</td><td colspan="8">P8[9:2]</td><td colspan="2">P7[1:0]</td><td colspan="2">P6[1:0]</td><td colspan="2">P5[1:0]</td><td colspan="2">P4[1:0]</td><td colspan="8">P7[9:2]</td></tr>
<tr><td>03h</td><td colspan="8">P12[9:2]</td><td colspan="2">P11[1:0]</td><td colspan="2">P10[1:0]</td><td colspan="2">P9[1:0]</td><td colspan="2">P8[1:0]</td><td colspan="8">P11[9:2]</td><td colspan="8">P10[9:2]</td></tr>
<tr><td>04h</td><td colspan="2">P15[1:0]</td><td colspan="2">P14[1:0]</td><td colspan="2">P13[1:0]</td><td colspan="2">P12[1:0]</td><td colspan="8">P15[9:2]</td><td colspan="8">P14[9:2]</td><td colspan="8">P13[9:2]</td></tr>
</table>

FIG. 26

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | P2[11:4] | | | | | | | | P1[3:0] | | | | P0[3:0] | | | | P1[11:4] | | | | | | | | P0[11:4] | | | | | | | |
| 01h | P5[11:4] | | | | | | | | P4[11:4] | | | | | | | | P3[3:0] | | | | P2[3:0] | | | | P3[11:4] | | | | | | | |
| 02h | P7[3:0] | | | | P6[3:0] | | | | P7[11:4] | | | | | | | | P6[11:4] | | | | | | | | P5[3:0] | | | | P4[3:0] | | | |

FIG. 27

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | P3[13:6] | | | | | | | | P2[13:6] | | | | | | | | P1[13:6] | | | | | | | | P0[13:6] | | | | | | | |
| 01h | P4[13:6] | | | | | | | | P3[5:0] | | | | | | P2[5:0] | | | | | | P1[5:0] | | | | | | P0[5:0] | | | | | |
| 02h | P5[1:0] | | P4[5:0] | | | | | | P7[13:6] | | | | | | | | P6[13:6] | | | | | | | | P5[13:6] | | | | | | | |
| 03h | P9[13:6] | | | | | | | | P8[13:6] | | | | | | | | P7[5:0] | | | | | | P6[5:0] | | | | | | P5[5:2] | | | |
| 04h | P10[3:0] | | | | P9[5:0] | | | | | | P8[5:0] | | | | | | P11[13:6] | | | | | | | | P10[13:6] | | | | | | | |
| 05h | P14[13:6] | | | | | | | | P13[13:6] | | | | | | | | P12[13:6] | | | | | | | | P11[5:0] | | | | | | P10[5:4] | |
| 06h | P15[5:0] | | | | | | P14[5:0] | | | | | | P13[5:0] | | | | | | P12[5:0] | | | | | | P15[13:6] | | | | | | | |

FIG. 28

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | R1 | | | | | G1 | | | | | | B1 | | | | | R0 | | | | | G0 | | | | | | B0 | | | | |

FIG. 29

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | | | | | | | | | R0 | | | | | | | | G0 | | | | | | | | B0 | | | | | | | |
| 01h | | | | | | | | | R1 | | | | | | | | G1 | | | | | | | | B1 | | | | | | | |
| 02h | | | | | | | | | R3 | | | | | | | | G3 | | | | | | | | B3 | | | | | | | |

FIG. 30

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | E0 [7:0] | | | | | | | | R0 [7:0] | | | | | | | | G0 [7:0] | | | | | | | | B0 [7:0] | | | | | | | |
| 01h | E1 [7:0] | | | | | | | | R1 [7:0] | | | | | | | | G1 [7:0] | | | | | | | | B1 [7:0] | | | | | | | |

FIG. 31

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | R0 [0] | G0 [0] | B0 [0] | E0 [4:0] | | | | | R0 [8:1] | | | | | | | | G0 [8:1] | | | | | | | | B0 [8:1] | | | | | | | |
| 01h | R1 [0] | G1 [0] | B1 [0] | E1 [4:0] | | | | | R1 [8:1] | | | | | | | | G1 [8:1] | | | | | | | | B1 [8:1] | | | | | | | |

FIG. 32

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | R0 [1:0] | | G0 [1:0] | | B0 [1:0] | | E0 [1:0] | | R0 [9:2] | | | | | | | | G0 [9:2] | | | | | | | | B0 [9:2] | | | | | | | |
| 01h | R1 [1:0] | | G1 [1:0] | | B1 [1:0] | | E1 [1:0] | | R1 [9:2] | | | | | | | | G1 [9:2] | | | | | | | | B1 [9:2] | | | | | | | |

FIG. 33

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | G0 | | | | | | | | | | | | | | | | B0 | | | | | | | | | | | | | | | |
| 01h | A0 | | | | | | | | | | | | | | | | R0 | | | | | | | | | | | | | | | |
| 02h | G1 | | | | | | | | | | | | | | | | B1 | | | | | | | | | | | | | | | |
| 03h | A1 | | | | | | | | | | | | | | | | R1 | | | | | | | | | | | | | | | |

FIG. 34

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|
| 00h | Cb0 | | | | | | | | | | | | | | | | Cr0 | | | | | | | | | | | | | | | |
| 01h | | | | | | | | | | | | | | | | | Y0 | | | | | | | | | | | | | | | |
| 02h | Cb1 | | | | | | | | | | | | | | | | Cr1 | | | | | | | | | | | | | | | |
| 03h | | | | | | | | | | | | | | | | | Y1 | | | | | | | | | | | | | | | |

FIG. 35

| | 31–24 | 23–16 | 15–8 | 7–0 |
|---|---|---|---|---|
| 00h | Cr0 | Y1 | Cb0 | Y0 |
| 01h | Cr2 | Y3 | Cb2 | Y2 |

FIG. 38

| | 31–22 | 21–16 | 15–6 | 5–0 |
|---|---|---|---|---|
| 00h | Cb0 | | Y0 | |
| 01h | Cr0 | | Y1 | |
| 02h | Cb2 | | Y2 | |
| 03h | Cr2 | | Y3 | |

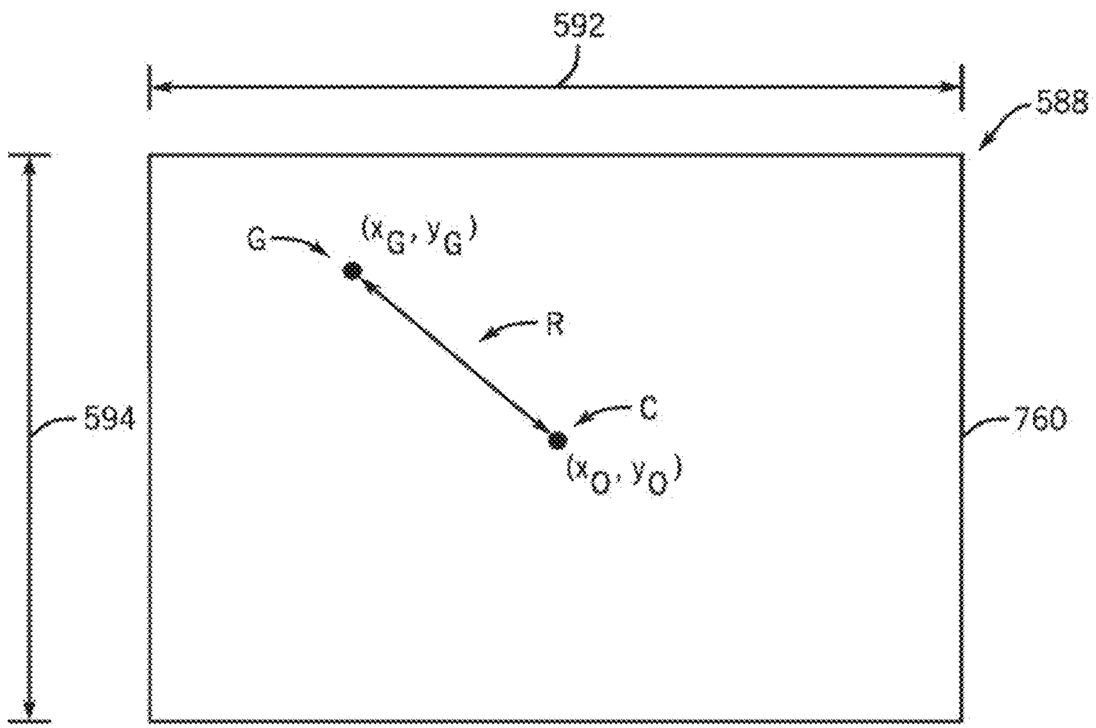
FIG. 61
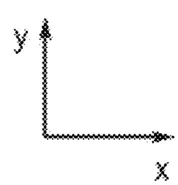

COLOR CORRECTION PROFILE:

LOW TEMP: H

MID / LOW: A

MID TEMP: D50

MID / HIGH: D65

HIGH TEMP: D75

| TEMP | RED | G0 | G1 | BLUE |
|---|---|---|---|---|
| 2300 | 1 | 1.07 | 1.06 | 1.86 |
| 2856 | 1.02 | 1 | 1 | 1.59 |
| 5000 | 1.37 | 1 | 1 | 1.23 |
| 6500 | 1.5 | 1 | 1 | 1.08 |
| 7500 | 1.55 | 1 | 1 | 1.02 |

FIG. 96
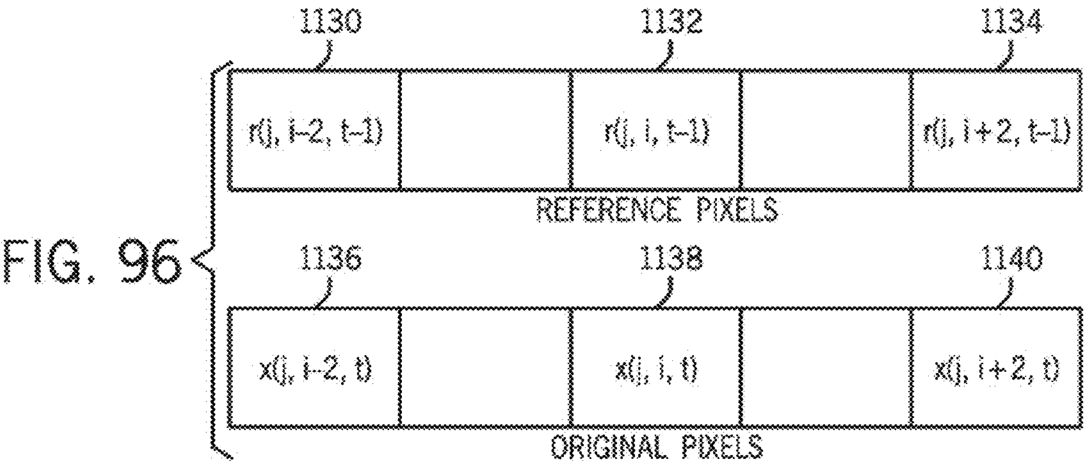
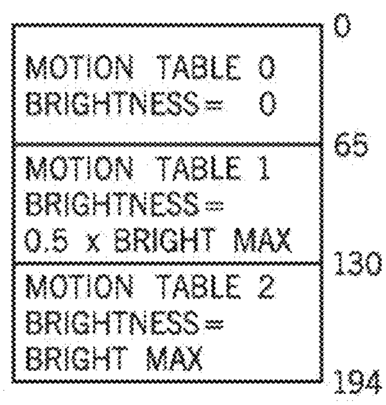
FIG. 97A
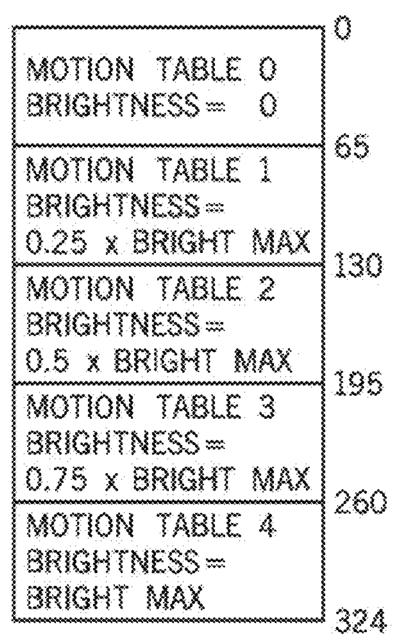
FIG. 97B

| | | | | |
|---|---|---|---|---|
| Gr7 | Gr7 | Gr5 | Gr7 | Gr7 |
| Gr4 | Gr3 | Gr2 | Gr3 | Gr4 |
| Gr1 | Gr0 | 0 | Gr0 | Gr1 |
| Gr4 | Gr3 | Gr2 | Gr3 | Gr4 |
| Gr7 | Gr6 | Gr5 | Gr6 | Gr7 |

Gr PIXEL CORRECTION

| | | | | |
|---|---|---|---|---|
| R7 | R6 | R5 | R6 | R7 |
| R4 | R3 | R2 | R3 | R4 |
| R1 | R0 | 0 | R0 | R1 |
| R4 | R3 | R2 | R3 | R4 |
| R7 | R6 | R5 | R6 | R7 |

R PIXEL CORRECTION

| | | | | |
|---|---|---|---|---|
| B7 | B6 | B5 | B6 | B7 |
| B4 | B3 | B2 | B3 | B4 |
| B1 | B0 | 0 | B0 | B1 |
| B4 | B3 | B2 | B3 | B4 |
| B7 | B6 | B5 | B6 | B7 |

B PIXEL CORRECTION

| | | | | |
|---|---|---|---|---|
| Gb7 | Gb6 | Gb5 | Gb6 | Gb7 |
| Gb4 | Gb3 | Gb2 | Gb3 | Gb4 |
| Gb1 | Gb0 | 0 | b0 | Gb1 |
| Gb4 | Gb3 | Gb2 | Gb3 | Gb4 |
| Gb7 | Gb6 | Gb5 | Gb6 | Gb7 |

Gb PIXEL CORRECTION

FIG. 101

| 31 | 15 | 0 |
|---|---|---|
| BIN[1] | BIN[0] | 0 |
| BIN[3] | BIN[2] | |
| BIN[5] | BIN[4] | |
| BIN[7] | BIN[6] | |
| SUM GRADIENT MAGNITUDE | | |
| SUM PIXEL INTENSITIES | | |
| | PEAK GRADIENT MAGNITUDE | 6 |

FIG. 107

| | Sample 40 | | | | Sample 44 | | | | Sample 48 | | | | Sample 52 | | | | Sample 56 | | | | Sample 60 | |
|---|---|---|---|---|---|---|---|---|---|---|---|---|---|---|---|---|---|---|---|---|---|---|
| Line 0 | Gr20 | R23 | Gr21 | R24 | Gr22 | R25 | Gr23 | R26 | Gr24 | R27 | Gr25 | R28 | Gr26 | R29 | Gr27 | R30 | Gr28 | R31 | Gr29 | R32 | Gr30 | R33 |
| | B16 | Gb20 | B17 | Gb21 | B18 | Gb22 | B19 | Gb23 | B20 | Gb24 | B21 | Gb25 | B22 | Gb26 | B24 | Gb27 | B25 | Gb28 | B26 | Gb29 | B27 | Gb30 |
| | Gr20 | R23 | Gr21 | R24 | Gr22 | R25 | Gr23 | R26 | Gr24 | R27 | Gr25 | R28 | Gr26 | R29 | Gr27 | R30 | Gr28 | R31 | Gr29 | R32 | Gr30 | R33 |
| | B16 | Gb20 | B17 | Gb21 | B18 | Gb22 | B19 | Gb23 | B20 | Gb24 | B21 | Gb25 | B22 | Gb26 | B24 | Gb27 | B25 | Gb28 | B26 | Gb29 | B27 | Gb30 |

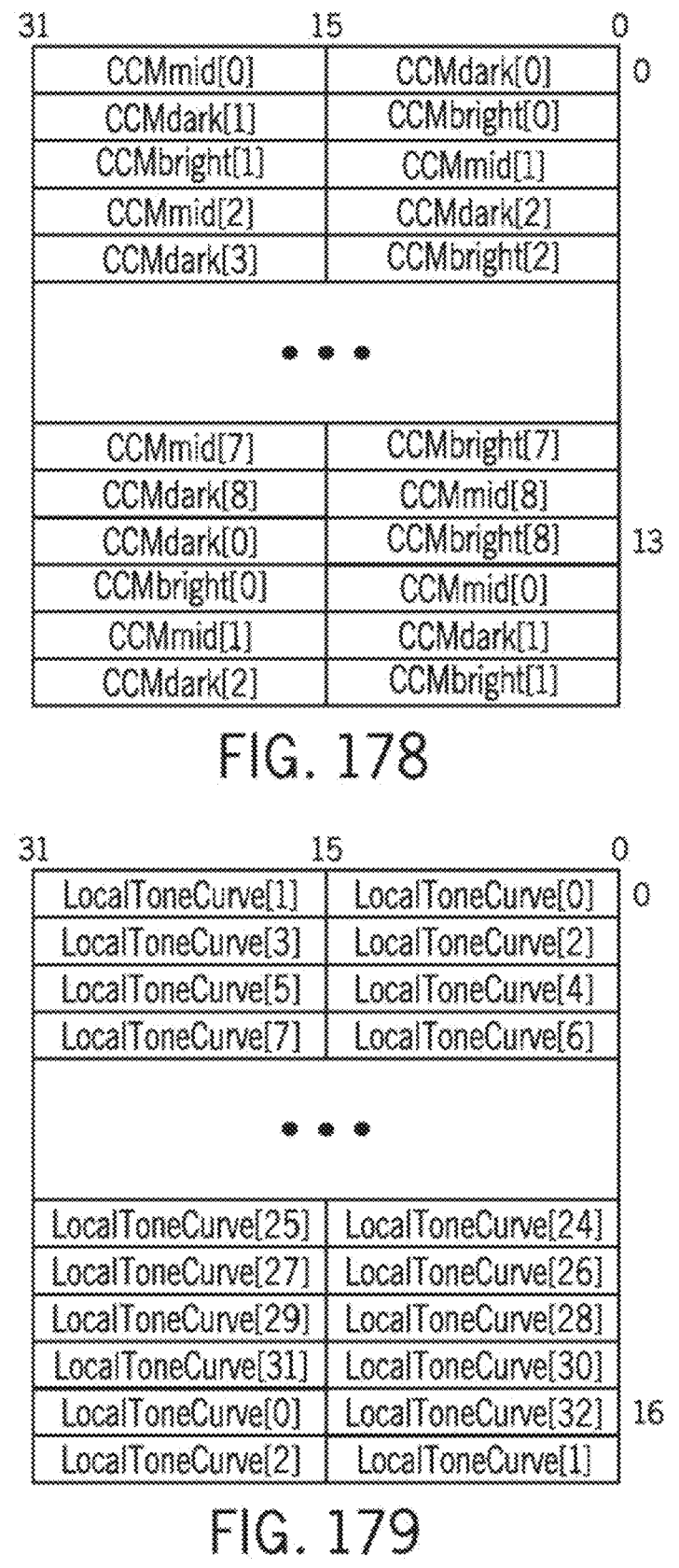

| 31 | 15 | 0 |
|---|---|---|
| CCMmid[0] | CCMdark[0] | 0 |
| CCMdark[1] | CCMbright[0] | |
| CCMbright[1] | CCMmid[1] | |
| CCMmid[2] | CCMdark[2] | |
| CCMdark[3] | CCMbright[2] | |
| • • • | | |
| CCMmid[7] | CCMbright[7] | |
| CCMdark[8] | CCMmid[8] | |
| CCMdark[0] | CCMbright[8] | 13 |
| CCMbright[0] | CCMmid[0] | |
| CCMmid[1] | CCMdark[1] | |
| CCMdark[2] | CCMbright[1] | |

FIG. 178

| 31 | 15 | 0 |
|---|---|---|
| LocalToneCurve[1] | LocalToneCurve[0] | 0 |
| LocalToneCurve[3] | LocalToneCurve[2] | |
| LocalToneCurve[5] | LocalToneCurve[4] | |
| LocalToneCurve[7] | LocalToneCurve[6] | |
| • • • | | |
| LocalToneCurve[25] | LocalToneCurve[24] | |
| LocalToneCurve[27] | LocalToneCurve[26] | |
| LocalToneCurve[29] | LocalToneCurve[28] | |
| LocalToneCurve[31] | LocalToneCurve[30] | |
| LocalToneCurve[0] | LocalToneCurve[32] | 16 |
| LocalToneCurve[2] | LocalToneCurve[1] | |

FIG. 179

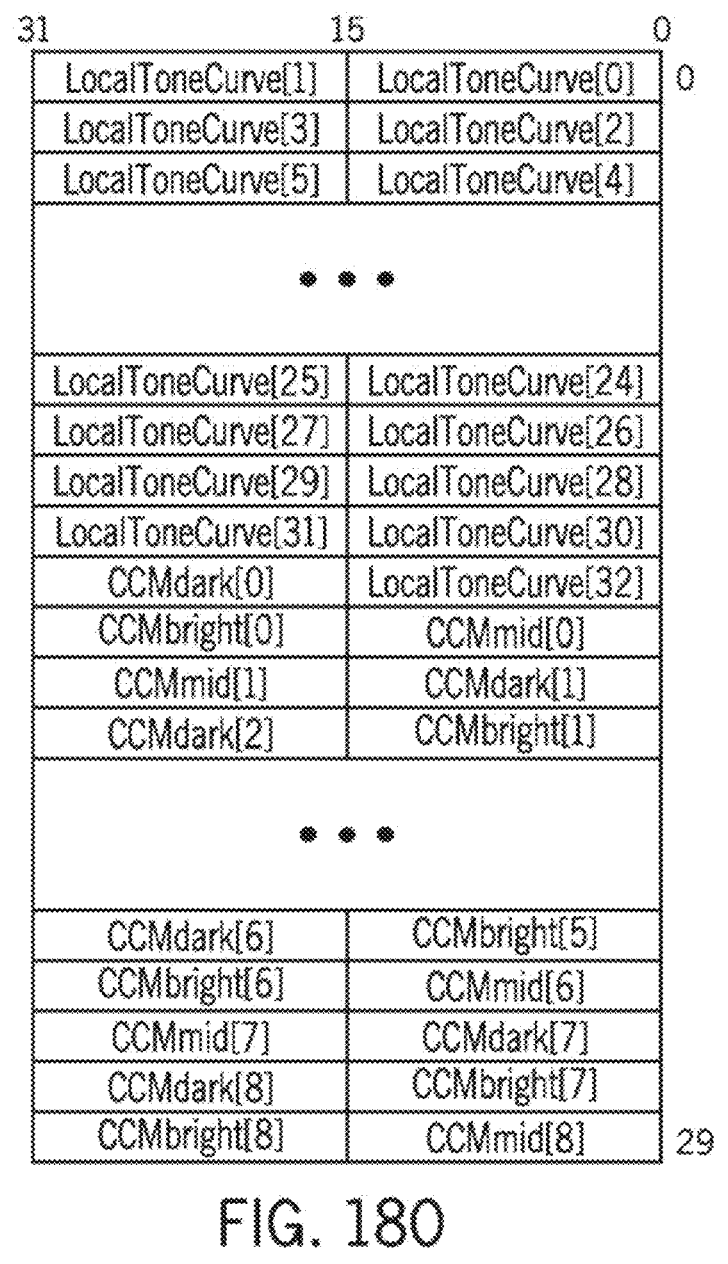

| 31 … 16 | 15 … 0 | |
|---|---|---|
| LocalToneCurve[1] | LocalToneCurve[0] | 0 |
| LocalToneCurve[3] | LocalToneCurve[2] | |
| LocalToneCurve[5] | LocalToneCurve[4] | |
| • • • | | |
| LocalToneCurve[25] | LocalToneCurve[24] | |
| LocalToneCurve[27] | LocalToneCurve[26] | |
| LocalToneCurve[29] | LocalToneCurve[28] | |
| LocalToneCurve[31] | LocalToneCurve[30] | |
| CCMdark[0] | LocalToneCurve[32] | |
| CCMbright[0] | CCMmid[0] | |
| CCMmid[1] | CCMdark[1] | |
| CCMdark[2] | CCMbright[1] | |
| • • • | | |
| CCMdark[6] | CCMbright[5] | |
| CCMbright[6] | CCMmid[6] | |
| CCMmid[7] | CCMdark[7] | |
| CCMdark[8] | CCMbright[7] | |
| CCMbright[8] | CCMmid[8] | 29 |

FIG. 180

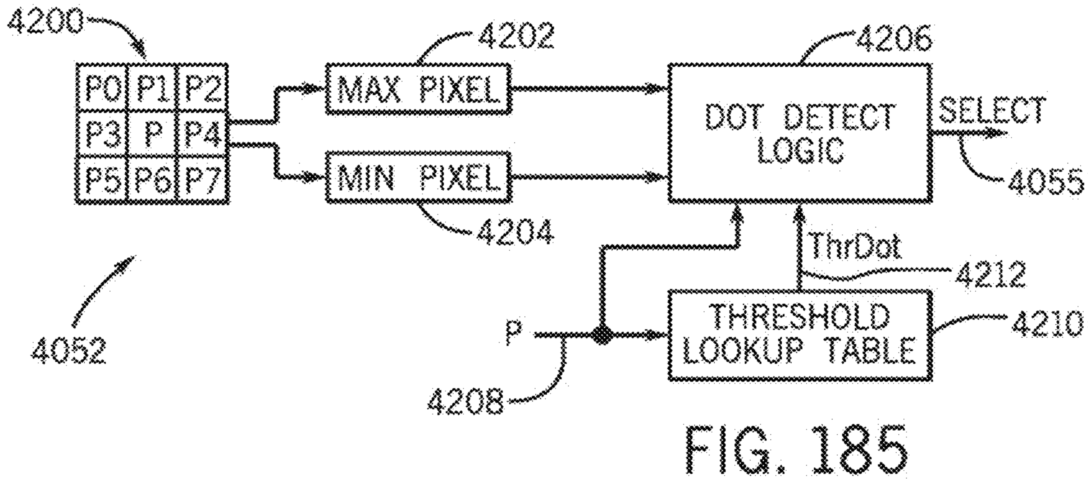
FIG. 185
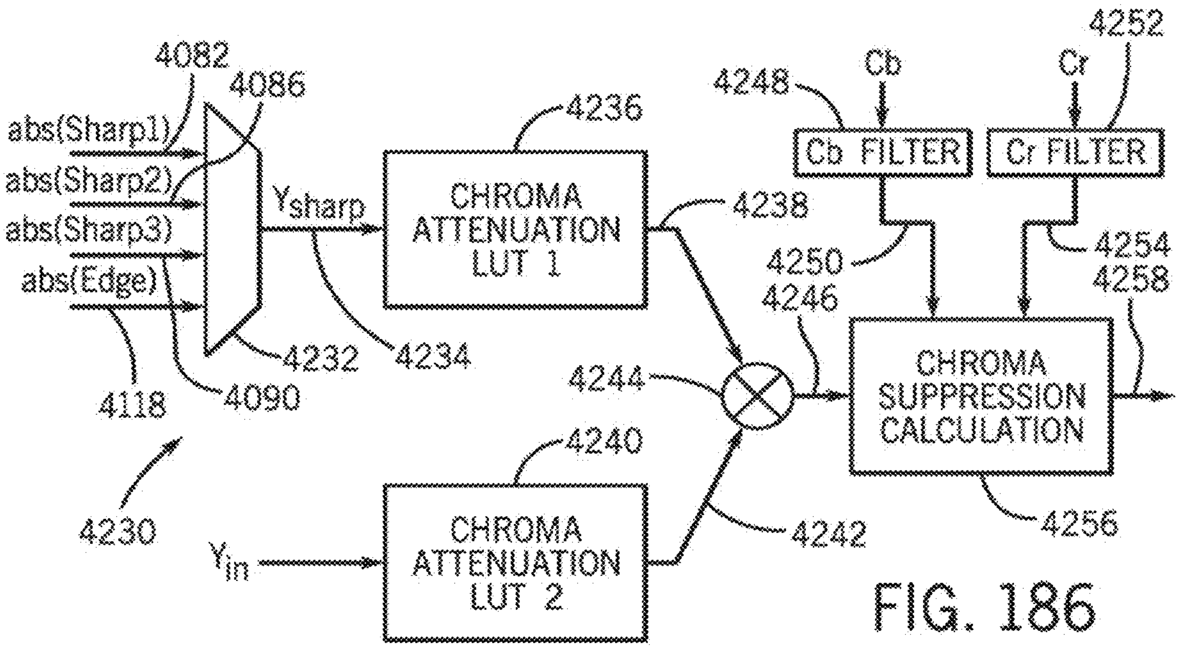
FIG. 186
FIG. 187
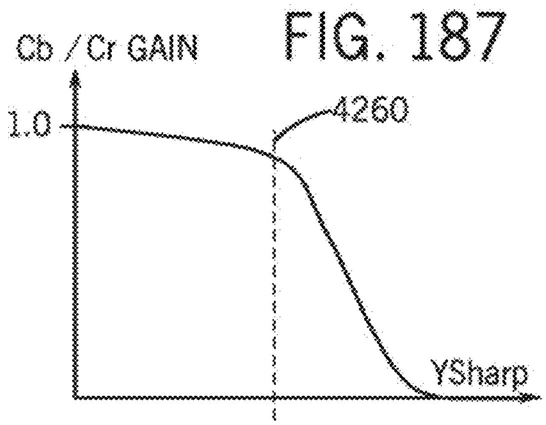
FIG. 188
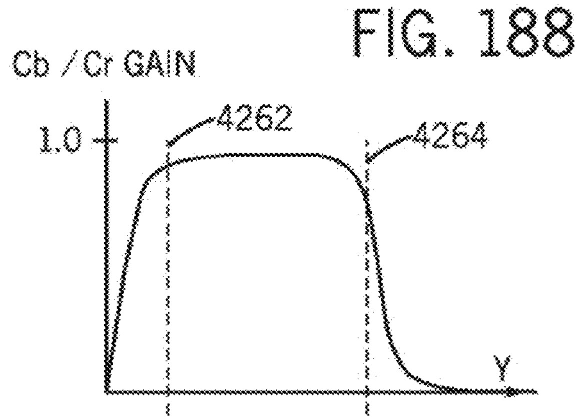

RAW SCALER WITH CHROMATIC ABERRATION CORRECTION

CROSS-REFERENCE TO RELATED APPLICATIONS

The instant application is a divisional of, and hereby claims priority to, pending U.S. patent application Ser. No. 13/485,024, which was filed on 31 May 2012, and which is incorporated by reference.

The following applications, all filed on May 31, 2012, are related: "Systems and Methods for Temporally Filtering Image Data," U.S. application Ser. No. 13/484,721; "Local Image Statistics Collection," U.S. application Ser. No. 13/484,741; "Systems and Methods for RGB Image Processing," U.S. application Ser. No. 13/484,484; "Image Signal Processing Involving Geometric Distortion Correction," U.S. application Ser. No. 13/484,842; "Systems and Methods for YCC Image Processing," U.S. application Ser. No. 13/484,926; "Systems and Methods for Chroma Noise Reduction," U.S. application Ser. No. 13/484,991; "Systems and Methods for Local Tone Mapping," U.S. application Ser. No. 13/485,421; "Raw Scaler with Chromatic Aberration Correction," U.S. application Ser. No. 13/485,024; "Systems and Methods for Raw Image Processing," U.S. application Ser. No. 13/485,056; "Systems and Methods for Reducing Fixed Pattern Noise in Image Data," U.S. application Ser. No. 13/485,101; "Systems and Methods for Collecting Fixed Pattern Noise Statistics of Image Data," U.S. application Ser. No. 13/485,124; "Systems and Methods for Highlight Recovery in an Image Signal Processor," U.S. application Ser. No. 13/485,199; "Systems and Methods for Lens Shading Correction," U.S. application Ser. No. 13/485,235; "Systems and Methods for Determining Noise Statistics of Image Data," U.S. application Ser. No. 13/485,299; and "Systems and Methods for Luma Sharpening," U.S. application Ser. No. 13/485,341. These applications are incorporated by reference herein in their entireties.

BACKGROUND

The present disclosure relates generally to digital imaging and, more particularly, to processing image data with image signal processor logic.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital imaging devices appear in handheld devices, computers, digital cameras, and a variety of other electronic devices. Once a digital imaging device acquires an image, an image processing pipeline may apply a number of image processing operations to generate a full color, processed image. Although conventional image processing techniques aim to produce a polished image, these techniques may not adequately address many image distortions and errors introduced by components of the imaging device. For example, defective pixels on the image sensor may produce image artifacts. Lens imperfections may produce an image with non-uniform light intensity. Sensor imperfections arising during manufacture may produce specific patterns of noise on different sensors. Furthermore, sensors from different vendors may reproduce color in perceptibly different ways.

Some conventional image processing techniques may also be relatively inefficient. In one example, certain operational blocks may spread distortions and errors to other areas of the image. In another example, lookup tables may be repeatedly loaded into local buffers from memory to process new image frames from different imaging devices. In addition, many conventional image processing techniques may cause image information to be lost during certain operations. For example, some operations may cause a pixel to be gained beyond a level that can be tracked in conventional image signal processors, resulting in an image with at least some pixels that have been arbitrarily clipped. Other operations may inaccurately reproduce some colors when one of the color channels has reached a maximum intensity. Still others may cause black level noise—noise occurring even when no light reaches the sensor—to be misconstrued as noise occurring only in a positive direction, producing gray-tinged black regions that should be completely black. Moreover, in some situations, images with high global contrast may have image information lost in shadows or obscured by highlights when global contrast operations are performed.

Other conventional image processing techniques may include image demosaicing and sharpening. Conventional demosaicing techniques, however, may not adequately account for the locations and direction of edges within the image, resulting in edge artifacts such as aliasing, checkerboard artifacts, or rainbow artifacts. Similarly, conventional sharpening techniques may not adequately account for existing noise in the image signal, or may be unable to distinguish the noise from edges and textured areas in the image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems and methods for down-scaling in the raw domain are provided. In one example, a method for processing raw image data includes using raw scaler logic of an image signal processor to determine a plurality of output pixel locations using a position value stored by a position register, wherein each of the plurality of output pixel locations is determined by incrementing the position value using a step value. The method also includes, for each output pixel location corresponding to a current position value stored in the position register, using the current position value to select a center input pixel from the raw image data and to select an index value, selecting a set of input pixels adjacent to the center input pixel, selecting a set of filtering coefficients from a filter coefficient lookup table using the index value, filtering the set of source input pixels using scaling logic to apply a respective one of the set of filtering coefficients to each of the set of source input pixels to determine an output value for the current output pixel at the current position value, and correcting chromatic aberrations in the set of source input pixels. The index value represents a fractional position of a current output pixel at the current position value between two input pixels of the same color. The raw image data comprises multiple color components in a single plane and corresponds to an image scene captured by a digital image sensor. The adjacent input pixels and the center input pixel form a set of source input pixels. The method also includes processing the output pixels provided by the raw scaler logic to display a visual representation of the image scene on a display device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawings will be provided by the Office upon request and payment of the necessary fee.

Various aspects of this disclosure may be better understood upon reading the following detailed description and upon reference to the drawings in which:

FIGS. 25-28 show examples of memory formats for raw image data that may be supported by the image processing circuitry of FIG. 7 or FIG. 8, in accordance with an embodiment;

FIGS. 29-34 show examples of memory formats for full-color RGB image data that may be supported by the image processing circuitry of FIG. 7 or FIG. 8, in accordance with an embodiment;

FIGS. 35-39 show examples of memory formats for luma/chroma image data (YUV/YC1C2) that may be supported by the image processing circuitry of FIG. 7 or FIG. 8, in accordance with an embodiment;

FIG. 61 graphically illustrates how a radial distance between a current pixel and the center of an image may be calculated and used to determine a radial gain component for lens shading correction, in accordance with an embodiment;

FIG. 96 illustrates a set of reference image pixels and a set of corresponding image pixels that may be used to determine one or more parameters for the temporal filtering process of FIG. 95, in accordance with an embodiment;

FIG. 97A and FIG. 97B illustrate two examples of a motion table being divided according to a number of brightness levels that may be used to determine one or more parameters for the temporal filtering process of FIG. 95, in accordance with an embodiment;

FIG. 101 shows various pixel correction coefficients that may be considered when applying techniques for detecting and correcting defective pixels during processing by the raw processing block shown in FIG. 91, in accordance with an embodiment;

FIG. 107 is an illustration of a memory format for the noise statistics, in accordance with an embodiment;

FIG. 135 is a block diagram illustrating the vertical resampler coordinate generator, in accordance with an embodiment;

FIG. 136 is a block diagram illustrating the vertical displacement computation, in accordance with an embodiment;

FIG. 137 is a block diagram illustrating the vertical sensor to component coordinate translation logic, in accordance with an embodiment;

FIG. 138 is an illustration of the green output samples aligning with the green input samples since there is no vertical scaling or binning compensation;

FIG. 139 is a diagram illustrating that if the Chromatic Aberration were a linear function of the radius, the offsets between red and green and between blue and green would be constant for each output line, but decreasing to zero near the vertical center of the frame;

FIG. 140 is a chart depicting vertical offsets from the green channel;

FIG. 141 is a block diagram illustrating one embodiment of the horizontal resampler coordinate generator, in accordance with an embodiment;

FIG. 142 is a block diagram illustrating the horizontal displacement computation logic, in accordance with an embodiment;

FIG. 143 is a block diagram illustrating the horizontal sensor to component coordinate translation logic, in accordance with an embodiment;

FIG. 144 is a diagram illustrating that since there is no horizontal scaling or binning compensation, the green output samples are aligned with the green input samples;

FIG. 145 is a diagram that illustrates the offset for the blue channel decreasing by 2

FIG. 146 is a diagram that illustrates the maximum offset between the vertical position of the center tap on the red (and blue) component and the corresponding green component;

Figure 8:
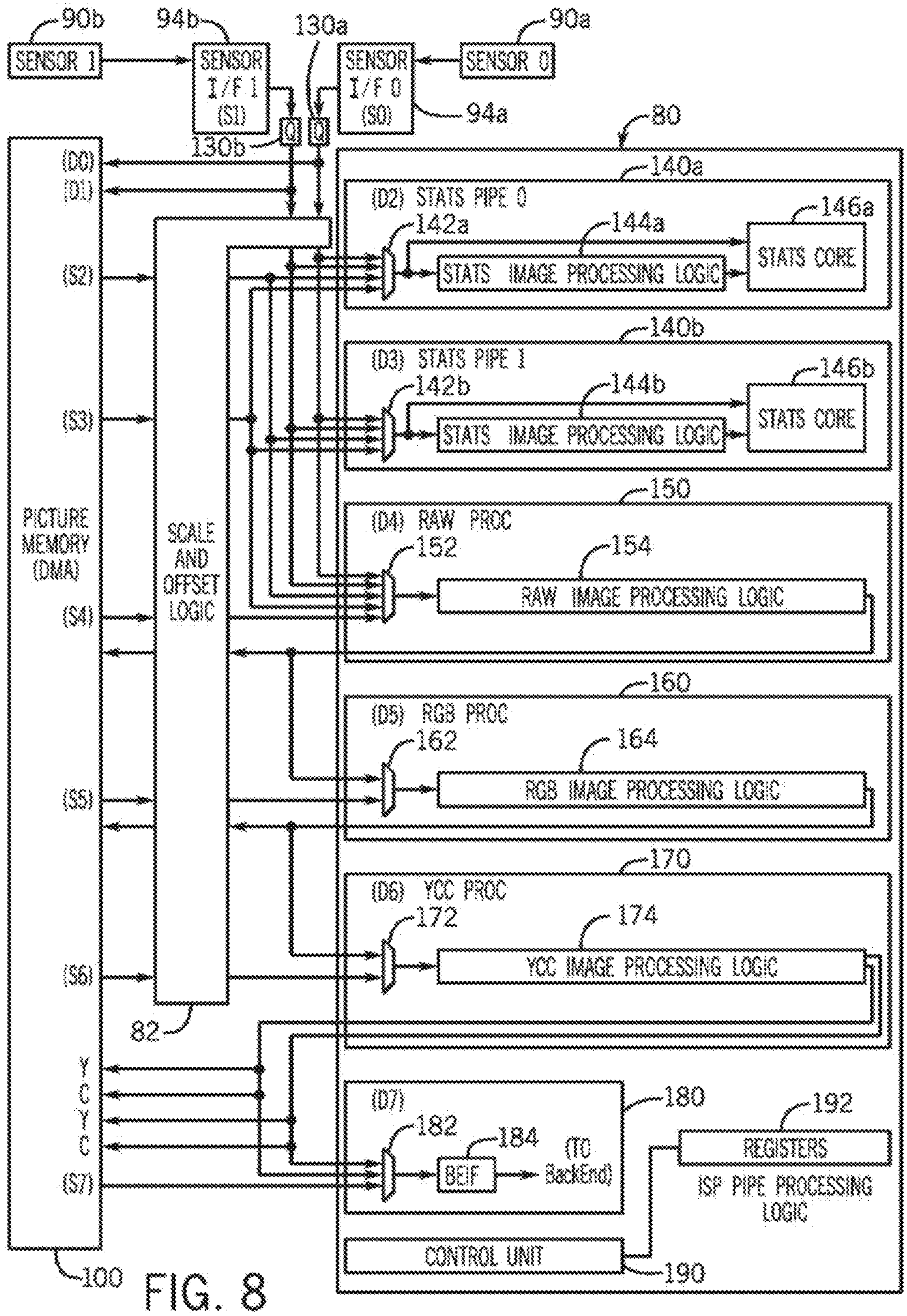
FIG. 8 is a block diagram of an example of the image processing circuitry of FIG. 1, including statistics logic, a raw-format processing block, an RGB-format processing block, and a YCC-format processing block, in accordance with an embodiment.
Figure 147:
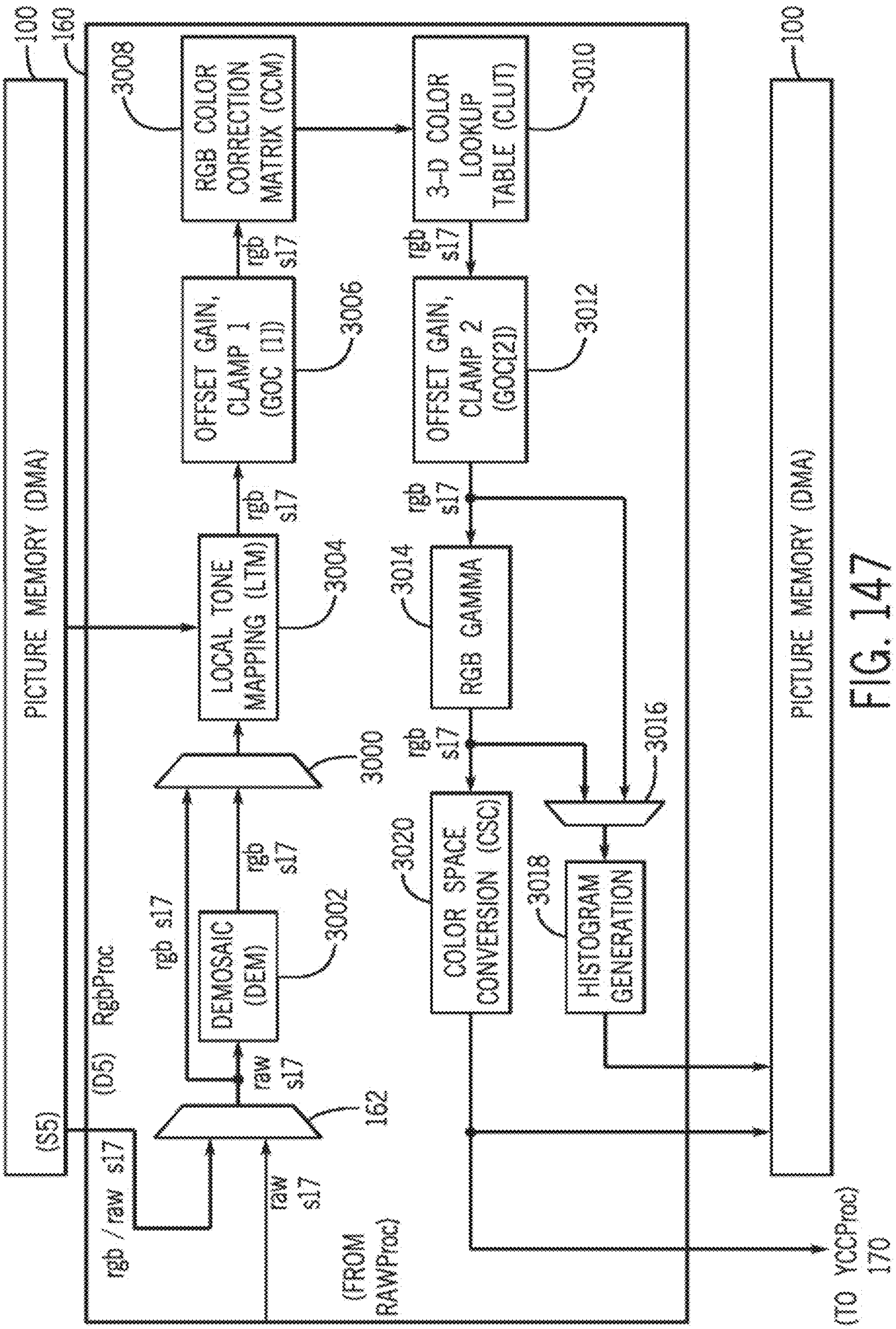
Figure 148:
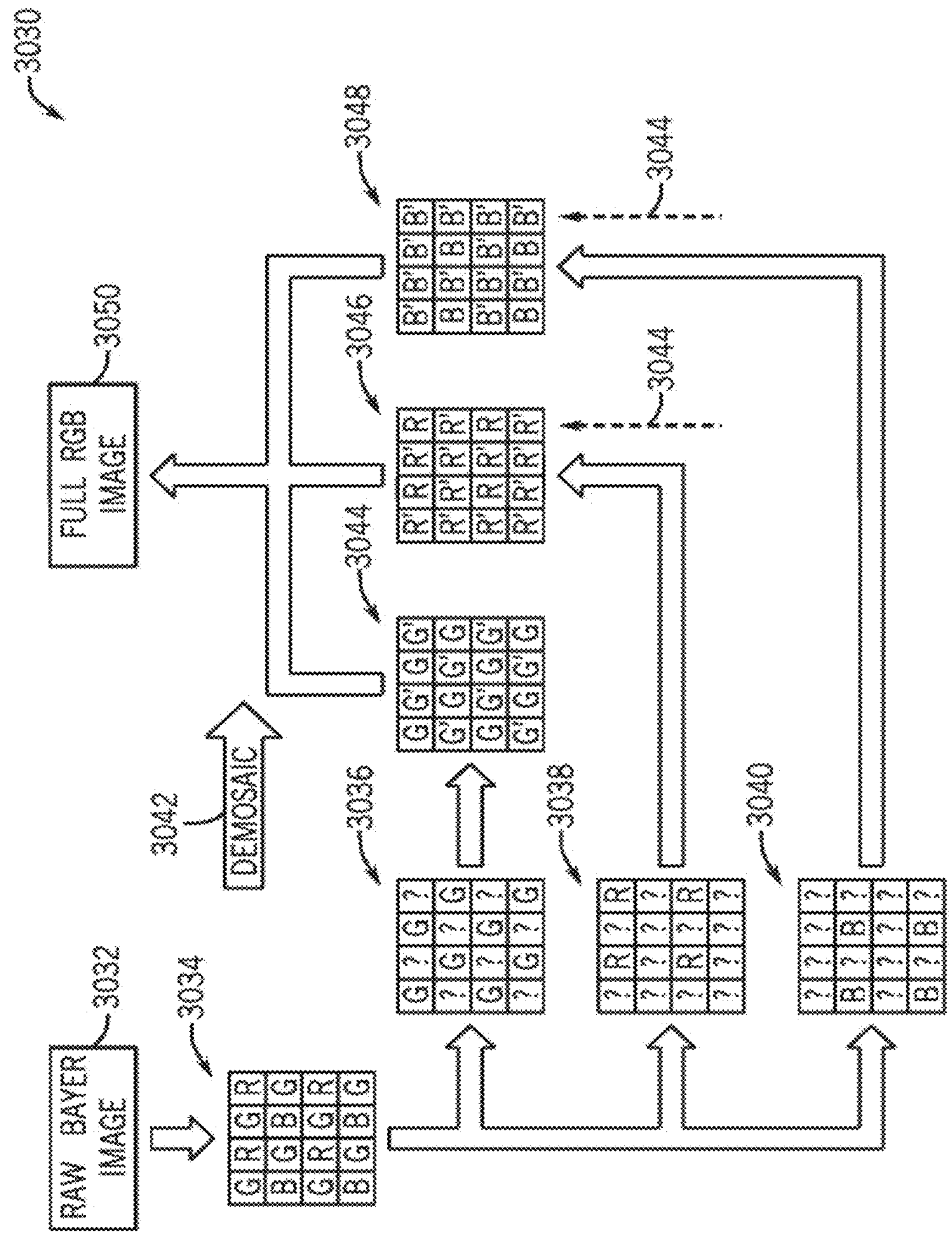
Figure 149:
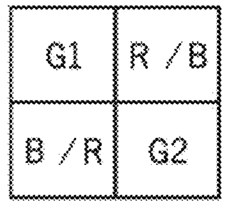
Figure 151:
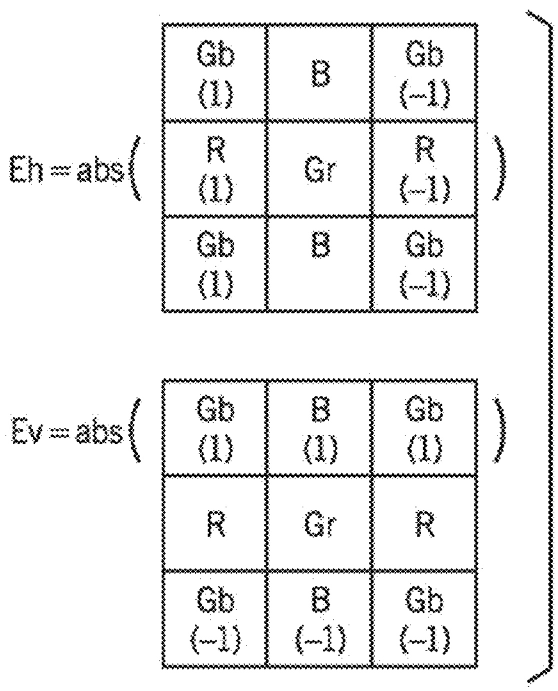
Figure 150:
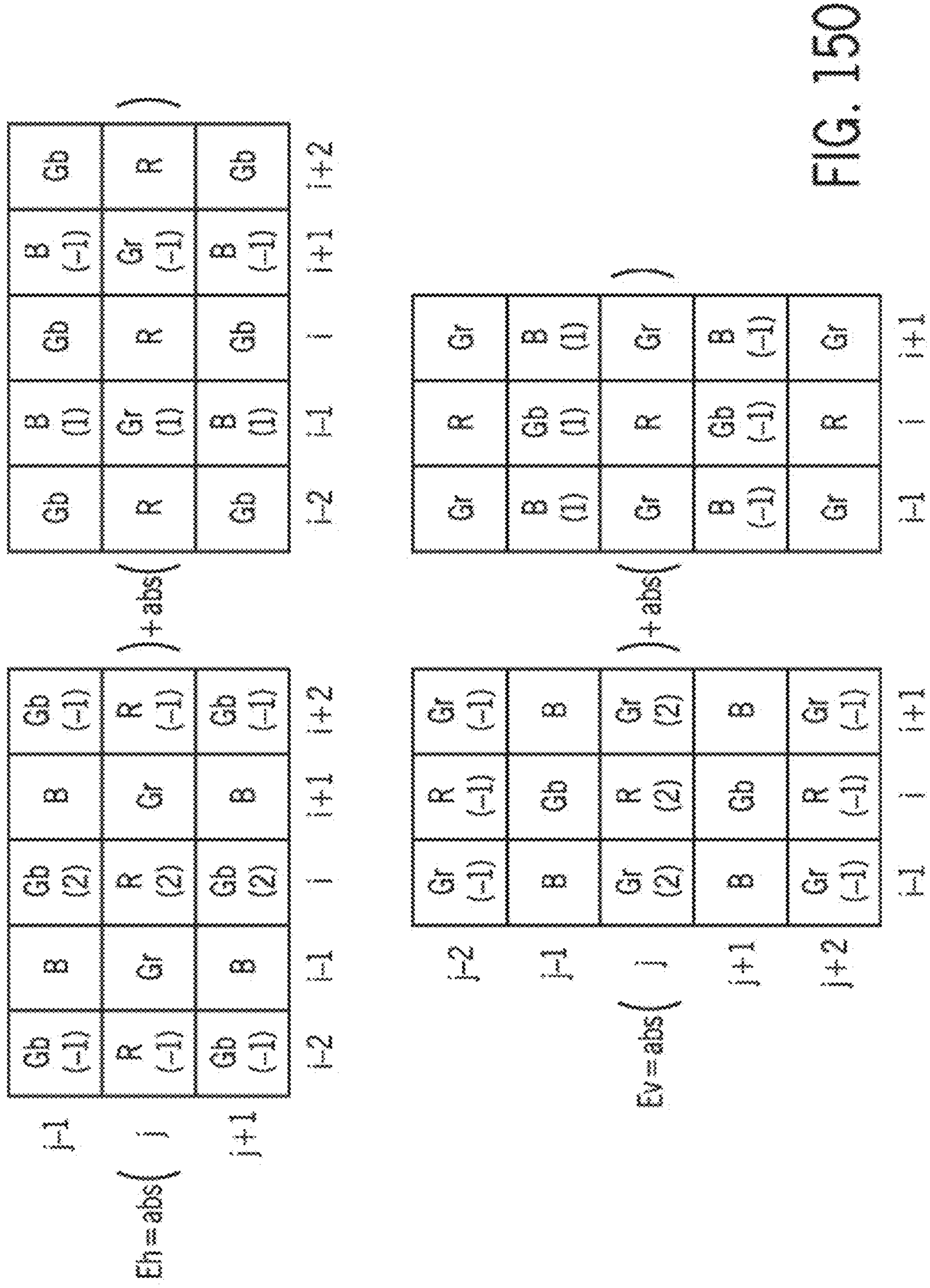
Figure 152:
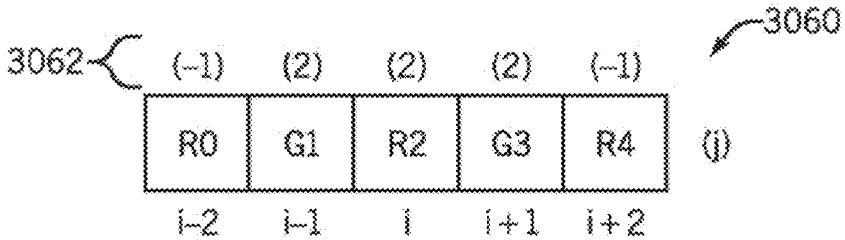
Figure 153:
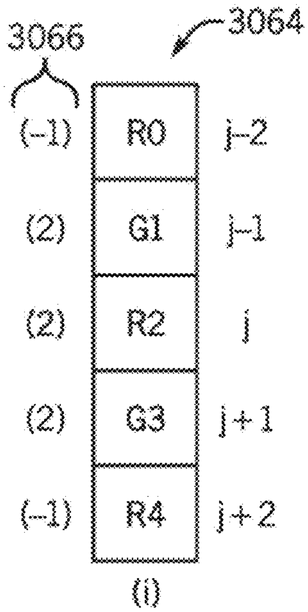
Figure 154:
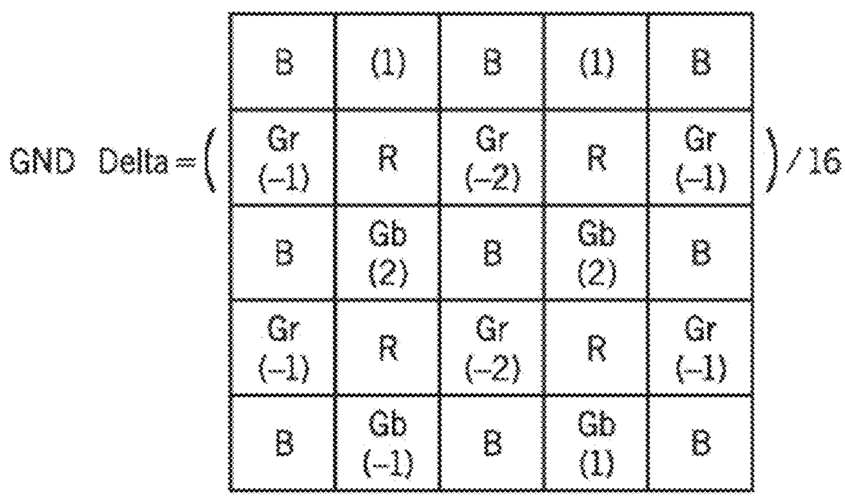
Figure 155:
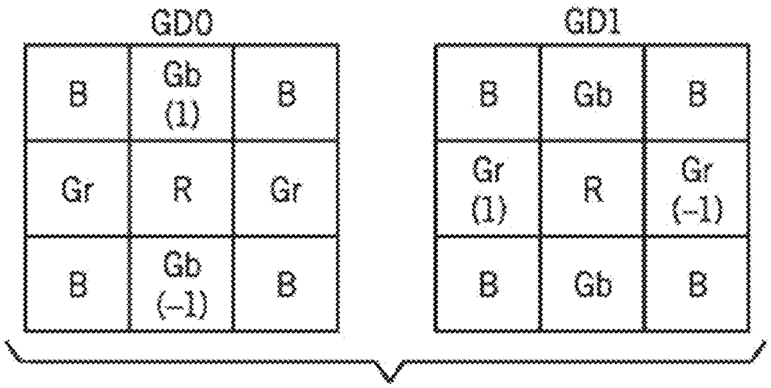
Figure 156:
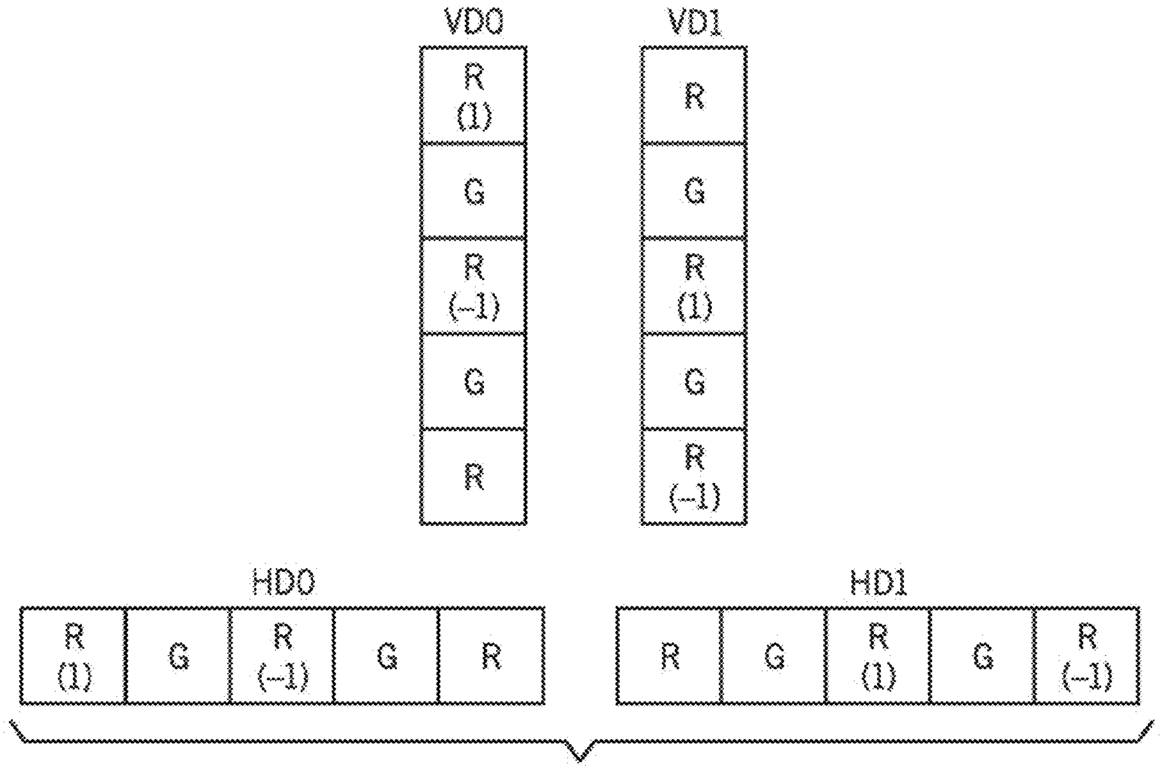
Figure 157:
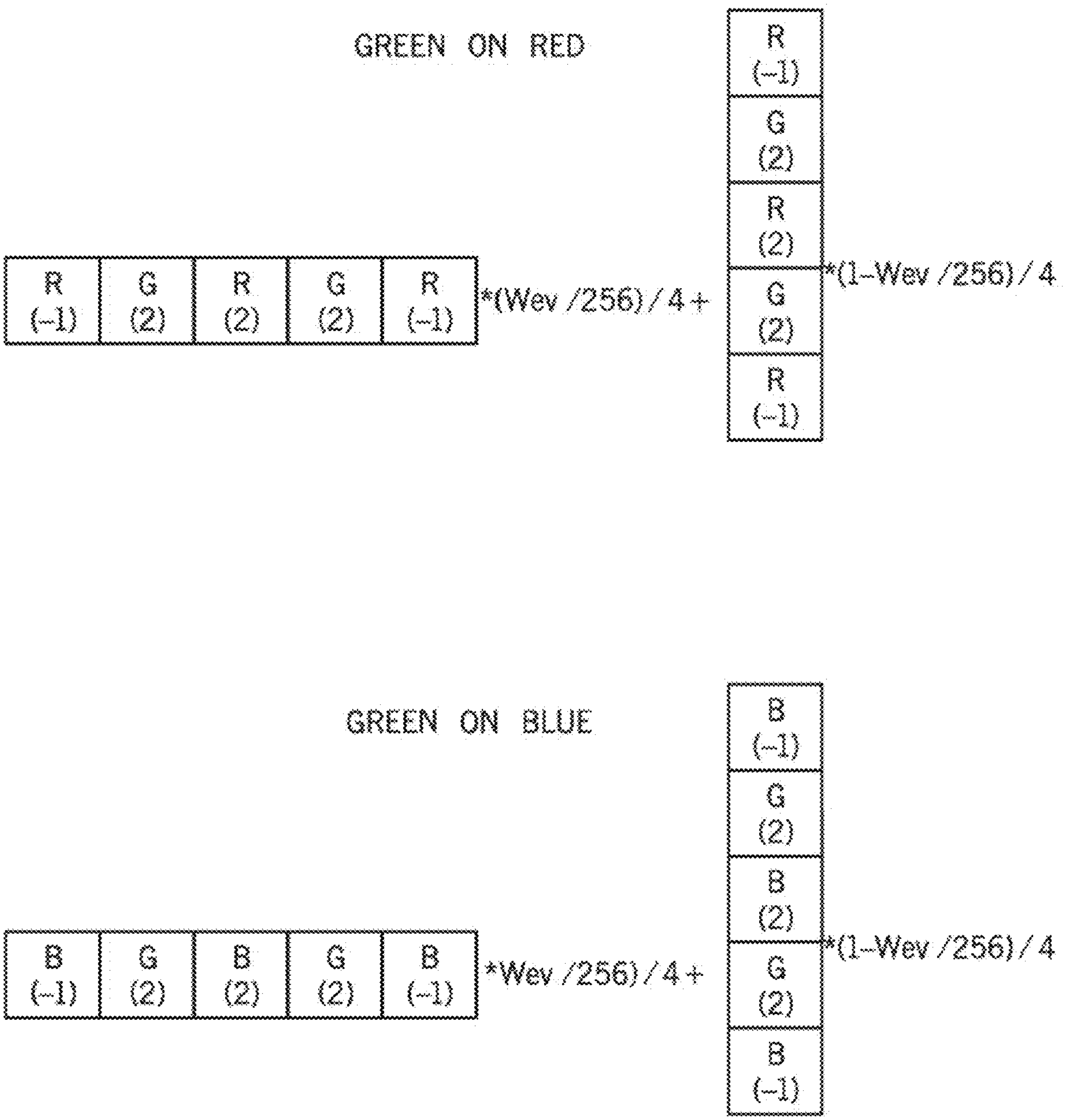
Figure 158:
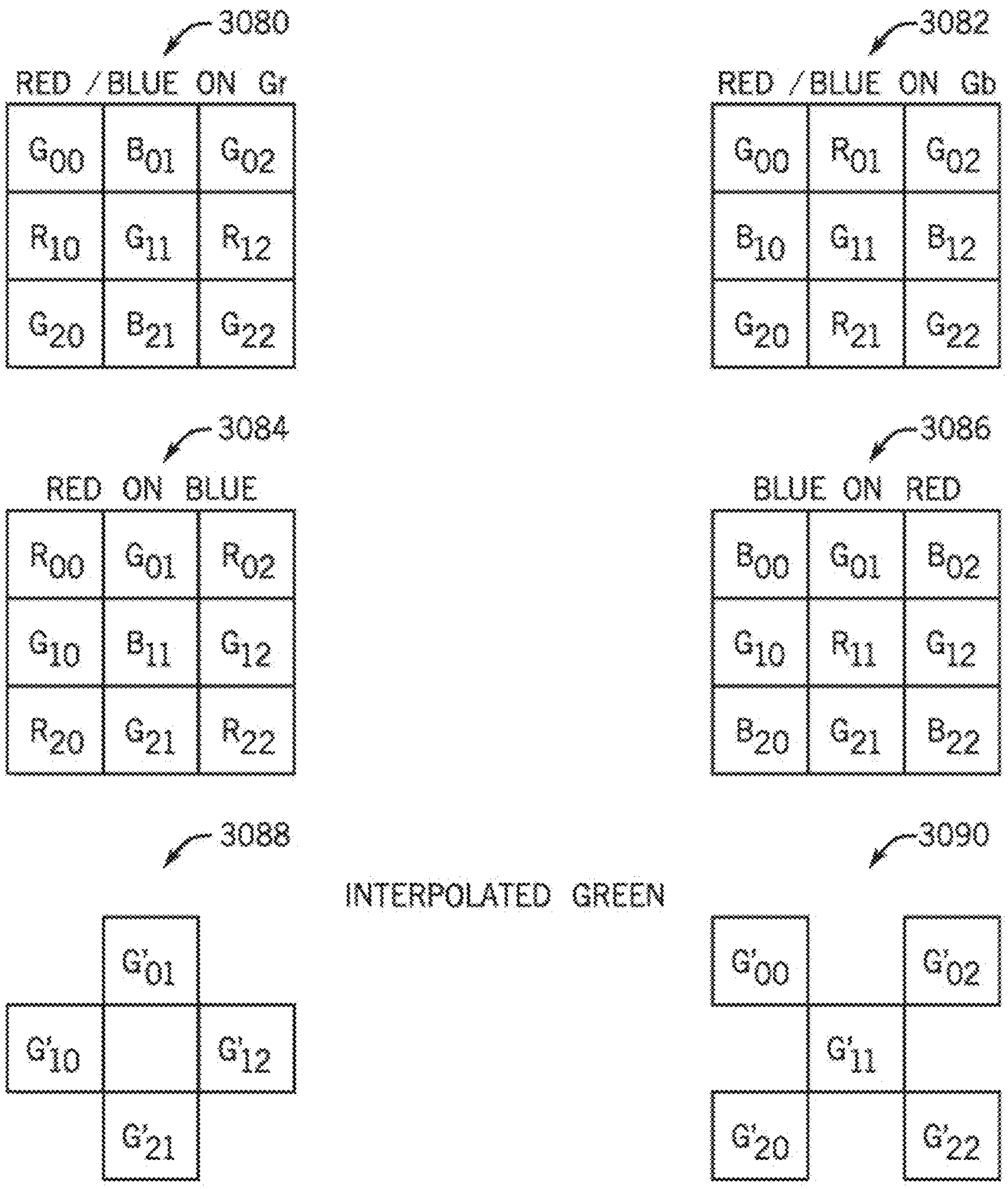
Figure 159:
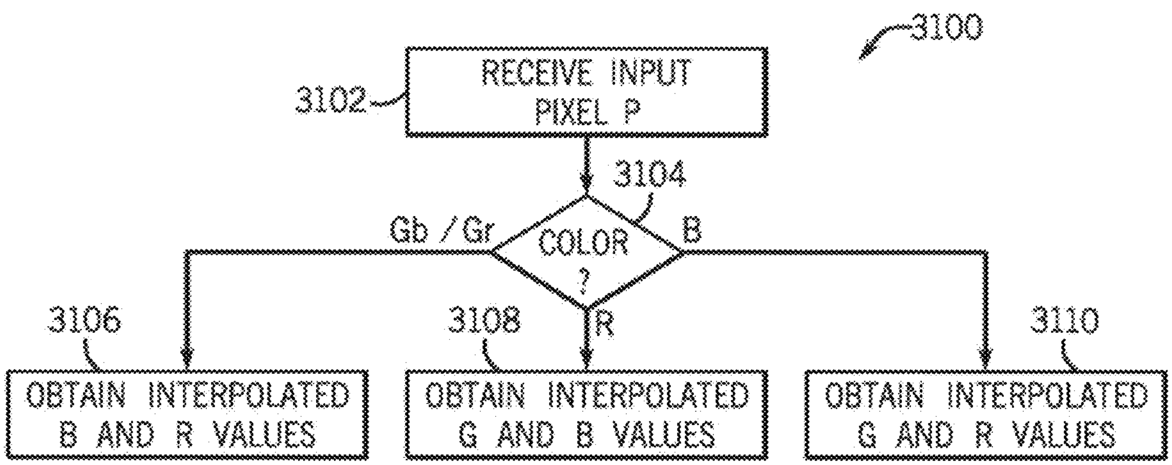
Figure 160:
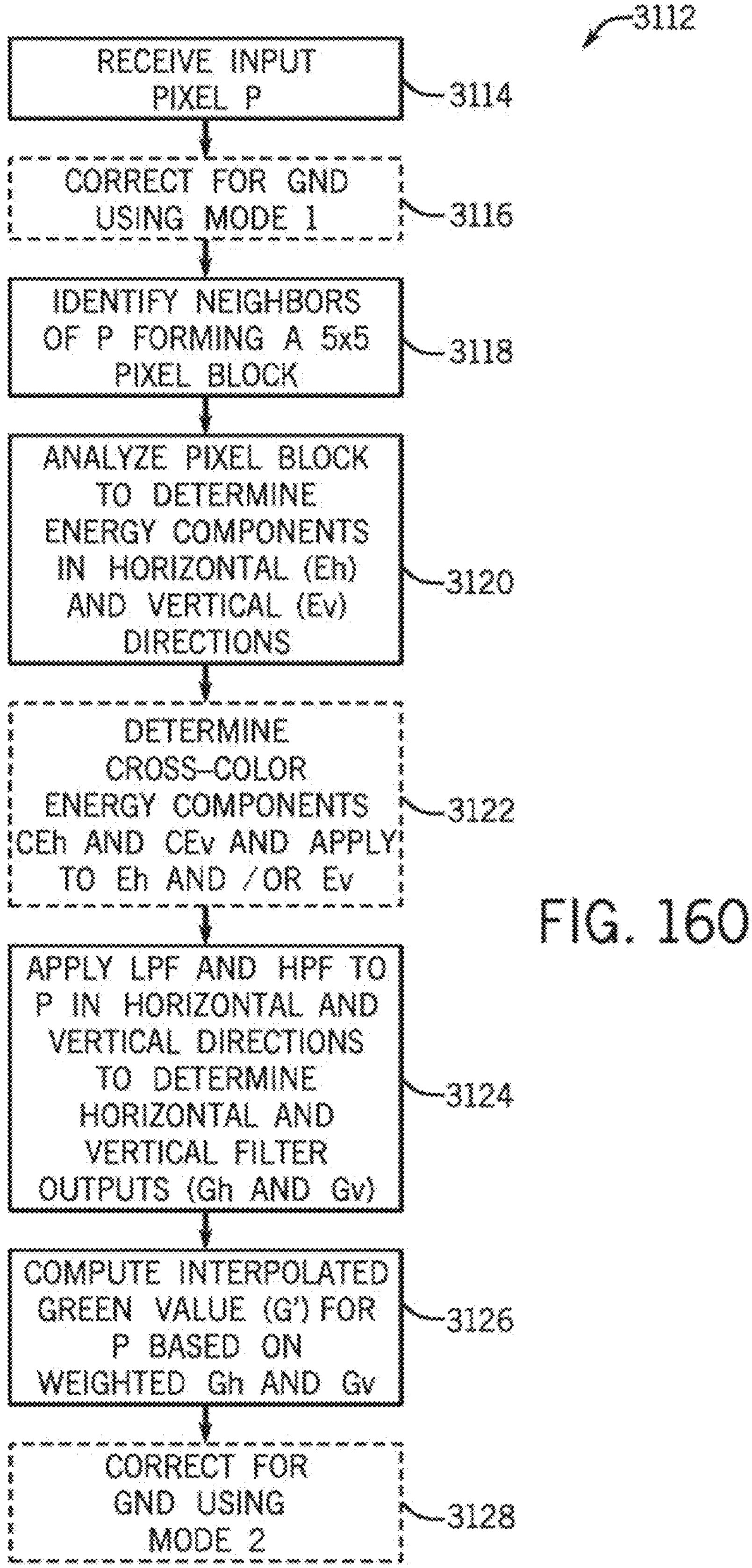
Figure 161:
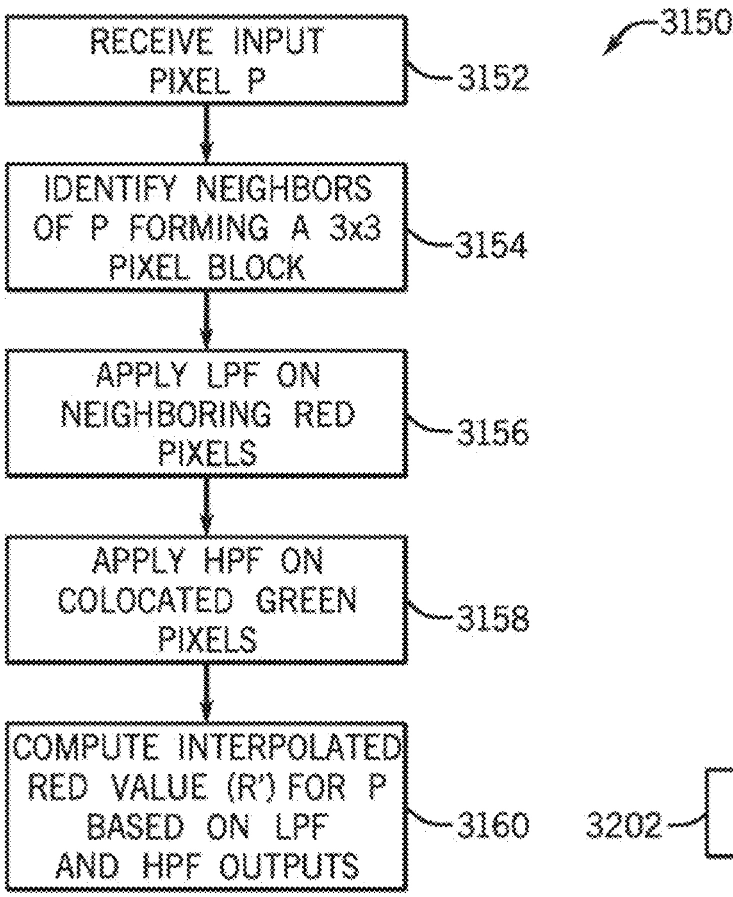
Figure 162:
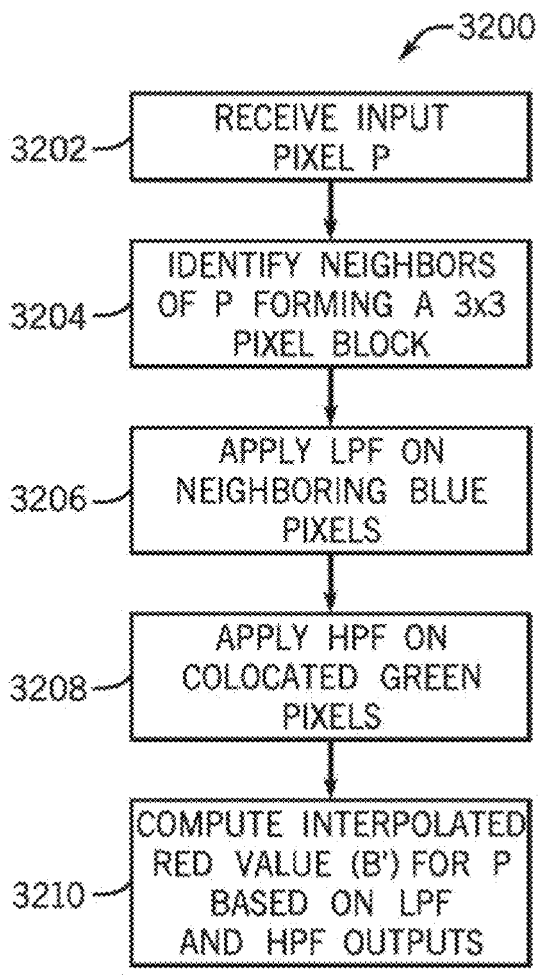
Figure 163:
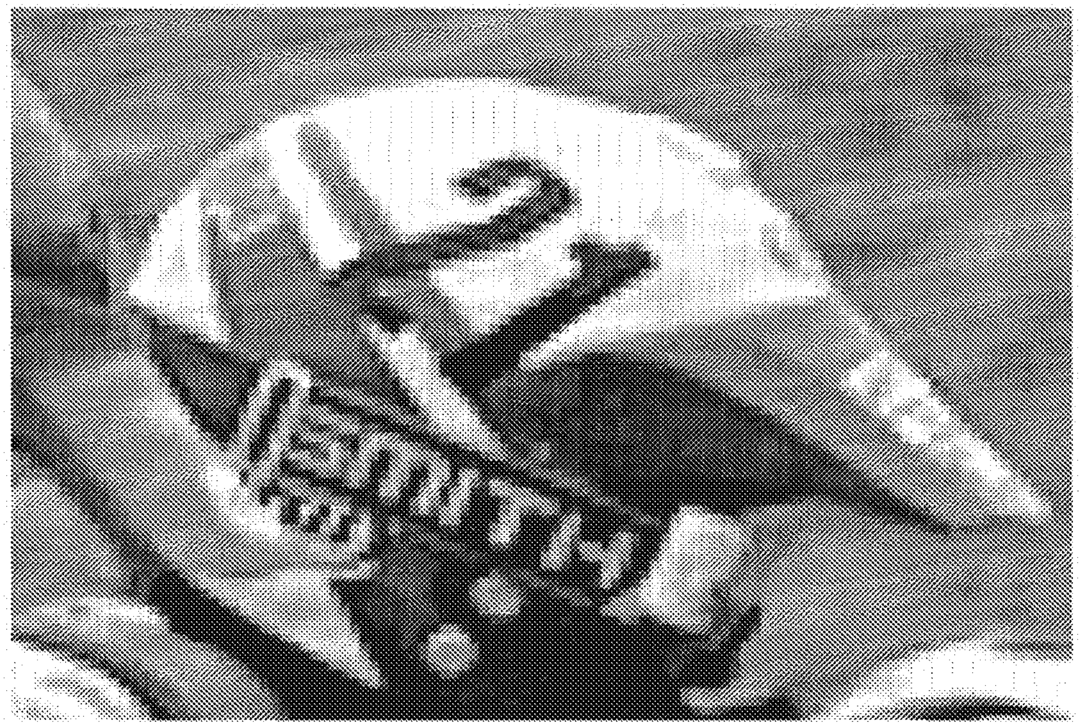
Figure 164:
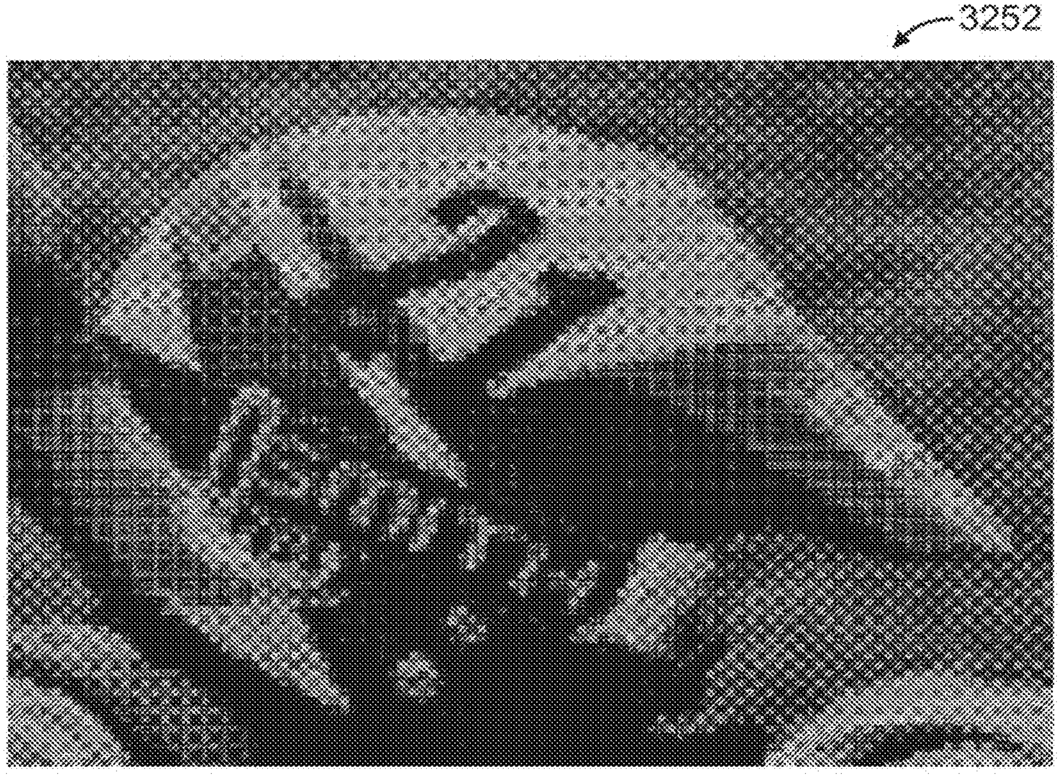
Figure 165:
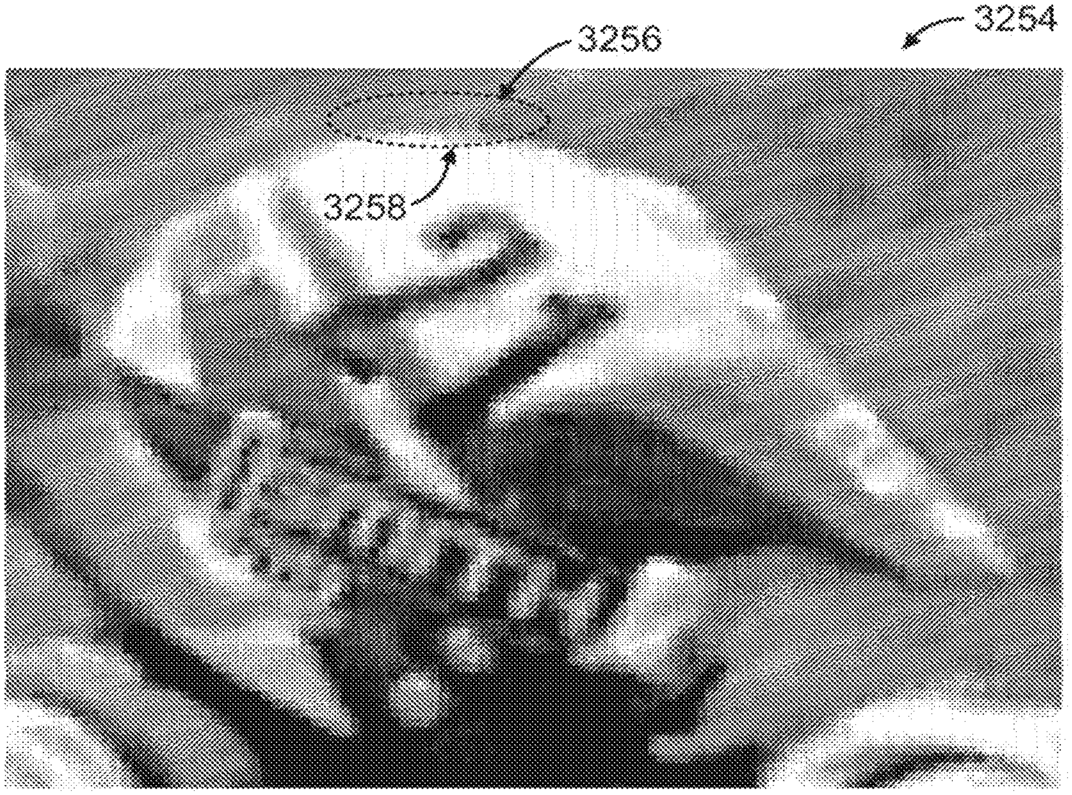
Figure 166:
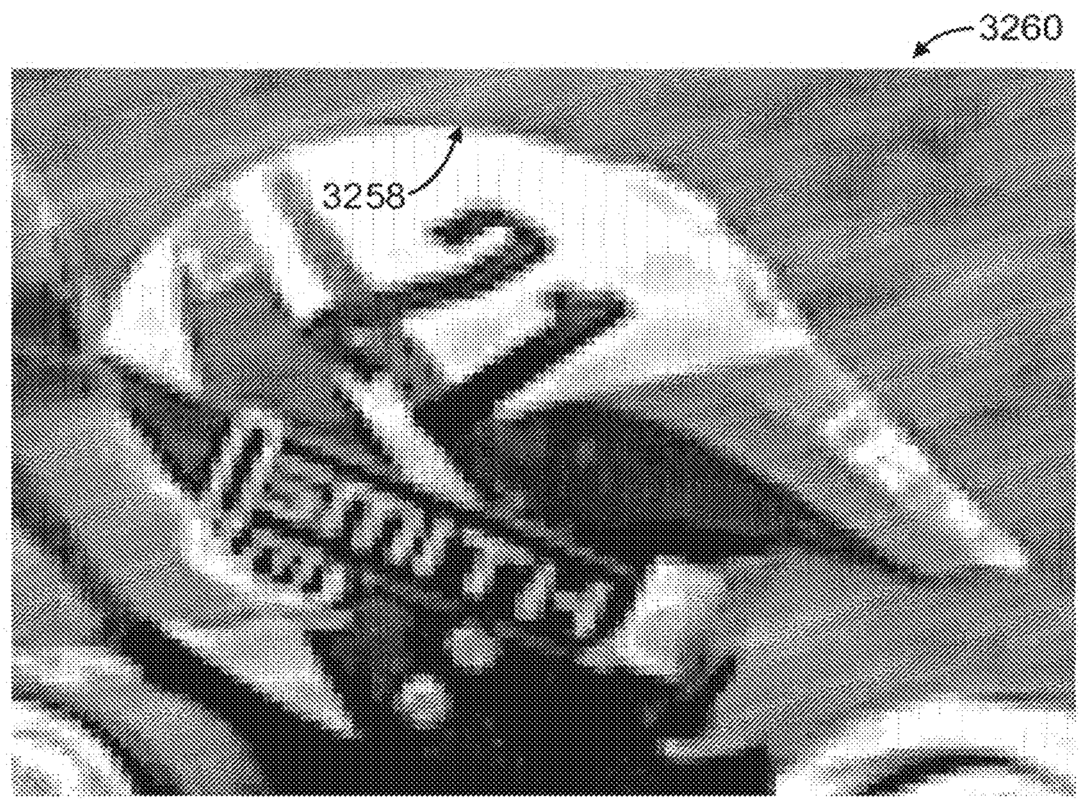
Figure 167:
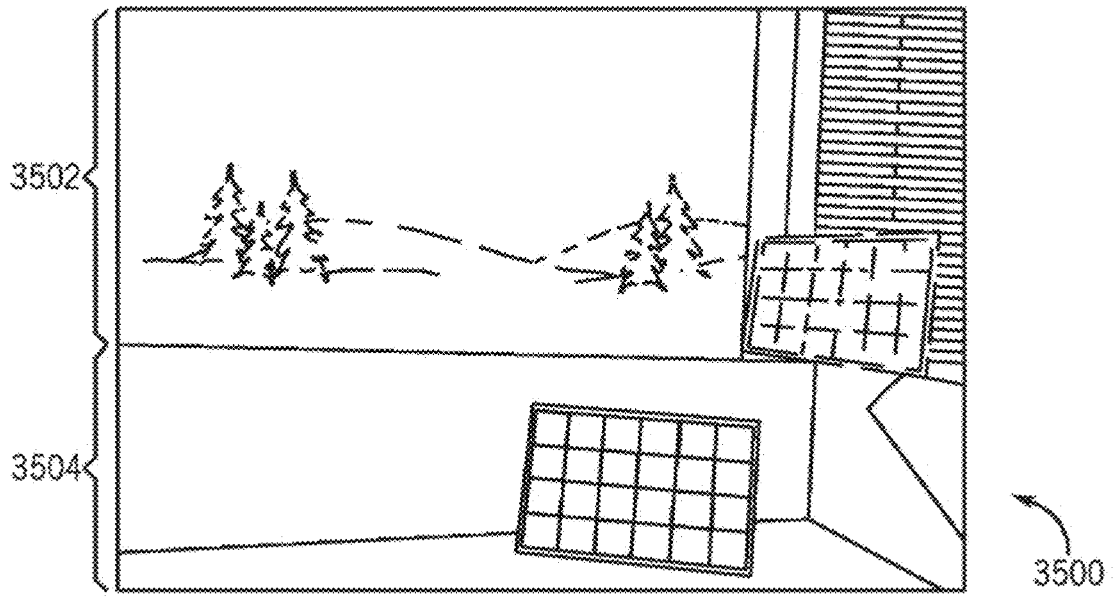
Figure 168:
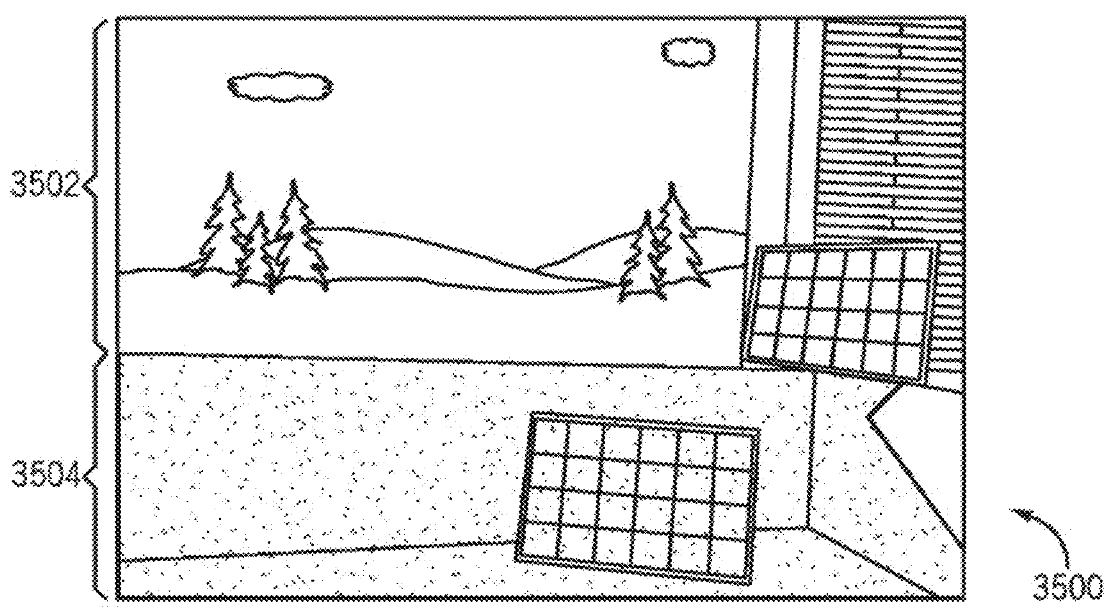
Figure 169:
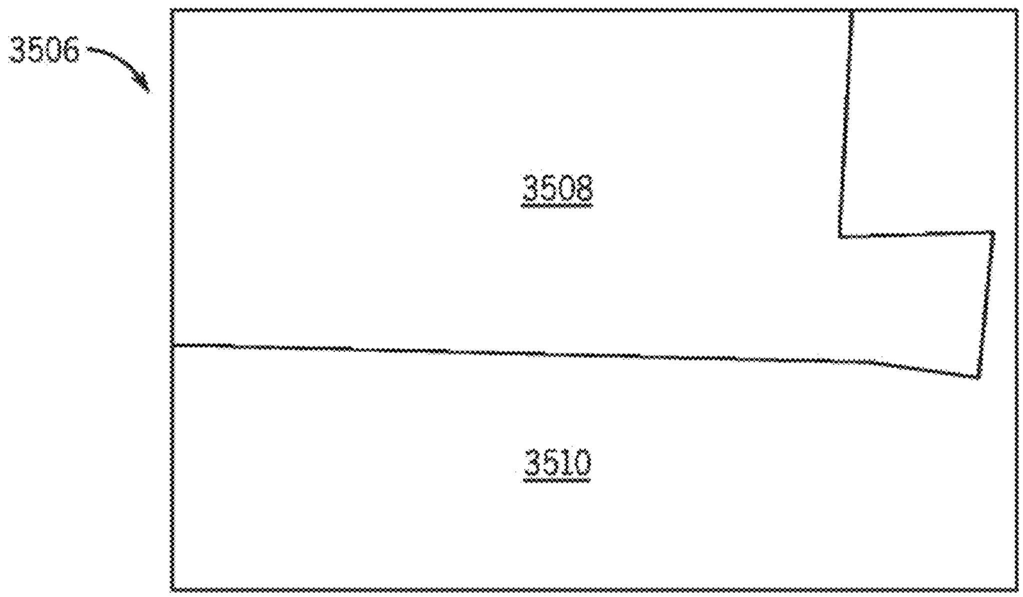
Figure 170:
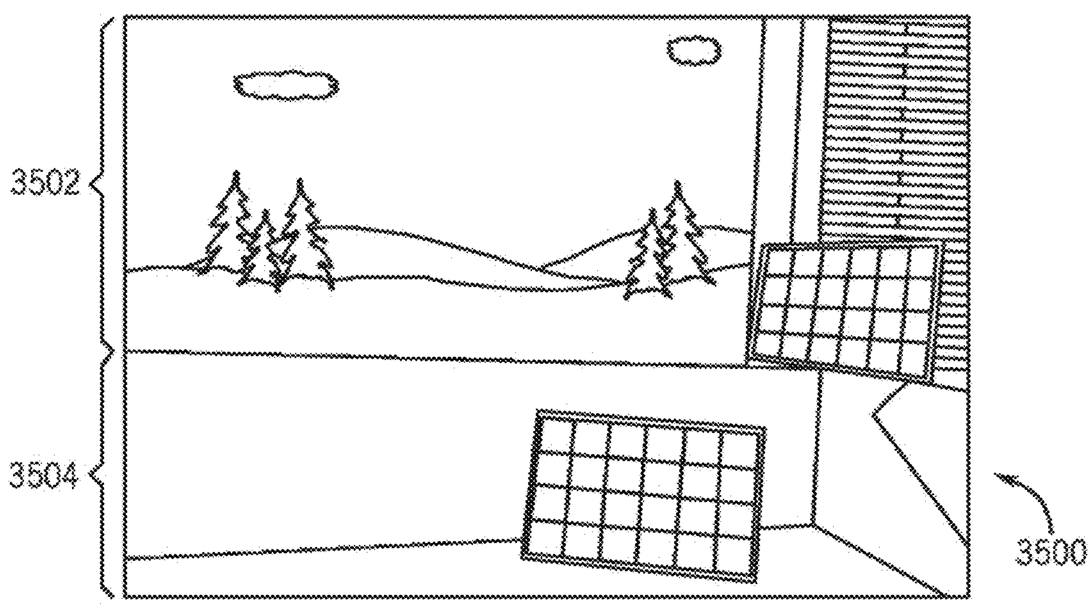
Figure 171:
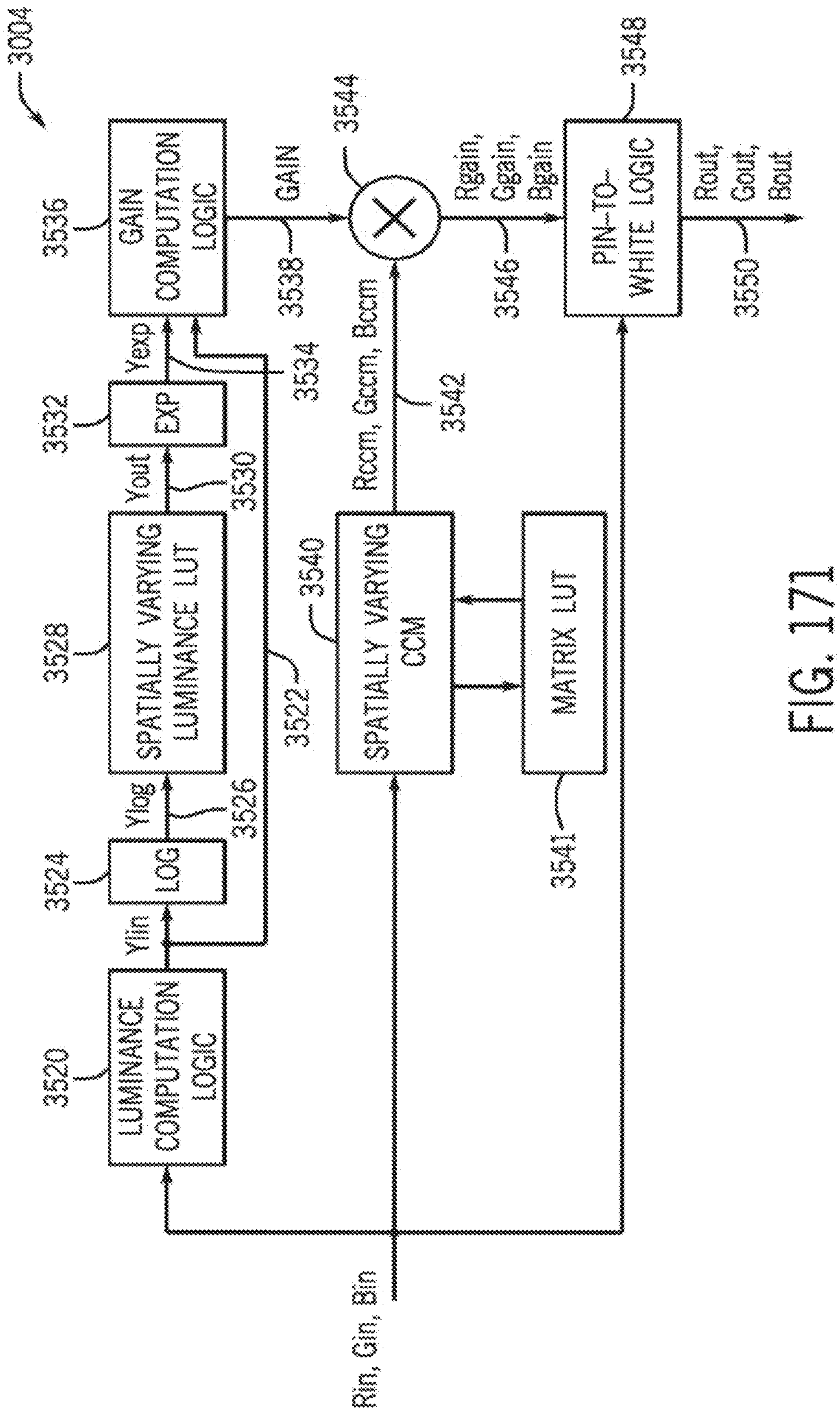
Figure 172:
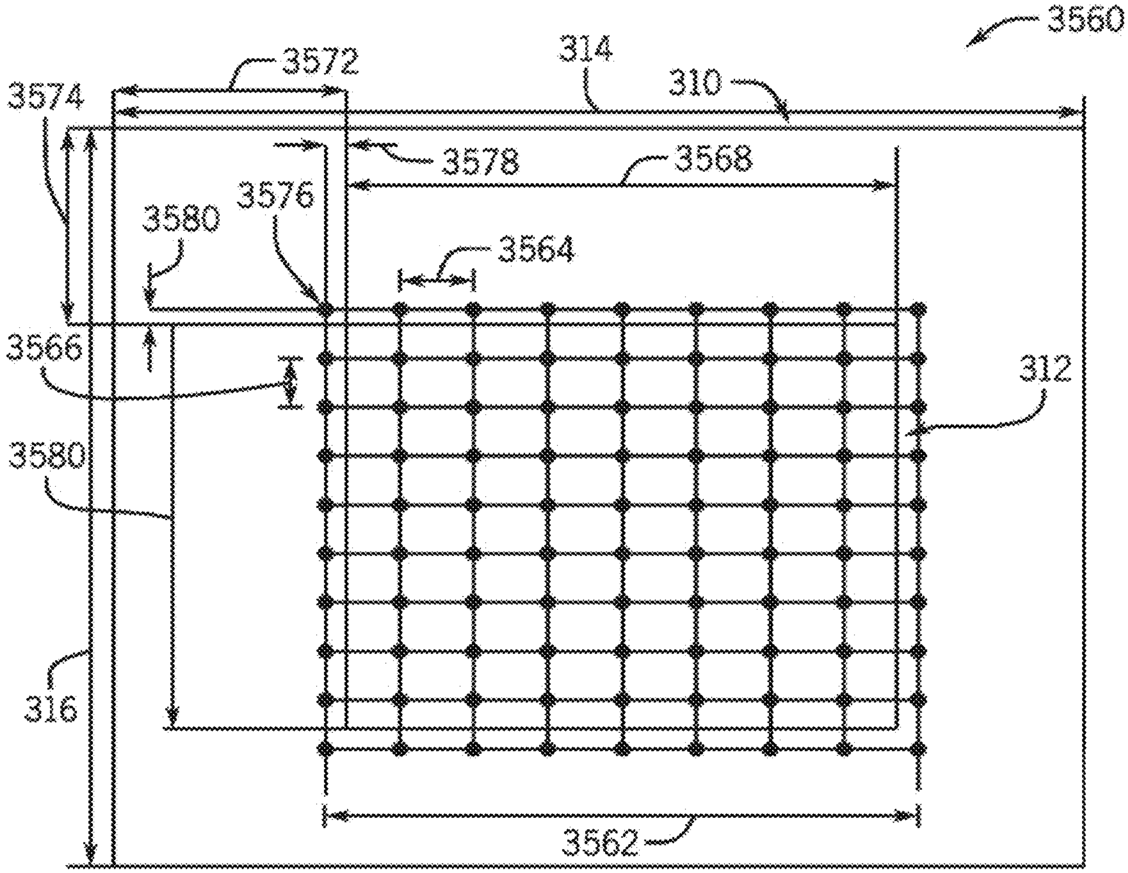
Figure 173:
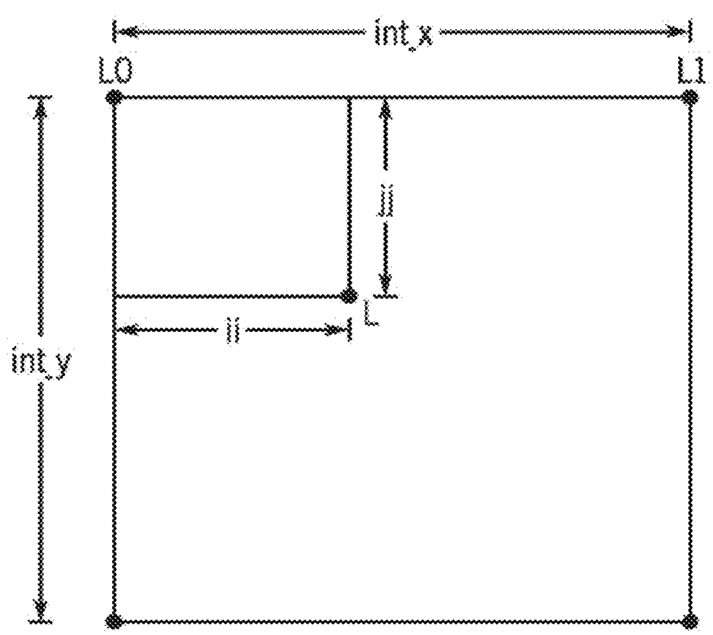
Figure 174:
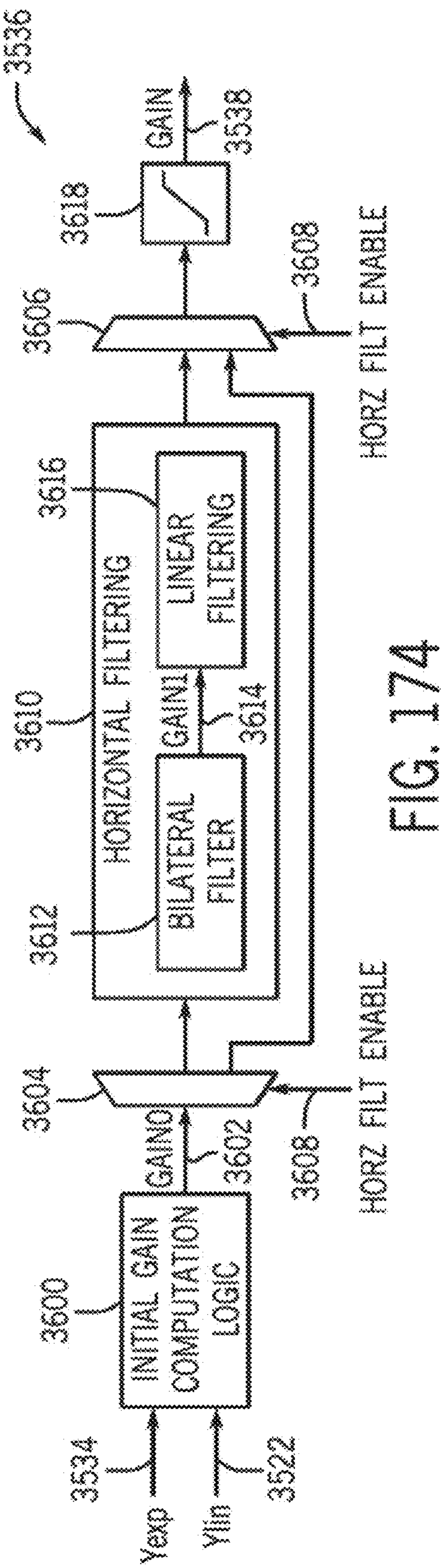
Figure 175:
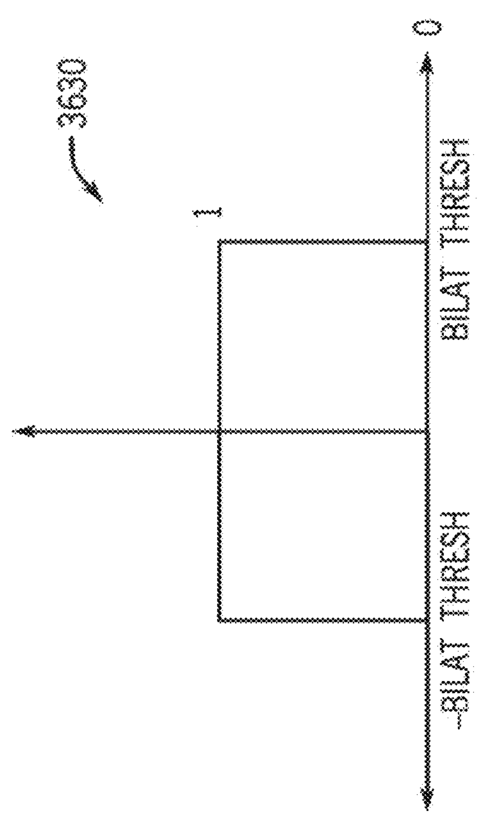
Figure 176:
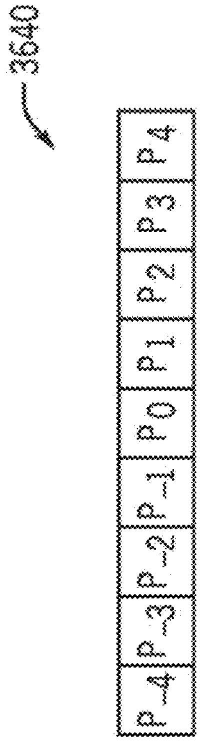
Figure 177:
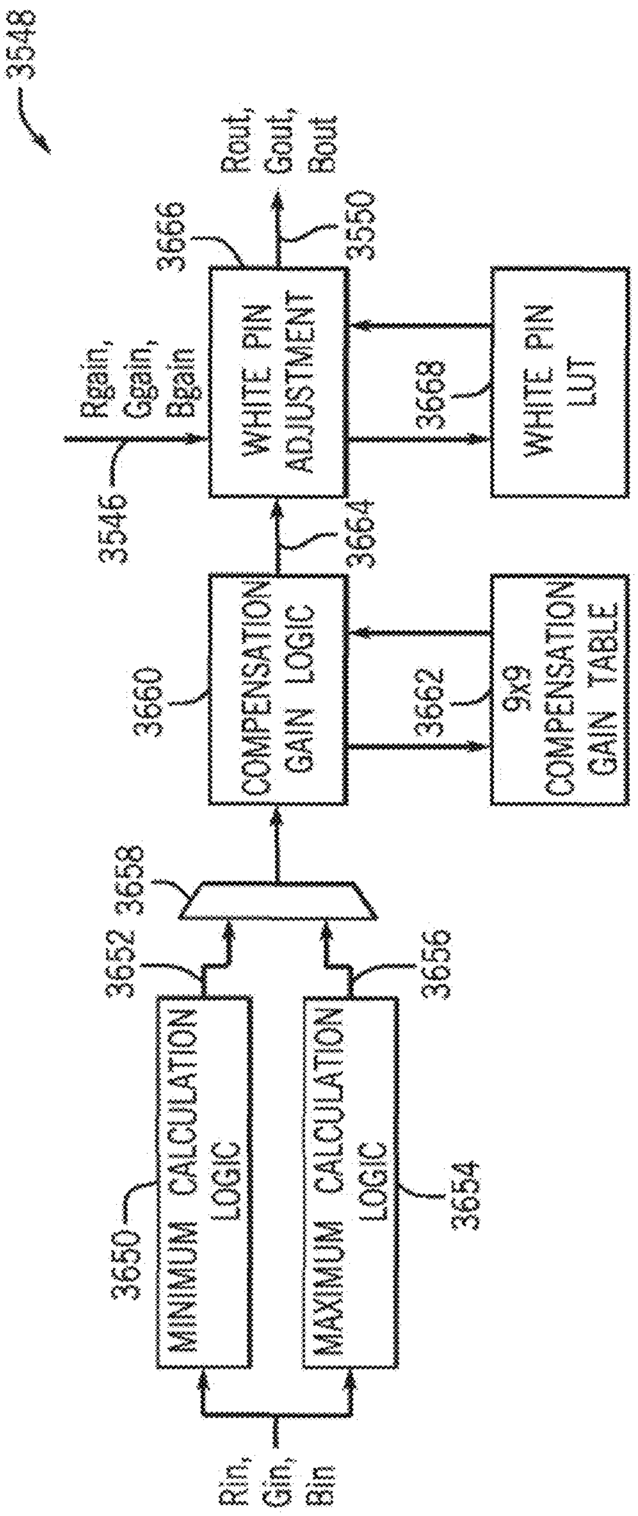
Figure 181:
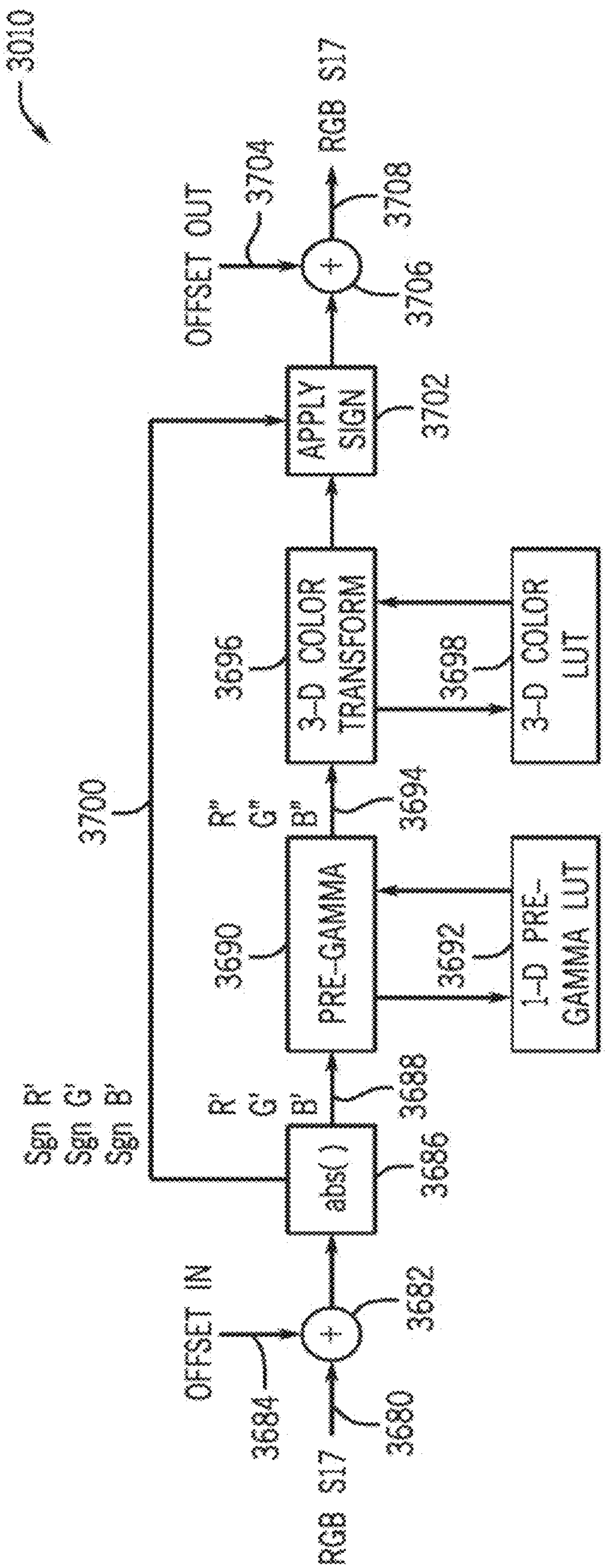
Figure 182:
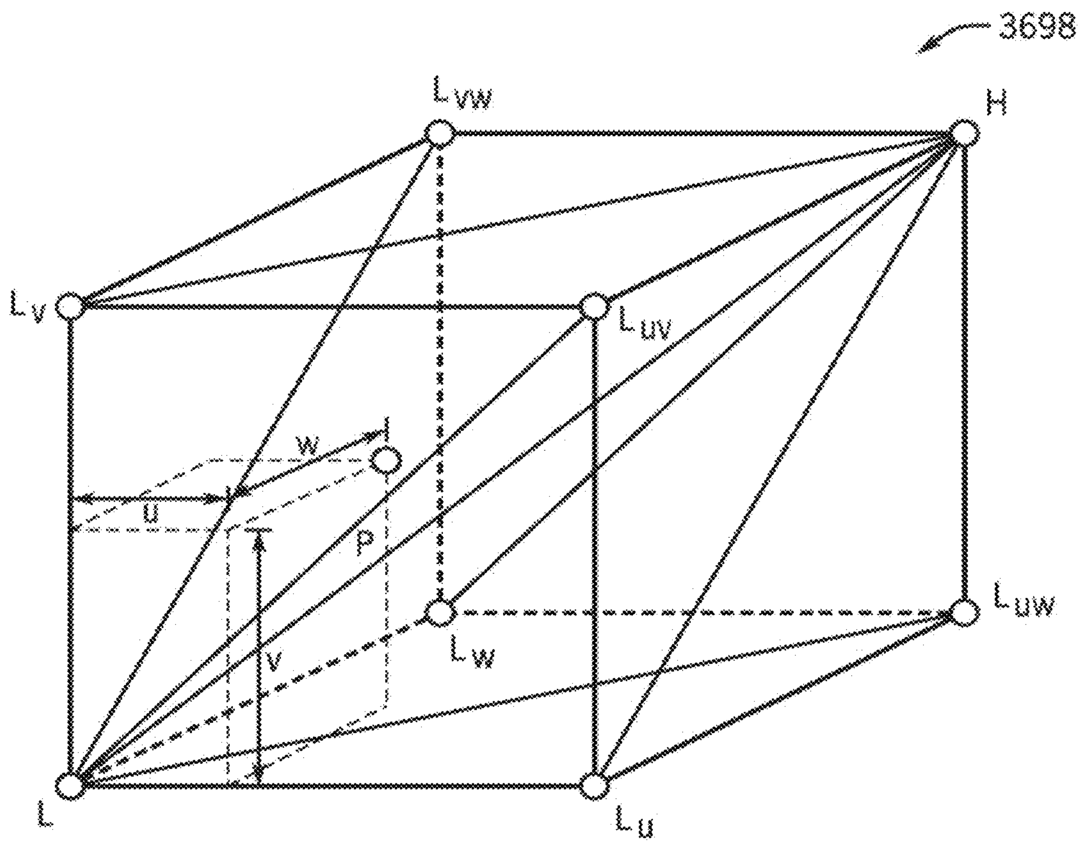
Figure 183:
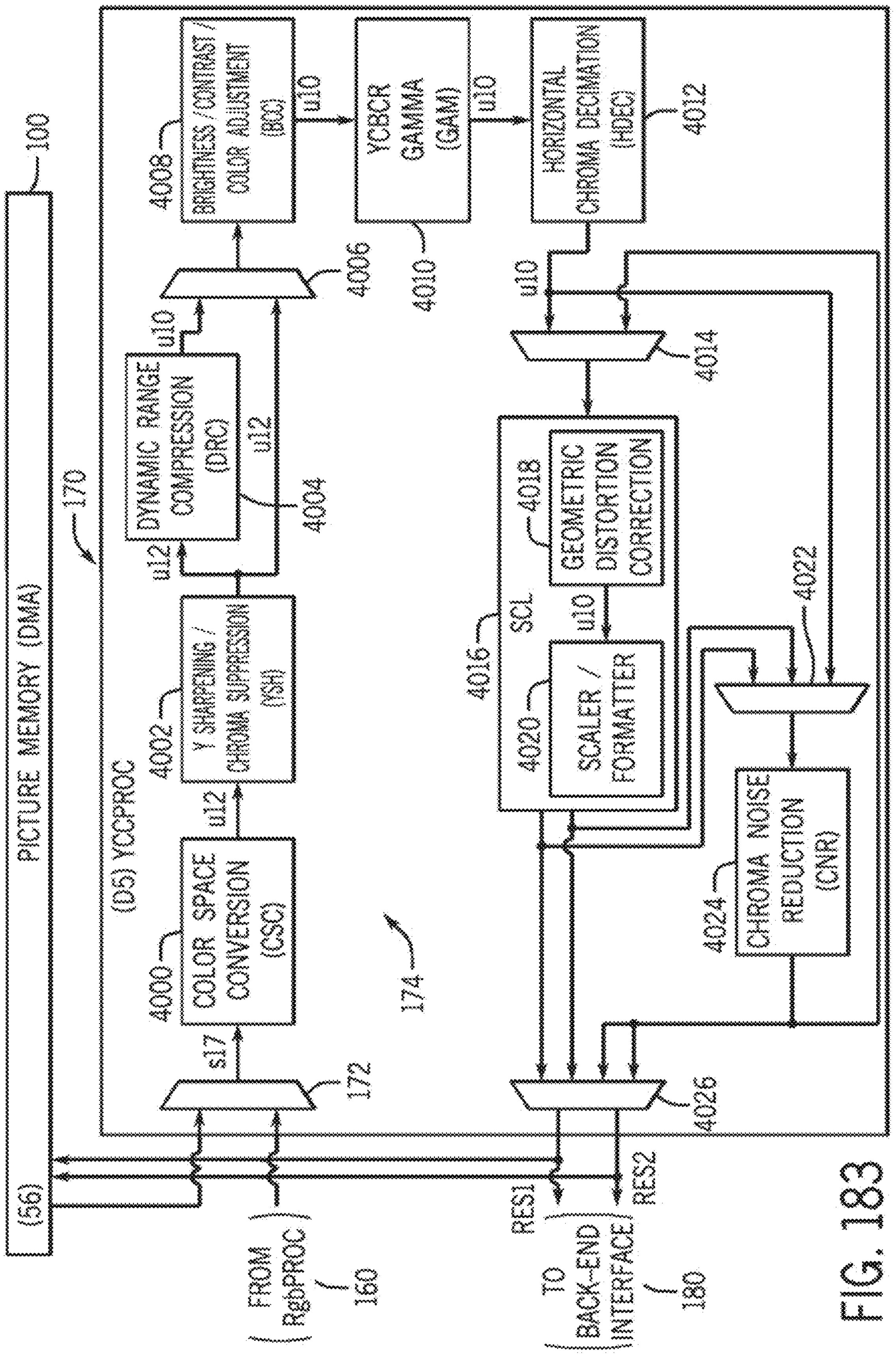
Figure 184:
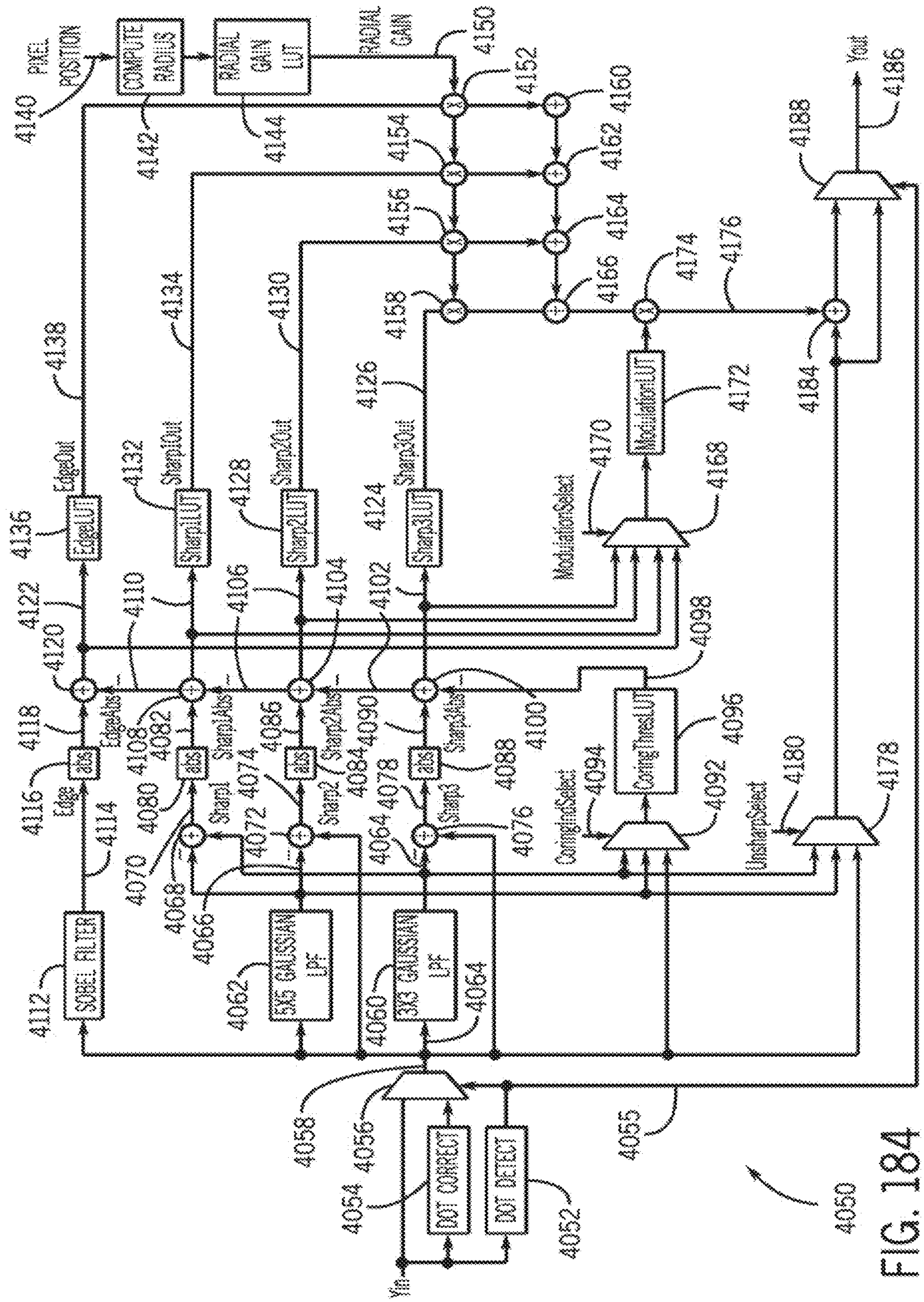
Figure 189:
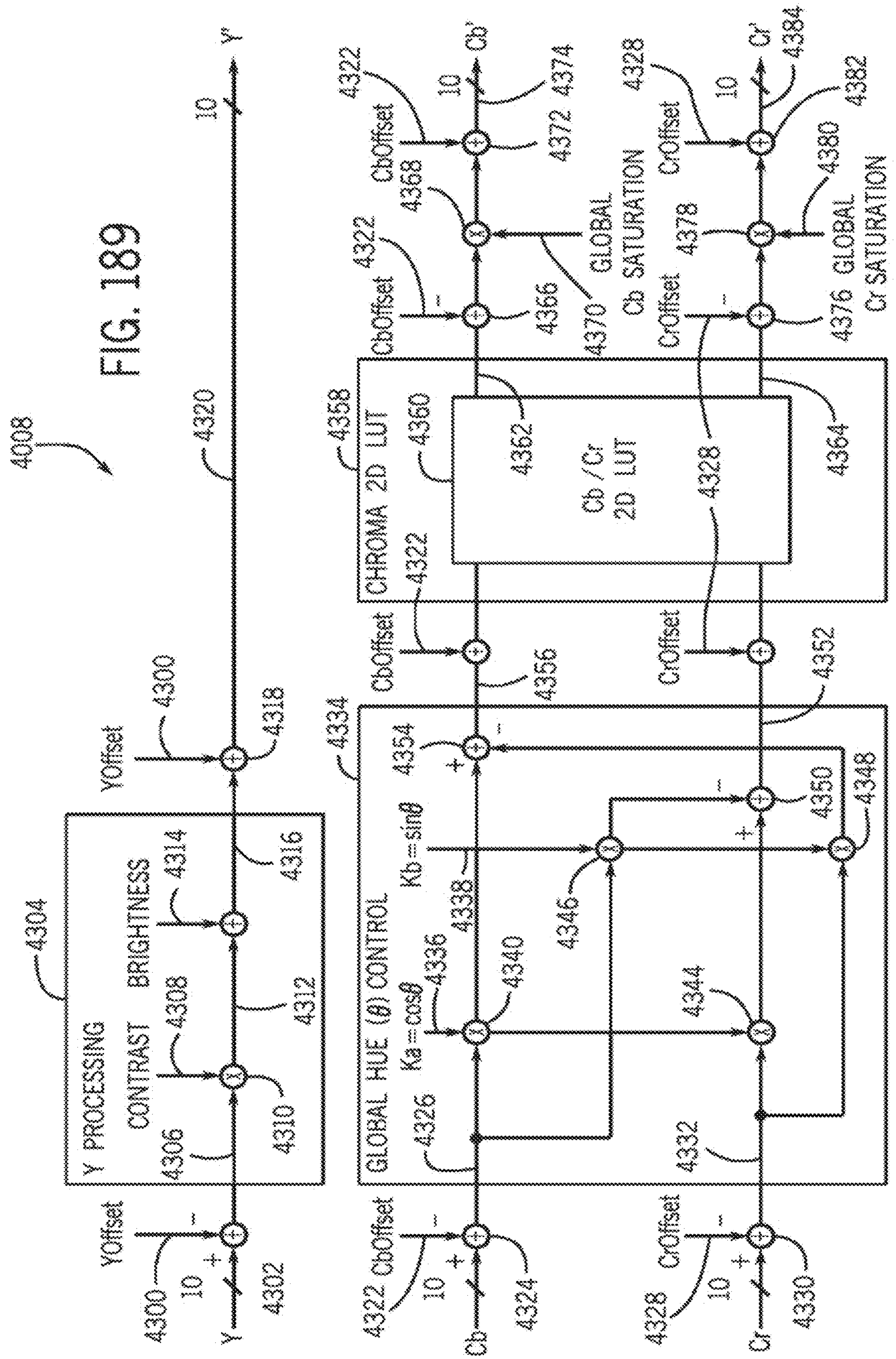
Figure 190:
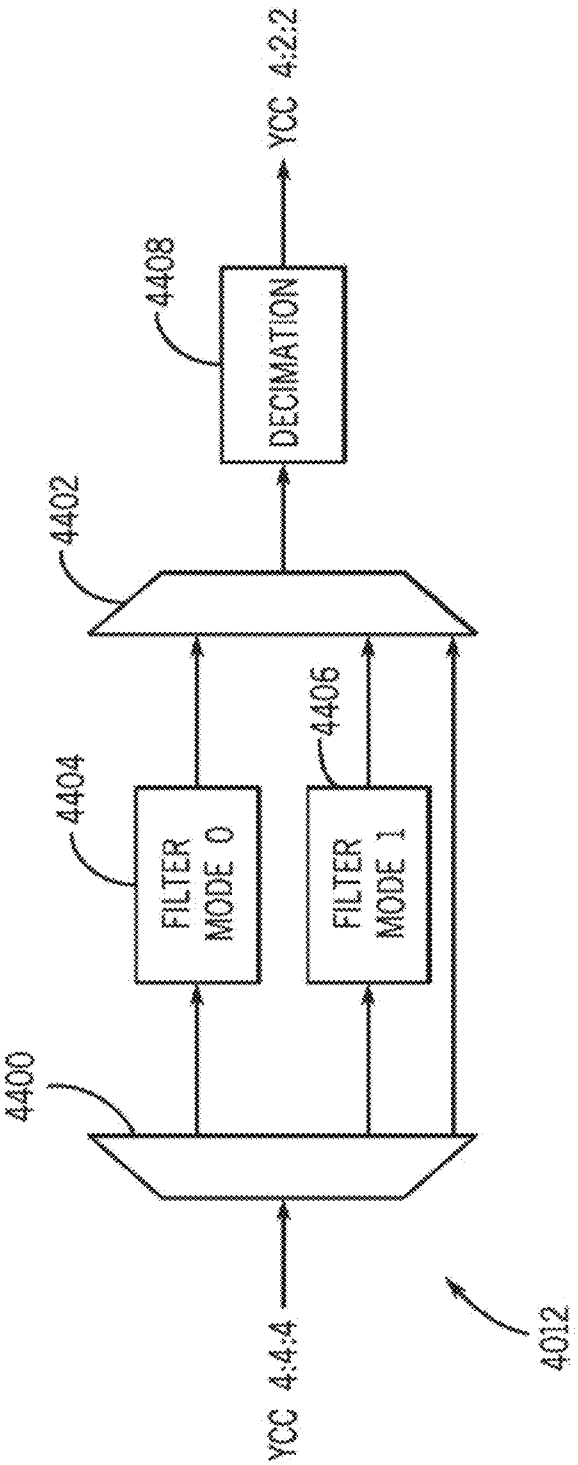
Figure 191:
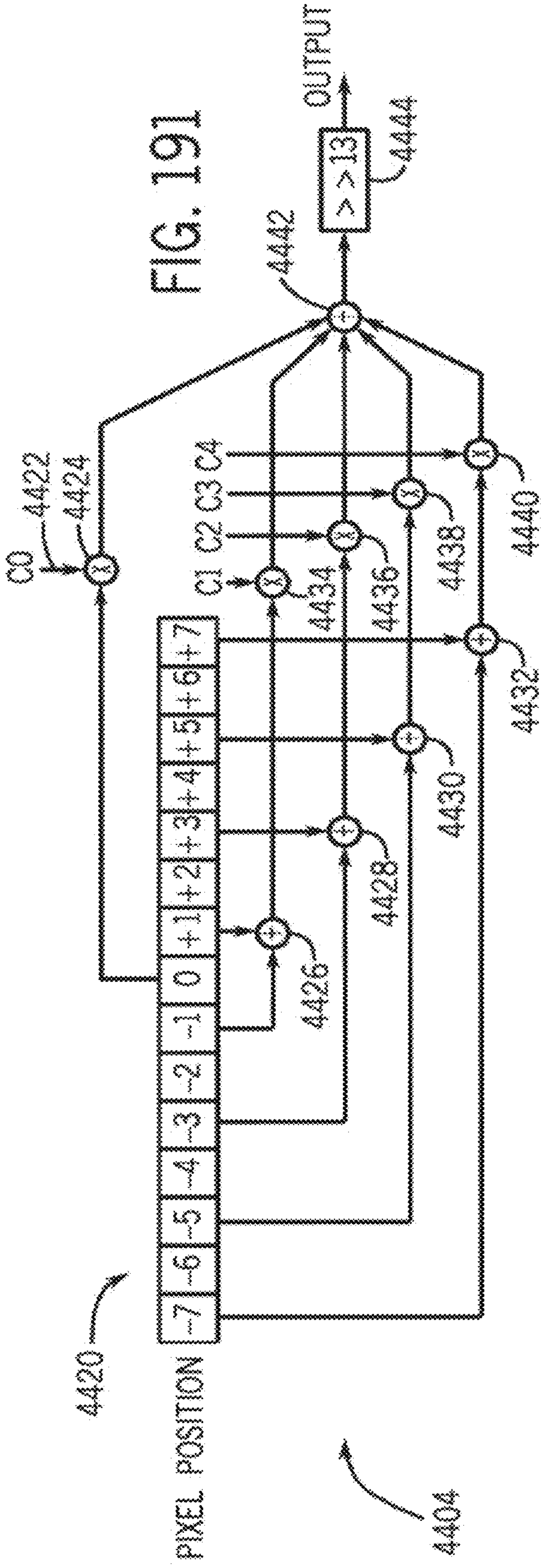
Figure 194:
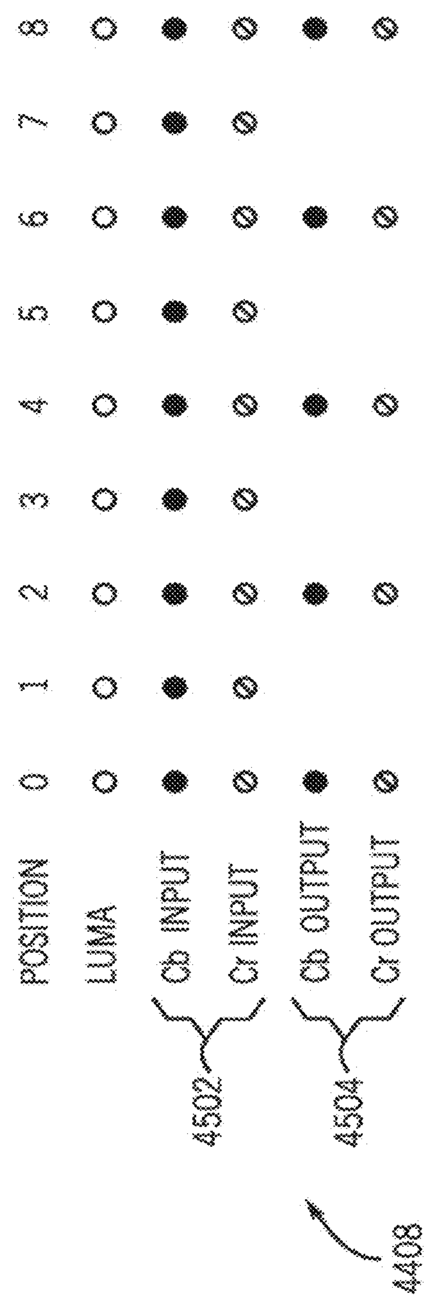
Figure 192:
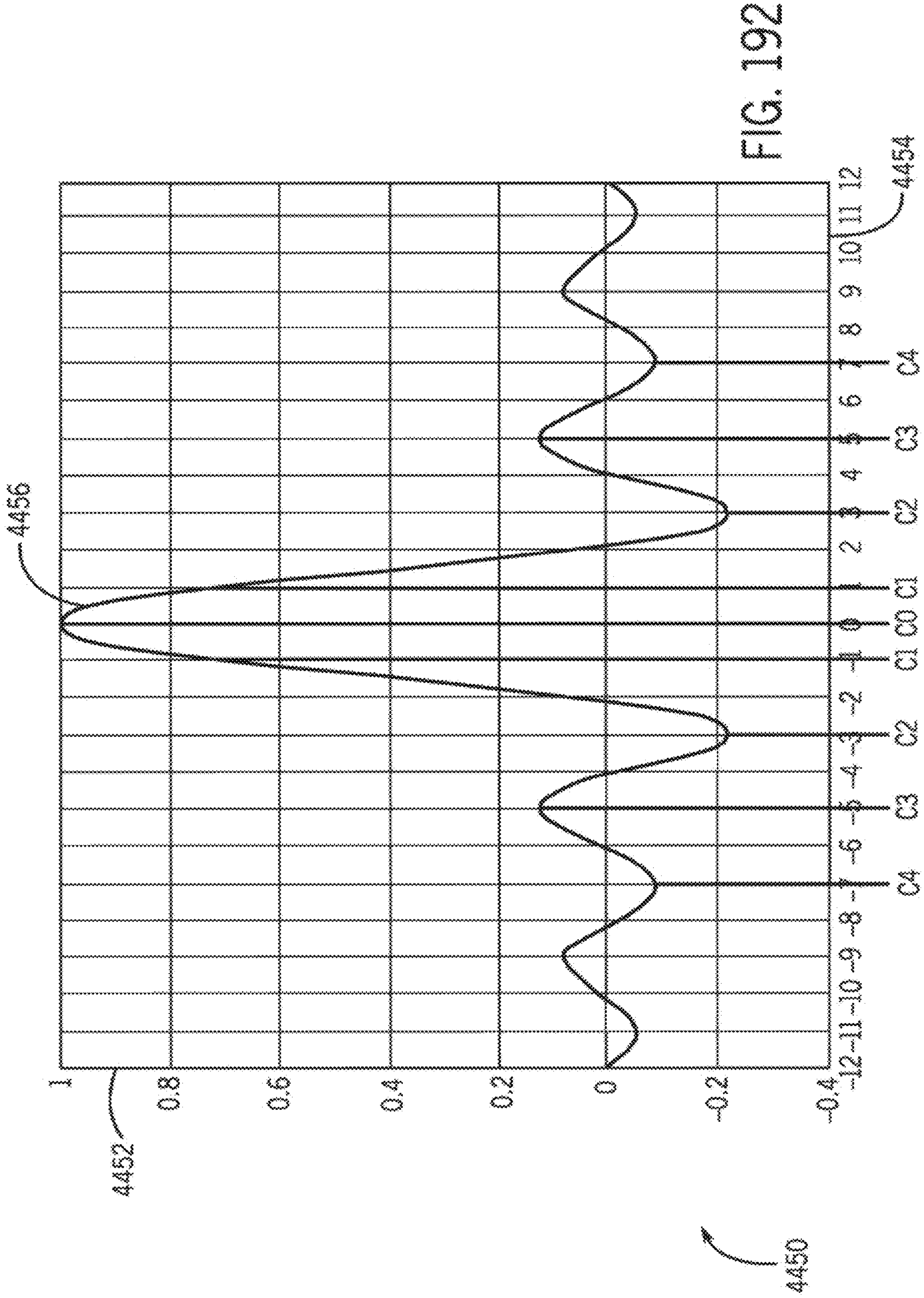
Figure 193:
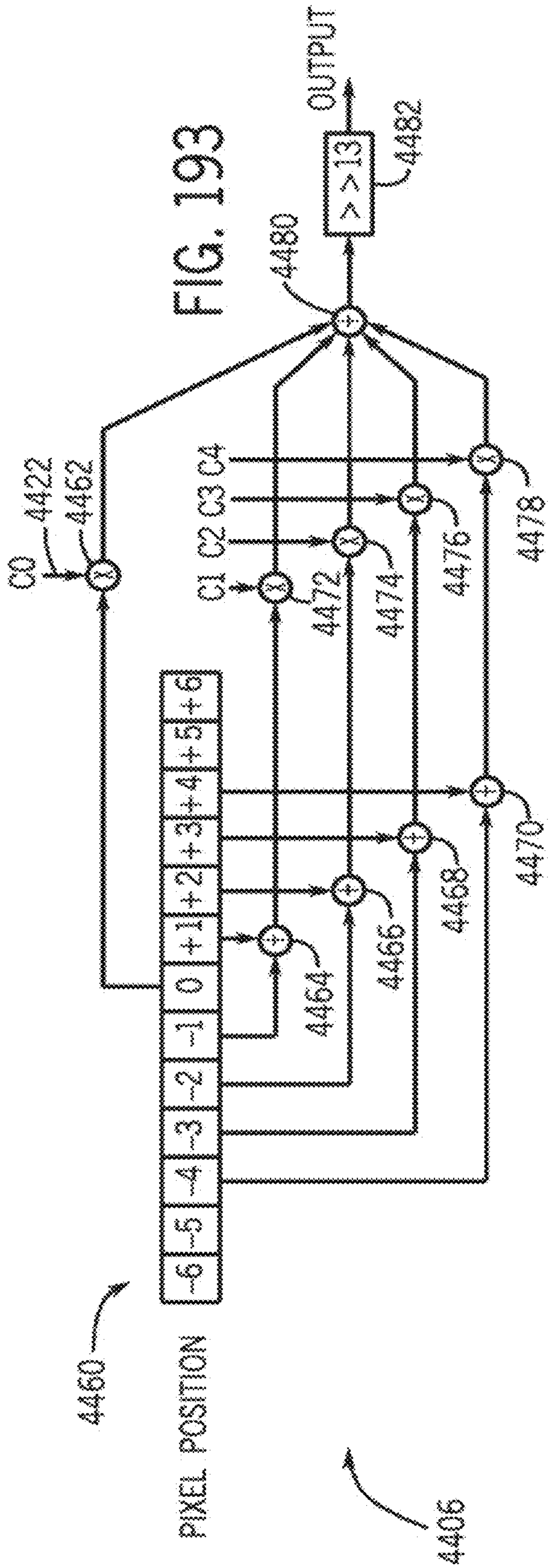
Figure 195:
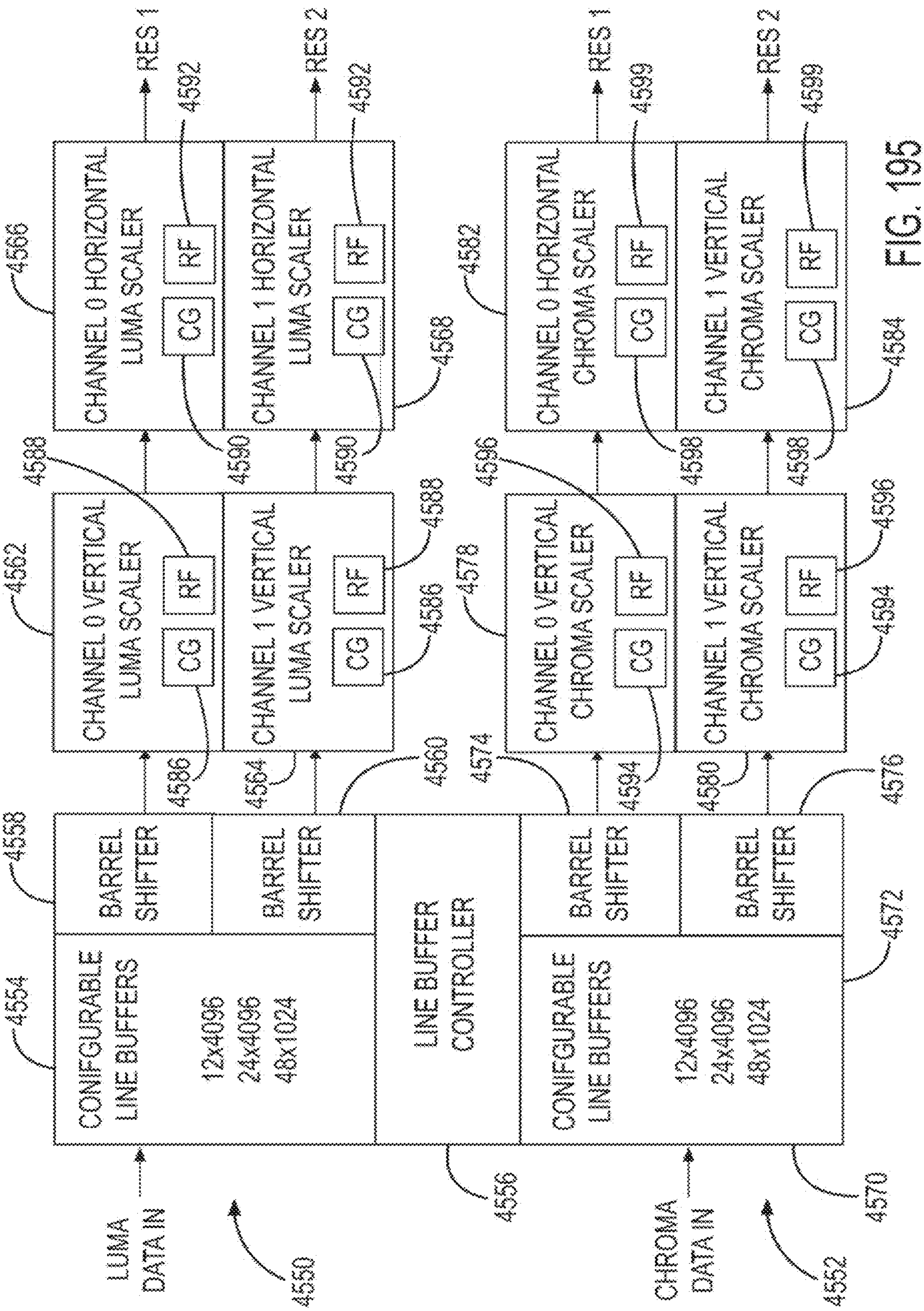
Figure 196:
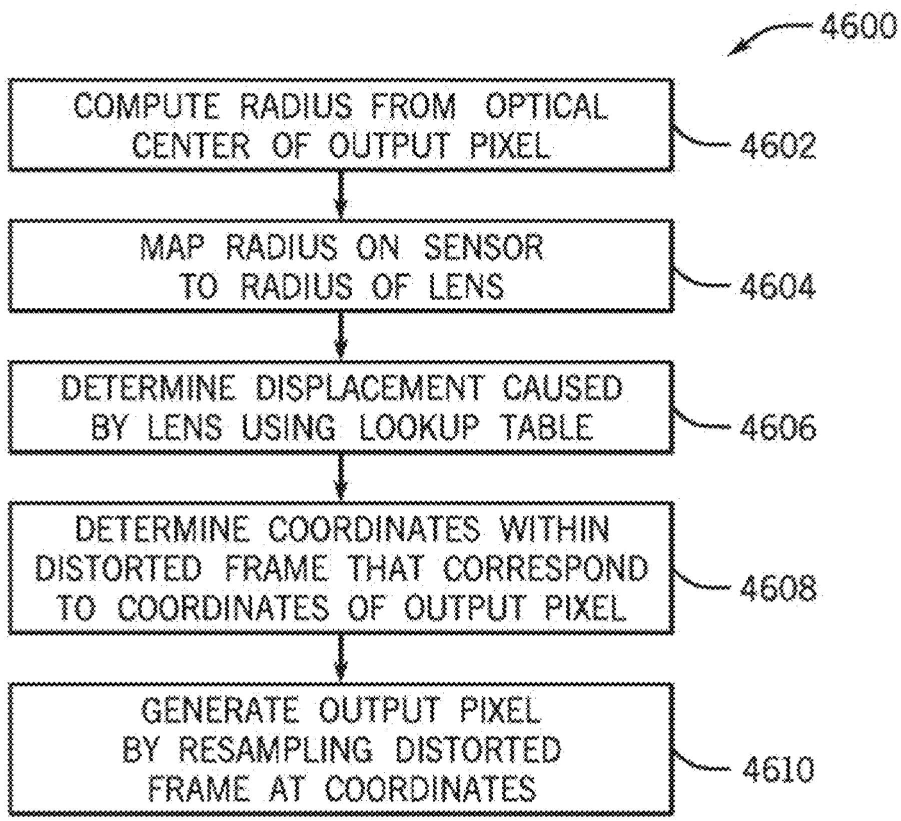
Figure 197:
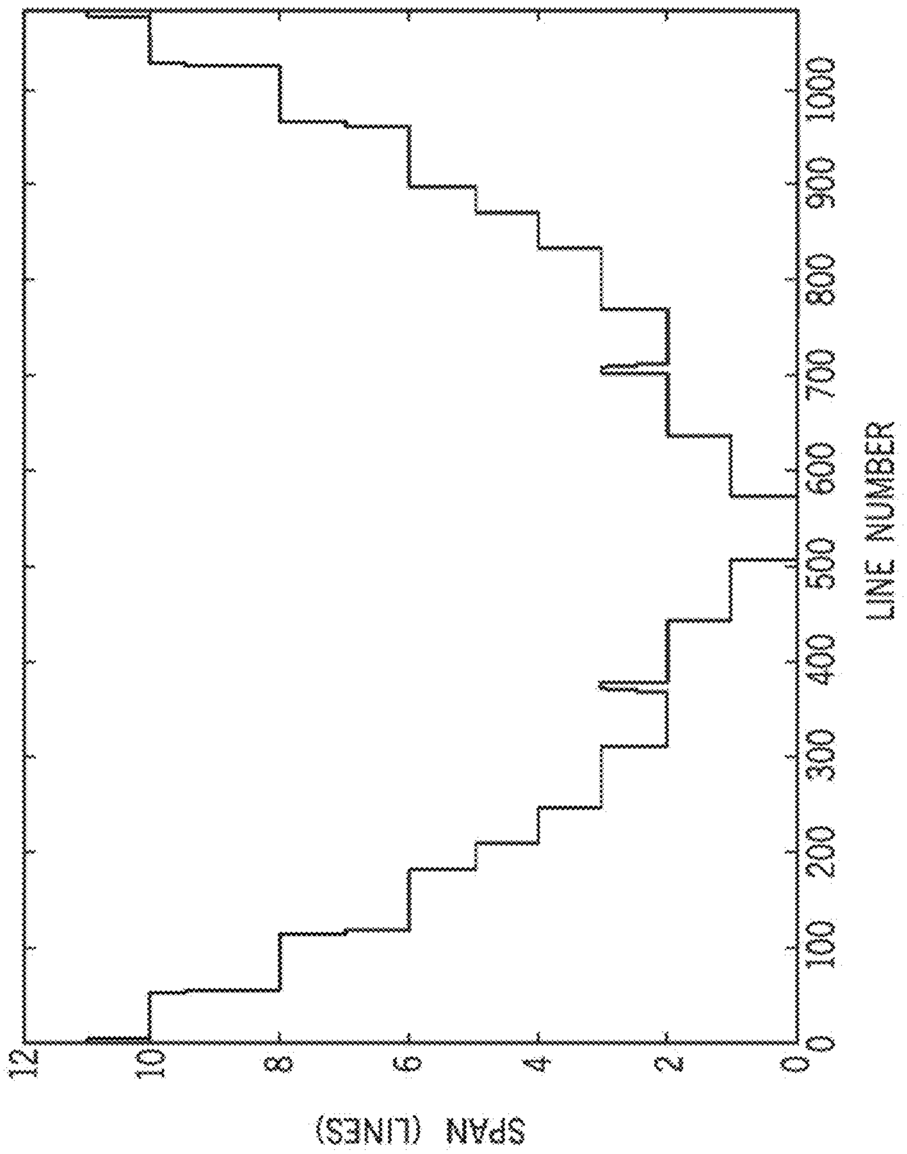
Figure 198:
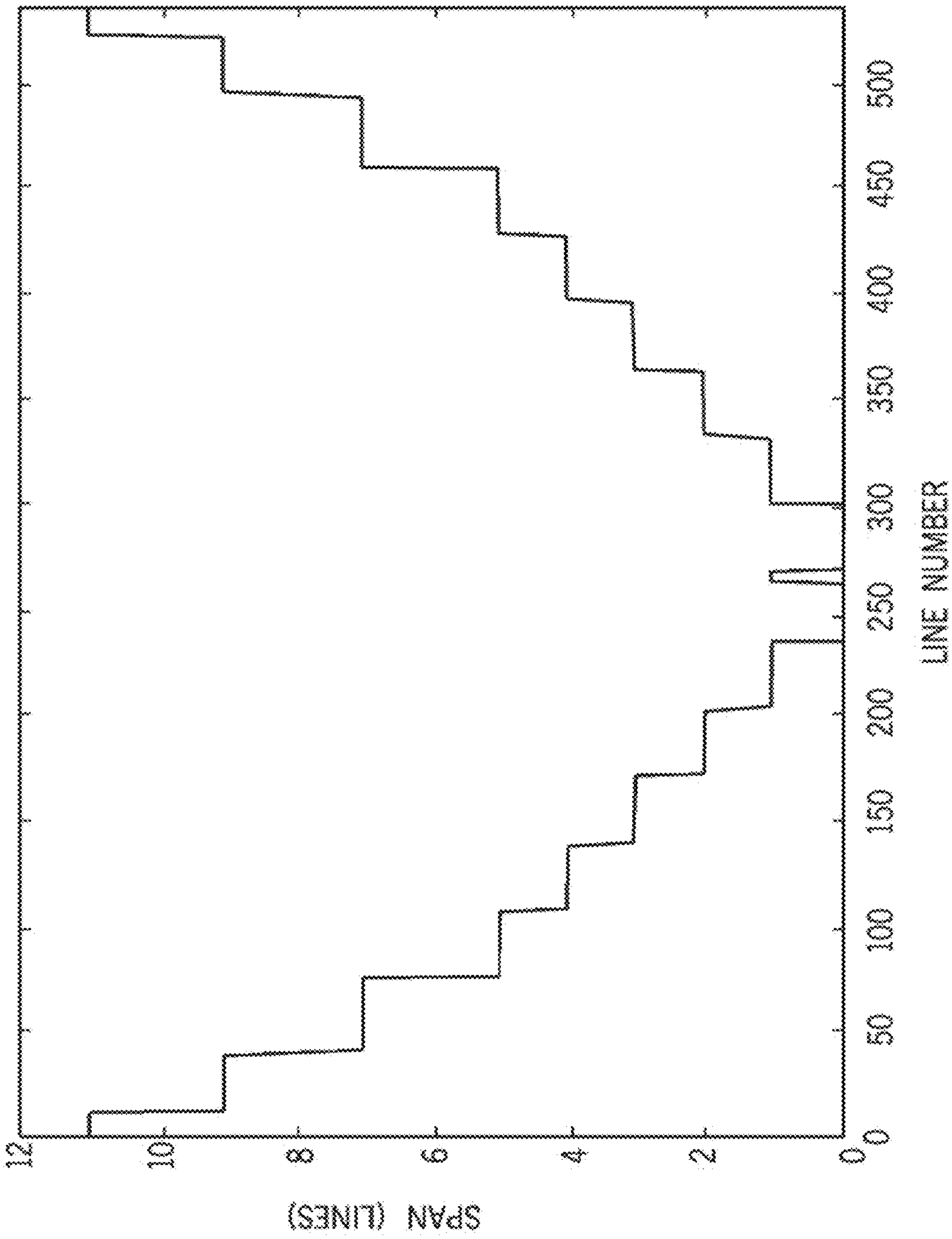
Figure 199A:
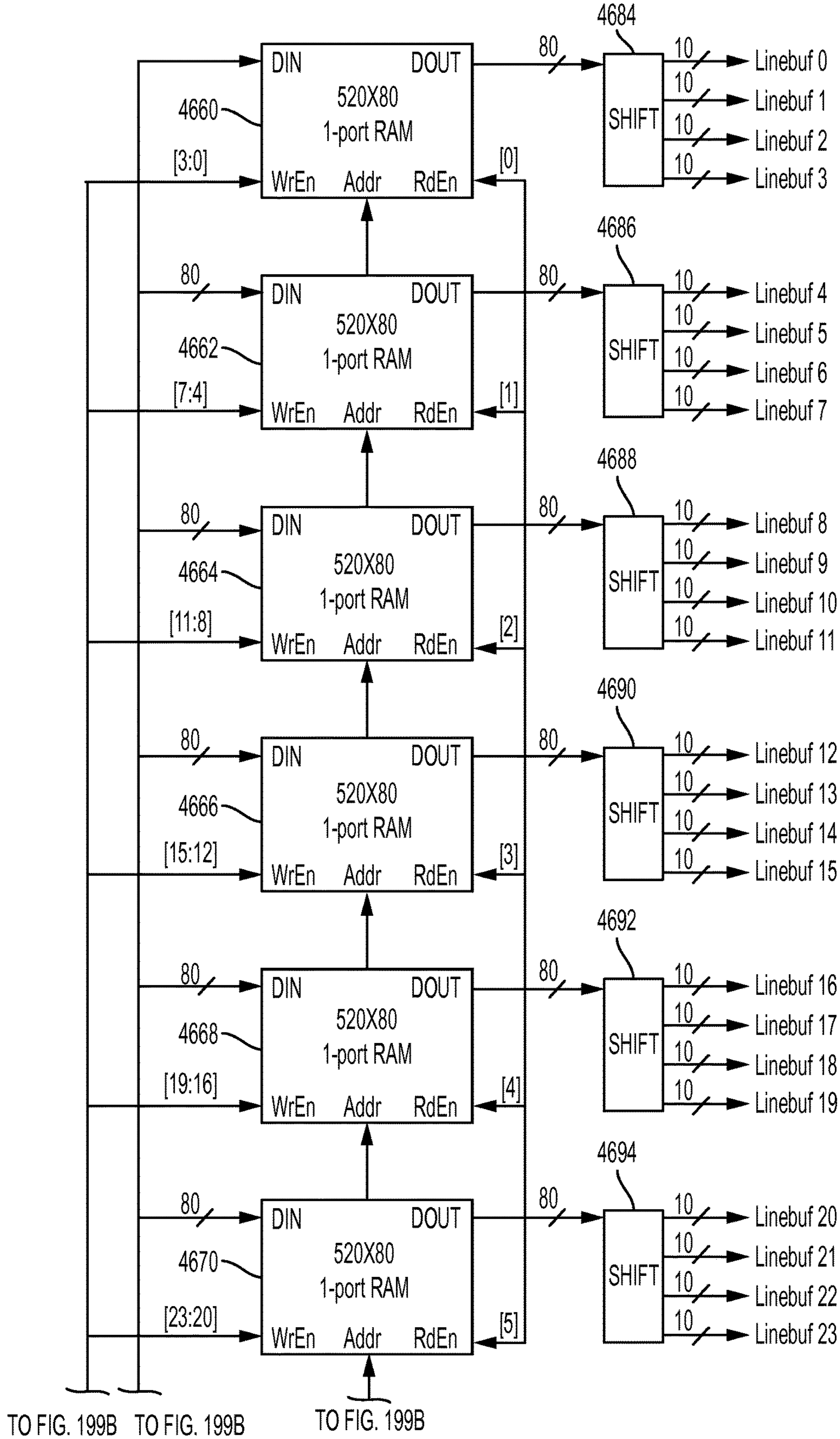
Figure 199B:
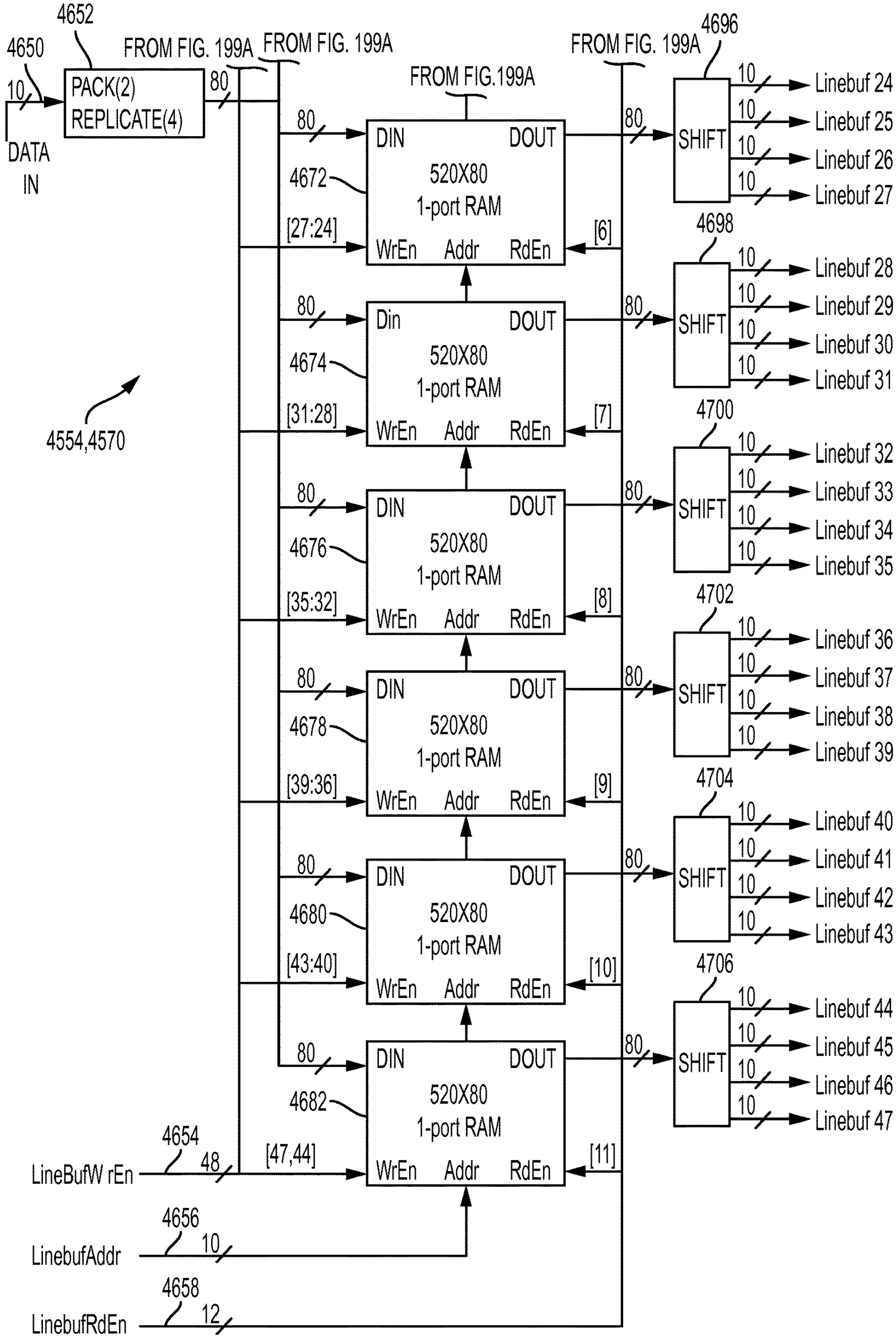
Figure 204:
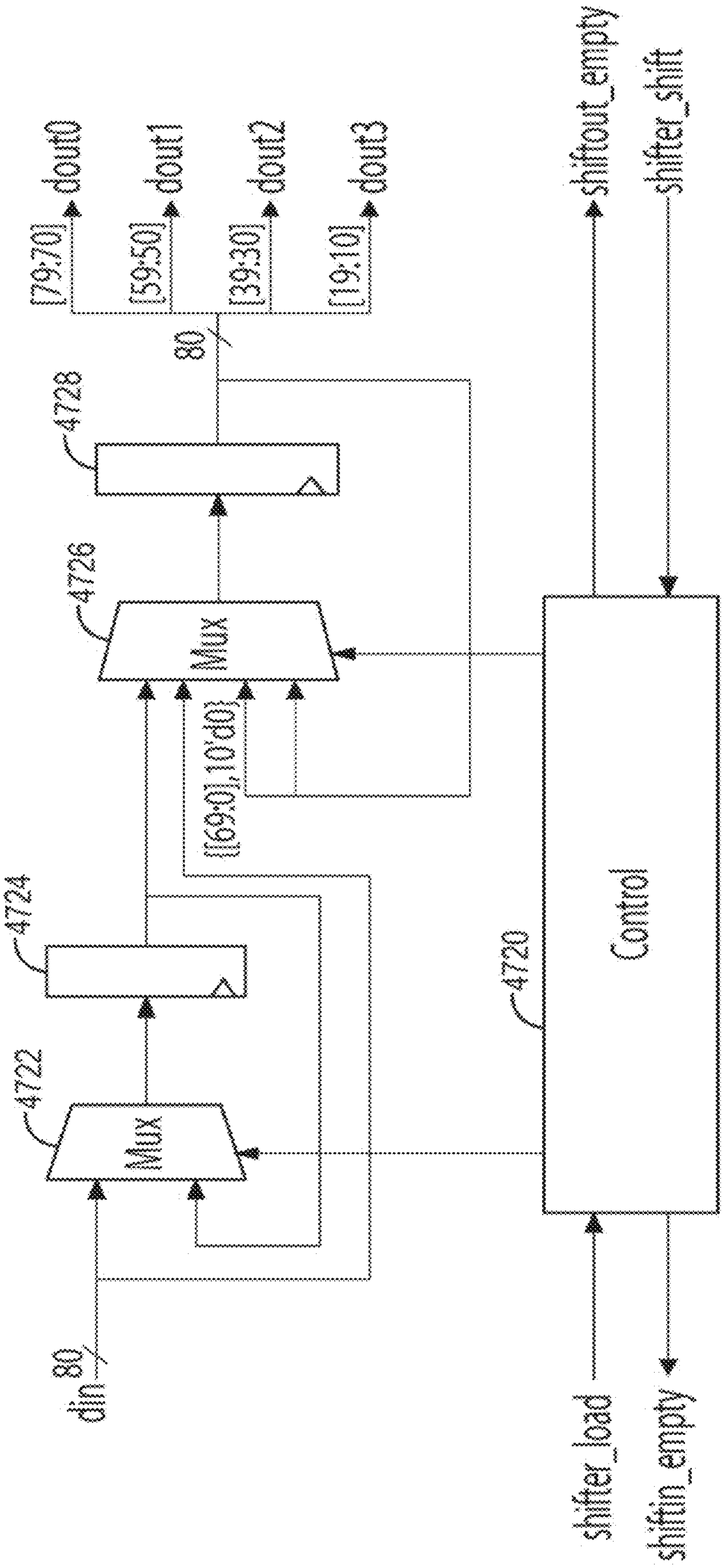
Figure 205:
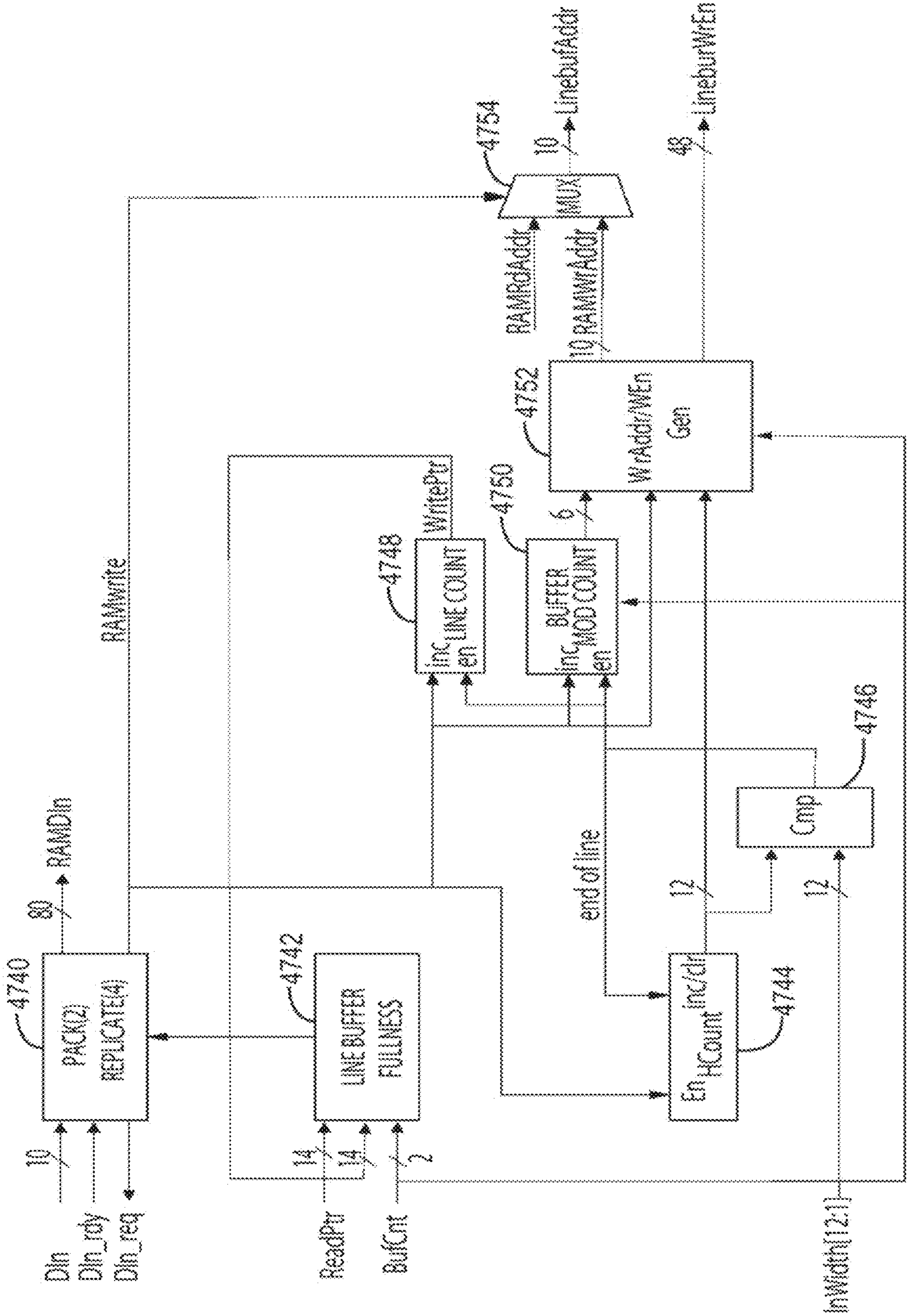
Figure 206:
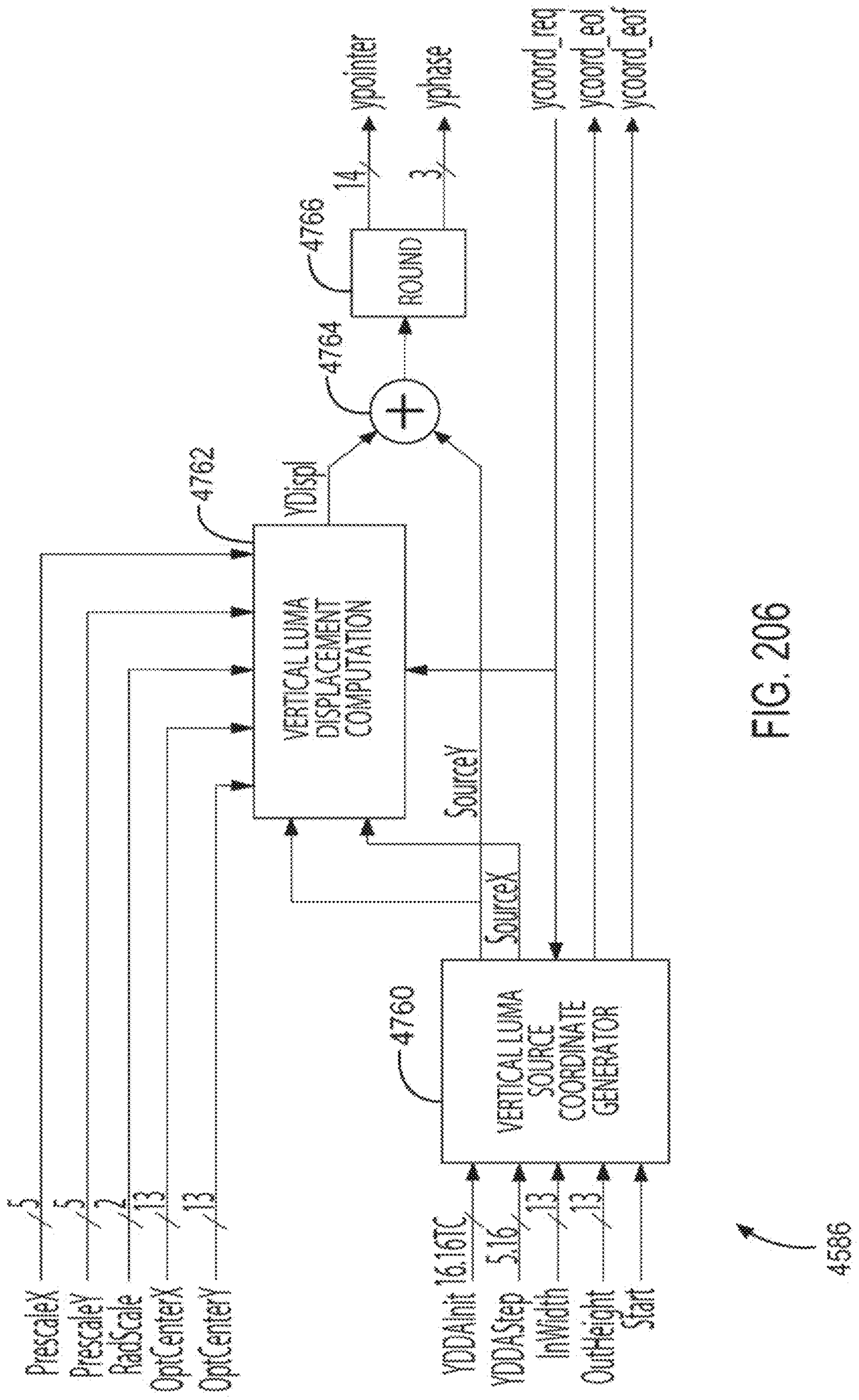
Figure 207:
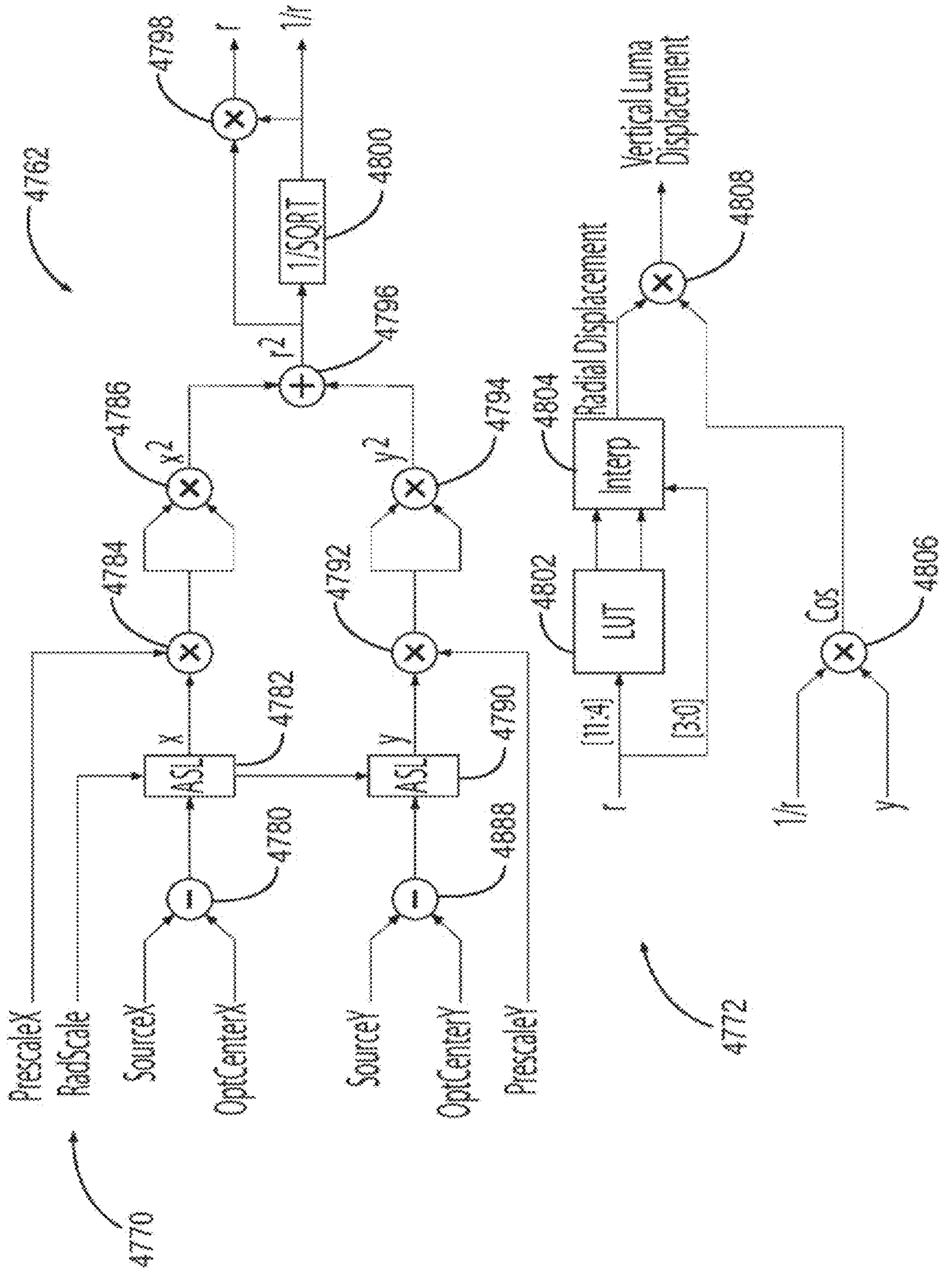
Figure 208A:
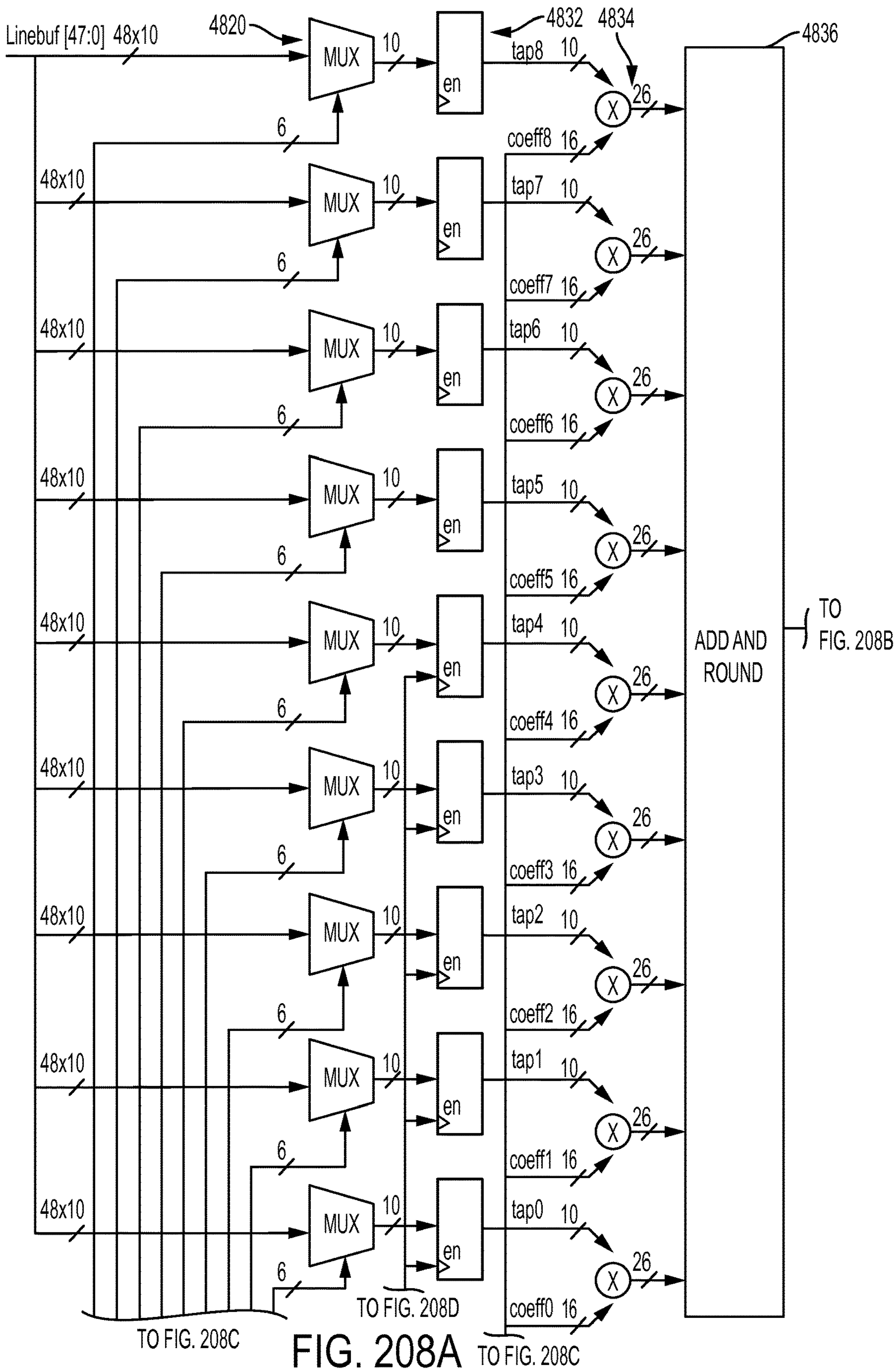
Figure 208B:
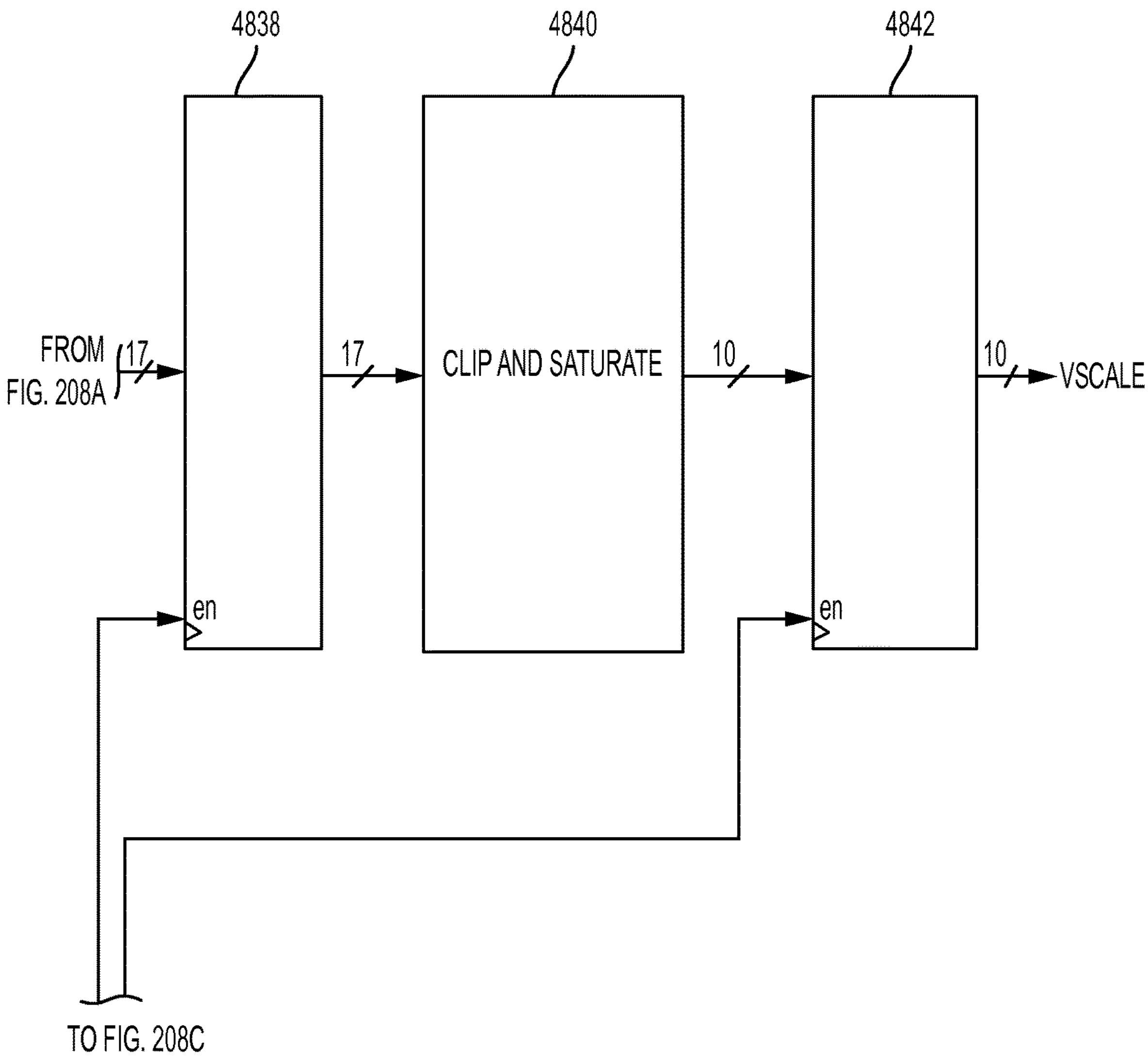
Figure 208C:
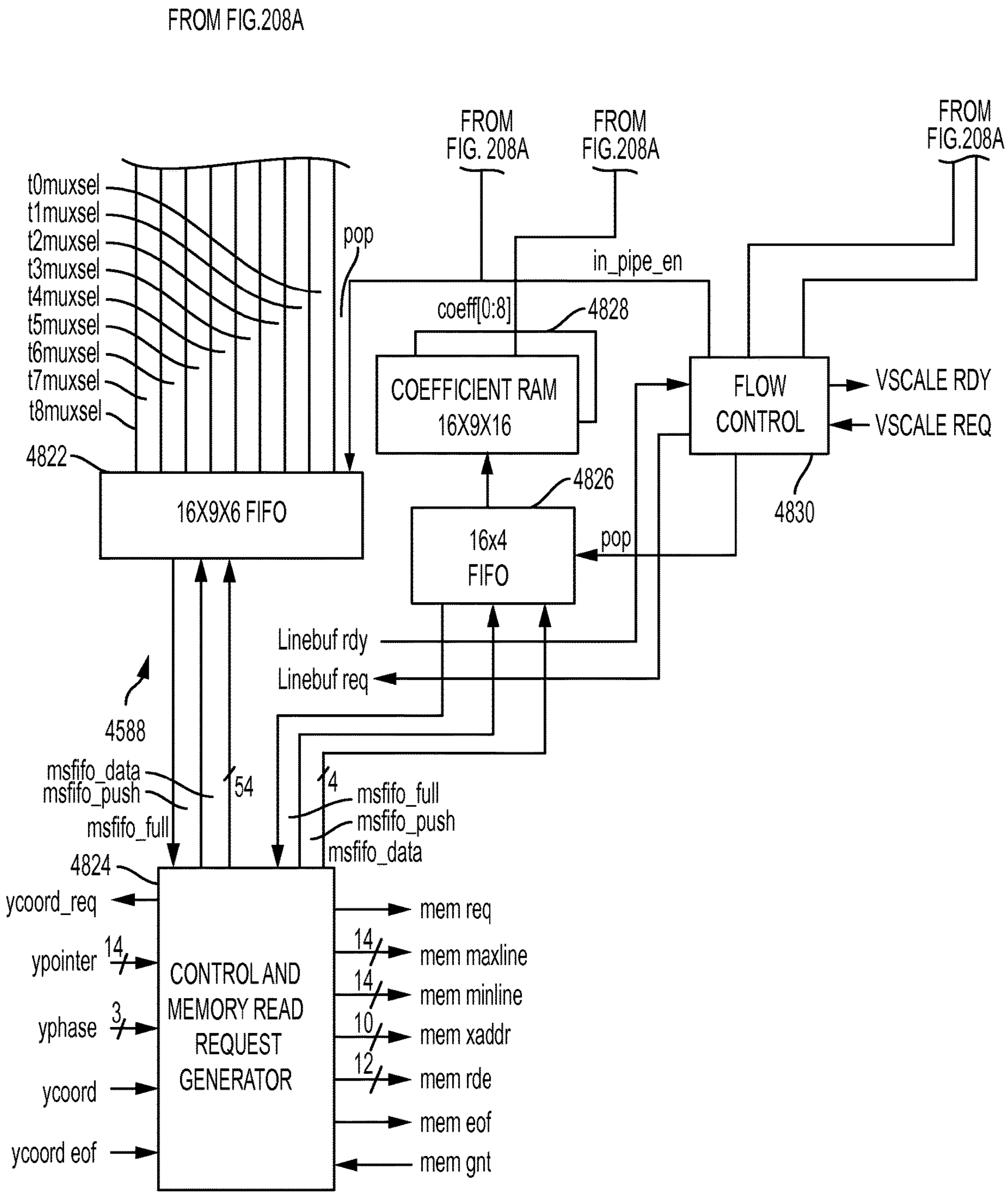
Figure 209:
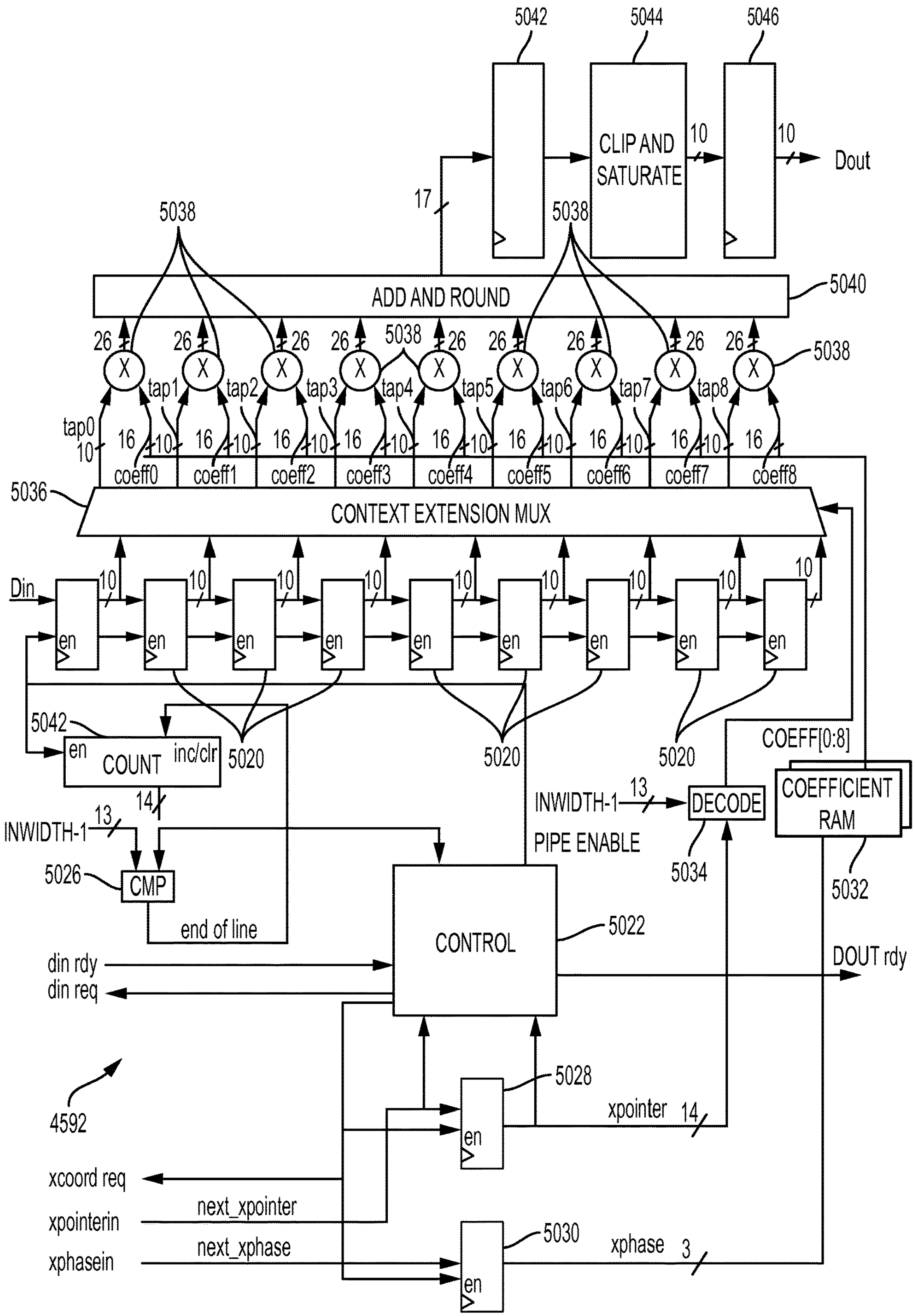
Figure 210:
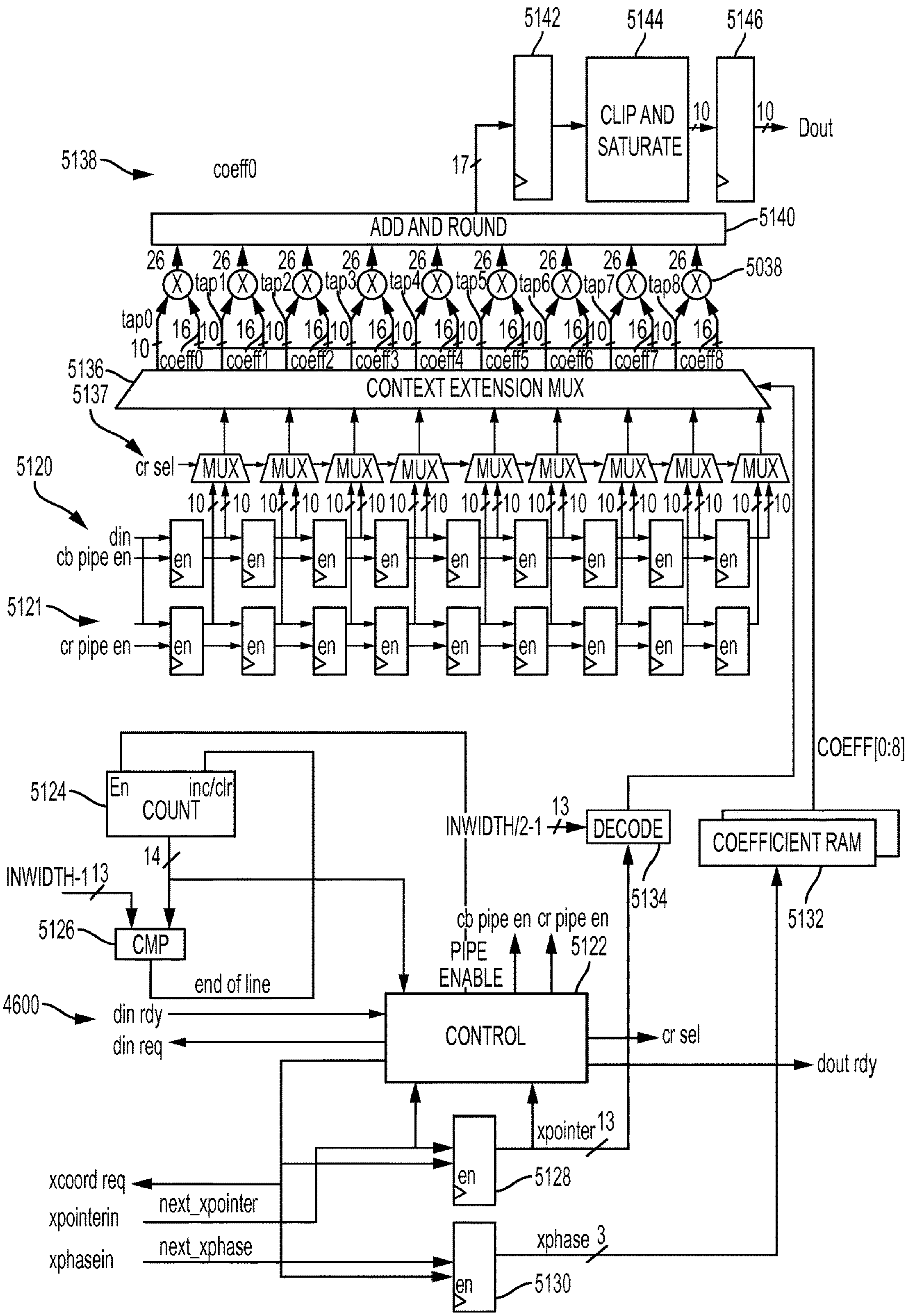
Figure 211:
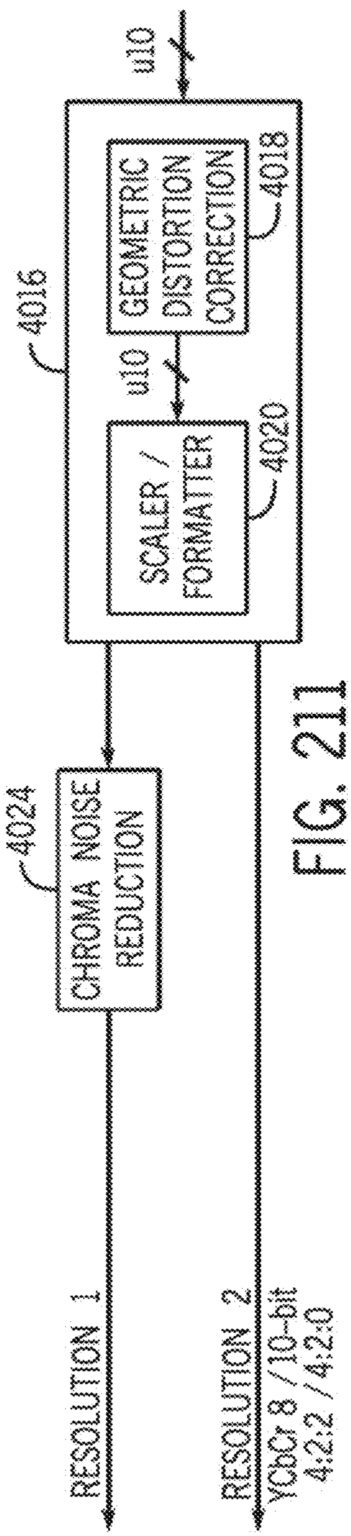
Figure 212:
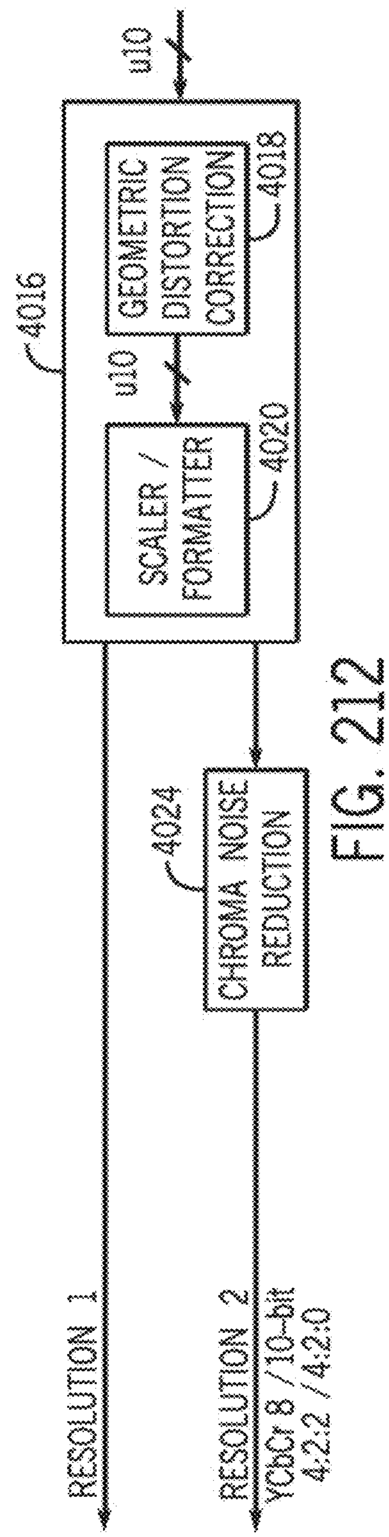
Figure 213:
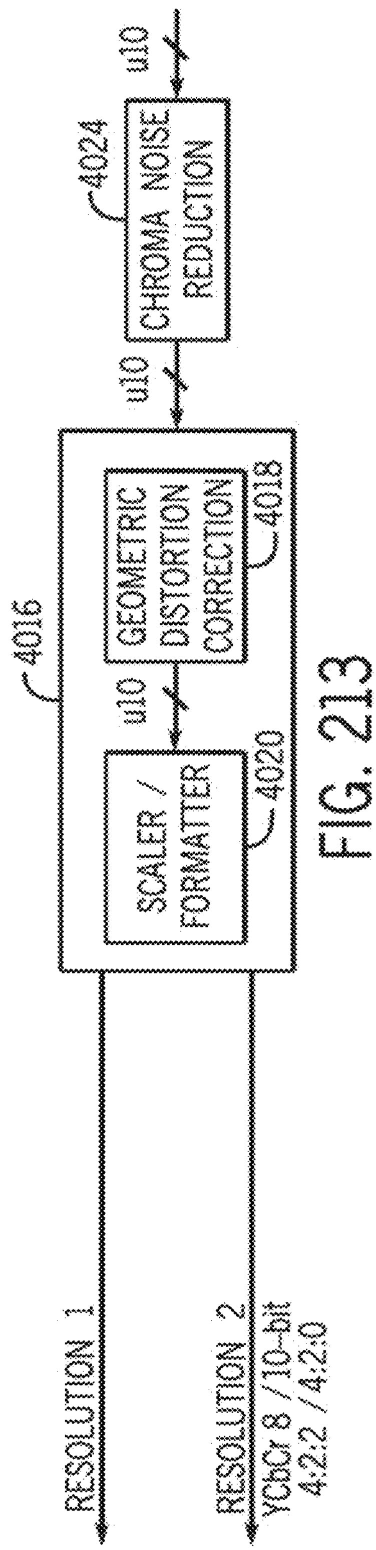
Figure 214:
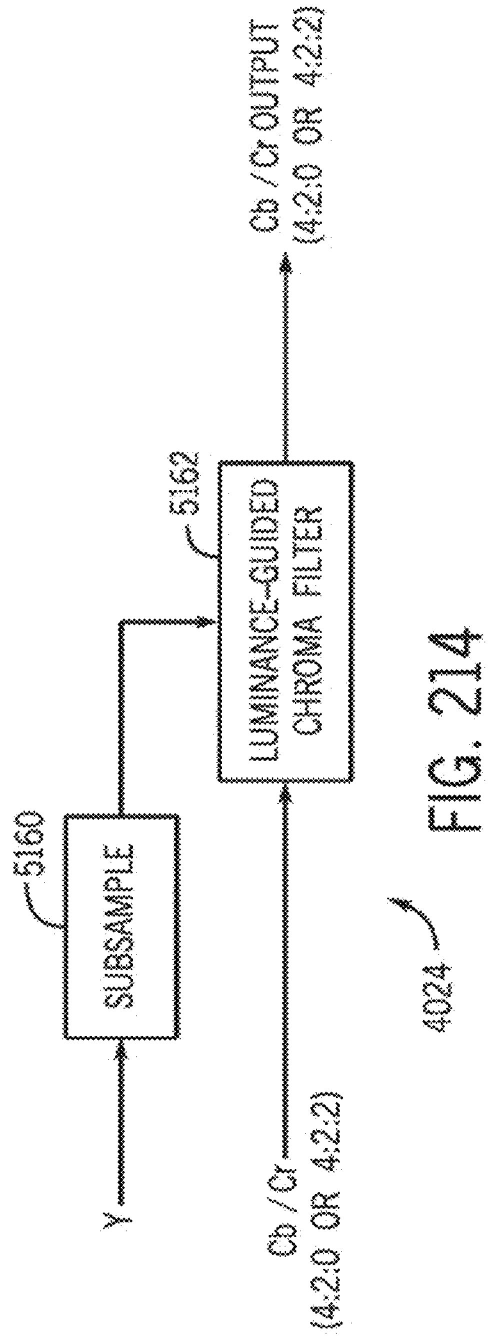
Figure 215:
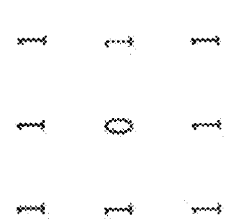
Figure 216:
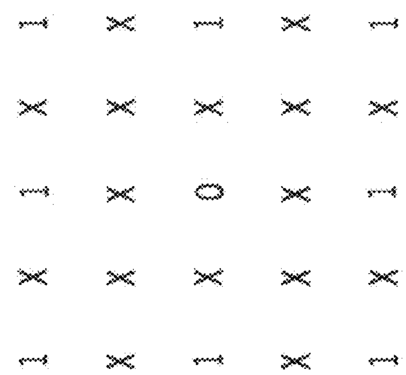
Figure 217:
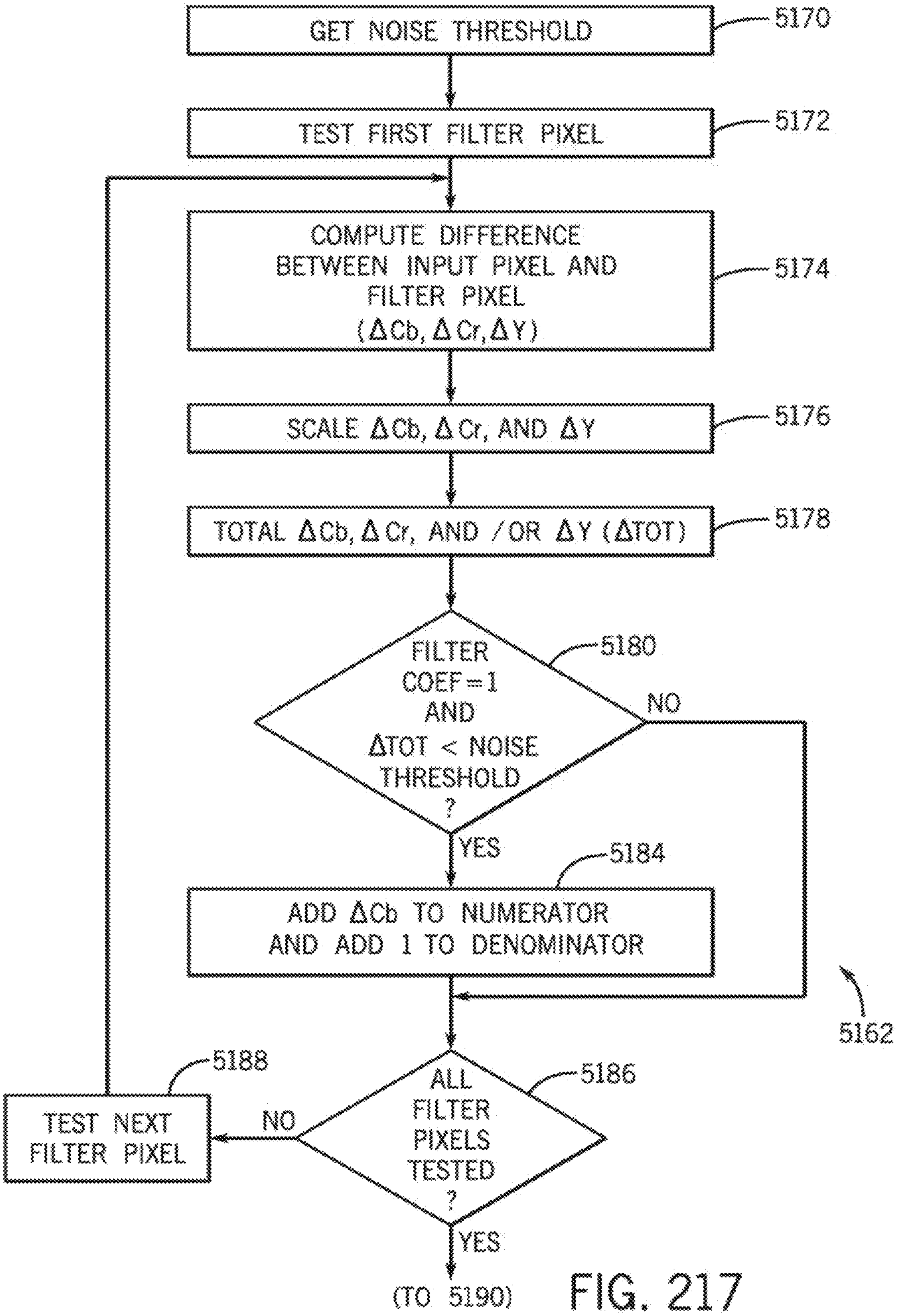
Figure 218:
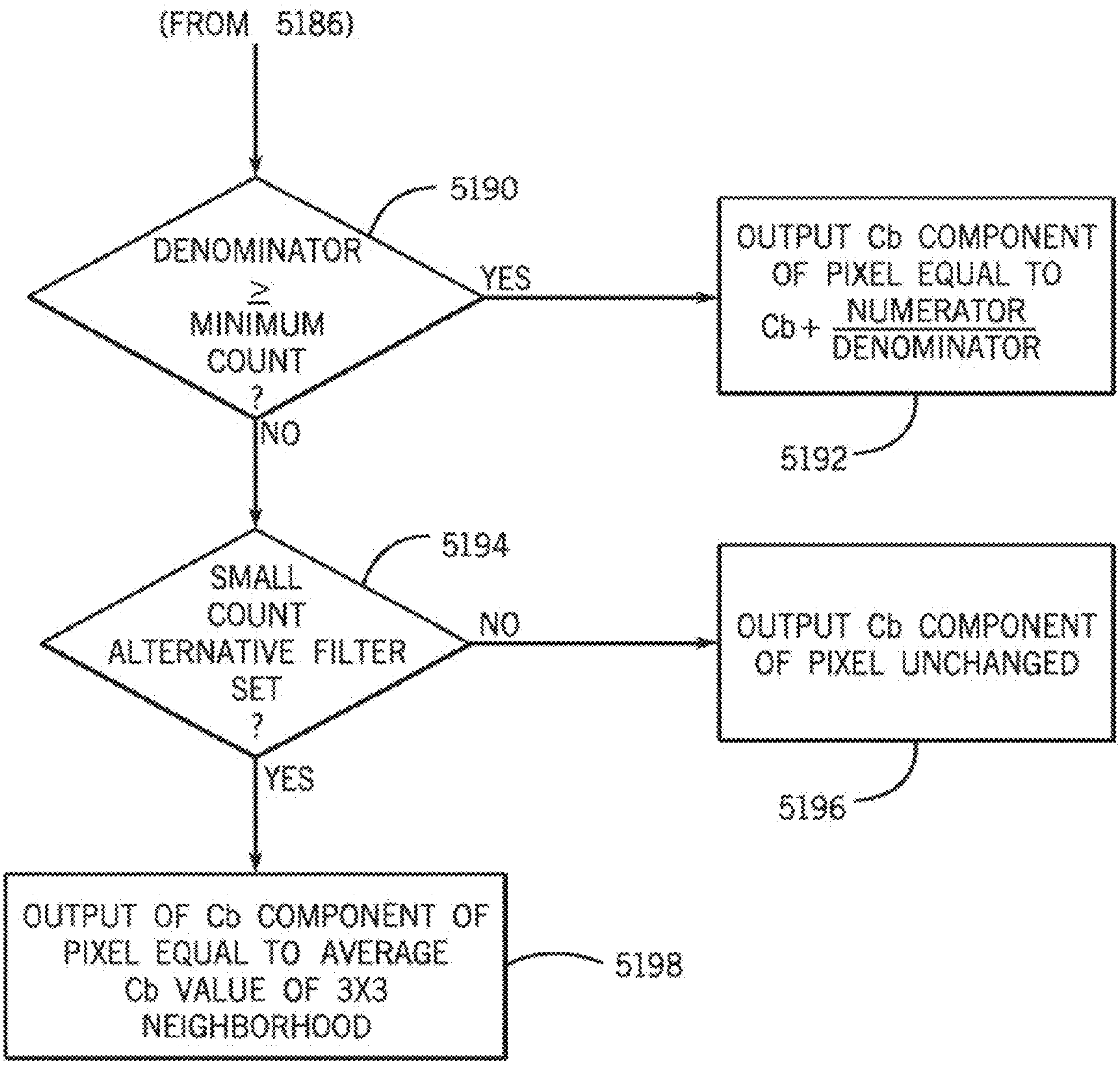
Figure 219:
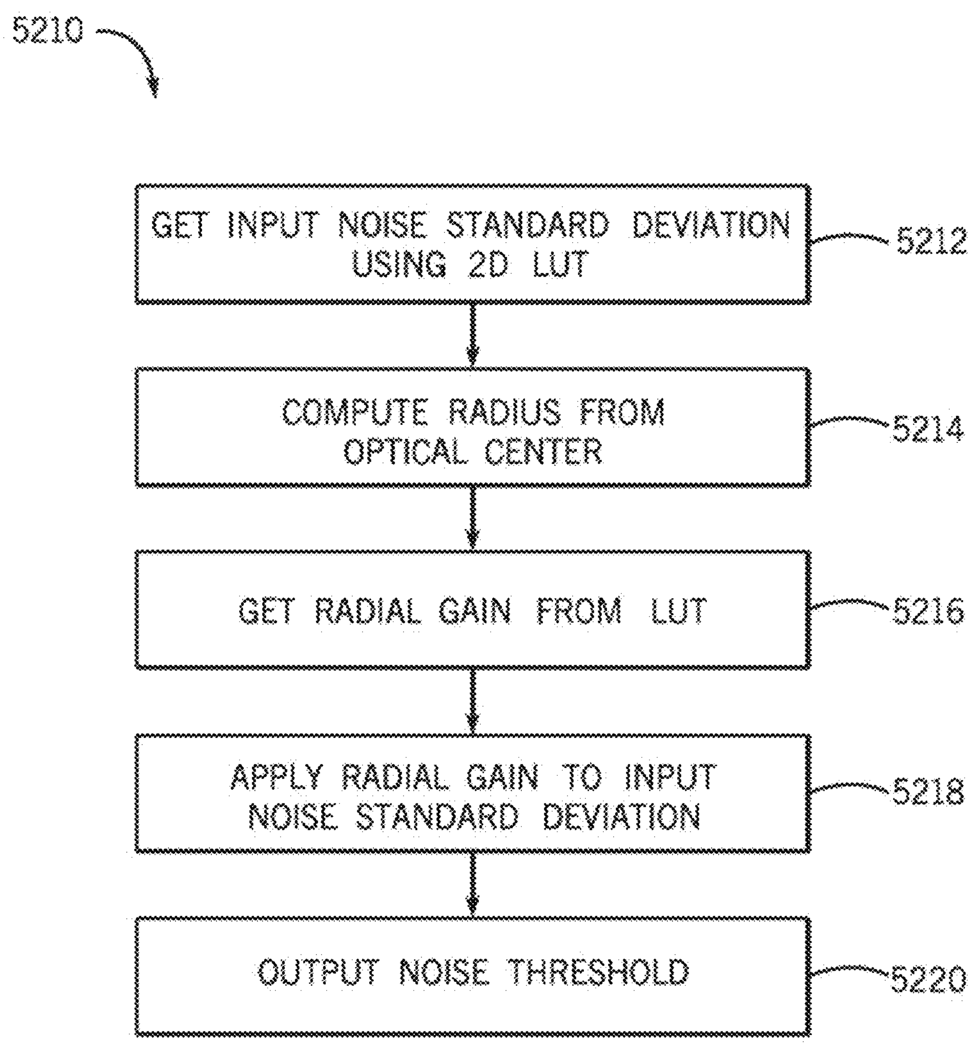

FIG. 147 is a block diagram of RGB-format processing logic of the ISP pipe processing logic of FIG. 8, in accordance with an embodiment;

FIG. 148 is a graphical process flow that provides a general overview as to how demosaicing may be applied to a raw Bayer image pattern to produce a full color RGB;

FIG. 149 is a diagram that illustrates a 2×2 pixel grid configured in a Bayer CFA pattern, in accordance with an embodiment;

FIG. 150 is a diagram that illustrates the computation of the Eh and Ev values for a red pixel centered in the 5×5 pixel block at location (j, i), wherein j corresponds to a row and i corresponds to a column, in accordance with an embodiment;

FIG. 151 is a diagram that illustrates the computation of Eh and Ev values for a Gr pixel, however, the same filter may be applied on any interpolated red or blue pixel, in accordance with an embodiment;

FIG. 152 is an example of horizontal interpolation for determining Gh, in accordance with one embodiment;

FIG. 153 is five vertical pixels (R0, G1, R2, G3, and R4) of a red column of the Bayer image and their respective filtering coefficients, in accordance with an embodiment;

FIG. 154 is a block diagram illustrating filter coefficients useful for computing the GNU correction amount, in accordance with an embodiment;

FIG. 155 is a block diagram illustrating a definition of local green gradient filters, in accordance with embodiments;

FIG. 156 is a block diagram in illustrating vertical and horizontal red/blue gradient filters, in accordance with an embodiment FIG. 157 is a diagram that illustrates a summary of the green interpolation on both red and blue pixels;

FIG. 158 is a diagram that illustrates various 3×3 blocks of the Bayer image pattern to which red and blue demosaicing may be applied, as well as interpolated green values (designated by G') that may have been obtained during demosaicing on the green channel, in accordance with an embodiment;

FIG. 159 is a block diagram that depicts the determination of which color components are to be interpolated for a given input pixel P, in accordance with an embodiment;

FIG. 160 is a flow chart illustrating a process for interpolating a green value, in accordance with an embodiment;

FIG. 161 is a flow chart illustrating a process for interpolating a red value, in accordance with an embodiment;

FIG. 162 is a flow chart illustrating a process for interpolating a blue value, in accordance with an embodiment;

FIG. 163 depicts an example of an original image scene, which may be captured by the imago sensor of the imaging device;

FIG. 164 is a raw Bayer image which may represent the raw pixel data captured by the image sensor;

FIG. 165 is an RGB image reconstructed using conventional demosaicing techniques, and may include artifacts, such as "checkerboard" artifacts at the edge;

FIG. 166 is an example of an image reconstructed using the demosaicing techniques, in accordance with an embodiment;

FIG. 167 is a simplified image of a scene with a bright area and a dark area, over which a first global gain has been applied that causes the bright area to be washed out, in accordance with an embodiment;

FIG. 168 is a simplified image of the scene with the bright area and the dark area, over which a second global gain has been applied that causes the dark area to be obscured, in accordance with an embodiment;

FIG. 169 is a simplified tone map of the scene of FIGS. 167 and 168, which relates local gains to the bright area and the dark area to preserve both highlight and dark image information, in accordance with an embodiment;

FIG. 170 is a simplified image of the scene of FIGS. 167 and 168, over which local gains have been applied using the tone map of FIG. 169, thereby preserving both highlight and dark image information, in accordance with an embodiment;

FIG. 171 is a block diagram representing an example of local tone mapping logic of the RGB-format processing logic of FIG. 147, in accordance with an embodiment;

FIG. 172 is a schematic diagram of a local tone map grid of a spatially varying lookup table of the local tone mapping logic of FIG. 171, in accordance with an embodiment;

FIG. 173 is an illustration of 2D interpolation to obtain values from the local tone map grid of FIG. 172, in accordance with an embodiment;

FIG. 174 is a block diagram of gain computation logic of the local tone mapping logic of FIG. 171, in accordance with an embodiment;

FIG. 175 is a plot representing a box function used in the gain computation logic of FIG. 174, in accordance with an embodiment;

FIG. 176 is a diagram of a 9Hx1V group of pixels filtered through a bilateral filter using the box function of FIG. 175, in accordance with an embodiment;

FIG. 177 is a block diagram of pin-to-white logic of the local tone mapping logic of FIG. 171, in accordance with an embodiment;

FIGS. 178-180 are memory format diagrams respectively representing memory formats for a spatially varying color correction matrix (CCM), the spatially varying local tone map lookup table, and both together, in accordance with an embodiment;

FIG. 181 is a block diagram of color correction logic using a 3D color lookup table, in accordance with an embodiment;

FIG. 182 is a diagram illustrating tetrahedral interpolation of values in the 3D color lookup table, in accordance with an embodiment;

FIG. 183 is a block diagram of YCC (e.g., YCbCr) processing logic of the ISP pipe processing logic of FIG. 8, in accordance with an embodiment;

FIG. 184 is a block diagram of luma sharpening logic of the YCC processing logic of FIG. 183, in accordance with an embodiment;

FIG. 185 is a block diagram of dot detection logic of the luma sharpening logic of FIG. 184, in accordance with an embodiment;

FIG. 186 is a block diagram of chroma suppression logic of the YCC processing logic of FIG. 183, in accordance with an embodiment;

FIG. 187 is a plot of chroma gain versus a sharp value of luma, which may be used in a lookup table to obtain a first attenuation factor in the chroma suppression logic of FIG. 186, in accordance with an embodiment;

FIG. 188 is a plot of chroma gain versus an unsharp value of luma, which may be used in a lookup table to obtain a second attenuation factor in the chroma suppression logic of FIG. 186, in accordance with an embodiment;

FIG. 189 is a block diagram of brightness, contrast, and color adjustment logic of the YCC processing logic of FIG. 183, in accordance with an embodiment;

FIG. 190 is a block diagram of horizontal chroma decimation logic of the YCC processing logic of FIG. 183, in accordance with an embodiment;

FIG. 191 is a block diagram of a first horizontal filter mode of the horizontal chroma decimation logic of FIG. 190, in accordance with an embodiment;

FIG. 192 is a plot representing a lancsoz filter waveform implemented in the first horizontal filter mode of FIG. 191, in accordance with an embodiment;

FIG. 193 is a block diagram of a second horizontal filter mode of the horizontal chroma decimation logic of FIG. 190, in accordance with an embodiment;

FIG. 194 is a schematic illustration of horizontal chroma decimation using the horizontal chroma decimation logic of FIG. 190, in accordance with an embodiment;

FIG. 195 is a block diagram of a YCC scaler with geometric distortion correction and scaling-formatting functions, in accordance with an embodiment;

FIG. 196 is a flowchart describing a method for geometric distortion correction, in accordance with an embodiment;

FIG. 197 is a plot of a vertical span in total lines of pixels used in a luminance component of the YCC scaler of FIG. 195, in accordance with an embodiment;

FIG. 198 is a plot of a vertical span in total lines of pixels used in a chrominance component of the YCC scaler of FIG. 195, in accordance with an embodiment;

FIGS. 199A and 199B are a block diagram of a line buffer module of the YCC scaler of FIG. 195, in accordance with an embodiment;

FIGS. 200-203 are random access memory (RAM) de ta formats for writing, storage in 1×4160×10 mode, storage in 2×2080×10 mode, and 4×1040×10 mode, respectively, in accordance with an embodiment;

FIG. 204 is a block diagram of an output shifter with a preload buffer used in the YCC scaler of FIG. 195, in accordance with an embodiment;

FIG. 205 is a block diagram of a line buffer controller to control writing in the YCC scaler of FIG. 195, in accordance with an embodiment;

FIG. 206 is a block diagram of vertical luminance coordinate generation logic to determine displacement caused by geometric distortion, in accordance with an embodiment;

FIG. 207 is a block diagram of vertical luminance displacement computation logic of the vertical luminance coordinate generation logic of FIG. 206, in accordance with an embodiment;

FIGS. 208A, 208B, and 208C are a block diagram of vertical luminance resampling filter logic of the YCC scaler of FIG. 195, in accordance with an embodiment;

FIG. 209 is a block diagram of horizontal luminance resampling filter logic of the YCC scaler of FIG. 195, in accordance with an embodiment;

FIG. 210 is a block diagram of horizontal chrominance resampling filter logic of the YCC scaler of FIG. 195, in accordance with an embodiment;

FIGS. 211-213 are block diagrams illustrating various processing orders of the YCC scaler logic and chroma noise reduction logic of the YCC processing logic of FIG. 183, in accordance with an embodiment;

FIG. 214 is a block diagram of the chroma noise reduction logic of the YCC processing logic of FIG. 183, in accordance with an embodiment;

FIG. 215 is an example of a 3×3 pixel filter, in accordance with an embodiment;

FIG. 216 is an example of a sparse 5×5 pixel filter enlarged from the 3×3 pixel filter of FIG. 215, in accordance with an embodiment;

FIGS. 217 and 218 represent a flowchart of a method for reducing chroma noise, in accordance with an embodiment; and FIG. 219 is a flowchart of a method for determining a noise threshold for the method for reducing chroma noise of FIGS. 217 and 218.

Figure 229:
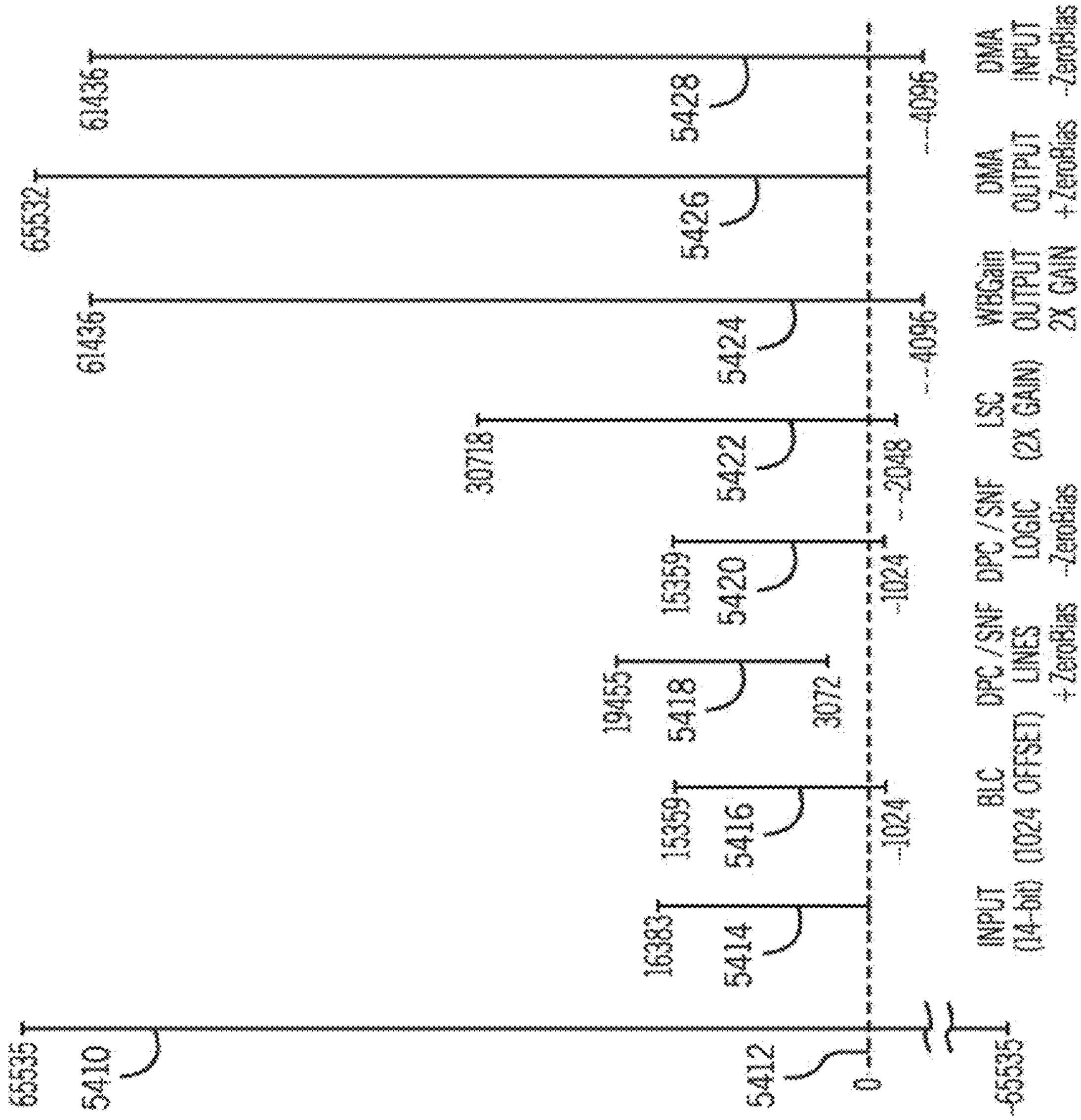
Figure 43:
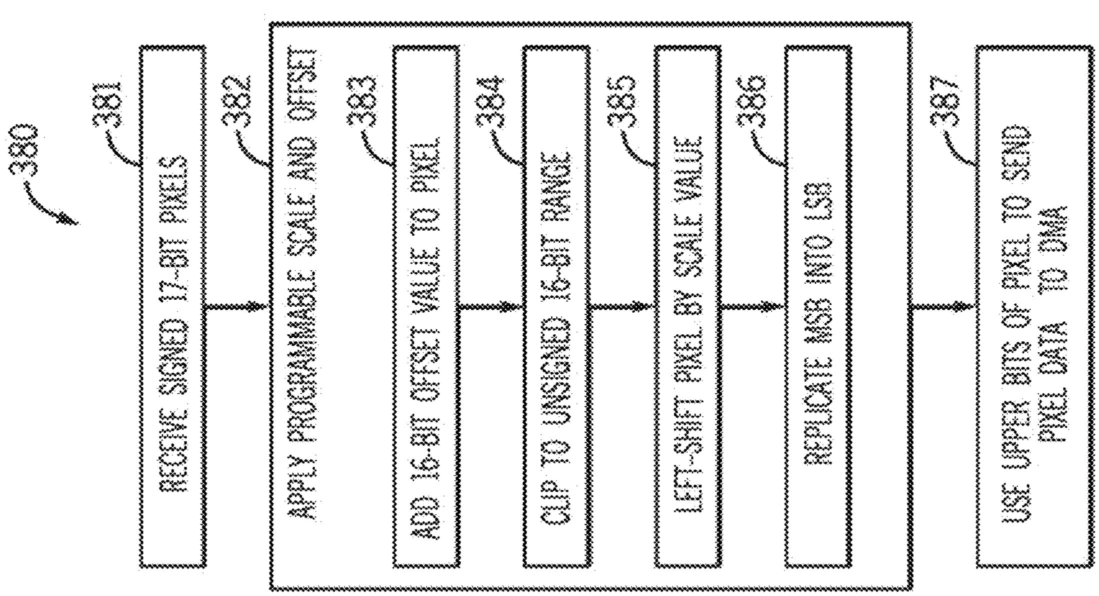
FIG. 43 is a flowchart describing embodiments of a method for converting signed 17-bit pixels from the ISP pipe processing logic of FIG. 8 into 16-bit pixels for storage in memory, in accordance with an embodiment.
Figure 228:
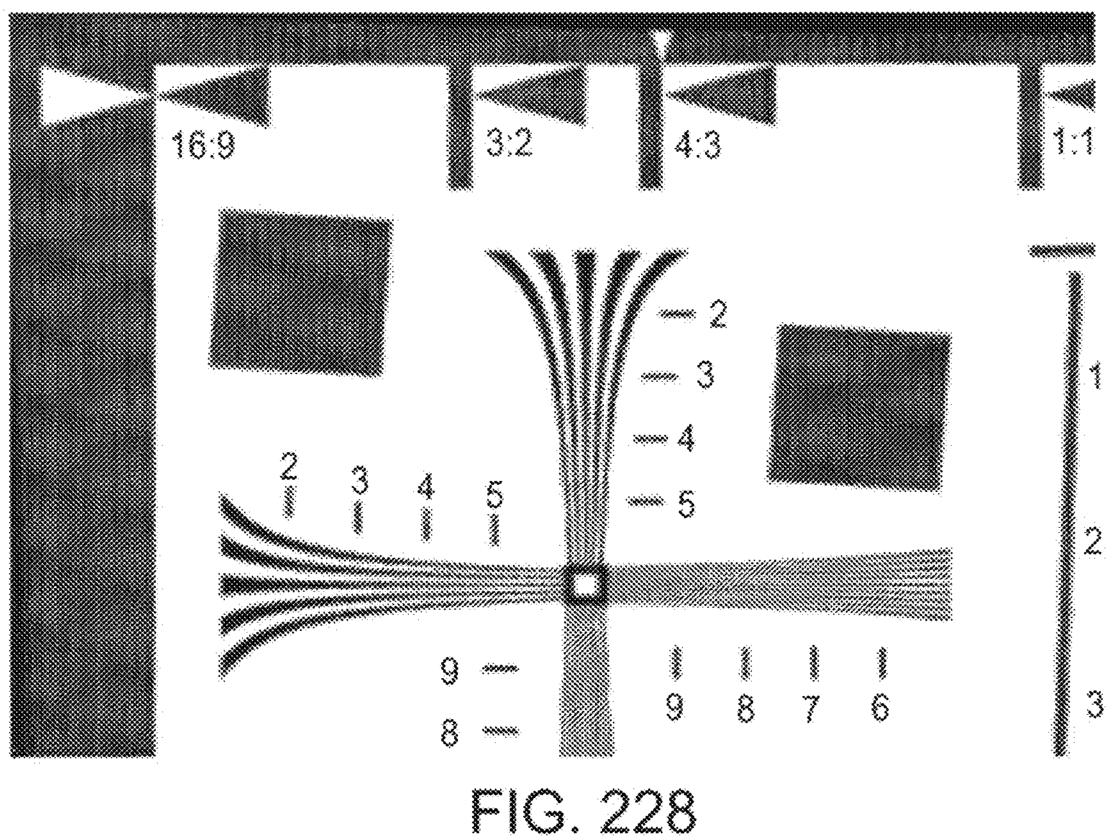
Figure 220:
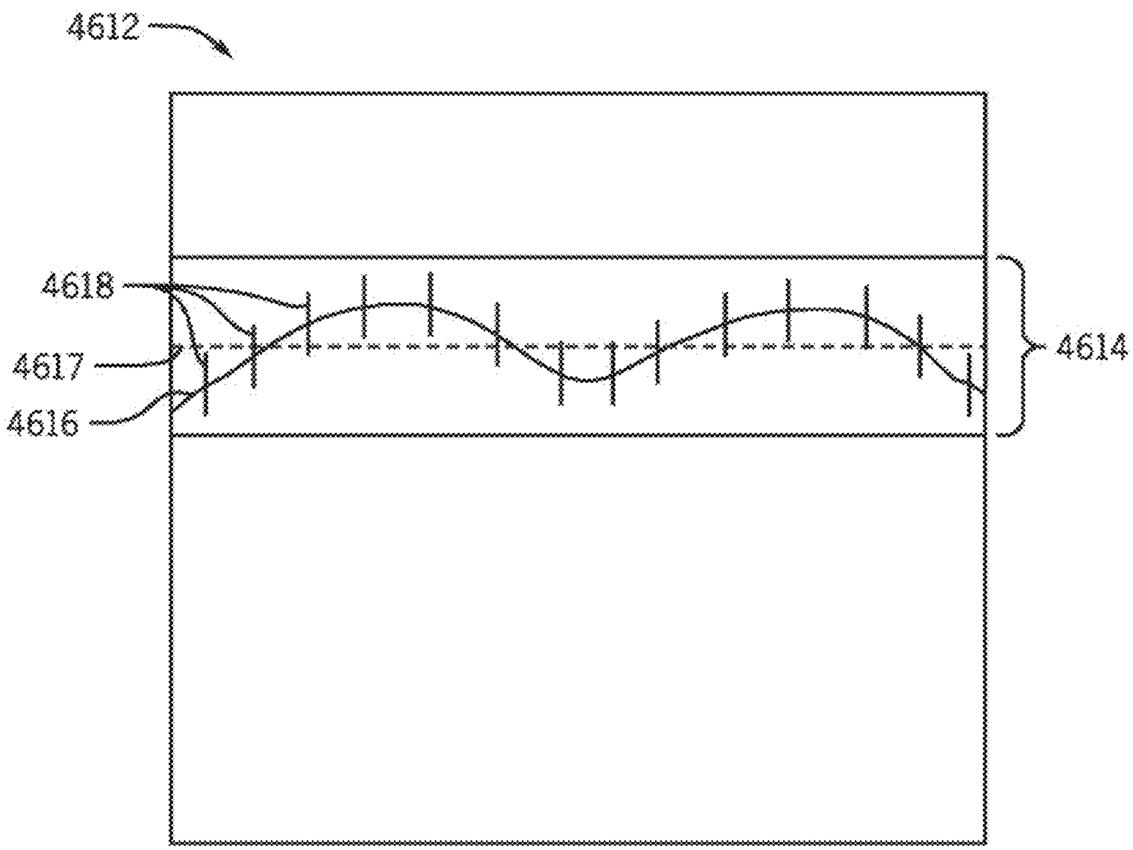
Figure 221:
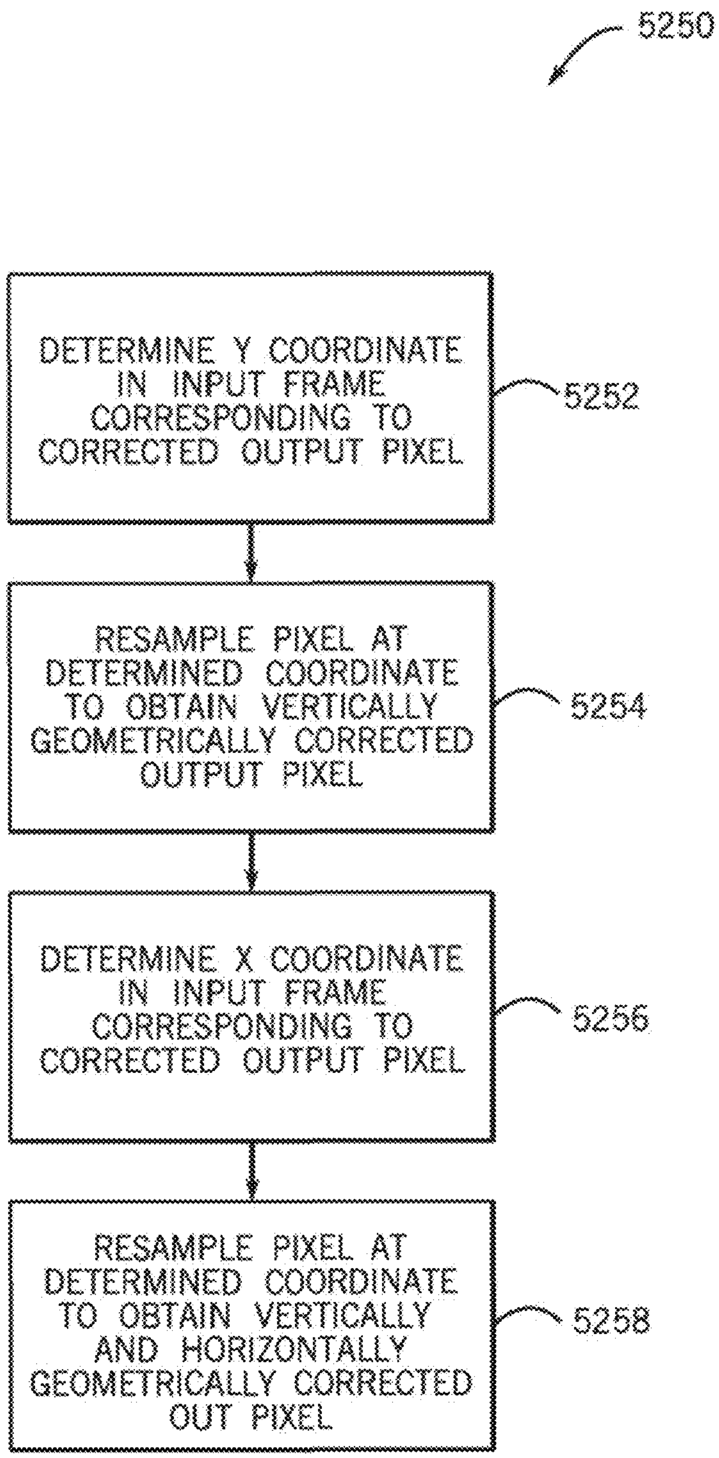
Figure 222:
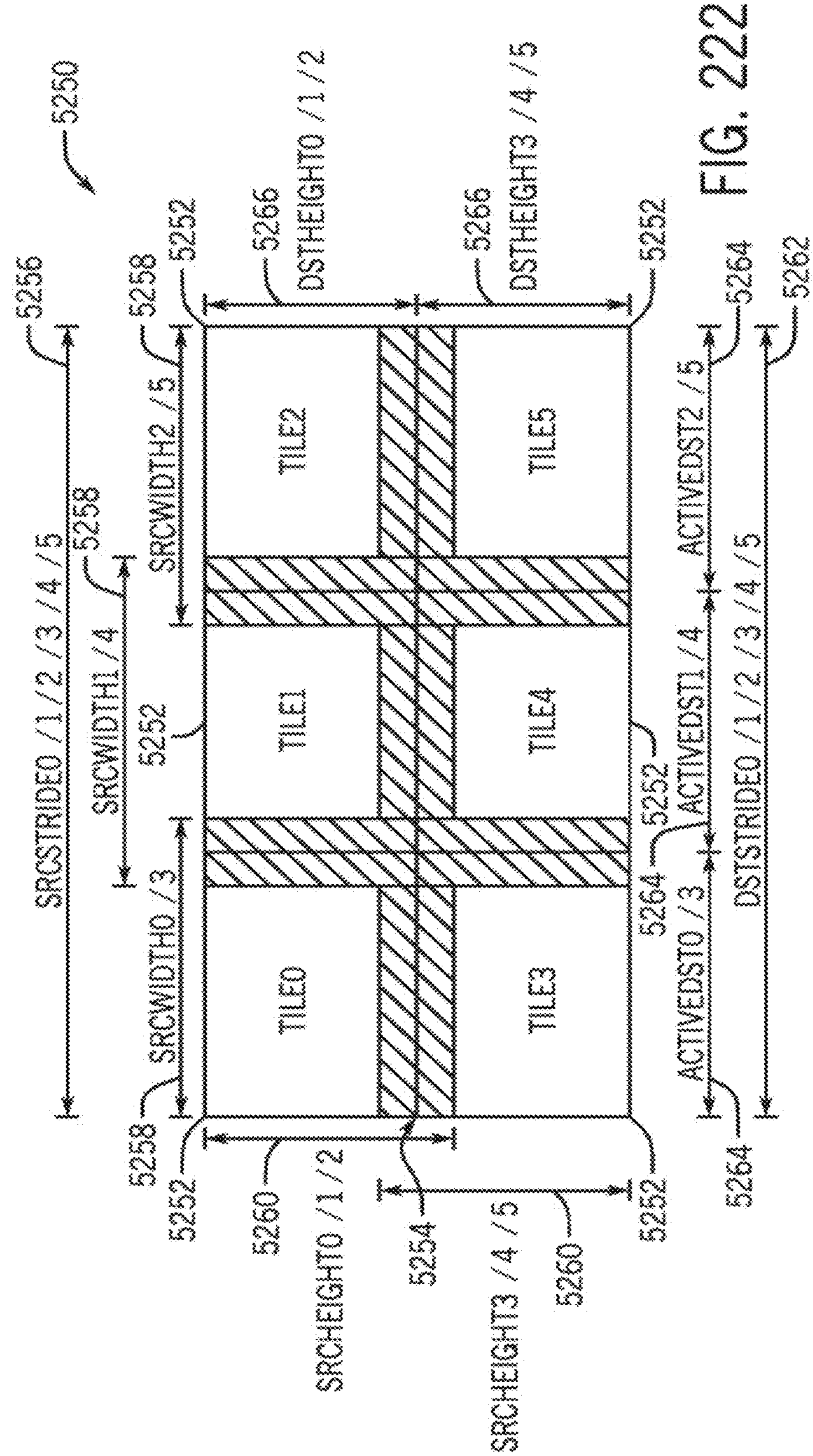
Figure 223:
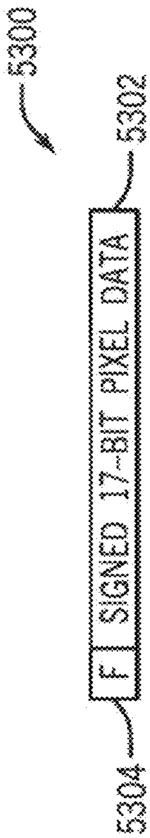
Figure 224:
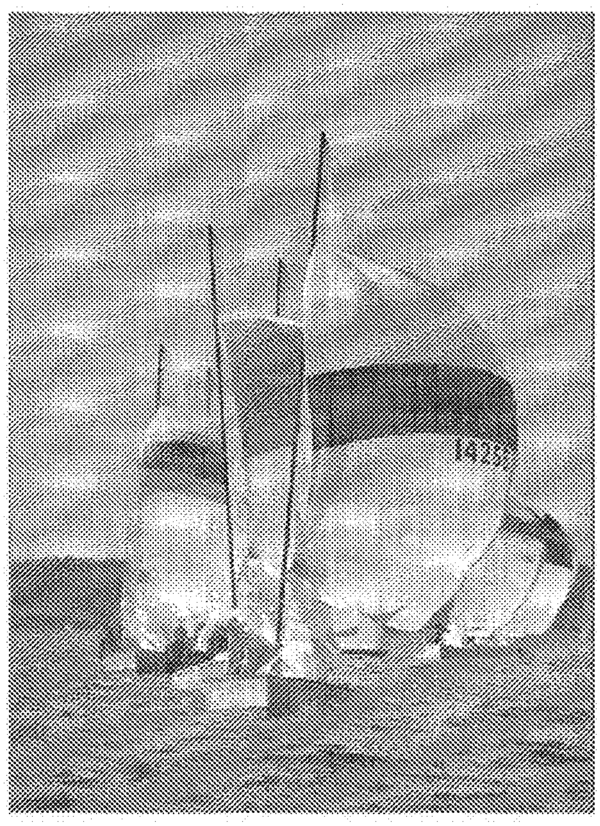
Figure 225:
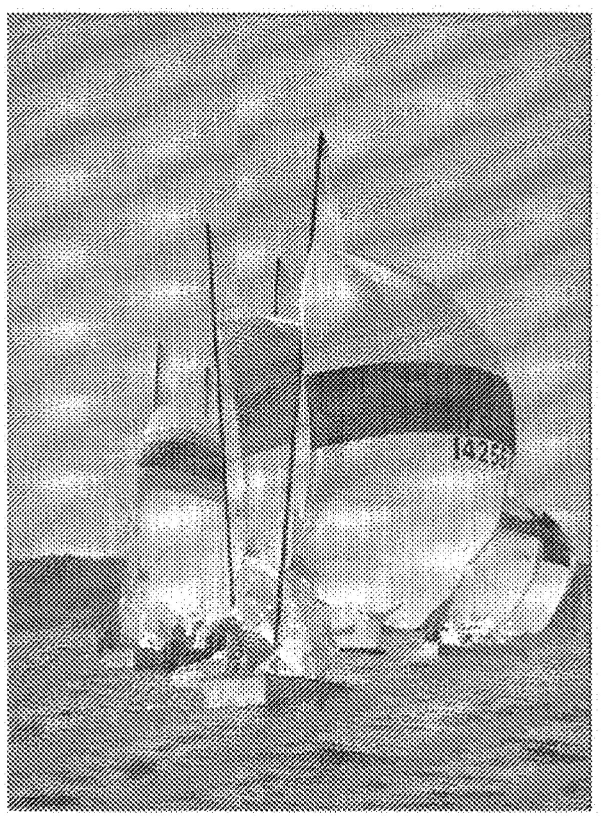
Figure 226:
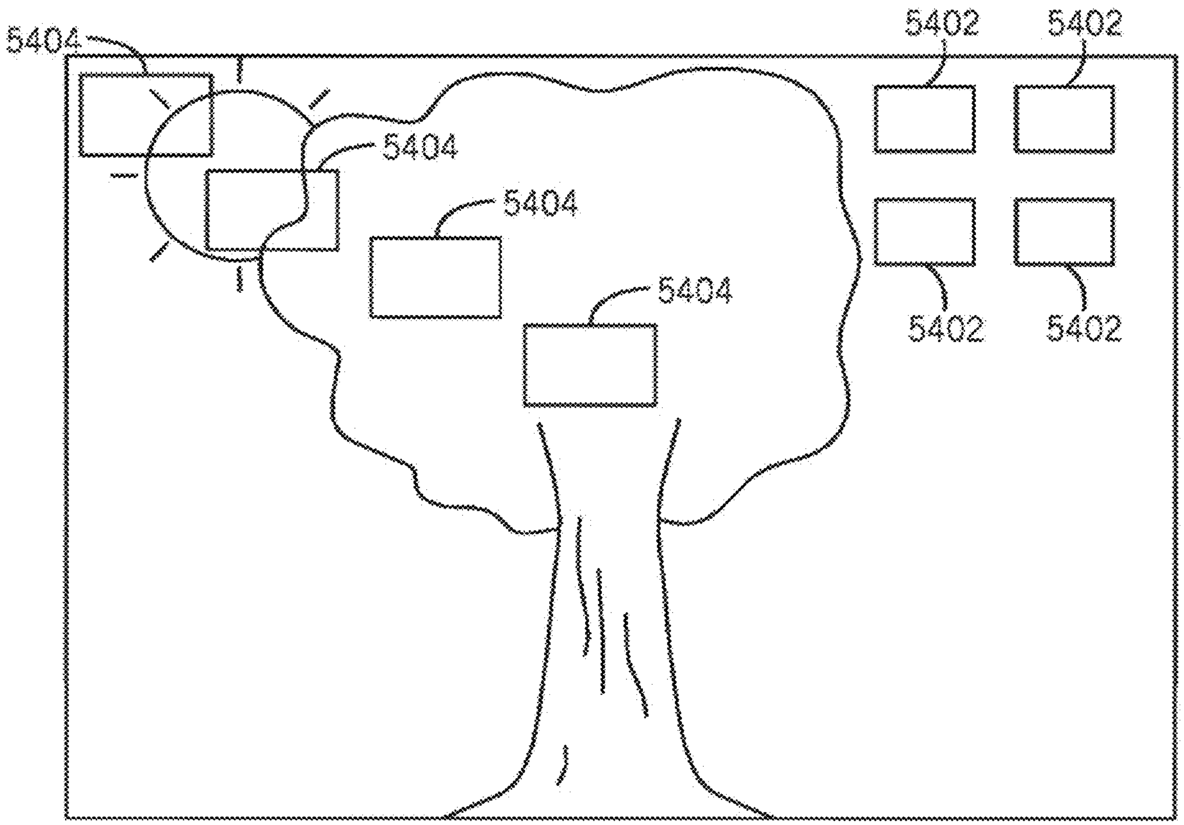
Figure 227:
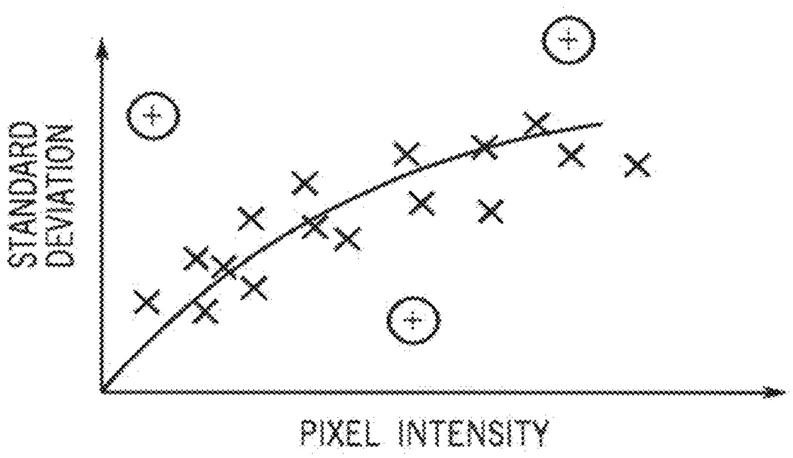

FIG. 220 is a block diagram of line buffering used in correcting for geometric distortion, in accordance with an embodiment;

FIG. 221 is a flowchart describing a manner of separably correcting for geometric distortion in vertical and horizontal scalers, in accordance with an embodiment;

FIG. 222 is a block diagram of processing image data in a series of tiles, in accordance with an embodiment;

FIG. 223 is a block diagram of pixel data having a clipped pixel flag, in accordance with an embodiment;

FIG. 224 is an example image having a column offset fixed pattern noise, in accordance with an embodiment;

FIG. 225 is an example image after applying a column offset fixed pattern noise correction, in accordance with an embodiment;

FIG. 226 is an example image after with low frequency portions of image data and high frequency portions of image data, in accordance with an embodiment;

FIG. 227 is graph of noise statistics as represented by a plot of standard deviations for portions of image data versus pixel intensity values, in accordance with an embodiment;

FIG. 228 is an example image that has been corrected for geometric distortion, in accordance with an embodiment; and FIG. 229 is an example of signed image data biasing throughout the raw processing logic of the image pipe processing logic, in accordance with an embodiment.

DETAILED DESCRIPTION OF SPECIFIC EMBODIMENTS

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "embodiments" of the present disclosure are not intended to be interpreted as excluding the existence of additional embodiments that also incorporate the recited features.

Acquired image data may undergo significant processing before appearing as a finished image. Accordingly, the disclosure below will describe image processing circuitry that can efficiently process image data. Statistics logic of the image processing circuitry may obtain statistics associated with an image in raw format in parallel with other image data processing. A raw-format processing block may also process the raw image data, using the statistics to correct fixed pattern noise, defective pixels, recover highlights lost by the sensor, and/or perform other operations. An RGB-format processing block may employ a more efficient organization, better demosaicing, improved local tone mapping, and/or color correction to correct colors from image data from more than one sensor vendor. A YCC-format processing block may similarly offer a more efficient organization, as well as improved sharpening, geometric distortion correction, and chroma noise reduction. Moreover, many operations may be performed using signed, rather than unsigned, pixel data. Using signed pixel data may preserve image data when operations produce interim negative pixel results, as well when a sensor produces black level noise in the negative direction.

Figure 1:
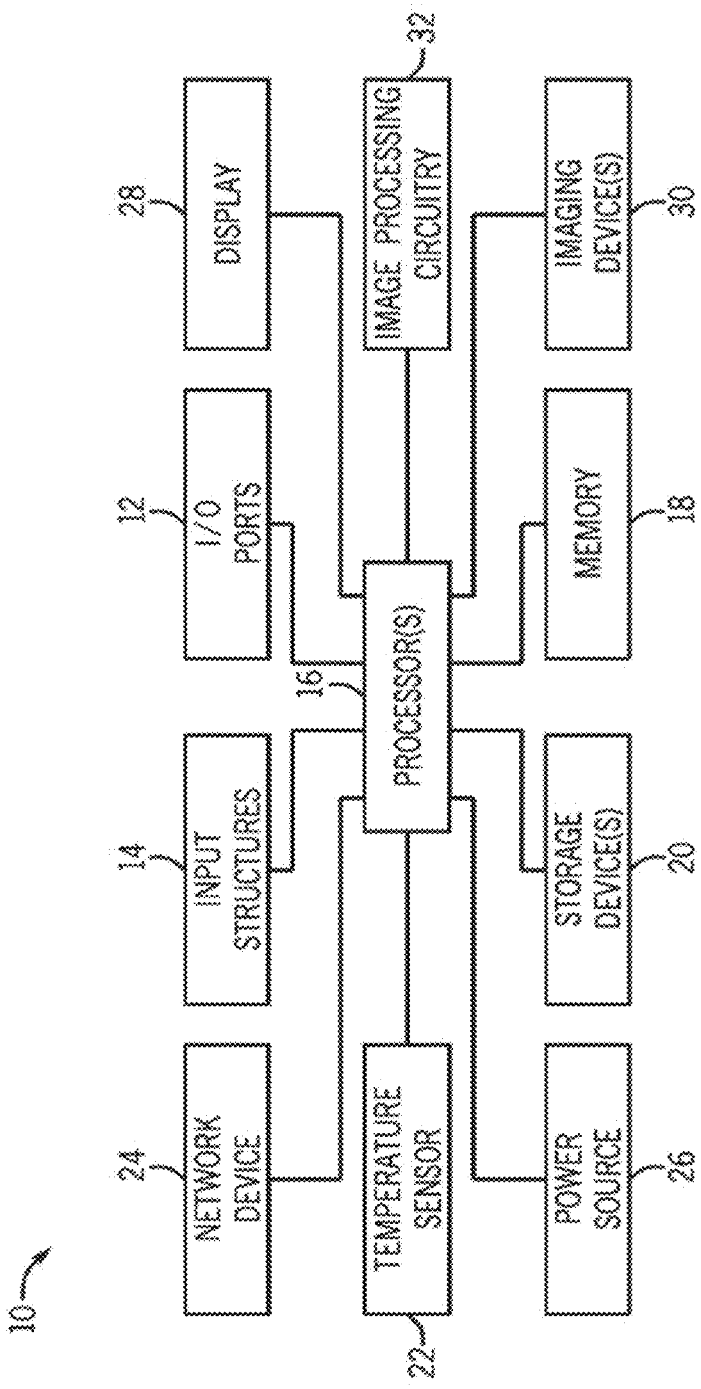
FIG. 1 is a simplified block diagram of components of an electronic device with imaging device(s) and image processing circuitry that may perform image processing, in accordance with an embodiment.

With this in mind, FIG. 1 is a block diagram illustrating an example of an electronic device 10 that may process image data using one or more of the image processing techniques briefly mentioned above. The electronic device 10 may be any suitable electronic device, such as a laptop or desktop computer, a mobile phone, a digital media player, or the like, that can receive and process image data. By way of example, the electronic device 10 may be a portable electronic device, such as a model of an iPod® or iPhone®, available from Apple Inc. of Cupertino, Calif. The electronic device 10 may be a desktop or notebook computer, such as a model of a MacBook®, MacBook® Pro, MacBook Air®, iMac®, Mac® Mini, or Mac Pro®, available from Apple Inc. In other embodiments, electronic device 10 may be a model of an electronic device from another manufacturer that is capable of acquiring and processing image data.

Regardless of form, the electronic device 10 may process image data using one or more of the image processing techniques presented in this disclosure. The electronic device 10 may include or operate on image data from one or more imaging devices, such as an integrated or external digital camera. Certain specific examples of the electronic device 10 will be discussed below with reference to FIGS. 3-6.

As shown in FIG. 1, the electronic device 10 may include various components. The functional blocks shown in FIG. 1 may represent hardware elements (including circuitry), software elements (including code stored on a computer-readable medium) or a combination of both hardware and software elements. In the example of FIG. 1, the electronic device 10 includes input/output (I/O) ports 12, input structures 14, one or more processors 16, a memory 18, nonvolatile storage 20, a temperature sensor 22, networking device 24, power source 26, display 28, one or more imaging devices 30, and image processing circuitry 32. It should be appreciated, however, that the components illustrated in FIG. 1 are provided only as an example. Other embodiments of the electronic device 10 may include more or fewer components. To provide one example, some embodiments of the electronic device 10 may not include the imaging device(s) 30. In any case, the image processing circuitry 32 may implement one or more of the image processing techniques discussed below. The image processing circuitry 32 may receive image data for image processing from the memory 18, the nonvolatile storage device(s) 20, the imaging device(s) 30, or any other suitable source.

Before continuing further, the reader should note that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU). In addition, the image processing circuitry 32 may communicate with the memory 18 directly via a direct memory access (DMA) bus.

Considering each of the components of FIG. 1, the I/O ports 12 may represent ports to connect to a variety of devices, such as a power source, an audio output device, or other electronic devices. For example, the I/O ports 12 may connect to an external imaging device, such as a digital camera, to acquire image data to be processed in the image processing circuitry 32. The input structures 14 may enable user input to the electronic device, and may include hardware keys, a touch-sensitive element of the display 28, and/or a microphone.

The processor(s) 16 may control the general operation of the device 10. For instance, the processor(s) 16 may execute an operating system, programs, user and application interfaces, and other functions of the electronic device 10. The processor(s) 16 may include one or more microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As may be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, Preview®, iMovie®, or Final Cut Pro® available from Apple Inc., or the "Camera" and/or "Photo" applications provided by Apple Inc. and available on some models of the iPhone®, iPod®, and iPad®.

A computer-readable medium, such as the memory 18 or the nonvolatile storage 20, may store the instructions or data to be processed by the processor(s) 16. The memory 18 may include any suitable memory device, such as random access memory (RAM) or read only memory (ROM). The nonvolatile storage 20 may include flash memory, a hard drive, or any other optical, magnetic, and/or solid-state storage media. The memory 18 and/or the nonvolatile storage 20 may store firmware, data files, image data, software programs and applications, and so forth. Such digital information may be used in image processing to control or supplement the image processing circuitry 32.

In some examples of the electronic device 10, the temperature sensor 22 may indicate a temperature associated with the imaging device(s) 30. Since fixed pattern noise may be exacerbated by higher temperatures, the image processing circuitry 32 may vary certain operations to remove fixed pattern noise depending on the temperature. The network device 24 may be a network controller or a network interface card (NIC), and may enable network communication over a local area network (LAN) (e.g., Wi-Fi), a personal area network (e.g., Bluetooth), and/or a wide area network (WAN) (e.g., a 3G or 4G data network). The power source 26 of the device 10 may include a Li-ion battery and/or a power supply unit (PSU) to draw power from an electrical outlet. The display 28 may display various images generated by device 10, such as a GUI for an operating system or image data (including still images and video data) processed by the image processing circuitry 32. The display 28 may be any suitable type of display, such as a liquid crystal display (LCD), plasma display, or an organic light emitting diode (OLED) display, for example. Additionally, as mentioned above, the display 28 may include a touch-sensitive element that may represent an input structure 14 of the electronic device 10.

The imaging device(s) 30 of the electronic device 10 may represent a digital camera that may acquire both still images and video. Each imaging device 30 may include a lens and an image sensor capture and convert light into electrical signals. By way of example, the image sensor may include a CMOS image sensor (e.g., a CMOS active-pixel sensor (APS)) or a CCD (charge-coupled device) sensor. Generally, the image sensor of the imaging device 30 includes an integrated circuit with an array of photodetectors. The array of photodetectors may detect the intensity of light captured at specific locations on the sensor. Photodetectors are generally only able to capture intensity, however, and may not detect the particular wavelength of the captured light.

Accordingly, the image sensor may include a color filter array (CFA) that may overlay the pixel array of the image sensor to capture color information. The color filter array may include an array of small color filters, each of which may overlap a respective location—namely, a picture element, or pixel—of the image sensor and filter the captured light by wavelength. Thus, together, the color filter array and the photodetectors may detect both the wavelength and intensity of light through the lens. The resulting image information may represent a frame of raw image data.

Figure 2:
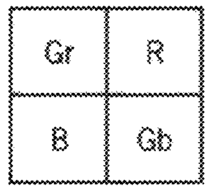
FIG. 2 shows a graphical representation of a 2×2 pixel block of a Bayer color filter array that may be implemented in the imaging device of FIG. 1.

The color filter array may be a Bayer color filter array, an example of which appears in FIG. 2. A Bayer color filter array provides a filter pattern that captures 50% green elements, 25% red elements, and 25% blue elements of light reaching the sensor. In the example of FIG. 2, 2 green elements (Gr and Gb), 1 red element (R), and 1 blue element (B) will repeat in the pattern shown across the full pixel array of the sensor(s) of the imaging device(s) 30. Thus, an image sensor with a Bayer color filter array may provide information regarding the intensity of the light received by the imaging device 30 at the green, red, and blue wavelengths, whereby each image pixel records only one of the three colors (RGB). This information, which may be referred to as "raw image data" or data in the "raw domain," may be processed using one or more demosaicing techniques to convert the raw image data into a full color image, generally by interpolating a set of red, green, and blue values for each pixel. As will be discussed further below, such demosaicing techniques may be performed by the image processing circuitry 32.

The image processing circuitry 32 may provide many other image processing steps, as well, including defective pixel detection and correction, fixed pattern noise reduction, lens shading correction, image sharpening, noise reduction, gamma correction, image enhancement, color-space conversion, image compression, chroma subsampling, local tone mapping, chroma noise reduction, image scaling operations, and so forth. In some embodiments, the image processing circuitry 32 may include various subcomponents and/or discrete units of logic that collectively form an image processing "pipeline" for performing each of the various image processing steps. These subcomponents may be implemented using hardware (e.g., digital signal processors or ASICs) or software, or via a combination of hardware and software components. The various image processing operations that may be provided by the image processing circuitry 32 will be discussed in greater detail below.

Before continuing, it should be noted that while various embodiments of the various image processing techniques discussed below may use a Bayer CFA, the presently disclosed techniques are not intended to be limited in this regard. Indeed, those skilled in the art will appreciate that the image processing techniques provided herein may be applicable to any suitable type of color filter array, including RGBW filters, CYGM filters, and so forth.

Figure 3:
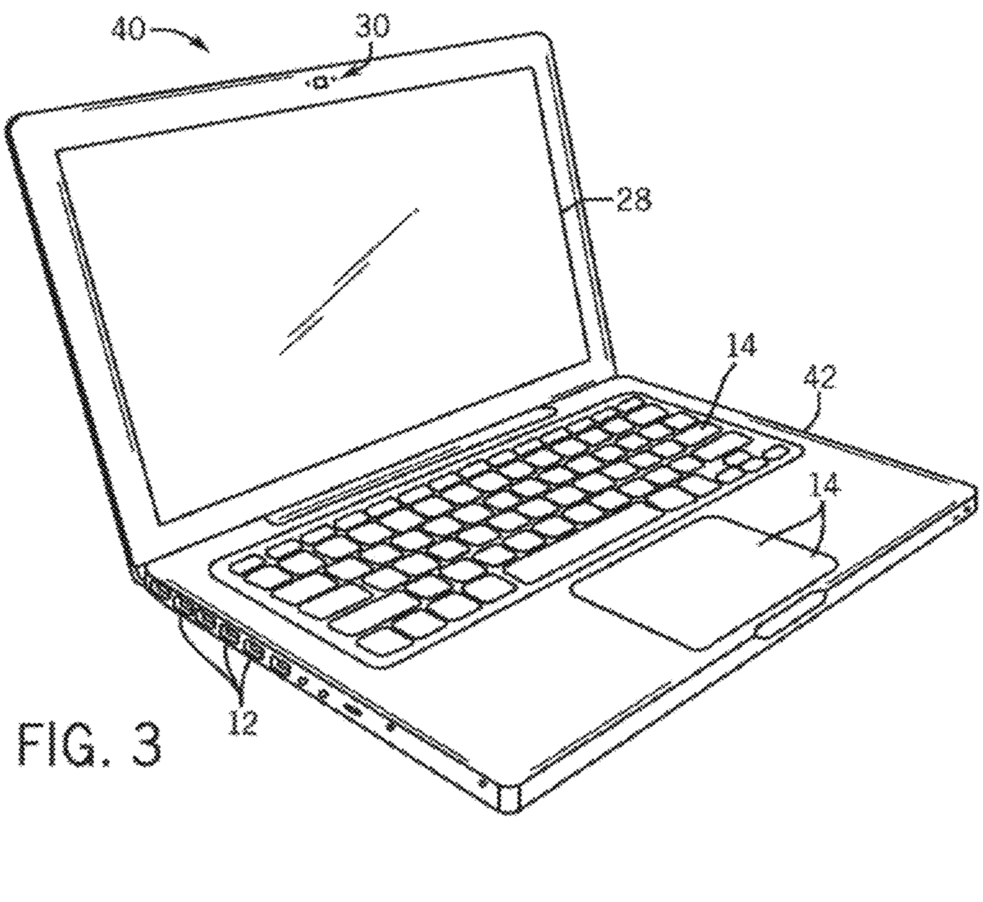
FIG. 3 is a perspective view of the electronic device of FIG. 1 in the form of a notebook computing device, in accordance with an embodiment.

Regardless of the particular filter employed by the sensor of the imaging device(s) 30, the electronic device 10 may take any number of suitable forms. Some examples of these possible forms appear in FIGS. 3-6. Turning to FIG. 3, a notebook computer 40 may include a housing 42, the display 28, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 26), memory (e.g., memory 20), and storage capabilities (e.g., storage device 22), as described above with respect to FIG. 1.

The notebook computer 40 may include an integrated imaging device 30 (e.g., a camera). In other embodiments, the notebook computer 40 may use an external camera (e.g., an external USB camera or a "webcam") connected to one or more of the I/O ports 12 instead of or in addition to the integrated imaging device 30. For instance, an external camera may be an iSight® camera available from Apple Inc. Images captured by the imaging device 30 may be viewed by a user using an image viewing application, or may be used by other applications, including video-conferencing applications, such as iChat®, and image editing/viewing applications, such as Photo Booth®, Aperture®, iPhoto®, or Preview®, which are available from Apple Inc. In certain embodiments, the depicted notebook computer 40 may be a model of a MacBook®, MacBook® Pro, MacBook Air®, or PowerBook® available from Apple Inc. In other embodiments, the computer 40 may be portable tablet computing device, such as a model of an iPad® from Apple Inc.

Figure 4:
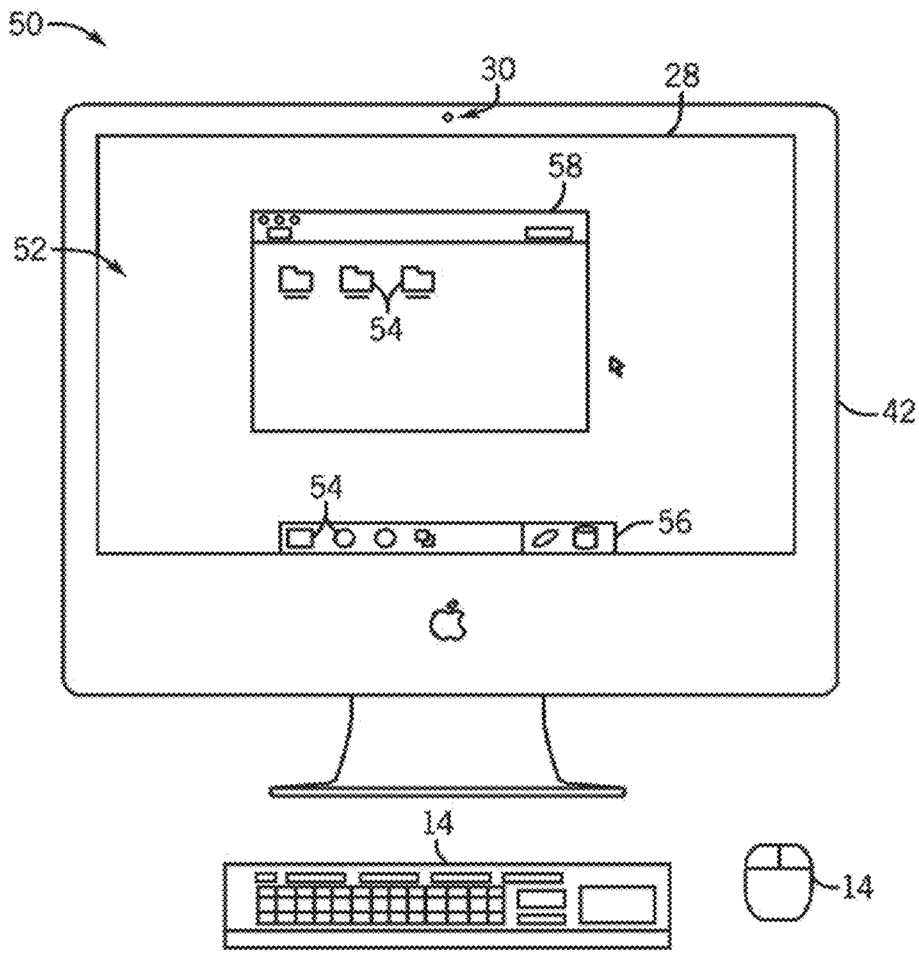
FIG. 4 is a front view of the electronic device of FIG. 1 in the form of a desktop computing device, in accordance with an embodiment.

FIG. 4 shows the electronic device 10 in the form of a desktop computer 50. The desktop computer 50 may include a number of features that may be generally similar to those provided by the notebook computer 40 shown in FIG. 4, but may have a generally larger overall form factor. As shown, the desktop computer 50 may be housed in an enclosure 42 that includes the display 28, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 30, which may be an integrated or external camera, as discussed above. In certain embodiments, the depicted desktop computer 50 may be a model of an iMac®, Mac® mini, or Mac Pro®, available from Apple Inc.

Figure 5:
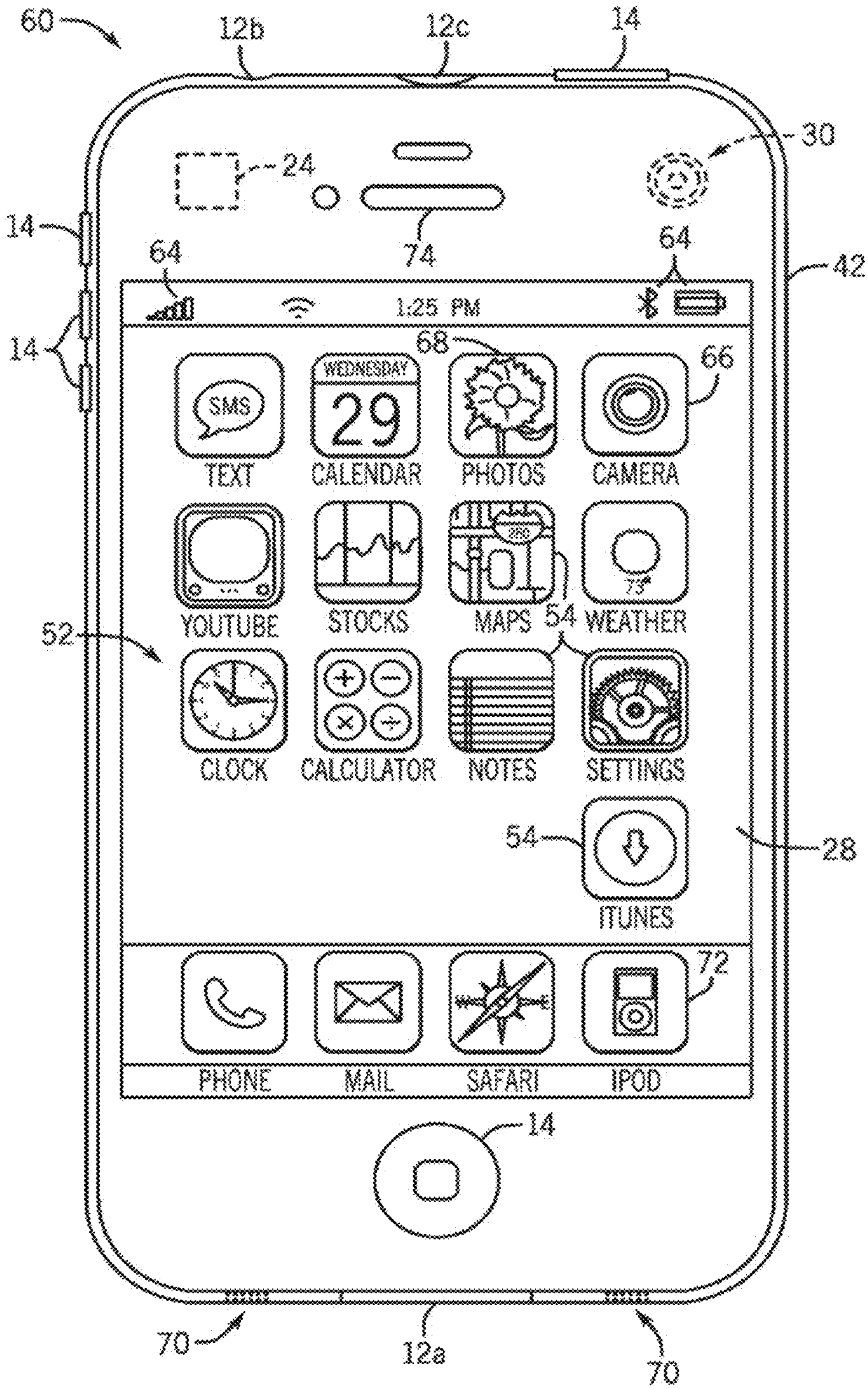
FIG. 5 is a front view of the electronic device of FIG. 1 in the form of a handheld portable electronic device, in accordance with an embodiment.
Figure 6:
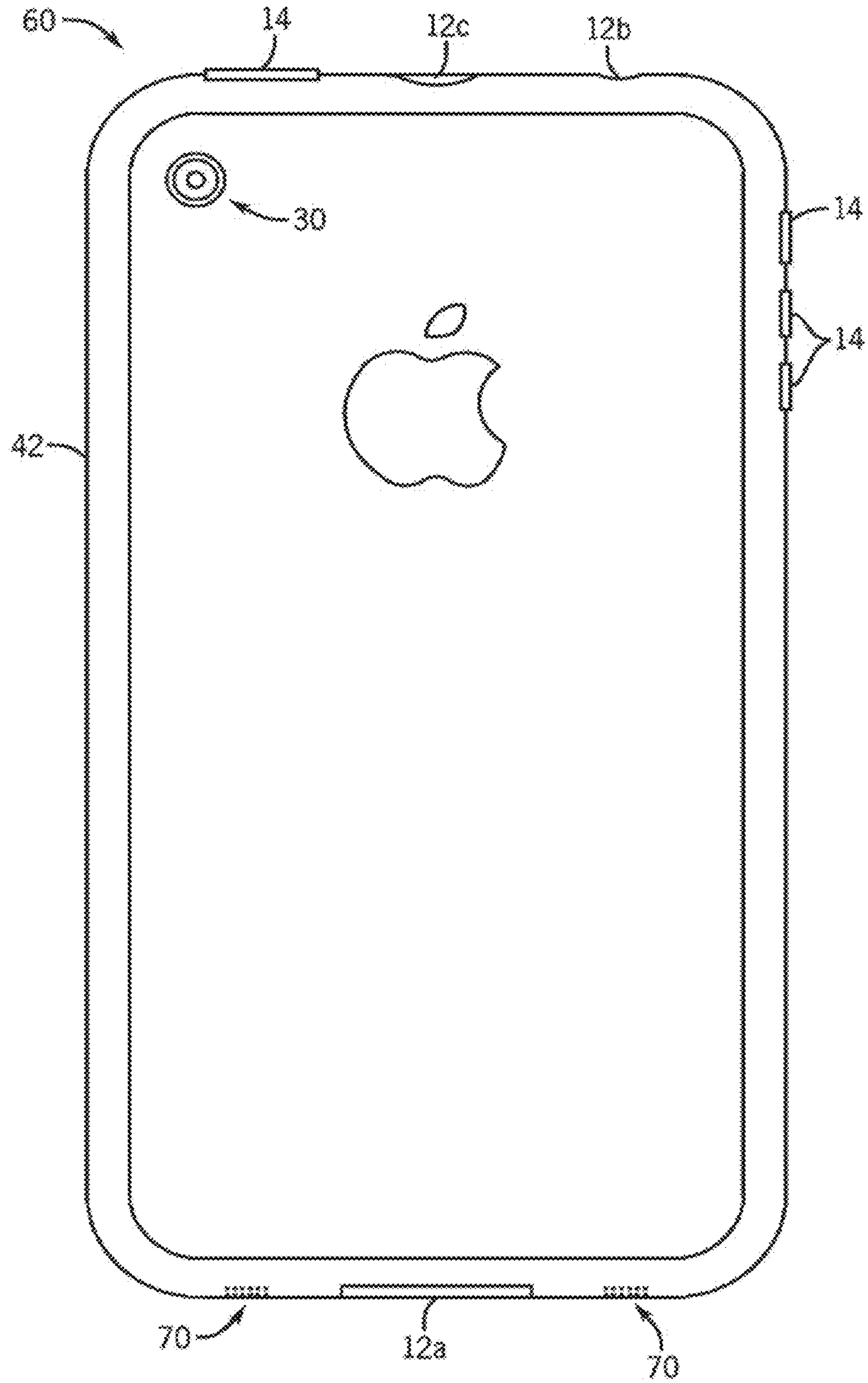
FIG. 6 is a back view of the electronic device shown in FIG. 5.

The electronic device 10 may also take the form of portable handheld device 60, as shown in FIGS. 5 and 6. By way of example, the handheld device 60 may be a model of an iPod® or iPhone® available from Apple Inc. The handheld device 60 includes an enclosure 42, which may function to protect the interior components from physical damage and to shield them from electromagnetic interference. The enclosure 42 also includes various user input structures 14 through which a user may interface with the handheld device 60. Each input structure 14 may control various device functions when pressed or actuated. As shown in FIG. 5, the handheld device 60 may also include various I/O ports 12. For instance, the depicted I/O ports 12 may include a proprietary connection port 12*a* for transmitting and receiving data files or for charging a power source 26 and an audio connection port 12*b* for connecting the device 60 to an audio output device (e.g., headphones or speakers). Further, in embodiments where the handheld device 60 provides mobile phone functionality, the device 60 may include an I/O port 12*c* for receiving a subscriber identify module (SIM) card.

The display device 28 may display images generated by the handheld device 60. For example, the display 28 may display system indicators 64 that may indicate device power status, signal strength, external device connections, and so forth. The display 28 may also display a GUI 52 that allows a user to interact with the device 60, as discussed above with reference to FIG. 4. The GUI 52 may include graphical elements, such as the icons 54 which may correspond to various applications that may be opened or executed upon detecting a user selection of a respective icon 54. By way of example, one of the icons 54 may represent a camera application 66 that may allow a user to operate an imaging device 30 (shown in phantom lines in FIG. 5). Referring briefly to FIG. 6, a rear view of the handheld electronic device 60 depicted in FIG. 5 is illustrated, which shows the imaging device 30 integrated with the housing 42 and positioned on the rear of the handheld device 60.

As mentioned above, image data acquired using the imaging device 30 or elsewhere may be processed using the image processing circuitry 32, which may include hardware (e.g., disposed within the enclosure 42) and/or software stored on one or more storage devices (e.g., memory 18 or nonvolatile storage 20) of the device 60. Images acquired using the camera application 66 and the imaging device 30 may be stored on the device 60 (e.g., in the nonvolatile storage 20) and may be viewed at a later time using a photo viewing application 68.

The handheld device 60 may also include various audio input and output elements. For example, the audio input/output elements, depicted generally by reference numeral 70, may include an input receiver, such as one or more microphones. The audio input/output elements 70 may include one or more output transmitters. Such output transmitters may include one or more speakers that may output sound from a media player application 72. In some embodiments (e.g., those in which the handheld device 60 includes a cell phone application), an additional audio output transmitter 74 may be provided, as shown in FIG. 5. Like the output transmitters of the audio input/output elements 70, the output transmitter 74 may also include one or more speakers to transmit audio signals to a user, such as voice data received during a telephone call.

Having provided some context with regard to possible forms that the electronic device 10 may take, the present discussion will now focus on the image processing circuitry 32 shown in FIG. 1. As mentioned above, the image processing circuitry 32 may be implemented using hardware and/or software components, and may include various processing units that define an image signal processing (ISP) pipeline. First, a general discussion of the operation of the various functional components of image processing circuitry 32 will be provided with reference to FIG. 7. More specific description of the components of the image processing circuitry 32 will be further provided below.

Figure 7:
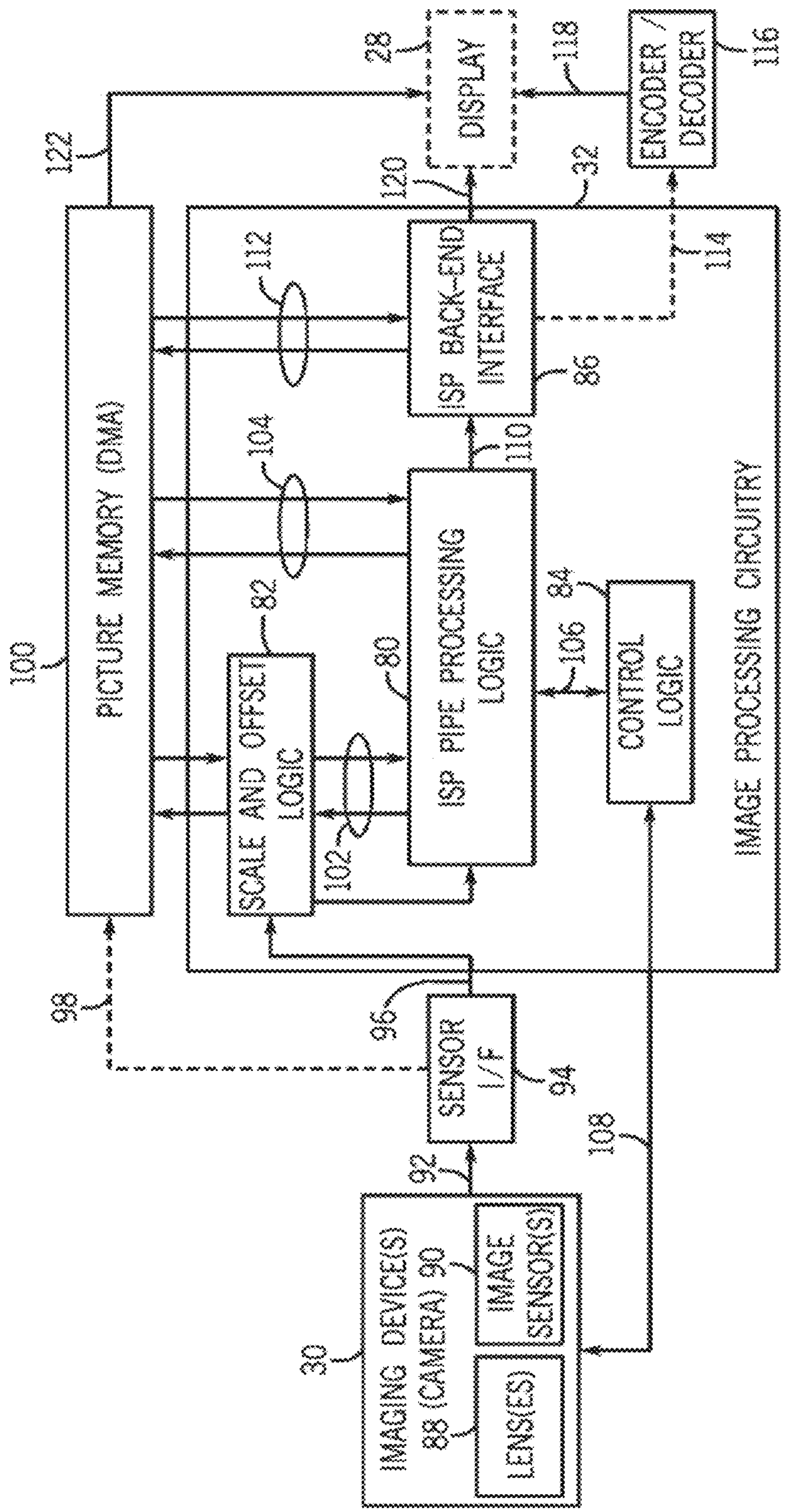
FIG. 7 is a block diagram of the image processing circuitry and imaging device(s) of FIG. 1, in accordance with an embodiment.

Referring to FIG. 7, the image processing circuitry 32 may include image signal processing (ISP) pipe logic 80, pixel scale and offset logic 82, control logic 84, and a back-end interface 86. To avoid processing image data from the imaging device 30 through some form of front-end image processing before processing the image data in the ISP pipe processing logic 80, the ISP pipe processing logic 80 may include image processing logic that may obtain image statistics in parallel with other image processing logic that may process image data to obtain a final processed image. The image statistics may be used to determine one or more control parameters for the ISP pipe logic 82 and/or the imaging device 30, as well as suitable software that may perform subsequent image processing on the image data.

The ISP pipe processing logic 80 may capture image data from an image sensor input signal. For instance, as shown in FIG. 7, the imaging device 30 may include lens(es) 88 and corresponding image sensor(s) 90. The image sensor(s) 90 may include a color filter array (e.g., a Bayer filter, such as that shown in FIG. 2) to capture both light intensity and wavelength information. This raw image data from the image sensor(s) 90 may be output 92 to a sensor interface 94. The sensor interface 94 may provide the raw image data 96 to the ISP pipe processing logic 80 via the scale and offset logic 82. By way of example, the sensor interface 94 may use a Standard Mobile Imaging Architecture (SMIA) interface or other serial or parallel camera interfaces, or some combination thereof. In certain embodiments, the ISP pipe processing logic 80 may operate within its own clock domain and may provide an asynchronous interface to the sensor interface 94 to support image sensors of different sizes and timing requirements. The sensor interface 94 may include, in some embodiments, a sub-interface on the sensor side (e.g., sensor-side interface) and a sub-interface on the ISP pipe processing logic 80 side, with the sub-interfaces forming the sensor interface 94. The sensor interface 94 may also provide the raw image data (shown as numeral 98) directly to picture memory 100, which may represent part of the memory 18 accessible via direct memory access (DMA).

The raw image data 96 may take any of a number of formats. For instance, each image pixel may have a bit-depth of 8, 10, 12, 14, or 16 bits. Various examples of memory formats showing how pixel data may be stored and addressed in memory are discussed in further detail below. The scale and offset logic 82 may convert the raw image data 96 from the sensor interface 94 into a signed, rather than unsigned, value. Processing the raw image data 96 in a signed format, rather than merely clipping the raw image data 96 to an unsigned format, may preserve image information that would otherwise be lost. To provide a brief example, noise on the image sensor(s) 90 may occur in a positive or negative direction. In other words, some pixels that should represent a particular light intensity may have values of a particular value, others may have noise resulting in values greater than the particular value, and still others may have noise resulting in values less than the particular value. When an area of the image sensor(s) 90 captures little or no light, sensor noise may increase or decrease individual pixel values such that the average pixel value is about zero. If only noise occurring in a negative direction is discarded, however, the average black color could rise above zero and would produce grayish-tinged black areas. Since the ISP pipe processing logic 80 may use signed image data, rather than merely clipping the negative noise away, the ISP pipe processing logic 80 may more accurately render dark black areas in images.

The ISP pipe processing logic 80 may process the raw image data 96 on a pixel-by-pixel basis. The ISP pipe processing logic 80 may perform one or more image processing operations on the raw image data 96 and collect statistics about the image data 96. The ISP pipe processing logic 80 may perform image processing using signed 17-bit data, and may collect statistics in 16-bit or 8-bit precision. In some embodiments, the ISP pipe processing logic 80 may collect statistics at a precision of 8-bits, raw pixel at a higher bit-depth may be down-sampled first to an 8-bit format. As may be appreciated, down-sampling to 8-bits may reduce hardware size (e.g., area) and also reduce processing resources (e.g., power). Collecting statistics in 16-bit precision, however, may produce image statistics both more accurate and more precise.

The ISP pipe processing logic 80 may also receive pixel data from the memory 100. As mentioned above and shown by reference numeral 98, the sensor interface 94 may send raw pixel data from the sensor(s) 90 to the memory 100. The raw pixel data stored in the memory 100 may be provided to the ISP pipe processing logic 80 for processing at another time. When the raw pixel data is provided via the memory 100, the scale and offset logic 82 may convert the raw pixel data to signed 17-bit pixel data 102. Upon receiving the raw image data from the sensor interface 94 or the memory 100, the ISP pipe processing logic 80 may perform various image processing operations, which will be discussed in greater detail below. In addition, the ISP pipe processing logic 80 may transfer signed 17-bit pixel data 102 in various stages of processing back to the memory 100 via the scale and offset logic 82. The ISP pipe processing logic 80 may also transfer and receive certain unsigned image data 104 (e.g., processed image data) to and from the memory 100, as will be discussed further below.

Moreover, throughout image processing, the control logic 84 may control various operations of image processing circuitry 32 (e.g., shifting pixel data into and out of the ISP pipe processing logic 80) via control signals 106. The control logic 84 may also control the operation of the imaging device(s) 30 (e.g., integration time to avoid flicker caused by certain types of interior lighting) via control signals 108. The control logic 84 may rely on statistical data determined by the ISP pipe processing logic 80. Such statistical data may include, for example, image sensor statistics relating to auto-exposure, auto-white balance, auto-focus, flicker detection, black level compensation (BLC), lens shading correction, and so forth. The control logic 84 may include a processor and/or microcontroller configured to execute one or more routines (e.g., firmware) that may determine, based upon the statistical data 102, the control signals 106 and 108. By way of example, the control signals 106 may include gain levels and color correction matrix (CCM) coefficients for auto-white balance and color adjustment (e.g., during RGB processing), as well as lens shading correction parameters which, as discussed below, may be determined based upon white point balance parameters. The control signals 108 may include sensor control parameters (e.g., gains, integration time for exposure control), camera flash control parameters, lens control parameters (e.g., focal length for focusing or zoom), or a combination of such parameters. In some embodiments, the control logic 84 may also analyze historical statistics, which may be stored on the electronic device 10 (e.g., in memory 18 or storage 20).

The ISP pipe processing logic 80 may output processed image data to the memory 100 (e.g., numeral 104) or to the ISP back-end interface 86 (e.g., numeral 110). The ISP back-end interface 86 may alternatively receive image data from the memory 100. In either case, the ISP back-end logic 86 may pass image data to other blocks for post-processing operations. For example, the ISP back-end interface 86 may pass the image data to other logic to detect certain features, such as faces, in the image data. Facial detection data may be fed to statistics processing components of the ISP pipe processing logic 80 as feedback data for auto-white balance, auto-focus, flicker, and auto-exposure statistics, as well as other suitable logic that may benefit from facial detection logic.

In further embodiments, the feature detection logic may also be configured to detect the locations of corners of objects in the image frame. This data may be used to identify the location of features in consecutive image frames in order to determine an estimation of global motion between frames, which may be used to perform certain image processing operations, such as image registration. In one embodiment, the identification of corner features and the like may be particularly useful for algorithms that combine multiple image frames, such as in certain high dynamic range (HDR) imaging algorithms, as well as certain panoramic stitching algorithms.

The ISP back-end interface 86 may output post-processed image data (e.g., numeral 114) to an encoder/decoder 116 to encode the image data. The encoded image data may be stored and then later decoded (e.g., numeral 118) to be displayed on the display 28. By way of example, the compression engine or "encoder" 116 may be a JPEG compression engine for encoding still images, an H.264 compression engine for encoding video images, or any other suitable compression engine, as well as a corresponding decompression engine to decode encoded image data. Additionally or alternatively, the ISP back-end interface 86 may output the post-processed image data (e.g., numeral 120) to the display 28. Additionally or alternatively, output from the ISP pipe processing logic 80 or the ISP back-end interface 86 may be stored in memory 100. The display 28 may read the image data from the memory 100 (e.g., numeral 122).

Overview of the ISP Pine Processing Logic

A general organization of the ISP pipe processing logic 80 appears in FIG. 8. It should be appreciated that the ISP pipe processing logic 80 may receive image data from one of several different direct memory access (DMA) sources (illustrated as S0-S7) to one of several different DMA destinations (illustrated as D0-D7). A specific discussion about the relationship between each DMA source S0-S7 and destination D0-D7 will appear further below.

As shown in FIG. 8, two sensors 90*a* and 90*b* may provide raw image data through respective sensor interfaces 94*a* (also referred to as Sif0, Sens0, or S0) and 94*b* (also referred to as Sif1, Sens1, or S1) to input queues 130*a* and 130*b*. The sensor interfaces 94*a* and 94*b* represent two sources of pixel data that may be supplied to the ISP pipe processing logic 80. Specifically, the sensor interface 94*a* may be referred to as a source S0 and the sensor interface 94*b* may be referred to as a source S1. Raw image data from the sensor interface 94*a* (S0) or the sensor interface 94*b* (S1) may be stored in the memory 100 (destinations D0 or D1, respectively) or provided directly to the components of the ISP pipe processing logic 80. It should be appreciated that raw image data stored in the memory 100 may be provided to the components of the ISP pipe processing logic 80 at a later time.

Thus, raw image data from the sensor interfaces 94*a* (S0) or 94*b* (S1) or from the memory 100 (e.g., via DMA sources S2 or S3) may be transferred to a statistics logic 140*a* (referred to as a DMA destination D2) or a statistics logic 140*b* (referred to as a DMA destination D3). The statistics logic 140*a* and 140*b* may determine sets of statistics that may relate to auto-exposure, auto-white balance, auto-focus, flicker detection, black level compensation, lens shading correction, local tone mapping and highlight recovery, fixed pattern noise reduction, and so forth. In certain embodiments, when only one of the sensors 90*a* or 90*b* is actively acquiring images, the image data may be sent to both the statistics logic 140*a* and the statistics logic 140*b* if additional statistics are required. To provide one brief example, if both the statistics logic 140*a* and the statistics logic 140*b* are available, the statistics logic 140*a* may be used to collect statistics for one color space (e.g., RGB), and the statistics logic 140*b* may be used to collect statistics for another color space (e.g., YCbCr). Thus, if desired, the statistics logic 140*a* and 140*b* may operate in parallel to collect multiple sets of statistics for each frame of image data acquired by inactive sensor 90*a* or 90*b*.

In the example of FIG. 8, the two statistics logic 140*a* and 140*b* are essentially identical. As used herein, the statistics logic 140*a* may be referred to as StatsPipe0 or DMA destination D2 and the statistics logic 140*b* may be referred to as StastPipe1 or DMA destination D3. Each may receive image data from one of several sources (S0-S3), as conceptually illustrated by respective selection logic 142*a* and 142*b*. The statistics logic 140*a* and 140*b* also include respective image processing logic 144*a* and 144*b* to process pixel data before reaching a statistics core 146*a* or 146*b*. The statistics core 146*a* or 146*b* may collect image statistics using the image data processed through the image processing logic 144*a* or 144*b* and/or using raw image data that has not been processed by the image processing logic 144*a* or 144*b*.

The ISP pipe processing logic 80 may also include several image processing blocks, some of which may operate in parallel with the statistics logic 140*a* and 140*b*. For example, a raw block 150 (also referred to as RAWProc or DMA destination D4) also may receive one of several possible raw image data signals via selection logic 152 and may process the raw image data using raw image processing logic 154. The raw image processing logic 154 may perform several raw image data processing operations, including sensor linearization (SLIN), black level compensation (BLC), fixed pattern noise reduction (FPNR), temporal filtering (TF), defective pixel correction (DPC), collection of additional noise statistics (NS), spatial noise filtering (SNF), lens shading correction (LSC), white balance gain (WBG), highlight recovery (HR), and/or raw scaling (RSCL).

The output of the raw block 150 may be stored in the memory 100 or continue to an RGB-format processing block 160 (also referred to as RgbProc or DMA destination D5). The RGB block 160 may receive one of two image data signals via selection logic 162, which may be processed by RGB image processing logic 164. The RGB image processing logic 164 may perform several image data processing operations, including demosaicing (DEM) to obtain RGB-format image data from raw image data. Having obtained RGB-format image data, the RGB image processing logic 164 may perform local tone mapping (LTM); color correction using a color correction matrix (CCM); color correction using a three-dimensional color lookup table (CLUT); gamma/degamma (GAM); gain, offset, and clipping (GOC); and/or color space conversion (CSC), producing image data in a YCC format (e.g., YCbCr or YUV).

The output of the RGB block 160 may be stored in the memory 100 or may continue to be processed by a YCC-format image processing block 170 (also referred to as YCCProc or DMA destination D6). The YCC block 170 may receive one of two possible signals via selection logic 172. The YCC block 170 may perform certain YCC-format image processing using YCC image processing logic 174. The YCC image processing logic 174 may perform, for example, color space conversion (CSC); Y sharpening and/or chroma suppression (YSH); dynamic range compression (DRC); brightness, contrast, and color adjustment (BCC); gamma/degamma (GAM); horizontal decimation (HDEC); YCC scaling and/or geometric distortion correction (SCL); and/or chroma noise reduction (CNR). The output of the YCC block 170 may be stored in the memory 100 (e.g., in separate luminance (Y) and chrominance (C) channels), or may continue to a backend interface block 180 (also referred to as BEIF or DMA destination D7).

The backend interface block 180 may alternatively receive image data from the memory 100 (conceptually illustrated by a selection logic 182), supplying the image data to a backend interface (BEIF) 184. The ISP pipe processing logic 80 can forward the processed pixel data stream to additional processing logic through the backend interface (BEIF) 184. The backend interface (BEIF) may be a YCbCr4:2:2 10-bit-per-component interface, where Cb and Cr data are interleaved every other luma (Y) sample. The total width of the interface thus may be 20 bits with chroma stored in bits 0-9 and luma stored in bits 10-19 (e.g., Y0Cb0, Y1Cr1, Y2Cb2, Y3Cr3, and so forth). Each pixel sample also may have an associated data valid signal.

As can be seen in FIG. 8, eight asynchronous DMA sources of data (S0-S7) may provide image data to components of the ISP type processing logic 80 to eight DMA destinations (D0-D7). Namely, the sources may include: (S0), a direct input from the sensor interface 94*a*; (S1), a direct input from the sensor interface 94*b*; (S2), Sensor0 90*a* data input or other raw image data from the memory 100; (S3), Sensor1 data input or other raw image data from the memory 100; (S4), raw image data retrieved from the memory 100 (also referred to as RawProcInDMA); (S5), raw image data or RGB-format image data retrieved from the memory 100 (also referred to as RgbProcInDMA); (S6), RGB-format image data retrieved from the memory 100 (also referred to as YccProcInDMA); and (S7), YCC-format image data retrieved from the memory 100 (also referred to as BEIFDMA). The destinations may include: (D0), a DMA destination to the memory 100 for image data obtained by Sensor0 90*a* (also referred to as Sif0DMA); (D1), a DMA destination in the memory 100 for image data obtained by Sensor1 90*b* (also referred to as Sif1DMA); (D2), the first statistics logic 140*a* (also referred to as StatsPipe0); (D3), the second statistics logic 140*b* (also referred to as StatsPipe1); (D4), a DMA destination to the raw block 150 (also referred to as RAWProc); (D5), the RGB block 160 (also referred to as RgbProc); (D6), the YCC block 170 (also referred to as YCCProc); and (D7), the back-end interface block 180 (also referred to as BEIF). Only certain DMA destinations may be valid for a particular source, as generally shown in Table 1 below:

TABLE 1

Example of ISP pipe processing logic 80 valid destinations D0-D7 for each source S0-S7

| | Sif0DMA (D0) | Sif1DMA (D1) | StatsPipe0 (D2) | StatsPipe1 (D3) | RAWProc (D4) | RgbProc (D5) | YCCProc (D6) | BEIF (D7) |
|---|---|---|---|---|---|---|---|---|
| Sens0 (S0) | X | | X | X | X | X | X | X |
| Sens1 (S1) | | X | X | X | X | X | X | X |
| Sens0DMA (S2) | | | X | X | X | X | X | X |
| Sens1DMA (S3) | | | X | X | X | X | X | X |
| RawProcinDMA (S4) | | | | | X | X | X | X |
| RgbProcinDMA (S5) | | | | | | X | X | X |
| YccProcinDMA (S6) | | | | | | | X | X |
| BEIFDMA (S7) | | | | | | | | X |

Thus, for example, image data from Sensor0 90*a* (S0) may be transferred to destination D0 in the memory 100 (but not destination D1), to the first statistics logic 140*a* (D2) or the second statistics logic 140*b* (D3), or to the raw block 150 (D4). By extension, through the raw block 150, the image data from Sensor0 90*a* (S0) may be provided to the RGB block 160 (D5), the YCC block 170 (D6), or the backend interface block 180 (D7). Similarly, as shown in Table 1, sources S2 and S3 may provide image data to destinations D2, D3, D4, D5, D6, or D7, but not D0 or D1.

The scale and offset logic 82 also appears in FIG. 8. The scale and offset logic 82 may represent any suitable functions to programmably scale and/or offset input pixel data from an unsigned format to a signed format. In particular, in some embodiments, the scale and offset logic 82 represents functions implemented in DMA input and output channels to convert pixel data. Thus, it should be appreciated that the scale and offset logic may or may not convert image data, depending on the input pixel format and/or the format of the image data processed by the individual processing blocks. The operation of the scale and offset logic 82 is described in greater detail below with reference to FIGS. 40-43 below.

It should also be noted that the presently illustrated embodiment may allow the ISP pipe processing logic 80 to retain a certain number of previous frames (e.g., 5 frames)

in memory. For example, due to a delay or lag between the time a user initiates a capture event (e.g., transitioning the image system from a preview mode to a capture or a recording mode, or even by just turning on or initializing the image sensor) using the image sensor to when an image scene is captured, not every frame that the user intended to capture may be captured and processed in substantially real-time. Thus, by retaining a certain number of previous frames in memory 100 (e.g., from a preview phase), these previous frames may be processed later or alongside the frames actually captured in response to the capture event, thus compensating for any such lag and providing a more complete set of image data.

A control unit 190 may control the operation of the ISP pipe processing logic 80. The control unit 190 may initialize and program control registers 192 (also referred to as "go registers") to facilitate processing an image frame and to select appropriate register bank(s) to update double-buffered data registers. In some embodiments, the control unit 190 may also provide memory latency and quality of service (QOS) information. Further, the control unit 190 may also control dynamic clock gating, which may be used to disable clocks to one or more portions of the ISP pipe processing logic 80 when there is not enough data in the input queue 130 from an active sensor.

General Principles of Operation

Using the "go registers" mentioned above, the control unit 190 may control the manner in which various parameters for each of the processing units are updated. Generally, image processing in the ISP pipe processing logic 80 may operate on a frame-by-frame basis. As discussed above with reference to Table 1, the input to the processing units may be from the sensor interface (S0 or S1) or from memory 100 (e.g., S2-S7). Further, the processing units may employ various parameters and configuration data, which may be stored in corresponding data registers. In one embodiment, the data registers associated with each processing unit or destination may be grouped into blocks forming a register bank group. In the example of FIG. 8, several register bank groups may have block address space, certain of which may be duplicated to provide two banks of registers. Only the registers that are double buffered are instantiated in the second bank. If a register is not double buffered, the address in the second bank may be mapped to the address of the same register in the first bank.

For registers that are double buffered, registers from one bank are active and used by the processing units while the registers from the other bank are shadowed. The shadowed register may be updated by the control unit 190 during the current frame interval while hardware is using the active registers. The determination of which bank to use for a particular processing unit at a particular frame may be specified by a "NextDestBk" (next bank) field in a go register corresponding to the source providing the image data to the processing unit. Essentially, NextDestBk is a field that allows the control unit 190 to control which register bank becomes active on a triggering event for the subsequent frame.

Figure 9:
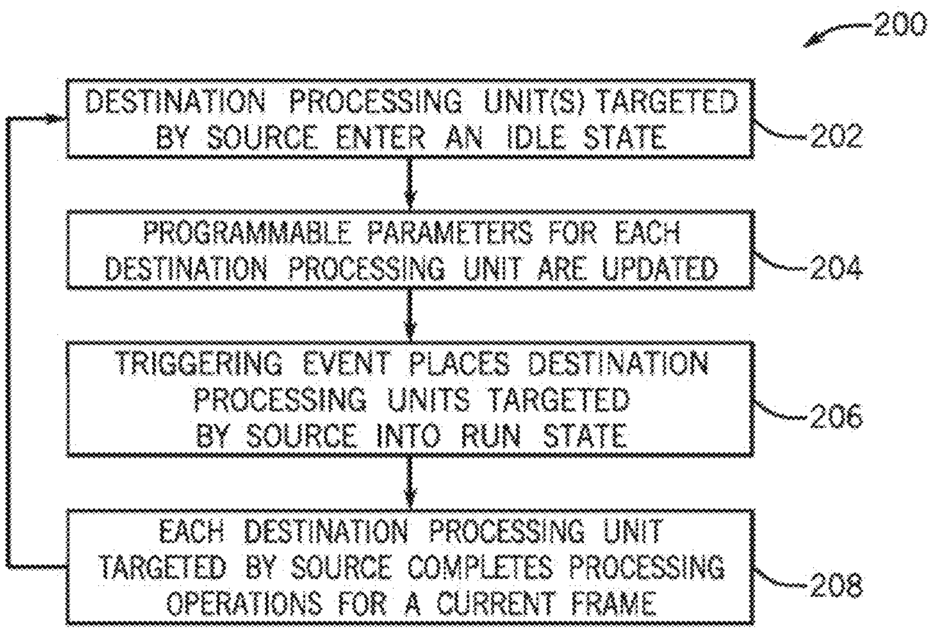
FIG. 9 is flowchart depicting a method for processing image data in the ISP pipe processing logic 80 logic of FIG. 10, in accordance with an embodiment.

Before discussing the operation of the go registers in detail, FIG. 9 provides a general flowchart 200 for processing image data on a frame-by-frame basis in accordance with the present techniques. The flowchart 200 may begin when the destination processing units (e.g., D2-D7) targeted by a data source (e.g., S0-S7) enter an idle state (block 202). This may indicate that processing for the current frame is completed and, therefore, the control unit 190 may prepare for processing the next frame. For instance, programmable parameters for each destination processing unit next may be updated (block 204). This may include, for example, updating the NextDestBk field in the go register corresponding to the source, as well as updating any parameters in the data registers corresponding to the destination units. Thereafter, a triggering event may place the destination units into a run state (block 206). Each destination unit targeted by the source then may complete its processing operations for the current frame (block 208), and the process may flow to block 202 to begin processing the next frame.

Figure 10:
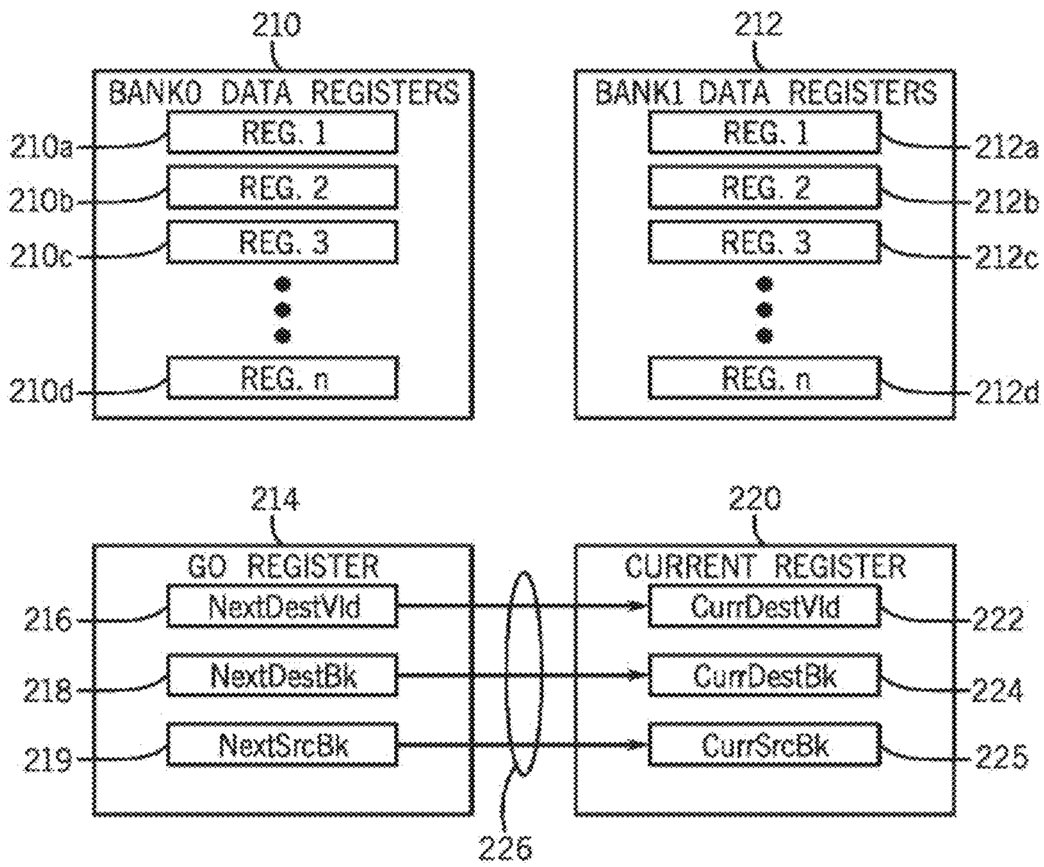
FIG. 10 is block diagram illustrating a configuration of double buffered registers and control registers that may be used for processing image data in the ISP pipe processing logic 80 logic, in accordance with an embodiment.

FIG. 10 depicts a block diagram view showing two banks of data registers 210 and 212 that may be used by the various destination units of the ISP-front end. For instance, Bank 0 (210) may include the data registers 1-n (210*a*-210*d*), and Bank 1 (212) may include the data registers 1-n (212*a*-212*d*). As discussed above, the embodiment shown in FIG. 10 may use a register bank (Bank 0) having any suitable number of register bank groups. Thus, in such embodiments, the register block address space of each register is duplicated to provide a second register bank (Bank 1).

FIG. 10 also illustrates go register 214 that may correspond to one of the sources. As shown, the go register 214 includes a "NextDestVld" field 216, the above-mentioned "NextDestBk" field 218, and a "NextSrcBk" field 219. These fields may be programmed before beginning to process the current frame. Particularly, NextDestVld may indicate the destination(s) to where data from the source is to be sent. As discussed above, NextDestBk may indicate a corresponding data register from either Bank0 or Bank1 for each destination targeted, as indicated by NextDestVld. NextSrcBk may indicate the source bank from which to obtain data (Bank0 or Bank1). Though not shown in FIG. 10, the go register 214 may also include an arming bit, referred to herein as a "go bit," which may be set to arm the go register. When a triggering event 226 for a current frame is detected, NextDestVld, NextDestBk, and NextSrcBk may be copied into a "CurrDestVld" field 222, a "CurrDestBk" field 224, and a "CurrSrcBk" field 225 of a corresponding current or "active" register 220. In one embodiment, the current register(s) 220 may be read-only registers that may set by hardware, while remaining inaccessible to software commands within the ISP pipe processing logic 80.

As may be appreciated, for each DMA source S0-S7, a corresponding go register may be provided. The control unit 190 may use the go registers to control the sequencing of frame processing within the ISP pipe processing logic 80. Each source may be configured to operate asynchronously and can send data to any of its valid destinations. Further, it should be understood that for each destination, generally only one source may be active during a current frame.

With regard to the arming and triggering of the go register 214, asserting an arming bit or "go bit" in the go register 214 arms the corresponding source with the associated NextDestVld and NextDestBk fields. For triggering, various modes are available depending on whether the source input data is read from the memory 100 (e.g., S2-S7) or whether the source input data is from a sensor interface 94 (e.g., S0 or S1). For instance, if the input is from the memory 100, the arming of the go bit itself may serve as the triggering event, since the control unit 190 has control over when data is read from the memory 100. If the image frames are being input by the sensor interface 94, the triggering event may depend on the timing at which the corresponding go register is armed relative to when data from the sensor interface 94 is received. In accordance with the present embodiment, three different techniques for triggering timing from a sensor interface 94 input are shown in FIGS. 11-13.

Figure 11:
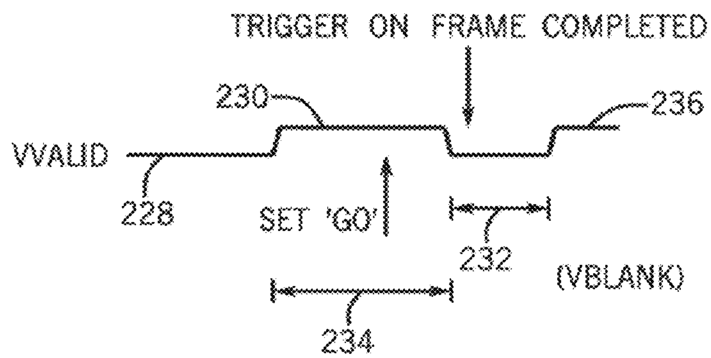
FIGS. 11-13 are timing diagrams depicting different modes for triggering the processing of an image frame, in accordance with an embodiment.

Referring first to FIG. 11, a first scenario is illustrated in which triggering occurs once all destinations targeted by the source transition from a busy or run state to an idle state. Here, a data signal VVALID (228) represents an image data signal from a source. The pulse 230 represents a current frame of image data, the pulse 236 represents the next frame of image data, and the interval 232 represents a vertical blanking interval (VBLANK) 232 (e.g., represents the time differential between the last line of the current frame 230 and the next frame 236). The time differential between the rising edge and falling edge of the pulse 230 represents a frame interval 234. Thus, in FIG. 11, the source may be configured to trigger when all targeted destinations have finished processing operations on the current frame 230 and transition to an idle state. In this scenario, the source is armed (e.g., by setting the arming or "go" bit) before the destinations complete processing so that the source can trigger and initiate processing of the next frame 236 as soon as the targeted destinations go idle. During the vertical blanking interval 232 the processing units may be set up and configured for the next frame 236 using the register banks specified by the go register corresponding to the source before the sensor input data arrives. By way of example, read buffers used by the ISP pipe processing logic 80 may be filled before the next frame 236 arrives. In this case, shadowed registers corresponding to the active register banks may be updated after the triggering event, thus allowing for a full frame interval to setup the double-buffered registers for the next frame (e.g., after frame 236).

Figure 12:
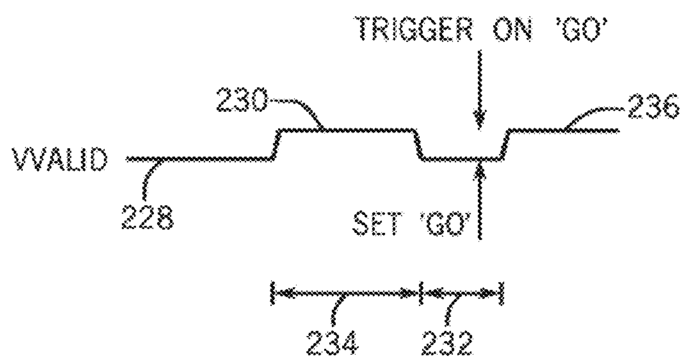

FIG. 12 illustrates a second scenario in which the source is triggered by arming the go bit in the go register corresponding to the source. Under this "trigger-on-go" configuration, the destination units targeted by the source are already idle and the arming of the go bit is the triggering event. This triggering mode may be used for registers that are not double-buffered and, therefore, are updated during vertical blanking (e.g., as opposed to updating a double-buffered shadow register during the frame interval 234).

Figure 13:
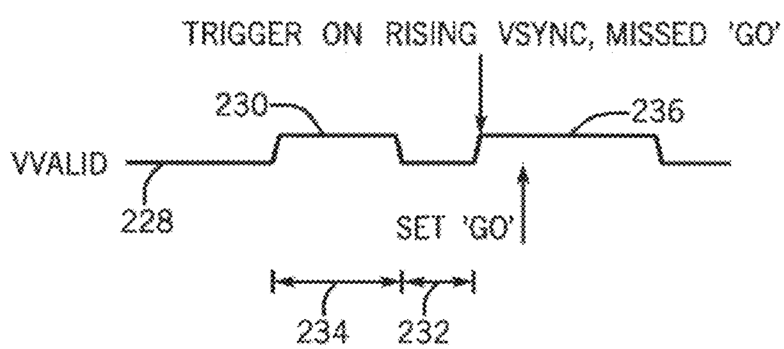

FIG. 13 illustrates a third triggering mode in which the source is triggered upon detecting the start of the next frame, i.e., a rising VSYNC. However, it should be noted that in this mode, if the go register is armed (by setting the go bit) after the next frame 236 has already started processing, the source will use the target destinations and register banks corresponding to the previous frame, since the CurrDestVld and CurrDestBk fields are not updated before the destination start processing. This leaves no vertical blanking interval for setting up the destination processing units and may potentially result in dropped frames, particularly when operating in a dual sensor mode. It should be noted, however, that this mode may nonetheless result in accurate operation if the image processing circuitry 32 is operating in a single sensor mode that uses the same register banks for each frame (e.g., the destination (NextDestVld) and register banks (NextDestBk) do not change).

Figure 14:
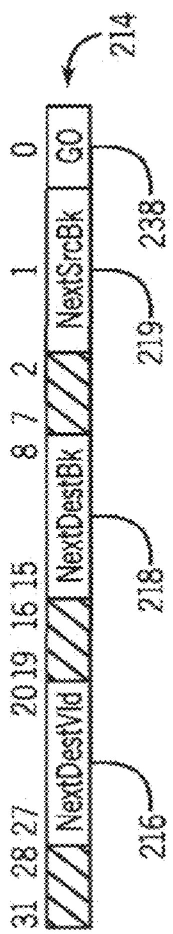
FIGS. 14 and 15 are diagrams depicting control registers in more detail, in accordance with an embodiment.
Figure 15:
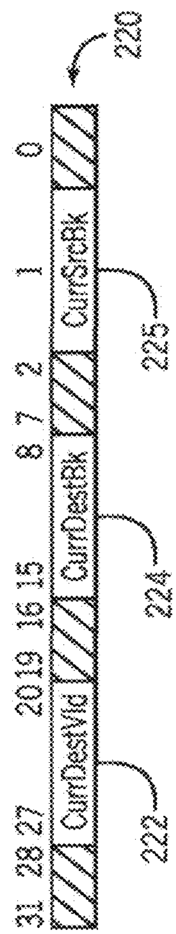
Figure 16:
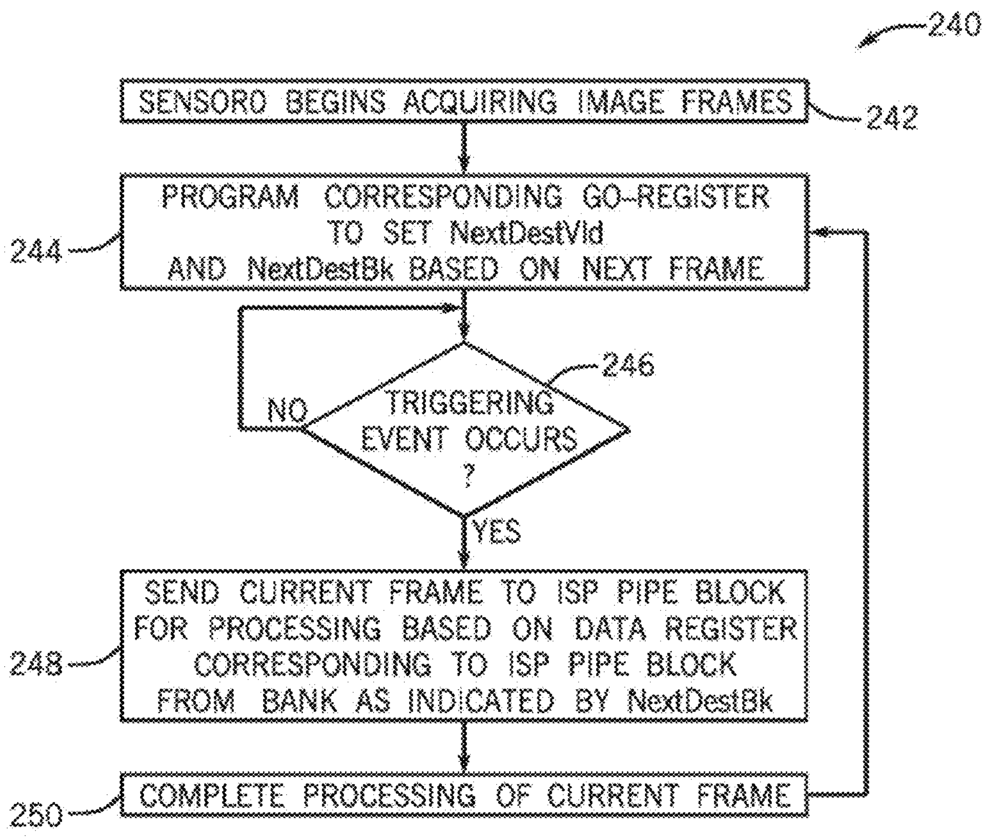
FIG. 16 is a flowchart depicting a method for using a front-end pixel processing unit to process image frames when the ISP pipe processing logic 80 logic of FIG. 10 is operating in a single sensor mode.
Figure 17:
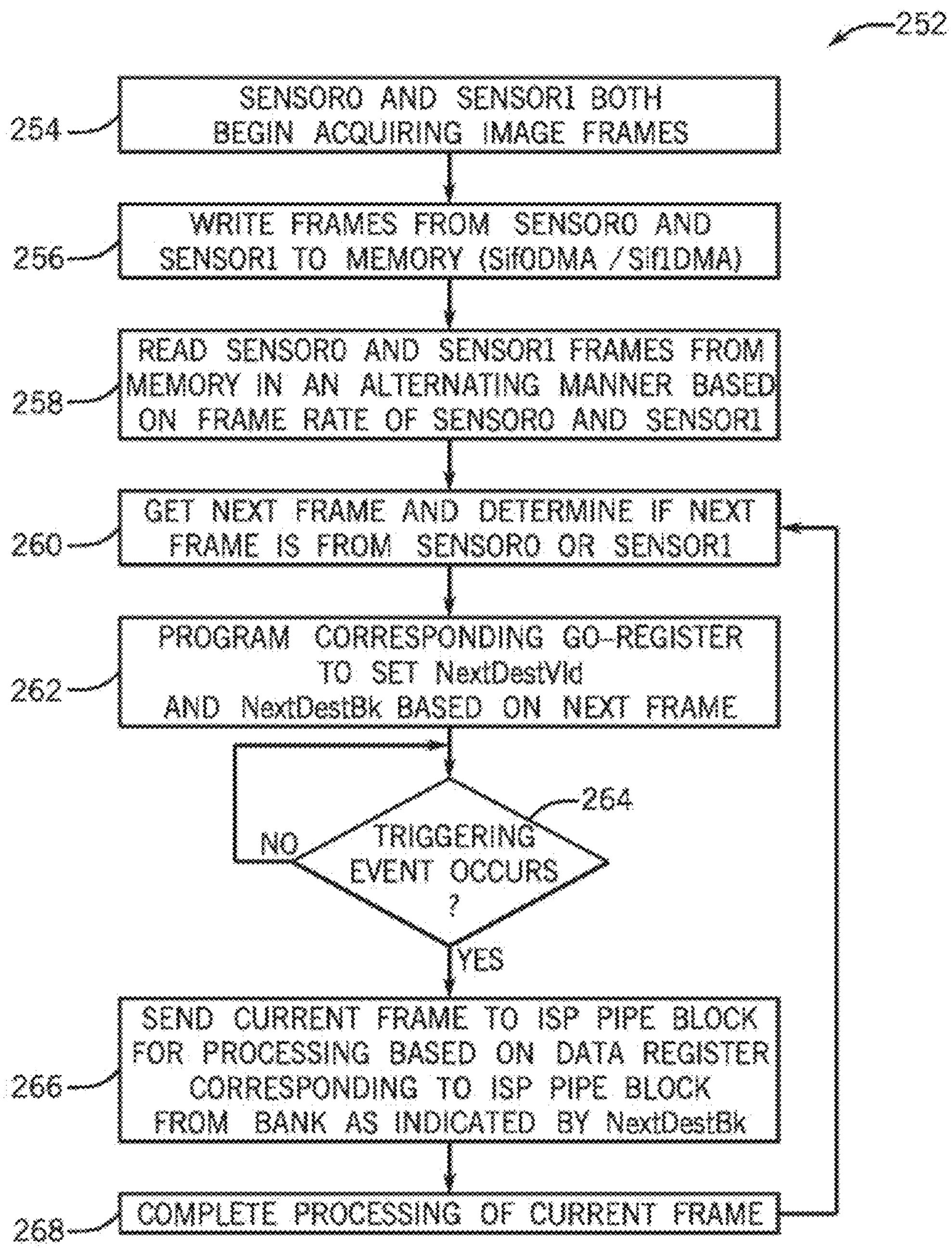
FIG. 17 is a flowchart depicting a method for using a front-end pixel processing unit to process image frames when the ISP pipe processing logic 80 logic of FIG. 10 is operating in a dual sensor mode.

Referring now to FIGS. 14 and 16, control registers 214 (a "go register") and 220 (a "current read-only register") are respectively illustrated in more detail. The go register 214 includes an arming "go" bit 238, as well as the NextDestVld field 216, the NextDestBk field 218, and the NextSrcBk field 219. The current read-only register 220 includes the CurrDestVld field 222, the CurrDestBk field 224, and the CurrSrcBk field 225. It should be appreciated that the current read-only register 220 represents a read-only register that may indicate the current valid destinations and bank numbers.

As discussed above, each source (S0-S7) of the ISP pipe processing logic 80 may have a corresponding go register 214. In one embodiment, the go bit 238 may be a single-bit field. The go register 214 may be armed by setting the go bit 238 to 1, for example. The NextDestVld field 216 may contain a number of bits corresponding to the number of destinations in the ISP pipe processing logic 80. For instance, in the embodiment shown in FIG. 8, the ISP pipe processing logic 80 includes eight destinations D0-D7. Thus, the go register 214 may include eight bits in the NextDestVld field 216, with one bit corresponding to each destination. Targeted destinations in the NextDestVld field 216 may be set to 1. Similarly, the NextDestBk field 216 may contain a number of bits corresponding to the number of data registers in the ISP pipe processing logic 80. For instance, the embodiment of the ISP pipe processing logic 80 shown in FIG. 8 may include eight sources S0-S7. Accordingly, the NextDestBk field 218 may include eight bits, with one bit corresponding to each source register. Source registers corresponding to Bank 0 and 1 may be selected by setting their respective bit values to 0 or 1, respectively. Thus, using the go register 214, the source, upon triggering, knows precisely which destination units are to receive frame data, and which source banks are to be used for configuring the targeted destination units.

Additionally, to support the dual sensor configuration of the illustrated embodiments, the ISP pipe processing logic 80 may operate in a single sensor configuration mode (e.g., only one sensor is acquiring data) and/or a dual sensor configuration mode (e.g., both sensors are acquiring data). In a typical single sensor configuration, input data from a sensor interface 94, such as Sens0 (S0), is sent to StatsPipe0 (D2) (for statistics processing) and RAWProc (D4) (for pixel processing). In addition, sensor frames may also be sent to memory 100 (e.g., D0) for future processing, as discussed above.

An example of how the NextDestVld fields corresponding to each source of the ISP pipe processing logic 80 may be configured when operating in a single sensor mode is depicted below in Table 2.

TABLE 2

NextDestVld per source example: Single sensor mode

| | Sif0DMA (D0) | Sif1DMA (D1) | StatsPipe0 (D2) | StatsPipe1 (D3) | RAWProc (D4) | RgbProc (D5) | YCCProc (D6) | BEIF (D7) |
|---|---|---|---|---|---|---|---|---|
| Sens0 (S0) | 1 | N/A | 1 | 0 | 1 | 1 | 1 | 0 |
| Sens1 (S1) | N/A | 0 | 0 | 0 | 0 | 0 | 0 | 0 |
| Sens0DMA (S2) | N/A | N/A | 0 | N/A | 0 | 0 | 0 | 0 |
| Sens1DMA (S3) | N/A | N/A | N/A | 0 | 0 | 0 | 0 | 0 |

TABLE 2-continued

| NextDestVld per source example: Single sensor mode | | | | | | | | |
|---|---|---|---|---|---|---|---|---|
| | Sif0DMA (D0) | Sif1DMA (D1) | StatsPipe0 (D2) | StatsPipe1 (D3) | RAWProc (D4) | RgbProc (D5) | YCCProc (D6) | BEIF (D7) |
| RawProcinDMA (S4) | N/A | N/A | N/A | N/A | 0 | 0 | 0 | 0 |
| RgbProcinDMA (S5) | N/A | N/A | N/A | N/A | N/A | 0 | 0 | 0 |
| YccProcinDMA (S6) | N/A | N/A | N/A | N/A | N/A | N/A | 0 | 0 |
| BEIFDMA (S7) | N/A | N/A | N/A | N/A | N/A | N/A | N/A | 0 |

As mentioned above with reference to Table 1, the ISP pipe processing logic 80 may be configured such that only certain destinations are valid for a particular source. Thus, the destinations in Table 2 marked with "N/A" or "0" are intended to indicate that the ISP pipe processing logic 80 is not configured to allow a particular source to send frame data to that destination. For such destinations, the bits of the NextDestVld field of the particular source corresponding to that destination may always be 0. It should be understood, however, that this is merely one embodiment and, indeed, in other embodiments, the ISP pipe processing logic 80 may be configured such that each source is capable of targeting each available destination unit.

The configuration shown above in Table 2 represents a single sensor mode in which only Sensor0 90*a* is providing frame data. For instance, the Sens0Go register indicates destinations as being SIf0DMA, StatsPipe0, RAWProc, RgbProc, and YCCProc. Thus, when triggered, each frame of the Sensor0 image data, is sent to these destinations (where data is sent to RgbProc and YCCProc by way of RAWProc). As discussed above, SIf0DMA may store frames in memory 100 for later processing, StatsPipe0 may perform statistics collection, and RAWProc, RgbProc, and YCCProc may process the image data using the statistics from the StatsPipe0. Further, in some configurations where additional statistics are desired (e.g., statistics in different color spaces), StatsPipe1 may also be enabled (corresponding NextDestVld set to 1) during the single sensor mode. In such embodiments, the Sensor0 frame data is sent to both StatsPipe0 and StatsPipe1. Further, as shown in the present embodiment, only a single sensor interface (e.g., Sens0 or alternatively Sen0) is the only active source during the single sensor mode.

With this in mind, FIG. 16 provides a flowchart depicting a method 240 for processing frame data in the ISP pipe processing logic 80 when only a single sensor is active (e.g., Sensor 0). While the method 240 illustrates in particular the processing of Sensor0 frame data by The ISP pipe processing logic 80 as an example, it should be understood that this process may be applied to any other source and corresponding destination unit in the ISP pipe processing logic 80. Beginning at block 242, Sensor0 begins acquiring image data and sending the captured frames to the ISP pipe processing logic 80. The control unit 190 may initialize programming of the go register corresponding to Sens0 (the Sensor0 interface) to determine target destinations (including RAWProc) and what bank registers to use, as shown at block 244. Thereafter, decision logic 246 determines whether a source triggering event has occurred. As discussed above, frame data input from a sensor interface may use different triggering modes (FIGS. 11-13). If a trigger event is not detected, the process 240 continues to wait for the trigger. Once triggering occurs, the next frame becomes the current frame and is sent to RAWProc (and other target destinations) for processing at block 248. RAWProc may be configured using data parameters based on a corresponding data register specified in the NextDestBk field of the Sens0Go register. After processing of the current frame is completed at block 250, the method 240 may return to block 244, at which the Sens0Go register is programmed for the next frame.

When both Sensor0 and Sensor1 of the ISP pipe processing logic 80 are both active, statistics processing remains generally straightforward, since each sensor input may be processed by a respective statistics logic, StatsPipe0 and StatsPipe1. However, because the illustrated embodiment of the ISP pipe processing logic 80 provides only a single pixel processing pipeline (RAWProc to RgbProc to YCCProc), RAWProc, RgbProc, and YCCProc may be configured to alternate between processing frames corresponding to Sensor0 input data and frames corresponding to Sensor1 input data. As may be appreciated, the image frames are read from RAWProc in the illustrated embodiment to avoid a condition in which image data from one sensor is processed in real-time while image data from the other sensor is not processed in real-time. For instance, as shown in Table 3 below, which depicts one possible configuration of NextDestVld fields in the go registers for each source when the ISP pipe processing logic 80 is operating in a dual sensor mode, input data from each sensor is sent to memory (SIf0DMA and SIf1DMA) and to the corresponding statistics processing unit (StatsPipe0 and StatsPipe1).

TABLE 3

| NextDestVld per source example: Dual sensor mode | | | | | | | | |
|---|---|---|---|---|---|---|---|---|
| | Sif0DMA (D0) | Sif1DMA (D1) | StatsPipe0 (D2) | StatsPipe1 (D3) | RAWProc (D4) | RgbProc (D5) | YCCProc (D6) | BEIF (D7) |
| Sens0 (S0) | 1 | N/A | 1 | 0 | 0 | 0 | 0 | 0 |
| Sens1 (S1) | N/A | 1 | 0 | 1 | 0 | 0 | 0 | 0 |

TABLE 3-continued

| NextDestVld per source example: Dual sensor mode | | | | | | | | |
|---|---|---|---|---|---|---|---|---|
| | Sif0DMA (D0) | Sif1DMA (D1) | StatsPipe0 (D2) | StatsPipe1 (D3) | RAWProc (D4) | RgbProc (D5) | YCCProc (D6) | BEIF (D7) |
| Sens0DMA (S2) | N/A | N/A | 0 | N/A | 0 | 0 | 0 | 0 |
| Sens1DMA (S3) | N/A | N/A | N/A | 0 | 0 | 0 | 0 | 0 |
| RawProcinDMA (S4) | N/A | N/A | N/A | N/A | 1 | 1 | 1 | 0 |
| RgbProcinDMA (S5) | N/A | N/A | N/A | N/A | N/A | 0 | 0 | 0 |
| YccProcinDMA (S6) | N/A | N/A | N/A | N/A | N/A | N/A | 0 | 0 |
| BEIFDMA (S7) | N/A | N/A | N/A | N/A | N/A | N/A | N/A | 0 |

The sensor frames in memory are sent to RAWProc from the RAWProcInDMA source (S4), such that they alternate between Sensor0 and Sensor1 at a rate based on their corresponding frame rates. For instance, if Sensor0 and Sensor1 are both acquiring image data at a rate of 30 frames per second (fps), then their sensor frames may be interleaved in a 1-to-1 manner. If Sensor0 (30 fps) is acquiring image data at a rate twice that of Sensor1 (15 fps), then the interleaving may be 2-to-1, for example. That is, two frames of Sensor0 data are read out of memory for every one frame of Sensor1 data.

With this in mind, FIG. 16 depicts a method 252 for processing frame data in the ISP pipe processing logic 80 having two sensors acquiring image data simultaneously. At block 254, both Sensor0 and Sensor1 begin acquiring image frames. As may be appreciated, Sensor0 and Sensor1 may acquire the image frames using different frame rates, resolutions, and so forth. At block 256, the acquired frames from Sensor0 and Sensor1 written to memory 100 (e.g., using SIf0DMA and SIf1DMA destinations). Next, source RAWProcInDMA reads the frame data from the memory 100 in an alternating manner, as indicated at block 258. As discussed, frames may alternate between Sensor0 data and Sensor1 data depending on frame rate at which the data is acquired. At block 260, the next frame from RAWProcInDMA is acquired. Thereafter, at block 262, the NextDestVld and NextDestBk fields of the go register corresponding to the source, here RAWProcInDMA, is programmed depending on whether the next frame is Sensor0 or Sensor1 data. Thereafter, decision logic 264 determines whether a source triggering event has occurred. As discussed above, data input from memory may be triggered by arming the go bit (e.g., "trigger-on-go" mode). Thus, triggering may occur once the go bit of the go register is set to 1. Once triggering occurs, the next frame becomes the current frame and is sent to RAWProc for processing at block 266. As discussed above, RAWProc may be configured using data parameters based on a corresponding data register specified in the NextDestBk field of the corresponding go register. After processing of the current frame is completed at block 268, the method 252 may return to block 260 and continue.

A further operational event that the ISP pipe processing logic 80 may perform is a configuration change during image processing. For instance, such an event may occur when the ISP pipe processing logic 80 transitions from a single sensor configuration to a dual sensor configuration, or vice-versa. As discussed above, the NextDestVld fields for certain sources may be different depending on whether one or both image sensors are active. Thus, when the sensor configuration is changed, the ISP pipe processing logic 80 control unit 190 may release all destination units before they are targeted by a new source. This may avoid invalid configurations (e.g., assigning multiple sources to one destination). In one embodiment, the release of the destination units may be accomplished by setting the NextDestVld fields of all the go registers to 0, thus disabling all destinations, and arming the go bit. After the destination units are released, the go registers may be reconfigured depending on the current sensor mode, and image processing may continue.

Figure 18:
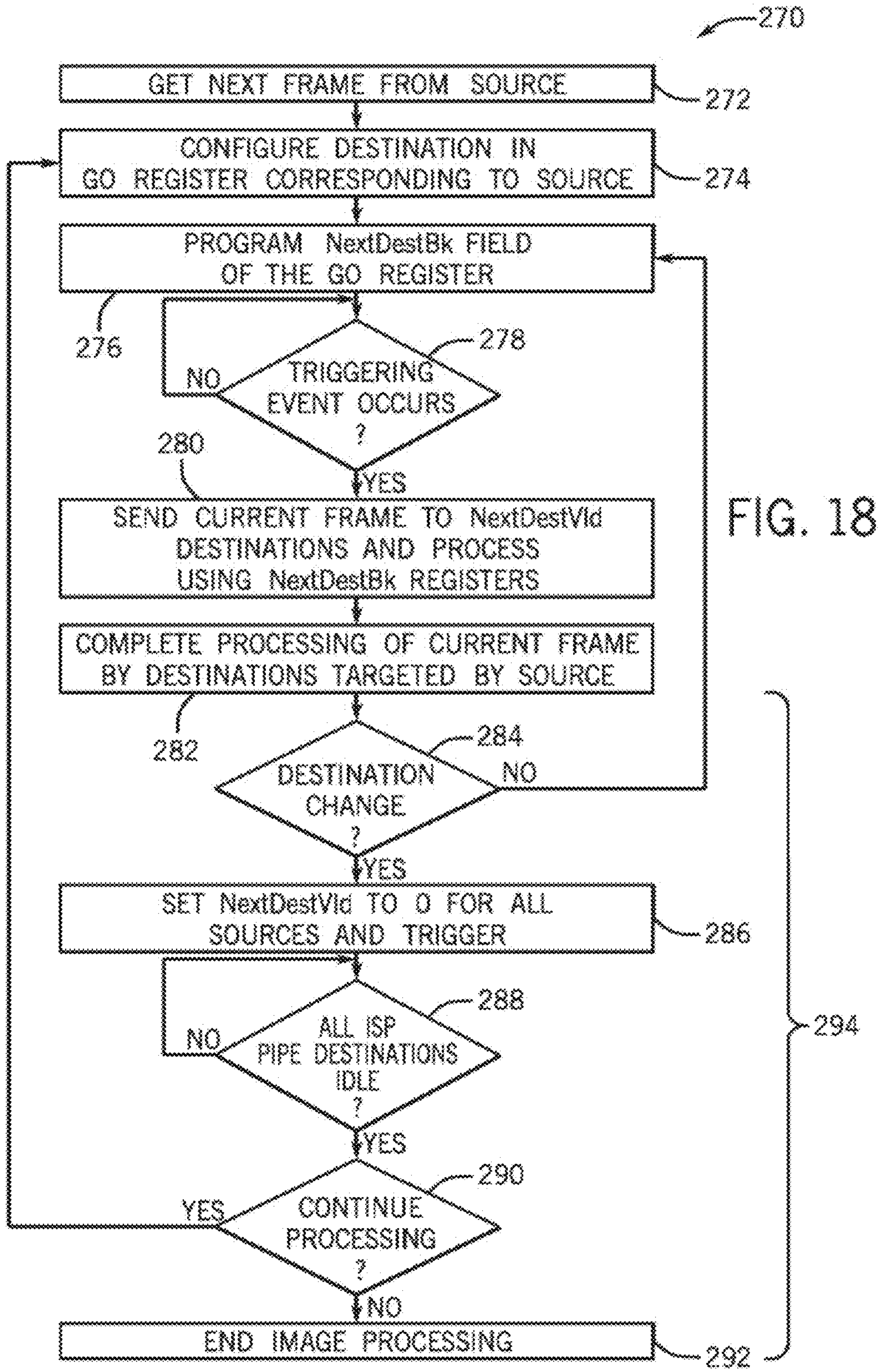
FIG. 18 is a flowchart depicting a method for using a front-end pixel processing unit to process image frames when the ISP pipe processing logic 80 logic of FIG. 10 is operating in a dual sensor mode.

A flowchart 270 for switching between single and dual sensor configurations is shown in FIG. 18. Beginning at block 272, a next frame of image data from a particular source of the ISP pipe processing logic 80 is identified. At block 274, the target destinations (NextDestVld) are programmed into the go register corresponding to the source. Next, at block 1368, depending on the target destinations, NextDestBk is programmed to point to the correct data registers associated with the target destinations. Thereafter, decision logic 278 determines whether a source triggering event has occurred. Once triggering occurs, the next frame is sent to the destination units specified by NextDestVld and processed by the destination units using the corresponding data registers specified by NextDestBk, as shown at block 280. The processing continues until block 282, at which the processing of the current frame is completed.

Subsequently, decision logic 284 determines whether there is a change in the target destinations for the source. As discussed above, NextDestVld settings of the go registers corresponding to Sens0 and Sens1 may vary depending on whether one sensor or two sensors are active. For instance, referring to Table 2, if only Sensor0 is active, Sensor0 data is sent to SIf0DMA, StatsPipe0, and RAWProc. However, referring to Table 3, if both Sensor0 and Sensor1 are active, then Sensor0 data is not sent directly to RAWProc. Instead, as mentioned above, Sensor0 and Sensor1 data is written to memory 100 and is read out to RAWProc in an alternating manner by source RAWProcInDMA (S4). Thus, if no target destination change is detected at decision logic 284, the control unit 190 deduces that the sensor configuration has not changed, and the method 270 returns to block 276, whereas the NextDestBk field of the source go register is programmed to point to the correct data registers for the next frame, and continues.

If however, at decision logic 284, a destination change is detected, the control unit 190 may determine that a sensor configuration change has occurred. This could represent, for example, switching from single sensor mode to dual sensor mode, or shutting off the sensors altogether. Accordingly, the method 270 continues to block 286, at which all bits of the NextDestVld fields for all go registers are set to 0, thus effectively disabling the sending of frames to any destination on the next trigger. Then, at decision logic 288, a determination is made as to whether all destinations have transitioned to an idle state. If not, the method 270 waits at decision logic 288 until all destinations units have completed their current operations. Next, at decision logic 290, a determination is made as to whether image processing is to continue. For instance, if the destination change represented the deactivation of both Sensor0 and Sensor1, then image processing ends at block 292. However, if it is determined that image processing is to continue, then the method 270 returns to block 274 and the NextDestVld fields of the go registers are programmed in accordance with the current operation mode (e.g., single sensor or dual sensor). As shown here, the steps 284-292 for clearing the go registers and destination fields may collectively be referred to by reference number 294.

Figure 19:
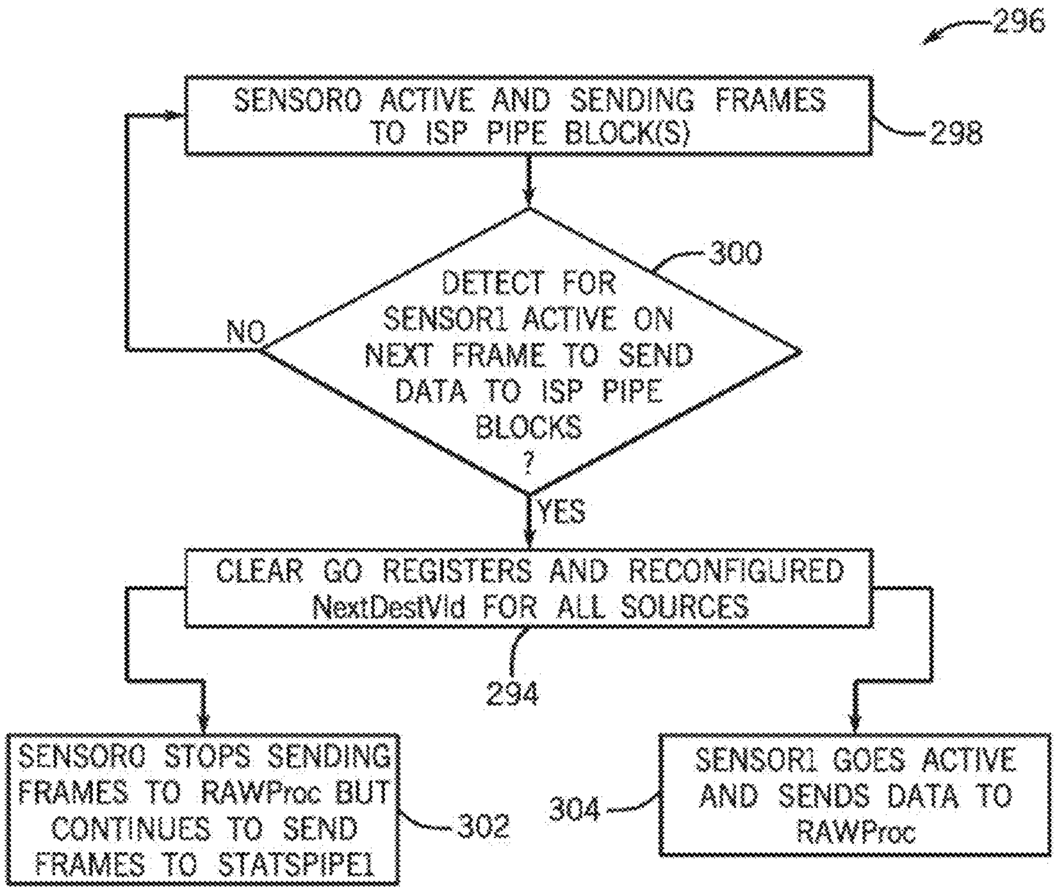
FIG. 19 is a flowchart depicting a method in which both image sensors are active, but wherein a first image sensor is sending image frames to a front-end pixel processing unit, while the second image sensor is sending image frames to a statistics processing unit so that imaging statistics for the second sensor are immediately available when the second image sensor continues sending image frames to the front-end pixel processing unit at a later time, in accordance with an embodiment.

Next, FIG. 19 shows a further embodiment by way of the flowchart (method 296) that provides for another dual sensor mode of operation. The method 296 depicts a condition in which one sensor (e.g., Sensor0) is actively acquiring image data and sending the image frames to The ISP pipe processing logic 80 for processing, while also sending the image frames to StatsPipe0 and/or memory 100 (Sif0DMA), while the other sensor (e.g., Sensor1) is inactive (e.g., turned off), as shown at block 298. Decision logic 300 then detects for a condition in which Sensor1 will become active on the next frame to send image data to RAWProc. If this condition is not met, then the method 296 returns to block 298. However, if this condition is met, then the method 296 proceeds by performing action 294 (collectively steps 284-292 of FIG. 19), whereby the destination fields of the sources are cleared and reconfigured at block 294. For instance, at block 294, the NextDestVld field of the go register associated with Sensor1 may be programmed to specify RAWProc as a destination, as well as StatsPipe1 and/or memory (Sif1DMA), while the NextDestVld field of the go register associated with Sensor0 may be programmed to clear RAWProc as a destination. In this embodiment, although frames captured by Sensor0 are not sent to RAWProc on the next frame, Sensor0 may remain active and continue to send its image frames to StatsPipe0, as shown at step 302, while Sensor1 captures and sends data to RAWProc for processing at step 304. Thus, both sensors, Sensor0 and Sensor1 may continue to operate in this "dual sensor" mode, although only image frames from one sensor are sent to RAWProc for processing. For the purposes of this example, a sensor sending frames to RAWProc for processing may be referred to as an "active sensor," a sensor that is not sending frame RAWProc but is still sending data to the statistics processing units may be referred to as a "semi-active sensor," and a sensor that is not acquiring data at all may be referred to as an "inactive sensor."

One benefit of the foregoing technique is that the because statistics continue to be acquired for the semi-active sensor (Sensor0), the next time the semi-active sensor transitions to an active state and the current active sensor (Sensor1) transitions to a semi-active or inactive state, the semi-active sensor may begin acquiring data within one frame, since color balance and exposure parameters may already be available due to the continued collection of image statistics. This technique may be referred to as "hot switching" of the image sensors, and avoids drawbacks associated with "cold starts" of the image sensors (e.g., starting with no statistics information available). Further, to save power, since each source is asynchronous (as mentioned above), the semi-active sensor may operate at a reduced clock and/or frame rate during the semi-active period.

ISP Memory Format

Before continuing with a more detailed description of the statistics processing and pixel processing operations depicted in the ISP pipe processing logic 80 of FIG. 8, it is believed that a brief introduction regarding several types of memory addressing formats that may be used with the disclosed techniques, as well as a definition of various ISP frame regions, will help to facilitate a better understanding of the present subject matter.

Figure 20:
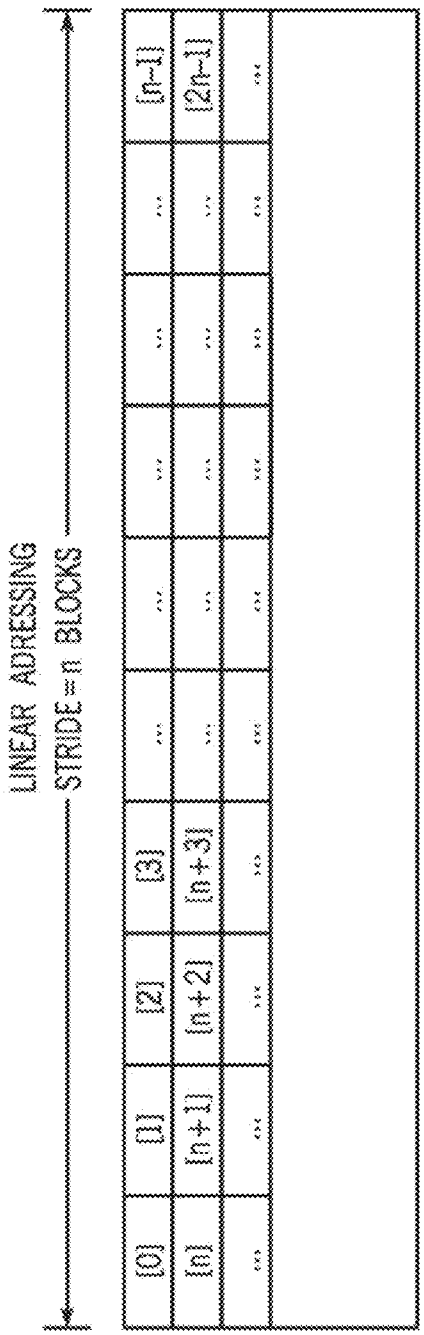
FIG. 20 is a graphical depiction of a linear memory addressing format that may be applied to pixel formats stored in a memory of the electronic device of FIG. 1, in accordance with an embodiment.

FIG. 20 illustrates a linear addressing mode that may be applied to pixel data received from the image sensor(s) 90 and stored into memory (e.g., 100). The depicted example may be based upon a host interface block request size of 64 bytes. As may be appreciated, other embodiments may use different block request sizes (e.g., 32 bytes, 128 bytes, and so forth). In the linear addressing mode shown in FIG. 20, image samples are located in memory in sequential order. The term "linear stride" specifies the distance in bytes between 2 adjacent vertical pixels. In the present example, the starting base address of a plane is aligned to a 64-byte boundary and the linear stride may be a multiple of 64 (based upon the block request size).

Figure 21:
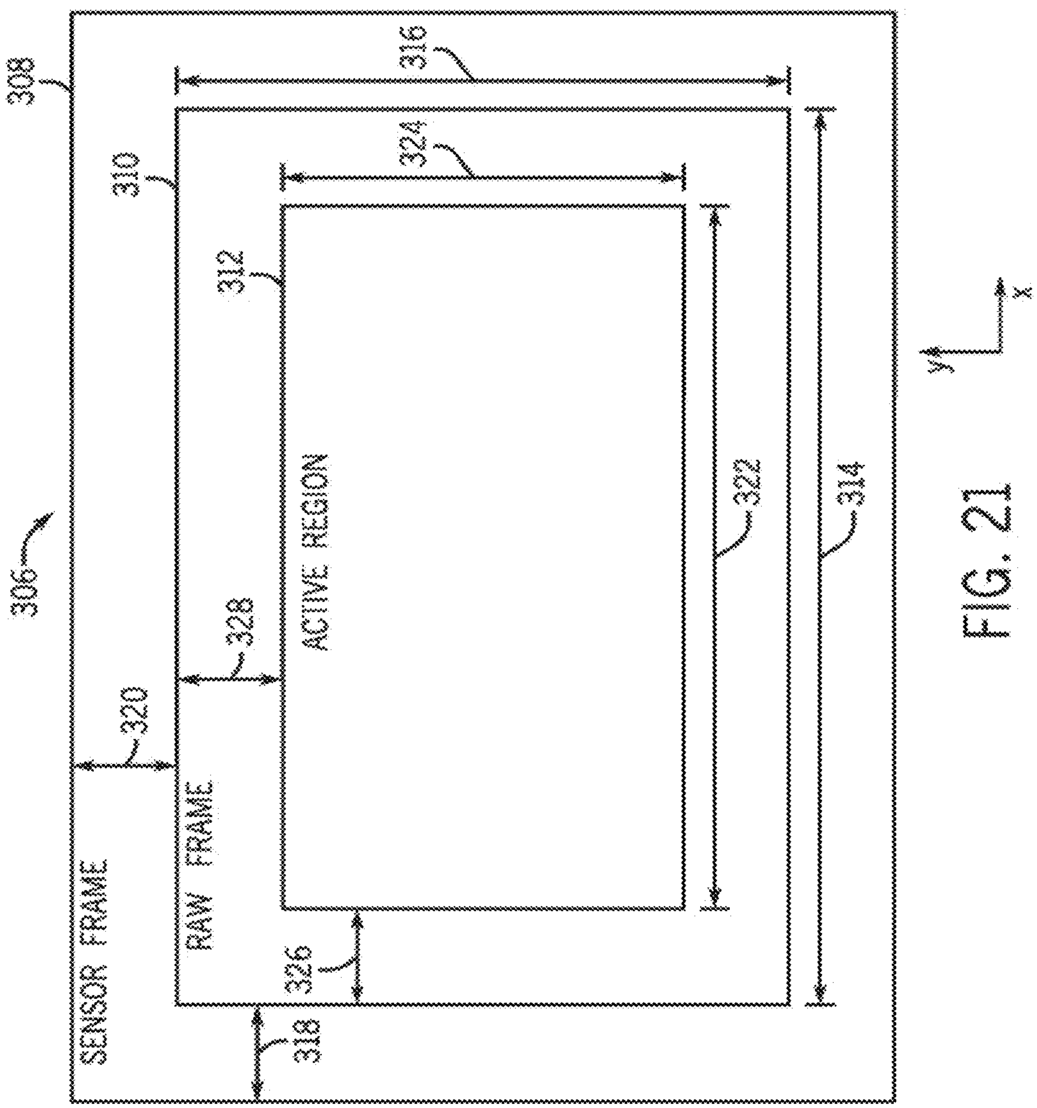
FIG. 21 is graphical depiction of various imaging regions that may be defined within a source image frame captured by an image sensor, in accordance with an embodiment.

With this in mind, various frame regions that may be defined within an image source frame are illustrated in FIG. 21. The format for a source frame provided to the image processing circuitry 32 may use the linear addressing mode discussed above, and may use pixel formats in 8, 10, 12, 14, or 16-bit precision (which ultimately may be converted to signed 17-bit format for image processing). The image source frame 306, as shown in FIG. 21, may include a sensor frame region 308, a raw frame region 308, and an active region 310. The sensor frame 308 is generally the maximum frame size that the image sensor 90 can provide to the image processing circuitry 32. The raw frame region 310 may be defined as the region of the sensor frame 308 that is sent to the ISP pipe processing logic 80. The active region 312 may be defined as a portion of the source frame 306, typically within the raw frame region 310, on which processing is performed for a particular image processing operation. In accordance with an embodiment, the active region 312 may be the same or may be different for different image processing operations.

In accordance with aspects of the present technique, the ISP pipe processing logic 80 only receives the raw frame 310. Thus, for the purposes of the present discussion, the global frame size for the ISP pipe processing logic 80 may be assumed as the raw frame size, as determined by the width 314 and height 316. In some embodiments, the offset from the boundaries of the sensor frame 308 to the raw frame 310 may be determined and/or maintained by the control logic 84. For instance, the control logic 84 may be include firmware that may determine the raw frame region 310 based upon input parameters, such as the x-offset 318 and the y-offset 320, that are specified relative to the sensor frame 308. Further, in some cases, a processing unit within the ISP pipe processing logic 80 or the ISP pipe logic 82 may have a defined active region, such that pixels in the raw frame but outside the active region 312 will not be processed, i.e., will left unchanged. For instance, an active region 312 for a particular processing unit having a width 322 and height 324 may be defined based upon an x-offset 326 and y-offset 328 relative to the raw frame 310. Further, where an active region is not specifically defined, one embodiment of the image processing circuitry 32 may assume that the active region 312 is the same as the raw frame 310 (e.g., x-offset 326 and y-offset 328 are both equal to 0). Thus, for the purposes of image processing operations performed on the image data, boundary conditions may be defined with respect to the boundaries of the raw frame 310 or active region 312. Additionally, in some embodiments, a window (frame) may be specified by identifying a starting and ending location in memory, rather than a starting location and window size information.

Figure 22:
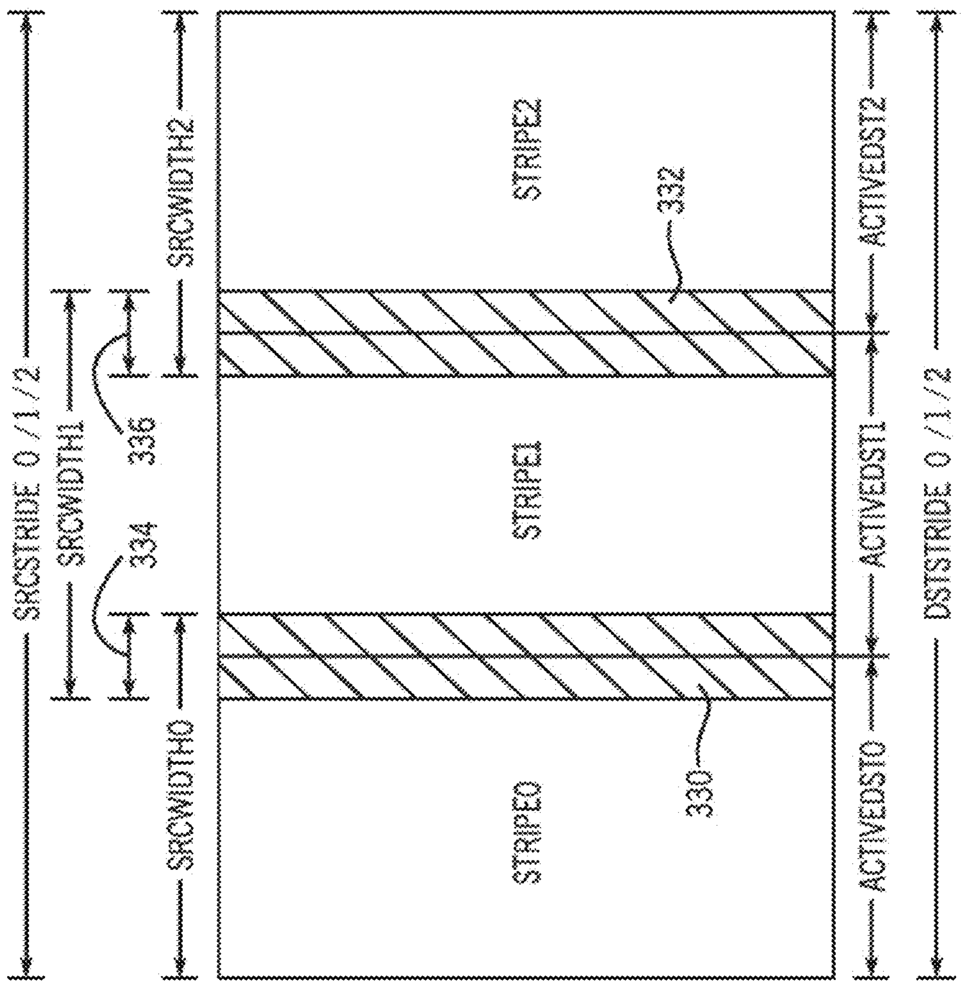
FIG. 22 is a graphical depiction of a technique for using the ISP pipe processing logic 80 processing unit to process overlapping vertical stripes of an image frame.

In some embodiments, the ISP pipe processing logic 80 (RAWProc) may also support processing an image frame by way of overlapping vertical stripes, as shown in FIG. 22. For instance, image processing in the present example may occur in three passes, with a left stripe (Stripe0), a middle stripe (Stripe1), and a right stripe (Stripe2). This may allow the ISP pipe processing logic 80 to process a wider image in multiple passes without the need for increasing line buffer size. This technique may be referred to as "stride addressing."

When processing an image frame by multiple vertical stripes, the input frame is read with some overlap to allow for enough filter context overlap so that there is little or no difference between reading the image in multiple passes versus a single pass. For instance, in the present example, Stripe0 with a width SrcWidth0 and Stripe1 with a width SrcWidth1 partially overlap, as indicated by the overlapping region 330. Similarly, Stripe1 also overlaps on the right side with Stripe2 having a width of SrcWidth2, as indicated by the overlapping region 332. Here, the total stride is the sum of the width of each stripe (SrcWidth0, SrcWidth1, SrcWidth2) minus the widths (334, 336) of the overlapping regions 330 and 332. When writing the image frame to memory (e.g., 108), an active output region is defined and only data inside the output active region is written. As shown in FIG. 22, on a write to memory, each stripe is written based on non-overlapping widths of ActiveDst0, ActiveDst1, and ActiveDst2.

Additionally or alternatively, the ISP pipe processing logic 80 may support processing an image frame 5250 by way of overlapping tiles, as shown in FIG. 222. In the example of FIG. 222, processing all or part of an image frame in this way may involve processing six tiles 5252 (Tile0-Tile5) in six different passes in a 3×2 grid. As should be appreciated, any other suitable number of tiles may be processed. As with vertical stripe processing, the input tiles 5252 are read in to the ISP pipe processing logic 80 so as to allow sufficient overlap 5254 to permit filter context overlap. Doing this may avoid artifacts that might otherwise arise when the processed tiles 5252 are put back together in a final image. Thus, the source stride 5256 may include the sum of tile source widths 5258, each of which may overlap the other. Likewise, tile source heights 5260 may also overlap one another. The destination stride 5262 of the processed image frame may be the same as the source stride 5256. The active destination widths 5264 each may extend to a point within the overlapping area of the source widths 5258, and the destination heights 5266 may extend to a point within the overlapping area of the source heights 5260.

Using tile processing as shown in FIG. 222, input frames may be read with overlap to allow for enough filter context overlap so that there are few, if any, differences between one pass or multiple passes. As such, the DMA input to the ISP pipe processing logic 80 may read the additional pixel to accommodate the filter context of the component(s) of the ISP pipe processing logic 80 to which the data is sent. Namely, each pixel DMA output channel may define an active output region. The DMA may receive data for the entire processing frame size, but only those pixels that fall inside the active output region may be written to DMA. Software controlling the ISP pipe processing logic 80 may program the DMA registers to allow enough overlap for the context of the component(s) of the ISP pipe processing logic 80 to which the data is sent.

As discussed above, the image processing circuitry 32 may receive image data directly from a sensor interface (e.g., 94) or may receive image data from memory 100 (e.g., DMA memory). Where incoming data is provided from memory, the image processing circuitry 32 and the ISP pipe processing logic 80 may be configured to provide for byte swapping, wherein incoming pixel data from memory may be byte swapped before processing. In one embodiment, a swap code may be used to indicate whether adjacent double words, words, half words, or bytes of incoming data from memory are swapped. For instance, referring to FIG. 23, byte swapping may be performed on a 16 byte (bytes 0-15) set of data using a four-bit swap code.

As shown, the swap code may include four bits, which may be referred to as bit3, bit2, bit1, and bit0, from left to right. When all bits are set to 0, as shown by reference number 338, no byte swapping is performed. When bit3 is set to 1, as shown by reference number 340, double words (e.g., 8 bytes) are swapped. For instance, as shown in FIG. 25, the double word represented by bytes 0-7 is swapped with the double word represented by bytes 8-15. If bit2 is set to 1, as shown by reference number 342, word (e.g., 4 bytes) swapping is performed. In the illustrated example, this may result in the word represented by bytes 8-11 being swapped with the word represented by bytes 12-15, and the word represented by bytes 0-3 being swapped with the word represented by bytes 4-7. Similarly, if bit1 is set to 1, as shown by reference number 344, then half word (e.g., 2 bytes) swapping is performed (e.g., bytes 0-1 swapped with bytes 2-3, etc.) and if bit0 is set to 1, as shown by reference number 346, then byte swapping is performed.

Figure 23:
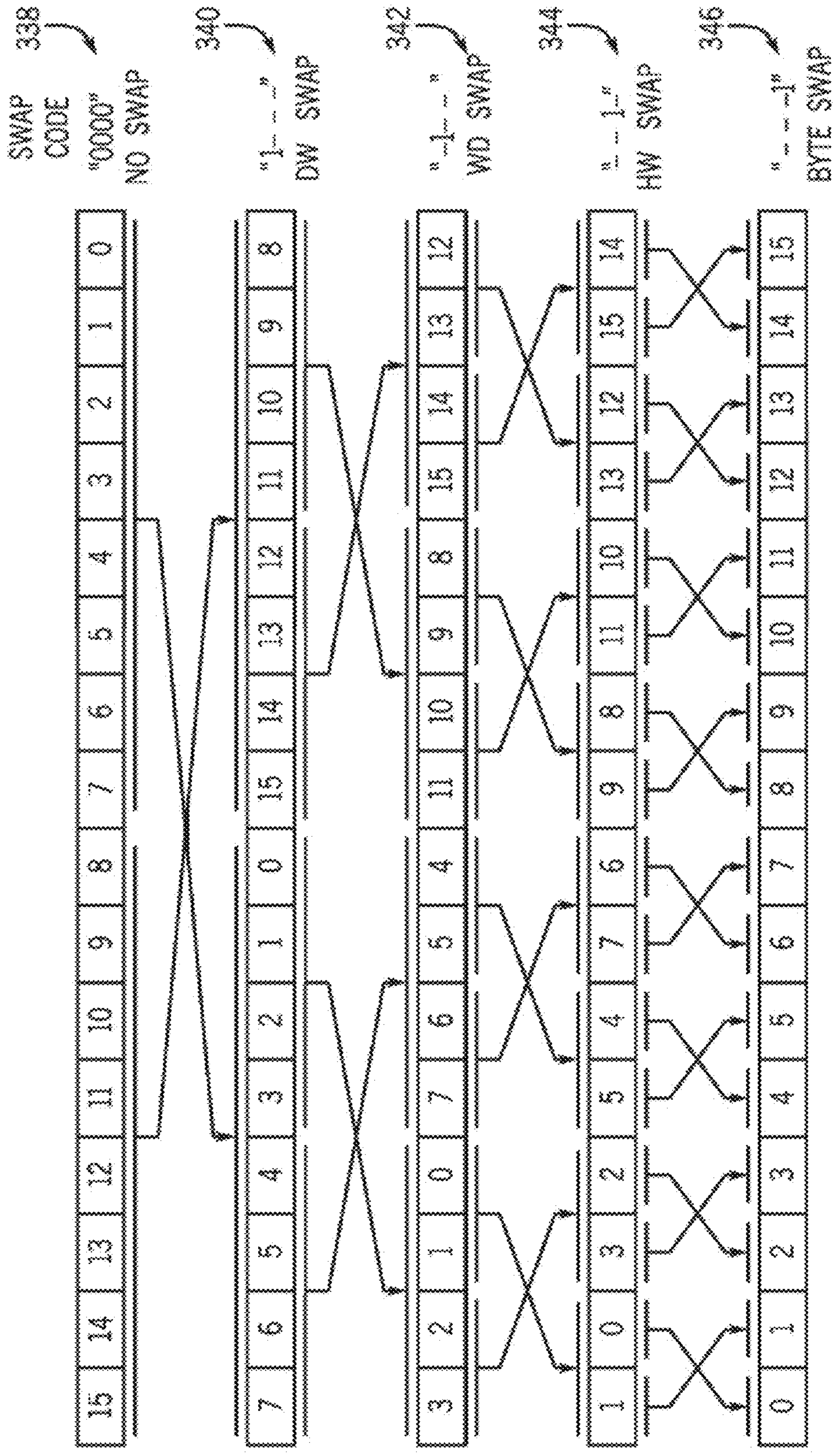
FIG. 23 is a diagram depicting how byte swapping may be applied to incoming image pixel data from memory using a swap code, in accordance with an embodiment.

In the present embodiment, swapping may be performed in by evaluating bits 3, 2, 1, and 0 of the swap code in an ordered manner. For example, if bits 3 and 2 are set to a value of 1, then double word swapping (bit3) is first performed, followed by word swapping (bit2). Thus, as shown in FIG. 23, when the swap code is set to "1111," the end result is the incoming data being swapped from little endian format to big endian format.

Various read and write channels to memory 100 may be employed by the ISP pipe processing logic 80. In one embodiment, the read/write channels may share a common data bus, which may be provided using Advanced Microcontroller Bus Architecture, such as an Advanced Extensible Interface (AXI) bus, or any other suitable type of bus (AHB, ASB, APB, ATB, etc.). Depending on the image frame information (e.g., pixel format, address format, packing method) which, as discussed above, may be determined via a control register, an address generation block, which may be implemented as part of the control logic 84, may be configured to provide address and burst size information to the bus interface. By way of example the address calculation may depend various parameters, such as whether the pixel data is packed or unpacked, the pixel data format (e.g., RAW8, RAW10, RAW12, RAW14, RAW16, RGB, or YCbCr/YUV formats), whether tiled or linear addressing format is used, x- and y-offsets of the image frame data relative to the memory array, as well as frame width, height, and stride. Further parameters that may be used in calculation pixel addresses may include minimum pixel unit values (MPU), offset masks, a byte per MPU value (BPPU), and a Log 2 of MPU value (L2MPU). Table 4, which is shown below, illustrates the aforementioned parameters for packed and unpacked pixel formats, in accordance with an embodiment.

TABLE 4

Definition of L2MPU & BPPU

| Format | | MPU (Minimum Pixel Unit) | L2MPU (Log2 of MPU) | OffsetMask | BPPU (Bytes Per MPU) |
|---|---|---|---|---|---|
| RAW8 | Unpacked | 1 | 0 | 0 | 1 |
| RAW10 | Packed | 4 | 2 | 3 | 5 |
| | Unpacked | 1 | 0 | 0 | 2 |
| RAW12 | Packed | 4 | 2 | 3 | 6 |
| | Unpacked | 1 | 0 | 0 | 2 |
| RAW14 | Packed | 4 | 2 | 3 | 7 |
| | Unpacked | 1 | 0 | 0 | 2 |
| RAW16 | Unpacked | 1 | 0 | 0 | 2 |
| RGB-888 | | 1 | 0 | 0 | 4 |
| RGB-666 | | 1 | 0 | 0 | 4 |
| RGB-565 | | 1 | 0 | 0 | 2 |
| RGB-16 | | 1 | 0 | 0 | 8 |
| YCC8_420 (2 Plane) | | 2 | 1 | 0 | 2 |
| YCC10_420 (2 Plane) | | 2 | 1 | 0 | 4 |
| YCC8_422 (2 Plane) | | 2 | 1 | 0 | 2 |
| YCC10_422 (2 Plane) | | 2 | 1 | 0 | 4 |
| YCC8_422 (1 Plane) | | 2 | 1 | 0 | 4 |
| YCC10_422 (1 Plane) | | 2 | 1 | 0 | 8 |

As should be understood, the MPU and BPPU settings allow the image processing circuitry 32 to assess the number of pixels that need to be read in order to read one pixel, even if not all of the read data is needed. That is, the MPU and BPPU settings may allow the image processing circuitry 32 read in pixel data formats that are both aligned with (e.g., a multiple of 8 bits (1 byte) is used to store a pixel value) and unaligned with memory byte (e.g., pixel values are stored using fewer or greater than a multiple of 8 bits (1 byte), such as RAW10, RAW12, etc.). It may be noted that OffsetX may always be a multiple of two for all of the YCC formats. For 4:2:0 YCC formats, OffsetY may always be a multiple of two.

Figure 24:
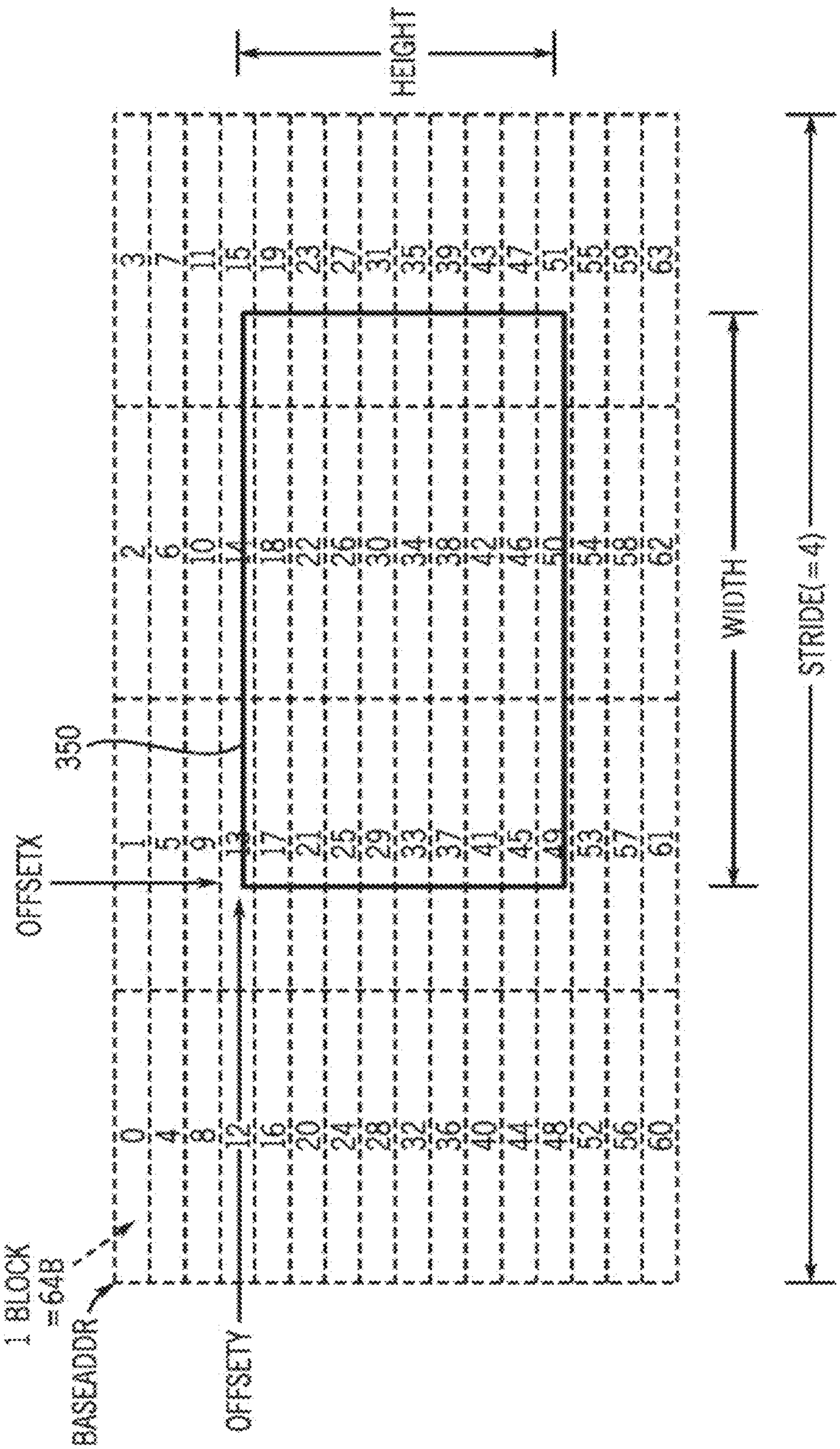
FIG. 24 shows an example of how to determine a frame location in memory in a linear addressing format, in accordance with an embodiment.

Referring to FIG. 24, an example showing the location of an image frame 350 stored in memory under linear addressing is illustrated, which each block representing 64 bytes (as discussed above in FIG. 21). In FIG. 24, the Stride is 4, meaning 4 blocks of 64 bytes. Referring to Table 4 above, the values for L2MPU and BPPU may depend on the format of the pixels in the frame 350. Software may program the base address (BaseAddr) of the frame in memory, along with OffsetX, OffsetY, Width, and Height in pixel units and the Stride in block units. These may be determined using the values of L2MPU and BPPU corresponding to the pixel format of the frame 350. The image processing circuitry 32 may calculate the position for the first pixel to fetch from the memory 100 at the BlockStart address.

Various memory formats of the image pixel data that may be supported by the image processing circuitry 32 will now be discussed in greater detail. These formats may include raw image data (e.g., Bayer RGB data), RGB color data, and YUV (YCC, luma/chroma data). First, formats for raw image pixels (e.g., Bayer data before demosaicing) in a destination/source frame that may be supported by embodiments of the image processing circuitry 32 are discussed. As mentioned, certain embodiments may support processing of image pixels at 8, 10, 12, 14, and 16-bit precision (scaled and offset to a signed 17-bit format). In the context of raw image data, 8, 10, 12, 14, and 16-bit raw pixel formats may be referred to herein as RAW8, RAW10, RAW12, RAW14, and RAW16 formats, respectively. Examples showing how each of the RAW8, RAW10, RAW12, RAW14, and RAW16 formats may be stored in memory are shown graphically unpacked forms in FIG. 25. For raw image formats having a bit-precision greater than 8 bits (and not being a multiple of 8-bits), the pixel data may also be stored in packed formats. For instance, FIG. 26 shows an example of how RAW10 image pixels may be stored in memory. Similarly, FIG. 27 and FIG. 28 illustrate examples by which RAW12 and RAW14 image pixels may be stored in memory. As will be discussed further below, when image data is being written to/read from memory, a control register associated with the sensor interface 94 may define the destination/source pixel format, whether the pixel is in a packed or unpacked format, addressing format (e.g., linear or tiled), and the swap code. Thus, the manner in which the pixel data is read and interpreted by, the image processing circuitry 32 may depend on the pixel format.

The image signal processing (ISP) circuitry 32 may also support certain formats of RGB color pixels in the sensor interface source/destination frame (e.g., 310). For instance, RGB image frames may be received from the sensor interface (e.g., in embodiments where the sensor interface includes on-board demosaicing logic) and saved to memory 100. In one embodiment, the ISP pipe processing logic 80 (RAWProc) may bypass pixel and statistics processing when RGB frames are being received. By way of example, the image processing circuitry 32 may support the following RGB pixel formats: RGB-565 and RGB-888. An example of how RGB-565 pixel data may be stored in memory is shown in FIG. 29. As illustrated, the RGB-565 format may provide one plane of an interleaved 5-bit red color component, 6-bit green color component, and 5-bit blue color component in RGB order. Thus, 16 bits total may be used to represent an RGB-565 pixel (e.g., {R0, G0, B0} or {R1, G1, B1}).

An RGB-888 format, as depicted in FIG. 30, may include one plane of interleaved 8-bit red, green, and blue color components in RGB order. In one embodiment, the image processing circuitry 32 may also support an RGB-666 format, which generally provides one plane of interleaved 6-bit red, green and blue color components in RGB order. In such embodiments, when an RGB-666 format is selected, the RGB-666 pixel data may be stored in memory using the RGB-888 format shown in FIG. 30, but with each pixel left justified and the two least significant bits (LSB) set as zero.

In certain embodiments, the image processing circuitry 32 may also support RGB pixel formats that allow pixels to have extended range and precision of floating point values. For instance, in one embodiment, the image processing circuitry 32 may support the RGB pixel format shown in FIG. 31, wherein a red (R0), green (G0), and blue (B0) color component is expressed as an 8-bit value, with a shared 8-bit exponent (E0). Thus, in such embodiments, the actual red (R'), green (G') and blue (B') values defined by R0, G0, B0, and E0 may be expressed as:

$$R'=R0[7:0]*2\hat{}E0[7:0]$$

$$G'=G0[7:0]*2\hat{}E0[7:0]$$

$$B'=B0[7:0]*2\hat{}E0[7:0]$$

This pixel format may be referred to as the RGBE format, which is also sometimes known as the Radiance image pixel format.

FIGS. 32 and 33 illustrate additional RGB pixel formats that may be supported by the image processing circuitry 32. Particularly, FIG. 32 depicts a pixel format that may store 9-bit red, green, and blue components with a 5-bit shared exponent. For instance, the upper eight bits [8:1] of each red, green, and blue pixel are stored in respective bytes in memory. An additional byte is used to store the 5-bit exponent (e.g., E0[4:0]) and the least significant bit [0] of each red, green, and blue pixel. Thus, in such embodiments, the actual red (R'), green (G') and blue (B') values defined by R0, G0, B0, and E0 may be expressed as:

$$R'=R0[8:0]*2^{\wedge}E0[4:0]$$

$$G'=G0[8:0]*2^{\wedge}E0[4:0]$$

$$B'=B0[8:0]*2^{\wedge}E0[4:0]$$

Further, the pixel format illustrated in FIG. 32 is also flexible in that it may be compatible with the RGB-888 format shown in FIG. 30. For example, in some embodiments, the image processing circuitry 32 may process the full RGB values with the exponential component, or may also process only the upper 8-bit portion [7:1] of each RGB color component in a manner similar to the RGB-888 format.

FIG. 33 depicts a pixel format that may store 10-bit red, green, and blue components with a 2-bit shared exponent. For instance, the upper 8-bits [9:2] of each red, green, and blue pixel are stored in respective bytes in memory. An additional byte is used to store the 2-bit exponent (e.g., E0[1:0]) and the least significant 2-bits [1:0] of each red, green, and blue pixel. Thus, in such embodiments, the actual red (R'), green (G') and blue (B') values defined by R0, G0, B0, and E0 may be expressed as:

$$R'=R0[9:0]*2^{\wedge}E0[1:0]$$

$$G'=G0[9:0]*2^{\wedge}E0[1:0]$$

$$B'=B0[9:0]*2^{\wedge}E0[1:0]$$

Additionally, like the pixel format shown in FIG. 32, the pixel format illustrated in FIG. 33 is also flexible in that it may be compatible with the RGB-888 format shown in FIG. 30. For example, in some embodiments, the image processing circuitry 32 may process the full RGB values with the exponential component, or may also process only the upper 8-bit portion (e.g., [9:2]) of each RGB color component in a manner similar to the RGB-888 format.

In addition, the image processing circuitry 32 may support 16-bit RGB format known as RGB-16. With RGB-16, one plane of interleaved 16-bit components in ARGB order, as illustrated in FIG. 34. For the RGB-888 format shown in FIG. 30 and the RGB-16 format shown in FIG. 34, alpha may be set to 0xFF and 0xFFFF, respectively, when pixel data is written to external memory 100. Alpha may be ignored when reading RGB-888 or RGB-16 formatted data from the memory 100. Image data of the RGB-16 format may not be supported from the sensor 90 outputs.

The image processing circuitry 32 may also further support certain formats of YCbCr (YUV) luma and chroma pixels in the sensor interface source/destination frame (e.g., 310). For instance, YCbCr image frames may be received from the sensor interface (e.g., in embodiments where the sensor interface includes on-board demosaicing logic and logic configured to convert RGB image data into a YCC color space) and saved to memory 100 and/or the output of the RgbProc 160 in YCC format may be saved to memory 100. In one embodiment, the ISP pipe processing logic 80 may bypass pixel and statistics processing when YCbCr frames are being received. By way of example, the image processing circuitry 32 may support the following YCbCr pixel formats: YCbCr4:4:4 16-bit, 1-plane; YCbCr-4:2:0 10-bit, 2-plane; YCbCr-4:2:2 10-bit, 1-plane; YCbCr-4:2:0 8-bit, 2-plane; and YCbCr-4:2:2 8-bit, 1-plane.

The YCbCr4:4:4 16-bit, 1-plane format may provide a single image plane with interleaved 16-bit components, as generally shown by FIG. 35. That is, both luma pixels (Y) and chroma pixels (Cb and Cr) may be represented in the same plane of memory in the YCbCr4:4:4 16-bit, 1-plane format. It may be noted that the YCbCr4:4:4 16-bit, 1-plane format is related to the RGB-16 format shown in FIG. 34.

Figure 36:
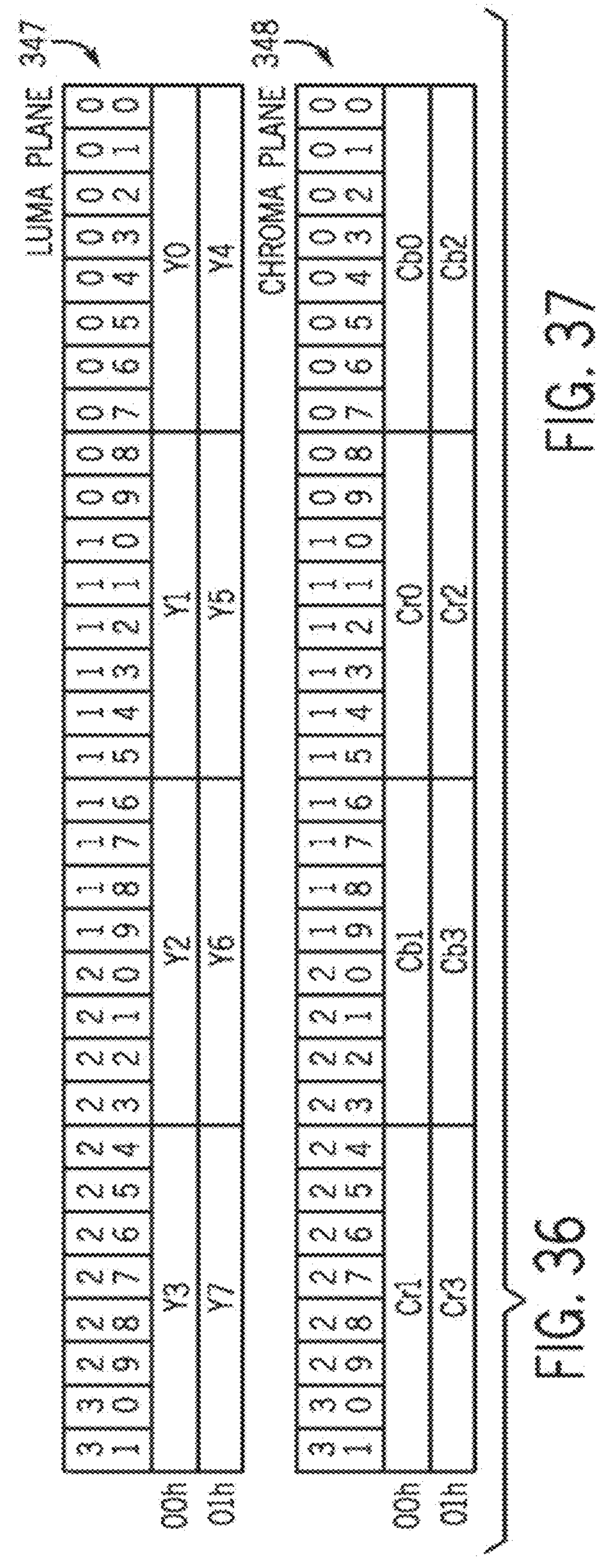
Figure 37:
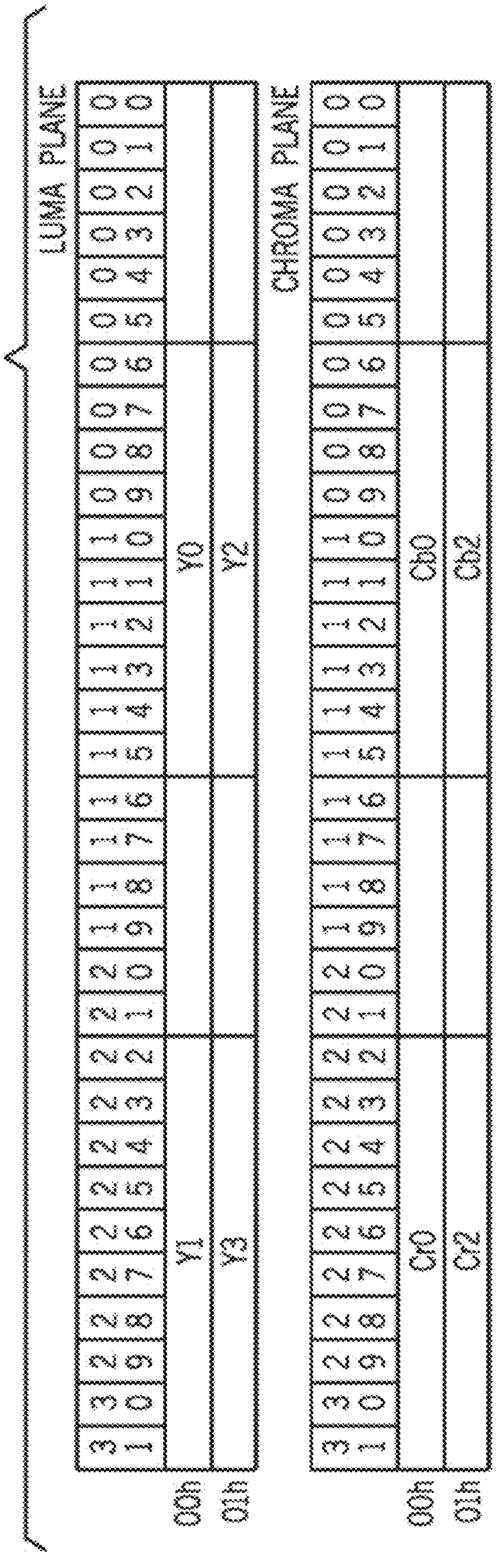

The YCbCr-4:2:0, 8-bit, 2 plane pixel format and the YCbCr-4:2:0, 10-bit, 2 plane pixel format may provide two separate image planes in memory, one for luma pixels (Y) and one for chroma pixels (Cb, Cr), wherein the chroma plane interleaves the Cb and Cr pixel samples. Additionally, the chroma plane may be subsampled by one-half in both the horizontal (x) and vertical (y) directions. An example showing how YCbCr-4:2:0, 2 plane, data may be stored in memory is shown in FIG. 36, which depicts a luma plane 347 for storing the luma (Y) samples and a chroma plane 348 for storing chroma (Cb, Cr) samples. An example showing how YCbCr-4:2:0, 10-bit, 2 plane pixel data may be stored in the memory 100 appears in FIG. 37.

A YCbCr-4:2:2 8-bit, 1 plane format, which is shown in FIG. 38, may include one image plane of interleaved luma (Y) and chroma (Cb, Cr) pixel samples, with the chroma samples being subsampled by one-half both the horizontal (x) and vertical (y) directions. An example of a YCbCr-4:2:2 10-bit, 1-plane format appears in FIG. 39. In some embodiments, the image processing circuitry 32 may also support 10-bit YCbCr pixel formats by saving the pixel samples to memory using the above-described 8-bit format with rounding (e.g., the two least significant bits of the 10-bit data are rounded off). Further, as may be appreciated, YC1C2 values may also be stored using any of the RGB pixel formats discussed above in FIGS. 29-34, wherein each of the Y, C1, and C2 components are stored in a manner analogous to an R, G, and B component.

As shown above in Table 4, for pixels stored in RAW10, RAW12, and RAW14 packed formats, four pixels make a minimum pixel unit (MPU) of five, six, or seven bytes (BPPU), respectively. For instance, referring to the RAW10 pixel format example shown in FIG. 26, an MPU of four pixels P0-P3 includes 5 bytes, wherein the upper 8 bits of each of the pixels P0-P3 are stored in four respective bytes, and the lower 2 bytes of each of the pixels are stored in bits 0-7 of the 32-bit address 01h. Similarly, referring back to FIG. 27, an MPU of four pixels P0-P3 using the RAW12 format includes 6 bytes, with the lower 4 bits of pixels P0 and P1 being stored in the byte corresponding to bits 16-23 of address 00h and the lower 4 bits of pixels P2 and P3 being stored in the byte corresponding to bits 8-15 of address 01h. FIG. 28 shows an MPU of four pixels P0-P3 using the RAW14 format as including 7 bytes, with 4 bytes for storing the upper 8 bits of each pixel of the MPU and 3 bytes for storing the lower 6 bits of each pixel of the MPU.

Using these pixel formats, it is possible at the end of a frame line to have a partial MPU where less than four pixels of the MPU are used (e.g., when the line width modulo four is non-zero). When reading a partial MPU, unused pixels may be ignored. Similarly, when writing a partial MPU to a destination frame, unused pixels may be written with a value of zero. Further, in some instances, the last MPU of a frame line may not align to a 64-byte block boundary. In one embodiment, bytes after the last MPU and up to the end of the last 64-byte block are not written.

Scale and Offset Logic

As will be discussed in greater detail below, pixel processing through certain functional blocks of the ISP pipe processing logic 80 may take place in a signed format. The signed image data may employ an offset allowing for greater headroom than footroom. Moreover, by offsetting input pixels to allow for some negative values, using signed image data instead of unsigned image data for image processing may preserve more image information in the final, processed image. In some embodiments, the signed format may be signed 17-bit data, but any other suitable size may be employed. Using 17-bit image data, the source pixel data may take up two bytes to simplify memory, and one bit may be added to account for sign. Using 9-bit data, the source pixel data may take up one byte. Any other suitable signed format may be employed. For example, the signed format may be signed 10-bit, 11-bit, 12-bit, 13-bit, 14-bit, 15-bit, or less than 9-bit or greater than 17-bit. Indeed, in some embodiments, the image data may be signed 25-bit image data or signed 33-bit image data to allow for signed versions of image data of 3 or 4 bytes. Accordingly, it should be understood that when the present disclosure refers to "signed 17-bit," any other suitable bit depth may be employed. Moreover, although the present disclosure refers to signed 17-bit image data, floating point image data may alternatively be used (e.g., 9.3). Before and after processing image data in certain functional blocks of the ISP pipe processing logic 80, the scale and offset logic 82 may convert unsigned image data into signed image data.

Figure 40:
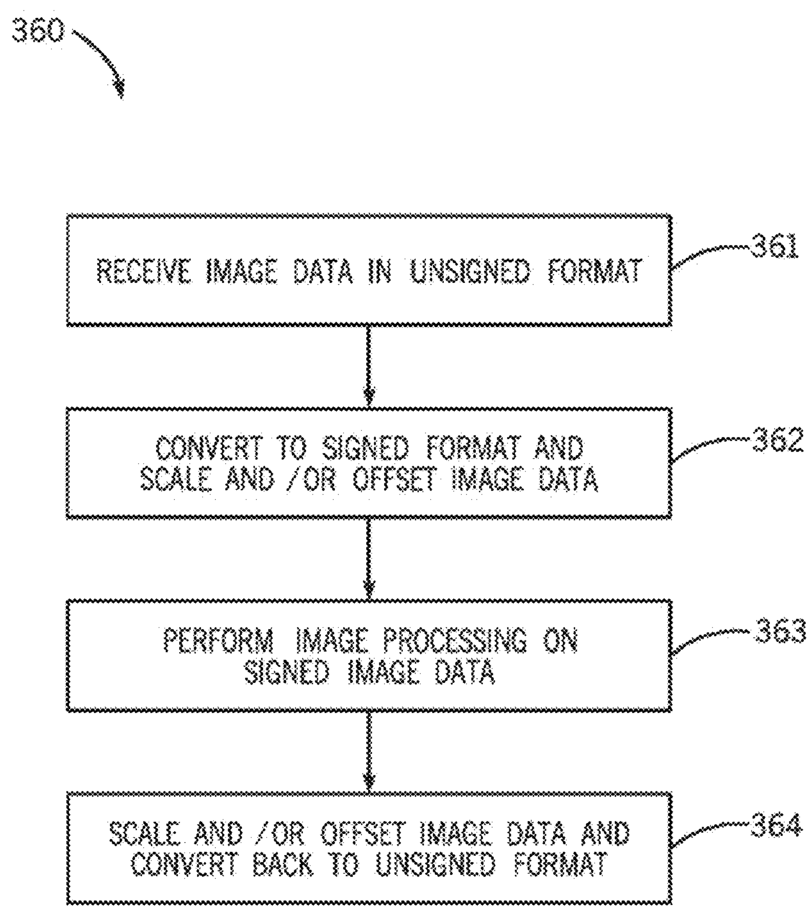
FIG. 40 is a flowchart describing a method for processing image data using signed image data, in accordance with an embodiment.

A flowchart 360 of FIG. 40 provides an example of image processing involving signed image data. The flowchart 360 may begin when the ISP pipe processing logic 80 is programmed to receive image data from the memory 100 in an unsigned format (block 361). For instance, the StatsPipe0 140*a*, the StatsPipe1 140*b*, the RAWProc 150, and the RgbProc 160 may be programmed to receive raw image data, which may be stored in the memory 100 in one of the RAW8, RAW10, RAW12, RAW14, or RAW16 image data formats. As mentioned above, the scale and offset logic 82 may represent logical offset and scale functions implemented on both DMA input and DMA output pixel channels. The pixel offset and scale functions of the scale and offset logic 82 may be applied to all supported formats of raw image data (e.g., RAW8, RAW10, RAW12, RAW14, and/or RAW16), all supported formats of RGB pixel data (e.g., RGB-565, RGB-888, RGB-16), and YCC pixel data of the YCC4:4:4 format. In transferring the unsigned image data from the memory 100 and/or the sensors 90*a* and 90*b*, the scale and offset logic 82 may convert the unsigned image data to a signed format (e.g., signed 17-bit) by applying a programmable scale and/or offset to the image data (block 362).

As mentioned above, the ISP pipe processing logic 80 may perform various image processing operations using signed image data to preserve image information (block 363). For instance, operations that produce negative pixel values as outputs or interim pixel values could lose image information if these pixels were merely clipped to zero. Although negative pixel values could not be displayed on a display 28—the lowest pixel value will typically be 0 (black)—allowing negative pixel values during interim processing may preserve image information for pixels at or near the color black in the final processed image. To provide a brief example, noise on the image sensor(s) 90 may occur in a positive or negative direction from the correct value. In other words, some pixels that should represent a particular light intensity may have a particular value, others may have noise resulting in values greater than the particular value, and still others may have noise resulting in values less than the particular value. When an area of the image sensor(s) 90 captures little or no light, sensor noise may increase or decrease individual pixel values such that the average pixel value is about zero. Thus, when image data from the sensor(s) 90 is processed by the scale and offset logic 82, the pixel values may be offset so as to preserve the negative noise values rather than clipping the negative noise values away. In particular, if only noise occurring in a negative direction were discarded, the true black color could rise above zero and could produce grayish-tinged black areas. Thus, by using signed image data, the ISP pipe processing logic 80 may more accurately render dark black areas in images.

When the ISP pipe processing logic 80 has finished performing one or more operations on the image data, the image data may be programmed to be stored in a location of the memory 100. Before being stored in the memory 100, the scale and offset logic 82 may convert the signed image data back to an unsigned format (block 364).

Figure 41:
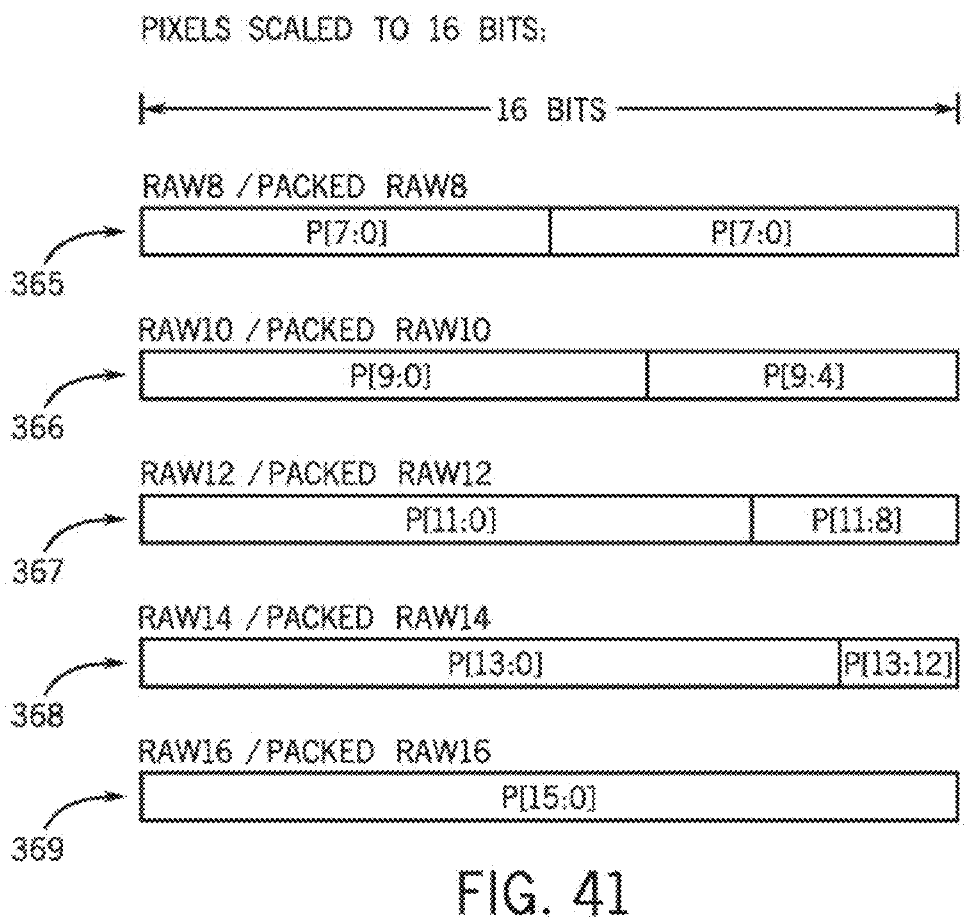
FIG. 41 is a schematic illustration of scaling pixels of various bit-depths to a common unsigned 16-bit format, in accordance with an embodiment.

Before image data is converted from unsigned data to signed data, whether from the sensor interfaces 94*a* (S0) or 94*b* (S1) or from the memory 100 (S2-S6), pixel data first may be scaled to encompass 16 bits. For example, the scale and offset logic 82 may convert input pixels of bit depths less than 16 bits to an unsigned 16-bit format by shifting the input pixels to the left to fit the 16-bit scale. In addition, the scale and offset logic 82 may, but not necessarily, replicate the most significant bits (MSBs) of the input pixel in the remaining least significant bits (LSBs). The results of scaling various formats with bit depths of less than 16 bits unsigned 16-bit pixels are shown in FIG. 41. As shown in FIG. 41, when pixels in the RAW8 format (numeral 365) are scaled to 16 bits, the entire pixel may be replicated in the LSBs; when pixels in the RAW10 format (numeral 366) are scaled to 16 bits, the upper 6 bits may be replicated in the LSBs; when pixels in the RAW12 format (numeral 367) are scaled to 16 bits, the upper 4 bits may be replicated in the LSBs; when pixels in the RAW14 format (numeral 368) are scaled to 16 bits, the upper 2 bits may be replicated in the LSBs; and, since pixels in the RAW16 format (numeral 369) already take up 16 bits, these pixels need not be scaled. The same procedure illustrated by FIG. 41 may also be applied to the RGB-565 and RGB-888 formats.

Figure 42:
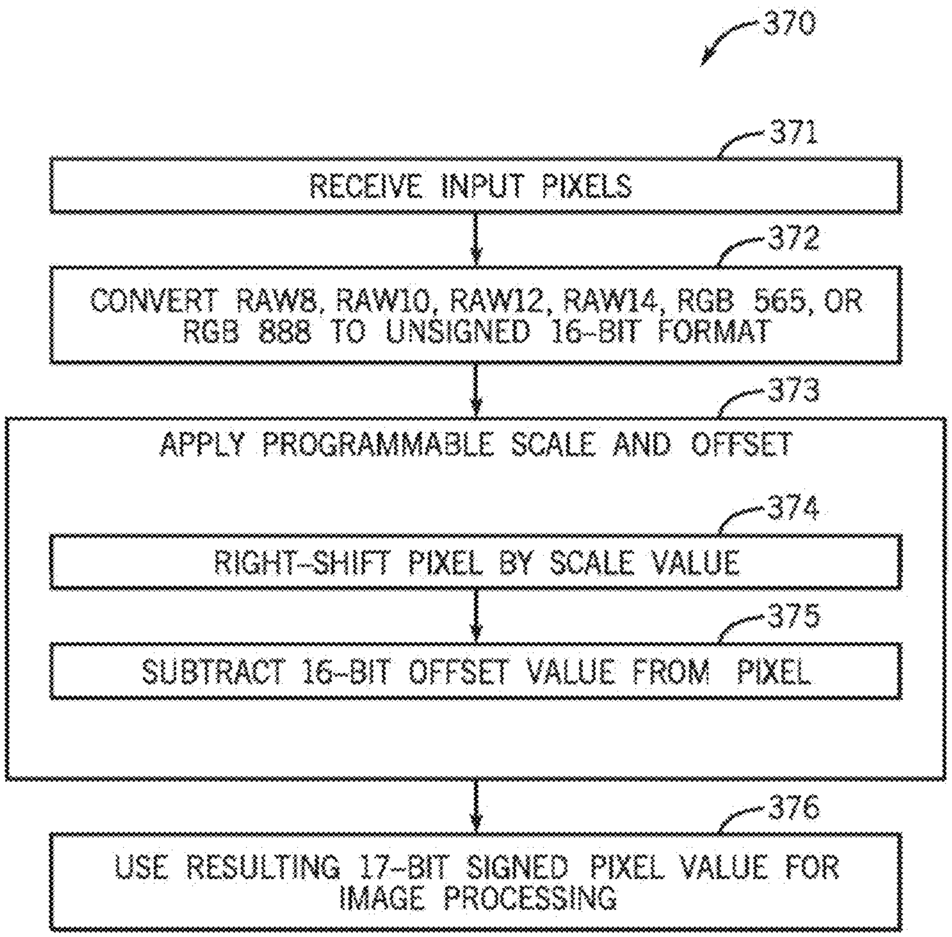
FIG. 42 is a flowchart describing embodiments of a method for converting unsigned 16-bit pixels into signed 17-bit pixels for processing using the ISP pipe processing logic of FIG. 8, in accordance with an embodiment.

Such 16-bit unsigned image data may be converted to signed 17-bit image data as shown in a flowchart 370 of FIG. 42. The flowchart 370 may begin when input pixels are programmed to be transferred to a processing block of the ISP pipe processing logic 80 that receives signed 17-bit input data (block 371). Pixels with bit depths of less than 16 bits may be scaled to an unsigned 16-bit format in the manner of FIG. 41 (block 372). The scale and offset logic 82 then may apply a programmable scale and offset to the unsigned 16-bit pixels (block 373).

First, the scale and offset logic 82 may scale the input pixels by some scale value (block 374). The scale value may be programmable. In the example of FIG. 42, the scale and offset logic 82 may scale the input pixels using a right-shift operation, but other embodiments may involve any other suitable scaling logic (e.g., multiplication logic). Software may vary the scale value depending, for example, on the original format of the input pixel and/or other expected gains that will be applied during image processing. By way of example, the programmable scale value may be a right-shift of 0 to 8. Scaling the input pixels may enable software to control the amount of headroom in the pixel pipeline to accommodate the various gains applied in the ISP pipe processing logic 80. Thus, the input pixels will be less likely to lose information after gains are applied. In the case of RGB image data, the same or a different scale may be applied to R, G, and B channels.

After scaling, the scale and offset logic 82 may subtract an offset value from the scaled pixel (block 375). Subtracting the offset value sets a zero-value in the now-signed 17-bit data, allowing negative pixel values from the sensor to enter the ISP pipe processing logic 80. The offset value may be, as indicated in FIG. 42, a programmable 16-bit value. In other embodiments, the offset value may have a depth other than 16-bits. In the case of RGB image data, the same offset value may be applied to R, G, and B channels. Subtracting the offset value may provide software the ability to program the range available for negative pixel values through the ISP pipe processing logic 80. Specifically, by appropriately biasing the input pixel value range using the offset value, potential overflow and underflow conditions in the ISP pipe processing logic 80 may be avoided. After subtracting the offset value, the scale and offset logic 82 may output the input pixel in 17-bit signed format. The resulting 17-bit signed pixel value may be used by the ISP pipe processing logic 80 to perform various image processing operations, as will be discussed in greater detail below (block 376).

After some interim processing, it may be desirable to write pixel values to the memory 100. Since the pixels may have been processed in the 17-bit format, these pixels first may be converted back to the unsigned 16-bit format before being stored in the memory 100. One example of this conversion is described by a flowchart 380 of FIG. 43. At various stages of processing through the ISP pipe processing logic 80, image data that has been partially processed may be transferred to the memory 100. Thus, the flowchart 380 may begin when the memory 100 is programmed to receive signed 17-bit pixels out of the ISP pipe processing logic 80 (block 381).

Before storing the pixels in the memory 100, the programmable scale and offset logic 82 may de-apply the programmable scale and offset to convert the image data from the signed 17-bit format back to the unsigned 16-bit format (block 382). Specifically, the scale and offset logic 82 may first add the 16-bit offset value back into the pixel (block 383). Adding the offset value back into the pixel brings the pixel value back to an unsigned 16-bit range. Thus, the scale and offset logic 82 may also clip the pixel to the extent that the pixel value falls outside of the 16-bit range (block 384). The scale and offset logic 82 next may scale the pixel by the scale value (block 385). In some embodiments, the scale and offset logic 82 may left-shift the pixel, while in others, the scale and offset logic 82 may multiply the pixel by some value. The scale function essentially enable software to convert from a smaller pixel range used by the ISP pipe processing logic 80 to a larger range used by the memory 100. For instance, if the pixel value used by a process of the ISP pipe processing logic 80 employs a 10-bit format, the pixels may be converted to 16-bits in memory by left-shifting the pixel data by 6 before writing to the memory 100. Additionally, in some embodiments, the most significant bits (MSB) of the pixel may be replicated into the least significant bits (LSB) (block 386). In other embodiments, the actions of block 386 may not be carried out.

The scale and offset logic 82 thus will have converted the signed 17-bit pixels back to the unsigned 16-bit format. The upper bits of the 16-bit range may then be used to send pixel data to the DMA memory 100 (block 387). The number of the upper bits used to send the pixel data to the memory 100 may vary depending on the format of the image data. For example, RAW8 image data may use bits [15:8], RAW10 may use bits [15:6], RAW12 may use bits [15:4], RAW14 may use bits [15:2], and so forth.

In practice, the scale and offset logic 82 may permit image processing with headroom and footroom. As used herein, "headroom" refers to ISP Overflow Handling In accordance with an embodiment, the image processing circuitry 32 may provide overflow handling. For instance, an overflow condition (also referred to as "overrun") may occur in certain situations where the ISP pipe processing logic 80 receives back-pressure from its own internal processing units, from downstream processing units (e.g., ISP back-end interface 86), or from a memory 100 destination (e.g., where the image data is to be written). Overflow conditions may occur when pixel data is being read in (e.g., either from the sensor interface or memory) faster than one or more processing blocks is able to process the data, or faster than the data may be written to a destination (e.g., memory 100).

As will be discussed further below, reading and writing to memory may contribute to overflow conditions. When the input data derives from a location in the memory 100, the image processing circuitry 32 may simply stall the reading of the input data when an overflow condition occurs until the overflow condition recovers. When image data is being read directly from an image sensor, however, the "live" data generally cannot be stalled, as the image sensor 90 is generally acquiring the image data in real time. For instance, the image sensor 90 may operate in accordance with a timing signal based upon its own internal clock and may output image frames at a certain frame rate, such as 15, 30, or 60 frames per second (fps). The sensor 90 inputs to the image processing circuitry 32 and memory 100 may thus include input queues which may buffer the incoming image data before it is processed (by the image processing circuitry 32) or written to memory (e.g., 100). Accordingly, if image data is being received at the input queue 130 faster than it can be read out of the queue 130 and processed or stored (e.g., written to memory 100), an overflow condition may occur. That is, if the buffers/queues are full, additional incoming pixels cannot be buffered and, depending on the overflow handling technique implemented, may be dropped.

Figure 44:
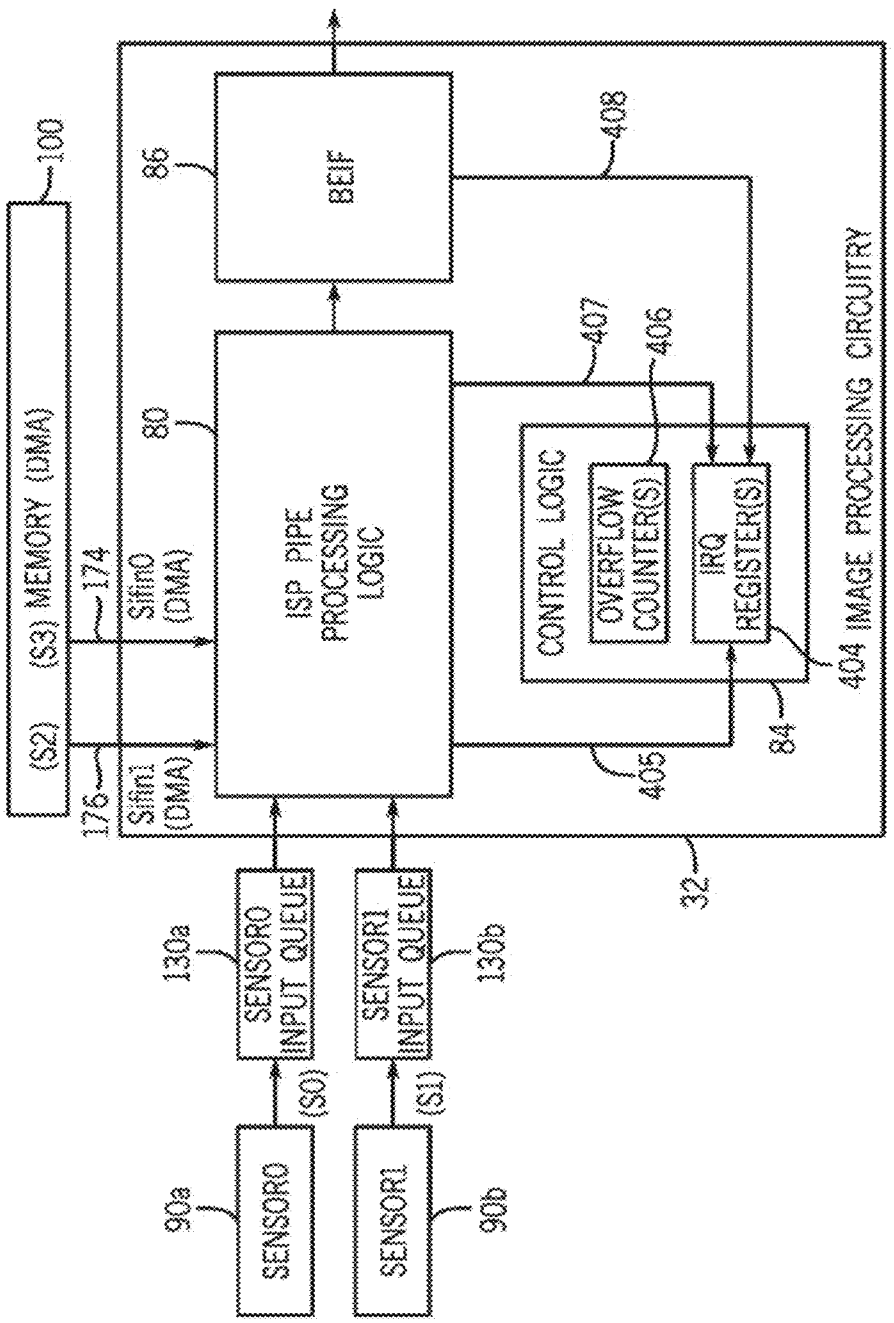
FIG. 44 is a block diagram of the ISP circuitry of FIG. 8 depicting how overflow handling may be performed, in accordance with an embodiment.

FIG. 44 shows a block diagram of the image processing circuitry 32, focusing on features of the control logic 84 that may provide for overflow handling in accordance with an embodiment. As illustrated, image data associated with Sensor0 90*a* and Sensor1 90*b* may be read in from memory 100 as sources S0 and S1 (by way of sensor input queues 130*a* and 130*b*) to the ISP pipe processing logic 80 (e.g., RAWProc 150), or may be provided to the ISP pipe processing logic 80 directly from the respective sensor interfaces. In the latter case, incoming pixel data from the image sensors 90*a* and 90*b* may be passed to input queues 400 and 402, respectively, before being sent to the ISP pipe processing logic 80.

When an overflow condition occurs, the processing block(s) (e.g., blocks 80, 82, or 120) or memory (e.g., 108) in which the overflow occurred may provide a signal (as indicated by signals 405, 407, and 408) to set a bit in an interrupt request (IRQ) register 404. In the present embodiment, the IRQ register 404 may be implemented as part of the control logic 84. Additionally, separate IRQ registers 404 may be implemented for each of Sensor0 image data and Sensor1 image data. Based on the value stored in the IRQ register 404, the control logic 84 may be able to determine which logic units within the ISP processing blocks 80, 82, 120 or memory 100 generated the overflow condition. The logic units may be referred to as "destination units," as they may constitute destinations to which pixel data is sent. In some embodiments, the destination units may represent the destinations D0-D7. Based on the overflow conditions, the control logic 84 may also (e.g., through firmware/software handling) govern which frames are dropped (e.g., either not written to memory or not output to the display for viewing).

Once an overflow condition is detected, the manner in which overflow handling is carried may depend on whether the ISP pipe processing logic 80 is reading pixel data from memory 100 or from the image sensor input queues (e.g., buffers) 130*a* or 130*b*, which may be first-in-first-out (FIFO) queues. When input pixel data is read from memory 100 through, for example, an associated DMA interface, the ISP pipe processing logic 80 will stall the reading of the pixel data if it receives back-pressure as a result of an overflow condition being detected (e.g., via control logic 84 using the IRQ register(s) 404) from any downstream destination blocks which may include the ISP pipe processing logic 80, the ISP back-end interface 86, or the memory 100 in instances where the output of the ISP pipe processing logic 80 is written to memory 100. In this scenario, the control logic 84 may prevent overflow by stopping the reading of the pixel data from memory 100 until the overflow condition recovers. For instance, overflow recovery may be signaled when the downstream unit that is causing the overflow condition sets a corresponding bit in the IRQ register 404 indicating that the overflow is no longer occurring. An example of this process appears in a flowchart 410 of FIG. 45.

While overflow conditions may generally be monitored at the sensor input queues, it should be understood that many additional queues may be present between processing units of the image processing circuitry 32 (e.g., including internal units of the ISP pipe processing logic 80 and/or the ISP back-end logic 86). Additionally, the various internal units of the image processing circuitry 32 may also include line buffers, which may also function as queues. Thus, all the queues and line buffers of the image processing circuitry 32 may provide buffering. Accordingly, when the last processing block in a particular chain of processing blocks is full (e.g., its line buffers and any intermediate queues are full), back-pressure may be applied to the preceding (e.g., upstream) processing block and so forth, such that the back-pressure propagates up through the chain of logic until it reaches the sensor interface, where overflow conditions may be monitored. Thus, when an overflow occurs at the sensor interface, it may mean that all the downstream queues and line buffers are full.

Figure 45:
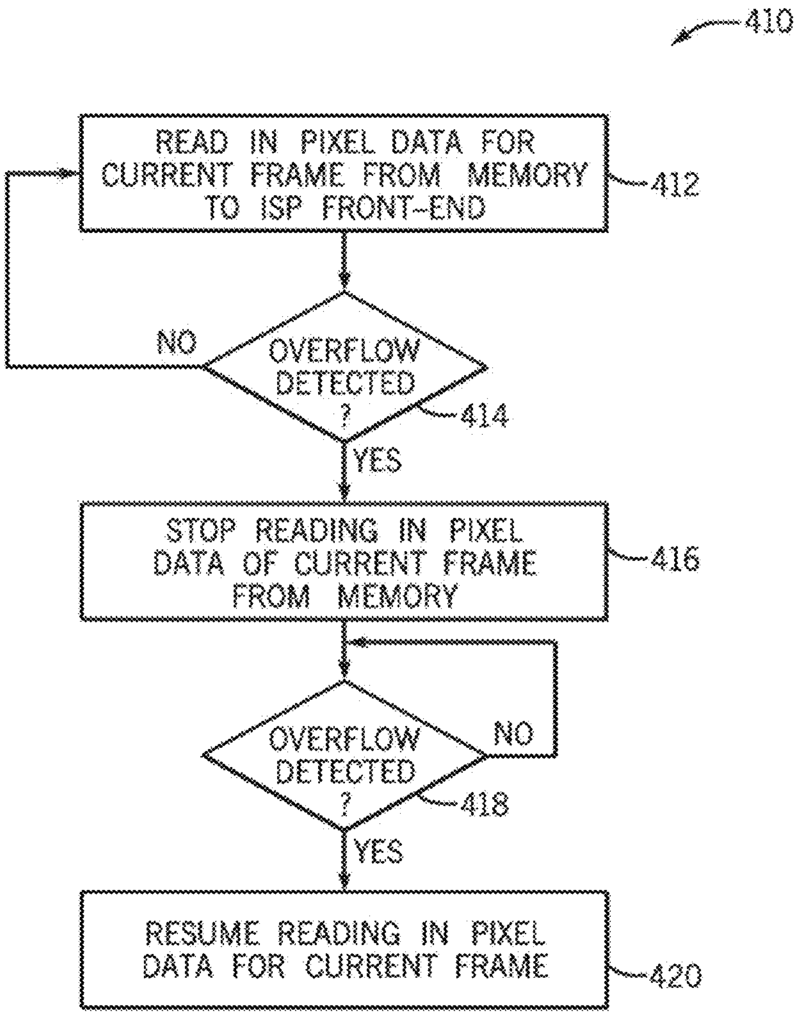
FIG. 45 is a flowchart depicting a method for overflow handling when an overflow condition occurs while image pixel data is being read from picture memory, in accordance with an embodiment.

As shown in FIG. 45, the flowchart 410 may begin at block 412, when pixel data for a current from is read from memory to the ISP pipe processing logic 80. Decision logic 414 may determine whether an overflow condition is present. This decision may involve determining the state of bits in the IRQ register(s) 404. If no overflow condition is detected, then the flowchart 410 returns to block 412 and continues to read in pixels from the current frame. If an overflow condition is detected by decision logic 414, pixels of the current frame may no longer be read from memory, as shown by block 416. Next, at decision logic 418, it is determined whether the overflow condition has recovered. If the overflow condition persists, the process may wait at the decision logic 418 until the overflow condition recovers. If decision logic 418 indicates that the overflow condition has recovered, the process proceeds to block 420 and pixel data for the current frame may resume being read from memory.

When an overflow condition occurs while input pixel data is being read in from the sensor interface(s) 90*a* or 90*b*, interrupts may indicate which downstream units (e.g., processing blocks or destination memory) generated the overflow. In one embodiment, overflow handling may be provided based on two scenarios. In a first scenario, the overflow condition occurs during an image frame, but recovers before the start of the subsequent image frame. In this case, input pixels from the image sensor are dropped until the overflow condition recovers and space becomes available in the input queue corresponding to the image sensor. The control logic 84 may use a counter 406 to track the number of dropped pixels and/or dropped frames. When the overflow condition recovers, the dropped pixels may be replaced with undefined pixel values (e.g., all 1's, all 0's, or a value programmed into a data register that sets what the undefined pixel values are), and downstream processing may resume. In a further embodiment, the dropped pixels may be replaced with a previous non-overflow pixel (e.g., the last "good" pixel read into the input buffer). Doing so may ensure that a correct number of pixels (e.g., a number of pixels corresponding to the number of pixels expected in a complete frame) is sent to the ISP pipe processing logic 80, thus enabling the ISP pipe processing logic 80 to output the correct number of pixels for the frame that was being read in from the sensor input queue when the overflow occurred.

While the correct number of pixels may be output by the ISP pipe processing logic 80 under this first scenario, depending on the number of pixels that were dropped and replaced during the overflow condition, software handling (e.g., firmware), which may be implemented as part of the control logic 84, may choose to drop (e.g., exclude) the frame from being sent to the display 28 and/or written to the memory 100. Such a determination may be based, for example, upon the value of the dropped pixel counter 406 compared to an acceptable dropped pixel threshold value. For instance, if an overflow condition occurs only briefly during the frame such that only a relatively small amount of pixels are dropped (e.g., and replaced with undefined or dummy values; e.g., 10-20 pixels or less), then the control logic 84 may choose to display and/or store this image despite the small number of dropped pixels, even though the presence of the replacement pixels may produce minor artifacts in the resulting image. However, owing to the small number of replacement pixels, such artifacts may go generally unnoticed or may be only marginally perceptible to a user. That is, the presence of any such artifacts due to the undefined pixels from the brief overflow condition may not significantly degrade the aesthetic quality of the image (e.g., any such degradation may be minimal or negligible to the human eye).

In a second scenario, the overflow condition may remain present into the start of the subsequent image frame. In this case, the pixels of the current frame are also dropped and counted like the first scenario described above. However, if an overflow condition is still present upon detecting a VSYNC rising edge (e.g., indicating the start of a subsequent frame), the ISP pipe processing logic 80 may hold off the next frame, thus dropping the entire next frame. In this scenario, the next frame and subsequent frames will continue to be dropped until overflow recovers. Once the overflow recovers, the previously current frame (e.g., the frame being read when the overflow was first detected) may replace its dropped pixels with the undefined pixel values, thus allowing the ISP pipe processing logic 80 to output the correct number of pixels for that frame. Thereafter, downstream processing may resume. As for the dropped frames, the control logic 84 may further include a counter that counts the number of dropped frames. This data may be used to adjust timings for audio-video synchronization. For instance, for video captured at 30 fps, each frame has a duration of approximately 33 milliseconds. Thus, if three frames are dropped due to overflow, then the control logic 84 may be configured to adjust audio-video synchronization parameters to account for the approximately 99 millisecond (33 milliseconds×3 frames) duration attributable to the dropped frames. For instance, to compensate for time attributable due to the dropped frames, the control logic 84 may control image output by repeating one or more previous frames.

Figure 46:
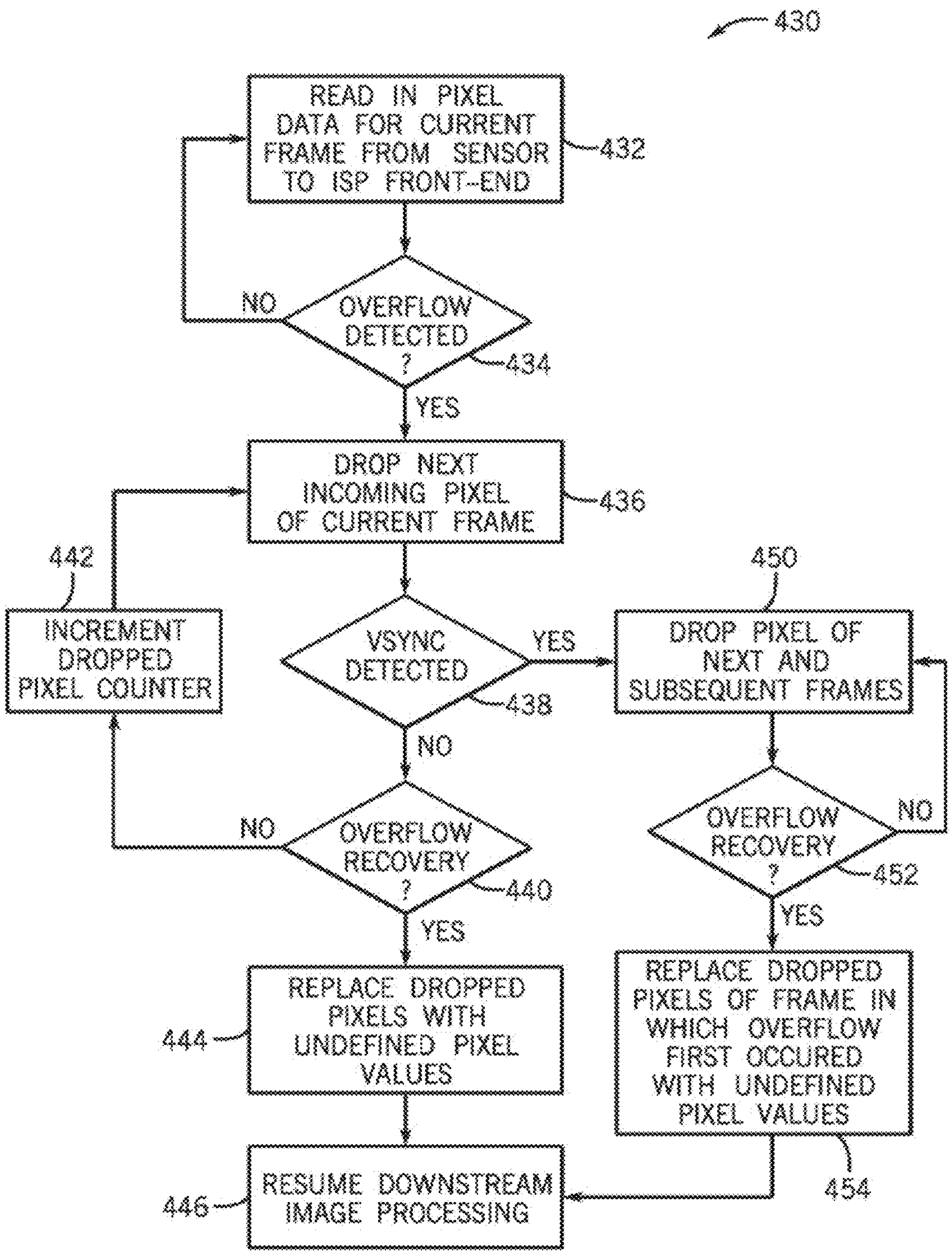
FIG. 46 is a flowchart depicting a method for overflow handling when an overflow condition occurs while image pixel data is being read in from an image sensor interface, in accordance with an embodiment.

An example of a flowchart 430 representing the above-discussed scenarios that may occur when input pixel data is being read from the sensor interfaces appears in FIG. 46. As shown, the flowchart 430 begins at block 432, at which pixel data for a current frame is read in from the sensor to the ISP pipe processing logic 80. Decision logic 434 then determines whether an overflow condition exists. If there is no overflow, the flowchart 430 continues, as pixels of the current frame are read (e.g., returning to block 432). If decision logic 434 determines that an overflow condition is present, then the flowchart 430 continues to block 436, where the next incoming pixel of the current frame is dropped. Next, decision logic 438 determines whether the current frame has ended and the next frame has begun. For instance, in one embodiment, this may include detecting a rising edge in the VSYNC signal. If the sensor is still sending the current frame, the flowchart 430 continues to decision logic 440, which determines whether the overflow condition originally detected at logic 434 is still present. If the overflow condition has not recovered, then the flowchart 430 proceeds to block 442, at which the dropped pixel counter is incremented (e.g., to account for the incoming pixel dropped at block 436). The method then returns to block 436 and continues.

If, at decision logic 438, it is detected that the current frame has ended and that the sensor 90 is sending the next frame (e.g., VSYNC rising detected), then the flowchart 430 proceeds to block 450. At block 450, all pixels of the next and subsequent frames are dropped as long as the overflow condition remains (e.g., shown by decision logic 452). As discussed above, a separate counter 406 may track the number of dropped frames, which may be used to adjust audio-video synchronization parameters. If decision logic 452 indicates that the overflow condition has recovered, then the dropped pixels from the initial frame in which the overflow condition first occurred are replaced with a number of undefined pixel values corresponding to the number of dropped pixels from that initial frame, as indicated by the dropped pixel counter. As mentioned above, the undefined pixel values may be all 1's, all 0's, a replacement value programmed into a data register, or may take the value of a previous pixel that was read before the overflow condition (e.g., the last pixel read before the overflow condition was detected). Accordingly, this allows the initial frame to be processed with the correct number of pixels and, at block 446, downstream image processing may continue, which may include writing the initial frame to memory. As also discussed above, depending on the number of pixels that were dropped in the frame, the control logic 84 may either choose to exclude or include the frame when outputting video data (e.g., if the number of dropped pixels is above or below an acceptable dropped pixel threshold). As may be appreciated, overflow handling may be performed separately for each input queue 400 and 402 of the image processing circuitry 32.

Figure 47:
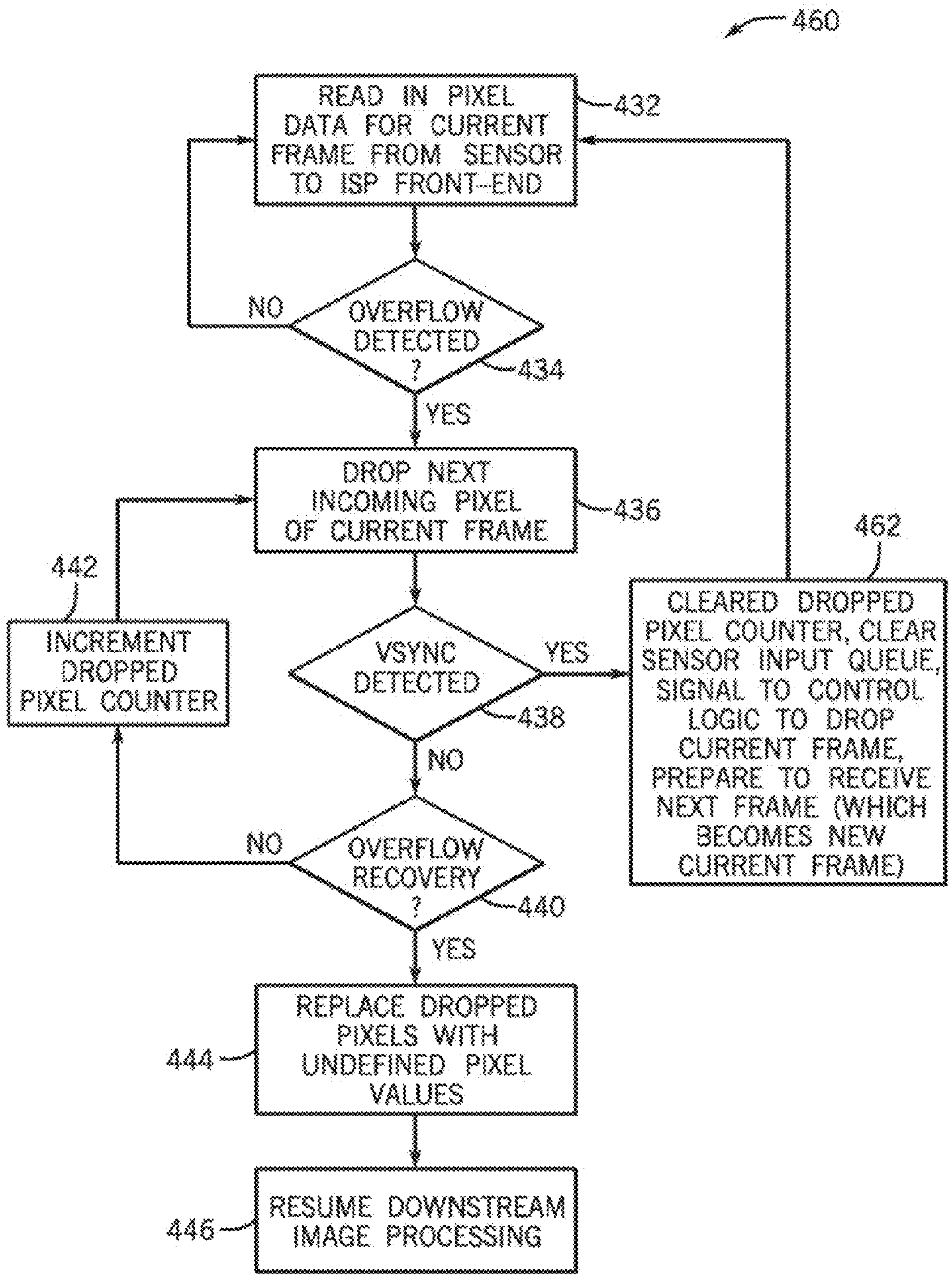
FIG. 47 is a flowchart depicting another method for overflow handling when an overflow condition occurs while image pixel data is being read in from an image sensor interface, in accordance with an embodiment.

Another example of overflow handling that may be implemented in accordance with the present disclosure is shown in FIG. 47 by way of a flowchart 460. Here, overflow handling for an overflow condition that occurs during a current frame but recovers before the end of a current frame is handled in the same manner as shown in FIG. 46 and, therefore, those steps have thus been numbered with like reference numbers 432-446. The difference between the flowchart 460 of FIG. 47 and the flowchart 430 of FIG. 46 pertains to overflow handling when an overflow condition continues into the next frame. For instance, referring to decision logic 438, when the overflow condition continues into the next frame, rather than drop the next frame as in the flowchart 430 of FIG. 46, the flowchart 460 implements block 462, in which the dropped pixel counter is cleared, the sensor input queue is cleared, and the control logic 84 is signaled to drop the partial current frame. By clearing the sensor input queue and dropped pixel counter, the flowchart 460 prepares to acquire the next frame (which now becomes the current frame), returning the method to block 432. As may be appreciated, pixels for this current frame may be read into the sensor input queue. If the overflow condition recovers before the input queue becomes full, then downstream processing resumes. However, if the overflow condition persists, the flowchart 460 will continue from block 436 (e.g., begin dropping pixels until overflow either recovers or the next frame starts).

Statistics Logic

As mentioned above, the statistics logic 140*a* and 140*b* may collect various statistics about the image data. These statistics may include information relevant to the sensors 90*a* and 90*b* that capture and provide the raw image signals (e.g., Sif0 94*a* and Sif1 94*b*), such as statistics relating to auto-exposure, auto-white balance, auto-focus, flicker detection, black level compensation, and lens shading correction, and so forth. The statistics logic 140*a* and 140*b* may also collect statistics used to control aspects of the ISP pipe processing logic 80, such as local tone mapping and local histogram statistics, local thumbnail statistics, fixed pattern noise statistics, and so forth.

Figure 48:
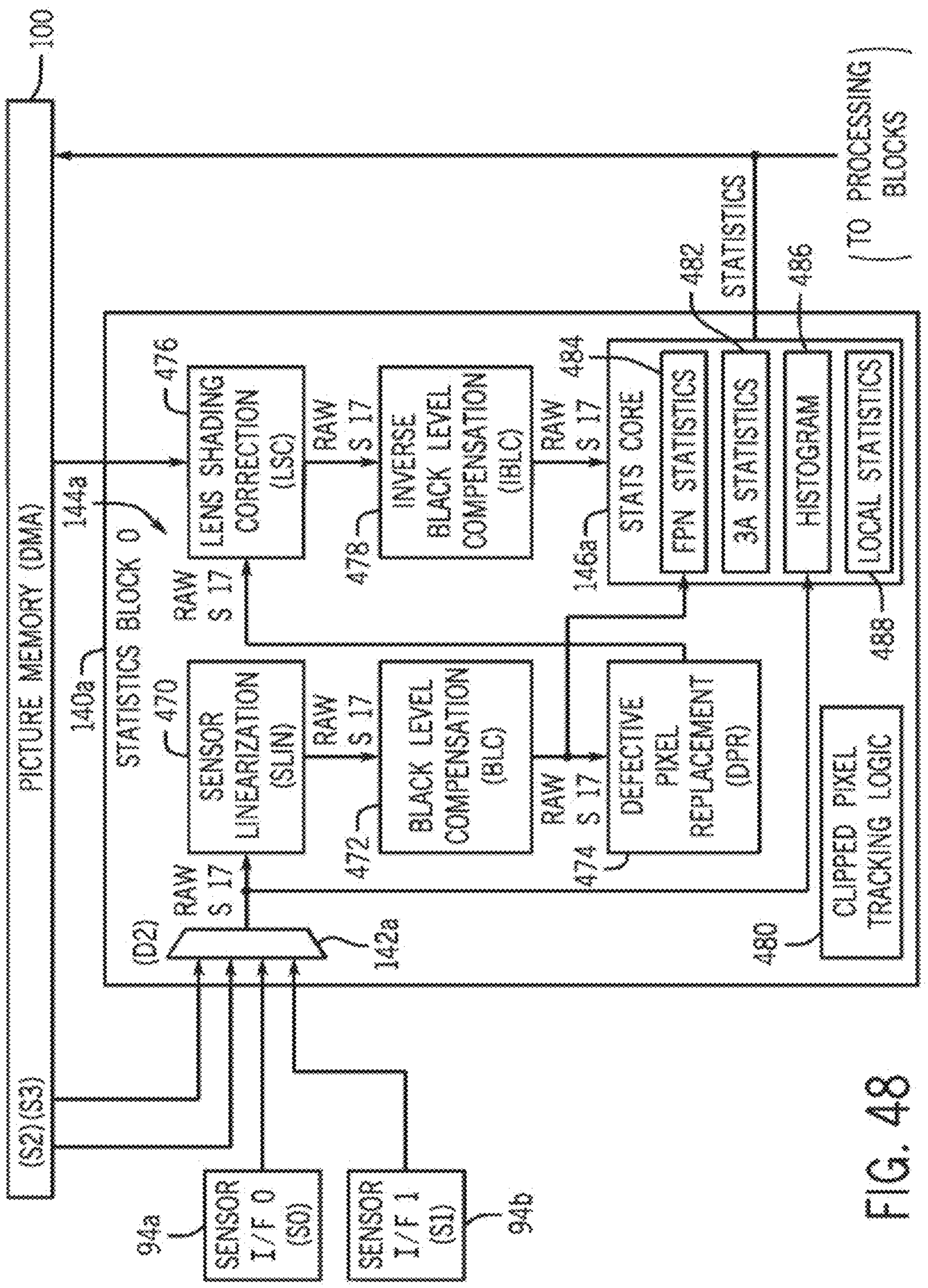
FIG. 48 is more a more detailed block diagram showing embodiments of statistics processing logic that may be implemented in the ISP pipe processing logic, as shown in FIG. 8, in accordance with an embodiment.

An example of some of the components of the statistics logic 140*a* appears in FIG. 48. It may be recalled that the statistics logic 140*a* and 140*b* are substantially identical. As such, only statistics logic 140*a* is shown in FIG. 48, but it should be appreciated that the statistics logic 140*b* may contain similar components. The statistics logic 140*a* may receive raw image data deriving from the first sensor interface 94*a* (S0), the second sensor interface 94*b* (S1), or the memory 100 (S2 and S3). The image data may be converted to signed 17-bit format by the scale and offset logic 82, which is discussed above with reference to FIGS. 40-43. Since the scale and offset logic 82 may be implemented as functions of the DMA input, this element is not otherwise shown in FIG. 48. Selection logic 142*a* may select which of the input signals to process.

The statistics image processing logic 144*a* may process some of the input image data before collecting statistics in the statistics core 146*a*. As shown in FIG. 48, however, certain other image data may not be processed through the statistics image processing logic 144*a*. Image data that is processed through the statistics image processing logic 144*a* may be decimated, in some embodiments, to facilitate processing. By way of example, before substantial processing by the statistics image processing logic 144*a*, the image data may be decimated by a factor of four (e.g., 4×4 averaged). If decimating before substantial processing in the statistics image processing logic 144*a* (e.g., before sensor linearization (SLIN) logic 470), this may be noted by clipped pixel tracking, as will be described below.

As illustrated, the statistics image processing logic 144*a* may include sensor linearization (SLIN) logic 470, black level compensation (BLC) logic 472, defective pixel replacement (DPR) logic 474, lens shading correction (LSC) logic 476, and/or inverse black level compensation (IBLC) logic 478. These processes will be discussed in greater detail below. The statistics core 146*a* may use image data output by the inverse black level compensation (IBLC) (block 478). While image data is being processed in the statistics image processing logic 144*a* or while statistics are being collected in the statistics core 146*a*, clipped pixel tracking logic 480 may track pixels that are gained beyond the maximum pixel value.

The statistics core 146*a* may collect statistics using 8-bit or 16-bit data. Collecting statistics using 16-bit data may provide more precise statistics and may be advantageous for many applications (e.g., handling image data from high dynamic range (HDR) image sensors 90). Many legacy algorithms may use 8-bit statistics, however, so the statistics core 146*a* may collect 8-bit or 16-bit statistics based on a selection by the software controlling the ISP pipe processing logic 80. The statistics core 146*a* may include "3A" statistics collection logic 482 to collect statistics relating to auto-exposure, auto-white balance, auto-focus, and similar operations; fixed pattern noise (FPN) statistics collection logic 484; histogram statistics collection logic 486; and/or local statistics collection logic 488.

The statistics core 146*a* may receive the output of the IBLC logic 478 and convert the input pixels to 16-bit or 8-bit, scaling the input pixels appropriately. In addition, the FPN statistics collection logic 484 may receive interim image data output by the defective pixel replacement (DPR) block 474. The histogram statistics collection logic 486 may receive image data that is not processed through the statistics image processing logic 144*a*. Statistics from the statistic core 146*a* may be output to the memory 100 or to other processing blocks of the ISP pipe processing logic 80. How the components of the statistics core 146*a* collect statistics will be discussed in greater detail further below, following a discussion of the components of the statistics image processing logic 144*a*.

As discussed above, the statistics logic 140*a* and/or 140*b* may track clipped pixels using clipped pixel tracking logic 480. Although the clipped pixel tracking logic 480 is illustrated as a discrete functional block in FIG. 48, and may track pixels in a centralized way (e.g., an array of flags corresponding to every pixel being processed through the in some embodiments, clipped pixel tracking may be carried out diffusely throughout the statistics logic 140*a* and/or 140*b*. For example, pixels passing through the statistics logic 144*a* and/or 144*b* may be defined not only by pixel data, but also by a clipped pixel flag that moves with the pixel throughout the statistics logic 140*a* and/or 140*b*.

FIG. 223 provides one example of pixel data that may be used in the statistics processing logic 140*a* and/or 140*b*. In the example of FIG. 223, a pixel 5300 being processed through the statistics image processing logic 144*a* or 144*b* may include signed 17-bit pixel data 5302 and a clipped pixel flag 5304. In other embodiments, the pixel 5300 may include pixel data 5302 of any other suitable bit depth, which may be signed or unsigned. The clipped pixel flag 5304 may represent one or more bits that, when set, indicate that the pixel data 5302 has been clipped—that is, that the pixel data 5302 has been processed in such a way that the pixel data 5302 that some image information has been lost. When the pixel data 5302 has been clipped, the pixel data 5302 may not be reliable for collecting certain statistics.

The clipped pixel flag 5304 may indicate that and/or where the pixel data 5302 was clipped. In one example, the clipped pixel flag 5304 may be a single bit that may indicate only that the pixel 5300 has been clipped somewhere in the statistics image processing logic 144*a* and/or 144*b*. In other embodiments, however, the clipped pixel flag 5304 may take up more than one bit. For such embodiments, the clipped pixel flag 5304 may indicate not only that the pixel data 5302 has been clipped, but also the particular operation where it was clipped.

To provide a brief example of the operation of a multi-bit clipped pixel flag 5304, when the black level compensation (BLC) logic 472 causes the pixel 5300 to clip, the clipped pixel flag may be set to a numerical value to indicate that the BLC logic 472 caused the pixel 5300 to clip. For example, the clipped pixel flag 5304 may be a 3-bit value that is set to 0 when the pixel data 5302 is not clipped, to 1 when the sensor linearization (SLIN) logic 470 causes the pixel data 5302 to clip, to 2 when the BLC logic 472 causes the pixel data 5302 to clip, to 3 when the lens shading correction (LSC) logic 476 causes the pixel data 5302 to clip, and 4 when the IBLC logic 478 causes the pixel data 5302 to clip. Subsequently, particular logical blocks of the statistics cores 146*a* and/or 146*b* may determine to collect statistics using the pixel 5300 depending on whether clipping in the BLC logic 472, or the LSC logic 476 still results in image data usable by particular logic of the statistics core 146*a* and/or 146*b*. As should be appreciated, the above discussion presents only one example of such a multi-bit clipped pixel flag 5304. Other embodiments may include more or fewer bits and may also indicate, for example, when a pixel is clipped by more than one block, or may be concerned only with clipping caused by certain blocks.

In still other examples, the clipped pixel flag 5304 may indicate the extent of pixel data 5302 clipping. For instance, the clipped pixel flag 5304 may be set to a first value when an operation of the statistics image processing logic 144*a* and/or 144*b* would have been—had the pixel data 5302 had not been clipped—over the maximum value that can be stored in the pixel data 5302, but beneath a first threshold. The clipped pixel flag 5304 may be set to a second value when an operation of the statistics image processing logic 144*a* and/or 144*b* would have been—had the pixel data 5302 had not been clipped—at or above the first threshold.

In any case, the various functional blocks of the statistics cores 146*a* and/or 146*b* may use the clipped pixel flag 5304 or any other indications that a specific pixel has been clipped (e.g., discrete counters in the clipped pixel tracking logic 480) in collecting image statistics. For example, software controlling the ISP pipe processing logic 80 may program the various functional blocks of the statistics cores 146*a* and/or 146*b* to use or not to use certain pixels in calculating statistics based on whether the pixel has been clipped, where the pixel has been clipped, and/or the extent to which the pixel has been clipped. In this way, statistics collection using clipped pixels may vary depending on the reason for processing the pixels in the ISP pipe processing logic 80. The various functional blocks of the statistics image processing logic 144*a* may also vary operation based on whether a pixel is indicated as clipped. For instance, a pixel in a filter may not be considered if it has been clipped, which may prevent the clipped pixel from skewing the output with erroneous information.

Any of the statistics collection logic discussed below may include or exclude pixels from statistics collection depending on whether the pixel is indicated as clipped and/or where or to what extent the pixel is indicated as clipped (e.g., as indicated by a clipped pixel flag 5304 or by clipped pixel tracking logic 480). Namely, white balancing may incorrectly identify the color temperature of a scene if clipped pixels are used, so white balancing components of the 3A statistics collection logic 482 may discard clipped pixel values. Similarly, autofocus components of the 3A statistics collection logic 482 may discard clipped pixel values because using blown-out regions of the image data may generate incorrect focal results.

Whether a particular component of the statistics core 146*a* (including sub components, such as the various elements of the 3A statistics collection logic 482) uses a clipped pixel may be hard-coded or controlled by software. That is, in some embodiments, all components of the statistics core 146*a* may exclude clipped pixels from statistics. In other embodiments, software may control (e.g., toggle) whether particular components of the statistics core 146*a* use clipped pixels. Additionally or alternatively, a single global toggle selection may enable software to determine whether all of the components of the statistics core 146*a* consider clipped pixels in determining statistics.

Statistics Image Processing Logic

The discussion will now turn to the statistics image processing logic 144. It should be appreciated that many of the image processing operations discussed in relation to the statistics logic 140 may be employed in the same or a similar manner by the other image processing functional blocks of the ISP pipe processing logic 80, namely those of the raw processing logic (RAWProc) 150.

Sensor Linearization (SLIN) Logic

Raw image data received from some sensors 90, particularly high dynamic range (HDR) sensors, may be nonlinear. For instance, raw image data in a companding format first may need to be mapped from nonlinear space to a linear space. The sensor linearization logic 470 of the statistics image processing logic 144*a* may perform such a conversion. One example of the sensor linearization (SUN) logic 470 appears in FIG. 49.

Figure 49:
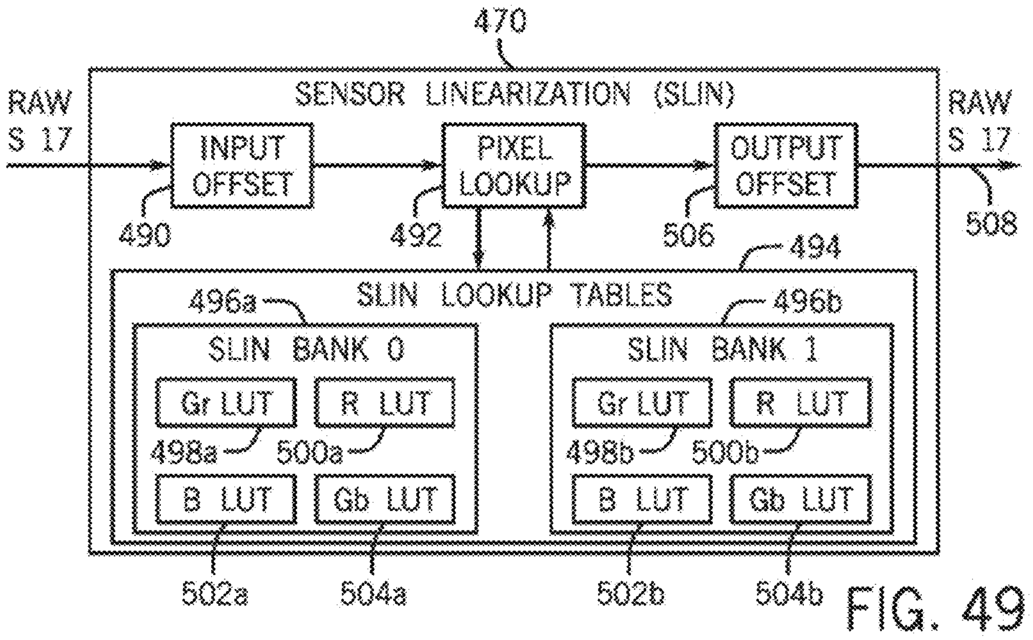
FIG. 49 is a block diagram of sensor linearization logic that may be employed by the statistics processing logic of the ISP pipe processing logic, in accordance with an embodiment.

As seen in FIG. 49, the sensor linearization (SLIN) logic 470 may receive input pixels in raw format (e.g., signed 17-bit raw format) one pixel at a time. An input offset value (block 490) may be applied to each input pixel. If the pixel value exceeds the signed 17-bit range after the input offset is applied, the pixel value may be clamped and an input clip counter may be incremented. A pixel lookup block 492 may obtain a new pixel value by using the output of the input offset logic 490 as an index value to a lookup table (LUT) 494. The LUT 494 may map nonlinear input pixel values to linear output pixel values. In the example of FIG. 49, the LUT 494 of the sensor linearization (SLIN) logic 470 includes two banks of lookup tables 496*a* and 496*b*, each including respective lookup tables for each raw color pixel. As may be recalled from the discussion relating to FIG. 2, above, Bayer pixels of the raw image data format may be one of four colors: green-red (Gr), red (R), blue (B), and green-blue (Gb). As such, each bank of lookup tables 496*a* or 496*b* may include a respective lookup table (LUT) for each raw input pixel color component. These are represented as Gr LUT 498, R LUT 500, B LUT 502, and Gb LUT 504. After looking up the new pixel value via the pixel lookup block 492, the sensor linearization (SLIN) logic 470 may optionally apply an output offset 506 to produce an output pixel, now linearized, illustrated at numeral 508. If the pixel value after the output offset exceeds the signed 17-bit range, the pixel value may be clamped to the signed 17-bit range and an output clip counter may be incremented.

Figure 50:
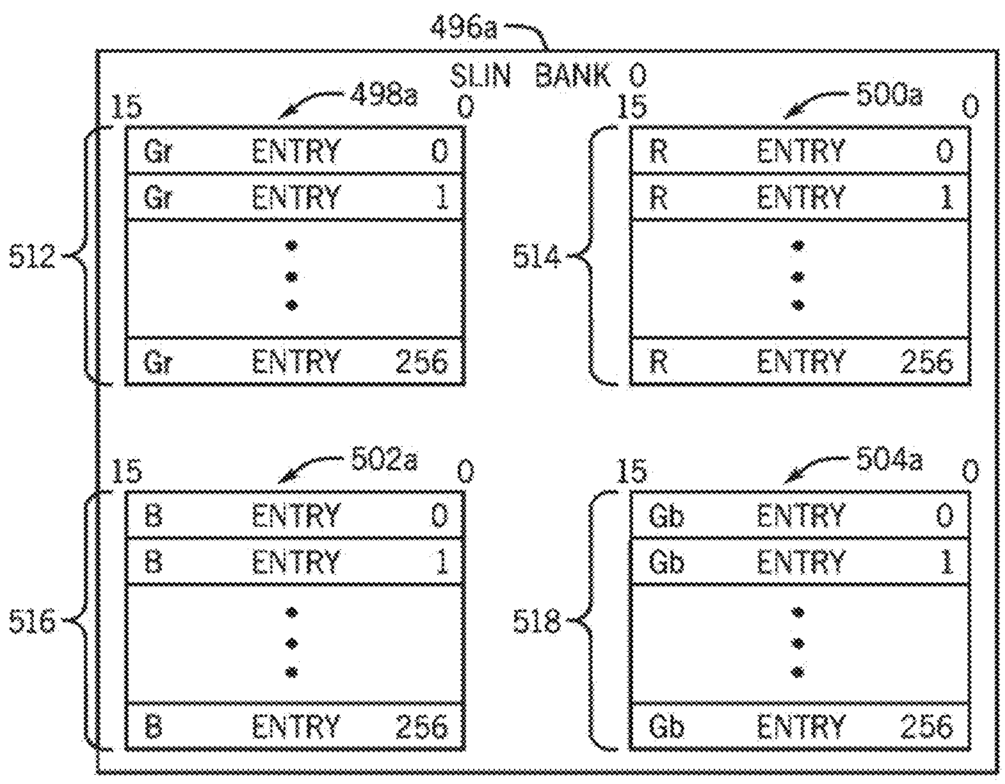
FIG. 50 is a block diagram illustrating sensor linearization lookup tables (LUTs) employed by the sensor linearization logic, in accordance with an embodiment.

As seen in a more detailed schematic block diagram of the lookup table bank 496*a* shown in FIG. 50, each lookup table 498*a*, 500*a*, 502*a*, and 504*a* may include any suitable number of entries. The entries of the lookup tables 498, 500, 502, and 504 are noted as numerals 512, 514, 516, and 518, respectively. The entries 512, 514, 516, and 518 may be of any suitable number (e.g., 33, 65, 129, or, in the illustrated example, 257, or more) and may have any suitable bit depth (e.g., 8, 10, 12, 14, or, in the illustrated example, 16 bits, or more). The value of the entries 512, 514, 516, and 518 may represent pre-offset output pixel levels that map non-linear sensor values to linear image pixel values. In the example of FIG. 50, the 257 input entries of each lookup table 498, 500, 502, and 504 may be evenly distributed in the range of 8- to 16-bit input pixel values.

Only the lookup table bank 496*a* is shown in FIG. 50, but it should be appreciated that the lookup table bank 496*b* may operate in a substantially similar way. Because the lookup tables 498, 500, 502, and 504 are double-banked in the lookup table banks 496*a* and 496*b*, firmware may update one of the banks 496*a* or 496*b* while the sensor linearization (SLIN) logic 470 is processing the image data using the other bank (e.g., bank 496*a*). The lookup tables 498, 500, 502, and 504 may be loaded individually, or all four inactive tables can be loaded with the same values.

Figure 51:
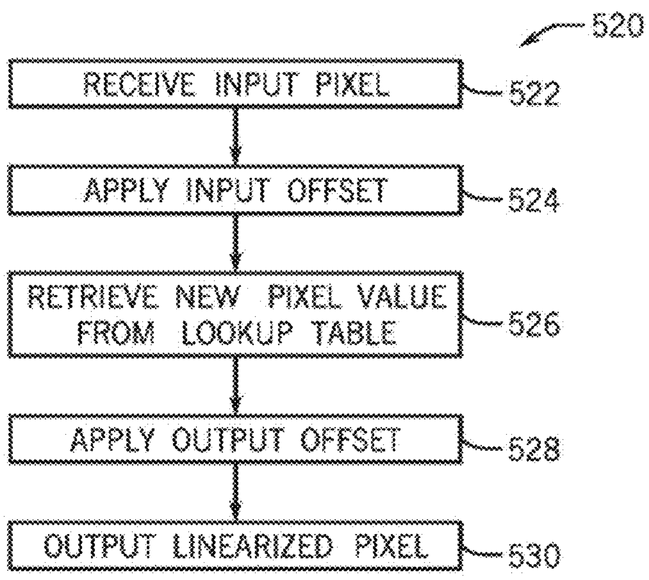
FIG. 51 is a flowchart describing a method for linearizing image data from a sensor using the sensor linearization logic, in accordance with an embodiment.

An example operation of the sensor linearization (SLIN) logic 470 appears in a flowchart 520 of FIG. 51. The flowchart 520 may begin when the sensor linearization (SLIN) logic 470 receives an input pixel in raw format (block 522). The sensor linearization (SLIN) logic 470 may apply an input offset value (block 524). The input offset value that is applied may be a signed value applied before the sensor linearization (SLIN) logic 470 looks up the new value of the pixel in the lookup tables 494. For negative pixel values, the pixel value selected from the lookup table 498, 500, 502, or 504 may be the absolute value of the input pixel. The sign of the image data may be applied after the resulting lookup table output value has been obtained. It may be appreciated that this is equivalent to miring the lookup tables 498, 500, 502, and 504 around zero.

As mentioned above, the 257 input entries 512, 514, 516, or 518 may be evenly distributed in the range of 8- to 16-bit input pixel values. Thus, when the input pixel value falls between the intervals of the 257 entries (e.g., between entries 54 and 55), the output values may be linearly interpolated using the two values between which the input pixel value falls. As should be appreciated, the input bit depth may determine the amount of interpolated bits. For 8-bit input, no interpolation need be performed. For 10-16 bit input pixels, however, the lower 2-8-bits will be used for interpolation. The firmware may thus select the fraction for interpolation based on the bit depth of the input pixels to obtain a output linear pixel output value.

Having retrieved a linearized pixel value from the lookup tables 494, the sensor linearization (SLIN) logic 470 may apply an output offset value (block 528). The output offset value may be signed (i.e., may add or subtract from the value obtained from the lookup tables 494). The sensor linearization (SLIN) logic 470 then may output the resulting linear pixels 508 to be processed by the black level compensation (BLC) block 472.

Black Level Compensation (BLC)

Returning to FIG. 48, the output of the sensor linearization (SLIN) logic 470 may be passed to the black level compensation (BLC) logic 472. The BLC logic 472 may provide for digital gain, offset, and clipping independently for each color component "c" (e.g., R, B, Gr, and Gb for Bayer) on the pixels used for statistics collection. For instance, as expressed by the following operation, the input value for the current pixel is first offset by a signed value, and then multiplied by a gain.

$$Y=(X+O[c])\times G[c] \quad (1),$$

where X represents the input pixel value for a given color component c (e.g., R, B, Gr, or Gb), O[c] represents a signed 16-bit offset for the current color component c, G[c] represents a gain value for the color component c, and Y represents the output pixel value. In one embodiment, the gain G[c] may be a 16-bit unsigned number with 2 integer bits and 14 fraction bits (e.g., 2.14 in floating point representation), and the gain G[c] may be applied with rounding. By way of example, the gain G[c] may have a range of between 0 to 4 (e.g., 4 times the input pixel value).

Next, as shown by Equation 2 below, the computed value Y, which is signed, may then be then clipped to a minimum and maximum range:

$$Y=(Y<\min[c])?\min[c]:(Y>\max[c])?\max[c]:Y) \quad (2).$$

The variables min[c] and max[c] may represent signed 16-bit clipping values for the minimum and maximum output values, respectively. In one embodiment, the BLC logic 472 may also be configured to maintain a count of the number of pixels that were clipped above and below maximum and minimum, respectively, per color component. Additionally or alternatively, the clipped pixel tracking logic 480 may globally track pixels clipped throughout the statistics logic 140*a*. In some embodiments, when the pixel is clipped, a clipped pixel flag associated with the clipped pixel may be set to indicate that the pixel was clipped, that the pixel was clipped by the BLC logic 472, and/or the extent to which the pixel was clipped.

Defective Pixel Replacement

As may be appreciated, the image sensor(s) 90 may not always perfectly capture every pixel of light. Some of the pixels of the sensor(s) 90 may be "defective pixels," a term that refers to imaging pixels within the image sensor(s) 90 that fail to sense light levels accurately. Defective pixels may attributable to a number of factors, and may include "hot" (or leaky) pixels, "stuck" pixels, and "dead pixels." A "hot" pixel generally appears as being brighter than a non-defective pixel given the same amount of light at the same spatial location. Hot pixels may result due to reset failures and/or high leakage. For example, a hot pixel may exhibit a higher than normal charge leakage relative to non-defective pixels, and thus may appear brighter than non-defective pixels. Additionally, "dead" and "stuck" pixels may be the result of impurities, such as dust or other trace materials, contaminating the image sensor during the fabrication and/or assembly process, which may cause certain defective pixels to be darker or brighter than a non-defective pixel, or may cause a defective pixel to be fixed at a particular value regardless of the amount of light to which it is actually exposed. Additionally, dead and stuck pixels may also result from circuit failures that occur during operation of the image sensor. By way of example, a stuck pixel may appear as always being on (e.g., fully charged) and thus appears brighter, whereas a dead pixel appears as always being off.

The defective pixel replacement (DPR) logic 474 may correct defective pixels by replacing them with other values before the pixels are considered in statistics collection in the statistics core 146*a*. With reference again to FIG. 48, it may be seen that the DPR logic 474 appears after the BLC logic 472. By performing defective pixel replacement after, rather than before, black level compensation, the black levels may be more accurately represented (since replacing some of the defective pixels may disadvantageously change the black level of the image data). In other embodiments, however, the DPR logic 474 may occur before the BLC logic 472.

In one embodiment, defective pixel correction is performed independently for each color component (e.g., R, B, Gr, and Gb for a Bayer pattern). Generally, the DPR logic 474 may provide for dynamic defect correction, wherein the locations of defective pixels are determined automatically based upon directional gradients computed using neighboring pixels of the same color. As will be understand, the defects may be "dynamic" in the sense that the characterization of a pixel as being defective at a given time may depend on the image data in the neighboring pixels. By way of example, a stuck pixel that is always on maximum brightness may not be regarded as a defective pixel if the location of the stuck pixel is in an area of the current image that is dominate by brighter or white colors. Conversely, if the stuck pixel is in a region of the current image that is dominated by black or darker colors, then the stuck pixel may be identified as a defective pixel during processing by the DPR logic 474 and corrected accordingly.

Figure 52:
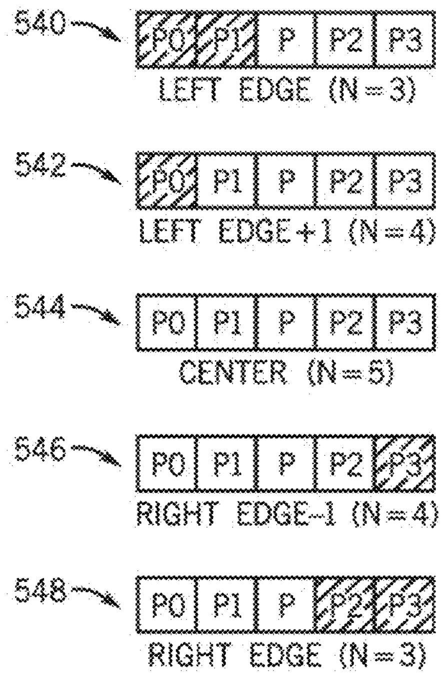
FIG. 52 shows various image frame boundary cases that may be considered when applying techniques for detecting and correcting defective pixels during statistics processing by the statistics processing unit of FIG. 48, in accordance with an embodiment.

The DPR logic 474 may use one or more horizontal neighboring pixels of the same color on each side of a current pixel to determine if the current pixel is defective using pixel-to-pixel directional gradients. If a current pixel is identified as being defective, the value of the defective pixel may be replaced with the value of a horizontal neighboring pixel. For instance, in one embodiment, five horizontal neighboring pixels of the same color that are inside the raw frame 310 (FIG. 21) boundary are used, wherein the five horizontal neighboring pixels include the current pixel and two neighboring pixels on either side. Thus, as illustrated in FIG. 52, for a given color component c and for the current pixel P, horizontal neighbor pixels P0, P1, P2, and P3 may be considered by the DPR logic 474. It should be noted, however, that depending on the location of the current pixel P, pixels outside the raw frame 310 are not considered when calculating pixel-to-pixel gradients.

For instance, as shown in FIG. 52, in a "left edge" case 540, the current pixel P is at the leftmost edge of the raw frame 310 and, thus, the neighboring pixels P0 and P1 outside of the raw frame 310 are not considered, leaving only the pixels P, P2, and P3 (N=3). In a "left edge+1" case 542, the current pixel P is one unit pixel away from the leftmost edge of the raw frame 310 and, thus, the pixel P0 is not considered. This leaves only the pixels P1, P, P2, and P3 (N=4). Further, in a "centered" case 544, pixels P0 and P1 on the left side of the current pixel P and pixels P2 and P3 on the right side of the current pixel P are within the raw frame 310 boundary and, therefore, all of the neighboring pixels P0, P1, P2, and P3 (N=5) are considered in calculating pixel-to-pixel gradients. Additionally, similar cases 546 and 548 may be encountered as the rightmost edge of the raw frame 310 is approached. For instance, given the "right edge−1" case 546, the current pixel P is one unit pixel away the rightmost edge of the raw frame 310 and, thus, the pixel P3 is not considered (N=4). Similarly, in the "right edge" case 548, the current pixel P is at the rightmost edge of the raw frame 310 and, thus, both of the neighboring pixels P2 and P3 are not considered (N=3).

In the illustrated embodiment, for each neighboring pixel (k=0 to 3) within the picture boundary (e.g., raw frame 310), the pixel-to-pixel gradients may be calculated as follows:

$$G_k = \mathrm{abs}(P - P_k),\ \text{for } 0 \le k \le 3 \text{ (only for } k \text{ within the raw frame)} \quad (3).$$

Once the pixel-to-pixel gradients have been determined, defective pixel detection may be performed by the DPR logic 474 as follows. First, it is assumed that a pixel is defective if a certain number of its gradients $G_k$ are at or below a particular threshold, denoted by the variable dprTh. Thus, for each pixel, a count (C) of the number of gradients for neighboring pixels inside the picture boundaries that are at or below the threshold dprTh is accumulated. By way of example, for each neighbor pixel inside the raw frame 310, the accumulated count C of the gradients $G_k$ that are at or below the threshold dprTh may be computed as follows:

$$C = \sum_{k}^{N} (G_k \le dprTh), \quad (4)$$

for 0≤k≤3 (only for k within the raw frame).

As may be appreciated, depending on the color components, the threshold value dprTh may vary. Next, if the accumulated count C is determined to be less than or equal to a maximum count, denoted by the variable dprMaxC, then the pixel may be considered defective. This logic is expressed below:

$$\text{if } (C \le \mathrm{dprMax}C), \text{ then the pixel is defective} \quad (5).$$

Defective pixels are replaced using a number of replacement conventions. For instance, in one embodiment, a defective pixel may be replaced with the pixel to its immediate left, P1. At a boundary condition (e.g., P1 is outside of the raw frame 310), a defective pixel may replaced with the pixel to its immediate right, P2. Further, it should be understood that replacement values may be retained or propagated for successive defective pixel detection operations. For instance, referring to the set of horizontal pixels shown in FIG. 52, if P0 or P1 were previously identified by the DPR logic 474 as being defective pixels, their corresponding replacement values may be used for the defective pixel detection and replacement of the current pixel P.

Figure 53:
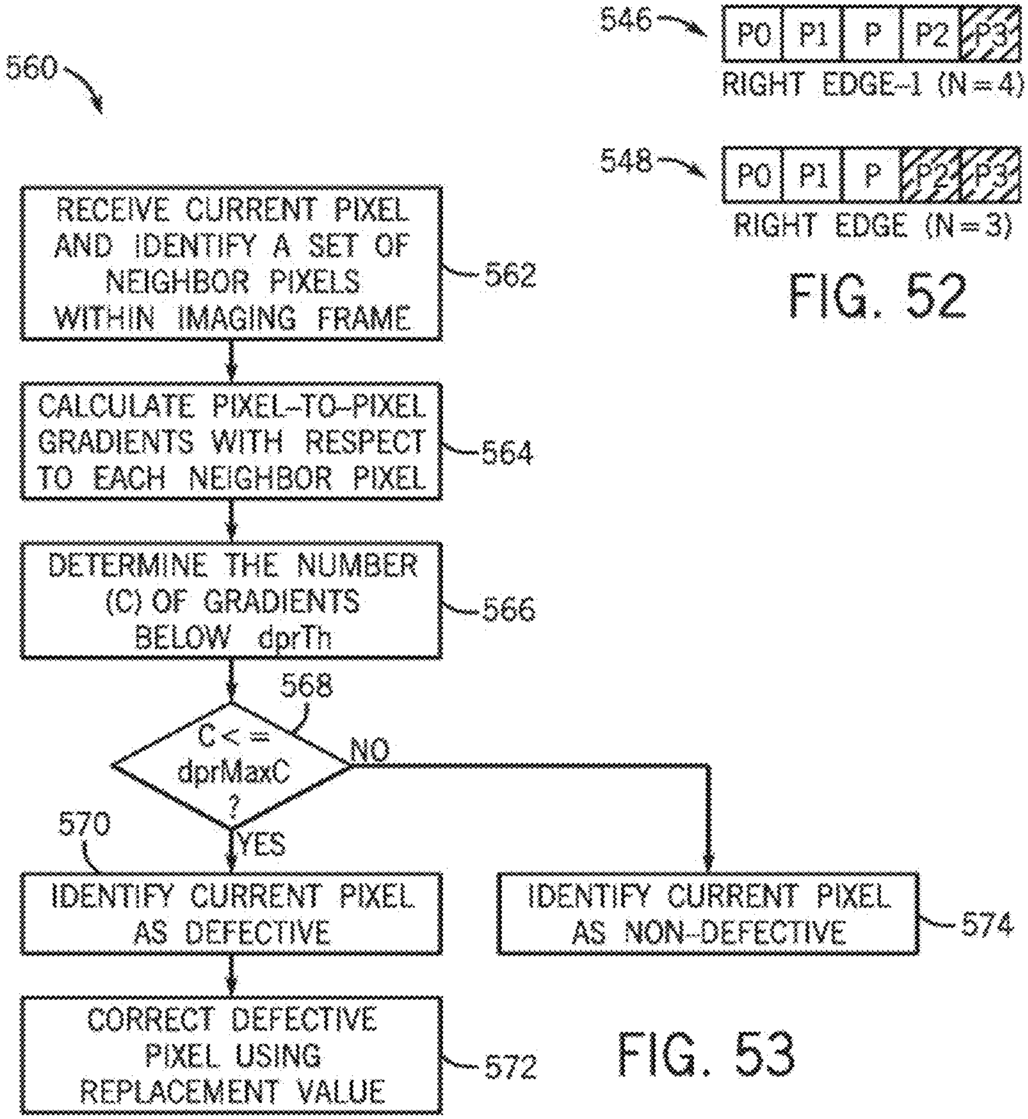
FIG. 53 is a flowchart illustrating a process for performing defective pixel detection and correction during statistics processing, in accordance with an embodiment.

To summarize the above-discussed defective pixel detection and correction techniques, a flowchart depicting such a process is provided in FIG. 53 and referred to by reference number 560. As shown, process 560 begins at step 562, at which a current pixel (P) is received and a set of neighbor pixels is identified. In accordance with the embodiment described above, the neighbor pixels may include two horizontal pixels of the same color component from opposite sides of the current pixel (e.g., P0, P1, P2, and P3). Next, at step 564, horizontal pixel-to-pixel gradients are calculated with respect to each neighboring pixel within the raw frame 310, as described in Equation 3 above. Thereafter, at step 566, a count C of the number of gradients that are less than or equal to a particular threshold dprTh is determined. As shown at decision logic 568, if C is less than or equal to dprMaxC, then the process 560 continues to step 570, and the current pixel is identified as being defective. The defective pixel is then corrected at step 572 using a replacement value. Additionally, referring back to decision logic 568, if C is greater than dprMaxC, then the process continues to step 574, and the current pixel is identified as not being defective, and its value is not changed.

It should be noted that the defective pixel detection/correction techniques applied during the ISP pipe processing logic 80 statistics processing may be less robust than defective pixel detection/correction that is performed in the ISP pipe logic 82. For instance, as will be discussed in further detail below, defective pixel detection/correction performed in the ISP pipe logic 82 may, in addition to dynamic defect correction, further provide for fixed defect correction, wherein the locations of defective pixels are known a priori and loaded in one or more defect tables. Further, dynamic defect correction may in the ISP pipe logic 82 may also consider pixel gradients in both horizontal and vertical directions, and may also provide for the detection/correction of speckling, as will be discussed below.

Lens Shading Correction (LSC)

The geometric optics of the lens may result in a drop-off in intensity that is roughly proportional to the distance from the lens optical center. Lens shading correction logic 476 may be used to correct these anomalies by applying a gain per pixel to compensate for these drop-offs in intensity.

Figure 54:
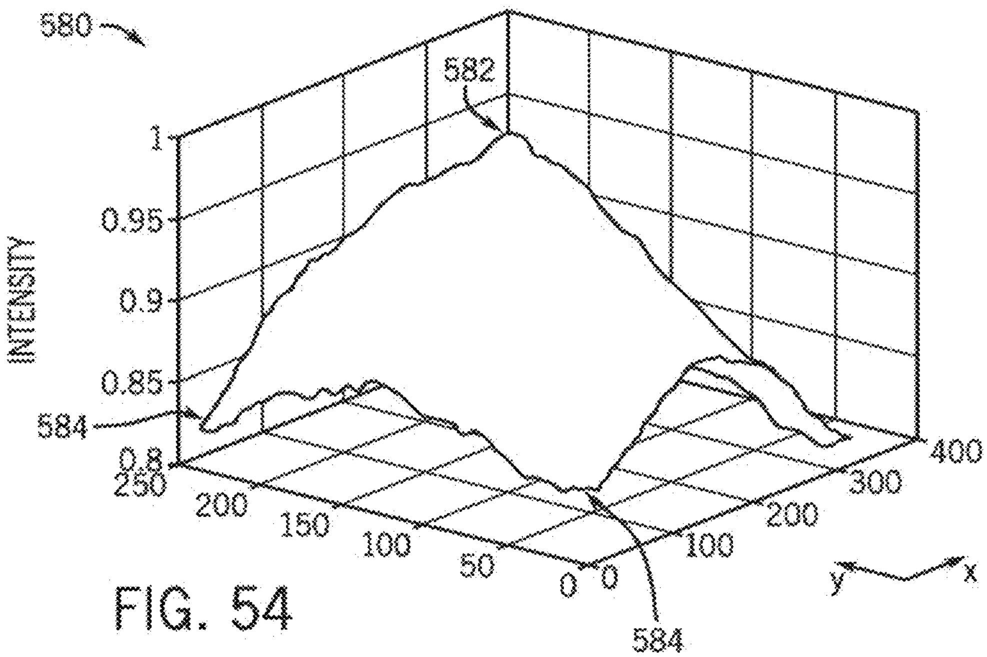
FIG. 54 shows a three-dimensional profile depicting light intensity versus pixel position for a conventional lens of an imaging device.

Referring to FIG. 54, a three-dimensional profile 580 depicting light intensity versus pixel position for a typical lens is illustrated. As shown, the light intensity near the center 582 of the lens gradually drops off towards the corners or edges 584 of the lens. The lens shading irregularities depicted in FIG. 54 may be better illustrated by FIG. 55, which shows a photograph 586 that exhibits drop-offs in light intensity towards the corners and edges. Particularly, it should be noted that the light intensity at the approximate center of the image appears to be brighter than the light intensity at the corners and/or edges of the image.

In accordance with an embodiments, lens shading correction gains may be specified as a two-dimensional grid of gains per color channel (e.g., Gr, R, B, Gb for a Bayer filter). The gain grid points may be distributed at fixed horizontal and vertical intervals. The grid point gain data may be stored in memory external to the ISP circuitry, thus facilitating access to the data without necessitating a load of a portion of the grid into the ISP circuitry's internal memory. Further, because the external memory may include an increased capacity over the ISP circuitry's internal memory, grid point gain data for the entire sensor (or multiple sensors if so equipped) may be stored in the external memory. Thus, as will be described in more detail below, the ISP circuitry may simply reference a pointer to an external memory address where the grid point gain data is stored for the entire sensor and navigate to the relevant portion of the grid point gain data. The lens shading correction gains may be represented in the same order as they Bayer image and, in some embodiments, including a 16-bit gain per color component. As discussed above in FIG. 21, the raw frame 310 may include an active region 312 which defines an area on which processing is performed for a particular image processing operation. With regard to the lens shading correction operation, an active processing region, which may be referred to as the LSC region, is defined within the raw frame region 310. As will be discussed below, the LSC region may be completely inside or at the gain grid boundaries, otherwise results may be undefined.

Figure 56:
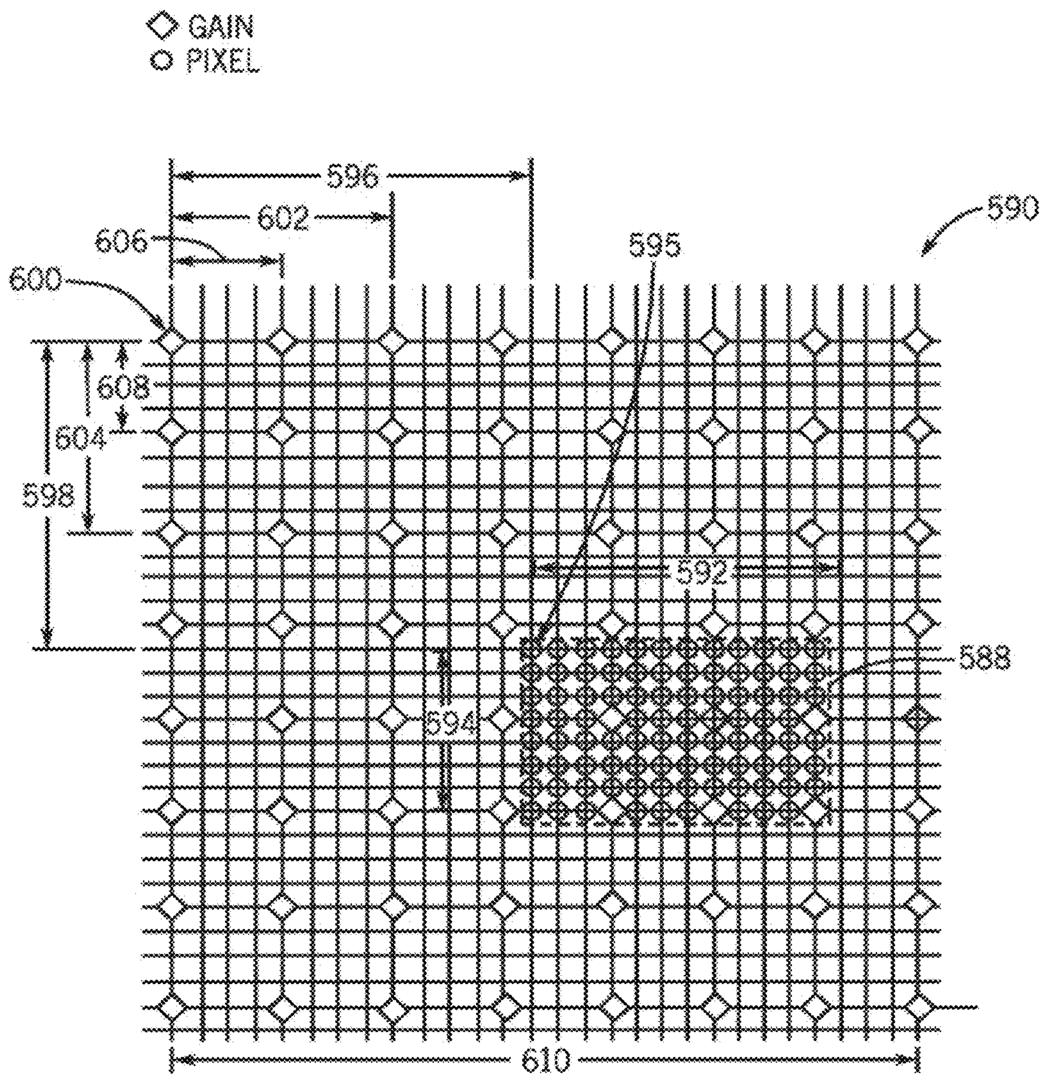
FIG. 56 is a graphical illustration of a raw imaging frame that includes a lens shading correction region and a gain grid, in accordance with an embodiment.

For instance, referring to FIG. 56, an LSC region 588 and a gain grid 590 that may be defined within an input frame are shown. The LSC region 588 may have a width 592 and a height 594. Further, the starting pixel 595 of the LSC region

588 may be defined by an x-offset 596 and a y-offset 598 with respect to a lens shading gain base 600. For example, the x-offset 596 and y-offset 598 may define a grid frame offset from the lens shading gain base 300 to the first pixel in the LSC region 588. Thus, the relative position of the LSC region 588 to the gain grid 600 may be determined.

The horizontal (x-direction) and vertical (y-direction) grid point intervals 602 and 604, respectively, may be specified independently for each color channel. These grid point intervals 602 and 604 define the intervals between grid points of the same color channel. The grid point interval can be set to an arbitrary value in the horizontal and vertical directions. In the Raw Processing block lens correction shading discussed below, the grid point intervals may be set to 1 or between 4-256. In the statistics block lens shading correction, the grid point intervals may be between 16-256 in units of the Bayer quad. As will be discussed in more detail below, pixel gain values may be interpolated based upon the nearby grid gain values. However, when the intervals are set to 1, these gain values are not interpolated. Instead, the previous gain value read from the LSC gain memory is used.

The horizontal (x-direction) and vertical (y-direction) grid point spacing 606 and 608, respectively, may represent the position of the gain value of the Bayer quad gains relative to the first gain at the lens shading gain base 600. This spacing may be used to set the sampling interval of the gain values in the gain grid 600. In one example, when the gain grid 600 is co-located for all colors, the grid spacing is zero. Alternatively, when the grid gain points are equally spaced, the grid point spacing 606 and 608 will be half the grid intervals 602 and 604, respectively. The grid spacing 606 and 608 will necessarily be less than the grid intervals 602 and 604, respectively. Further, a lens shading correction gain stride 610 may represent the distance between two vertically adjacent gain grids 590.

The lens shading correction (LSC) gains may be represented in the same order as a Bayer image, with 16-bit gain per color component. The color of the first pixel in the LSC grid gain may be programmed by software. Each 16-bit representation may contain an LSC gain value with 13 fractional bits (e.g., a 3.13 bit representation). As can be appreciated, by utilizing the address of lens shading gain base 600 and the grid offsets, the same gain memory can be used while the sensor cropping region is changing. For example, instead of the ISP circuitry having to update grid gain values in internal memory, the ISP circuitry, by merely updating a few parameters (e.g., the grid point intervals 602 and 604), may align the proper grid points for the changed cropping region. By way of example only, this may be useful when cropping is used during digital zooming operations. Further, while the gain grid 600 shown in the embodiment of FIG. 56 is depicted as having generally equally spaced grid points, it should be understood that in other embodiments, the grid points may not necessarily be equally spaced. For instance, in some embodiments, the grid points may be distributed unevenly (e.g., logarithmically), such that the grid points are less concentrated in the center of the LSC region 588, but more concentrated towards the corners of the LSC region 588, typically where lens shading distortion is more noticeable.

In accordance with the presently disclosed lens shading correction techniques, when a current pixel location is located outside of the LSC region 588, no gain is applied (e.g., the pixel is passed unchanged). When the current pixel location is at a gain grid location, the gain value at that particular grid point may be used. However, when a current pixel location is between grid points, the gain may be interpolated using bilinear interpolation. An example of interpolating the gain for the pixel location "G" on FIG. 21 is provided below.

Figure 57:
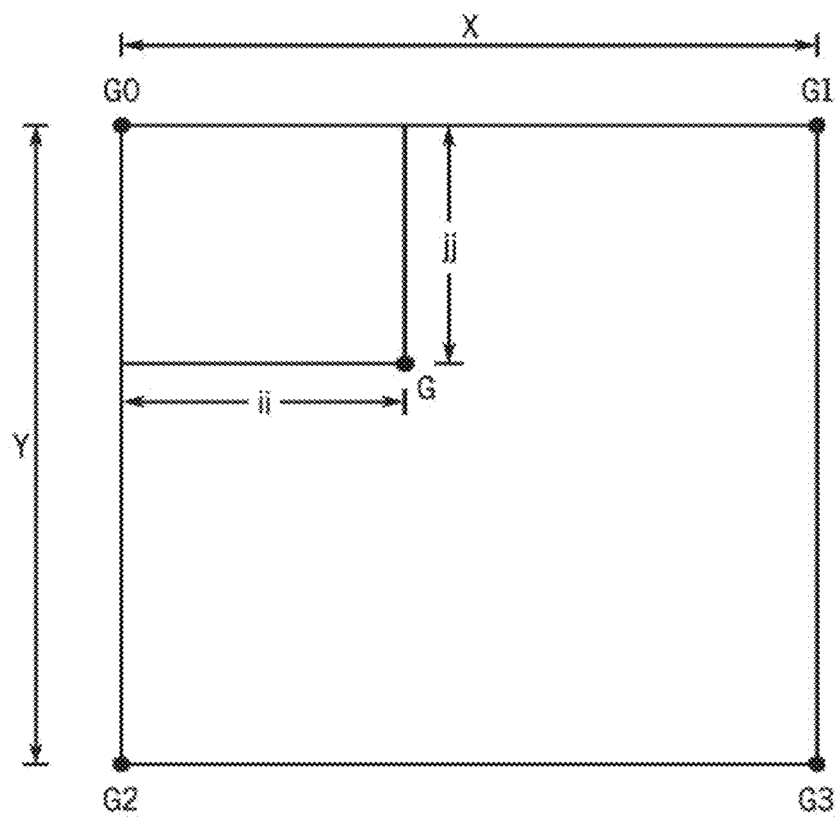
FIG. 57 illustrates the interpolation of a gain value for an image pixel enclosed by four bordering grid gain points, in accordance with an embodiment.

As shown in FIG. 57, the pixel G is between the grid points G0, G1, G2, and G3, which may correspond to the top-left, top-right, bottom-left, and bottom-right gains, respectively, relative to the current pixel location G. The horizontal and vertical size of the grid interval is represented by X and Y, respectively. Additionally, ii and jj represent the horizontal and vertical pixel offsets, respectively, relative to the position of the top left gain G0. Based upon these factors, the gain corresponding to the position G may thus be interpolated as follows:

$$G = \frac{(G0(Y-jj)(X-ii)) + (G1(Y-jj)(ii)) + (G2(jj)(X-ii)) + (G3(ii)(jj))}{XY}. \tag{6a}$$

The terms in Equation 6a above may then be combined to obtain the following expression:

$$G = \frac{G0[XY - X(jj) - Y(ii) + (ii)(jj)] + G1[Y(ii) - (ii)(jj)] + G2[X(jj) - (ii)(jj)] + G3[(ii)(jj)]}{XY}. \tag{6b}$$

In one embodiment, since X and Y are constant for the input frame, a reciprocal value may be used to avoid a divide as follows:

$$G=(G0(Y-j)(X-ii))+(G1(Y-jj)(ii))+(G2(jj)(X-ii))+(G3(ii)(j))*\text{recipricol})>>32$$

where reciprocal=(1<<32)/(XY).

In certain embodiments, the gain may have a range of between 0 and 8×. The interpolated gain between grid points may retain full precision. Further, because the input pixel is signed, the output from the lens shading correction is also signed.

Statistics regarding the lens shading correction input and output pixels may be useful for further processing in the ISP pipeline. For example, lens shading correction statistics may collect a number of pixels that are above a programmable threshold value before and/or after the lens shading correction is applied. For example, in some embodiments, a programmable threshold value may be set to a sensor's saturation value. The lens shading correction statistics may count the number of pixels at or above the sensor's saturation value before lens shading correction is applied. Further, a second threshold value may be set to a desired clip level at the output of the lens shading correction. The lens shading correction statistics may count the number of pixels at or above the desired clip level after lens shading correction has been applied. The lens shading correction statistics may also count the number of pixels that both are above the sensor's saturation value before lens shading correction is applied and are above the desired clip level after the lens shading correction is applied.

Figure 58:
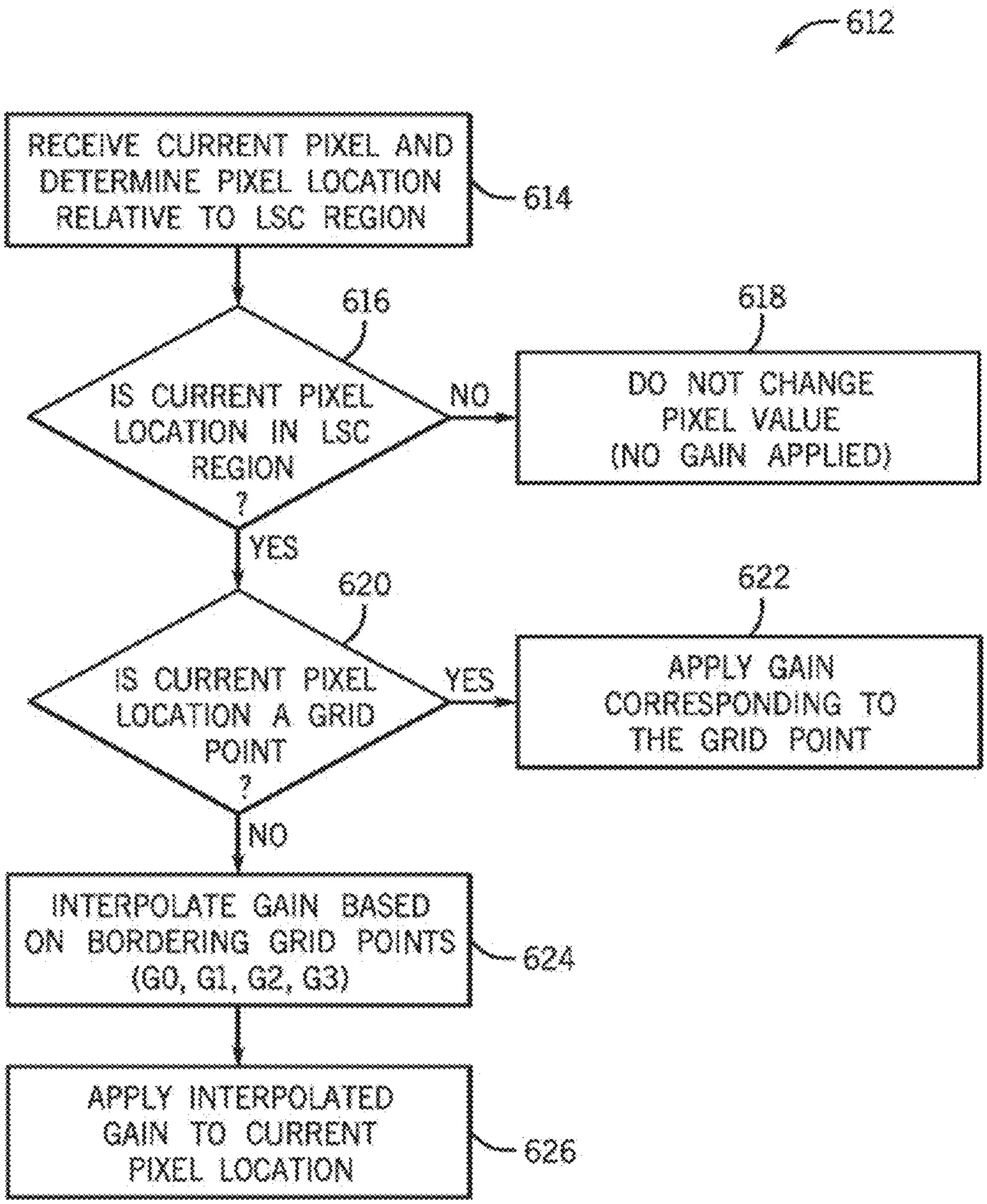
FIG. 58 is a flowchart illustrating a process for determining interpolated gain values that may be applied to imaging pixels during a lens shading correction operation, in accordance with an embodiment.

The lens shading correction techniques may be further illustrated by the process 612 shown in FIG. 58. As shown, process 612 begins at step 614, at which the position of a current pixel is determined relative to the boundaries of the LSC region 588 of FIG. 56. Next, decision logic 616 determines whether the current pixel position is within the LSC region 588. If the current pixel position is outside of the LSC region 588, the process 612 continues to step 618, and no gain is applied to the current pixel (e.g., the pixel passes unchanged).

If the current pixel position is within the LSC region 588, the process 612 continues to decision logic 620, at which it is further determined whether the current pixel position corresponds to a grid point within the gain grid 590. If the current pixel position corresponds to a grid point, then the gain value at that grid point is selected and applied to the current pixel, as shown at step 622. If the current pixel position does not correspond to a grid point, then the process 612 continues to step 624, and a gain is interpolated based upon the bordering grid points (e.g., G0, G1, G2, and G3 of FIG. 21). For instance, the interpolated gain may be computed in accordance with Equations 6a and 6b, as discussed above. Thereafter, the process 612 ends at step 626, at which the interpolated gain from step 624 is applied to the current pixel.

Figure 55:
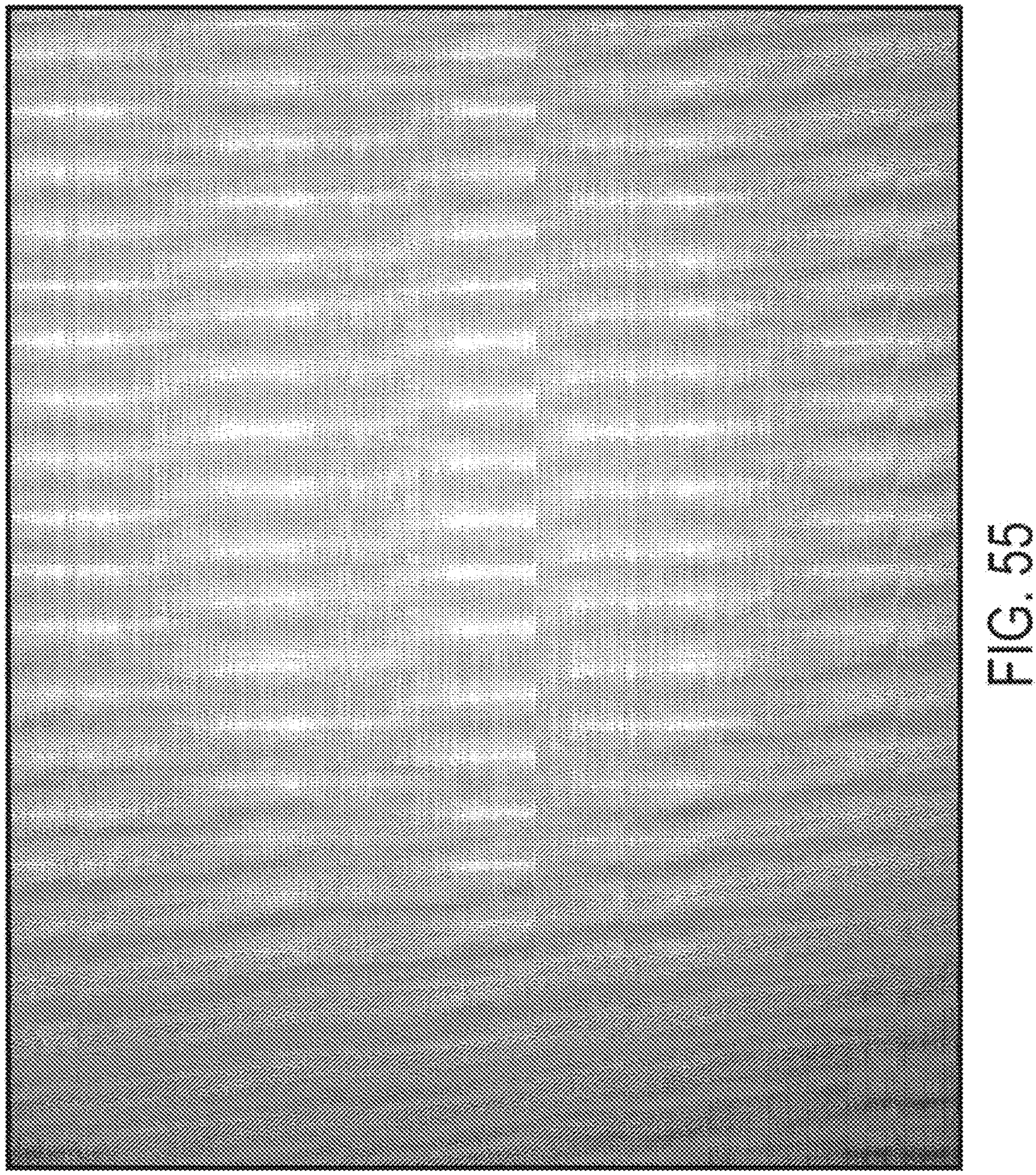
FIG. 55 is a colored drawing that exhibits non-uniform light intensity across the image, which may be the result of lens shading irregularities.
Figure 59:
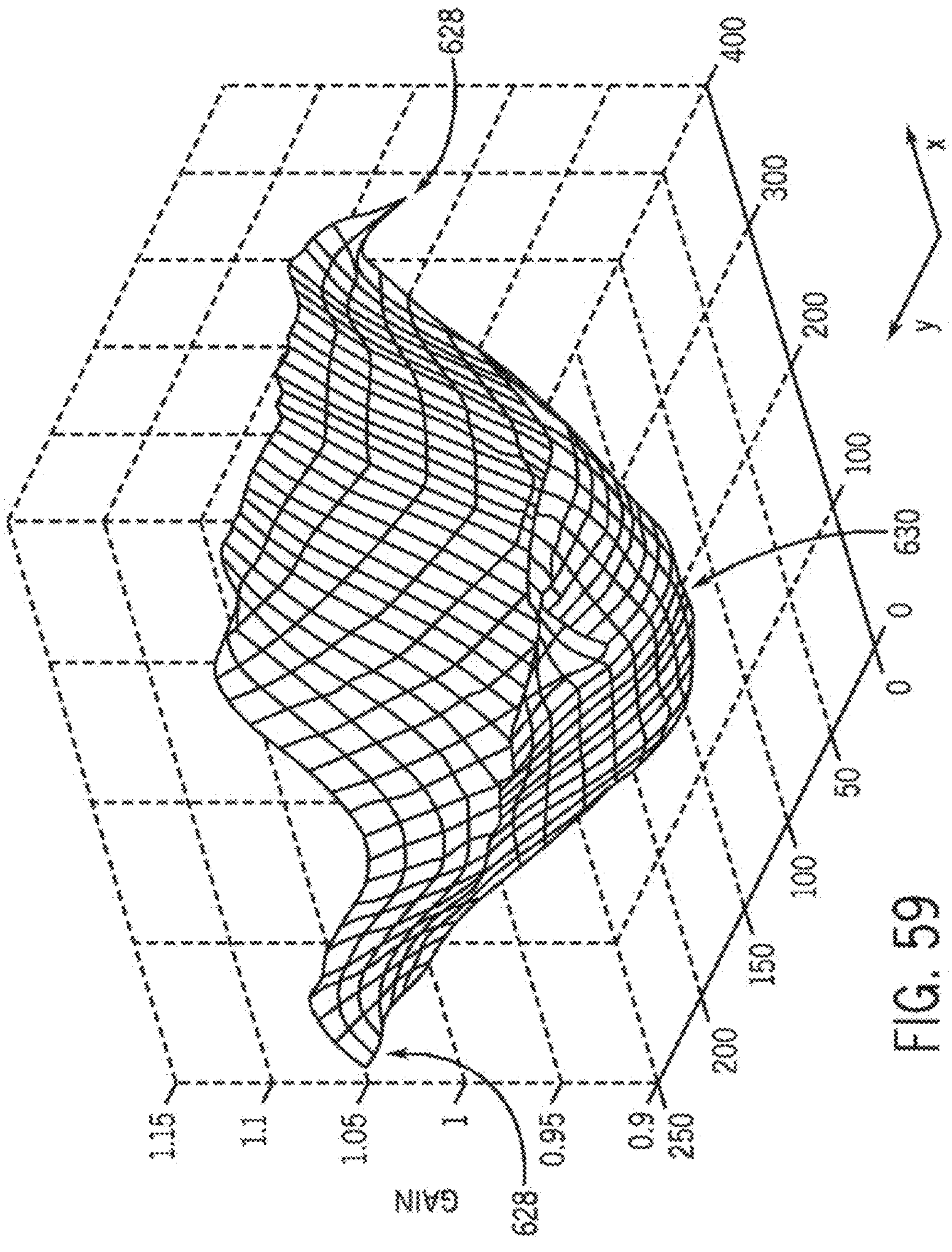
FIG. 59 is a three-dimensional profile depicting interpolated gain values that may be applied to an image that exhibits the light intensity characteristics shown in FIG. 54 when performing lens shading correction, in accordance with an embodiment.
Figure 60:
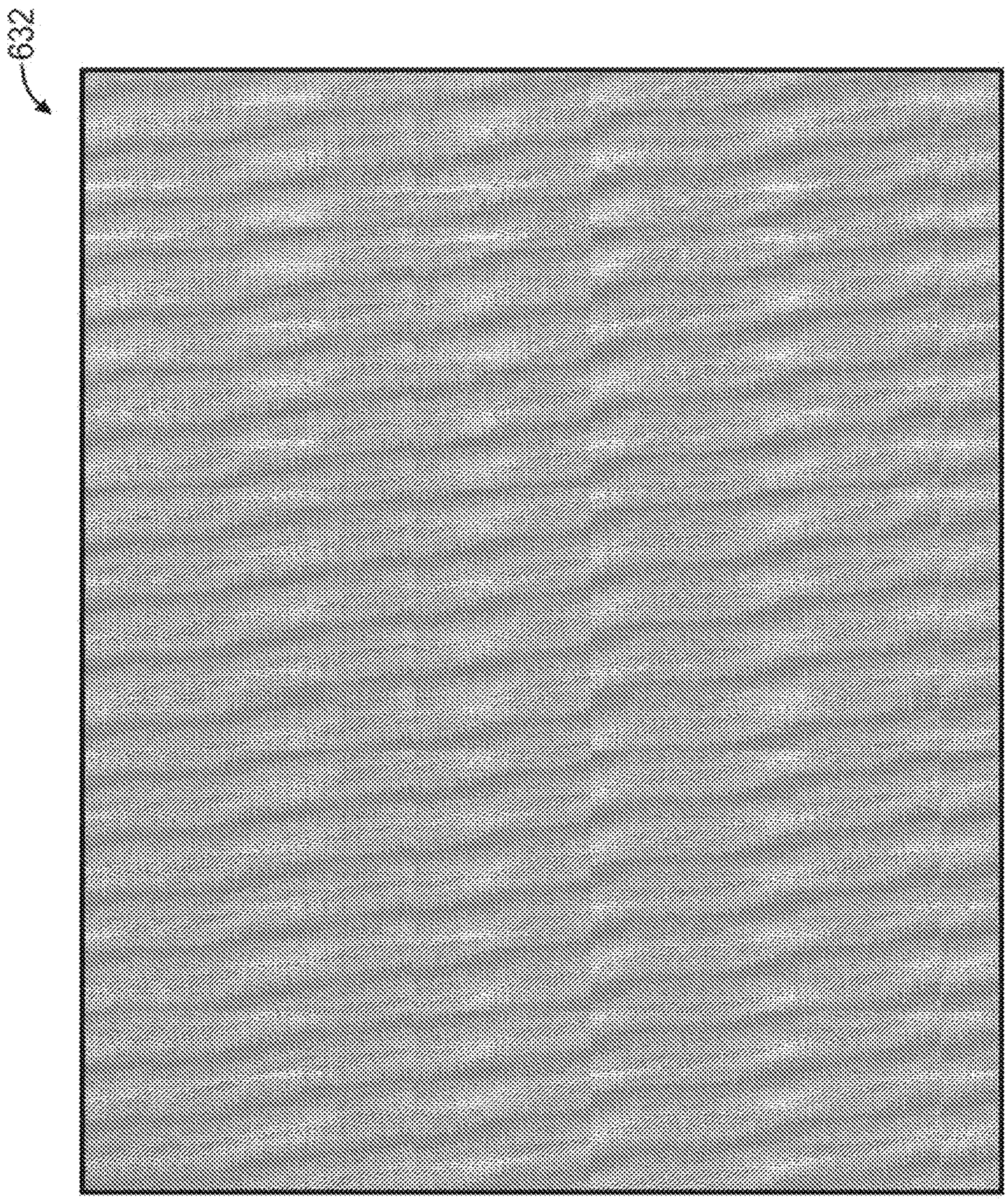
FIG. 60 shows the colored drawing from FIG. 55 that exhibits improved uniformity in light intensity after a lens shading correction operation is applied, in accordance with accordance aspects of the present disclosure.

As will be appreciated, the process 612 may be repeated for each pixel of the image data. For instance, as shown in FIG. 59, a three-dimensional profile depicting the gains that may be applied to each pixel position within a LSC region (e.g. 588) is illustrated. As shown, the gain applied at the corners 628 of the image may be generally greater than the gain applied to the center 630 of the image due to the greater drop-off in light intensity at the corners, as shown in FIGS. 54 and 55. Using the presently described lens shading correction techniques, the appearance of light intensity drop-offs in the image may be reduced or substantially eliminated. For instance, FIG. 60 provides an example of how the photograph 632 from FIG. 55 may appear after lens shading correction is applied. As shown, compared to the original image from FIG. 55, the overall light intensity is generally more uniform across the image. Particularly, the light intensity at the approximate center of the image may be substantially equal to the light intensity values at the corners and/or edges of the image. Additionally, as mentioned above, the interpolated gain calculation (Equations 6a and 6b) may, in some embodiments, be replaced with an additive "delta" between grid points by taking advantage of the sequential column and row incrementing structure. As will be appreciated, this reduces computational complexity.

In further embodiments, in addition to using grid gains, a global gain per color component that is scaled as a function of the distance from the image center is used. The center of the image may be provided as an input parameter, and may be estimated by analyzing the light intensity amplitude of each image pixel in the uniformly illuminated image. The radial distance between the identified center pixel and the current pixel, may then be used to obtain a linearly scaled radial gain, $G_r$, as shown below:

$$G_r=G_p[c]\times R \qquad (7),$$

where $G_p[c]$ represents a global gain parameter for each color component c (e.g., R, B, Gr, and Gb components for a Bayer pattern), and wherein R represents the radial distance between the center pixel and the current pixel.

With reference to FIG. 61, which shows the LSC region 588 discussed above, the distance R may be calculated or estimated using several techniques. As shown, the pixel C corresponding to the image center may have the coordinates $(x_0, y_0)$, and the current pixel G may have the coordinates $(x_G, y_G)$. In one embodiment, the LSC logic 476 may calculate the distance R using the following equation:

$$R=\sqrt{(x_G-x_0)^2+(y_G-y_0)^2} \qquad (8).$$

In another embodiment, a simpler estimation formula, shown below, may be utilized to obtain an estimated value for R.

$$R=\alpha\times\max(\mathrm{abs}(x_G-x_0),\mathrm{abs}(y_G-y_0))+\beta\times\min(\mathrm{abs}(x_G-x_0),\mathrm{abs}(y_G-y_0)) \qquad (9).$$

In Equation 9, the estimation coefficients α and β may be scaled to 8-bit values. By way of example only, in one embodiment, a may be equal to approximately 123/128 and β may be equal to approximately 51/128 to provide an estimated value for R. Using these coefficient values, the largest error may be approximately 4%, with a median error of approximately 1.3%. Thus, even though the estimation technique may be somewhat less accurate than utilizing the calculation technique in determining R (Equation 8), the margin of error is low enough that the estimated values or R are suitable for determining radial gain components for the present lens shading correction techniques.

The radial gain $G_r$ may then be multiplied by the interpolated grid gain value G (Equations 6a and 6b) for the current pixel to determine a total gain that may be applied to the current pixel. The output pixel Y is obtained by multiplying the input pixel value X with the total gain, as shown below:

$$Y=(G\times G_r\times X) \qquad (10).$$

Thus, in accordance with the present technique, lens shading correction may be performed using only the interpolated gain, both the interpolated gain and the radial gain components. Alternatively, lens shading correction may also be accomplished using only the radial gain in conjunction with a radial grid table that compensates for radial approximation errors. For example, instead of a rectangular gain grid 590, as shown in FIG. 56, a radial gain grid having a plurality of grid points defining gains in the radial and angular directions may be provided. Thus, when determining the gain to apply to a pixel that does not align with one of the radial grid points within the LSC region 588, interpolation may be applied using the four grid points that enclose the pixel to determine an appropriate interpolated lens shading gain.

Figure 62:
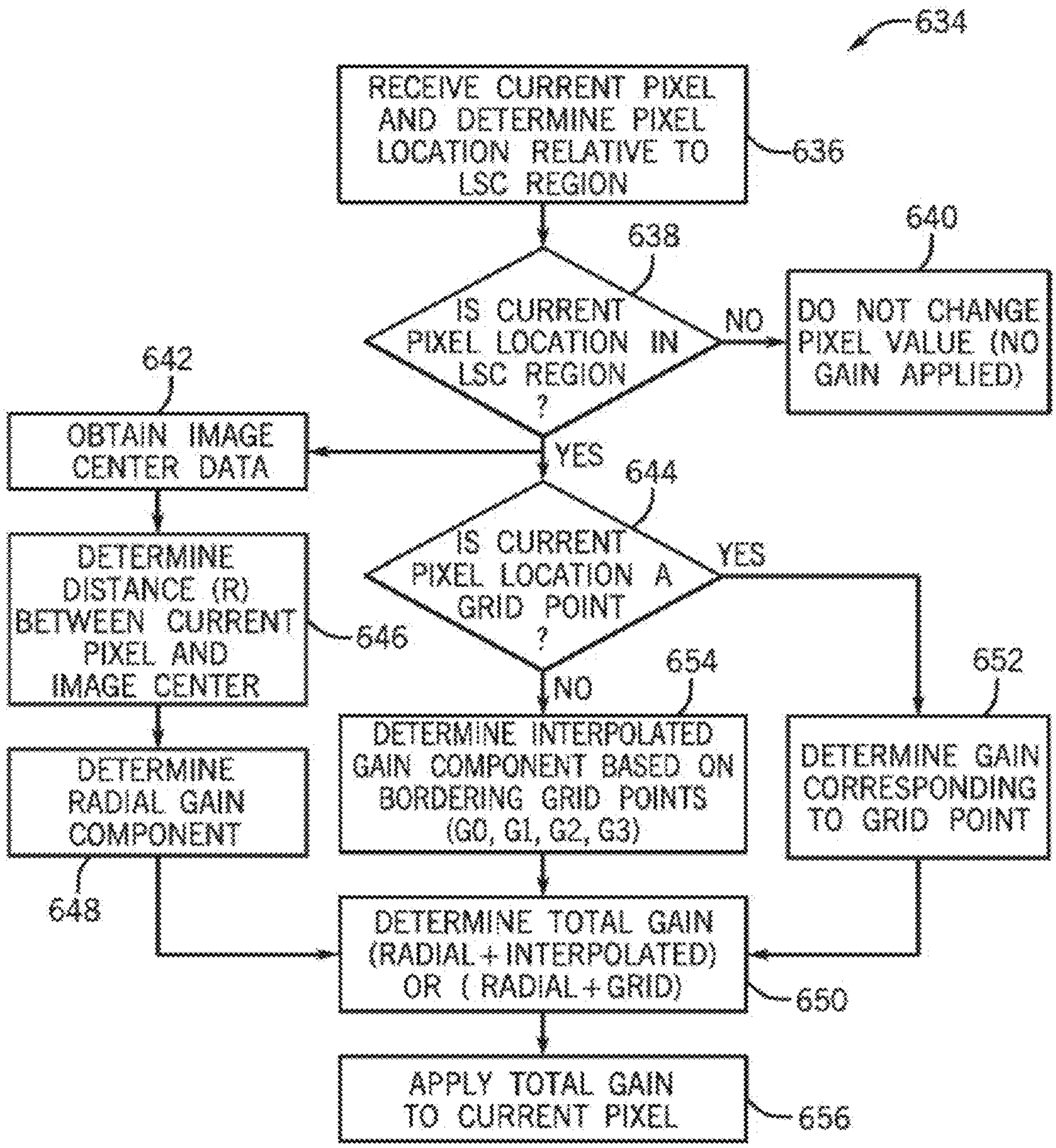
FIG. 62 is a flowchart illustrating a process by which radial gains and interpolated gains from a gain grid are used to determine a total gain that may be applied to imaging pixels during a lens shading correction operation, in accordance with an embodiment.

Referring to FIG. 62, the use of interpolated and radial gain components in lens shading correction is illustrated by the process 634. It should be noted that the process 634 may include steps that are similar to the process 612, described above in FIG. 58. Accordingly, such steps have been numbered with like reference numerals. Beginning at step 636, the current pixel is received and its location relative to the LSC region 588 is determined. Next, decision logic 638 determines whether the current pixel position is within the LSC region 588. If the current pixel position is outside of the LSC region 588, the process 634 continues to step 640, and no gain is applied to the current pixel (e.g., the pixel passes unchanged). If the current pixel position is within the LSC region 588, then the process 634 may continue simultaneously to step 642 and decision logic 644. Referring first to step 642, data identifying the center of the image is retrieved. As discussed above, determining the center of the image may include analyzing light intensity amplitudes for the pixels under uniform illumination. This may occur during calibration, for instance. Thus, it should be understood that step 642 does not necessarily encompass repeatedly calculating the center of the image for processing each pixel, but may refer to retrieving the data (e.g., coordinates) of previously determined image center. Once the center of the image is identified, the process 634 may continue to step 646, wherein the distance between the image center and the current pixel location (R) is determined. As discussed above, the value of R may be calculated (Equation 8) or estimated (Equation 9). Then, at step 648, a radial gain component $G_r$ may be computed using the distance R and global gain parameter corresponding to the color component of the current pixel (Equation 7). The radial gain component $G_r$ may be used to determine the total gain, as will be discussed in step 650 below.

Referring back to decision logic 644, a determination is made as to whether the current pixel position corresponds to a grid point within the gain grid 590. If the current pixel position corresponds to a grid point, then the gain value at that grid point is determined, as shown at step 652. If the current pixel position does not correspond to a grid point, then the process 634 continues to step 654, and an interpolated gain is computed based upon the bordering grid points (e.g., G0, G1, G2, and G3 of FIG. 21). For instance, the interpolated gain may be computed in accordance with Equations 6a and 6b, as discussed above. Next, at step 650, a total gain is determined based upon the radial gain determined at step 346, as well as one of the grid gains (step 652) or the interpolated gain (step 654). As can be appreciated, this may depend on which branch decision logic 644 takes during the process 634. The total gain is then applied to the current pixel, as shown at step 656. Again, it should be noted that like the process 310, the process 340 may also be repeated for each pixel of the image data.

The use of the radial gain in conjunction with the grid gains may offer various advantages. For instance, using a radial gain allows for the use of single common gain grid for all color components. This may greatly reduce the total storage space required for storing separate gain grids for each color component. For instance, in a Bayer image sensor, the use of a single gain grid for each of the R, B, Gr, and Gb components may reduce the gain grid data by approximately 75%. As will be appreciated, this reduction in grid gain data may decrease implementation costs, as grid gain data tables may account for a significant portion of memory or chip area in image processing hardware. Further, depending upon the hardware implementation, the use of a single set of gain grid values may offer further advantages, such as reducing overall chip area (e.g., such as when the gain grid values are stored in an on-chip memory) and reducing memory bandwidth requirements (e.g., such as when the gain grid values are stored in an off-chip external memory).

When applying the gains using the LSC logic 476 results in a clipped pixel, this may be tracked, and the statistics core 146*a* and/or 146*b* may determine whether to use the pixel in certain statistics collection operations based on its clipped status. In one embodiment, the LSC logic 476 may also be configured to maintain a count of the number of pixels that were clipped above and below maximum and minimum, respectively, per color component. Additionally or alternatively, the clipped pixel tracking logic 480 may globally track pixels clipped throughout the statistics logic 140*a*. In some embodiments, when the pixel is clipped, a clipped pixel flag associated with the clipped pixel may be set to indicate that the pixel was clipped, that the pixel was clipped by the LSC logic 476, and/or the extent to which the pixel was clipped.

Inverse Black Level Compensation (IBLC)

Recalling FIG. 48, the output of the lens shading correction (LSC) logic 476 is subsequently forwarded to the inverse black level compensation (IBLC) logic 478. The IBLC logic 478 provides gain, offset and clip independently for each color component (e.g., R, B, Gr, and Gb), and generally performs the inverse function to the BLC logic 472. For instance, as shown by the following operation, the value of the input pixel is first multiplied by a gain and then offset by a signed value, before being clipped:

$$Y=((X+O1[c])*G[c])+O[c]$$

$$Y=(Y<\min[c])?\min[c]:(Y>\max[c])?\max[c]:Y$$

where X represents the input pixel value for a given color component c (e.g., R, B, Gr, or Gb), O[c] represents a signed 16-bit offset for the current color component c, G[c] represents a gain value for the color component c, and Y represents the output pixel value. In one embodiment, the gain G[c] may have a range of between approximately 0 to 4× (4 times the input pixel value X). The gains G[c] may represent 16-bit unsigned numbers with 14 fraction bits (2.14). The gain may be applied with rounding, and the min[c] and max[c] may be signed 16-bit clip values for the minimum and maximum output values, respectively. The output of the IBLC may be unsigned. Moreover, if the input pixels to the IBLC logic 478 are expected to go negative (when using a negative offset in the BLC logic 472), the IBLC logic 478 may not be bypassed and the minimum clip value may be set to zero. In bypass mode, the lower 16-bits of the pixel data coming from the LSC logic 476 may be passed through. Therefore, negative values (e.g., represented in twos complement) will not be clipped to zero, resulting instead in large positive numbers at the 16-bit unsigned output.

In one embodiment, the IBLC logic 478 may maintain a count of the number of pixels that were clipped above and below maximum and minimum, respectively, per color component. Additionally or alternatively, the clipped pixel tracking counter 480 may globally track pixels clipped throughout the statistics logic 140*a*, and/or an associated clipped pixel flag (e.g., 5304) may be set.

Statistics Collection

Thereafter, the output of the IBLC logic 478 is received by the statistics core 146, which may provide for the collection of various statistical data points about the image sensor(s) 90, such as those relating to auto-exposure (AE), auto-white balance (AWB), auto-focus (AF), flicker detection, and so forth. Additionally, the statistics core 146 may obtain fixed pattern noise statistics (FPN stats) using the FPN statistics logic 484 and local image statistics (e.g., local tone mapping statistics and thumbnail statistics) using the local statistics logic 488. These various statistics collection blocks of the statistics core 146*a* will be discussed below.

Before continuing further, it should also be noted that the various statistics collection blocks of the statistics core 146*a* and/or 146*b* may vary operation on pixels when the pixels are clipped (e.g., as indicated by a clipped pixel flag associated with the pixel, the clipped pixel tracking logic 480, and so forth). As mentioned above, in some embodiments, when the pixel is clipped, a clipped pixel flag associated with the clipped pixel may be set to indicate that the pixel was clipped, that the pixel was clipped by a particular functional block of the statistics image processing logic 144, and/or the extent to which the pixel was clipped. Certain of the statistics collection blocks may be configured always to exclude a pixel from statistics collection when the pixel is clipped. Additionally or alternatively, some or all of the statistics collection blocks may be programmed by software to consider or not to consider a clipped pixel in it calculations. Thus, the software controlling the ISP pipe processing logic 80 may determine whether to include clipped pixels depending, for example, on whether including clipped pixels would be detrimental to the particular statistics collected.

To provide a brief example, the "3A statistics" block discussed below includes auto-white-balance (AWB) statistics logic. The AWB logic generally is concerned with red and blue pixels, but not green. As such, red or blue pixels that have been clipped (e.g., as indicated by a clipped pixel flag) may not be used by the AWB statistics logic. On the other hand, green pixels that have been clipped (e.g., as indicated by a clipped pixel flag) may be used by the AWB statistics logic. That is, clipping of red or blue pixels may cause AWB statistics to be unreliable, while clipping of green pixels may not. This is only one example, and it should be understood that any of the various statistics collection blocks may selectively use pixels depending on whether they have been clipped.

"3A" Statistics Collection

As may be appreciated, AWB, AE, and AF statistics may be used in the acquisition of images in digital still cameras as well as video cameras. For simplicity, AWB, AE, and AF statistics may be collectively referred to herein as "3A statistics." In the embodiment of the statistics logic 140*a* shown in FIG. 48, the architecture for the 3A statistics collection logic 482 may be implemented in hardware, software, or a combination of hardware and software. Further, control software or firmware (e.g., control logic 84) may be used to analyze the statistics data collected by the 3A statistics collection logic 482 and control various parameters of the lens (e.g., focal length), sensor (e.g., analog gains, integration times), and the ISP pipe processing logic 80 (e.g., digital gains, color correction matrix coefficients). In some embodiments, the image processing circuitry 32 may provide flexibility in statistics collection to enable control software or firmware to implement various AWB, AE, and AF algorithms.

Figures 63, 64:
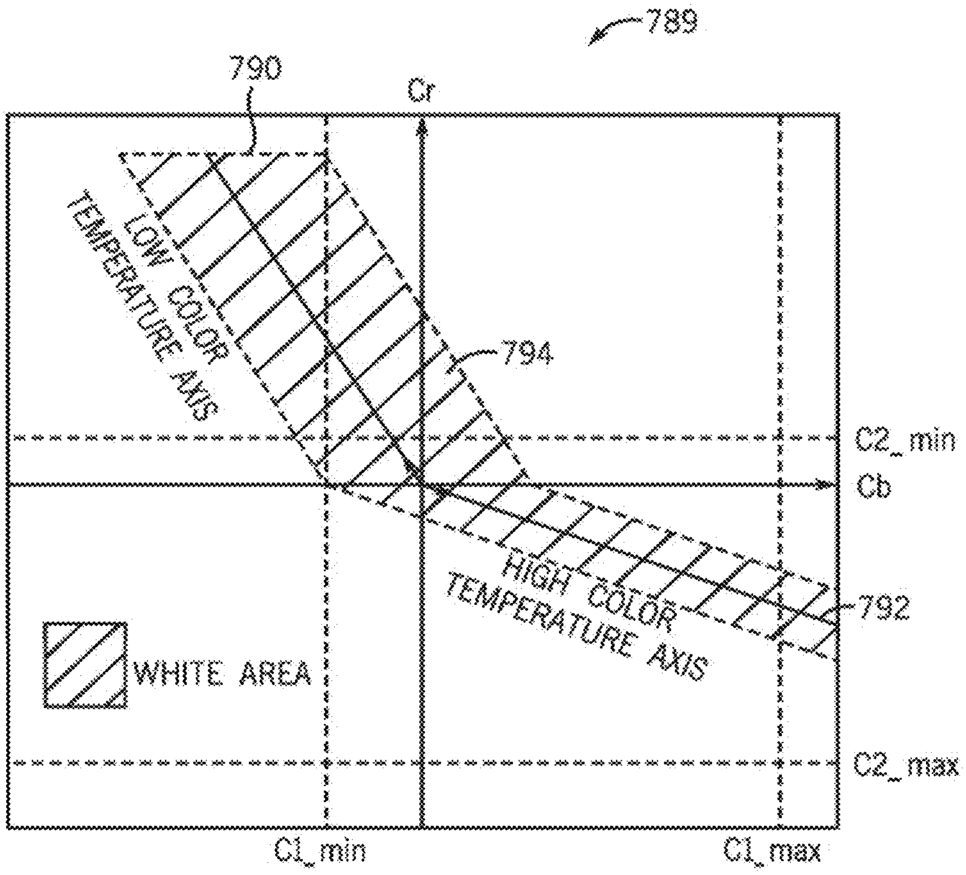
FIG. 63 is a graph showing white areas and low and high color temperature axes in a color space.
FIG. 64 is a table showing how white balance gains may be configured for various reference illuminant conditions, in accordance with an embodiment.

With regard to white balancing (AWB), the image sensor response at each pixel may depend on the illumination source, since the light source is reflected from objects in the image scene. Thus, each pixel value recorded in the image scene is related to the color temperature of the light source. For instance, FIG. 63 shows a graph 789 illustrating the color range of white areas under low color and high color temperatures for a YCbCr color space. As shown, the x-axis of the graph 789 represents the blue-difference chroma (Cb) and the y-axis of the graph 789 represents red-difference chroma (Cr) of the YCbCr color space. The graph 789 also shows a low color temperature axis 790 and a high color temperature axis 791. The region 792 in which the axes 790 and 791 are positioned, represents the color range of white areas under low and high color temperatures in the YCbCr color space. It should be understood, however, that the YCbCr color space is merely one example of a color space that may be used in conjunction with auto white balance processing. Other embodiments may use any suitable color space. For instance, in certain embodiments, other suitable color spaces may include a Lab (CIELab) color space (e.g., based on CIE 1976), a red/blue normalized color space (e.g., an R/(R+2G+B) and B/(R+2G+B) color space; a R/G and B/G color space; a Cb/Y and Cr/Y color space, etc.). Accordingly, for the purposes of this disclosure, the axes of the color space used by the 3A statistics collection logic 482 may be referred to as C1 and C2 (as is the case in FIG. 63).

When a white object is illuminated under a low color temperature, it may appear reddish in the captured image. Conversely, a white object that is illuminated under a high color temperature may appear bluish in the captured image. The goal of white balancing is, therefore, to adjust RGB values such that the image appears to the human eye as if it were taken under canonical light. Thus, in the context of imaging statistics relating to white balance, color information about white objects are collected to determine the color temperature of the light source. In general, white balance algorithms may include two main steps. First, the color temperature of the light source is estimated. Second, the estimated color temperature is used to adjust color gain values and/or determine/adjust coefficients of a color correction matrix. Such gains may be a combination of analog and digital image sensor gains, as well as ISP digital gains.

For instance, in some embodiments, the imaging device 30 may be calibrated using multiple different reference illuminants. Accordingly, the white point of the current scene may be determined by selecting the color correction coefficients corresponding to a reference illuminant that most closely matches the illuminant of the current scene. By way of example, one embodiment may calibrate the imaging device 30 using five reference illuminants, a low color temperature illuminant, a middle-low color temperature illuminant, a middle color temperature illuminant, a middle-high color temperature illuminant, and a high color temperature illuminant. As shown in FIG. 64, one embodiment may define white balance gains using the following color correction profiles: Horizon (H) (simulating a color temperature of approximately 2300 degrees), Incandescent (A or IncA) (simulating a color temperature of approximately 2856 degrees), D50 (simulating a color temperature of approximately 5000 degrees), D65 (simulating a color temperature of approximately 6500 degrees), and D75 (simulating a color temperature of approximately 5640 degrees).

Depending on the illuminant of the current scene, white balance gains may be determined using the gains corresponding to the reference illuminant that most closely matches the current illuminant. For instance, if the 3A statistics collection logic 482 (described in more detail with reference to FIG. 65 below) determines that the current illuminant approximately matches the reference middle color temperature illuminant, D50, then white balance gains of approximately 1.37 and 1.23 may be applied to the red and blue color channels, respectively, while approximately no gain (1.0) is applied to the green channels (G0 and G1 for Bayer data). In some embodiments, if the current illuminant color temperature is in between two reference illuminants, white balance gains may be determined via interpolating the white balance gains between the two reference illuminants. Further, while the present example shows an imaging device being calibrated using H, A, D50, D65, and D75 illuminants, it should be understood that any suitable type of illuminant may be used for camera calibration, such as TL84 or CWF (fluorescent reference illuminants), and so forth.

As will be discussed further below, several statistics may be provided for AWB including a two-dimensional (2D) color histogram, and RGB or YCC sums to provide multiple programmable color ranges. For instance, in one embodiment, the 3A statistics collection logic 482 may provide a set of multiple pixel condition filters, of which a subset of the multiple pixel filters may be selected for AWB processing. In one embodiment, eight sets of filters, each with different configurable parameters, may be provided, and three sets of color range filters may be selected from the set for gathering tile statistics, as well as for gathering statistics for each floating window. By way of example, a first selected filter may be configured to cover the current color temperature to obtain accurate color estimation, a second selected filter may be configured to cover the low color temperature areas, and a third selected filter may be configured to cover the high color temperature areas. This particular configuration may enable the AWB algorithm to adjust the current color temperature area as the light source is changing. Further, the 2D color histogram may be used to determine the global and local illuminants and to determine various pixel filter thresholds for accumulating RGB values. Again, it should be understood that the selection of three pixel filters is meant to illustrate just one embodiment. In other embodiments, fewer or more pixel filters may be selected for AWB statistics.

Further, in addition to selecting three pixel filters, one additional pixel filter may also be used for auto-exposure (AE), which generally refers to a process of adjusting pixel integration time and gains to control the luminance of the captured image. For instance, auto-exposure may control the amount of light from the scene that is captured by the image sensor(s) by setting the integration time. In certain embodiments, tiles and floating windows of luminance statistics may be collected via the 3A statistics collection logic 482 and processed to determine integration and gain control parameters.

Further, auto-focus may refer to determining the optimal focal length of the lens in order to substantially optimize the focus of the image. In certain embodiments, floating windows of high frequency statistics may be collected and the focal length of the lens may be adjusted to bring an image into focus. As discussed further below, in one embodiment, auto-focus adjustments may use coarse and fine adjustments based upon one or more metrics, referred to as auto-focus scores (AF scores) to bring an image into focus. Further, in some embodiments, AF statistics/scores may be determined for different colors, and the relativity between the AF statistics/scores for each color channel may be used to determine the direction of focus.

As discussed above, the control logic 84, which may be a dedicated processor in the image processing circuitry 32 of the device 10, may process the collected statistical data to determine one or more control parameters for controlling the imaging device 30 and/or the image processing circuitry 32. For instance, such the control parameters may include parameters for operating the lens of the image sensor 90 (e.g., focal length adjustment parameters), image sensor parameters (e.g., analog and/or digital gains, integration time), as well as ISP pipe processing parameters (e.g., digital gain values, color correction matrix (CCM) coefficients). Additionally, as mentioned above, in certain embodiments, statistical processing may occur at a precision of 8-bits and, thus, raw pixel data having a higher bit-depth may be down-scaled to an 8-bit format for statistics purposes. As discussed above, down-scaling to 8-bits (or any other lower-bit resolution) may reduce hardware size (e.g., area) and also reduce processing complexity, as well as allow for the statistics data to be more robust to noise (e.g., using spatial averaging of the image data). The statistical processing of the statistics logic 146*a* and 146*b* may, alternatively, use a precision of 16 bits. Although the 16-bit statistics may be more precise than 8-bit statistics, some software may rely on legacy 8-bit statistics. As such, the statistics cores 146*a* and 146*b* may be controlled by software to operate at 8-bit and/or 16-bit precision.

Figure 65:
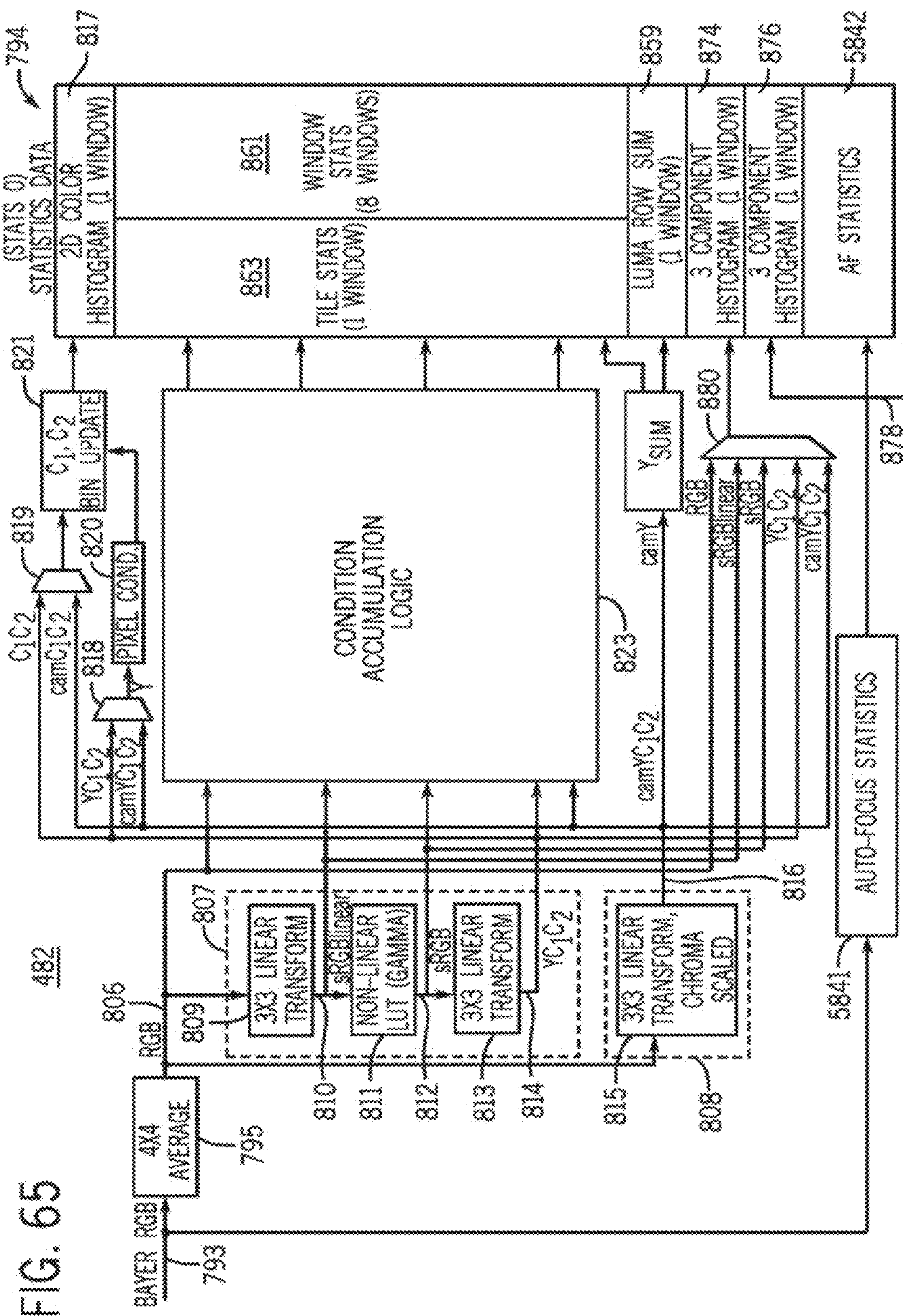
FIG. 65 is a block diagram showing a statistics collection engine that may be implemented in the ISP pipe processing logic 80 processing logic, in accordance with an embodiment.

With the foregoing in mind, FIG. 65 is a block diagram depicting logic for implementing one embodiment of the 3A statistics collection logic 482. As shown, the 3A statistics collection logic 482 may receive a signal 793 representing Bayer RGB data which, as shown in FIG. 48, may correspond to the output of the inverse BLC logic 478. The 3A statistics collection logic 482 may process the Bayer RGB data 793 to obtain various statistics 794, which may represent the output STATS0 of the 3A statistics collection logic 482, as shown in FIG. 48, or alternatively the output STATS1 of a statistics logic associated with the Sensor1 statistics processing unit 140*b*.

Figure 66:
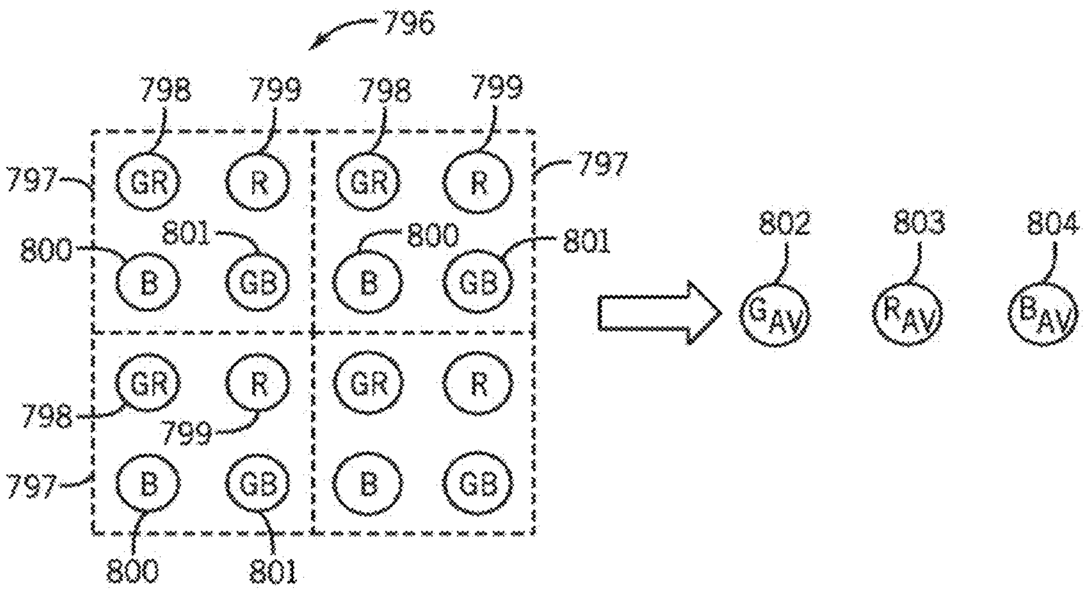
FIG. 66 illustrates the down-sampling of raw Bayer RGB data, in accordance with an embodiment.

In the illustrated embodiment, for the statistics to be more robust to noise, the incoming Bayer RGB pixels 793 are first averaged by logic 795. For instance, the averaging may be performed in a window size of 4×4 sensor pixels consisting of four 2×2 Bayer quads (e.g., a 2×2 block of pixels representing the Bayer pattern), and the averaged red (R), green (G), and blue (B) values in the 4×4 window may be computed and, if desired, converted to 8-bits. This process is illustrates in more detail with respect to FIG. 66, which shows a 4×4 window 796 of pixels formed as four 2×2 Bayer quads 797. Using this arrangement, each color channel includes a 2×2 block of corresponding pixels within the window 796, and same-colored pixels may be summed and averaged to produce an average color value for each color channel within the window 796. For instance, red pixels 799 may be averaged to obtain an average red value ($R_{AV}$) 803, and the blue pixels 800 may be averaged to obtain an average blue value ($B_{AV}$) 804 within the sample 796. With regard to averaging of the green pixels, several techniques may be used since the Bayer pattern has twice as many green samples as red or blue samples. In one embodiment, the average green value ($G_{AV}$) 802 may be obtained by averaging just the Gr pixels 798, just the Gb pixels 801, or all of the Gr and Gb pixels 798 and 801 together. In another embodiment, the Gr and Gb pixels 798 and 801 in each Bayer quad 797 may be averaged, and the average of the green values for each Bayer quad 797 may be further averaged together to obtain $G_{AV}$ 802. As may be appreciated, the averaging of the pixel values across pixel blocks may provide for the reduction of noise. Further, it should be understood that the use of a 4×4 block as a window sample is merely intended to provide one example. Indeed, in other embodiments, any suitable block size may be used (e.g., 8×8, 16×16, 32×32, etc.). It may be appreciated that a pixel may be considered clipped if any of the average values ($R_{AV}$) 803, ($B_{AV}$) 804, or ($G_{AV}$) 802 is clipped.

Thereafter, the downscaled Bayer RGB values 806 are input to the color space conversion logic units 807 and 808. Because some of the 3A statistics data may rely upon pixel pixels after applying color space conversion, the color space conversion (CSC) logic 807 and CSC logic 808 may be configured to convert the down-sampled Bayer RGB values 806 into one or more other color spaces. In one embodiment, the CSC logic 807 may provide for a non-linear space conversion and the CSC logic 808 may provide for a linear space conversion. Thus, the CSC logic units 807 and 808 may convert the raw image data from sensor Bayer RGB to another color space (e.g., $sRGB_{linear}$, sRGB, YCbCr, etc.) that may be more ideal or suitable for performing white point estimation for white balance.

In the present example, the non-linear CSC logic 807 may be configured to perform a 3×3 matrix multiply, followed by a non-linear mapping implemented as a lookup table, and further followed by another 3×3 matrix multiply with an added offset. This allows for the 3A statistics color space conversion logic 807 to replicate the color processing of the RGB processing logic 160 in the ISP pipe processing logic 80 (e.g., applying white balance gain, applying a color correction matrix, applying RGB gamma adjustments, and performing color space conversion) for a given color temperature. It may also provide for the conversion of the Bayer RGB values to a more color consistent color space such as CIELab, or any of the other color spaces discussed above (e.g., YCbCr, a red/blue normalized color space, etc.). Under some conditions, a Lab color space may be more suitable for white balance operations because the chromaticity is more linear with respect to brightness.

As shown in FIG. 65, the output pixels from the Bayer RGB down-scaled signal 806 are processed with a first 3×3 color correction matrix (3A_CCM), referred to herein by reference number 808. In the present embodiment, the 3A_CCM 809 may be configured to convert from a camera RGB color space (camRGB), to a linear sRGB calibrated space ($sRGB_{linear}$). A programmable color space conversion that may be used in one embodiment is provided:

$sR_{linear}$=3A_CCM_00*R+3A_CCM_01*G+3A_CCM_02*B+3A_CCM_OffsetR $sG_{linear}$=3A_CCM_10*R+3A_CCM_11*G+3A_CCM_12*B+3A_CCM_OffsetG $sB_{linear}$=3A_CCM_20*R+3A_CCM_21*G+3A_CCM_22*B+3A_CCM_OffsetB $sR_{linear}$=($sR_{linear}$<3A_CCM_MIN[0])? 3A_CCM_MIN[0]: ($sR_{linear}$>3A_CCM_MAX[0]): 3A_CCM_MAX[0]): $sR_{linear}$ $sG_{linear}$=($sG_{linear}$<3A_CCM_MIN[1])? 3A_CCM_MIN[1]: ($sG_{linear}$>3A_CCM_MAX[1]): 3A_CCM_MAX[1]: $sG_{linear}$ $sB_{linear}$=($sG_{linear}$<3A_CCM_MIN[2])? 3A_CCM_MIN[2]: ($sB_{linear}$>3A_CCM_MAX[2]): 3A_CCM_MAX[2]: $sB_{linear}$ where the variables 3A_CCM_00 through 3A_CCM_22 represent signed coefficients of the matrix 808, the variable 3A_CCM_OffsetR represents a red pixel offset value, the variable 3A_CCM_OffsetG represents a green pixel offset value, and the variable 3A_CCM_OffsetB represents a blue pixel offset value. The variables 3A_CCM_MIN[c] and 3A_CCM_MAX[c] refer to maximum and minimum allowable pixel values, where c represents the color component red (0), green (1), or blue (2). These values may vary depending, for example, on the bit depth of the image data. Thus, each of the $sR_{linear}$, $sG_{linear}$, and $sB_{linear}$, components of the $sRGB_{linear}$ color space may be determined first determining the sum of the red, blue, and green down-sampled Bayer RGB values with corresponding 3A_CCM coefficients applied, and then clipping this value to the minimum and maximum pixel values for 8-16-bit pixel data, as appropriate. The resulting $sRGB_{linear}$ values are represented in FIG. 65 by reference number 810 as the output of the 3A_CCM 809. Additionally, the 3A statistics collection logic 482 may maintain a count of the number of clipped pixels for each of the $sR_{linear}$, $sG_{linear}$, and $sB_{linear}$ components, as expressed below:

3A_CCM_R_clipcount_low: number of $sR_{linear}$ pixels<3A_CCM_MIN[0] clipped

3A_CCM_R_clipcount_high: number of $sR_{linear}$ pixels>3A_CCM_MAX[0] clipped

3A_CCM_G_clipcount_low: number of $sG_{linear}$ pixels<3A_CCM_MIN[1] clipped

3A_CCM_G_clipcount_high: number of $sG_{linear}$ pixels>3A_CCM_MAX[1] clipped

3A_CCM_B_clipcount_low: number of $sB_{linear}$ pixels<3A_CCM_MIN[2] clipped

3A_CCM_B_clipcount_high: number of $sB_{linear}$ pixels>3A_CCM_MAX[2] clipped

Next, the $sRGB_{linear}$, pixels 810 may be processed using a non-linear lookup table 811 to produce sRGB pixels 812. The lookup table 811 may contain entries of 16-bit values, with each table entry value representing an output level. In one embodiment, the look-up table 811 may include 257 evenly distributed input entries. A table index may represent values in steps of 1 to 256, depending on the bit depth (e.g., 8-bit to 16-bit). When the input pixel value falls between intervals, the output values may be linearly interpolated.

As may be appreciated, the sRGB color space may represent the color space of the final image produced by the imaging device 30 for a given white point, as white balance statistics collection is performed in the color space of the final image produced by the image device. In one embodiment, a white point may be determined by matching the characteristics of the image scene to one or more reference illuminants based, for example, upon red-to-green and/or blue-to-green ratios. For instance, one reference illuminant may be D65, a CIE standard illuminant for simulating daylight conditions. In addition to D65, calibration of the imaging device 30 may also be performed for other different reference illuminants, and the white balance determination process may include determining a current illuminant so that processing (e.g., color balancing) may be adjusted for the current illuminant based on corresponding calibration points. By way of example, in one embodiment, the imaging device 30 and 3A statistics collection logic 482 may be calibrated using, in addition to D65, a cool white fluorescent (CWF) reference illuminant, the TL84 reference illuminant (another fluorescent source), and the IncA (or A) reference illuminant, which simulates incandescent lighting. Additionally, as discussed above, various other illuminants corresponding to different color temperatures (e.g., H, IncA, D50, D65, and D75, etc.) may also be used in camera calibration for white balance processing. Thus, a white point may be determined by analyzing an image scene and determining which reference illuminant most closely matches the current illuminant source.

Referring still to the non-linear CSC logic 807, the sRGB pixel output 812 of the look-up table 811 may be further processed with a second 3×3 color correction matrix 813, referred to herein as 3A_CSC. In the depicted embodiment, the 3A_CSC matrix 813 is shown as being configured to convert from the sRGB color space to the YCbCr color space, though it may be configured to convert the sRGB values into other color spaces as well. By way of example, the following programmable color space conversion may be used:

Y=3A_CSC_00*sR+3A_CSC_01*sG+3A_CSC_02*sB+3A_CSC_OffsetY

Y=(Y<3A_CSC_MIN_Y)? 3A_CSC_MIN_Y: (Y>3A_CSC_MAX_Y)? 3A_CSC_MAX_Y: Y

C1=3A_CSC_10*sR+3A_CSC_11*sG+3A_CSC_12*sB

C2=3A_CSC_20*sR+3A_CSC_21*sG+3A_CSC_22*sB where 3A_CSC_00-3A_CSC_22 represent signed coefficients for the matrix 813 and 3A_CSC_OffsetY represent signed offsets, and C1 and C2 represent different colors (e.g., blue-difference chroma (Cb) and red-difference chroma (Cr), respectively, in one embodiment). It should be understood that C1 and C2 may represent any suitable difference chroma colors, and need not necessarily be Cb and Cr. At this point, camC1 and camC2 pixels may be signed. The chroma scaling is optionally performed next:

C1=C1*ChromaScale*255/((Y>>8)? (Y>>8): 1); and

C2=C2*ChromaScale*255/((Y>>8)? (Y>>8): 1);

where ChromaScale is a scaling factor between 0 and 8. ChromaScale may take two possible values depending on the sign of camC1:

| | | |
|---|---|---|
| ChromaScale = | ChromaScale0 | if (C1 < 0) |
| | ChromaScale1 | otherwise |

Finally, Chroma offsets (e.g., CSC_OffsetC1 and CSC_OffsetC2) are added and chroma pixels are clipped to generate unsigned pixel values:

C1=C1+3A_CSC_OffsetC1

C2=C2+3A_CSC_OffsetC2

C1=(C1<3A_CSC_MIN_C1)? 3A_CSC_MIN_C1: (C1>3A_CSC_MAX_C1)? 3A_CSC_MAX_C1: C1

C2=(C2<3A_CSC_MIN_C2)? 3A_CSC_MIN_C2: (C2>3A_CSC_MAX_C2)? 3A_CSC_MAX_C2: C2 where 3A_CSC_MIN C1, 3A_CSC_MIN_C2, 3A_ CSC_MAXC1, and 3A_CSC_MAX C2 represent maximum and minimum values. The resulting output of the linear transform 813 may be a YC1C2 signal 814.

As shown above, in determining each component of YCbCr, appropriate coefficients from the matrix 813 are applied to the sRGB values 812 and the result is summed with a corresponding offset. Essentially, this step is a 3×1 matrix multiplication step. This result from the matrix multiplication is then clipped between a maximum and minimum value. The associated minimum and maximum clipping values may be programmable and may depend, for instance, on particular imaging or video standards (e.g., BT.601 or BT.709) being used.

The 3A statistics collection logic 482 may also maintain a count of the number of clipped pixels for each of the Y, C1, and C2 components, as expressed below. In some embodiments, the number of clipped pixels of each of the Y, C1, and C2 components may be maintained independent of clipped pixel tracking using clipped pixel flags (e.g., as shown in FIG. 223). The 3A statistics collection logic 482 may vary its operation based on either or both forms of clipped pixel tracking.

3A_CSC_Y_clipcount_low: number of Y pixels<3A_CSC_MIN_Y clipped

3A_CSC_Y_clipcount_high: number of Y pixels>3A_CSC_MAX_Y clipped

3A_CSC_C1_clipcount_low: number of C1 pixels<3A_CSC_MIN_C1 clipped

3A_CSC_C1_clipcount_high: number of C1 pixels>3A_CSC_MAX_C1 clipped

3A_CSC_C2_clipcount_low: number of C2 pixels<3A_CSC_MIN_C2 clipped

3A_CSC_C2_clipcount_high: number of C2 pixels>3A_CSC_MAX_C2 clipped

The output pixels from the Bayer RGB down-sample signal 806 may also be provided to the linear color space conversion logic 808, which may be configured to implement a camera color space conversion. For instance, the output pixels 806 from the Bayer RGB down-sample logic 795 may be processed via another 3×3 color conversion matrix (3A_CSC2) 815 of the CSC logic 808 to convert from sensor RGB (camRGB) to a linear white-balanced color space (camYC1C2), wherein C1 and C2 may correspond to Cb and Cr, respectively. In one embodiment, the chroma pixels may be scaled by luma, which may be beneficial in implementing a color filter that has improved color consistency and is robust to color shifts due to luma changes. An example of how the camera color space conversion may be performed using the 3×3 matrix 815 is provided below:

camY=3A_CSC2_00*R+3A_CSC2_01*G+ 3A_CSC2_02*B+3A_CSC2_OffsetY camY=(camY<3A_CSC2_MIN_Y)? 3A_CSC2_MIN_Y: (camY>3A_CSC2_MAX_Y)? 3A_CSC2_MAX_Y: camY camC1=(3A_CSC2_10*R+3A_CSC2_11*G+ 3A_CSC2_12*B)

camC2=(3A_CSC2_20*R+3A_CSC2_21*G+ 3A_CSC2_22*B)

where 3A_CSC2_00-3A_CSC2_22 represent signed coefficients for the matrix 815, 3A_CSC2_OffsetY represents a signed offset for camY, and camC1 and camC2 represent different colors (e.g., blue-difference chroma (Cb) and red-difference chroma (Cr), respectively). As shown above, to determine camY, corresponding coefficients from the matrix 815 are applied to the Bayer RGB values 806, and the result is summed with 3A_Offset2Y. This result is then clipped between a maximum and minimum value. As discussed above, the clipping limits may be programmable.

At this point, the camC1 and camC2 pixels of the output 816 are signed. As discussed above, in some embodiments, chroma pixels may be scaled. For example, one technique for implementing chroma scaling is shown below:

camC1=camC1*ChromaScale*255/((camY>>8)? (camY>>8): 1)

camC2=camC2*ChromaScale*255/((camY>>8)? (camY>>8): 1)

where ChromaScale represents a floating point scaling factor between 0 and 8. The expression (camY? camY:1) is meant to prevent a divide-by-zero condition. That is, if camY is equal to zero, the value of camY is set to 1. Further, in one embodiment, ChromaScale may be set to one of two possible values depending on the sign of camC1. For instance, as shown below, ChomaScale may be set to a first value (ChromaScale0) if camC1 is negative, or else may be set to a second value (ChromaScale1):

| | | |
|---|---|---|
| ChromaScale = | ChromaScale0 | if(camC1 < 0) |
| | ChromaScale1 | otherwise |

Thereafter, chroma offsets are added, and the camC1 and camC2 chroma pixels are clipped, as shown below, to generate corresponding unsigned pixel values:

camC1=C1+3A_CSC2_OffsetC1 camC2=C2+3A_CSC2_OffsetC2 camC1=(camC1<3A_CSC2_MIN_C1)? 3A_CSC2_MIN_C1: (camC1>3A_CSC2_MAX_C1)? 3A_CSC2_MAX_C1: camC1 camC2=(camC2<3A_CSC2_MIN_C2)? 3A_CSC2_MIN_C2: (camC2>3A_CSC2_MAX_C2)? 3A_CSC2_MAX_C2: camC2 wherein 3A_CSC2_00-3A_CSC2_22 are signed coefficients of the matrix 815, and 3A_Offset2C1 and 3A_Offset2C2 are signed offsets. Further, the number of pixels that are clipped for camY, camC1, and camC2 may be counted, as shown below:

3A_CSC2_Y_clipcount_low: number of camY pixels<3A_CSC2_MIN_Y clipped

3A_CSC2_Y_clipcount_high: number of camY pixels>3A_CSC2_MAX_Y clipped

3A_CSC2_C1_clipcount_low: number of camC1 pixels<3A_CSC2_MIN_C1 clipped

3A_CSC2_C1_clipcount_high: number of camC1 pixels>3A_CSC2_MAX_C1 clipped

3A_CSC2_C2_clipcount_low: number of camC2 pixels<3A_CSC2_MIN_C2 clipped

3A_CSC2_C2_clipcount_high: number of camC2 pixels>3A_CSC2_MAX_C2 clipped

Thus, the non-linear and linear color space conversion logic 807 and 808 may, in the present embodiment, provide pixel data in various color spaces: sRGB (signal 810), sRGB (signal 812), YCbYr (signal 814), and camYCbCr (signal 816). It should be understood that the coefficients for each conversion matrix 809 (3A_CCM), 813 (3A_CSC), and 815 (3A_CSC2), as well as the values in the look-up table 811, may be independently set and programmed.

Referring still to FIG. 65, the chroma output pixels from either the non-linear color space conversion (YCbCr 814) or the camera color space conversion (camYCbCr 816) may be used to generate a two-dimensional (2D) color histogram 817. As shown, selection logic 818 and 819, which may be implemented as selection logics or by any other suitable logic, may be configured to select between luma and chroma pixels from either the non-linear or camera color space conversion. The selection logic 818 and 819 may operate in response to respective control signals, which, in one example, may be supplied by the main control logic 84 of the image processing circuitry 32 (FIG. 7) and may be set via software.

For the present example, it may be assumed that the selection logic 818 and 819 select the YC1C2 color space conversion (814), where the first component is Luma, and where C1, C2 are the first and second colors (e.g., Cb, Cr). A 2D histogram 817 in the C1-C2 color space is generated for one window. For instance, the window may be specified with a column start and width and a row start and height. The window position and size may be a multiple of 4 pixels. In one example, the color histogram 817 may include 64×64 bins for a total of 4096 bins. The bin boundaries may be at a fixed interval. To allow for zooming and panning the histogram collection in specific areas of the colorspace, a pixel scaling and offset may be specified. Values of C1 and C2 may be in the range [0,63] after offset and scaling, and may be used to determine the bin. The bin indices for C1 and C2, referred to herein by C1idx and C2idx, may be determined as follows:

C1idx=(C1_scale*(C1−C1_offset))>16

C2idx=(C2_scale*(C2−C2_offset))>>16

In the equations above, C1_scale and C2_scale may be 17-bit unsigned integer scale values, and C1_offset and C2_offset may be 16-bit unsigned values. Allowed values for C1_scale and C2_scale may be in the range 0 to 2^16 to represent a floating point scale between 0 and 1. Once the indices are determined, the color histogram bins are incremented by a Count value if the bin indices are in the range [0, 63], as shown below. Effectively, this allows for weighting the color counts based on luma values (e.g., brighter pixels are weighted more heavily, instead of weighting everything equally (e.g., by 1)):

if (C1idx>=0&& C1idx<=63&& C2idx>=0&& C2idx<=63)

Stats C1C2Hist[C2idx][C1idx]+=Count;

where Count is determined based on the selected luma value, Y in this example. As may be appreciated, the steps represented above may be implemented by a bin update logic block 821. Further, in one embodiment, multiple luma thresholds may be set to define luma intervals. By way of example, 15 luma thresholds referred to as Ythd[15] may define 16 luma intervals (e.g., with a first interval starting at 0 and the last interval ending at 65535). The Count values CountArr[15] may be defined for each interval. For instance, Count may be selected (e.g., by pixel condition logic 820) based on luma thresholds as follows:

```
Count = CountArr[15]; // initialize to last interval
for (level=0; level < 15)
{
    if (Y <= Ythd[level])
    {
```

-continued

```
            Count = CountArr[level];
            break;
        }
}
```

As should be appreciated, in some embodiments, the Count value may or may not include clipped pixels. That is, in some embodiments, software may be able to program the bin update logic block 821 to consider a pixel only when the clipped pixel flag of the pixel has not been set.

Figure 67:
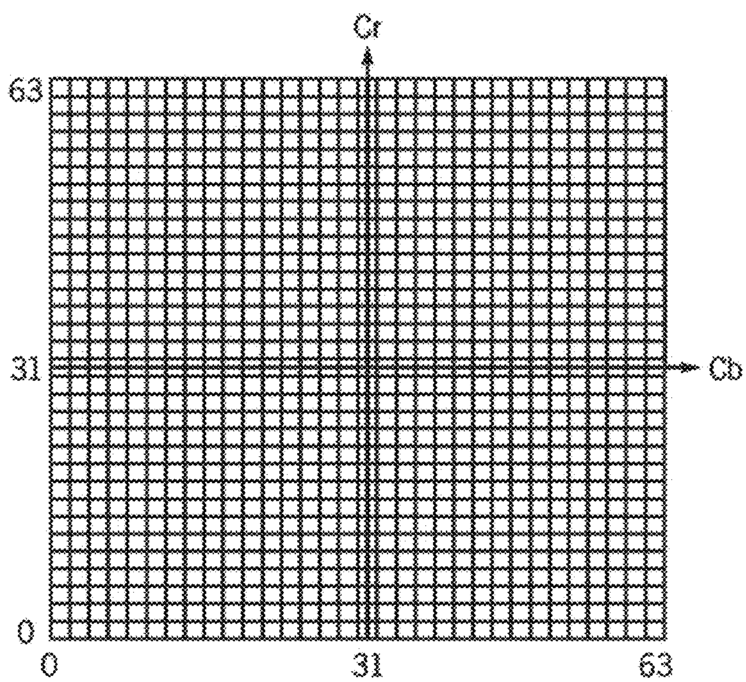
FIG. 67 depicts a two-dimensional color histogram that may be collected by the statistics collection engine of FIG. 65, in accordance with an embodiment.
Figure 68:
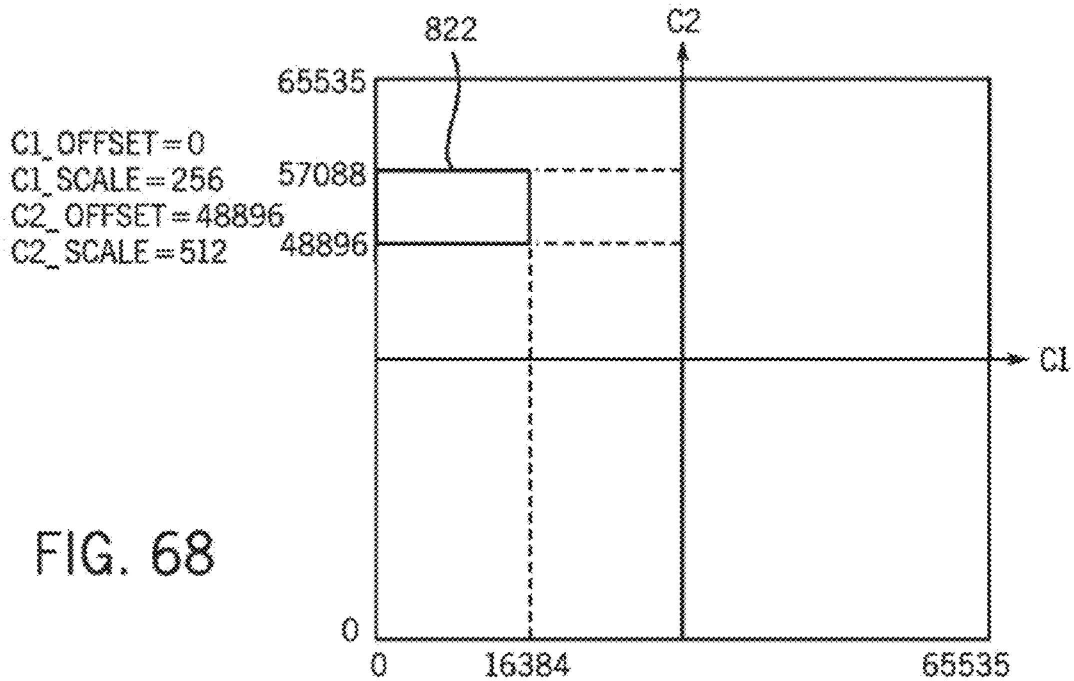
FIG. 68 depicts zooming and panning within a two-dimensional color histogram.

With the foregoing in mind, FIG. 67 illustrates the color histogram with scaling and offsets set to zero for both C1 and C2. The divisions within the CbCr space represent each of the 64×64 bins (4096 total bins). FIG. 68 provides an example of zooming and panning within the 2D color histogram for additional precision, in which the input data has a bit depth of 16 bits. A rectangular area 822 specifies the location of the 64×64 bins.

At the start of a frame of image data, bin values are initialized to zero. For each pixel going into the 2D color histogram 817, the bin corresponding to the matching C1C2 value is incremented by a determined Count value which, as discussed above, may be based on the luma value. For each bin within the 2D histogram 817, the total pixel count is reported as part of the collected statistics data (e.g., STATS0). In one embodiment, the total pixel count for each bin may have a resolution of 25-bits, whereby an allocation of internal memory equal to 4096×25 bits is provided.

In some embodiments, RGB, $sRGB_{linear}$, sRGB or YC1C2 sums may be accumulated conditional on camYC1C2 or YC1C2 pixel masks or camYC1C2 or YC1C2 pixel conditions.

Figure 69:
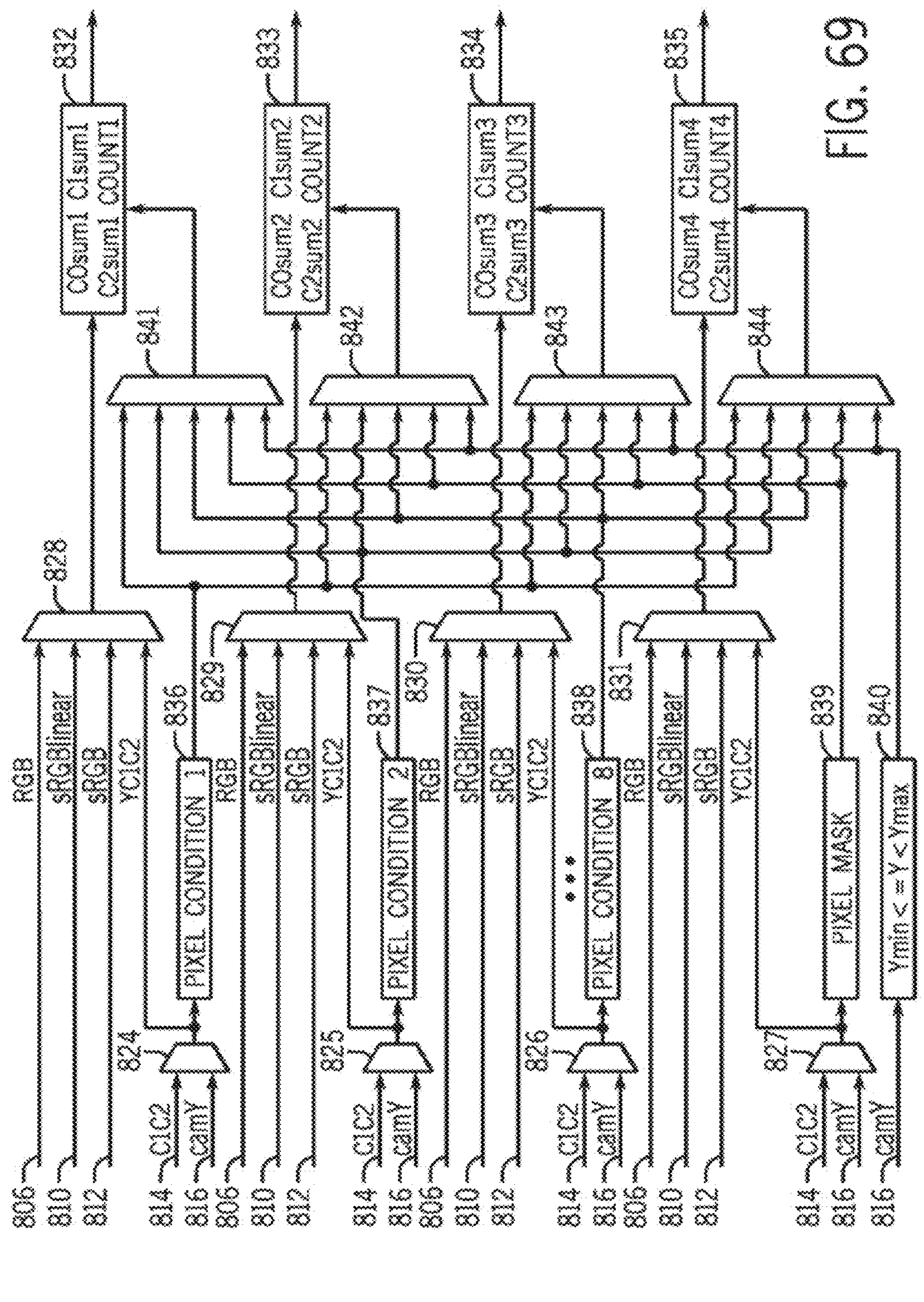
FIG. 69 is a more detailed view showing logic for implementing a pixel filter of the statistics collection engine, in accordance with an embodiment.

These sums may be accumulated in conditional accumulation logic 823 as shown in FIG. 65. A more detailed view of the conditional accumulation logic 823 appears in FIG. 69. In the example of FIG. 69, the C1C2 signal 814 or the camY signal 816 may be selected by selection logic 824, 825, 826, and/or 827. The selected signal C1C2 signal 814 or the camY signal 816 may be used in conditional accumulation, as may be the RGB signal 806, the sRGBlinear signal 810, the sRGB signal 812, as selectable by selection logic 828, 829, 830, and/or 831. That is, the output of the selection logic 828, 829, 830, and/or 831 may be used to develop one of four counts, Count1, Count2, Count3, or Count4, in the illustrated example, via accumulation logic 832, 833, 834, and 835, respectively. As will be discussed below, the accumulation logic 832, 833, 834, and/or 835 may develop the counts based on one of several (e.g., one of eight different) pixel conditions 836, 837, and/or 838. Any other suitable number of different conditions may be employed. Additionally or alternatively, the accumulation logic 832, 833, 834, and/or 835 may develop the counts based on a pixel mask 839 or the camY signal 816 (clipped in clipping logic 840. Selection logic 841, 842, 843, and 844 may select from among these signals.

As noted above, in some embodiments, RGB, $sRGB_{linear}$, sRGB or YC1C2 sums may be accumulated conditional on a camYC1C2 or YC1C2 pixel mask. The Y, C1 and C2 values from either output of the non-linear color space conversion or the output of the camera color space conversion may be used to conditionally select RGB, $sRGB_{linear}$, sRGB or YC1C2 values to accumulate. In the example of FIG. 69, the pixel mask defines a 2D weighting map indexed by C1C2 colors. It may also conditioned by brightness—that is, a pixel may be included in the statistics if $Y_{min}$<=Y<=$Y_{max}$.

The 2D pixel filter mask 839 essentially may be the inverse of the 2D color histogram 817. It may contain a 2-dimensional array of weights. The mask may be specified as a 64×64 2D weight map. Each entry may contain a 4-bit weight, but any other suitable size weighting value may be used. The current C1 and C2 values may be scaled to provide the index into the 2D table to lookup the weight. The weight may be used to multiply the input value (RGB, $sRGB_{linear}$, sRGB, or YC1C2) for each qualifying pixel and then added to the RGB, $sRGB_{linear}$, sRGB, or YC1C2 pixel sums. The mask indices in C1 and C2, C1idx and C2idx, may be determined as follows:

C1idx=(C1_scale*(C1−C1_offset))>>16; and

C2idx=(C2_scale*(C2−C2_offset))>>16;

where C1_scale and C2_scale are 17-bit unsigned integer scale values, and C1_offset and C2_offset are 16-bit unsigned values. The allowed values of C1_scale and C2_scale may be in the range 0 to 2^16, and thus may represent a floating point scale between 0 and 1.0. The weight may be looked up in the table if the mask indices are in the range [0, 63], and applied to the input pixel values. When the pixel mask 839 is disabled, all pixels are accumulated in the pixel mask 839 by setting weight to 1. The process may be summarized as follows:

```
if (Pixel Mask is disabled)
    Weight = 1
else
{
    Weight = 0
    if (C1idx >= 0 && C1idx <= 63 && C2idx >= 0 && C2idx <= 63
    && Ymin <= Y <= Ymax
    Weight = StatsC1C2Mask[C2idx][C1idx];
}
R_sum += (R * Weight (or Y_sum))
G_sum += (G * Weight (or C1_sum))
B_sum += (B * Weight (or C1_sum))
Count = Count + Weight
```

Similarly to the pixel filter condition, in addition to pixel sums, the sum of horizontal and vertical positions of pixels that satisfied the pixel mask is reported. Doing so may allow software to compute the centroid of the window for the pixels that satisfy the condition by taking the average of the horizontal and vertical position sums.

The following statistics may be collected for qualifying pixels: 32-bit sums in 8-bit mode or 40-bit sums in 16-bit mode: ($R_{sum}$, $G_{sum}$, $B_{sum}$) or ($sR_{linear\_sum}$, $sG_{linear\_sum}$, $sB_{linear\_sum}$), or ($sR_{sum}$, $sG_{sum}$, $sB_{sum}$) or ($Y_{sum}$, $C1_{sum}$, $C2_{sum}$), a 24-bit pixel count, Count, which is a sum of the number of pixels that were included in the statistic (software can use the sum to generate an average in a tile or window). Note also that the Count may be incremented by the weights such that the Count can be used for computing the weighted average values from the sums.

Referring back to FIG. 65, the Bayer RGB pixels (signal 806), $sRGB_{linear}$ pixels (signal 810), sRGB pixels (signal 812), and YC1C2 (e.g., YCbCr) pixels (signal 814) are provided to the set of pixel conditions 836, 837 . . . 838, whereby RGB, $sRGB_{linear}$, sRGB, YC1C2, or camYC1C2 sums may be accumulated conditionally upon either camYC1C2 or YC1C2 pixel conditions. That is, Y, C1 and C2 values from either output of the non-linear color space conversion (YC1C2) or the output of the camera color space conversion (camYC1C2) are used to conditionally select RGB, $sRGB_{linear}$, sRGB or YC1C2 values to accumulate. While the present embodiment depicts the 3A statistics collection logic 482 as having 8 conditions 836, 837 . . . 838, it should be understood that any number of pixel condition filters may be provided.

Figure 70:
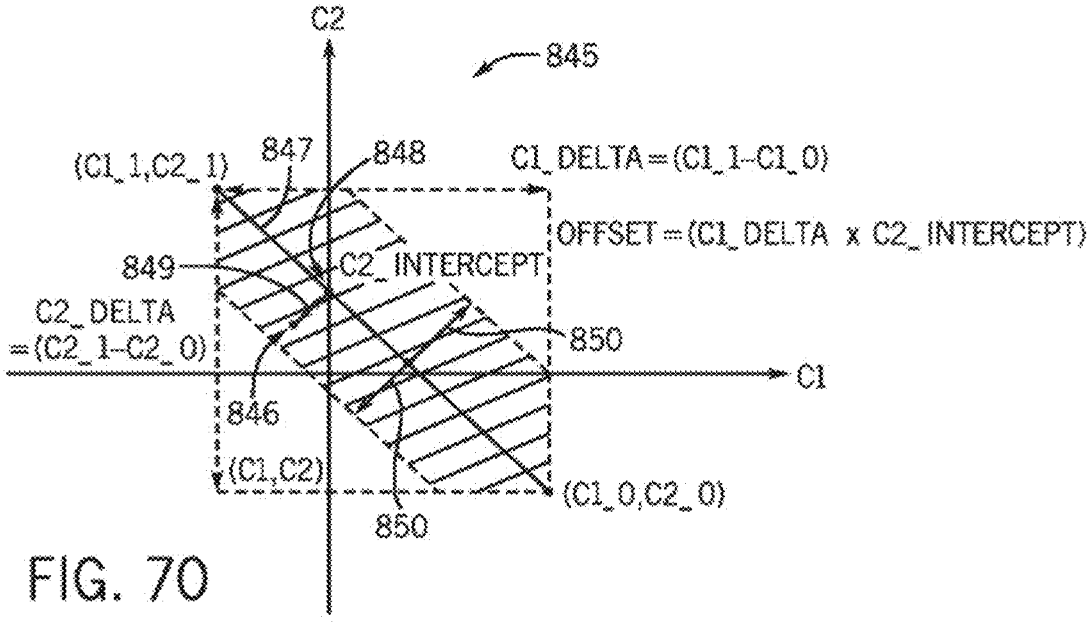
FIG. 70 is a graphical depiction of how the location of a pixel within a C1-C2 color space may be evaluated based on a pixel condition defined for a pixel filter, in accordance with an embodiment.

The pixels selected by the selection logic 828, 829, 830, and/or 831 may be accumulated. In one embodiment, the pixel condition may be defined using thresholds C1_min, C1_max, C2_min, C2 max, as shown in graph 789 of FIG. 63. A pixel is included in the statistics if it satisfies the following conditions:

1. C1_min<=C1<=C1_max
2. C2_min<=C2<=C2_max
3. abs((C2_delta*C1)−(C1_delta*C2)+Offset)<distance_max
4. $Y_{min}$<=Y<=$Y_{max}$ Referring to graph 845 of FIG. 70, in one embodiment, the point 846 represents the values (C2, C1) corresponding to the current YC1C2 pixel data. C1_delta may be determined as the difference between C1_1 and C1_0, and C2_delta may be determined as the difference between C2_1 and C2_0. As shown in FIG. 70, the points (C1_0, C2_0) and (C1_1, C2_1) may define the minimum and maximum boundaries for C1 and C2. The Offset may be determined by multiplying C1_delta by the value 848 (C2_intercept) at where the line 847 intercepts the axis C2. Thus, assuming that Y, C1, and C2 satisfy the minimum and maximum boundary conditions, the selected pixels (Bayer RGB, $sRGB_{linear}$, sRGB, and YC1C2/camYC1C2) is included in the accumulation sum if its distance 849 from the line 847 is less than distance_max 850, which may be distance 849 in pixels from the line multiplied by a normalization factor:

distance_max=distance*sqrt(C1_delta^2+C2_delta^2)

In this example, distance, C1_delta and C2_delta may have a range of −255 to 255 when operating in 8-bit mode. Thus, distance_max 850 may be represented by 17 bits for 8-bit mode operation. When operating in 16-bit mode, distance C1_delta and C2_delta may have a range of −65535 to 65535. Thus, distance_max 834 may be represented by 33 bits for 16-bit mode operation. The points (C1_0, C2_0) and (C1_1, C2_1), as well as parameters for determining distance_max (e.g., normalization factor(s)), may be provided as part of the pixel condition logic 836, 837 . . . 839. As may be appreciated, the pixel condition logic 836, 837 . . . 839 may be configurable/programmable.

Figure 71:
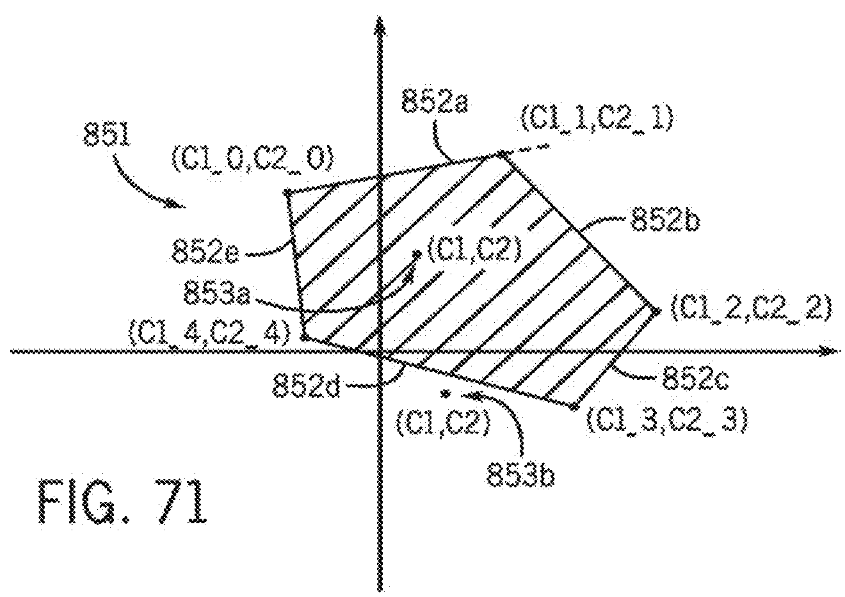
FIG. 71 is a graphical depiction of how the location of a pixel within a C1-C2 color space may be evaluated based on a pixel condition defined for a pixel filter, in accordance with another embodiment.

While the example shown in FIG. 70 depicts a pixel condition based on two sets of points (C1_0, C2_0) and (C1_, C2_1), in additional embodiments, certain pixel filters may define more complex shapes and regions upon which pixel conditions are determined. For instance, FIG. 71 shows embodiments where a pixel filter may define a five-sided polygon 851 using points (C1_0, C2_0), (C1_1, C2_1), (C1_2, C2_2) and (C1_3, C2_3), and (C1_4, C2_4). Each side 852_a-e_ may define a line condition. However, unlike the case shown in FIG. 70 (e.g., the pixel may be on either side of line 847 as long as distance_max is satisfied), the condition may be that the pixel (C1, C2) may be located on the side of the line 852_a-e_ such that it is enclosed by the polygon 851. Thus, the pixel (C1, C2) is counted when the intersection of multiple line conditions is met. For instance, in FIG. 71, such an intersection occurs with respect to pixel 853_a_. However, pixel 853_b_ fails to satisfy the line condition for line 852_d_ and, therefore, would not be counted in the statistics when processed by a pixel filter configured in this manner.

Figure 72:
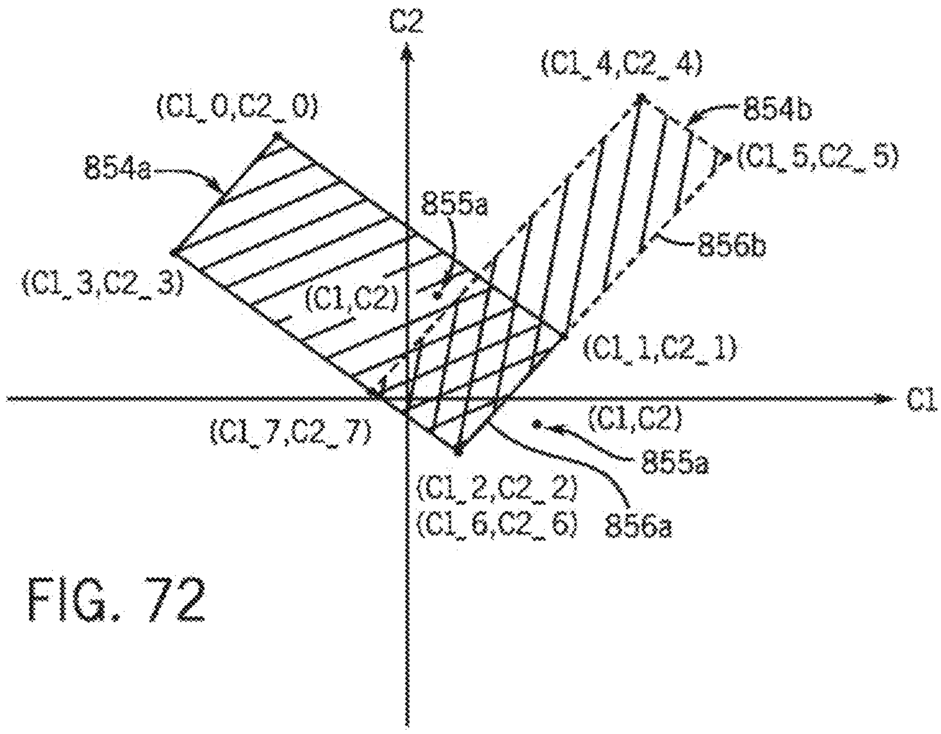
FIG. 72 is a graphical depiction of how the location of a pixel within a C1-C2 color space may be evaluated based on a pixel condition defined for a pixel filter, in accordance with yet a further embodiment.

In a further embodiment, shown in FIG. 72, a pixel condition may be determined based on overlapping shapes.

For instance, FIG. 72 shows how a pixel filter may have pixel conditions defined using two overlapping shapes, here rectangles 8548_a_ and 854_b_ defined by points (C1_0, C2_0), (C1_1, C2_1), (C1_2, C2_2) and (C1_3, C2_3) and points (C1_4, C2_4), (C1_5, C2_25), (C1_6, C2_6) and (C1_7, C2_7), respectively. In this example, a pixel (C1, C2) may satisfy line conditions defined by such a pixel filter by being enclosed within the region collectively bounded by the shapes 854_a_ and 854_b_ (e.g., by satisfying the line conditions of each line defining both shapes). For instance, in FIG. 72, these conditions are satisfied with respect to pixel 855_a_. However, pixel 855_b_ fails to satisfy these conditions (specifically with respect to line 856_a_ of rectangle 854_a_ and line 855_b_ of rectangle 854_b_) and, therefore, would not be counted in the statistics when processed by a pixel filter configured in this manner.

For each pixel filter, qualifying pixels are identified based on the pixel conditions and, for qualifying pixel values, the following statistics may be collected by the 3A statistics engine 742: 32-bit sums in 8-bit mode or 36-bit sums in 16-bit mode: ($R_{sum}$, $G_{sum}$, $B_{sum}$) or ($sR_{linear\_sum}$, $sG_{linear\_sum}$, $sB_{linear\_sum}$), or ($sR_{sum}$, $sG_{sum}$, $sB_{sum}$) or ($Y_{sum}$, $C1_{sum}$, $C2_{sum}$) and a 24-bit pixel count, Count, which may represent the sum of the number of pixels that were included in the statistic. In one embodiment, software may use the sum to generate an average in within a tile or window.

When the camYC1C2 pixels are selected by a pixel filter, color thresholds may be performed on scaled chroma values. For instance, since chroma intensity at the white points increases with luma value, the use of chroma scaled with the luma value in the pixel filter 824 may, in some instances, provide results with improved consistency. For example, minimum and maximum luma conditions may allow the filter to ignore dark and/or bright areas. If the pixel satisfies the YC1C2 pixel condition, the RGB, $sRGB_{linear}$, sRGB or YC1C2 values are accumulated. The selection of the pixel values by the selection logic 825 may depend on the type of information needed. For instance, for white balance, typically RGB or $sRGB_{linear}$ pixels are selected. For detecting specific conditions, such as sky, grass, skin tones, etc., a YCC or sRGB pixel set may be more suitable.

In the present embodiment, eight sets of pixel conditions may be defined, one associated with each of the pixel filters. Some pixel conditions may be defined to carve an area in the C1-C2 color space (FIG. 63) where the white point is likely to be. This may be determined or estimated based on the current illuminant. Then, accumulated RGB sums may be used to determine the current white point based on the R/G and/or B/G ratios for white balance adjustments. Further, some pixel conditions may be defined or adapted to perform scene analysis and classifications. For example, some pixel filters and windows/tiles may be used to detect for conditions, such as blue sky in a top portion of an image frame, or green grass in a bottom portion of an image frame. This information can also be used to adjust white balance.

Additionally, some pixel conditions may be defined or adapted to detect skin tones. For such filters, tiles may be used to detect areas of the image frame that have skin tone. By identifying these areas, the quality of skin tone may be improved by, for example, reducing the amount of noise filter in skin tone areas and/or decreasing the quantization in the video compression in those areas to improve quality.

The 3A statistics collection logic 482 may also provide for the collection of luma data. For instance, the luma value, camY, from the camera color space conversion (camYC1C2) may be used for accumulating luma sum statistics. In one embodiment, the following luma information is may be collected by the 3A statistics collection logic 482:

$Y_{sum}$: sum of camY cond($Y_{sum}$): sum of camY that satisfies the condition: $Y_{min}$<=camY<$Y_{max}$ Ycount1: count of pixels where camY<$Y_{min}$, Ycount2: count of pixels where camY>=$Y_{max}$ Here, Ycount1 may represent the number of underexposed pixels and Ycount2 may represent the number of overexposed pixels. This may be used to determine whether the image is overexposed or underexposed. For instance, if the pixels do not saturate, the sum of camY ($Y_{sum}$) may indicate average luma in a scene, which may be used to achieve a target AE exposure. For instance, in one embodiment, the average luma may be determined by dividing $Y_{sum}$ by the number of pixels. Further, by knowing the luma/AE statistics for tile statistics and window locations, AE metering may be performed. For instance, depending on the image scene, it may be desirable to weigh AE statistics at the center window more heavily than those at the edges of the image, such as may be in the case of a portrait.

In the presently illustrated embodiment, the 3A statistics collection logic may be configured to collect statistics in tiles and windows. In the illustrated configuration, one window may be defined for tile statistics 863. The window may be specified with a column start and width, and a row start and height. In one embodiment, the window position and size may be selected as a multiple of four pixels and, within this window, statistics are gathered in tiles of arbitrary sizes. By way of example, all tiles in the window may be selected such that they have the same size. The tile size may be set independently for horizontal and vertical directions and, in one embodiment, the maximum limit on the number of horizontal tiles may be set (e.g., a limit of 128 horizontal tiles). Further, in one embodiment, the minimum tile size may be set to 8 pixels wide by 4 pixels high, for example. Below are some examples of tile configurations based on different video/imaging modes and standards to obtain a window of 16×16 tiles:

VGA 640×480: tile interval 40×30 pixels

HD 1280×720: tile interval 80×45 pixels

HD 1920×1080: tile interval 120×68 pixels

5 MP 2592×1944: tile interval 162×122 pixels

8 MP 3280×2464: tile interval 205×154 pixels

With regard to the present embodiment, from the eight available pixel filters 824 (PF0-PF7), four may be selected for tile statistics 863. For each tile, the following statistics may collected:

($R_{sum0}$, $G_{sum0}$, $B_{sum0}$) or ($sR_{linear\_sum0}$, $sG_{linear\_sum0}$, $sB_{linear\_sum0}$), or ($sR_{sum0}$, $sG_{sum0}$, $sB_{sum0}$) or ($Y_{sum0}$, $C1_{sum0}$, $C2_{sum0}$), Count0

($R_{sum1}$, $G_{sum1}$, $B_{sum1}$) or ($sR_{linear\_sum1}$, $sG_{linear\_sum1}$, $sB_{linear\_sum1}$), or ($sR_{sum1}$, $sG_{sum1}$, $sB_{sum1}$) or ($Y_{sum1}$, $C1_{sum1}$, $C2_{sum1}$), Count1

($R_{sum2}$, $G_{sum2}$, $B_{sum2}$) or ($sR_{linear\_sum2}$, $sG_{linear\_sum2}$, $sB_{linear\_sum2}$), or ($sR_{sum2}$, $sG_{sum2}$, $sB_{sum2}$) or ($Y_{sum2}$, $C1_{sum2}$, $C2_{sum2}$), Count2

($R_{sum3}$, $G_{sum3}$, $B_{sum3}$) or ($sR_{linear\_sum3}$, $sG_{linear\_sum3}$, $sB_{linear\_sum3}$), or ($sR_{sum3}$, $sG_{sum3}$, $sB_{sum3}$) or ($Y_{sum3}$, $C1_{sum3}$, $C2_{sum3}$), Count3, or $Y_{sum}$, cond($Y_{sum}$), $Y_{count1}$, $Y_{count2}$ (from camY)

In the above-listed statistics, Count0-3 represents the count of pixels that satisfy pixel conditions corresponding to the selected four pixel filters. For example, if pixel filters PF0, PF1, PF5, and PF6 are selected as the four pixel filters for a particular tile or window, then the above-provided expressions may correspond to the Count values and sums corresponding to the pixel data (e.g., Bayer RGB, $sRGB_{linear}$, sRGB, YC1Y2, camYC1C2) which is selected for those filters. Additionally, the Count values may be used to normalize the statistics (e.g., by dividing color sums by the corresponding Count values). As shown, depending at least partially upon the types of statistics needed, the selected pixels filters may be configured to select between either one of Bayer RGB, $sRGB_{linear}$, or sRGB pixel data, or YC1C2 (non-linear or camera color space conversion depending on selection by logic) pixel data, and determine color sum statistics for the selected pixel data. Additionally, as discussed above the luma value, camY, from the camera color space conversion (camYC1C2) is also collected for luma sum information for auto-exposure (AE) statistics.

Additionally, the 3A statistics collection logic 482 may also be configured to collect statistics 861 for multiple windows. For instance, in one embodiment, up to eight floating windows may be used, with any rectangular region having a multiple of four pixels in each dimension (e.g., height×width), up to a maximum size corresponding to the size of the image frame. However, the location of the windows is not necessarily restricted to multiples of four pixels. For instance, windows can overlap with one another.

In the present embodiment, four pixel filters may be selected from the available eight pixel filters for each window. Statistics for each window may be collected in the same manner as for tiles, discussed above. Thus, for each window, the following statistics 861 may be collected:

($R_{sum0}$, $G_{sum0}$, $B_{sum0}$) or $sR_{linear\_sum0}$, $sG_{linear\_sum0}$, $sB_{linear\_sum0}$), or ($sR_{sum0}$, $sG_{sum0}$, $sB_{sum0}$) or ($Y_{sum0}$, $C1_{sum0}$, $C2_{sum0}$), Count0

($R_{sum1}$, $G_{sum1}$, $B_{sum1}$) or ($sR_{linear\_sum1}$, $sG_{linear\_sum1}$, $sB_{linear\_sum1}$), or ($sR_{sum1}$, $sG_{sum1}$, $sB_{sum1}$) or ($Y_{sum1}$, $C1_{sum1}$, $C2_{sum1}$), Count1

($R_{sum2}$, $G_{sum2}$, $B_{sum2}$) or ($sR_{linear\_sum2}$, $sG_{linear\_sum2}$, $sB_{linear\_sum2}$), or ($sR_{sum2}$, $sG_{sum2}$, $sB_{sum2}$) or ($Y_{sum2}$, $C1_{sum2}$, $C2_{sum2}$), Count2

($R_{sum3}$, $G_{sum3}$, $B_{sum3}$) or ($sR_{linear\_sum3}$, $sG_{linear\_sum3}$, $sB_{linear\_sum3}$), or ($sR_{sum3}$, $sG_{sum3}$, $sB_{sum3}$) or ($Y_{sum3}$, $C1_{sum3}$, $C2_{sum3}$), Count3, or $Y_{sum}$, cond($Y_{sum}$), $Y_{count1}$, $Y_{count2}$ (from camY)

In the above-listed statistics, Count0-3 represents the count of pixels that satisfy pixel conditions corresponding to the selected four pixel filters for a particular window. From the eight available pixel filters, the four active pixel filters may be selected independently for each window. Additionally, one of the sets of statistics may be collected using pixel filters or the camY luma statistics. The window statistics collected for AWB and AE may, in one embodiment, be mapped to one or more registers.

Figure 73:
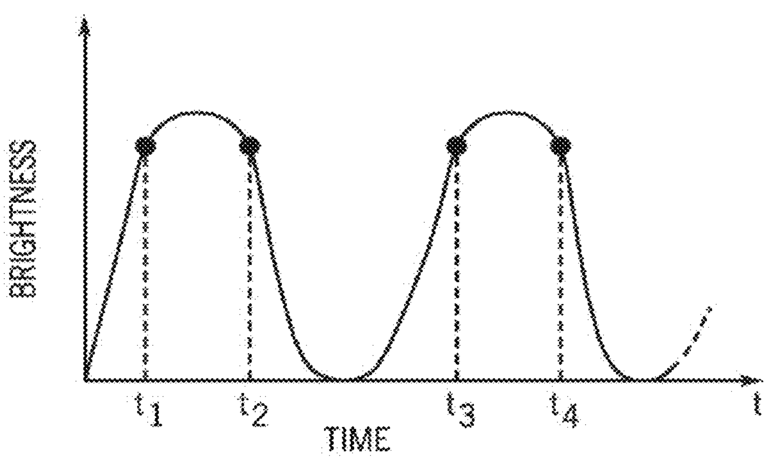
FIG. 73 is a graph showing how image sensor integration times may be determined to compensate for flicker, in accordance with an embodiment.

Referring still to FIG. 65, the 3A statistics collection logic 482 may also be configured to acquire luma row sum statistics 859 for one window using the luma value, camY, for the camera color space conversion. This information may be used to detect and compensate for flicker. Flicker is generated by a periodic variation in some fluorescent and incandescent light sources, typically caused by the AC power signal. For example, referring to FIG. 73, a graph illustrating how flicker may be caused by variations in a light source is shown. Flicker detection may thus be used to detect the frequency of the AC power used for the light source (e.g., 50 Hz or 60 Hz). Once the frequency is known, flicker may be avoided by setting the image sensor's integration time to an integer multiple of the flicker period.

To detect for flicker, the camera luma, camY, is accumulated over each row. Due to the down-sample of the incoming Bayer data, each camY value may corresponds to 4 rows of the original raw image data. Control logic and/or firmware may then perform a frequency analysis of the row average or, more reliably, of the row average differences over consecutive frames to determine the frequency of the AC power associated with a particular light source. For example, with respect to FIG. 73, integration times for the image sensor may be based on times t1, t2, t3, and t4 (e.g., such that integration occurs at times corresponding to when a lighting source exhibiting variations is generally at the same brightness level.

In one embodiment, a luma row sum window may be specified and statistics 859 are reported for pixels within that window. By way of example, for 1080p HD video capture, assuming a window of 1024 pixel high, 256 luma row sums are generated with 1-row resolution. Each accumulated value may be expressed with up to 32 bits for 16-bit camY values, for up to 1024 samples per row and up to 64 rows.

Figure 74:
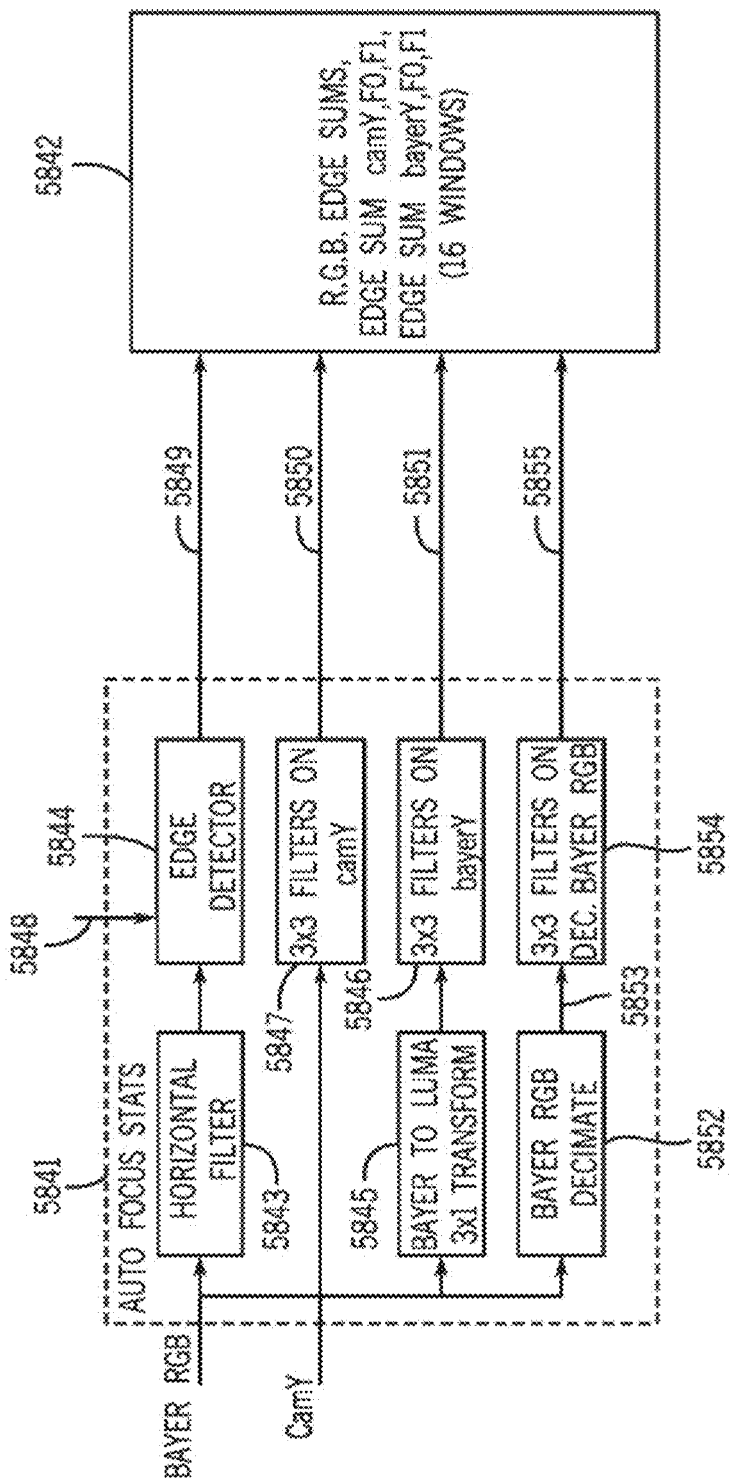
FIG. 74 is a detailed block diagram showing logic that may be implemented in the statistics collection engine of FIG. 65 and configured to collect auto-focus statistics in accordance with an embodiment.

The 3A statistics collection logic 146 of FIG. 65 may also provide for the collection of auto-focus (AF) statistics 842 by way of the auto-focus statistics logic 5841. A functional block diagram showing embodiments of the AF statistics logic 5841 in more detail is provided in FIG. 74. As shown, the AF statistics logic 5841 may include a horizontal filter 5843 and an edge detector 5844 which is applied to the original Bayer RGB (not down-sampled), two 3×3 filters 5846 on Y from Bayer, and two 3×3 filters 5847 on camY. In general, the horizontal filter 5843 provides a fine resolution statistics per color component, the 3×3 filters 5846 may provide fine resolution statistics on BayerY (Bayer RGB with 3×1 transform (logic 5845) applied), and the 3×3 filters 5847 may provide coarser two-dimensional statistics on camY (since camY is obtained using down-scaled Bayer RGB data, i.e., logic 5815). Further, the logic 5841 may include logic 5852 for decimating the Bayer RGB data (e.g., 2×2 averaging, 4×4 averaging, etc.), and the decimated Bayer RGB data 5853 may be filtered using 3×3 filters 5854 to produce a filtered output 5855 for decimated Bayer RGB data. The present embodiment provides for 16 windows of statistics. At the raw frame boundaries, edge pixels are replicated for the filters of the AF statistics logic 841. The various components of the AF statistics logic 5841 are described in further detail below.

First, the horizontal edge detection process includes applying the horizontal filter 5843 for each color component (R, Gr, Gb, B) followed by an optional edge detector 5844 on each color component. Thus, depending on imaging conditions, this configuration allows for the AF statistic logic 5841 to be set up as a high pass filter with no edge detection (e.g., edge detector disabled) or, alternatively, as a low pass filter followed by an edge detector (e.g., edge detector enabled). For instance, in low light conditions, the horizontal filter 5843 may be more susceptible to noise and, therefore, the logic 5841 may configure the horizontal filter as a low pass filter followed by an enabled edge detector 5844. As shown, the control signal 5848 may enable or disable the edge detector 5844. The statistics from the different color channels are used to determine the direction of the focus to improve sharpness, since the different colors may focus at different depth. In particular, the AF statistics logic 5841 may provide for techniques to enabling auto-focus control using a combination of coarse and fine adjustments (e.g., to the focal length of the lens). Embodiments of such techniques are described in additional detail below.

In one embodiment the horizontal filter may be a 7-tap filter. The 7-tap horizontal filter may be followed by an optional edge detector on Red, Green and Blue samples.

Thus, the AF statistics collection may be set up as a high pass filter with no edge detection. Additionally or alternatively, it can be set up as a low pass filter followed by an edge detector. The statistics from the different color channels may be used to determine the direction of the focus to improve sharpness, since the different colors may focus at different depths. The horizontal filter may be defined as follows:

out(i)=(af_horzfilt_coeff[0]*(in(i−3)+in(i+3))+af_horzfilt_coeff[1]*(in(i−2)+n(i+2))+af_horzfilt_coeff[2]*(in(i−1)+in(i+1))+af_horzfilt_coeff[3]*in(i))

out(i)=max(−65535, min(65535, out(i)))

Here, each coefficient af_horzfilt_coeff[0:3] may be in the range [−2, 2], and i represents the input pixel index for R, Gr, Gb or B. The filtered output out(i) may be clipped between a minimum and maximum value of −255 and 255, respectively. The filter coefficients may be defined independently per color component.

The optional edge detector 5844 may follow the output of the horizontal filter 5843. In one embodiment, the edge detector 5844 may be defined as:

edge(i)=abs(−2*out(i−1)+2*out(i+1))+abs(−out(i−2)+out(i+2))

edge(i)=max(0, min(65535, edge(i)))

Thus, the edge detector 5844, when enabled, may output a value based upon the two pixels on each side of the current input pixel i. The result may be clipped to a 16-bit value between 0 and 65535.

Depending on whether an edge is detected, the final output of the pixel filter (e.g., filter 5843 and detector 5844) may be selected as either the output of the horizontal filter 5843 or the output of the edge detector 5844. For instance, the output 5849 of the edge detector 5844 may be edge(i) if an edge is detected, or may be the absolute value of the horizontal filter output out(i) if no edge is detected. When operating in a 16-bit mode, the final output of the pixel filter may be selected to be either the output of the horizontal filter or the output of the edge detector the 16-bit mode):

edge(i)=(af_horzfilt_edge_en)? edge(i): abs(out(i))

In an 8-bit mode, the result is right shifted by 8 before accumulation:

edge(i)=(edge(i)>>8)

For each window, the accumulated value edge_sum[R,Gr,Gb,B], can selected to be either: (1) the sum of edge(j,i) for each pixel over the window, or (2) the maximum value of edge(j) across a line in the window, max(edge), summed over the lines in the window. The value of edge(j,i) is only accumulated if it is above a programmable threshold. In 8-bit mode, the number of bits required to store the maximum value of edge_sum[R,Gr,Gb,B] may be 30 bits, assuming a maximum AF window size of 4096×4096 (8 bit edge result, plus 22 bits AF window size). In 16-bit mode, the number of bits required may be 38 bits, assuming a maximum AF window size of 4096×4096 (with a 16-bit edge result, plus 22 bits for AF window size). In this case, the 32 least significant bits (LSBs) of the results are stored in one register, and the upper 6 most significant bits (MSBs) of the results are stored in a second register.

As discussed, the 3×3 filters 5847 for camY luma may include two programmable 3×3 filters, referred to as F0 and F1, which are applied to camY. The result of the filter 5847 goes to either a squared function or an absolute value function. The result is accumulated over a given AF window for both 3×3 filters F0 and F1 to generate a luma edge value. In one embodiment, the luma edge values at each camY pixel are defined as follows:

edgecamY_FX(j,i)=FX*camY
=FX(0,0)*camY(j−1, i−1)+FX(0,1)*camY(j−1, i)+FX(0,2)*camY(j−1, i+1)+FX(1,0)*camY(j, i−1)+FX(1,1)*camY(j, i)+FX(1,2)*camY(j, i+1)+FX(2,0)*camY(j+1, i−1)+FX(2,1)*camY(j+1, i)+FX(2,2)*camY (j+1, i+1)

edgecamY_FX(j, i)=f(max(−65535, min(65535, edgecamY_FX(j, i))))

f(a)=a^2 or abs(a) for 16-bit mode, or f(a)=(a^2)>>16 or (abs(a)>>8) for 8-bit mode where FX represents the 3×3 programmable filters, F0 and F1, with signed coefficients in the range [−4, 4]. The indices j and i represent pixel locations in the camY image. As discussed above, the filter on camY may provide coarse resolution statistics, since camY is derived using downscaled (e.g., 4×4 to 1) Bayer RGB data. For instance, in one embodiment, the filters F0 and F1 may be set using a Scharr operator, which offers improved rotational symmetry over a Sobel operator, an example of which is shown below:

$$F0 = \begin{bmatrix} -3 & 0 & 3 \\ -10 & 0 & 10 \\ -3 & 0 & 3 \end{bmatrix}$$

$$F1 = \begin{bmatrix} -3 & -10 & -3 \\ 0 & 0 & 0 \\ 3 & 10 & 3 \end{bmatrix}$$

For each window, the accumulated values 5850 determined by the filters 5847, edgecamY_FX sum (where FX=F0 and F1), can selected to be either (1) the sum of edgecamY_FX(j,i) for each pixel over the window, or (2) the maximum value of edgecamY_FX(j) across a line in the window, summed over the lines in the window. In one embodiment, edgecamY_FX sum may saturate to a 32-bit value when f(a) is set to a^2 to provide "peakier" statistics with a finer resolution. To avoid saturation, a maximum window size X*Y in raw frame pixels may be set such that it does not exceed a total of 1024×1024 pixels (e.g., i.e. X*Y<=1048576 pixels, with 16 bits per pixel plus 16 bits for AF window size). As noted above, f(a) may also be set as an absolute value to provide more linear statistics. In 16-bit mode, the number of bits required may be 52 bits, when a maximum AF window size of 4096×4096 (32 bits per pixel, plus 20 bits for AF window size) is used. For such a case, the 32 least significant bits (LSBs) of the results are stored in one register, and the upper 20 most significant bits (MSBs) of the results are stored in another register.

The AF 3×3 filters 846 on Bayer Y may defined in a similar manner as the 3×3 filters in camY, but they are applied to luma values Y generated from a Bayer quad (2×2 pixels). First, 8-bit Bayer RGB values are converted to Y with programmable coefficients in the range [0, 4] to generate a white balanced Y value, as shown below. The AF 3×3 filters on Y from Bayer are defined in a similar manner as the 3×3 filters in camY, but they are applied to Luma values Y generated from a Bayer quad (2×2 pixels). First, 16-bit Bayer RGB values are transformed to Y with programmable coefficients in the range [0, 4) to generate a white balanced Y:

bayerY=max(0, min(65535, bayerY_Coeff[0]*R+bayerY_Coeff[1]*(Gr+Gb)/2+bayerY_Coeff[2]*B))

Like the filters 5847 for camY, the 3×3 filters 5846 for bayerY luma may include two programmable 3×3 filters, referred to as F0 and F1, which are applied to bayerY. The result of the filter 5846 goes to either a squared function or an absolute value function. The result is accumulated over a given AF window for both 3×3 filters F0 and F1 to generate a luma edge value. In one embodiment, the luma edge values at each bayerY pixel are defined as follows:

edgebayerY_FX(j,i)=FX*bayerY =FX(0,0)*bayerY(j−1,i−1)+FX(0,1)*bayerY(j−1,i)+ FX(0,2)*bayerY(j−1,i)+FX(1,0)*bayerY(j,i−1)+FX (1,1)*bayerY(j,i)+FX(1,2)*bayerY(j−1,i)+FX(2,0) *bayerY(j+1,i−1)+FX(2,1)*bayerY(j+1,i)+FX(2,2) *bayerY(j+1,i)

edgebayerY_FX(j,i)=f(max(−65535, min(65535, edgebayerY_FX(j,i))))

f(a)=a^2 or abs(a) for 16-bit mode, or f(a)=(a^2)>>16 or (abs(a)>>8) for 8-bit mode where FX represents the 3×3 programmable filters, F0 and F1, with signed coefficients in the range [−4, 4]. The indices j and i represent pixel locations in the bayerY image. As discussed above, the filter on Bayer Y may provide fine resolution statistics, since the Bayer RGB signal received by the AF logic 5841 is not decimated. By way of examples only, the filters F0 and F1 of the filter logic 846 may be set using one of the following filter configurations:

$$\begin{bmatrix} -1 & -1 & -1 \\ -1 & 8 & -1 \\ -1 & -1 & -1 \end{bmatrix} \begin{bmatrix} -6 & 10 & 6 \\ 10 & 0 & -10 \\ 6 & -10 & -6 \end{bmatrix} \begin{bmatrix} 0 & -1 & 0 \\ -1 & 2 & 0 \\ 0 & 0 & 0 \end{bmatrix}$$

For each window, the accumulated values 5851 determined by the filters 5846, edgebayerY_FX sum (where FX=F0 and F1), can selected to be either (1) the sum of edgebayerY_FX(j,i) for each pixel over the window, or (2) the maximum value of edgebayerY_FX(j) across a line in the window, summed over the lines in the window. In 8-bit mode, edgebayerY_FX sum may saturate to 32-bits when f(a) is set to a^2. Thus, to avoid saturation, the maximum window size X*Y in raw frame pixels should be set such that it does not exceed a total of 512×512 pixels (e.g., X*Y<=262144, with 16 bits per pixel plus 16 bits for the AF window size). As discussed above, setting f(a) to a^2 may provide for peakier statistics, while setting f(a) to abs(a) may provide for more linear statistics. In 16-bit mode, the number of bits required may be 54 bits, assuming a maximum AF window size of 4096×4096, with 32 bits per pixel, plus 22 bits for AF window size. For such a case, the 32 least significant bits (LSBs) of the results are stored in one register, and the upper 22 most significant bits (MSBs) of the results are stored in a second register.

As discussed above, statistics 5842 for AF are collected for 16 windows. The windows may be any rectangular area with each dimension being a multiple of 4 pixels. Because each filtering logic 5846 and 5847 includes two filters, in some instances, one filter may be used for normalization over 4 pixels, and may be configured to filter in both vertical and horizontal directions. Further, in some embodiments, the AF logic 5841 may normalize the AF statistics by brightness. This may be accomplished by setting one or more of the filters of the logic blocks 5846 and 5847 as bypass filters. In certain embodiments, the location of the windows may be restricted to multiple of 4 pixels, and windows are permitted to overlap. For instance, one window may be used to acquire normalization values, while another window may be used for additional statistics, such as variance, as discussed below. In one embodiment, the AF filters (e.g., 5843, 5846, 5847) may not implement pixel replication at the edge of an image frame and, therefore, in order for the AF filters to use all valid pixels, the AF windows may be set such that they are each at least 4 pixels from the top edge of the frame, at least 8 pixels from the bottom edge of the frame and at least 12 pixels from the left/right edge of the frame. In 8-bit mode, the following statistics may be collected and reported for each window:

32-bit edgeGr_sum for Gr
32-bit edgeR_sum for R
32-bit edgeB_sum for B
32-bit edgeGb_sum for Gb
32-bit edgebayerY_F0_sum for Y from Bayer for filter0 (F0)
32-bit edgebayerY_F1_sum for Y from Bayer for filter1 (F1)
32-bit edgecamY_F0_sum for camY for filter0 (F0)
32-bit edgecamY_F1_sum for camY for filter1 (F1)

In such embodiments, the memory required for storing the AF statistics 5842 may be 16 (windows) multiplied by 8 (Gr, R, B, Gb, bayerY_F0, bayerY_F1, camY_F0, camY_F1) multiplied by 32 bits.

In 16-bit mode, the following statistics may be collected and reported per window:

38-bit edgeGr_sum for Gr
38-bit edgeR_sum for R
38-bit edgeB_sum for B
38-bit edgeGb_sum for Gb
52-bit edgebayerY_F0_sum for Y from Bayer for filter0
52-bit edgebayerY_F1_sum for Y from Bayer for filter1
54-bit edgecamY_F0_sum for camY for filter0
54-bit edgecamY_F1_sum for camY for filter1

The number of elements may include 16 (windows)×8 (Gr, R, B, Gb, bayerY_F0, bayerY_F1, camY_F0, camY_F1)×64 bits (1024 bytes). The most significant bits (MSBs) may be stored in one register and the remaining least significant bits (LSBs) may be stored in a second register. In addition to the output of the filter, the input pixel and the input pixel squared may also be reported for each of the 16 AF windows. This may be used, for example, to normalize the AF score.

Thus, in one embodiment, the accumulated value per window may be selected between: the output of the filter (which may be configured as a default setting), the input pixel, or the input pixel squared. The selection may be made for each of the 16 AF windows, and may apply to all of the 8 AF statistics (listed above) in a given window. This may be used to normalize the AF score between two overlapping windows, one of which is configured to collect the output of the filter and one of which is configured to collect the input pixel sum. Additionally, for calculating pixel variance in the case of two overlapping windows, one window may be configured to collect the input pixel sum, and another to collect the input pixel squared sum, thus providing for a variance that may be calculated as:

$$\text{Variance}=(\text{avg\_pixel}^2)-(\text{avg\_pixel})^2$$

Using the AF statistics, the ISP control logic 84 (FIG. 7) may be configured to adjust a focal length of the lens of an image device (e.g., 30) using a series of focal length adjustments based on coarse and fine auto-focus "scores" to bring an image into focus. As discussed above, the 3×3 filters 5847 for camY may provide for coarse statistics, while the horizontal filter 5843 and edge detector 5844 may provide for comparatively finer statistics per color component, while the 3×3 filters 5846 on BayerY may provide for fine statistics on BayerY. Further, the 3×3 filters 5854 on a decimated Bayer RGB signal 853 may provide coarse statistics for each color channel. As discussed further below, AF scores may be calculated based on filter output values for a particular input signal (e.g., sum of filter outputs F0 and F1 for camY, BayerY, Bayer RGB decimated, or based on horizontal/edge detector outputs, etc.).

Figure 75:
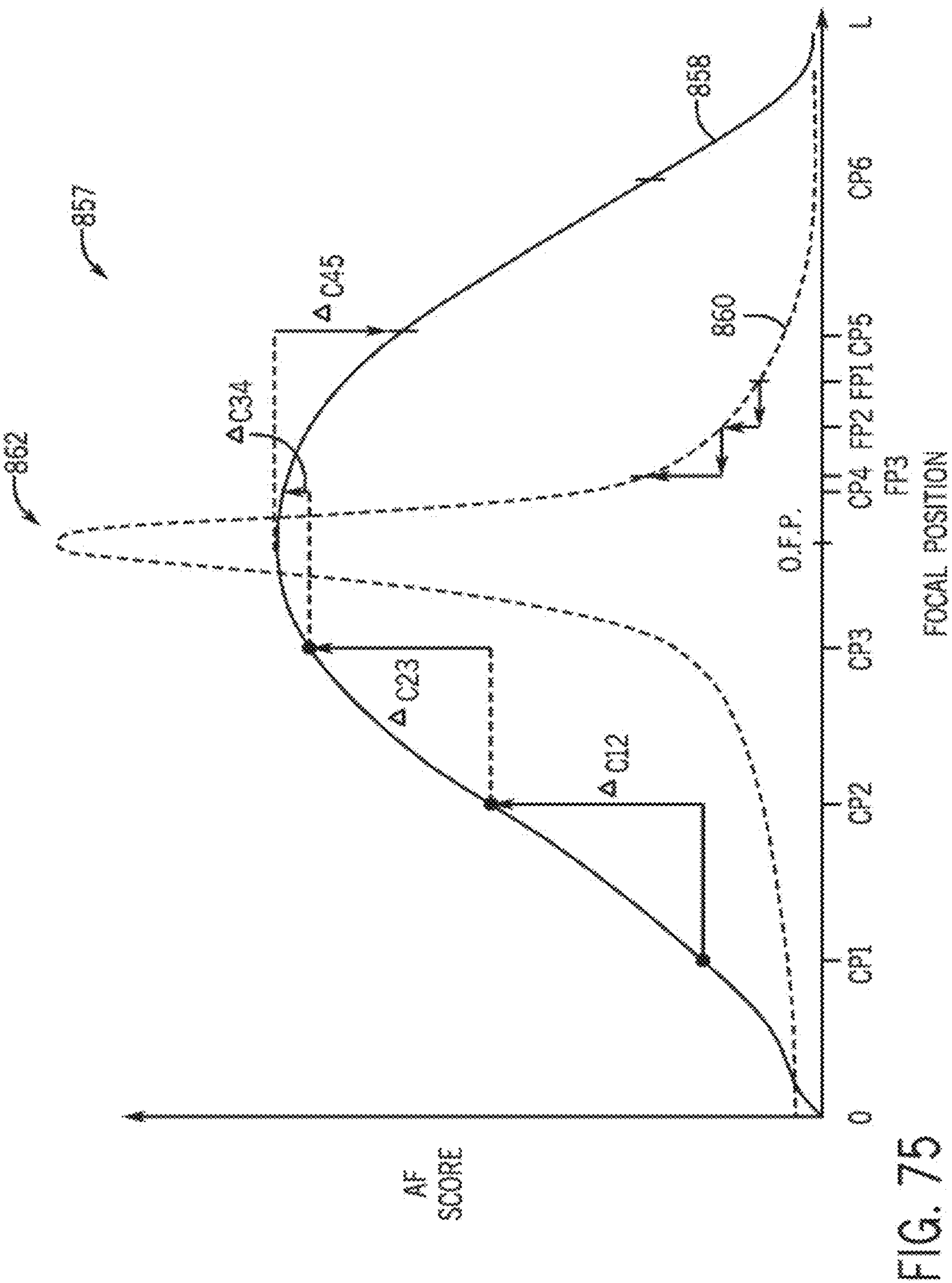
FIG. 75 is a graph depicting a technique for performing auto-focus using coarse and fine auto-focus scoring values, in accordance with an embodiment.

FIG. 75 shows a graph 5857 that depicts curves 5858 and 5860 which represent coarse and fine AF scores, respectively. As shown, the coarse AF scores based upon the coarse statistics may have a more linear response across the focal distance of the lens. Thus, at any focal position, a lens movement may generate a change in an auto focus score which may be used to detect if the image is becoming more in focus or out of focus. For instance, an increase in a coarse AF score after a lens adjustment may indicate that the focal length is being adjusted in the correct direction (e.g., towards the optical focal position).

However, as the optical focal position is approached, the change in the coarse AF score for smaller lens adjustments steps may decrease, making it difficult to discern the correct direction of focal adjustment. For example, as shown on graph 857, the change in coarse AF score between coarse position (CP) CP1 and CP2 is represented by $\Delta_{C12}$, which shows an increase in the coarse from CP1 to CP2. However, as shown, from CP3 to CP4, the change $\Delta_{C34}$ in the coarse AF score (which passes through the optimal focal position (OFP)), though still increasing, is relatively smaller. It should be understood that the positions CP1-CP6 along the focal length L are not meant to necessarily correspond to the step sizes taken by the auto-focus logic along the focal length. That is, there may be additional steps taken between each coarse position that are not shown. The illustrated positions CP1-CP6 are only meant to show how the change in the coarse AF score may gradually decrease as the focal position approaches the OFP.

Once the approximate position of the OFP is determined (e.g., based on the coarse AF scores shown in FIG. 75, the approximate position of the OFP may be between CP3 and CP5), fine AF score values, represented by curve 860 may be evaluated to refine the focal position. For instance, fine AF scores may be flatter when the image is out of focus, so that a large lens positional change does not cause a large change in the fine AF score. However, as the focal position approaches the optical focal position (OFP), the fine AF score may change sharply with small positional adjustments. Thus, by locating a peak or apex 862 on the fine AF score curve 860, the OFP may be determined for the current image scene. Thus, to summarize, coarse AF scores may be used to determine the general vicinity of the optical focal position, while the fine AF scores may be used to pinpoints a more exact position within that vicinity.

In one embodiment, the auto-focus process may begin by acquiring coarse AF scores along the entire available focal length, beginning at position 0 and ending at position L (shown on graph 857) and determine the coarse AF scores at various step positions (e.g., CP1-CP6). In one embodiment, once the focal position of the lens has reached position L, the position may reset to 0 before evaluating AF scores at various focal positions. For instance, this may be due to coil settling time of a mechanical element controlling the focal position. In this embodiment, after resetting to position 0, the focal position may be adjusted toward position L to a position that first indicated a negative change in a coarse AF score, here position CP5 exhibiting a negative change $\Delta_{C45}$ with respect to position CP4. From position CP5, the focal position may be adjusted in smaller increments relative to increments used in the coarse AF score adjustments (e.g., positions FP1, FP2, FP3, etc.) back in the direction towards position 0, while searching for a peak 862 in the fine AF score curve 860. As discussed above, the focal position OFP corresponding to the peak 862 in the fine AF score curve 860 may be the optimal focal position for the current image scene.

As may be appreciated, the techniques described above for locating the optimal area and optimal position for focus may be referred to as "hill climbing," in the sense that the changes in the curves for the AF scores 858 and 860 are analyzed to locate the OFP. Further, while the analysis of the coarse AF scores (curve 858) and the fine AF scores (curve 860) is shown as using same-sized steps for coarse score analysis (e.g., distance between CP1 and CP2) and same-sized steps for fine score analysis (e.g., distance between FP1 and FP2), in some embodiments, the step sizes may be varied depending on the change in the score from one position to the next. For instance, in one embodiment, the step size between CP3 and CP4 may be reduced relative to the step size between CP1 and CP2 since the overall delta in the coarse AF score ($\Delta_{C34}$) is less then the delta from CP1 to CP2 ($\Delta_{C12}$).

Figure 76:
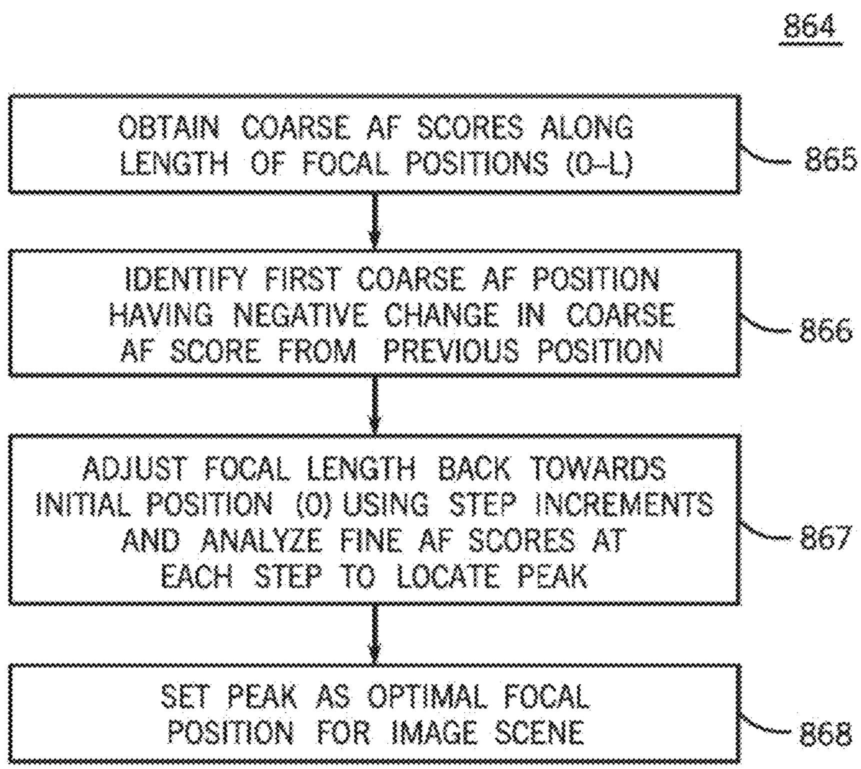
FIG. 76 is a flowchart depicting a process for performing auto-focus using coarse and fine auto-focus scoring values, in accordance with an embodiment.

A method 864 depicting this process is illustrated in FIG. 76. Beginning at block 865, a coarse AF score is determined for image data at various steps along the focal length, from position 0 to position L (FIG. 75). Thereafter, at block 866, the coarse AF scores are analyzed and the coarse position exhibiting the first negative change in the coarse AF score is identified as a starting point for fine AF scoring analysis. For instance, subsequently, at block 867, the focal position is stepped back towards the initial position 0 at smaller steps, with the fine AF score at each step being analyzed until a peak in the AF score curve (e.g., curve 860 of FIG. 75) is located. At block 868, the focal position corresponding to the peak is set as the optimal focal position for the current image scene.

As discussed above, due to mechanical coil settling times, the embodiment of the technique shown in FIG. 76 may be adapted to acquire coarse AF scores along the entire focal length initially, rather than analyzing each coarse position one by one and searching for an optimal focus area. Other embodiments, however, in which coil settling times are less of a concern, may analyze coarse AF scores one by one at each step, instead of searching the entire focal length.

Figure 77:
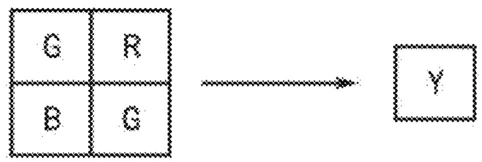
FIGS. 77 and 78 show the decimation of raw Bayer data to obtain a white balanced luma value.
Figure 78:
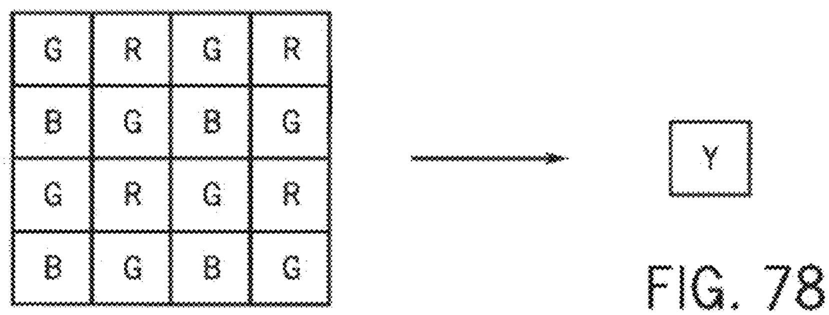

In certain embodiments, the AF scores may be determined using white balanced luma values derived from Bayer RGB data. For instance, the luma value, Y, may be derived by decimating a 2×2 Bayer quad by a factor of 2, as shown in FIG. 77, or by decimating a 4×4 pixel block consisting of four 2×2 Bayer quads by a factor of 4, as shown in FIG. 78. In one embodiment, AF scores may be determined using gradients. In another embodiment, AF scores may be determined by applying a 3×3 transform using a Scharr operator, which provides rotational symmetry while minimizing weighted mean squared angular errors in the Fourier domain. By way of example, the calculation of a coarse AF score on camY using a common Scharr operator (discussed above) is shown below:

$$AFScore_{coarse} = f\left(\begin{bmatrix} -3 & 0 & 3 \\ -10 & 0 & 10 \\ -3 & 0 & 3 \end{bmatrix} \times \text{in}\right) + f\left(\begin{bmatrix} -3 & -10 & -3 \\ 0 & 0 & 0 \\ 3 & 10 & 3 \end{bmatrix} \times \text{in}\right),$$

where in represents the decimated luma Y value. In other embodiments, the AF score for both coarse and fine statistics may be calculated using other 3×3 transforms.

Figure 79:
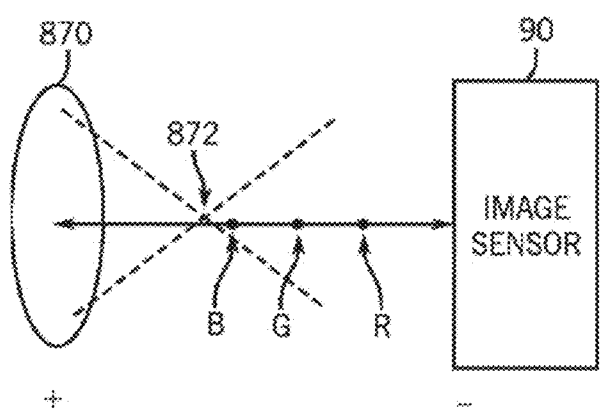
FIG. 79 shows a technique for performing auto-focus using relative auto-focus scoring values for each color component, in accordance with an embodiment.

Auto focus adjustments may also be performed differently depending on the color components, since different wavelengths of light may be affected differently by the lens, which is one reason the horizontal filter 843 is applied to each color component independently. Thus, auto-focus may still be performed even in the present of chromatic aberration in the lens. For instance, because red and blue typically focuses at a different position or distance with respect to green when chromatic aberrations are present, relative AF scores for each color may be used to determine the direction to focus. This is better illustrated in FIG. 79, which shows the optimal focal position for blue, red, and green color channels for a lens 870. As shown, the optimal focal positions for red, green, and blue are depicted by reference letters R, G, and B respectively, each corresponding to an AF score, with a current focal position 872. Generally, in such a configuration, it may be desirable to select the optimal focus position as the position corresponding to the optimal focal position for green components (e.g., since Bayer RGB has twice as many green as red or blue components), here position G. Thus, it may be expected that for an optimal focal position, the green channel should exhibit the highest auto-focus score. Thus, based on the positions of the optimal focal positions for each color (with those closer to the lens having higher AF scores), the AF logic 5841 and associated control logic 84 may determine which direction to focus based on the relative AF scores for blue, green, and red. For instance, if the blue channel has a higher AF score relative to the green channel (as shown in FIG. 79), then the focal position is adjusted in the negative direction (towards the image sensor) without having to first analyze in the positive direction from the current position 872. In some embodiments, illuminant detection or analysis using color correlated temperatures (CCT) may be performed.

Further, as mentioned above, variance scores may also be used. For instance, pixel sums and pixel squared sum values may be accumulated for block sizes (e.g., 8×8–32×32 pixels), and may be used to derive variance scores (e.g., avg_pixel$^2$)−(avg_pixel)^2). The variances may be summed to get a total variance score for each window. Smaller block sizes may be used to obtain fine variance scores, and larger block sizes may be used to obtain coarser variance scores.

Referring to the 3A statistics collection logic 482 of FIG. 65, the logic 146 may also be configured to collect component histograms 874 and 876. As may be appreciated, histograms may be used to analyze the pixel level distribution in an image. This may be useful for implementing certain functions, such as histogram equalization, where the histogram data is used to determine the histogram specification (histogram matching). By way of example, luma histograms may be used for AE (e.g., for adjusting/setting sensor integration times), and color histograms may be used for AWB. To provide a few examples, histograms may be 256, 128, 64 or 32 bins (where the top 8, 7, 6, and 5 bits of the pixel is used to determine the bin, respectively) for each color component, as specified by a bin size (BinSize).

A scale factor and offset may be applied to determine what range of the pixel data is collected. For example, the bin number may be obtained as follows:

idx=(hist_scale*(pixel−hist_offset))>>16.

In the equation above, hist_scale may represent a 17-bit unsigned number. Values of hist_scale that may be allowed may fall in the range 0 to 2^16, to represent a floating point scale between 0 and 1.0. The color histogram bins are incremented only if the bin indices are in the range [0, 255]:

```
if (idx>=0&& idx<256)
    StatHist[idx]+=Count.
```

In the present example, the statistics logic 140 may include two histogram units. This first histogram 874 (Hist0) may be configured to collect pixel data as part of the statistics collection after the 4×4 decimation in the 3A statistics logic 482. For Hist0, the components may be selected to be RGB, sRGB$_{linear}$, sRGB or YC1C2 using selection circuit 880. Keeping in mind FIG. 48 while considering FIG. 68, the second histogram 876 (Hist1) shown in FIG. 68 may be configured to collect pixel data before the statistics pipeline, as generally illustrated by the histogram logic 486 of FIG. 48. Since the input to the statistics logic 140 can be negative, since the input interface may be signed 17-bit, the histogram data may be collected only for positive pixels. The raw Bayer RGB data (output from 146) may be decimated (to produce signal 878) using logic 882 by skipping pixels, as discussed further below. For the green channel, the color may be selected between Gr, Gb or both Gr and Gb (both Gr and Gb counts are accumulated in the Green bins).

In order to keep the histogram bin width the same between the two histograms, Hist1 may be configured to collect pixel data every 4 pixels (every other Bayer quad). The start of the histogram window determines the first Bayer quad location where the histogram starts accumulating. Starting at this location, every other Bayer quad is skipped horizontally and vertically for Hist1. The window start location can be any pixel position for Hist1 and, therefore pixels being skipped by the histogram calculation can be selected by changing the start window location. Hist1 can be used to collect data close to the black level to assist in dynamic black level compensation (BLC) logic 472. For Hist0, bins may be 20 bits. For Hist1, bins may be 22 bits. This allows for a maximum picture size of 4096 by 3120 (12 MP). The internal memory size to accommodate such sizes may be 3×256×20 bits for Hist0 (3 color components, 256 bins), and 4×256×22 bits for Hist1 (4 color components, 256 bins).

With regard to memory format, statistics for AWB/AE windows, AF windows, 2D color histogram, and component histograms may be mapped to registers to allow early access by firmware. In one embodiment, two memory pointers may be used to write statistics to memory, one for tile statistics 863, and one for luma row sums 859, followed by all other collected statistics. All statistics are written to external memory, which may be DMA memory. The memory address registers may be double-buffered so that a new location in memory can be specified on every frame. In addition, many statistics collected in 16-bit mode may take up two 32-bit registers (which respectively may be double-buffered) to accommodate statistics of up to 64 bits (e.g., a 40-bit statistics measurement with the first 32 bits taking up the first register and the remaining 8 bits taking up the 8 most significant bits of the second register).

Fixed Pattern Noise Statistics

Referring back to FIG. 48, the output of the DPR logic 474 may also be input into the fixed pattern noise (FPN) statistics collection logic 484, which may be used to calculate fixed pattern noise statistics regarding the interim image data output by the DPR block 474. The fixed pattern noise statistics may include statistics related to fixed pattern noise that may exist on the sensors 90. Fixed pattern noise (FPN) is typically due to variations in pixel or column properties that manifest as spatial noise. For example, variations in pixel-offset values may result from variations in dark current or in offsets of an amplifier chain coupled to the sensors 90.

In general, fixed pattern noise may include noise in the sensors 90 that has a repeating or fixed pattern. For example, the fixed pattern noise may include row-wise or column-wise fixed variations that may be removed such that higher quality images can be displayed. In another example, fixed pattern noise may be a diagonal fixed variation that occurs due to a manufacturing process such as a laser annealing process that creates a different amount of light going to the pixels, which may result in a noise that has a pattern. Thus, the fixed pattern noise may be a row-wise, column-wise, or diagonal-wise pattern. Alternatively, the fixed pattern noise may be a whole frame pattern that changes pixel-to-pixel but remains similar from frame-to-frame.

Typically, during the manufacturing process, a calibration procedure may determine the fixed pattern noise, which may be used to remove the fixed pattern noise. However, the fixed pattern noise may change over time due to temperature, integration time, etc. In this manner, the fixed pattern noise statistics determined by the FPN statistics collection logic 484 may be used to adapt the fixed pattern noise removal process on the fly as the fixed pattern noise changes. In addition to the aiding the fixed pattern noise removal process, the fixed pattern noise statistics may be used to estimate a signal-to-noise (SNR) ratio or determine various noise filtering configurations such as filtering strength, filtering coefficients, and the like.

Figure 80:
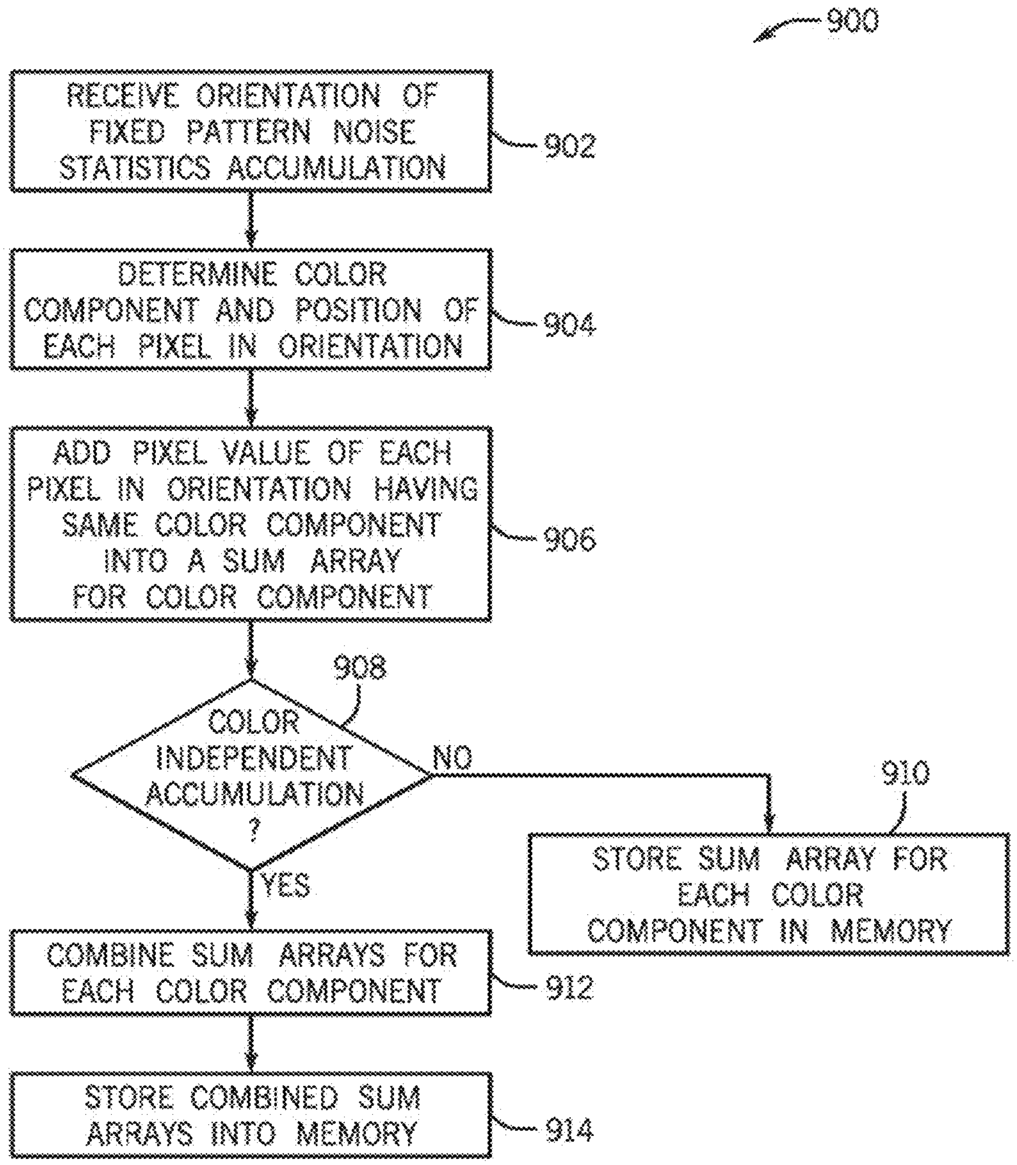
FIG. 80 is a flowchart depicting a process for calculating fixed pattern noise statistics, in accordance with an embodiment.

In one embodiment, the FPN statistics collection logic 484 may determine the fixed pattern noise statistics by accumulating pixel values across an axis (e.g., horizontal, vertical, diagonal) of image data, thereby capturing a 1-D projection of the image data received by the sensors 90. The 1-D projection may later be processed down the ISP pipeline to determine the fixed pattern noise of image data and to provide parameters that may be used to cancel out the fixed pattern noise from the image data. In addition to determining the fixed pattern noise of image data, the FPN statistics collection logic 484 may identify any type of pattern displayed in the image data such as, for example, bar codes. The process for determining the fixed pattern noise statistics is described below with reference to FIG. 80.

At block 902, the FPN statistics collection logic 484 may receive an orientation for fixed noise statistics accumulation. The orientation for the fixed noise statistics accumulation may include a horizontal axis (i.e., row-wise), a vertical axis (i.e., column-wise), and/or any angular axis (i.e., diagonal-wise). In one embodiment, the orientation for the fixed noise statistics accumulation may be specified using control parameters stepX and stepY. Control parameter stepX may denote a value of a horizontal pixel coordinate increment from a respective pixel location. Likewise, control parameter stepY may denote a value of a vertical pixel coordinate increment from the respective pixel location. The FPN statistics collection logic 484 may program the stepX and stepY parameters based on the orientation of the fixed noise statistics accumulation received at block 902. For example, stepX=1 and stepY=0 may indicate column accumulation, whereas stepX=0 and stepY=1 may indicate a row accumulation.

Figure 82A:
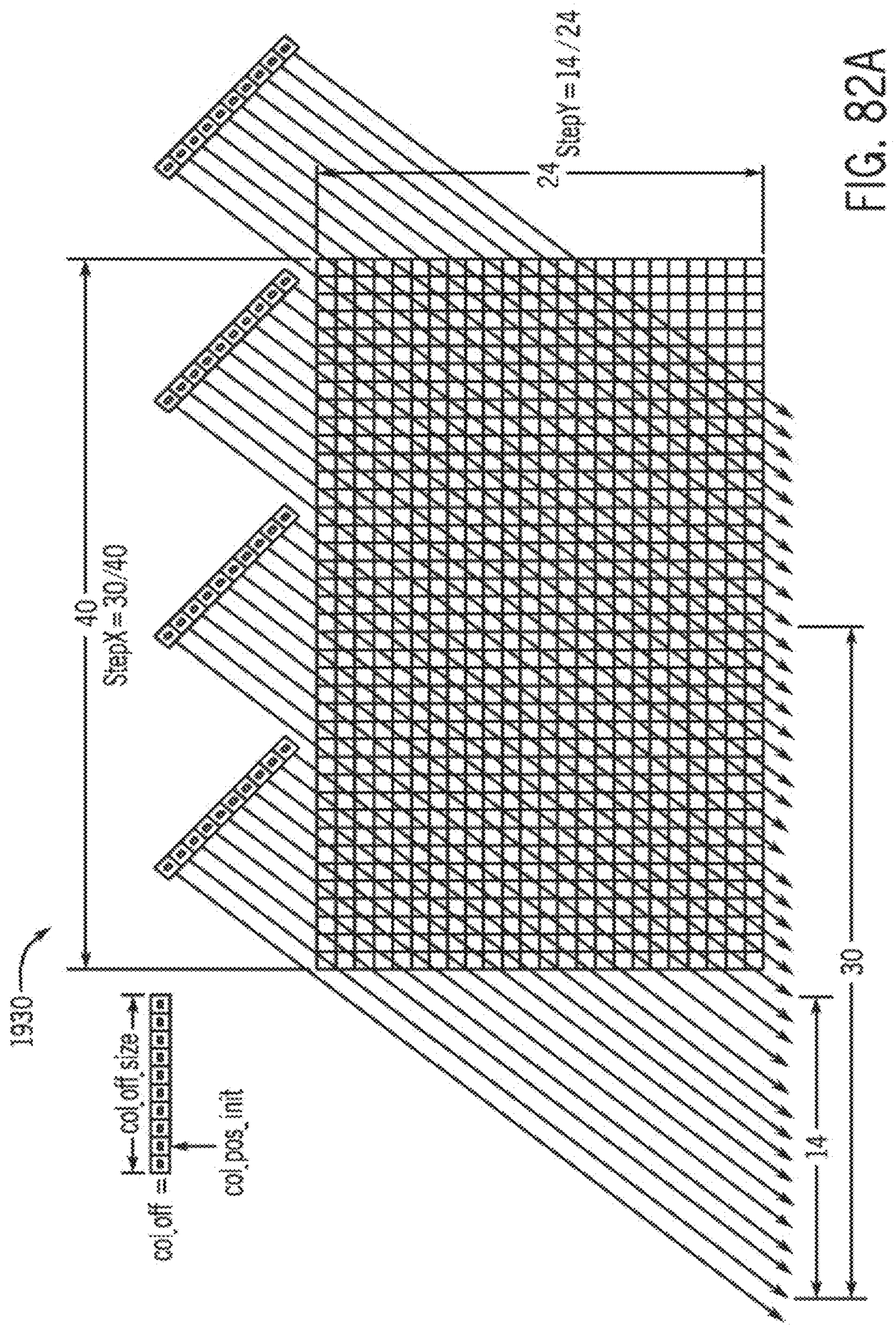
FIG. 82A is a graphical depiction of how fixed pattern noise statistics is accumulated using a diagonal orientation, in accordance with an embodiment.

Diagonal accumulation (i.e., angular orientation) may use stepX and stepY parameters that may correspond to fractional values. In one embodiment, control parameters stepX and stepY may be defined for each color component: Gr, R, B, and Gb. An example of a diagonal accumulation is illustrated FIG. 82A, which include a diagonal accumulation 930 that has a fractional stepX of 30/40 and a fractional stepY of 14/24.

At block 904, the FPN statistics collection logic 484 may determine the color component (c) and position (pos) for each pixel in the orientation specified at block 902. The color component (c) and position (pos) may be used as an index value into a sum array that corresponds to the accumulated pixel values along the specified orientation (i.e., fixed pattern noise statistics). In one embodiment, the color component (c) and the position (pos) of a respective pixel (p(j,i)) located at (j,i) may be determined based on the orientation specified at block 902 (i.e., stepX, stepY) and a size of the repeating fixed pattern noise (i.e., fpn_size[c]) as shown below:

c=current color component, 0-3 pos=(floor(pos_init[c]+stepX[c]*i+stepY[c]*) modulo fpn_size[c])

where pos_init may indicate an initial position in the sum array for a first pixel of the active region with respect to color component Gr, R, B, or Gb, and fpn_size may indicate a size of a repeating pattern in the sum array with respect to the color component Gr, R, B, or Gb. As such, each color component may have its own sum array indexing.

At block 906, the FPN statistics collection logic 484 may add a pixel value of each pixel having the same color component in the specified orientation into a sum array. In this manner, the FPN statistics collection logic 484 may generate a sum array for each color component. In one embodiment, the sum array may be generated with respect to a particular color component that may be specified to the FPN statistics collection logic 484. The sum array may then be computed according to:

sum[c][pos]+=color_en[c]? p(j,i): 0 where color_en[c] indicates whether the fixed pattern statistics is enabled for a particular color component.

At block 908, the FPN statistics collection logic 484 may determine whether the fixed pattern noise statistics are color-dependent or color-independent fixed pattern noise statistics. In one embodiment, whether the fixed pattern noise statistics are color-dependent or color-independent fixed pattern noise statistics may be specified to the FPN statistics collection logic 484 prior to performing the process 900. If the fixed pattern noise statistics are color-dependent fixed pattern noise statistics, the FPN statistics collection logic 484 may proceed to block 910.

At block 910, the FPN statistics collection logic 484 may store the fixed pattern noise statistics for each color component determined at block 906 in the memory 100. For color-dependent fixed pattern noise statistics, the FPN statistics collection logic 484 may store the fixed pattern noise statistics in the memory 100 in an order based on the color component of the first pixel value in the corresponding sum array as follows:

| First Pixel Color Component | Sum[0] | Sum[1] | Sum[2] | Sum[3] |
|---|---|---|---|---|
| 0 | Gr | R | B | Gb |
| 1 | R | Gr | Gb | B |
| 2 | B | Gb | Gr | R |
| 3 | Gb | B | R | Gr |

The output order of the memory 100 for the sum arrays may be:

sum[0][0:fpn_size[0]−1], sum[1][0:fpn_size[1]−1], sum[2][0:fpn_size[2]−1], sum[3][0:fpn_size[3]−1]

where the maximum fpn_size when determining color-dependent fixed pattern noise statistics may be 2048.

Referring back to block 908, if the fixed pattern noise statistics are color-independent fixed pattern noise statistics, the FPN statistics collection logic 484 may proceed to block 912. At block 912, the FPN statistics collection logic 484 may combine the sum arrays for each color component to determine the fixed pattern noise statistics for the sensors 90. In one embodiment, the FPN statistics collection logic 484 may determine the sum array indices for each color component based on the parameter pos_init[c], stepX[c], stepY[c], and fpn_size[c] for one particular color component. The maximum fpn_size when determining color-independent fixed pattern noise statistics may be 4096, which may be based on a size of a buffer memory available to perform the process 900.

After determining the fixed pattern noise statistics, at block 914, the FPN statistics collection logic 484 may store the fixed pattern noise statistics in the memory 100. In one embodiment, the FPN statistics collection logic 484 may periodically perform the process 900 to identify fixed pattern noise that may be generated as the sensors 90 ages. In another embodiment, the FPN statistics collection logic 484 may perform the process 900 over multiple frames such that the orientation of the of the fixed pattern noise accumulation changes for each frame. For example, if the orientation is specified as a column-wise orientation, the FPN statistics collection logic 484 may first perform the process 900 on one frame of the image data with variables stepX and stepY defined as 0 and 1, respectively. The FPN statistics collection logic 484 may then perform the process 900 on the next frame of the image data with variables stepX and stepY altered such that the orientation becomes an angled orientation. The FPN statistics collection logic 484 may then continue altering its orientation for each frame of the image data such that the FPN statistics collection logic 484 may collect fixed pattern noise statistics at different angles of the image data to identify fixed pattern noise that may be present along various axes of the image data.

Figure 81:
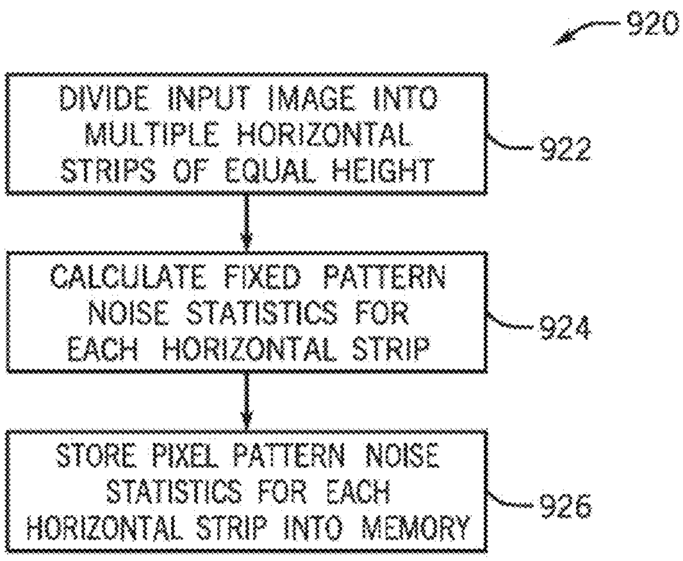
FIG. 81 is a flowchart depicting a process for calculating fixed pattern noise statistics by dividing an input image into horizontal strips of the input image, in accordance with an embodiment.

In one embodiment, the FPN statistics collection logic 484 may divide the received image data into multiple horizontal strips of the image such that each strip is of equal height. The FPN statistics collection logic 484 may then determine the FPN statistics for each horizontal strip independent of each other. By collecting FPN statistics for each horizontal strip of the image, it may be easier to distinguish image edges from the fixed pattern noise. Additionally, a correlation or another analysis process between the FPN statistics for each horizontal strip may be used to find a true fixed pattern noise. Keeping this in mind, FIG. 81 illustrates a process 920 that may be used to determine FPN statistics for multiple horizontal strips of the input image. Although process 920 describes a method for determining FPN statistics for multiple horizontal strips of the input image, it should be noted that in other embodiments, the process 920 may be performed with respect to multiple vertical strips of the input image.

At block 922, the FPN statistics collection logic 484 may divide the input image into multiple horizontal strips of equal height. At block 924, the FPN statistics collection logic 484 may calculate fixed pattern noise statistics for each horizontal strip of the input image. In one embodiment, the FPN statistics collection logic 484 may perform the process 900 described above with respect to FIG. 80 for each horizontal strip of the input image. As such, the FPN statistics collection logic 484 may determine a sum array that includes an accumulation of pixel values that correspond to a specified orientation (block 902) in a respective horizontal strip of the input image.

Figure 82B:
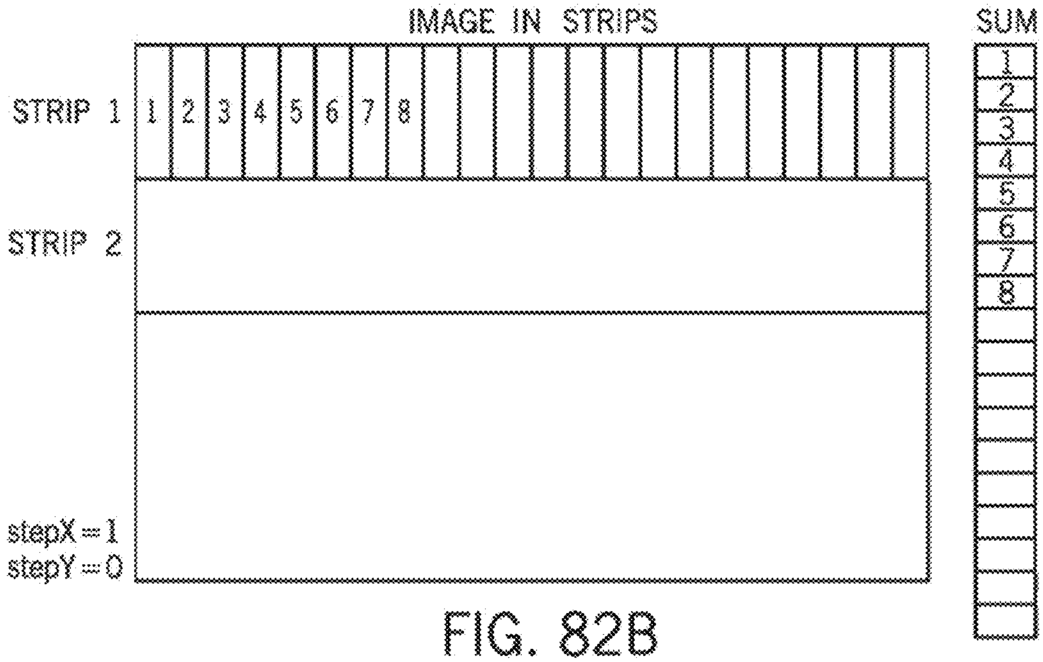
FIG. 82B is a graphical depiction of how fixed pattern noise statistics is accumulated using a column sum accumulation process within horizontal strips of the input image, in accordance with an embodiment.

In another embodiment, at block 924, the FPN statistics collection logic 484 may determine the FPN statistics for every column in each horizontal strip of the input image. When determining the FPN statistics for every column in a horizontal strip of the input image (column sum), the FPN statistics collection logic 484 may ignore the values of parameters: pos_init, stepX, stepY and fpn_size. Instead, the FPN statistics collection logic 484 may add the pixel values in each column of the horizontal strip of the input image to a sum array. Once a pixel value on a last active line of the horizontal strip has been accumulated into the sum array, at block 926, the corresponding sum array may be stored in the memory 100. An example of a column sum accumulation according to the process 920 is illustrated in FIG. 82B.

In yet another embodiment, the FPN statistics collection logic 484 may determine the FPN statistics for every row in each horizontal strip of the input image. When determining the FPN statistics for every row in a horizontal strip of the input image (row sum), the FPN statistics collection logic 484 may ignore the values of parameters: pos_init, stepY and fpn_size. Instead, the FPN statistics collection logic 484 may set parameter, stepX, such that each row of the horizontal strip of the input image may be divided into multiple segments of pixels. The FPN statistics collection logic 484 may then sum the pixel values within a segment into one bin (0<stepX<1).

Figure 82C:
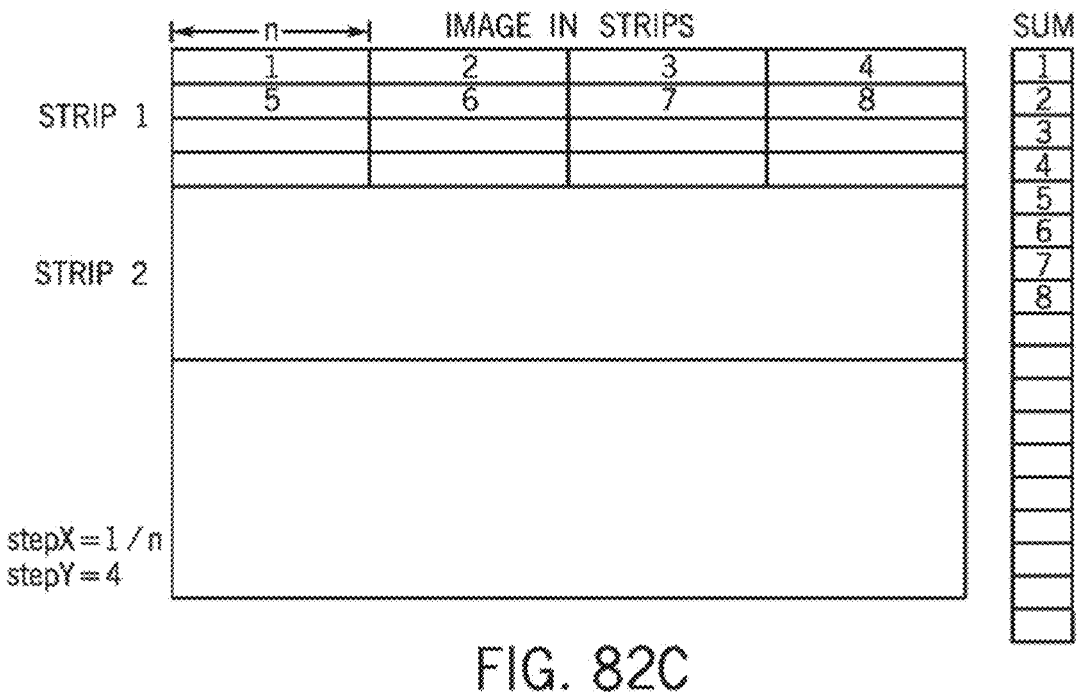
FIG. 82C is a graphical depiction of how fixed pattern noise statistics is accumulated using a row sum accumulation process within horizontal strips of the input image, in accordance with an embodiment.

Once the pixel values in a segment have been accumulated, the FPN statistics collection logic 484 may add the accumulated pixel values of each segment in a horizontal strip to a sum array. When determining the sum array for each row in a horizontal strip, the FPN statistics collection logic 484 may use a specified stepX value that corresponds to one particular color component (e.g., stepX[0]). As such, the FPN statistics collection logic 484 may ignore the values for stepX that may have been specified for other color components (e.g., stepX[1:3]). An example of a row sum accumulation according to the process 920 is illustrated in FIG. 82C.

At block 926, the FPN statistics collection logic 484 may store the corresponding sum array for each horizontal strip in the memory 100.

In one embodiment, when determining the FPN statistics for every column or row in each horizontal strip of the input image, the FPN statistics collection logic 484 may not allow for a repeating pattern due to the horizontal strips. As such, the FPN statistics collection logic 484 may store a sum array before the FPN statistics have been accumulated for a horizontal strip. Therefore, the number of active lines inside a horizontal strip may correspond to a height of the horizontal strip such that the FPN statistics collection logic 484 may not skip any lines of pixels while determining the sum array.

As will be appreciated, when storing the FPN statistics for every column in each horizontal strip of the input image in the memory 100 at block 926, the FPN statistics collection logic 484 may store the corresponding sum arrays according to the following output order:

sum[0][0], sum[1][0], sum[0][1], sum[1][1], . . . , sum[0][width/2−1], sum[1][active_region_width/2−1],
sum[2][0], sum[3][0], sum[2][1], sum[3][1], . . . , sum[2][width/2−1], sum[3][active_region_width/2−1]

where width corresponds to a width of the input image and where active_region_width corresponds to a width of the active region of the input image.

Further, when storing the FPN statistics for every row in each horizontal strip of the input image in the memory 100 at block 926, the FPN statistics collection logic 484 may store the corresponding sum arrays according to the following output order:

Even rows: sum[0][0], sum[1][0], sum[0][1], sum[1][1], . . . , sum[0][N−1], sum[1][N−1]

Odd rows: sum[2][0], sum[3][0], sum[2][1], sum[3][1], . . . , sum[2][N−1], sum[3][N−1]

where N=floor(stepX[0]*(active_region_width−1))+1 is the number of bins in a row for each enabled (i.e., specified) color component.

In one embodiment, the FPN statistics collection logic 484 may perform the process 920 over for each horizontal strip of the input image such that the orientation of the of the fixed pattern noise accumulation changes for each horizontal strip.

After determining the FPN statistics, the FPN statistics collection logic 484 may not count a number of pixels accumulated in each sum array. Instead, additional processing components may derive the pixel count based on the accumulation orientation and the size of any repeating pattern. For instance, the additional processing components may find the orientation of the fixed pattern noise and the size of any repeating fixed pattern noise by changing step size(s) (i.e., stepX/stepY) and repeating pattern size parameters during multiple frames of the fixed pattern noise statistics collection process. In one embodiment, the repeating pattern size parameter may be used when accumulating the sum array(s) since there could be more than 4096 columns or rows exceeding the sum array size when the image is rotated. On the other hand, when the size of repeating pattern is small, the number of pixels to be accumulated in a single column or row can be too big such that it overflows a corresponding register in the memory 100. In this case, the FPN statistics collection logic 484 may set the fpn_size parameter to be multiples of the actual repeating pattern size to split the sum into multiple array entries. In this manner, when an overflow occurs, the sum may saturate.

Local Image Statistics Collection

Certain processing blocks, such as the local tone mapping (LTM) logic 3004 and highlight recovery (HR) logic 1038 discussed further below, may use localized statistics to process image data. For example, as will be discussed below, the local tone mapping (LTM) logic 3004 may apply different tone curves to different areas of the image frame depending on the local luminances in the different areas of the image frame. The manner in which luminance may vary throughout the image frame may be collected and reported as individual pixel luminance values, thumbnails, and/or local histograms. The local image statistics logic 488 of the statistics core **146*a* (FIG. 48) may generate these statistics. Software or other processing blocks may employ the local statistics to control the operation of the ISP pipe processing logic 80. For instance, software may generate a local tone map based on the local statistics. The local tone map may be used by the local tone mapping (LTM) logic 3004** to apply an appropriate local tone curve to pixels depending on where the pixels are spatially located.

Figure 83:
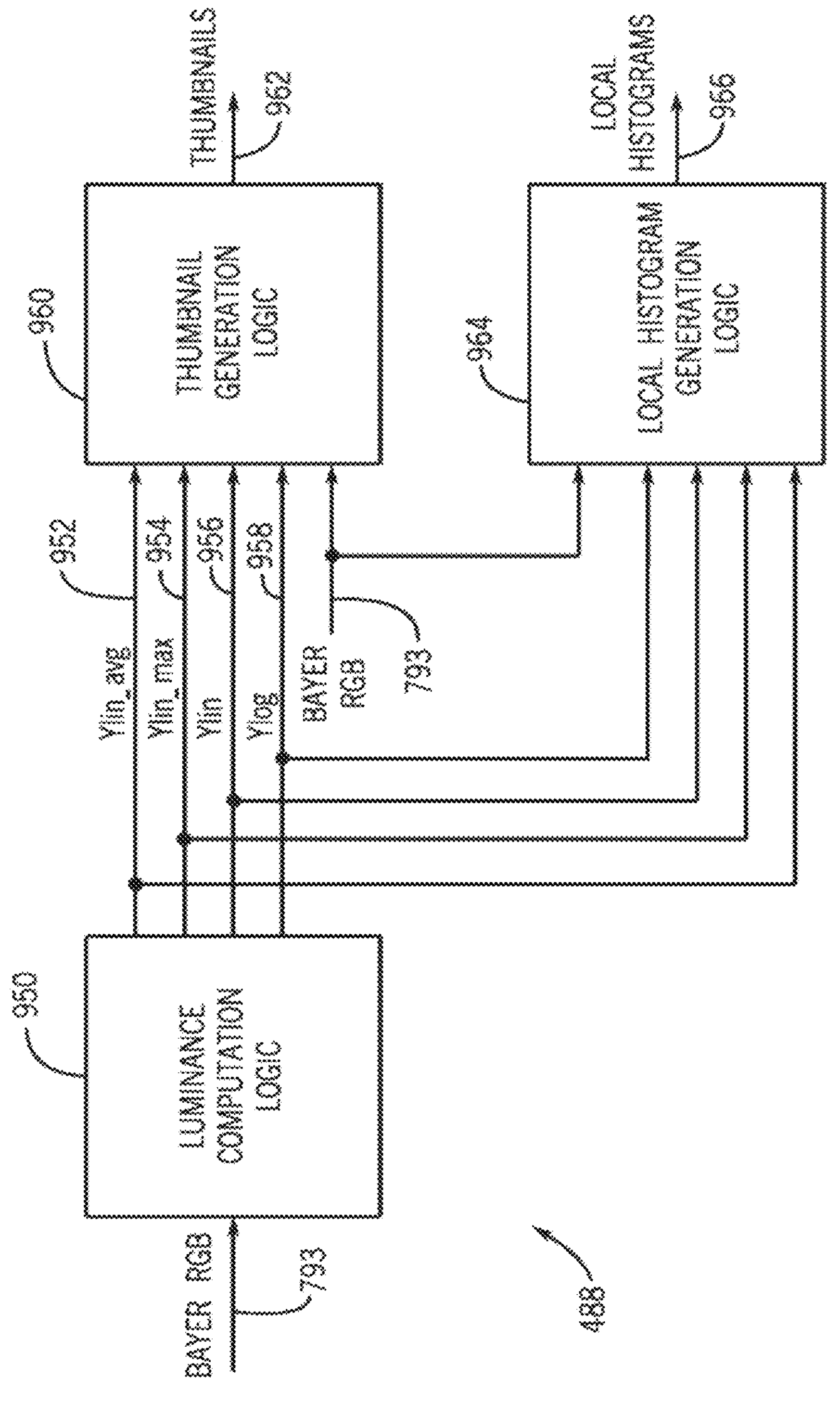
FIG. 83 is a block diagram of local image statistics logic of the statistics logic of the ISP pipe processing logic, which may collect statistics used in local tone mapping and/or highlight recovery, in accordance with an embodiment.

One example of the local image statistics logic 488 appears in FIG. 83. The local image statistics logic 488 may receive the Bayer RGB image data 793 output by the inverse black level compensation (IBLC) logic 478. It should be appreciated, however, that the local image statistics logic 488 may, alternatively, use YCC image data or image data in any other suitable color space. Considering an example involving the Bayer RGB image data 793, luminance computation logic 950 may compute several values relating to the luminance of the input pixels. These may include average luminance (Ylin_avg) 952, maximal luminance (Ylin_max) 954, pixel luminance (Ylin) 956 (which may represent the average luminance 952, the maximal luminance 954, or a blend of the average luminance 952 and the maximal luminance 954), and logarithmic luminance (Ylog) 958 (which may be a logarithmic expression of the pixel luminance (Ylin) 956). In alternative embodiments, the average luminance 952 and/or the maximal luminance 954 may be replaced or supplemented by a minimal luminance. The luminance computation logic 950 is discussed in greater detail below with reference to FIGS. 84 and 85.

The various luminance values, along with the Bayer RGB pixel data 793, may enter thumbnail generation logic 960. The thumbnail generation logic 960 may output thumbnails 962 based on any of these values. The thumbnails 962 may represent the input image data downscaled according to one of many downscaling techniques, as discussed below with reference to FIG. 86. The luminance values from the luminance computation logic 950 and the Bayer RGB input pixel data 793 may also enter local histogram generation logic 964. The local histogram generation logic may generate local histograms 966 from these values. One example of the local histogram logic 964 appears in FIG. 87, and will be discussed in greater detail below.

Figure 84:
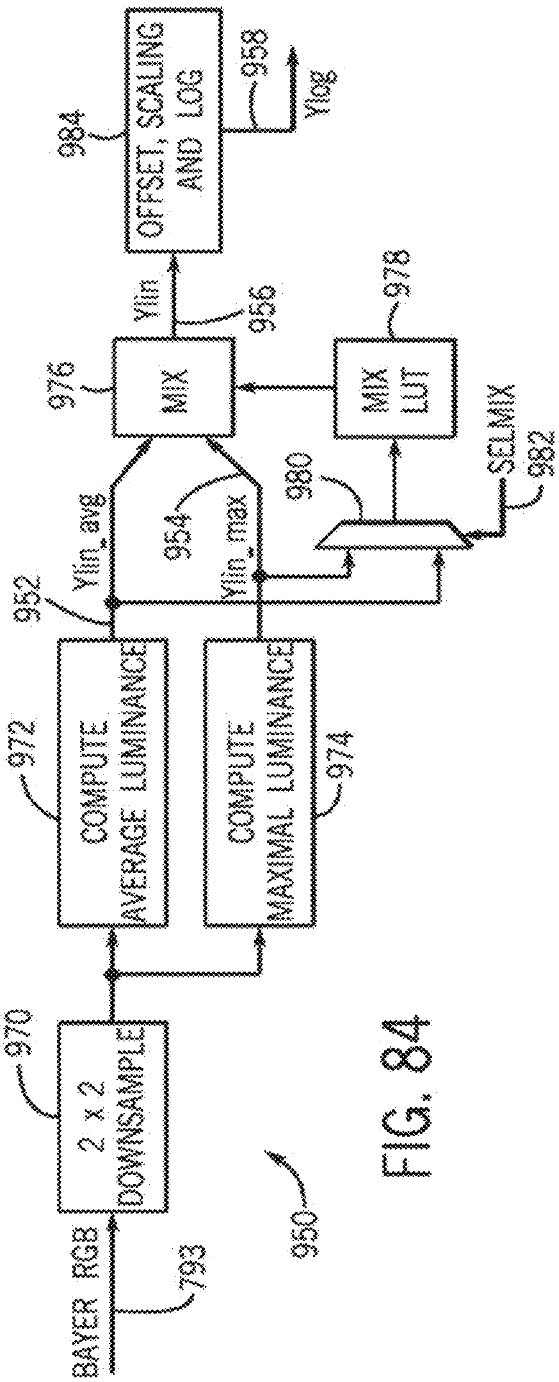
FIGS. 84 and 85 are block diagrams of luminance computation logic of the local image statistics logic, in accordance with an embodiment.
Figure 85:
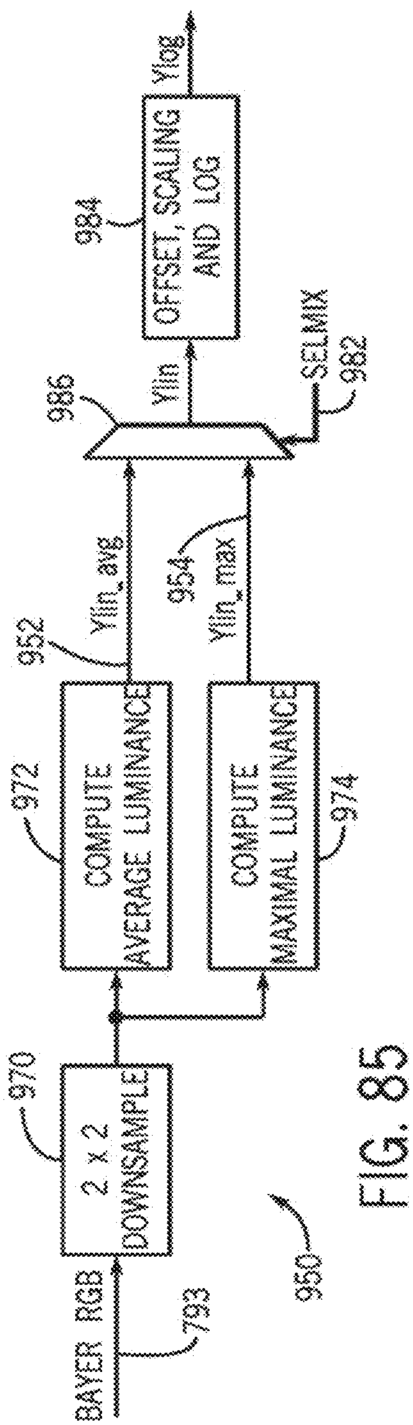

FIGS. 84 and 85 represent two examples of the luminance computation logic 950. Since the same luminance values may be employed in the local statistics logic 488 as the local tone mapping (LTM) logic 3004, the luminance computation logic 950 may replicate the process used in the LTM logic 3004. Thus, the properties of the luminance used by the local statistics logic 488 may be the same as the luminance values determined by the LTM logic 3004. In the example of FIG. 84, the Bayer RGB image data 793 first may be downsampled in 2×2 downsample logic 970. The 2×2 downsample logic 970 may downsample the Bayer RGB image data 793 by 2 horizontally and by 2 vertically to improve precision. As discussed above with reference to FIG. 66, for each Bayer quad, the R, G, and B pixel values may be collected. Thus, the 2×2 downsample logic 970 may downsample RGB image data 793 of the format R-Gr-Gb-B as follows:

Rbayer(x,y)=raw(2*x,2*y);

Gbayer(x,y)=0.5*raw(2*x,2*y+1)+0.5*raw(2*x+1,2*y);

Bbayer(x,y)=raw(2*x+1,2*y+1);

R(x,y)=Gain[0]*(Rbayer(x,y)+OffsetIn[0])+OffsetOut[0];

G(x,y)=Gain[1]*(Gbayer(x,y)+OffsetIn[1])+OffsetOut[1]; and

B(x,y)=Gain[2]*(Bbayer(x,y)+OffsetIn[2])+OffsetOut[2];

where x=0−width/2−1 and y=0−height/2−1. The Gain, OffsetIn, and OffsetOut values may be chosen such that the above process mirrors the white balance gain of other components of the ISP pipe processing logic 80. That is, the output pixel values of R, G and B may be approximately photometrically equivalent to the pixel values generated from the raw image data processing logic (RAWProc) 150. In other embodiments, other downsampling logic (e.g., 4×4 downsampling logic) may be used instead, but it should be appreciated that he 2×2 downsample logic 970 may not perform averaging, and thus discrete luminance information may be preserved. In addition, RGB-format image data may be used instead of raw-format image data, in which case the image data need not be downsampled to obtain separate color components.

Average luminance computation logic 972 and maximal luminance computation logic 974 may process the downsampled image data from the 2×2 downsample logic 970. The average luminance computation logic 972 may compute the average luminance (Ylin_avg) 952 as follows:

Ylin_avg=(CoeffAvgY[0]*R+CoeffAvgY[1]*G+CoeffAvgY[2]*B+AvgYOffset+1<<(LumShift−1))>>LumShift, where CoeffAvgY[0], CoeffAvgY[1] and CoeffAvgY[2] represent 2s-complement numbers (e.g., 16-bit 2s-complement numbers) to weight the color components and AvgYOffset represents a signed number (e.g., a 32-bit signed number). The value LumShift represents the number of bits to shift and can be chosen such that the luminance fills the entire 16 bits of range. As a result, CoeffAvgY may be understood to include 8 fractional bits, such that the luminance values cover the entire range. Using the full range may be valuable, since the spatially varying lookup tables (LUTs) used in the local tone mapping (LTM) logic 3004—which may be programmed by software based on the statistical luminance values, thumbnails, and/or local histograms—may have fixed input ranges. The average luminance (Ylin_avg) 952 may be clipped to minimum of zero and maximum of 65535.

The maximal luminance computation logic 974 may calculate the maximal luminance (Ylin_max) 954 using the maximal value of scaled R, G, and B values as the luminance:

Ylin_max=(max (CoeffMaxY[0]*R, CoeffMaxY[1]*G, CoeffMaxY[2]*B)+1<<(LumShift−1))>LumShift, where CoeffMaxY[0], CoeffMaxY[1] and CoeffMaxY[2] may represent unsigned 16-bit numbers to weight the color components and Ylin_max may be clipped to minimum of zero and maximum of 65535. It maybe noted that this luminance definition has the advantage of keeping the signals in gamut after the tone curve is applied in the local tone mapping (LTM) logic 3004, discussed further below. With this definition of luminance, a pixel is considered to be bright if any of the color channels are bright. Using the maximal luminance (Ylin_max) 954 may prevent pixels with saturated colors from gaining up and falling out of gamut in the local tone mapping (LTM) logic 3004. If desired, a minimal luminance may be calculated in a similar manner, using a minimum rather than maximum operator and coefficients that may be the same or different from those above.

Mixing logic 976, based on a mixing coefficient from a mixing lookup table (LUT) 978, may blend the average luminance (Ylin_avg) 952 and the maximal luminance (Ylin_max) 954 (and/or the minimal luminance) to obtain the pixel luminance (Ylin) 956. The objective of the mixing logic 976 and the mixing LUT 978 may be to blend the luminance signals smoothly. Namely, the average luminance (Ylin_avg) 952 may be weighted more heavily in dark to mid-level brightness levels, while the maximal luminance (Ylin_max) 954 may be weighted more heavily in highlight brightness levels. Some embodiments may involve mixing minimal, maximal, and average luminances. For some of these embodiments, the minimal luminance may be weighted most heavily in dark brightness levels, the average luminance (Ylin_avg) 952 may be weighted most heavily in mid-level brightness levels, and the maximal luminance (Ylin_max) 954 may be weighted more heavily in highlight brightness levels.

With these objectives in mind, the mixing LUT 978 may be programmed with any suitable values to smoothly mix, for example, the two luminance signals 952 and 954 to produce the input pixel luminance (Ylin) 956. The mixing LUT 978 may represent a table with 257 entries of 16-bits each. The entries of the mixing LUT 978 may be evenly distributed between 0 and 65535. The index to the mixing LUT 978 may be either the average luminance (Ylin_avg) 952 or the maximal luminance (Ylin_max) 954, as selected in selection logic 980 by a signal (SelMix) 982. Selecting the average luminance (Ylin_avg) 952 to index the mixing LUT 978 may produce smoother transitions of luminance, while the maximal luminance (Ylin_max) 954 may produce more aggressive transitions. Thus, whether the selection signal (SelMix) 982 is used to select the average luminance (Ylin_avg) 952 or the maximal luminance (Ylin_max) 954 may depend on the presence or absence of noise in the image, the general brightness of the image, and so forth. In another embodiment, ratios between color channels may be used to index the mixing LUT 978 instead.

The following pseudo code represents one example of calculating the input pixel luminance (Ylin) 956 as shown in FIG. 84:

```
if selMix=0
   wMix=interp1D (Ylin_max, wMixLUT);
else
   wMix=interp1D (Ylin_avg, wMixLUT);
Ylin=Ylin_avg*wMix+Ylin_max*(1−wMix)=(Ylin_avg−Ylin_max)*wMix+Ylin_max;
```

where wMixLUT represents the mixing LUT 978 with 257 entries evenly distributed between 0 and 65535, and interp1D denotes 1D linear interpolation employed with pixel values greater than 8 bits. The entries in wMixLUT may have unsigned 16 bit values with 15 fractional bits (i.e., 1.15) and the range of wMixLUT is between zero and one (i.e., 0<=wMixLUT<=1)—any value larger than 1 may be considered to be 1. The pixel luminance (Ylin) 956 may be an unsigned 16-bit value that is clipped to min of zero and max of 65535.

The input pixel luminance (Ylin) 956 may, in some examples, undergo offset, scaling, and log computation logic 984. Scaling, offsetting, and converting the luminance value to logarithmic form may convert the pixel luminance (Ylin) 956 into a more useful form. The offset, scaling, and log computation logic 984 may carry out the following computation, if implemented:

Ylog=CoeffLog_ScaleOut*log (max(CoeffLog_ScaleIn*(Ylin+CoeffLog_OffsetIn), CoeffLog_MinVal))+CoeffLog_OffsetOut.

In the equation above, Ylog represents an unsigned 16-bit value clipped to a minimum of 0 and maximum of 65535. To ensure numerical stability near zero, a minimum input value (CoeffLog_MinVal) may be specified. Offset coefficients CoeffLog_OffsetIn and (Ylin+CoeffLog_OffsetIn) may be signed 32-bit numbers with 15 fractional bits (17.15), while CoeffLog_OffsetOut may be signed 32-bit number with no fractional bit. Scale and minimum value coefficients, CoeffLog_ScaleOut, CoeffLog_ScaleIn, and CoeffLog_MinVal, may be specified with 23 bits, including a sign bit, a 6-bit signed exponent, and a 16-bit mantissa. The mantissa may be a fractional 0.16 value where the hardware concatenates an implied 1 on the most significant bit (MSB):

CoeffLog=$(-1)^{sign}$*Mant*(2^Exp), where:

−32<=Exp<=31

1.0<=Mant<2

This may allow a range of:

2^−32<=abs(CoeffLog)<2^32

In the equation above, the value CoeffLog_MinVal may be a positive number—thus, the sign bit may be ignored. Note that the output of log( ) may be represented as a signed 33 bit number 16 fractional bits.

Other examples of the luminance computation logic 950 may not employ the mixing logic 976 or mixing lookup table (LUT) 978. As shown in FIG. 85, the luminance computation logic 950 may, alternatively, involve a discrete selection between either the average luminance (Ylin_avg) 952 or the maximal luminance (Ylin_max) 954. For instance, selection logic 986 may select either the average luminance (Ylin_avg) 952 or the maximal luminance (Ylin_max) 954 based on the SelMix signal 982. The selected luminance value may be output as the input pixel luminance (Ylin) 956.

The SelMix signal 982 may be kept constant on a per-frame basis, or may vary as different regions of the image frame are processed. In one example, software controlling the ISP pipe processing logic 80 may vary the SelMix signal 982 depending on whether the region of the image frame is in a dark to mid-level brightness level or in a highlight brightness level. The SelMix signal 982 may select the average luminance (Ylin_avg) 952 when the luminance computation logic 950 is computing luminance in dark to mid-level brightness levels. The SelMix signal 982 may select the maximal luminance (Ylin_max) 954 when the luminance computation logic 950 is processing image pixels from a highlight region of the image frame. Doing so may preserve highlight information in the area predominated by highlights, while avoiding high-luminance noise in dark to mid-level brightness areas. In other embodiments, the software may vary the SelMix signal 982 when ratios of color components fall above or below a threshold.

The local tone mapping (LTM) logic 3004 or the highlight recovery (HR) logic 1038 may vary operation depending on certain thumbnail images generated by the thumbnail generation logic 960. For instance, in one example, the HR logic 1038 may focus on certain colors based on the thumbnails 962 from the thumbnail generation logic 960. Additionally, software or firmware may use the thumbnails 962 to, for instance, set the exposure, focus, and/or auto-white-balance. Moreover, tone curves (e.g., global or local tone curves) may be generated by software using the thumbnails 962 from the thumbnail generation logic 960 and/or local histograms 966 from the local histogram generation logic 966.

Figure 86:
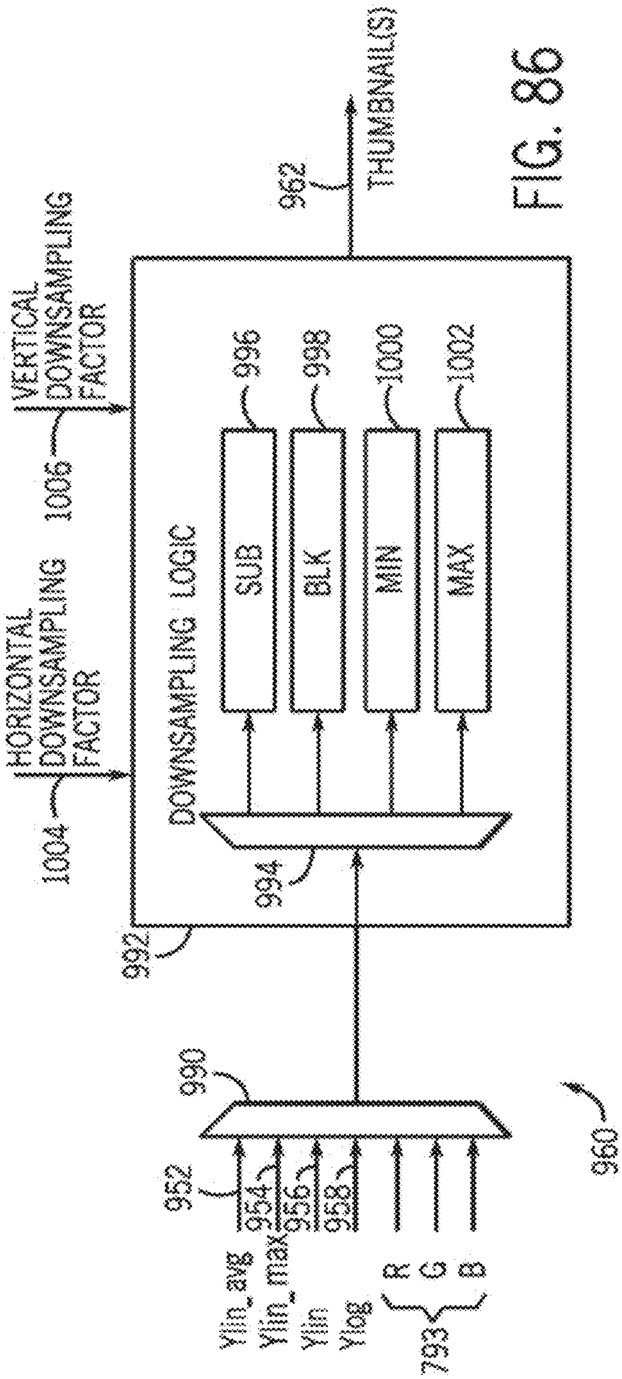
FIG. 86 is a block diagram of thumbnail generation logic of the local image statistics logic, in accordance with an embodiment.

One example of the thumbnail generation logic 960 appears in FIG. 86, receiving as input the average luminance (Ylin_avg) 952, the maximal luminance (Ylin_max) 954, the input pixel luminance (Ylin) 956, the logarithmic luminance (Ylog) 958, and red (R), green (G), and blue (B) components of the Bayer RGB image data 793. Selection logic 990 may pass one of these signals to downsampling logic 992. The downsampling logic 992 may downsample the selected image data using one of four downsampling modes to produce one or more thumbnails 962. For each thumbnail 962 that the thumbnail generation logic 960 generates, the software controlling the ISP pipe processing logic 80 may select the input source (e.g., via selection logic 990) and the downsampling mode (e.g., selection logic 994). In one example, the thumbnail generation logic 960 may generate a maximum of six thumbnails 962, thumbnails based on R, G, and B signals count as three separate thumbnails 962. As illustrated, the downsampling logic 992 may employ one or more of the following four downsampling modes: a subsampling mode (SUB) 996, a block averaging mode (BLK) 998, a minimum block value mode (MIN) 1000, and a maximum block value mode (MAX) 1002.

In general, the downsampling logic 992 may downsample each block of the image frame down to a single pixel of a thumbnail 962. The size of the blocks may be specified by a programmable horizontal downsampling factor 1004 and a programmable vertical downsampling factor 1006 (e.g., a block size of 32×32). The width and height of the generated thumbnails 962 may be the width and height of the active region 312 (FIG. 21) at full sensor resolution, divided by the horizontal and vertical downsampling factors 1004 and 1006. The top-left corner of the thumbnail image 962 will be aligned to the top-left corner of the active region 312. When the width and height of the active region 312 are not multiples of the downsampling factors 1004 and 1006, certain bottom rows and/or right columns may not be used in the thumbnail generation, as partial tiles may be discarded. In at least one embodiment, the downsampling factors 1004 and 1006 and active region 312 may always be multiples of two pixels. The width of the thumbnail 962 may not exceed 128 pixels. Also, the minimum horizontal downsampling factor 1004 may be 16 (in full sensor resolution), and the maximum number of pixels being downsampled to one pixel may not exceed 2^14 at full sensor resolution. For example, a block measuring 128×128 pixels (in full sensor resolution) may be the largest block size when the width and height are constrained to be the same value.

The four downsampling modes 996, 998, 1000, and 1002 will now be discussed. The subsample mode (SUB) 996 may subsample the pixel data spatially. Offset values from the top-left corner of each block may be programmable. The block averaging mode (BLK) 998 may perform block averaging to obtain pixel values in the thumbnail images 962. For example, if the downsampling factors 1004 and 1006 have been selected to obtain 32×32 blocks of pixels, the pixels in the 32×32 block may be averaged to determine the pixel value in the thumbnail 962. The minimum pixel value mode (MIN) 1000 may select the minimum pixel value in each block to represent each pixel of the output thumbnail 962. The maximum pixel value mode (MAX) 1002 may select the maximum pixel value in each block to represent each pixel of the output thumbnail 962.

The offset values used in the subsampling mode (SUB) 996, as well as the downsampling factors 1004 and 1006, may be defined in units of pixels in the sensor resolution—that is, before downsampling by 2×2—and should be in multiples of two. As such, the downsampling offset values in the horizontal and vertical (Y) directions may be between 0 and the horizontal downsampling value divided by the vertical downsampling value, less 1. For thumbnails 962 that are obtained via the block averaging mode (BLK) 998, the reciprocal of the number of pixels (e.g., RecipNumPix=(1<<32)/numPix) may be provided by software controlling the ISP pipe processing logic 80.

Figure 87:
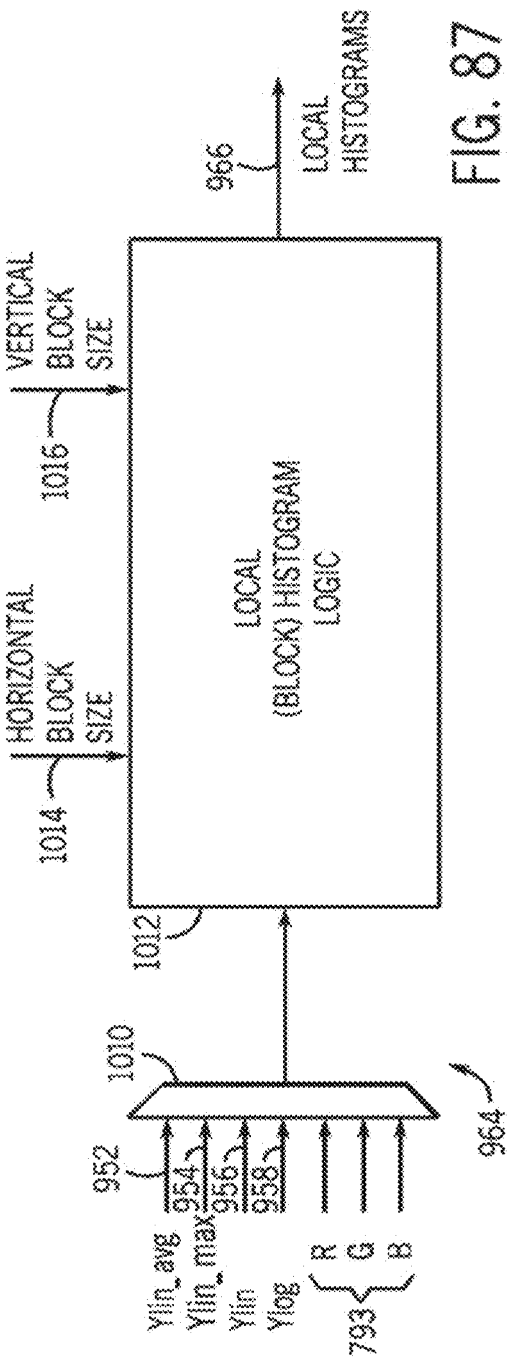
FIG. 87 is a block diagram of local histogram generation logic of the local image statistics logic, in accordance with an embodiment.

The local histogram generation logic 964, an example of which appears in FIG. 87, may generate histograms of luminance intensities for each block of pixels, all blocks having the same size. As illustrated in FIG. 87, selection logic 1010 may select from among the average luminance (Ylin_avg) 952, the maximal luminance (Ylin_max) 954, the input pixel luminance (Ylin) 956, the logarithmic luminance (Ylog) 958, and red (R), green (G), and blue (B) components of the Bayer RGB image data 793. The selected signal may be received by local (block) histogram logic 1012, which may generate local histograms 966 in, for example, 32 bins of 16 bits each. Any other suitable number of bins of suitable bit depths may also be used.

As in the downsampling logic 992, the size of the block of pixels used for the local histograms 966 may have independently programmable horizontal and vertical sizes. That is, a programmable horizontal block size signal 1014 may specify the horizontal size of a pixel block and a vertical block size signal 1016 may specify the vertical size of a block of pixels. In one embodiment, the maximum number of horizontal blocks may not exceed 64 blocks. The minimum block size in the horizontal direction may be 64 pixels (at full sensor resolution). The block size in both directions and the active region 312 coordinates may be in multiples of two. When the width and height of the active region 312 are not multiples of the block sizes, bottom rows and/or right columns may not be used for local histogram generation, as partial tiles may be discarded. The maximum number of pixels in a block may not exceed 2^18 at full sensor resolution, in some embodiments. For example, 512×512 pixels in full sensor resolution may be the largest block size when the width and height are constrained to be the same value.

For each block, the local (block) histogram logic 1012 may compute a local histogram of the luminance. The resulting histogram 966 may have 32 bins, and the size of each bin may be the same across all bins. The bin number may be obtained as follows:

idx=(LocalHistScale*(Luminance−LocalHlstOffset))>>16, where LocalHistScale represents scaling for computing the histogram, Luminance represents the selected signal input to the local (block) histogram logic 1012, LocalHistOffset represents a programmable offset for computing the histogram. The local histogram at block number (i,j), where (i,j) represents the horizontal (i) and vertical (j) coordinates of the block, may be incremented as follows:

if (idx>=0&& idx<32)
LocalHist(i,j,idx)+=Count;

Local histograms may be written to the memory 100 in scan order as the pixel block is processed, and if the pixel block was part of the active region 312. For each block, local histogram counts are written from the lowest index—that is, the darkest pixel count—to the highest index, or brightest pixel counts. In one example, each histogram bin may be represented by a 16-bit number. When each histogram bin is represented by a 16-bit number, the value of each bin may be saturated at 65535.

Figure 88:
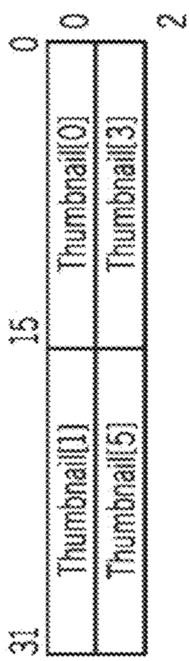
FIG. 88 is an illustration of a first memory format for thumbnails generated by the local image statistics logic, in accordance with an embodiment.
Figure 89:
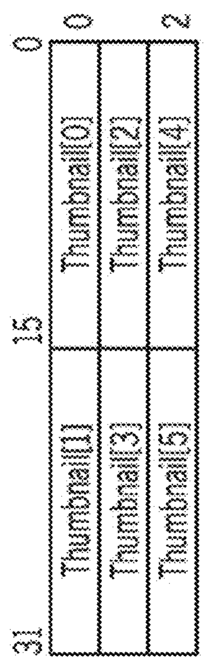
FIG. 89 is an illustration of a second memory format for thumbnails generated by the local image statistics logic, in accordance with an embodiment.
Figure 90:
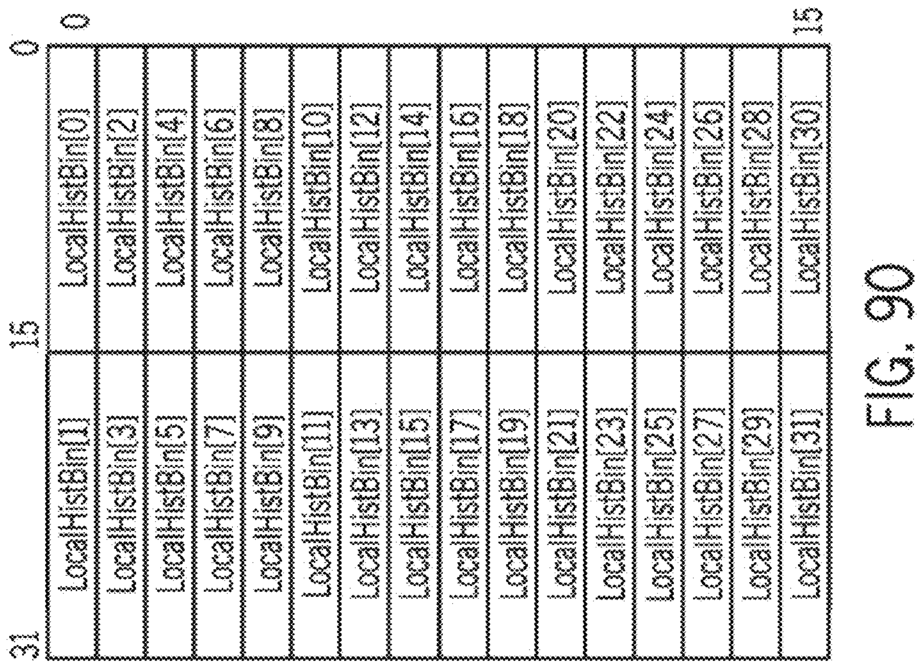
FIG. 90 is an illustration of a memory format for local histograms generated by the local image statistics logic, in accordance with an embodiment.

Considering the direct memory access (DMA) format of local image statistics, two memory pointers may be used to write statistics to the memory 100: one for local histograms 966 and one for thumbnails 962. The memory address registers may be double-buffered so that a new location in the memory 100 can be specified on every frame. FIGS. 88, 89, and 90 illustrate one example of a suitable memory format for the local statistics. In particular, FIGS. 88 and 89 illustrate thumbnail statistics written to memory in scan order as each local region—that is, each block—is complete (if the block is part of the active region 312). The thumbnail statistics 962 may be fully or partially enabled. When thumbnail statistics are partial enabled, only four thumbnail statistics may be written to memory, as shown in FIG. 88. When thumbnail statistics are all enabled, as shown in FIG. 89, six thumbnails may be written to memory. As shown in FIG. 90, and discussed above, local histogram statistics may include 32 bins of 16 bits each.

In some embodiments, an interrupt may be sent to the host when the local image statistics have been completed by the DMA for the active region. Also, the row number in (tile/block units) may be defined such that the interrupt occurs when the DMA has completed the defined row. This may allow firmware to begin early processing.

RAW Processing Logic

Referring again briefly to FIG. 8, the raw processing logic 150 may form an initial image processing block to operate on raw Bayer image data. Using the statistics collected in the statistics logic 140_a_ and/or 140_b_ (e.g., as interpreted by software running on the processor(s) 16 that may control the ISP pipe processing logic 80), the raw processing logic 150 may perform sensor linearization, black level compensation, fixed pattern noise reduction, temporal filtering, defective pixel detection and correction, spatial noise filtering, lens shading correction, white balance gain operations, highlight recovery, chromatic aberration correction and/or raw scaling, as will be discussed further below. As shown in the present embodiment, the input signal to the raw processing logic 150 may be the raw pixel output from the sensors 90 or raw pixel data from the memory 100, depending on the present configuration of the selection logic 142_c_.

Figure 91:
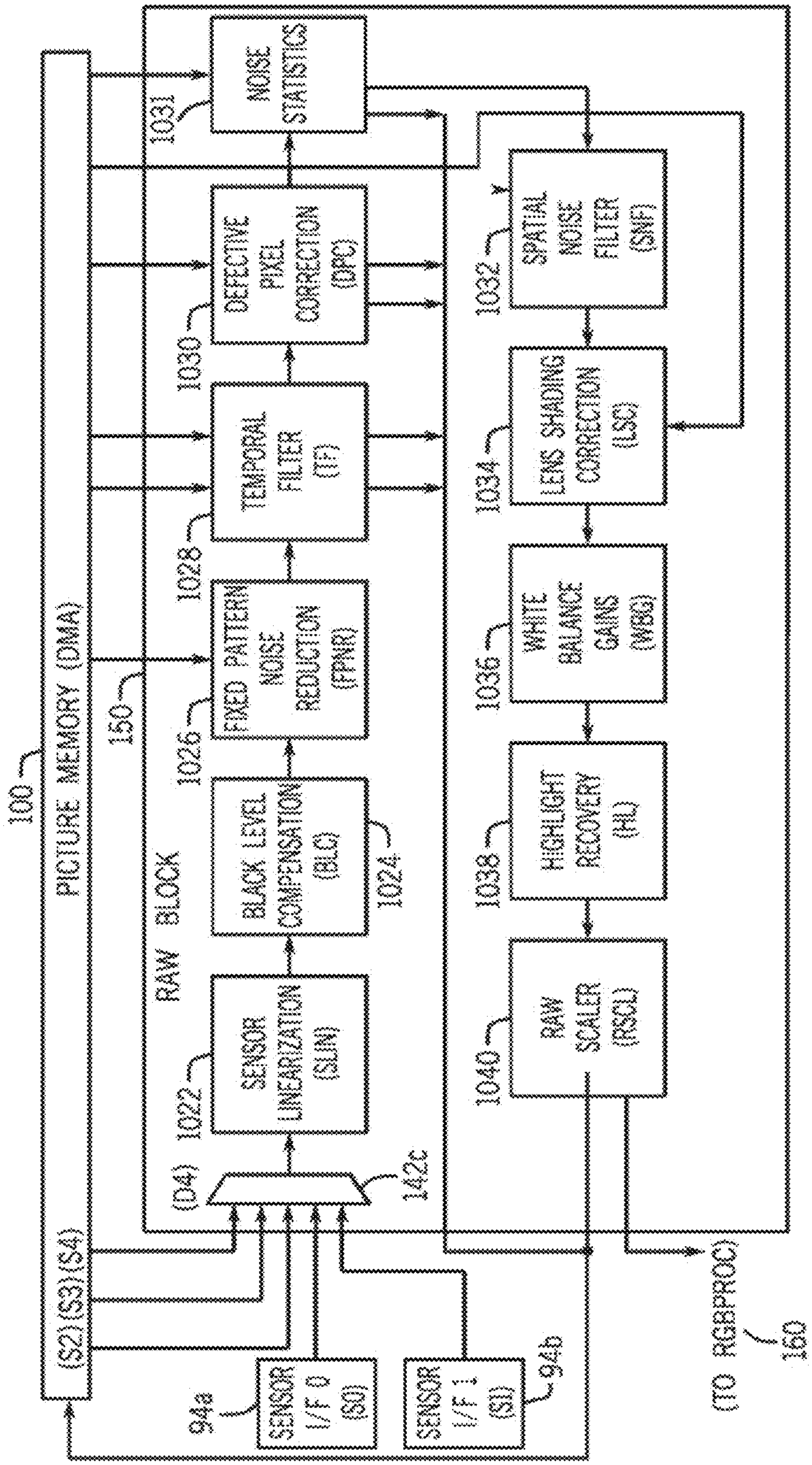
FIG. 91 is a block diagram of a raw processor block and imaging device(s) of FIG. 1, in accordance with an embodiment.

Referring now to FIG. 91, a block diagram showing a more detailed view of an embodiment of the raw processing logic 150 is illustrated, in accordance with an embodiment of the present technique. As shown, the raw processing logic 150 includes sensor linearization (SLIN) logic 1022, black level compensation (BLC) logic 1024, fixed pattern noise reduction (FPNR) logic 1026, temporal filter logic (TF) 1028, defective pixel correction (DPC) logic 1030, which may share hardware logical blocks with noise statistics logic 1031 to share resources, spatial noise filter (SNF) logic 1032, lens shading correction (LSC) logic 1034, white balance gain (WBG) logic 1036, highlight recovery (HR) logic 1038, and raw scaler (RSCL) logic 1040. In one example, the raw processing logic 150 may pass raw image data through these logic blocks in the order above. In some embodiments, the SLIN logic 1022, the BLC logic 1024, the FPNR logic 1026, and the TF logic 1028 may benefit from occurring before the DPC logic 1030, since these blocks perform corrections at a pixel correction level. In another example, the raw scaler (RSCL) logic 1040 may occur between the defective pixel correction (DPC) logic 1030 and the spatial noise filter. In other examples, the temporal filter (TF) logic 1028 may take place between the spatial noise filter (SNF) logic 1032. For instance, the order may be the SLIN logic 1022, the BLC logic 1024, the FPNR logic 1026, the DPC logic 1030, the RSCL logic 1040, the SNF logic 1032, the TF logic 1028, the LSC logic 1034, the WBG logic 1036, and the HR logic 1038. These logic blocks are described in greater detail below.

Before continuing, it should be appreciated that the noise statistics logic is implemented in conjunction with the DPC logic 1030 because doing so permits reusing some of the same logic. In other embodiments, however, the noise statistics logic may be located in any number of other spaces in the pipeline. For instance, the noise statistics logic may occur after the FPNR logic 1026, after the TF logic 1028, and/or after the SNF logic 1032, and so forth. The noise statistics logic may also be located outside of the raw processing logic 150. For instance, the noise statistics logic may be located after the demosaicing (DEM) logic of the RGB processing logic 160 or the luminance (Y) sharpening logic or chroma noise reduction logic of the YCC processing logic 170. Indeed, the noise reduction logic may allow the determination of the noise standard deviation after these noise reduction blocks have operated on the pixel data. Thus, by monitoring the noise standard deviation before and after processing, the effectiveness of the noise reduction blocks may be gauged. When only one noise statistics logic block is used (e.g., the noise statistics logic appears only in conjunction with the DPC logic 1030 or only appears before TF logic 1028), the noise standard deviation at later blocks may be estimated from the noise standard deviation determined in the one noise statistics logic block. Moreover, when only one noise statistics logic block is used, it may be valuable to locate the noise statistics logic block before the SNF logic 1032 spreads noise around, which could alter the noise standard deviation of the image by spatially spreading noise.

Of note, the raw processing logic 150 may preserve more image information than many conventional techniques. Indeed, the raw processing logic 150 may operate on signed image data, which allows for a zero offset that can preserve negative noise. By processing the raw image data in a signed format, rather than merely clipping the raw image data to an unsigned format, image information that would otherwise be lost may be preserved. To provide a brief example, noise on the image sensor(s) 90 may occur in a positive or negative direction. In other words, some pixels that should represent a particular light intensity may have values of a particular (correct) value, others may have noise resulting in values greater than the particular value, and still others may have noise resulting in values less than the particular value. When an area of the image sensor(s) 90 captures little or no light, sensor noise may increase or decrease individual pixel values such that the average pixel value is about zero. If only noise occurring in a negative direction is discarded, however, the average black color could rise above zero and would produce grayish-tinged black areas.

In effect, the zero bias effectively centers the noise distribution from the sensor(s) 90 around zero, so that filters and functional operations can use pixels with information on both sides of the distribution. Thus, the average noise will be approximately zero. The distribution of noise may thus effectively cancel out to provide colors that more accurately reflect the scene that was captured. For example, noise from the sensor(s) 90 may be Gaussian with a mean of zero. Without applying the zero bias as taught in the present disclosure, the average black color will be at zero bias after the noise filter.

Since the ISP pipe processing logic 80 may use signed image data, rather than merely clipping the negative noise away, the ISP pipe processing logic 80 may more accurately render dark black areas in images. In alternative embodiments, only some of the raw processing logic 150 may employ signed image data. In general, however, the raw processing logic 150 may use signed image data at least through the noise statistics block and the SNF logic 1032, to allow for a more precise determination of the noise standard deviation (noise statistics) and to prevent spreading unwanted noise (SNF logic 1032).

The process of scaling and offsetting the input image data may take place as described above with reference to FIGS. 40-43 and FIG. 229. Scaling and offset logic 82 (not shown in FIG. 91) may be implemented as a function of the input and output direct memory access (DMA) logic that inputs and outputs image data to and from the memory 100 and raw processing logic 150.

Also of note is that the raw processing logic 150 does not perform demosaicing of raw image data into the RGB format. As such, the output of the raw processing logic 150 remains in the raw image format. Since the output of the raw processing logic 150 is in the raw format, the output of the raw processing logic 150 may be stored in the memory 100 and reprocessed through the raw processing logic 150 in multiple passes. For example, software running on the processor(s) 16 may control the ISP pipe processing logic 80 to make multiple passes on the same data, keeping the same or varying the control parameters of the raw processing logic 150 each time. Under certain conditions (e.g., low-light conditions or other high-noise conditions), multiple passes through the raw processing logic 150 may reduce noise in otherwise overly noisy images.

Moreover, in some embodiments, software may provide raw image data obtained from another imaging device than those of the electronic device 10 (e.g., a raw file obtained by a third-party camera system). To provide one example, the raw image data may be obtained by decompressing VLC compressed RAW images. The obtained raw image data may be processed through the raw processing logic 150 as if the image data had been obtained by the sensors 90. Software controlling the ISP pipe processing logic 80 may program the various functional blocks based on information related to the third-party camera, sensor, lens, etc. For instance, the lens shading correction (LSC) logic may adjust the radial gains based on the lens used in the third-party camera.

Sensor Linearization (SLIN)

As mentioned above, raw image data received from some sensors 90, particularly high dynamic range (HDR) sensors 90, may be nonlinear. The image processing of the raw processing logic 150, however, may operate on linear image data. The sensor linearization logic 1022 thus may convert nonlinear image data from the sensors 90 into linear image data that can be operated on by the raw processing logic 150. To provide one example, raw image data in a companding format first may be mapped from its encoded nonlinear state to a linear space for additional image processing. The sensor linearization logic 1022 may perform such a conversion.

The sensor linearization (SLIN) logic 1022 of the raw processing logic (RAWProc) 150 may operate in substantially the same way as the sensor linearization (SLIN) logic 470 of the statistics logic 140*a* and 140*b*. As such, sensor linearization (SLIN) logic 1022 may operate in the manner discussed above with reference to FIGS. 49-51.

Black Level Compensation (BLC)

The output of the sensor linearization (SLIN) logic 1022 may be passed to the black level compensation (BLC) logic 1024. The BLC logic 1024 may operate in substantially the same way as the BLC logic 472. Thus, the BLC logic 1024 may provide for digital gain, offset, and clipping independently for each color component "c" (e.g., R, B, Gr, and Gb for Bayer) on the pixels used for statistics collection. For instance, as expressed by the following operation, the input value for the current pixel is first offset by a signed value, and then multiplied by a gain:

$$Y=(X+O[c])\times G[c],$$

where X represents the input pixel value for a given color component c (e.g., R, B, Gr, or Gb), O[c] represents a signed 16-bit offset for the current color component c, G[c] represents a gain value for the color component c, and Y represents the output pixel value. In one embodiment, the gain G[c] may be a 16-bit unsigned number with 2 integer bits and 14 fraction bits (e.g., 2.14 in floating point representation), and the gain G[c] may be applied with rounding. By way of example, the gain G[c] may have a range of between 0 to 4 (e.g., 4 times the input pixel value).

Next, as shown by the below, the computed value Y, which is signed, may then be then clipped to a minimum and maximum range:

$$Y=(Y<\min[c])?\min[c]:(Y>\max[c])?\max[c]:Y).$$

The variables min[c] and max[c] may represent signed 16-bit clipping values for the minimum and maximum output values, respectively. In one embodiment, the BLC logic 1024 may also be configured to maintain a count of the number of pixels that were clipped above and below maximum and minimum, respectively, per color component.

Fixed Pattern Noise Reduction (FPNR)

Subsequently, the output of the BLC logic 1024 is forwarded to a fixed pattern noise reduction (FPNR) block 1026. The FPNR block 1026 may use the fixed pattern noise statistics generated by the FPN statistics logic 484 to remove the fixed pattern noise from raw image data received from some sensors 90. For instance, the FPNR block 1026 may extract the fixed pattern noise in the raw image by identifying the pattern with the highest energy in the FPN statistics determined by the FPN statistics logic 484. As discussed above with reference to FIGS. 80-82 (FPN statistics logic 484), fixed pattern noise (FPN) is generally due to variations in pixel or column properties that manifest themselves as spatial noise. For example, variations in pixel-offset values may result from variations in dark current or in offsets of an amplifier chain coupled to the sensors 90.

In general, fixed pattern noise may include noise in the sensors 90 that has a repeating or fixed pattern. For example, the fixed pattern noise may include row-wise or column-wise fixed variations that may be removed such that higher quality images can be displayed. In another example, fixed pattern noise may be a diagonal fixed variation that occurs due to a manufacturing process such as a laser annealing process that creates a different amount of light going to the pixels, which may result in a noise that has a pattern. Thus, the fixed pattern noise may be a row-wise, column-wise, or diagonal-wise pattern. Alternatively, the fixed pattern noise may be a whole frame pattern that changes pixel-to-pixel but remains similar from frame-to-frame.

Typically, during the manufacturing process, a calibration procedure may determine the fixed pattern noise, which may be used to remove the fixed pattern noise. However, the fixed pattern noise may change over time due to temperature, integration time, etc. In this manner, the fixed pattern noise statistics determined by the FPN statistics logic 484, as described above, may be used by the FPNR block 1026 to adapt the fixed pattern noise removal process on the fly as the fixed pattern noise changes.

In one embodiment, the fixed pattern noise may correspond to variations in gain and offsets of pixel intensity values as indicated in the fixed pattern noise statistics determined by the FPN statistics logic 484. The FPNR block 1026 may remove the offset fixed pattern noise by subtracting a dark frame from the input image. The dark frame may be an image captured by the sensors 90 in the dark (e.g., an image of noise in the sensor 90*a*). In this manner, the dark frame may be generated by capturing image data with a closed shutter or during camera calibration. In general, the dark frame may change based on an integration time, a temperature, and/or other external factors. In one embodiment, the offset may be generated by a linear combination of two or more dark frames. For instance, a dark frame acquired with an integration time of 10 ms may be bilinearly interpolated with a dark from with an integration time of 20 ms.

As mentioned above, in addition to offsets of pixel values, the fixed pattern noise may include gain fixed pattern noise. Gain fixed pattern noise may be a ratio between an optical power on a pixel versus an electrical signal output on the pixel. For instance, the gain fixed pattern noise may be pixel-to-pixel response non-uniformity (PRNU). The FPNR block 1026 may remove the gain fixed pattern noise by multiplying different gain values to pixels, thereby compensating for the PRNU effects on the pixels.

Figure 92:
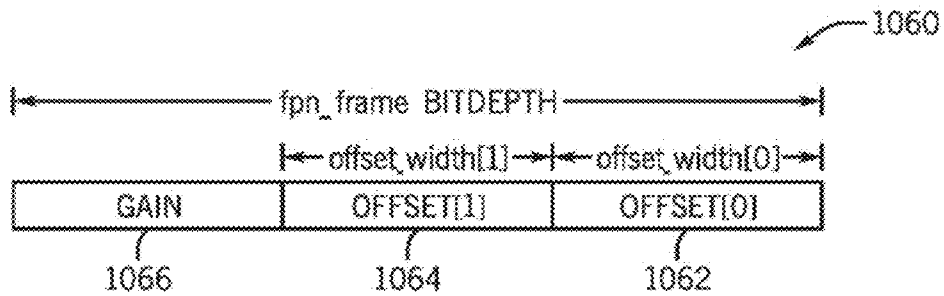
FIG. 92 is an illustration of a memory format for a fixed pattern noise frame generated by the fixed pattern noise reduction (FPNR) logic, in accordance with an embodiment.

In one embodiment, the offset and gain components for each pixel in an input image may be stored in an offset look-up table (LUT) and a gain LUT, respectively. Each LUT may be calibrated based on various types of fixed pattern noise, which may be identified using the fixed pattern noise statistics. In addition to or in lieu of being calibrated based on the various types of fixed pattern noise, each LUT may be calibrated based on a temperature value acquired by the temperature sensor or an integration time for the sensors(s) 90. For instance, each LUT may be calibrated based on a per-unit temperature value change on the temperature sensor. By storing the offset and gain components for each pixel in LUTs, the offset and gain components may be represented using fewer bits per pixel and may be used to specify a non-linear mapping. The offset and gain components for each pixel may be stored in a fixed pattern noise frame. In one embodiment, the fixed pattern noise frame 1060, as illustrated in FIG. 92, may include packed bits that encode two offsets and a gain. A first offset 1062 in the fixed pattern noise frame 1060 may be located in the least significant bits of the fixed pattern noise frame 1060 followed by a second offset 1064, and then followed by a gain 1066. The fixed pattern noise frame may be represented in 8, 10, 12, 14, or 16-bit. As such, the fixed pattern noise frame width (fpn_frame_bitdepth) may be determined by the RAW format (RAW8, 10, 12, 14 or 16) of the input image.

After determining the width of the fixed pattern noise frame, the width of the offsets and gain in the fixed pattern noise frame 1060 may be programmed. In this manner, the number of bits used for each offset (1062 and 1064) in the fixed pattern noise frame 1060 may be specified (frame_off_width[0] and frame_off_width[1]) prior to when the offsets of the fixed pattern noise frame of a pixel are set. For example, with a RAW16 input image, bit widths for the first offset 1062, the second offset 1064, and the gain 1066 may be set to 6, 6, and 4, respectively. Alternatively, if the gain 1066 is not required, the first offset 1062 and the second offset 1064 may be set to 8 bit each. In one embodiment, the fixed pattern noise frame 1060 may include only one offset as opposed to two offsets.

The bits of the fixed pattern noise frame not being used for an offset may consequently be used for the gain portion 1066 of the fixed pattern noise frame 1060. Since the gain portion 1066 of the fixed pattern noise frame 1060 may be fractional value, the number of bits to be used as the fractional value of the gain may also be specified (frame_gain_fraction) prior to the gain is set in the fixed pattern noise frame 1060 for a pixel.

After determining the fixed pattern noise frame 1060 (offset and gain values) to compensate for the fixed pattern noise of a pixel, the FPNR block 1026 may subtract an offset and apply a gain (up or down) to the pixel, thereby compensating for the fixed pattern noise in the input image. Additional details with regard to compensating for the fixed pattern noise in the input image are discussed below with reference to FIG. 93.

At block 1072, the FPNR block 1026 may determine an offset value and a gain value for each pixel based on the fixed pattern noise frame for each pixel as shown below:

frame_offset[0]=fpn (j,i) & frame_off_mask[0]

frame_offset[1]=(fpn (j,i) & frame_off_mask[1])>>frame_off_width[0]

frame_gain=((fpn (j,i) & frame_gain_mask))>>(frame_off_width[0]+frame_off_width[1])

where frame_offset[0] corresponds to the first offset 1062 and frame_off mask[0] corresponds to a mask for the first offset 1062, frame_offset[1] corresponds to the second offset 1064, frame_off mask[1] corresponds to a mask for the second offset 1064, frame_gain mask correspond to a mask for the gain 1066, and fpn (j,i) corresponds to a fixed pattern noise frame for a pixel in the input image located at (j, i).

In another embodiment, if an offset LUT is enabled and/or a gain LUT is enabled, the FPNR block 1026 may apply a mask to the fixed pattern noise frame 1060 for a respective pixel based on the mask and the fixed pattern noise frame as follows:

if (offset_LUT_en)

frame_offset[0]=offset_LUT[fpn (j,i) & frame_off_mask [0]]

frame_offset[1]=offset_LUT[fpn (j,i) & frame_off_mask [1])>>frame_off_width[0]]

if (gain_LUT_en)

frame_gain=gain_LUT[fpn (j,i) & frame_gain_mask))>> (frame_off_width[0]+frame_off_width[1]]

where offset_LUT represents an interpolation of the offset from a look-up table for the offset, frame_off_width [0] corresponds to a number of bits used in the fixed pattern noise frame to specify the first offset 1062, frame_off_width [1] corresponds to a number of bits used in the fixed pattern noise frame to specify the second offset 1064, and gain_LUT represents an interpolation of the gain from a look-up table for the gain 1066.

The total frame offset may then be determined as follows:

frame_off=frame_off_weight [0]*frame_offset[0]+ frame_off_weight[1]*frame_offset[1]

where frame_off_weight [0] corresponds to a weighting factor for the first offset 1062, and frame_off_weight [1] corresponds to a weighting factor for the second offset 1064.

As shown in the equations above, after appropriate masking of the fixed pattern noise frame, the FPNR block 1026 may use lookup-table operations to determine an offset and gain for the respective pixel. In one embodiment, an optional linear interpolation between look-up table values may be performed if the offset width of the fixed pattern noise frame is larger than the number of entries in the LUT. As such, the interpolation may occur if the width of the offset or gain is larger than the corresponding LUT size. The offset LUT may include signed 17-bit output levels such that the spacing on the input is a maximum value between 1 and 2^(offset_width−7). As such, if the offset is 7 bit or less, the spacing is 1 and the FPNR block 1026 may not perform any interpolation. The gain LUT may include unsigned 16-bit output levels such that the spacing on the input is a maximum value between 1 and 2^(gain_width−6). Therefore, if the gain is 6 bit or less, the spacing is 1 and the FPNR block 1026 may not perform any interpolation.

At block 1074, the FPNR block 1026 may determine if a row fixed pattern noise correction feature has been enabled (i.e., row_fpn_en=1). The row fixed pattern noise correction feature may be enabled if the FPN statistics logic 484 collects fixed pattern noise that indicates a row-wise fixed pattern noise in the input image. In one embodiment, the row fixed pattern noise correction feature may be enabled with respect to each color component (i.e., row_fpn_en[c]=1). If the row fixed pattern noise correction feature is enabled, then the FPNR block 1026 may proceed to block 1076.

At block 1076, the FPNR block 1026 may determine the fixed pattern noise correction factors for each row of the input image similar as to how the fixed pattern noise correction factors for each pixel has been determined as described above. In one embodiment, the FPNR block 1026 may determine an offset value and a gain value for each row based on the fixed pattern noise frame for each row as shown below:

row_offset[0]=row_fpn[floor(row_pos)]& row_off_mask [0]

row_offset[1]=(row_fpn[floor(row_pos)]& row_off_mask[1])>>row_off_width[0]

row_gain=((row_fpn[floor(row_pos)]& row_gain_mask))>>(row_off_width[0]+row_off_width[1])

where row_pos=((row_pos_init[c]+row_stepX[c]*i+row_stepY[c]*j) modulo row_fpn_size[c])+row_pos_offset[c]

and where row_offset[0] corresponds to the first offset 1062 and row_off_mask[0] corresponds to a mask for the first offset 1062, row_offset[1] corresponds to the second offset 1064, row_off_mask[1] corresponds to a mask for the second offset 1064, row_gain_mask correspond to a mask for the gain 1066, row_fpn[floor(row_pos)] corresponds to the fixed pattern noise frame for a respective row located at floor(row_pos), row_pos corresponds to a current row position of the respective pixel in the active region per color component, row_off_width[0] corresponds to a number of bits the row fixed pattern noise frame that are used to specify the first offset 1062, row_off_width[1] corresponds to a number of bits the row fixed pattern noise frame that are used to specify the second offset 1064, and row_gain corresponds to the gain 1066 in the row fixed pattern noise frame, row_pos_init[c] corresponds to an initial position in a row fixed pattern noise array, which may be determined based on fixed pattern noise statistics or calibration data obtained from a supplier of the sensors 90, for a first pixel of an active region per color component in the input image, row_stepX[c] corresponds to a horizontal step size in the row fixed pattern noise array per color component, row_stepY[c] corresponds to a vertical step size in the row fixed pattern noise array per color component, row_fpn_size [c] corresponds to the size of a repeating pattern in the row fixed pattern noise array per color component, and row_pos_offset[c] corresponds to an offset in the row fixed pattern noise array for the position of the first element per color component.

In another embodiment, if an offset LUT is enabled and/or a gain LUT is enabled, the FPNR block 1026 may apply a mask to the fixed pattern noise frame 1060 for a respective pixel based on the mask and the fixed pattern noise frame as follows:

if (offset_LUT_en)

row_offset[0]=offset_LUT[row_fpn[floor(row_pos)]& row_off_mask[0]]

row_offset[1]=offset_LUT[(row_fpn[floor(row_pos)]& row_off_mask[1]>row_off_width[0]]

if (gain_LUT_en)

row_gain=gain_LUT[((row_fpn[floor(row_pos)]& row_gain_mask))>>(row_off_width[0]+row_off_width[1])]

where row_off_width [0] corresponds to a number of bits used in the fixed pattern noise frame to specify the first offset 1062, and row_off_width [1] corresponds to a number of bits used in the fixed pattern noise frame to specify the second offset 1064.

The total row offset may then be determined as follows:

row_off=row_off_weight [0] row_offset[0]+row_off_weight[1]*row_offset[1]

where row_off_weight [0] corresponds to a weighting factor for the first offset 1062, and row_off_weight [1] corresponds to a weighting factor for the second offset 1064.

After setting the row offset value and the row gain value as shown above, the FPNR block 1026 may proceed to block 1078.

Referring back to block 1074, if the row fixed pattern noise correction feature is not enabled for one or more color components (i.e., row_fpn_en=0), then the FPNR block 1026 may set a row offset value in the row fixed pattern noise frame to 0 and set the gain value in the row fixed pattern noise frame to 1 as shown below:

row_off=0 row_gain=(1<<row_gain_fraction)

where row_gain_fraction corresponds to a number of bits to be used for the row gain portion of the row fixed pattern noise frame. After setting the row offset value and the row gain value, the FPNR block 1026 may proceed to block 1078.

At block 1078, the FPNR block 1026 may determine the fixed pattern noise correction factors for each column of the input image similar as to how the fixed pattern noise correction factors for each pixel has been determined as described above for each pixel and each row of the input image. In one embodiment, the FPNR block 1026 may determine an offset value and a gain value for each column based on the fixed pattern noise frame for each column as shown below:

col_offset[0]=col_fpn[floor(col_pos)]& col_off_mask[0]

col_offset[1]=(col_fpn[floor(col_pos)]& col_off_mask[1])>>col_off_width[0]

col_gain=((col_fpn[floor(col_pos)]& col_gain_mask))>>(col_off_width[0]+col_off_width[1])

where col_pos=((col_pos_init[c]+col_stepX[c]*i+col_stepY[c]*j) modulo col_fpn_size[c])+col_pos_offset[c]

and where col_offset[0] corresponds to the first offset 1062 and col_off_mask[0] corresponds to a mask for the first offset 1062, col_offset[1] corresponds to the second offset 1064, col_off_mask[1] corresponds to a mask for the second offset 1064, col_gain_mask correspond to a mask for the gain 1066, col_fpn[floor(col_pos)] corresponds to the fixed pattern noise frame for a respective column located at floor(col_pos), col_pos corresponds to a current column position of the respective pixel in the active region per color component, col_off_width[0] corresponds to a number of bits the column fixed pattern noise frame that are used to specify the first offset 1062, col_off_width[1] corresponds to a number of bits the column fixed pattern noise frame that are used to specify the second offset 1064, and col_gain corresponds to the gain 1066 in the column fixed pattern noise frame, col_pos_init[c] corresponds to an initial position in a column fixed pattern noise array, which may be determined based on fixed pattern noise statistics or calibration data obtained from a supplier of the sensors 90, for a first pixel of an active region per color component in the input image, col_stepX[c] corresponds to a horizontal step size in the row fixed pattern noise array per color component, col_stepY[c] corresponds to a vertical step size in the column fixed pattern noise array per color component, col_fpn_size[c] corresponds to the size of a repeating pattern in the column fixed pattern noise array per color component, and col_pos_offset[c] corresponds to an offset in the column fixed pattern noise array for the position of the first element per color component.

In another embodiment, if an offset LUT is enabled and/or a gain LUT is enabled, the FPNR block 1026 may apply a mask to the fixed pattern noise frame 1060 for a respective pixel based on the mask and the fixed pattern noise frame as follows:

if (offset_LUT_en)

col_offset[0]=offset_LUT[col_fpn[floor(col_pos)]& col_off_mask[0]]

col_offset[1]=offset_LUT[(col_fpn[floor(col_pos)]& col_off_mask[1])>>col_off_width[0]]

if (gain_LUT_en)

col_gain=gain_LUT[((col_fpn[floor(col_pos)]& col_gain_mask))>>(col_off_width[0]+col_off_width[1])]

where col_off_width [0] corresponds to a number of bits used in the fixed pattern noise frame to specify the first offset 1062, and col_off_width [1] corresponds to a number of bits used in the fixed pattern noise frame to specify the second offset 1064.

The total column offset may then be determined as follows:

col_off=col_off_weight [0]*col_offset[0]+col_off_weight[1]*col_offset[1]

where col_off_weight [0] corresponds to a weighting factor for the first offset 1062, and col_off_weight [1] corresponds to a weighting factor for the second offset 1064.

The column fixed pattern noise frame may be represented in the same manner as the pixel fixed pattern noise frame of FIG. 92. The column offset (col_off) may be used to represent a pattern of a known frequency using a horizontal step size (col_stepX[c]) and a vertical step size (col_stepY[c]) into a column offset array. In one embodiment, a position in a column fixed pattern noise table (col_pos_init) may be represented as a 14.16 fractional number. In one embodiment, the column fixed pattern noise table may be generated based on the fixed pattern noise statistics. Similarly, the horizontal step (col_stepX[c]) and the vertical step (col_stepY[c]) may be represented as a 14.16 fractional number. As such, the FPNR block 1026 may maintain the column fixed pattern noise position in the column fixed pattern noise table (col_pos) and increment the column fixed pattern noise position by a corresponding horizontal step (col_stepX[c]). The horizontal step may be truncated to a closed integer value to provide a precise step value. At the end of every row in the input image, the FPNR block 1026 may increment the column fixed pattern noise position (col_pos) by the vertical step (col_stepY[c]). The column fixed pattern noise position (col_pos) may then wraps around when it reaches the maximum index of the column fixed pattern noise table. After setting the column offset value and the column gain value as described above, the FPNR block 1026 may proceed to block 1082.

Referring back to block 1078, if the column fixed pattern noise correction feature is not enabled for one or more color components (i.e., col_fpn_en[c]=1), then the FPNR block 1026 may set a column offset value in the column fixed pattern noise frame to 0 and set the gain value in the column fixed pattern noise frame to 1 as shown below:

col_off=0 col_gain=(1<<col_gain_fraction)

where col_gain_fraction corresponds to a number of bits to be used for the column gain portion of the row fixed pattern noise frame. After setting the column offset value and the column gain value, the FPNR block 1026 may proceed to block 1082.

At block 1082, the FPNR block 1026 may apply the fixed pattern noise offsets and gains (i.e., fixed pattern noise correction factors per pixel, row, and/or column) determined at blocks 1072, 1076, and 1080 to the input image. An example of the effects of applying the fixed pattern noise offsets and gains as described in process 1070 above is illustrated in FIG. 224 and FIG. 225. In one embodiment, the image illustrated in FIG. 224 may correspond to image data received by the FPNR block 1026, and the image illustrated in FIG. 225 may correspond to image data processed by the FPNR block 1026 to remove the column offset fixed pattern noise from the image data.

In addition to the fixed pattern noise correction factors per pixel, row, and/or column, the FPNR block 1026 may also apply global input and output offsets as described below with reference to FIG. 94. At block 1092, the FPNR block 1026 may receive global input and/or output offset values for the input image. At block 1094, the FPNR block 1026 may determine whether the global offset values are to be added before applying the gain values of the fixed pattern noise correction factors that correspond to the pixel, row, and/or column of the input image.

If the global offset values are to be added before applying the gain values of the fixed pattern noise correction factors, the FPNR block 1026 may proceed to block 1096. At block 1096, the FPNR block 1026 may apply the fixed pattern noise correction factors and the global offsets as follows:

tmp=max(−2^17, min(2^17−1, (x(j,i)+offset_in[c]−row_off−col_off−frame_off)))

tmp=max(−2^17, min(2^17−1, (tmp*row_gain+(1<<(row_gain_fraction−1)))>>row_gain_fraction))

tmp=max(−2^17, min(2^17−1, (tmp*col_gain+(1<<(col_gain_fraction−1)))>>col_gain_fraction))

tmp=max(−2^17, min(2^17−1, (tmp*frame_gain+(1<<(frame_gain_fraction−1)))>>frame_gain_fraction))

x(j,i)=max(−2^16, min(2^16−1, tmp+offset_out[c]))

where tmp corresponds to a temporary value, x(j,i) corresponds to a pixel value for the respective pixel, offset_in[c] corresponds to a global input offset per color component, and offset_out[c] corresponds to a global output offset per color component.

Referring back to block 1094, if the global offset values are not to be added before applying the gain values of the fixed pattern noise correction factors, the FPNR block 1026 may proceed to block 1098. At block 1098, the FPNR block 1026 may apply the fixed pattern noise correction factors and the global offsets as follows:

tmp=max(−2^17, min(2^17−1, ((x(j,i)+offset_in[c])*row_gain+(1<<(row_gain_fraction−1)))>>row_gain_fraction))

tmp=max(−2^17, min(2^17−1, (tmp*col_gain+(1<<(col_gain_fraction−1)))>>col_gain_fraction))

tmp=max(−2^17, min(2^17−1, (tmp*frame_gain+(1<<(frame_gain_fraction−1)))>>frame_gain_fraction))

tmp=max(−2^17, min(2^17−1, tmp−row_off−col_off−frame_off))

x(j,i)=max(−2^16, min(2^16−1, tmp+offset_out[c]))

Figure 93:
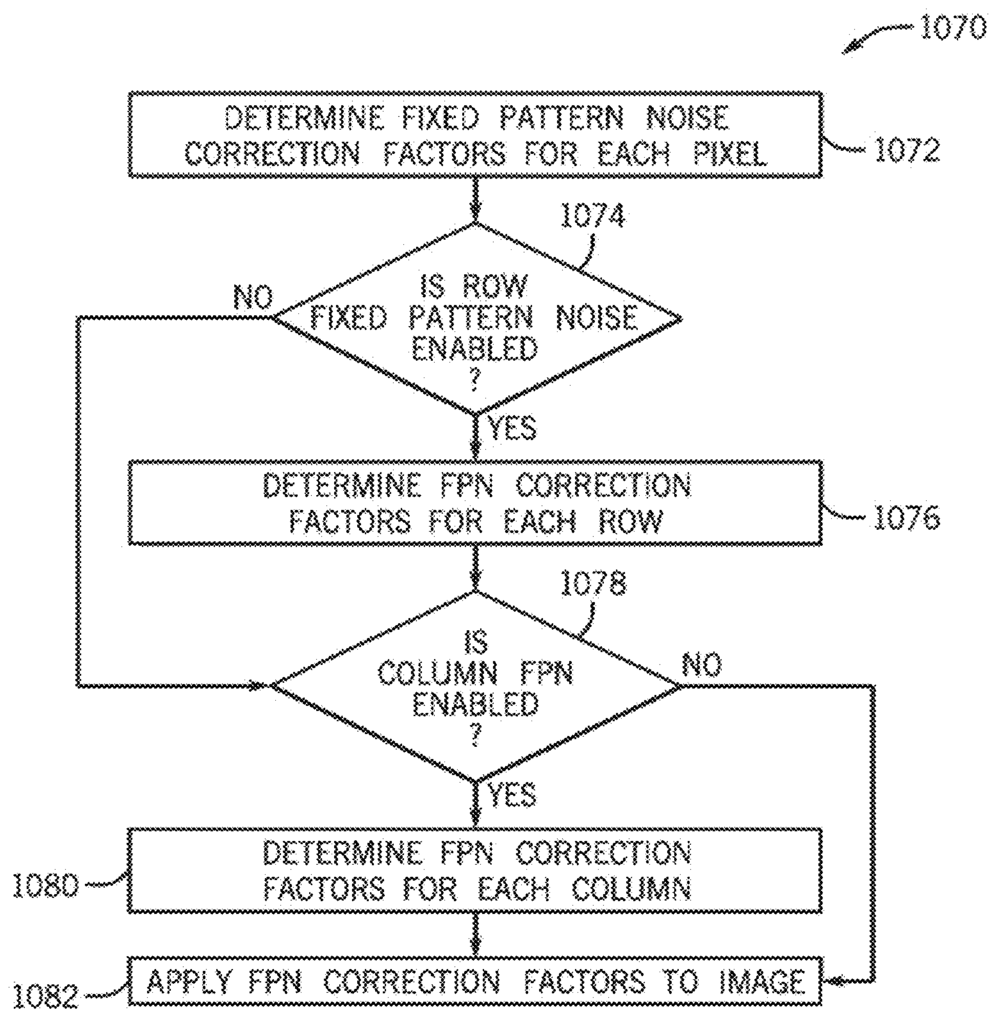
FIG. 93 is a flow diagram illustrating a fixed pattern noise reduction process, in accordance with an embodiment.
Figure 94:
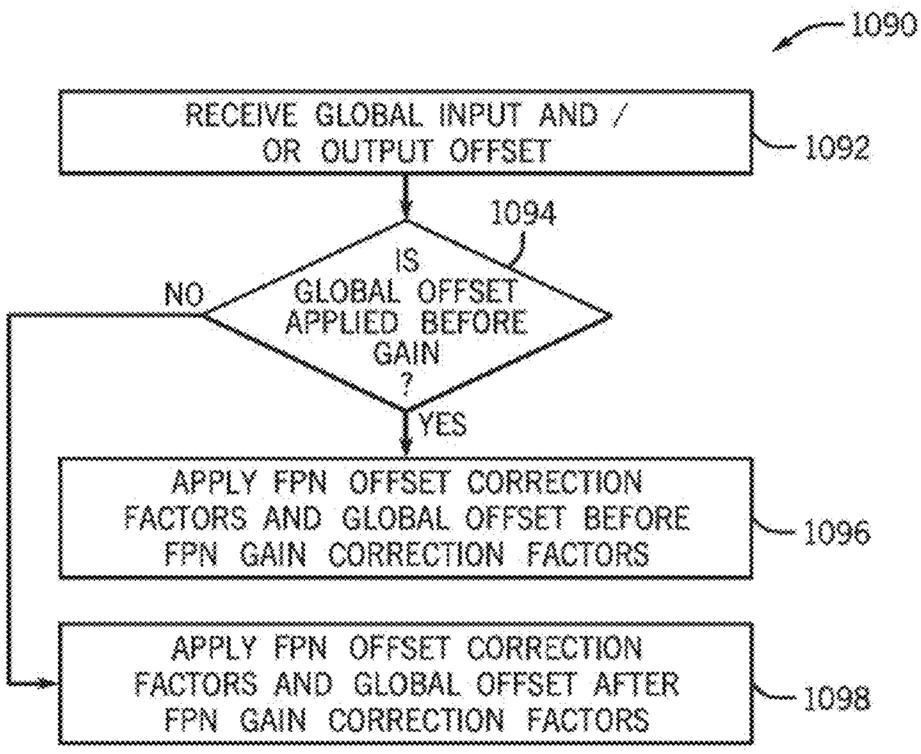
FIG. 94 is a flow diagram illustrating a fixed pattern noise reduction process using global offsets, in accordance with an embodiment.

In one embodiment, the FPNR block 1026 may bypass the fixed pattern noise processes (1070 and 1090) described in FIG. 93 and FIG. 94 if the value of the respective pixel is not between a low threshold value and a high threshold value. As such, the FPNR block 1026 may evaluate whether the value of each pixel (x(j,i)) is less than a low threshold value (BypassThdLow) or greater than a high threshold value (BypasshdHigh) as shown below.

(x(j,i)<BypastThdLow||x(j,i)>BypassThdHigh)

If the value of the respective pixel (x(j,i)) is less than a low threshold value (BypassThdLow) or greater than a high threshold value (BypasshdHigh), the FPNR block 1026 may bypass the fixed pattern noise processes (1070 and 1090) for the respective pixel.

In one embodiment, the FPNR block 1026 may compensate for the fixed pattern noise in the input image based on a temperature value acquired from the temperature sensor 22 or an integration time for the sensor(s) 90. Here, look-up tables for various temperature values that acquired by the temperature sensor 22 and/or integration times that correspond to the sensor(s) 90 may include correction factors for each pixel in the input image. Like the look-up tables described above, the look-up tables for various temperature values and/or integration times may include offset values and gain values, which may be used to correct each pixel in the input image for fixed pattern noise. In one embodiment, the FPNR block 1026 may determine the current temperature value of the temperature sensor 22 and/or the integration time of the sensor(s) 90 and interpolate the temperature value and/or the integration time based on the corresponding look-up tables, which may be stored in the memory 18. In one embodiment, the look-up tables for various temperature values and/or integration times may be combined with the look-up tables described above, which may be determined based on a type of fixed pattern noise, to determine more accurate correction factors for each pixel in the input image.

Temporal Filter (TF)

The output of the FPNR block 1026 may be input into the temporal filter block 1028, as depicted in FIG. 91. In addition to the output of the FPNR block 1026, the temporal filter block 1028 may receive raw image data that may be stored in or written to the memory 110 or may be provided directly from the sensors 94 via sensors interfaces 94 (not shown). The temporal filter block 1028 may perform various image processing operations on the received image data on a pixel-by-pixel basis. In one embodiment, the temporal filter block 1028 may be used to reduce noise by averaging frames of image data in the temporal direction. As such, the temporal filter block 1028 may blend prior frames of the image data into each pixel of the image data. In addition to the image data, the temporal filter block 1028 may also receive and output various signals (e.g., Rin, Hin, Hout, and Yout—which may represent motion history and luma data used during temporal filtering) when performing the pixel processing operations, as will be discussed further below. The output of the pixel temporal filter block 1028 may then be forwarded to the defective pixel correction (DPC) block 1030 or may be sent to the memory 110.

In one embodiment, the temporal filter block 1028 may be pixel-adaptive based upon motion and brightness characteristics. For instance, when pixel motion is high, the filtering strength may be reduced in order to avoid the appearance of “trailing” or “ghosting artifacts” in the resulting processed image, whereas the filtering strength may be increased when little or no motion is detected. Additionally, the filtering strength may also be adjusted based upon brightness data (e.g., “luma”). For instance, as image brightness increases, filtering artifacts may become more noticeable to the human eye. Thus, the filtering strength may be further reduced when a pixel has a high level of brightness.

In applying temporal filtering, the temporal filter block 1028 may receive reference pixel data (Rin) and motion history input data (Hin), which may be from a previous filtered or original frame. Using these parameters, the temporal filter block 1028 may provide motion history output data (Hout) and filtered pixel output (Yout). The filtered pixel output Yout may then be forwarded to the DPC block 1030, as mentioned above.

In one embodiment, the temporal filter block 1028 may apply filter coefficients to pixel data from the received image data to generate the filtered pixel output (Yout). The filter coefficients may be adjusted adaptively on a per pixel basis based at least partially upon motion data between an input pixel x(t) and a reference pixel r(t−1). For instance, the input pixel x(t), with the variable “t” denoting a temporal value, may be compared to the reference pixel r(t−1) in a previously filtered frame or a previous original frame to determine the motion data associated with the input pixel. In one embodiment, the motion data may be used to generate a motion table index value (m) that corresponds to a motion table (M). The motion table (M) may contain the filter coefficients that may be used to generate the filtered pixel output (Yout). In one embodiment, the motion table (M) may be indexed according to motion data (e.g., motion table index value) and a brightness value of a pixel. As such, the temporal filter block 1028 may retrieve filter coefficients from the motion table (M) and apply the filter coefficients to the pixel data to generate filtered pixel output (Yout). The process for generating filtered pixel output (Yout) employed by the temporal filter block 1028 is described in greater detail below with reference to FIGS. 95-98.

In one embodiment, the motion table (M) may generally be oriented such that pixels exhibiting high motion values may have coefficient values equal to 0. As such, the motion table (M) may set a maximum motion value as the first motion value that has a 0 coefficient value. The motion table (M) may then divide the number of entries in the table by the maximum motion value to determine the filter coefficient for each entry in the motion table (M).

Figure 95:
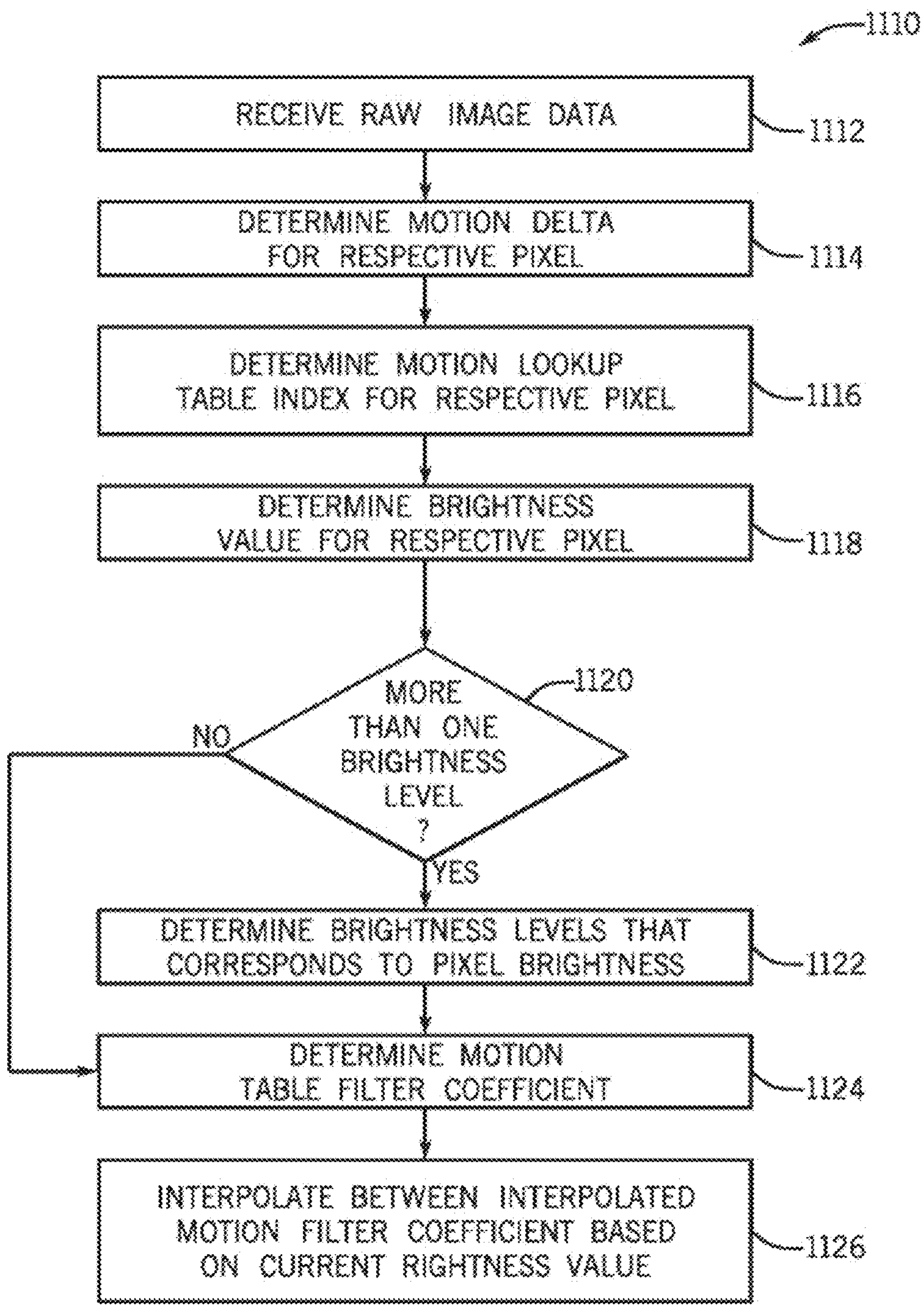
FIG. 95 is a flow diagram illustrating an embodiment of a temporal filtering process performed by the raw processor block shown in FIG. 91, in accordance with an embodiment.

Referring to FIG. 95, a flow diagram of a method 1110 for temporally filtering the image data received by the temporal filter block 1028 is illustrated. Although the method 1110 indicates a particular order of operation, it should be understood that the method 1110 is not limited to the illustrated order. Instead, the method 1110 may be performed in any suitable order. In one embodiment, the method 1110 may be performed by the temporal filter block 1028 of FIG. 91.

At block 1112, the temporal filter 1028 may receive image data. At block 1114, the temporal filter block 1028 may determine a motion delta value for each respective pixel in the image data. The motion delta value may represent the amount of motion occurring in a respective pixel between frames. The motion delta value may be determined by calculating the difference between a pixel value for the respective pixel in a respective frame and a pixel value for the respective pixel in its previous frame. By comparing these two time dependent pixel values, the temporal filter block 1028 may represent the amount of motion occurring in the respective pixel in the motion delta value.

In one embodiment, the motion delta d(j,i,t) may be computed by determining the maximum of three absolute deltas between original and reference pixels for three horizontally collocated pixels of the same color, as demonstrated in the formula below:

$$d(j,i,t)=\max3[\mathrm{abs}(x(j,i-2,t)-r(j,i-2,t)),$$

$$(\mathrm{abs}(x(j,t,t)-r(j,i,t)),$$

$$(\mathrm{abs}(x(j,i+2,t)-r(j,i+2,t))]$$

where x(j, i, t) corresponds to the pixel value of a pixel, j corresponds to the vertical position of the pixel, i corresponds to the horizontal position of the pixel, t corresponds to time.

By determining the maximum of the three absolute deltas between original and reference pixels for three horizontally collocated pixels of the same color, the temporal filter block 1028 may more accurately represent the motion in the respective pixel with respect to the three horizontally collocated pixels of the same color.

To calculate the motion delta d(j,i,t) for the respective pixel, the temporal filter block 1028 may first receive data regarding a spatial location of the respective pixel. The temporal filter block 1028 may then identify the reference pixel from a previous frame (collocated reference pixel) based on the spatial location of the respective pixel. For instance, referring briefly to FIG. 96, the spatial locations of three reference pixels 1130, 1132, and 1134 that are collocated with original input pixels 1136, 1138, and 1140 are illustrated. As shown in FIG. 96, the collocated reference pixels 1130, 1132, and 1134 are located in the same spatial position as original input pixels 1136, 1138, and 1140. However, the reference pixels 1130, 1132, and 1134 are located in a previous frame in time as indicated by "t−1," where t represents the current frame in time.

In one embodiment, instead of using three collocated horizontal pixels, the temporal filter block 1028 may calculate the motion delta d(j,i,t) for the respective pixel by determining the maximum of absolute deltas between original and reference pixels for N×N collocated pixels of the same color. For instance, the temporal filter block 1029 may determine the absolute delta between the original pixel values and the reference pixel values for 3×3 or 5×5 collocated pixels of the same color.

After calculating the motion delta d(j,i,t), the temporal filter block 1028 may use the motion delta d(j,i,t) to determine a filter coefficient to be applied to the pixel value x(j,i,t). As mentioned above, when pixel motion is high, the filtering strength (i.e., filter coefficient) may be reduced in order to avoid the appearance of "trailing" or "ghosting artifacts" in the resulting processed image. In one embodiment, the temporal filter block 1028 may determine the filter coefficient for a respective pixel using a motion table (M). The motion table (M) may include a number of filter coefficients (K) which may be predetermined based on a noise variance for different brightness values of a pixel. In one embodiment, the motion table (M) may be indexed according to a motion table lookup index (m) and a brightness value (b) for the respective pixel as shown below.

$$M[b][m]$$

where b corresponds to a brightness value of a pixel and m corresponds to a motion table lookup index for the pixel.

The motion table lookup index (m) may represent a motion for the respective pixel.

As such, the motion table lookup index (m) may be determined based on the motion delta d(j,i,t) and a motion history value (i.e., motion delta d(j,i,t−1) of the reference pixel at time t−1) for the respective pixel. Keeping this in mind, at block 1116, the temporal filter block 1028 may determine the motion table lookup index (m) for the respective pixel. In one embodiment, the motion lookup index lookup (m) and the motion history output h(t) may be determined using the following formulas:

$$m=\mathrm{gain\_rad}*\mathrm{gain}[\mathrm{comp}]*(d(j,i,t)+h(j,i,t-1))$$

$$h(j,i,t)=d(j,i,t)+K*(h(j,i,t-1)-d(j,i,t))$$

where gain_rad is a radial gain lookup table interpolation function that performs a linear interpolation between a radial gain table and a radius of an optical center of a pixel, K is a filter coefficient from the motion table M, d(j,i,t) corresponds to the motion delta value for a pixel at time t, h(j,i,t−1) corresponds to the motion delta value for a pixel at time t−1, and gain[comp] corresponds to a gain associated with the color of the pixel.

In addition to the motion table lookup index (m), the motion table (M) may be indexed according to a brightness value (b) for the respective pixel. As mentioned above, as image brightness increases, filtering artifacts may become more noticeable to the human eye. Thus, the filter coefficients (K) in the motion table (M) may be indexed such that the filter coefficients (K) may decrease as the brightness value of the pixel increases. In one embodiment, the motion table (M) may be set to a number of brightness levels such that each brightness level may be defined as a percentage of a maximum brightness value. In this manner, the filter coefficients (K) may be adjusted based on the brightness level of the pixel.

In one embodiment, the brightness level adjusted filter coefficients (K) may be represented in the motion table (M) by setting the motion table (M) to multiple brightness levels.

That is, multiple motion tables may be used to represent the motion table (M) for each brightness level such that each of the multiple motion table may include filter coefficients (K) adjusted according to the brightness level of the pixel. For instance, the motion table (M) may be set to three brightness levels such that each of the three brightness levels may be associated with a respective motion table (e.g., motion table (M1), (M2), and (M3)). Each respective motion table may include 65 entries. The three brightness levels may correspond to 0% of the maximum brightness value for the respective pixel, 50% of the maximum brightness value for the respective pixel, and 100% of the maximum brightness value for the respective pixel.

Alternatively, the motion table (M) may be set to five brightness levels (e.g., motion table (M1), (M2), (M3), (M4), and (M5)) such that each motion table may include 65 entries. The five brightness levels may correspond to 0% of the maximum brightness value for the respective pixel, 25% of the maximum brightness value for the respective pixel, 50% of the maximum brightness value for the respective pixel, 75% of the maximum brightness value for the respective pixel, and 100% of the maximum brightness value for the respective pixel. FIG. 12A and FIG. 12B illustrate the three brightness level and five brightness level embodiments described above.

Although the motion table (M) has been described as being set to multiple brightness levels, it should be noted that in one embodiment the motion table (M) may be set to just one brightness level. In this case, the motion table (M) may be a one-dimensional table with 257 entries that may be stored in a corresponding memory.

Keeping the foregoing in mind, at block 1118, the temporal filter block 1028 may determine a brightness value of the respective pixel. At block 1120, the temporal filter block 1028 may determine whether the motion table (M) is set to more than one brightness level. If the motion table (M) is set to one brightness level, the temporal filter block 1028 may proceed to block 1124. If, however, the motion table (M) is set to more than one brightness level, the temporal filter block 1028 may proceed to block 1122.

When the motion table is set to one brightness level, at block 1124, the temporal filter block 1028 may determine a motion table filter coefficient (e.g., K) based on the single motion table (M) and the motion table lookup index (m) of the respective pixel. The process for determining the motion table filter coefficient (K) is described in greater detail below with reference to FIG. 98, which describes a method 1150 for determining a motion table filter coefficient (K) for the respective pixel.

Figure 98:
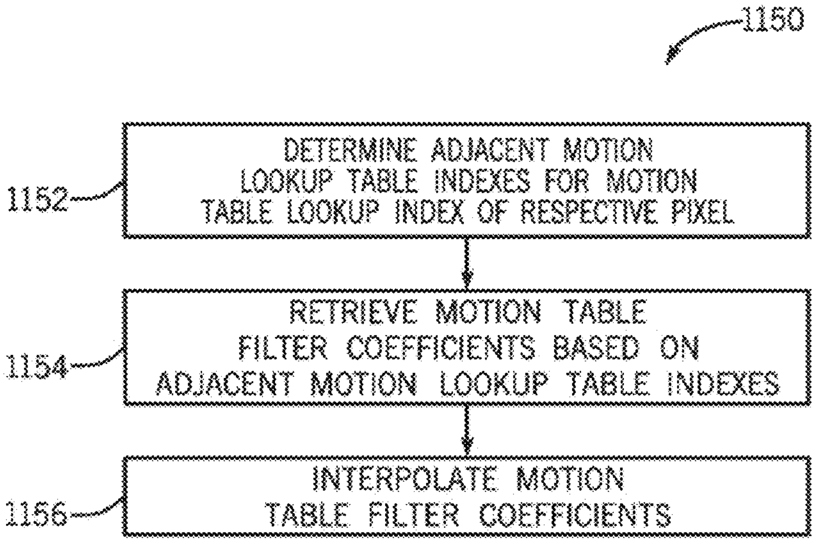
FIG. 98 is a flow diagram illustrating a more detailed description of a block in the flow diagram of FIG. 10, in accordance with one embodiment.

Referring to FIG. 98, at block 1152, the temporal filter block 1028 may identify at least two motion table lookup indexes (e.g., m1 and m2) for the motion table (M). The two identified motion table lookup indexes (m1 and m2) for the motion table (M) may correspond to two motion table lookup indexes that are adjacent to (e.g., above and below) the motion table lookup index (m) for the respective pixel determined at block 1116. Here, the temporal filter block 1028 may identify at least two motion table lookup indexes (e.g., m1 and m2) for the motion table (M) because the motion table (M) may not have an index value that exactly matches the motion table lookup index (m) determined at block 1116. By identifying the at least two motion table lookup indexes (e.g., m1 and m2) adjacent to the motion table lookup index (m), the temporal filter block 1028 may be able to interpolate a filter coefficient value that corresponds to the motion table lookup index (m) using the filter coefficient values for the two motion table lookup indexes (e.g., m1 and m2). In this manner, the temporal filter block 1028 may determine a filter coefficient that may most effectively filter the respective pixel.

Keeping this mind, at block 1154, the temporal filter block 1028 may use the two adjacent motion table lookup indexes (m1 and m2) and retrieve two motion table filter coefficients (e.g., K1 and K2) from the motion table (M). In one embodiment, the motion table filter coefficients may be determined based on the following equation:

$$K=M[b][m]=M[x(j,i,t)][\text{gain\_rad}*\text{gain[comp]}*(d(j,i,t)+h(j,i,t-1))]$$

where b, m, x(j,i,t), gain_rad, gain[comp], d(j,i,t), and h(j,i,t−1) are the same as defined above.

At block 1156, the temporal filter block 1028 may linearly interpolate the two motion table filter coefficients (e.g., K1 and K2) retrieved from the motion table (M) to determine an interpolated motion table filter coefficient (K3).

Referring back to FIG. 95, at block 1126, the temporal filter block 1028 may linearly interpolate the interpolated motion table filter coefficient (K3) with the brightness value (b) of the respective pixel (from block 1118) to determine a final filter coefficient (e.g., K) for the respective pixel.

Referring back to block 1120, if the motion table (M) is set to more than one brightness level, the temporal filter block 1028 may proceed to block 1122. At block 1122, the temporal filter block 1028 may identify at least two brightness levels (e.g., brightness levels 1 & 2) that are adjacent to the brightness value (b) for the respective pixel. As such, the temporal filter block 1028 may identify two brightness levels that correspond to a brightness level above and below the brightness value of the respective pixel. Here, the temporal filter block 1028 may identify the two brightness levels above and below the brightness value of the respective pixel because none of the brightness levels may exactly matches the brightness value of the pixel. By identifying the two brightness levels above and below the brightness value of the respective pixel, the temporal filter block 1028 may be able to interpolate a filter coefficient value for the respective pixel that account for the brightness value of the respective pixel.

After identifying the two brightness levels adjacent to the brightness value of the respective pixel, at block 1124, the temporal filter block 1028 may determine two motion table filter coefficients (e.g., K1 & K2) that correspond to the two motion tables (e.g., motion table 1 & 2) associated with the two identified brightness levels (e.g., brightness level 1 & 2). As mentioned above, the process for determining the motion table filter coefficients is described in greater detail with reference to FIG. 98.

Referring again to FIG. 98, at block 1152, the temporal filter block 1028 may first identify at least two motion table lookup indexes for each motion table associated with two brightness levels (e.g., index 1 and 2 for motion table 1; index 3 and 4 for motion table 2). The two identified motion table lookup indexes for each motion table may correspond to motion table lookup indexes that are adjacent to (e.g., above and below) the motion table lookup index (m) for the respective pixel. As mentioned above, by identifying the two motion table lookup indexes for each motion table associated with two brightness levels (e.g., index 1 and 2 for motion table 1; index 3 and 4 for motion table 2), the temporal filter block 1028 may be able to interpolate a filter coefficient value for each brightness level even though each motion table may not have an index value that exactly matches the motion table lookup index (m) determined at block 1116.

Keeping this in mind, at block 1154, the temporal filter block 1028 may retrieve two motion table filter coefficients from each motion table (e.g., K3 & K4 from motion table 1, K5 & K6 from motion table 2) using the two adjacent motion table lookup indexes (e.g., index 1 and 2 for motion table 1; index 3 and 4 for motion table 2). In one embodiment, the motion table filter coefficients may be determined based the equations listed above.

At block 1156, the temporal filter block 1028 may linearly interpolate the two motion table filter coefficients from each motion table (K3 & K4 from motion table 1, K5 & K6 from motion table 2) to determine an interpolated motion table filter coefficient that most closely corresponds to a filter coefficient that may have been retrieved from the motion tables (motion table 1 & 2) using the motion table lookup index (m) determined at block 1116.

Referring back to FIG. 95, at block 1126, the temporal filter block 1028 may linearly interpolate the two interpolated motion table filter coefficients (K1 and K2) determined at block 1124 with the brightness value (b) of the respective pixel determined at block 1118. As a result, the temporal filter block 1028 may determine a final filter coefficient (e.g., K) for the respective pixel that has been adjusted to account for the motion occurring within the respective pixel and the brightness value of the pixel. That is, since noise variance changes with the brightness and motion values of a pixel, the temporal filter block 1028 may modify the filtering strength (filter coefficient) to account for motion occurring within a pixel and a brightness value of the pixel, thereby avoiding trailing or ghosting artifacts from being displayed in the image.

Figure 99:
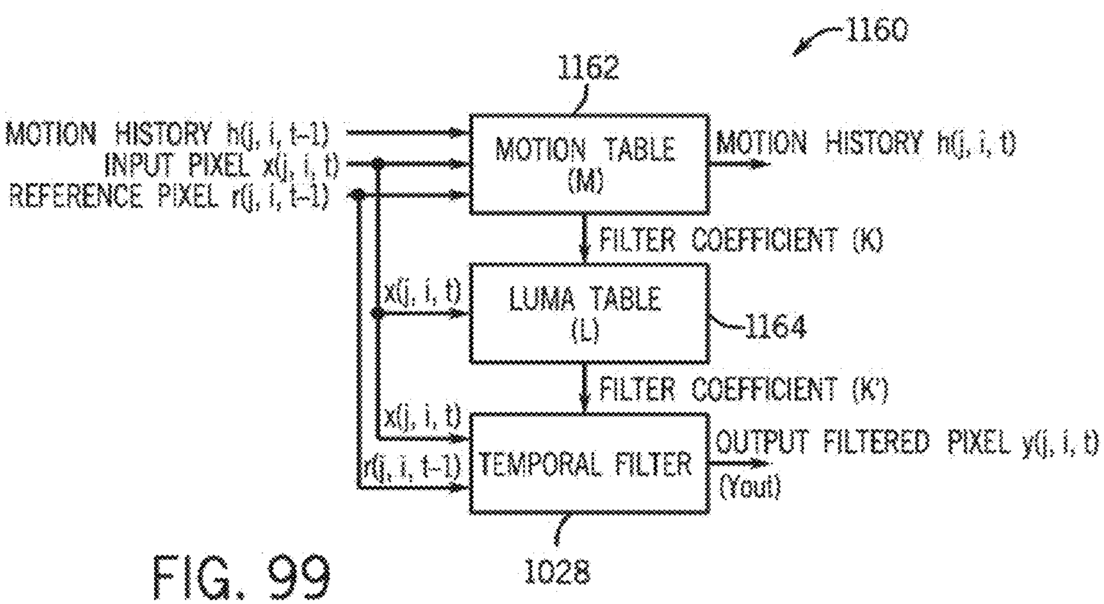
FIG. 99 is a process diagram illustrating how temporal filtering may be applied to image pixel data received by the raw processor shown in FIG. 91, in accordance with one embodiment.

In addition to the processes described above with reference to FIG. 95 and FIG. 98, additional temporal filtering steps may be performed to further remove noise from the image data received by the temporal filter block 1028. This noise, however, may not be related to the motion occurring within a pixel. For instance, FIG. 99 illustrates a process diagram depicting a temporal filtering process 1160 that may be performed within the temporal filter block 1028. As shown in process 1160, the temporal filter block 1028 may include a 2-tap filter such that its filter coefficients may be adjusted adaptively on a per pixel basis based at least partially upon motion and brightness data. In one embodiment, temporal filter block 1028 may perform the processes described above with reference to FIG. 95 and FIG. 98 in a first tap of the temporal filtering process 1160 (the motion table 1162). As shown in FIG. 99, the temporal filter block 1028 may output a motion history value h(t) and a filter coefficient (K) for each pixel in the raw image data from the motion table 1162.

In one embodiment, after determining the filter coefficient (K) from the motion table 1162, the temporal filter block 1028 may use the brightness value (b) of the respective pixel x(j,i,t) to generate a luma table lookup index (1) in a luma table (L) 1164. As mentioned above, as image brightness increases, filtering artifacts may become more noticeable to the human eye. Thus, the filtering strength may be further reduced when a pixel has a high level of brightness. In one embodiment, the luma table (L) may contain attenuation factors that between 0 and 1 that may be used to account for the brightness of the image without regard to the motion occurring within the image. In one embodiment, the attenuation factors from the luma table (L) may be selected based upon the luma table lookup index (1).

As such, a second filter coefficient, K', may be calculated by multiplying the first filter coefficient (K) by the luma attenuation factor, as shown in the following equation:

$$K'=K\times L[\text{gain\_rad}*\text{gain}[\text{comp}]*x(j,i,t)]$$

The determined value for K' may then be used as the filtering coefficient by the temporal filter block 1028. As such, the temporal filter block 1028 may account for the motion of each pixel of the image with reference to its brightness value and may account for the brightness value of each pixel of the image independent of its motion value. In one embodiment, the temporal filter block 1028 may be an infinite impulse response (IR) filter using previous filtered frame or as a finite impulse response (FIR) filter using previous original frame. The temporal filter block 1028 may compute the filtered output pixel (Yout) using the current input pixel x(t), the reference pixel r(t−1), and the filter coefficient K' using the following formula:

$$y(j,i,t)=x(j,i,t)+K'(r(j,i,t-1)-x(j,i,t))$$

The temporal filtering process 1160 shown in FIG. 99 may be performed on a pixel-by-pixel basis. In one embodiment, the same motion table (M) and luma table (L) may be used for all color components (e.g., R, G, and B).

Defective Pixel Correction (DPC)

Referring back to FIG. 91, the output of the temporal filter block 1028 is subsequently forwarded to the defective pixel correction logic 1030. In one embodiment, the temporal filter block 1028 may forward signed 17-bit data to the defective pixel detection and correction (DPC) logic 1030 which may be capable of operating on signed pixels. As discussed above with reference to FIG. 48 (DPR logic 474), defective pixels may attributable to a number of factors, and may include “hot” (or leaky) pixels, “stuck” pixels, and “dead pixels, wherein hot pixels exhibit a higher than normal charge leakage relative to non-defective pixels, and thus may appear brighter than non-defective pixel, and wherein a stuck pixel appears as always being on (e.g., fully charged) and thus appears brighter, whereas a dead pixel appears as always being off. As such, it may be desirable to have a pixel detection scheme that is robust enough to identify and address different types of failure scenarios. Particularly, when compared to the DPR logic 474, which may provide only dynamic defect detection/correction, the DPC logic 1030 may provide for fixed or static defect detection/correction, dynamic defect detection/correction, as well as speckle removal.

In accordance with embodiments of the presently disclosed techniques, defective pixel correction/detection performed by the DPC logic 1030 may occur independently for each color component (e.g., R, B, Gr, and Gb), and may include various operations for detecting defective pixels, as well as for correcting the detected defective pixels. For instance, in one embodiment, the defective pixel detection operations may provide for the detection of static defects, dynamics defects, as well as the detection of speckle, which may refer to the electrical interferences or noise (e.g., photon noise) that may be present in the imaging sensor. By analogy, speckle may appear on an image as seemingly random noise artifacts, similar to the manner in which static may appear on a display, such as a television display. Further, as noted above, dynamic defection correction is regarded as being dynamic in the sense that the characterization of a pixel as being defective at a given time may depend on the image data in the neighboring pixels. For example, a stuck pixel that is always on maximum brightness may not be regarded as a defective pixel if the location of the stuck pixel is in an area of the current image that is dominate by bright white colors. Conversely, if the stuck pixel is in a region of the current image that is dominated by black or darker colors, then the stuck pixel may be identified as a defective pixel during processing by the DPC logic 1030 and corrected accordingly.

With regard to static defect detection, the location of each pixel is compared to a static defect table, which may store data corresponding to the location of pixels that are known to be defective. For instance, in one embodiment, the DPC logic 1030 may monitor the detection of defective pixels (e.g., using a counter mechanism or register) and, if a particular pixel is observed as repeatedly failing, the location of that pixel is stored into the static defect table. Thus, during static defect detection, if it is determined that the location of the current pixel is in the static defect table, then the current pixel is identified as being a defective pixel, and a replacement value is determined and temporarily stored. In one embodiment, the replacement value may be the value of the previous pixel (based on scan order) of the same color component. The replacement value may be used to correct the static defect during dynamic/speckle defect detection and correction, as will be discussed below. Additionally, if the previous pixel is outside of the raw frame 308 (FIG. 21), then its value is not used, and the static defect may be corrected during the dynamic defect correction process. Further, due to memory considerations, the static defect table may store a finite number of location entries. For instance, in one embodiment, the static defect table may be implemented as a FIFO queue configured to store a total of 16 locations for every two lines of image data. The locations in defined in the static defect table will, nonetheless, be corrected using a previous pixel replacement value (rather than via the dynamic defect detection process discussed below). As mentioned above, embodiments of the present technique may also provide for updating the static defect table intermittently over time.

Embodiments may provide for the static defect table to be implemented in on-chip memory or off-chip memory. As may be appreciated, using an on-chip implementation may increase overall chip area/size, while using an off-chip implementation may reduce chip area/size, but increase memory bandwidth requirements. Thus, it should be understood that the static defect table may be implemented either on-chip or off-chip depending on specific implementation requirements, i.e., the total number of pixels that are to be stored within the static defect table.

The dynamic defect and speckle detection processes may be time-shifted with respect to the static defect detection process discussed above. For instance, in one embodiment, the dynamic defect and speckle detection process may begin after the static defect detection process has analyzed two scan lines (e.g., rows) of pixels. As can be appreciated, this allows for the identification of static defects and their respective replacement values to be determined before dynamic/speckle detection occurs. For example, during the dynamic/speckle detection process, if the current pixel was previously marked as being a static defect, rather than applying dynamic/speckle detection operations, the static defect is simply corrected using the previously assessed replacement value.

With regard to dynamic defect and speckle detection, these processes may occur sequentially or in parallel. The dynamic defect and speckle detection and correction that is performed by the DPC logic 1030 may rely on adaptive edge detection using pixel-to-pixel direction gradients. In one embodiment, the DPC logic 1030 may select the eight immediate neighbors of the current pixel having the same color component that are within the raw frame 308 (FIG. 21) are used. In other words, the current pixels and its eight immediate neighbors P0, P1, P2, P3, P4, P5, P6, and P7 may form a 3×3 area, as shown below in FIG. 63.

Figure 100:
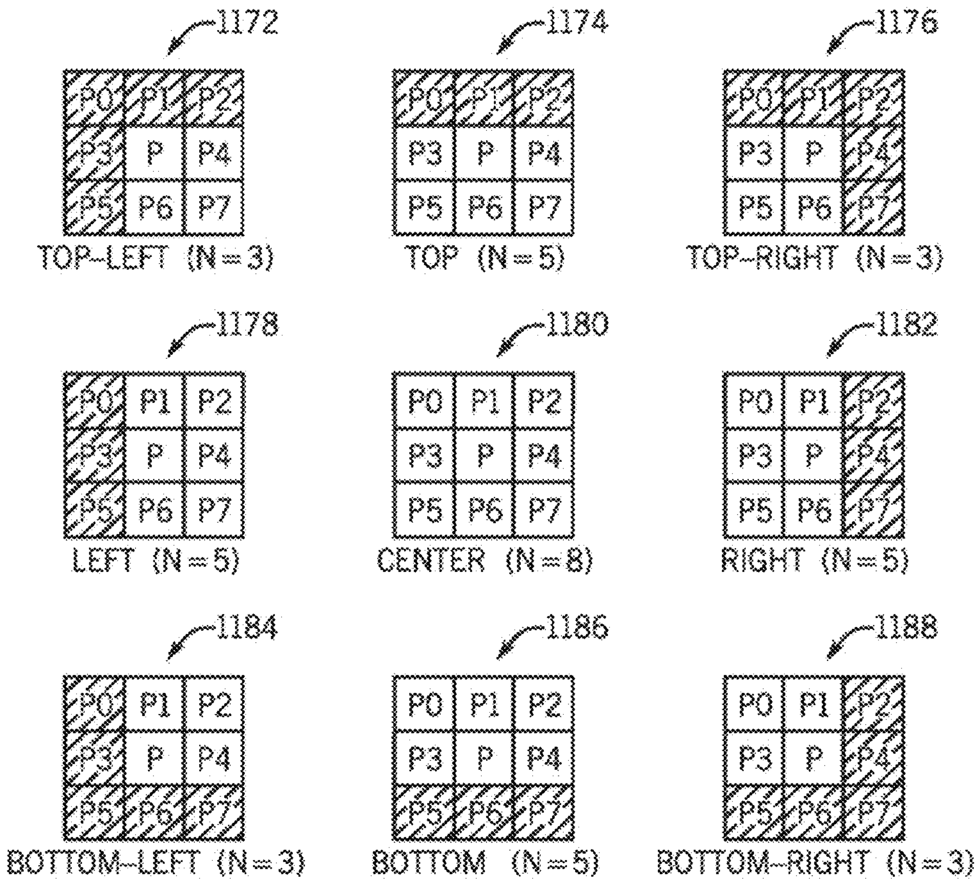
FIG. 100 shows various image frame boundary cases that may be considered when applying techniques for detecting and correcting defective pixels during processing by the raw processing block shown in FIG. 91, in accordance with an embodiment.

It should be noted, however, that depending on the location of the current pixel P, pixels outside the raw frame 310 are not considered when calculating pixel-to-pixel gradients. For example, with regard to the "top-left" case 1172 shown in FIG. 100, the current pixel P is at the top-left corner of the raw frame 308 and, thus, the neighboring pixels P0, P1, P2, P3, and P5 outside of the raw frame 308 are not considered, leaving only the pixels P4, P6, and P7 (N=3). In the "top" case 1174, the current pixel P is at the top-most edge of the raw frame 308 and, thus, the neighboring pixels P0, P1, and P2 outside of the raw frame 308 are not considered, leaving only the pixels P3, P4, P5, P6, and P7 (N=5). Next, in the "top-right" case 1176, the current pixel P is at the top-right corner of the raw frame 308 and, thus, the neighboring pixels P0, P1, P2, P4, and P7 outside of the raw frame 308 are not considered, leaving only the pixels P3, P5, and P6 (N=3). In the "left" case 1178, the current pixel P is at the left-most edge of the raw frame 308 and, thus, the neighboring pixels P0, P3, and P5 outside of the raw frame 308 are not considered, leaving only the pixels P1, P2, P4, P6, and P7 (N=5).

In the "center" case 1180, all pixels P0-P7 lie within the raw frame 308 and are thus used in determining the pixel-to-pixel gradients (N=8). In the "right" case 1182, the current pixel P is at the right-most edge of the raw frame 308 and, thus, the neighboring pixels P2, P4, and P7 outside of the raw frame 308 are not considered, leaving only the pixels P0, P1, P3, P5, and P6 (N=5). Additionally, in the "bottom-left" case 1184, the current pixel P is at the bottom-left corner of the raw frame 308 and, thus, the neighboring pixels P0, P3, P5, P6, and P7 outside of the raw frame 308 are not considered, leaving only the pixels P1, P2, and P4 (N=3). In the "bottom" case 1186, the current pixel P is at the bottom-most edge of the raw frame 308 and, thus, the neighboring pixels P5, P6, and P7 outside of the raw frame 308 are not considered, leaving only the pixels P0, P1, P2, P3, and P4 (N=5). Finally, in the "bottom-right" case 1188, the current pixel P is at the bottom-right corner of the raw frame 308 and, thus, the neighboring pixels P2, P4, P5, P6, and P7 outside of the raw frame 308 are not considered, leaving only the pixels P0, P1, and P3 (N=3).

In one embodiment, the DPC logic 1030 may correct for defective pixels from the bottom-left part of the image to the top-right part of the image. As such, when a pixel being evaluated is not at the boundaries of the raw frame 308, neighboring pixels P0.about.P4 may not have been corrected by the DPC logic 1030, while the defects in the neighboring pixels P5-P7 may have been corrected (if any defects were present). In another embodiment, when a pixel being evaluated is at the top edge, pixel P0 may be uncorrected and instead pixel P3 may be replicated in the place of pixel P0. Similarly, when a pixel being evaluated is at the bottom edge, pixel P5 may be uncorrected and instead P3 may be replicated in its place.

Thus, depending upon the position of the current pixel P, the number of pixels used in determining the pixel-to-pixel gradients may be 3, 5, or 8. In the illustrated embodiment, for each neighboring pixel (k=0 to 7) within the picture boundary (e.g., raw frame 308), the pixel-to-pixel gradients may be calculated as follows:

$G_k=\text{abs}(P-P_k)$, for $0\le k\le 7$ (only for $k$ within the raw frame)

where the value for each pixel (k=0 to 7) is a 17-bit signed value. An average gradient, $G_{av}$, may be calculated as the difference between the current pixel and the average, $P_{av}$, of its surrounding pixels, as shown by the equations below:

$$P_{av}=\frac{\left(\sum_k^N P_k\right)}{N},$$

wherein N=3, 5, or 8 (depending on pixel position)

$G_{av}=\text{abs}(P-P_{av})$

The pixel-to-pixel gradient values may be used in determining a dynamic defect case, and the average of the neighboring pixels may be used in identifying speckle cases, as discussed further below.

In one embodiment, the average pixel value, $P_{av}$, of the neighboring pixels may account for neighboring defective pixels by the excluding the minimum and maximum values of the neighboring pixels (K=0 to 7) when determining the average pixel value, $P_{av}$. In this manner, a defective pixel is assumed to correspond to either the minimum and/or maximum pixel value among the surrounding neighbor pixels (P0 . . . P7). By excluding the minimum and maximum pixel values from the computation of the average pixel value, $P_{av}$, the average pixel value, $P_{av}$, may account for the defective neighboring pixels and may be more robust for processing. In the illustrated embodiment of FIG. 100, for each neighboring pixel (k=0 to 7) within the picture boundary (e.g., raw frame 308), the average pixel value, $P_{av}$, may be calculated as follows:

$P_{min}$=min (Pk)

$P_{max}$=max (Pk)

$P_{av}$=(P0+P1+P2+P3+P4+P5+P6+P7−Pmax−Pmin)/6

In one embodiment, dynamic defect detection may be performed by the DPC logic 1030 as follows. First, it is assumed that a pixel is defective if a certain number of the gradients $G_k$ are at or below a particular threshold, denoted by the variable defect_thd (dynamic defect threshold). Thus, for each pixel, a count (C) of the number of gradients for neighboring pixels inside the picture boundaries that are at or below the threshold defect_thd is accumulated. The threshold defect_thd may be a combination of a fixed threshold component and a dynamic threshold component that may depend on the "activity" present the surrounding pixels. For instance, in one embodiment, the dynamic threshold component for defect_thd may be determined by calculating a high frequency component value $P_{hf}$ based upon summing the absolute difference between the average pixel values $P_{av}$, and each neighboring pixel, as illustrated below:

$$P_{hf}=\frac{8}{N}\sum_k^N \text{abs}(P_{av}-P_k)$$

wherein N=3, 5, or 8

In instances where the pixel is located at an image corner (N=3) or at an image edge (N=5), the $P_{hf}$ may be multiplied by the 8/3 or 8/5, respectively. As can be appreciated, this ensures that the high frequency component $P_{hf}$ is normalized based on eight neighboring pixels (N=8).

Once $P_{hf}$ is determined, the dynamic defect detection threshold defect_thd may be computed for each color component based on the average pixel value $P_{av}$ and the high frequency component $P_{hf}$. More specifically, the dynamic defect detection threshold defect_thd may be determined by first identifying two brightness levels (x0 and x1) that are above and below the average pixel value $P_{av}$. In one embodiment, five equally spaced brightness levels may be defined between 0 and 2^16. As such, the brightness value may be represented by a 16-bit value between 0 and 65,536, which may correspond to a signed 17-bit pixel value. Accordingly, each brightness level may include 16,384 values such that each pixel value may fit within one of the brightness levels. Further, each brightness level may be denoted a brightness value (x_val) that corresponds to a multiple of 16,384 (16,384*i where i=0, 1, 2, 3, 4).

In one embodiment, a defect threshold array (defect_thd) may be defined for each brightness level. After identifying the two brightness levels (x0 and x1) that are above and below the average pixel value $P_{av}$, two defect threshold values (defect_thd0 and defect_thd1) that may be used to determine the dynamic defect detection threshold defect_thd may be calculated as follows:

tmp0=dpc_thd0[c][x0];

tmp1=dpc_thd0[c][x1];

defect_thd0=(((tmp0*(x1_val−Pav))+((tmp1*(Pav−x0_val))+8192)/16384;

tmp0=dpc_thd1[c][x0];

tmp1=dpc_thd1[c][x1];

defect_thd1=(((tmp0*(x1_val−$P_{av}$))+((tmp1*($P_{av}$−x0_val))+8192)/16384;

where tmp0 and tmp1 are temporary values; dpc_thd0[c][x0], dpc_thd0[c][x1], dpc_thd1[c][x0], dpc_thd1 [c][x1] are data arrays associated with each identified brightness level such that the data arrays include defect detection threshold values indexed according to color component (c) and brightness level (x0/x1), and x1_val and x2_val are brightness values associated with each of the identified brightness level.

In one embodiment, the dynamic defect detection threshold defect_thd may be determined by interpolating the two defect threshold values (defect_thd0 and defect_thd1) as follows:

defect_thd=defect_thd0+(defect_thd1*Phf+2048)/4096

In another embodiment, the dynamic defect detection threshold defect_thd may be determined by as a max between the defect threshold value defect_thd0 and the defect threshold value defect_thd1*$P_{hf}$/4096 as shown below:

defect_thd=max (defect_thd0, (defect_thd1*Phf+2048)/4096)

As mentioned above, for each pixel, a count C of the number of gradients for neighboring pixels inside the picture boundaries that are at or below the threshold defect_thd is determined. For instance, for each neighboring pixel within the raw frame 308, the accumulated count C of the gradients $G_k$ that are at or below the threshold defect_thd may be computed as follows:

$$C=\sum_k^N (G_k\le \text{defect\_thd}),$$

for 0≤k≤7 (only for k within the raw frame)

Next, if the accumulated count C is determined to be less than or equal to a maximum count, denoted by the variable defect_max, then the pixel may be considered as a dynamic defect. In one embodiment, different values for defect_max may be provided for N=3 (corner), N=5 (edge), and N=8 conditions. This logic is expressed below:

if (C≤defect_max), then the current pixel P is defective.

As mentioned above, the location of defective pixels may be stored into the static defect table. In some embodiments, the minimum gradient value ($\min(G_k)$) calculated during dynamic defect detection for the current pixel may be stored and may be used to sort the defective pixels, such that a greater minimum gradient value indicates a greater "severity" of a defect and should be corrected during pixel correction before less severe defects are corrected. In one embodiment, a pixel may need to be processed over multiple imaging frames before being stored into the static defect table, such as by filtering the locations of defective pixels over time. In the latter embodiment, the location of the defective pixel may be stored into the static defect table only if the defect appears in a particular number of consecutive images at the same location. Further, in some embodiments, the static defect table may be configured to sort the stored defective pixel locations based upon the minimum gradient values. For instance, the highest minimum gradient value may indicate a defect of greater "severity." By ordering the locations in this manner, the priority of static defect correction may be set, such that the most severe or important defects are corrected first. Additionally, the static defect table may be updated over time to include newly detected static defects, and ordering them accordingly based on their respective minimum gradient values.

Speckle detection, which may occur in parallel with the dynamic defect detection process described above, may be performed by determining if the value $G_{av}$ (Equation 52b) is above a speckle detection threshold despeckle_thd. Like the dynamic defect threshold defect_thd, the speckle threshold despeckle_thd may also include fixed and dynamic components, referred to by despeckle_thd0 and despeckle_thd1, respectively. In general, the fixed and dynamic components despeckle_thd0 and despeckle_thd1 may be set more "aggressively" compared to the defect_thd0 and defect_thd1 values, in order to avoid falsely detecting speckle in areas of the image that may be more heavily textured and others, such as text, foliage, certain fabric patterns, etc. Accordingly, in one embodiment, the dynamic speckle threshold component despeckle_thd1 may be increased for high-texture areas of the image, and decreased for "flatter" or more uniform areas.

In one embodiment, the speckle detection threshold despeckle_thd may be computed similar to how the dynamic defect detection threshold defect_thd is computed as described above. As such, a despeckle threshold array (dpc_desp_thd) may be defined for each brightness level. After identifying the two brightness levels (x0 and x1) that are above and below the average pixel value $P_{av}$, two despeckle threshold values (dpc_desp_thd0 and dpc_desp_thd1) used to determine the speckle detection threshold despeckle_thd may be determined as follows:

tmp0=dpc_desp_thd0[c][x0];

tmp1=dpc_desp_thd0[c][x1];

despeckle_thd0=(((tmp0*(x1_val−$P_{av}$))+((tmp1*($P_{av}$−x0_val))+8192)/16384;

tmp0=dpc_desp_thd1[c][x0];

tmp1=dpc_desp_thd1[c][x1];

despeckle_thd1=(((tmp0*(x1_val−$P_{av}$))+((tmp1*($P_{av}$−x0_val))+8192)/16384;

where tmp0 and tmp1 are temporary values; dpc_desp_thd0[c][x0], dpc_desp_thd0[c][x1], dpc_desp_thd1 [c][x0], dpc_desp_thd1[c][x1] are data arrays associated with each identified brightness level such that the data arrays include defect detection threshold values indexed according to color component (c) and brightness level (x0/x1), and x1_val and x2_val are brightness values associated with each of the identifsamied brightness level.

In one embodiment, the speckle detection threshold despeckle_thd may be determined by interpolating the two speckle detection threshold values (despeckle_thd0 and despeckle_thd1) as follows:

despeckle_thd=despeckle_thd0+(despeckle_thd1*$P_{hf}$+2048)/4096

In another embodiment, the speckle detection threshold despeckle_thd may be determined by as a max between the speckle threshold value despeckle_thd0 and the speckle threshold value despeckle_thd1*$P_{hf}$/4096 as shown below:

despeckle_thd=max (despeckle_thd0, (despeckle_thd1*P+2048)/4096)

The detection of speckle may then be determined in accordance with the following expression:

if ($G_{av}$>despeckle_thd), then the current pixel P is speckled.

Once defective pixels have been identified, the DPC logic 1030 may store the locations of the defective pixels to the memory 100. The DPC logic 1030 may then use the stored locations of the defective pixels to determine the static defect table. The DPC logic 1030 may maintain a counter that specifies a maximum number of defective pixels written into the memory 100 (dpc dynamic max). In one embodiment, the DPC logic 1030 may store each location of the defective pixel in the memory 100 as a 32-bit word. The 32-bit word may include bits 0-11 that represent the column number, bits 12-23 that represent the row number, and bits 24-31 that represent either a scaled version of the minimum gradient value (i.e., min(Gk)) or a scaled version of the defective pixel value before correction. In one embodiment, the DPC logic 1030 may use the scaled version of the defective pixel value before correction if specified by a user (e.g., if variable DynamicDMAOutPixelEn is set to 1). When Gmin is selected for bits 24-31, since only 8 bits are available, the DPC logic 1030 may shift Gmin by some amount (e.g., GminShift).

In one embodiment, the stored Gmin scaled value may be obtained as min(0xff, Gmin>>GminShift), where GminShift is a programmable parameter. In this manner, the DPC logic 1030 may select a range and saturate if Gmin[15:0] is larger than the selected range. If the DPC logic 1030 may use the scaled version of the defective pixel value before correction if specified by a user (e.g., if variable DynamicDMAOutPixelEn is set to 1), in place of the Gmin value, the bits 8-15 of the uncorrected defective may also be included. Here, the pixel value included is the original pixel value (if stored in memory 100) or statically replaced value (if not stored in memory 100). Also, it should be noted that the pixel value corresponds to a value that is obtained before subtracting a ZeroBias. In one embodiment, the DPC logic 1030 may use the input pixel value to determine the distribution of defective pixels, which may be useful to determine the statistics of Random Telegraph Signal (RTS) noise. If the number of entries written into the memory 100 is not a multiple of 64-bytes, the DPC logic 1030 may write zeros to complete the remaining bytes in the last 64-byte block. In one embodiment, the DPC logic 1030 may ensure that the allocated portion of the memory 100 is a multiple of 64-bytes.

After identifying and storing the locations of the defective pixels, the DPC logic 1030 may apply pixel correction operations depending on the type of defect detected. For instance, if the defective pixel was identified as a static defect, the pixel is replaced with the stored replacement value, as discussed above (e.g., the value of the previous pixel of the same color component). If the pixel was identified as either a dynamic defect or as speckle, then pixel correction may be performed as follows.

In one embodiment, gradients may be computed as the sum of the absolute difference between the center pixel and a first and second neighbor pixels (e.g., computation of $G_k$ of Equation 51) for four directions, a horizontal (h) direction, a vertical (v) direction, a diagonal-positive direction (dp), and a diagonal-negative direction (dn), as shown below:

$G_h = G_3 + G_4$ $G_v = G_1 + G_6$ $G_{dp} = G_2 + G_5$ $G_{dn} = G_0 + G_7$

Next, the corrective pixel value $P_C$ may be determined via linear interpolation of the two neighboring pixels associated with the directional gradient $G_h$, $G_v$, $G_{dp}$, and $G_{dn}$ that has the smallest value. For instance, in one embodiment, the logic statement below may express the calculation of $P_C$:

if $(\min == G_h)$ $$P_C = \frac{P_3 + P_4}{2};$$

else if $(\min == G_v)$ $$P_C = \frac{P_1 + P_6}{2};$$

else if $(\min == G_{dp})$ $$P_C = \frac{P_2 + P_3}{2};$$

else if $(\min == G_{dn})$ $$P_C = \frac{P_0 + P_7}{2};$$

The pixel correction techniques implemented by the DPC logic 1030 may also provide for exceptions at boundary conditions. For instance, if one of the two neighboring pixels associated with the selected interpolation direction is outside of the raw frame, then the value of the neighbor pixel that is within the raw frame is substituted instead. Thus, using this technique, the corrective pixel value will be equivalent to the value of the neighbor pixel within the raw frame. As mentioned above, neighboring pixels P0-P3 may not have been corrected by DPC logic 1030, while the defects in the neighboring pixels P4-P7 may have been corrected.

In another embodiment, pixel correction operations may use pixel values from other Bayer color components to correct the defective pixels. By using high-frequency information from other Bayer color components, the pixel correction operations may reduce color artifacts from being introduced in the defective pixel corrected image.

When correcting the defective pixels using pixel values from other Bayer color components, the 5×5 neighboring pixels (including those from other color components) may be convolved with a symmetric filter that has 5×5 spatial support. The coefficients that may be used in conjunction with the symmetric filter may be defined with respect to the defective pixel as shown in FIG. 101. In one embodiment, each color component (Gr, R, B, Gb) may have 8 programmable coefficients such that each coefficient may be a signed 16-bit number with 12 fractional bits. The center tap may be set to 0 since it corresponds to the defective pixels. In total, there may be 32 programmable coefficients to define four 5×5 filter kernels for correcting the defective pixels.

In one embodiment, the coefficients that may be used in conjunction with the symmetric filter may be trained using a standard film photograph or an image acquired using a charge-coupled device (i.e., reference image). That is, the coefficients may be determined by comparing the image data acquired by the sensors 90 and the reference image using various analysis processes such as, for example, a least square fit, a genetic learning algorithm, or a 1st order absolute difference.

The defective pixel correction process using 5×5 filtering may include interpolating the pixel values surrounding the respective defective pixel using the respective coefficients for the surrounding pixels. This process is summarized as follows.

```
filtVal=((im(j,i−1)+im(j,i+1))*correction_coeff[n][0]+(im(j,
   i−2)+im(j,i+2))*correction_coeff[n][1]+(im(j+1,i)+im(j−
   1,i))*correction_coeff[n][2]+(im(j−1,i−1)+im(j−1,i+1)+
   im(j+1,i−1)+im(j+1,i+1))*correction_coeff[n][3]+(im(j−
   1,i−2)+im(j−1,i+2)+im(j+1,i−2)+im(j+1,          +2))
   *correction_coeff[n][4]+(im(j−2,i)+im(j+2,i))
   *correction_coeff[n][5]+(im(j−2,i−1)+im(j−2,i+1)+im(j+
   2,i−1)+im(j+2,i+1))*correction_coeff[η][6]+(im(j−2,i−
   2)+im(j−2,i+2)+im(j+2,i−2)+im(j+2,i+2))
   *correction_coeff[n][7]+(1<<11))>>12;
outPix(j,i)=max(0, min(65535, filtVal));
```

where im(j,i) denotes the pixel value for the defective pixel located at (j, i) such that i denotes a horizontal location and j denotes a vertical location of a pixel, and n indicates a Bayer color component of the pixel.

It should be noted that the defective pixel detection/correction techniques applied by the DPC logic 1030 during the raw processing block 150 is more robust compared to the DPR logic 474 described above. As discussed in the embodiment above, the DPR logic 474 performs only dynamic defect detection and correction using neighboring pixels in only the horizontal direction, whereas the DPC logic 1030 provides for the detection and correction of static defects, dynamic defects, as well as speckle, using neighboring pixels in both horizontal and vertical directions.

As may be appreciated, the storage of the location of the defective pixels using a static defect table may provide for temporal filtering of defective pixels with lower memory requirements. For instance, compared to many conventional techniques which store entire images and apply temporal filtering to identify static defects over time, embodiments of the present technique only store the locations of defective pixels, which may typically be done using only a fraction of the memory required to store an entire image frame. Further, as discussed above, the storing of a minimum gradient value ($\min(G_k)$), allows for an efficient use of the static defect table prioritizing the order of the locations at which defective pixels are corrected (e.g., beginning with those that will be most visible).

Additionally, the use of thresholds that include a dynamic component (e.g., defect_thd1 and despeckle_thd1) may help to reduce false defect detections, a problem often encountered in conventional image processing systems when processing high texture areas of an image (e.g., text, foliage, certain fabric patterns, etc.). Further, the use of directional gradients (e.g., h, v, dp, dn) for pixel correction may reduce the appearance of visual artifacts if a false defect detection occurs. For instance, filtering in the minimum gradient direction may result in a correction that still yields acceptable results under most cases, even in cases of false detection. Additionally, the inclusion of the current pixel P in the gradient calculation may improve the accuracy of the gradient detection, particularly in the case of hot pixels.

Figure 102:
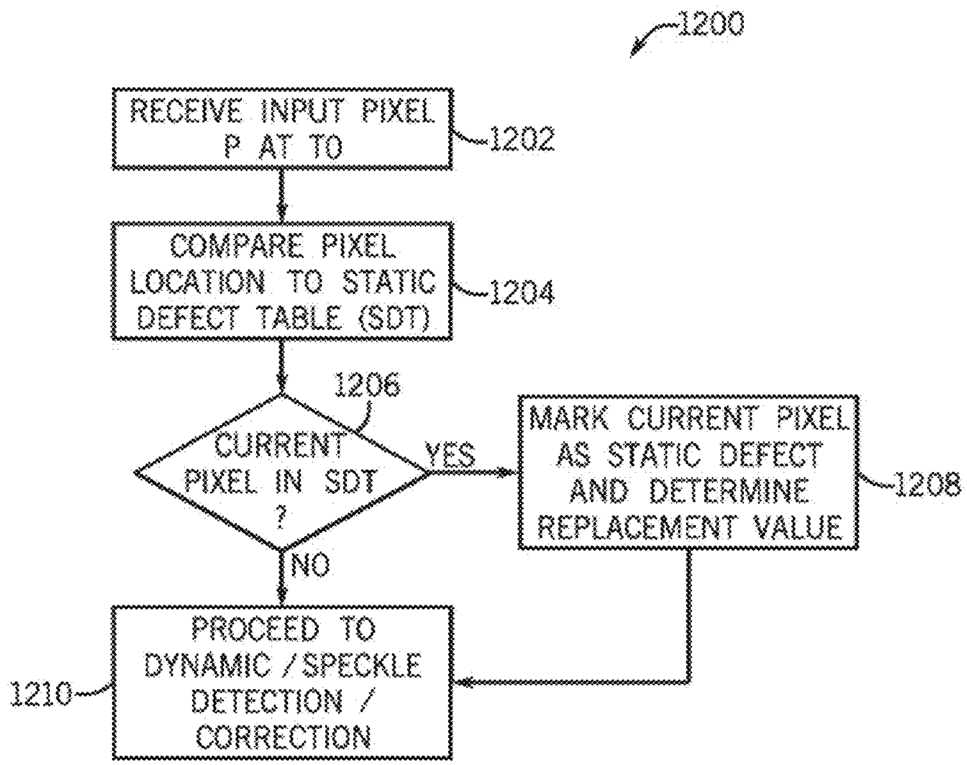
FIGS. 102-104 are flowcharts that depict various processes for detecting and correcting defective pixels that may be performed in the raw pixel processing block of FIG. 99, in accordance with an embodiment.
Figure 103:
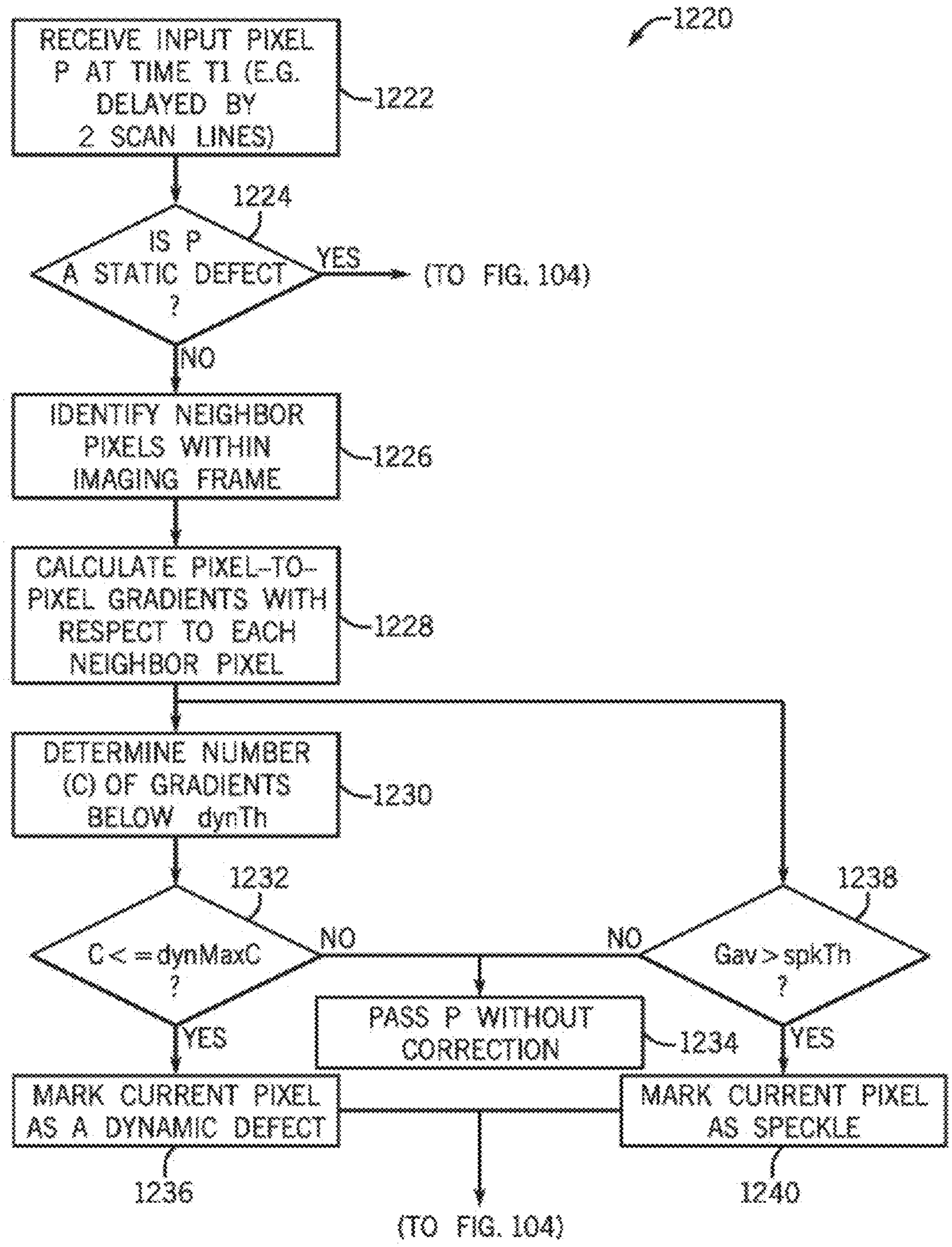
Figure 104:
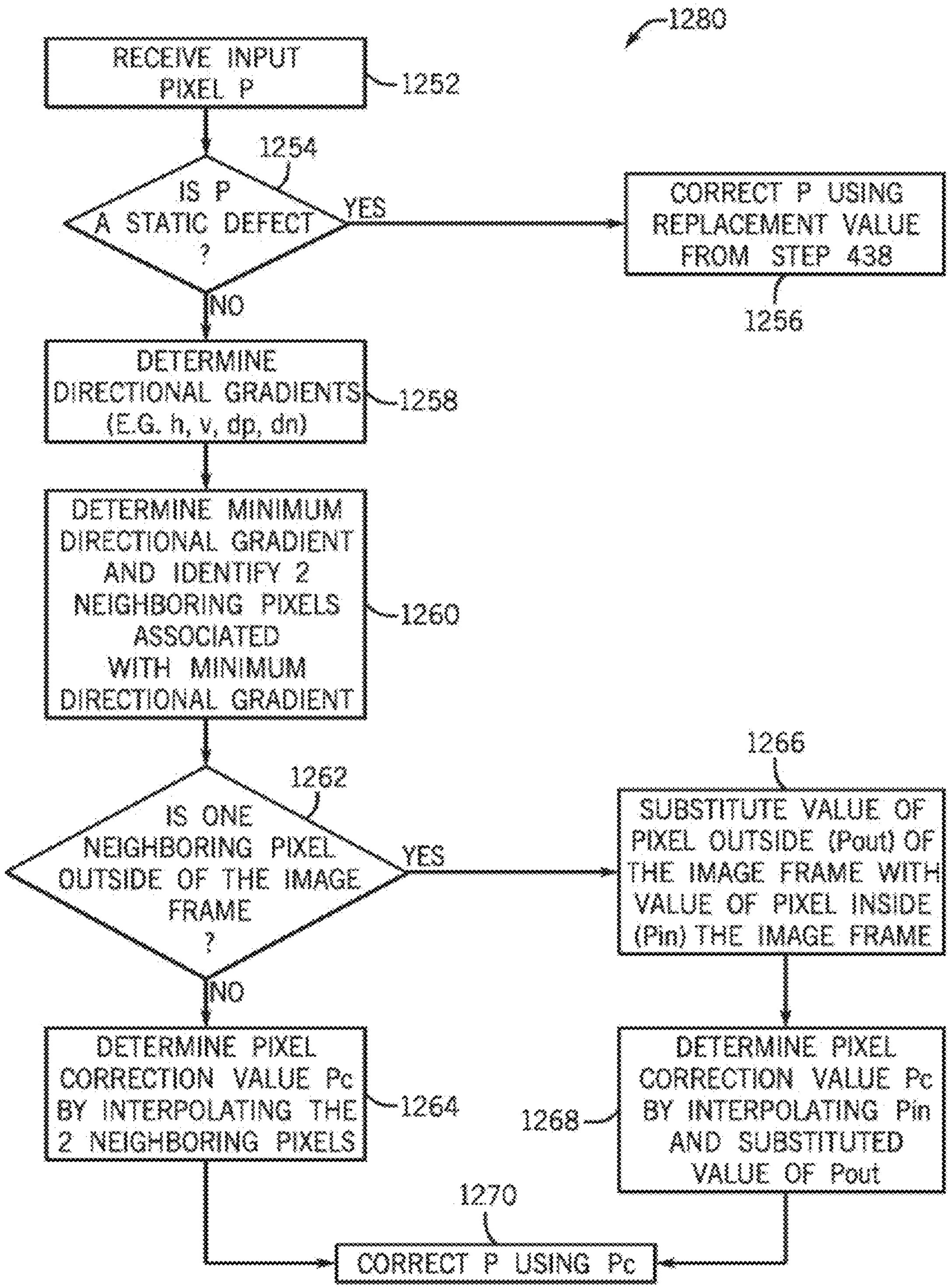

The above-discussed defective pixel detection and correction techniques implemented by the DPC logic 1030 may be summarized by a series of flowcharts provided in FIGS. 102-104. For instance, referring first to FIG. 102, a process 1200 for detecting static defects is illustrated. Beginning initially at step 1202, an input pixel P is received at a first time, $T_0$. Next, at step 1204, the location of the pixel P is compared to the values stored in a static defect table. Decision logic 1206 determines whether the location of the pixel P is found in the static defect table. If the location of P is in the static defect table, then the process 1200 continues to step 1208, wherein the pixel P is marked as a static defect and a replacement value is determined. As discussed above, the replacement value may be determined based upon the value of the previous pixel (in scan order) of the same color component. The process 1200 then continues to step 1210, at which the process 1200 proceeds to the dynamic and speckle detection process 1220, illustrated in FIG. 103. Additionally, if at decision logic 1206, the location of the pixel P is determined not to be in the static defect table, then the process 1200 proceeds to step 1210 without performing step 1208.

Continuing to FIG. 103, the input pixel P is received at time T1, as shown by step 1222, for processing to determine whether a dynamic defect or speckle is present. Time T1 may represent a time-shift with respect to the static defect detection process 1200 of FIG. 101. As discussed above, the dynamic defect and speckle detection process may begin after the static defect detection process has analyzed two scan lines (e.g., rows) of pixels, thus allowing time for the identification of static defects and their respective replacement values to be determined before dynamic/speckle detection occurs.

The decision logic 1224 determines if the input pixel P was previously marked as a static defect (e.g., by step 1208 of process 1200). If P is marked as a static defect, then the process 1220 may continue to the pixel correction process shown in FIG. 103 and may bypass the rest of the steps shown in FIG. 103. If the decision logic 1224 determines that the input pixel P is not a static defect, then the process continues to step 1226, and neighboring pixels are identified that may be used in the dynamic defect and speckle process. For instance, in accordance with the embodiment discussed above and illustrated in FIG. 100, the neighboring pixels may include the immediate 8 neighbors of the pixel P (e.g., P0-P7), thus forming a 3×3 pixel area. Next, at step 1228, pixel-to-pixel gradients are calculated with respect to each neighboring pixel within the raw frame 308. Additionally, an average gradient ($G_{av}$) may be calculated as the difference between the current pixel and the average of its surrounding pixels, as shown above.

The process 1220 then branches to step 1230 for dynamic defect detection and to decision logic 1238 for speckle detection. As noted above, dynamic defect detection and speckle detection may, in some embodiments, occur in parallel. At step 1230, a count C of the number of gradients that are less than or equal to the threshold defect_thd is determined. As described above, the threshold defect_thd may include fixed and dynamic components. If C is less than or equal to a maximum count, dynMaxC, then the process 1220 continues to step 1236, and the current pixel is marked as being a dynamic defect. Thereafter, the process 1220 may continue to the pixel correction process shown in FIG. 104, which will be discussed below.

Returning back the branch after step 1228, for speckle detection, the decision logic 1238 determines whether the average gradient $G_{av}$ is greater than a speckle detection threshold despeckle_thd, which may also include a fixed and dynamic component. If G is greater than the threshold despeckle_thd, then the pixel P is marked as containing speckle at step 1000 and, thereafter, the process 1220 continues to FIG. 104 for the correction of the speckled pixel. Further, if the output of both of the decision logic blocks 1232 and 1238 are "NO," then this indicates that the pixel P does not contain dynamic defects, speckle, or even static defects (decision logic 1224). Thus, when the outputs of decision logic 1232 and 1238 are both "NO," the process 1220 may conclude at step 1234, whereby the pixel P is passed unchanged, as no defects (e.g., static, dynamic, or speckle) were detected.

Continuing to FIG. 104, a pixel correction process 1250 in accordance with the techniques described above is provided. At step 1252, the input pixel P is received from process 1220 of FIG. 103. It should be noted that the pixel P may be received by process 1250 from step 1224 (static defect) or from steps 1236 (dynamic defect) and 1240 (speckle defect). The decision logic 1254 then determines whether the pixel P is marked as a static defect. If the pixel P is a static defect, then the process 1250 continues and ends at step 1256, whereby the static defect is corrected using the replacement value determined at step 1208 (FIG. 102).

If the pixel P is not identified as a static defect, then the process 1250 continues from decision logic 1254 to step 1258, and directional gradients are calculated. For instance, as discussed above, the gradients may be computed as the sum of the absolute difference between the center pixel and first and second neighboring pixels for four directions (h, v, dp, and dn). Next, at step 1260, the directional gradient having the smallest value is identified and, thereafter, decision logic 1262 assesses whether one of the two neighboring pixels associated with the minimum gradient is located outside of the image frame (e.g., raw frame 310). If both neighboring pixels are within the image frame, then the process 1250 continues to step 1264, and a pixel correction value ($P_C$) is determined by applying linear interpolation to the values of the two neighboring pixels. Thereafter, the input pixel P may be corrected using the interpolated pixel correction value $P_C$, as shown at step 1270.

Returning to the decision logic 1262, if it is determined that one of the two neighboring pixels are located outside of the image frame (e.g., raw frame 308), then instead of using the value of the outside pixel (Pout), the DPC logic 1030 may substitute the value of Pout with the value of the other neighboring pixel that is inside the image frame (Pin), as shown at step 1266. Thereafter, at step 1268, the pixel correction value $P_C$ is determined by interpolating the values of Pin and the substituted value of Pout. In other words, in this case, $P_C$ may be equivalent to the value of Pin. Concluding at step 1270, the pixel P is corrected using the value $P_C$. Before continuing, it should be understood that the particular defective pixel detection and correction processes discussed herein with reference to the DPC logic 1030 are intended to reflect only one possible embodiment of the present technique. Indeed, depending on design and/or cost constraints, a number of variations are possible, and features may be added or removed such that the overall complexity and robustness of the defect detection/correction logic is between the simpler detection/correction logic 474 and the defect detection/correction logic discussed here with reference to the DPC logic 1030.

Noise Statistics

After performing the defect detection/correction logic, the DPC logic 1030 may send to defective pixel corrected image data to the noise statistics logic 1031 to compute noise statistics for the input image. The noise statistics for the input image may enable various image processing stages in the raw block 150 such as, for example, the defective pixel detection/correction process, a spatial noise filtering process, a demosaicing process, and/or an image sharpening process. These processes may use the noise statistics to more accurately perform their respective functions even though they may not be used to filter noise from the image data. For instance, a spatial noise filtering process, which will be described in detail later, may use noise statistics to properly filter dark and bright regions of the image data, even though the dark and bright regions of the image data may not be attributed to noise. As such, in one embodiment, the noise statistics logic 1031 may be implemented after each process in the raw block 150 since the noise may change after each process.

The noise statistics may include a standard deviation of noise versus a pixel intensity. Although the noise statistics may be measured during a calibration process while manufacturing the ISP pipe, the noise statistics may not be accurate as the environment (e.g. temperature) surrounding the sensors 90. Furthermore, reliable calibration of the noise statistics (noise profile) may not be a straightforward process; instead, reliable calibration of the noise statistics may use an extensive noise calibration process that may be prohibitively expensive.

Figure 105:
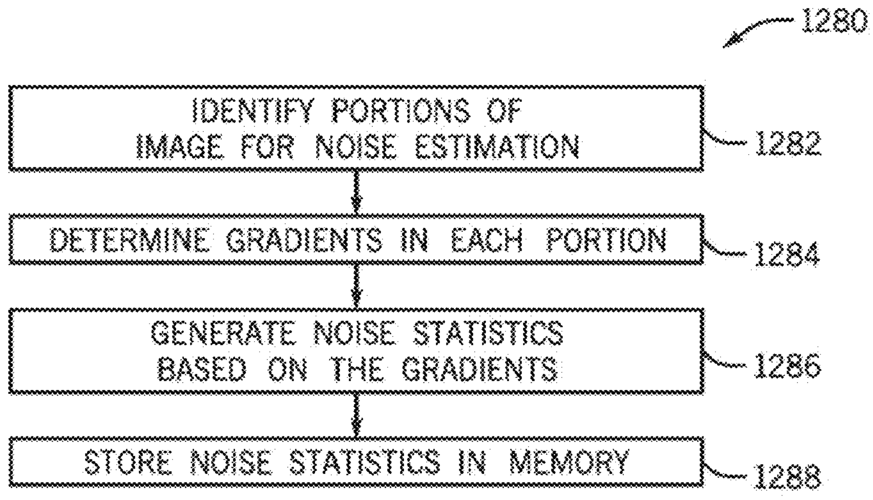
FIG. 105 is a flow diagram depicting a process for calculating noise statistics, in, accordance with an embodiment.

In general, the noise statistics for the input image may be generated by first determining dominant gradient orientations for non-overlapping portions of the input image. After determining the dominant gradient orientations for each non-overlapping portion of the input image, a count of the dominant gradient orientations for non-overlapping portions of the input image may be calculated and stored in the memory 100. In addition to the count of dominant gradient orientations, the noise statistics may include a peak and a sum of gradient magnitudes for each non-overlapping portion of the input image. In one embodiment, the noise statistics logic 1031 may be performed within the DPC logic 1030 because the noise statistics are based on a computation of gradients, which is a function that is also performed by the DPC logic 1030. In this manner, the line buffers for the gradient computation may be used by the DPC logic 1030 to determine gradients in connection with the defective pixel detection/correction process and the noise statistics generation process. Although the DPC logic 1030 may be used to generate the noise statistics, in other embodiments other components in the raw block 150 may be used to perform the noise statistics logic 1031. Additional details with regard to how the noise statistics logic 1031 may compute the noise statistics for the input image is described in process 1280 below with reference to FIG. 105.

At block 1282, the noise statistics logic 1031 may identify portions or local regions on the input image where noise may be best estimated. Each portion on the input image may be a non-overlapping block of pixels on the input image. In one embodiment, the non-overlapping portions on the input image that may be well-suited for calculating noise statistics may include a flat surface. A flat surface on the input image may have gradient orientations that have a low frequency, an isotropic distribution, and a peak gradient magnitude that is relatively small as compared to the other gradients in a respective non-overlapping portion of the input image. For instance, FIG. 226 illustrates an example of low frequency portions (5402) of an input image and high frequency portions (5404) of the input image. As shown in FIG. 226, the low frequency portions 5402 of the input image may include relatively similar color such that each pixel in the portion may exhibit the same pixel intensity values.

After identifying the portions of the input image that may be well-suited to calculate the noise statistics, the noise statistics logic 1031 may be capable of estimating the noise statistics for the input image using just these portions.

Figure 106:
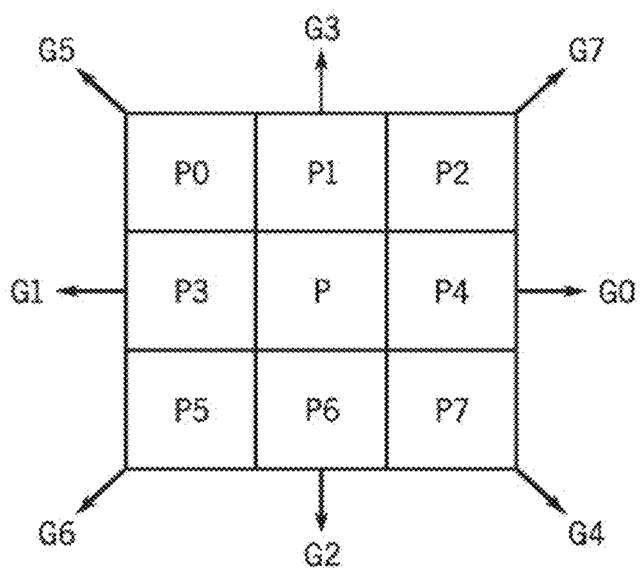
FIG. 106 shows various gradients that may be considered when applying techniques for calculating noise statistics during processing by the raw processing block shown in FIG. 91, in accordance with an embodiment.

At block 1284, the noise statistics logic 1031 may compute gradients for each portion of the input image. In one embodiment, the noise statistics logic 1031 may compute spatial gradient for one of the color components of the Bayer quads in each portion of the input image. As such, the Bayer color component may be specified to the noise statistics logic 1031 prior to performing the process 1280. For example, the noise statistics logic 1031 may compute the spatial gradients for the Bayer color component-Gr after the color component Gr has been specified to the noise statistics logic 1031. An example of a portion of the input image is illustrated in FIG. 106. The pixels (i.e., P, P0 . . . P7) shown in FIG. 106 may denote pixel values for the specified color component.

In one embodiment, the pixel data from the sensors 90 may have been scaled up to fit a range of the raw block 150. For example, a 10-bit image sensor may be scaled up by 4 in order to fully use the range of the raw block 150. In this manner, the sensors 90 may scale the pixel data down by 4 to compute the spatial gradient. Accordingly, when computing the spatial gradients, the noise statistics logic 1031 may bit-shift the spatial gradients (with rounding) by a specified amount (PixShift). The spatial gradients for a portion of the input image as illustrated in FIG. 106 may be calculated as follows:

G0=(P4−P3)>>PixShift;
G1=(P3−P4)>>PixShift;
G2=(P6−P1)>>PixShift;
G3=(P1−P6)>>PixShift
G4=(P7−P0)>>PixShift;
G5=(P0−P7)>>PixShift;
G6=(P5−P2)>>PixShift;
G7=(P2−P5)>>PixShift;

At block 1286, the noise statistics logic 1031 may generate noise statistics for the input image based on the spatial gradients for each portion of the input image. In one embodiment, the noise statistics logic 1031 may generate a histogram that counts the dominant gradient orientations for each of portion of the input image. The histogram may include a number of bins (e.g., bin[0] to bin[7]) that correspond to maximum spatial gradient values for G0 through G7. As such, the noise statistics logic 1031 may determine which spatial gradient has the maximum value in each portion of the image. After determining the maximum spatial gradient for each portion of the input image, the noise statistics logic 1031 may increment respective bins in the histogram that corresponds to the orientation of the maximum spatial gradients for the respective portions of the input image. For example, when gradient G1 has the maximum (positive) value among the set of G0 through G7 for a respective portion of the input image, the noise statistics logic 1031 may increment bin[1] in the histogram by one.

In one embodiment, the histogram of dominant orientations may be represented as 16-bit values with two fractional bits. If more than one gradient the portion of the input image have the same maximum gradient value, the noise statistics logic 1031 may use fractional bits to account for ties. For instance, if G0 and G1 in a respective portion of the input image both have the same maximum gradient value, then the noise statistics logic 1031 may increment bin[0] and bin[1] of the histogram by ½. In one embodiment, the noise statistics logic 1031 may increment the respective bins of the histogram by ½ when there are two or three gradients that have the same maximum gradient values. In another embodiment, the noise statistics logic 1031 may increment the respective bins of the histogram by ¼ when there are four or more gradients that have the same maximum gradient values.

In one embodiment, the noise statistics logic 1031 may use the histogram of dominant gradient orientations to determine a standard deviation of the gradients in each non-overlapping portion of the input image. For instance, the noise statistics logic 1031 may compute the standard-deviation for and standard-deviation-mean for each non-overlapping portion of image. Using the resulting standard-deviation versus pixel intensity pairs, the noise statistics logic 1031 may perform a curve fitting operation to acquire standard-deviation versus pixel intensity curves. In one embodiment, the noise statistics logic 1031 may perform an outlier rejection, which may remove some of the outlier standard deviation values from the curve fitting operation. The curve fitting operation may be performed using linear, quadratic, or polynomial curves. FIG. 227 illustrates an example graph of the standard deviation values for each portion of the input image with respect to the pixel intensity value. Outlier standard deviation values are illustrated in FIG. 227 as "+" symbols.

In addition to the histogram of dominant gradient orientations, at block 1286, the noise statistics logic 1031 may determine a sum of the pixel intensities, a peak gradient magnitude, a sum of the gradient magnitudes for each portion of the input image, and a mean value for the sum of the gradient magnitudes for each portion of the input image. The peak gradient magnitude may be represented as a 16-bit value, and the sum of the gradient magnitude and the sum of the pixel intensities may be represented as 32-bit values. In one embodiment, when determining the sum of the pixel intensities, the sum of the gradient magnitudes for each portion of the input image, and/or the mean gradient magnitude sum value for each portion of the input image may be the same size. As such, the size of the portion of the input image may be set independently for the horizontal and vertical directions. The maximum number of horizontal portions of the input image may not exceed 128. Further, the size of the portions of the input image may be a multiple of two. The minimum horizontal interval between each portion of the input image may be 16 pixels wide in half-sensor-resolution and 32 pixels in full-sensor-resolution. The maximum number of pixels in each portion of the input (at full sensor resolution) may not to a predetermined number of bits (e.g., bit depth).

In one embodiment, the noise statistics logic 1031 may determine the gradient magnitude as follows: Grad_Mag=(abs(G0)+abs (G2)+1)/2; At block 1288, the noise statistics logic 1031 may store the histogram of dominant orientation, the sum of the pixel intensities, the peak gradient magnitude, and the sum of the gradient magnitudes (noise statistics) in memory 100 in scan order. In one embodiment, the DPC logic 1030 may store the noise statistics as the portion of the image is complete and if the portion was part of the active region. FIG. 107 illustrates an example of the memory format for storing the noise statistics for each portion of the input image.

In one embodiment, the noise statistics logic 1031 may compute the horizontal/vertical/diagonal gradients using a filter convolution. For example, filter coefficients for a horizontal filter (h) may be set to [0.5 0−0.5], and the noise statistics logic 1031 may compute the horizontal gradient using a filter convolution and the filter coefficients. In another embodiment, the noise statistics logic 1031 may compute the horizontal gradient and vertical gradient for each pixel and then compute the orientation of the gradient using an arctangent function. For instance, theta=arctan (vertical_gradient/horizontal_gradient). Here, the noise statistics logic 1031 may bin the thetas for each pixel into the histogram.

After the noise statistics are stored in memory 100, various components may access the noise statistics to perform their respective operations. For instance, the noise statistics may be used to perform various operations including, for example, demosaicing operations, noise filtering operations, image sharpening operations, and the like. The noise statistics may be used to verify the accuracy of these operations, improve the effectiveness of these operations, and the like.

Spatial Noise Filter (SNF)

The output of the DPC logic may be passed to the spatial noise filter (SNF) logic 1032 for further processing. Thus, the discussion now turns to the SNF logic. As illustrated, in the present embodiment, the DPC logic is provided prior to the SNF logic 1032. This is because the initial temporal filtering process generally uses only co-located pixels (e.g., pixels from an adjacent frame in the temporal direction), and thus does not spatially spread noise and/or defects. However, spatial filtering filters the pixels in the spatial direction and, therefore, noise and/or defects present in the pixels may be spread spatially. Accordingly, defective pixel correction is applied prior to spatial filtering to reduce the spread of such defects.

In one embodiment, the SNF logic 1032 may be implemented as a two-dimensional spatial noise filter that is configured to support both a bilateral filtering mode and a non-local means filtering mode, both of which are discussed in further detail below. The SNF logic 1032 may process the raw pixels to reduce noise by averaging neighboring pixels that are similar in brightness. Referring first to the bilateral mode, this mode may be pixel adaptive based on a brightness difference between a current input pixel and its neighbors, such that when a pixel difference is high, filtering strength is reduced to avoid blurring edges. The SNF logic 1032 operates on raw pixels and may be implemented as a non-separable filter to perform a weighted average of local samples (e.g., neighboring pixels) that are close to a current input pixel both in space and intensity. For instance, in one embodiment, the SNF logic 1032 may include a 7×7 filter (with 49 filter taps) per color component to process a 7×7 block of same-colored pixels within a raw frame (e.g., 310 of FIG. 21), wherein the filter coefficients at each filter tap may adaptively change based upon the similarity (e.g., in brightness) of a pixel at the filter tap when compared to the current input pixel, which may be located at the center within the 7×7 block.

Figure 108:
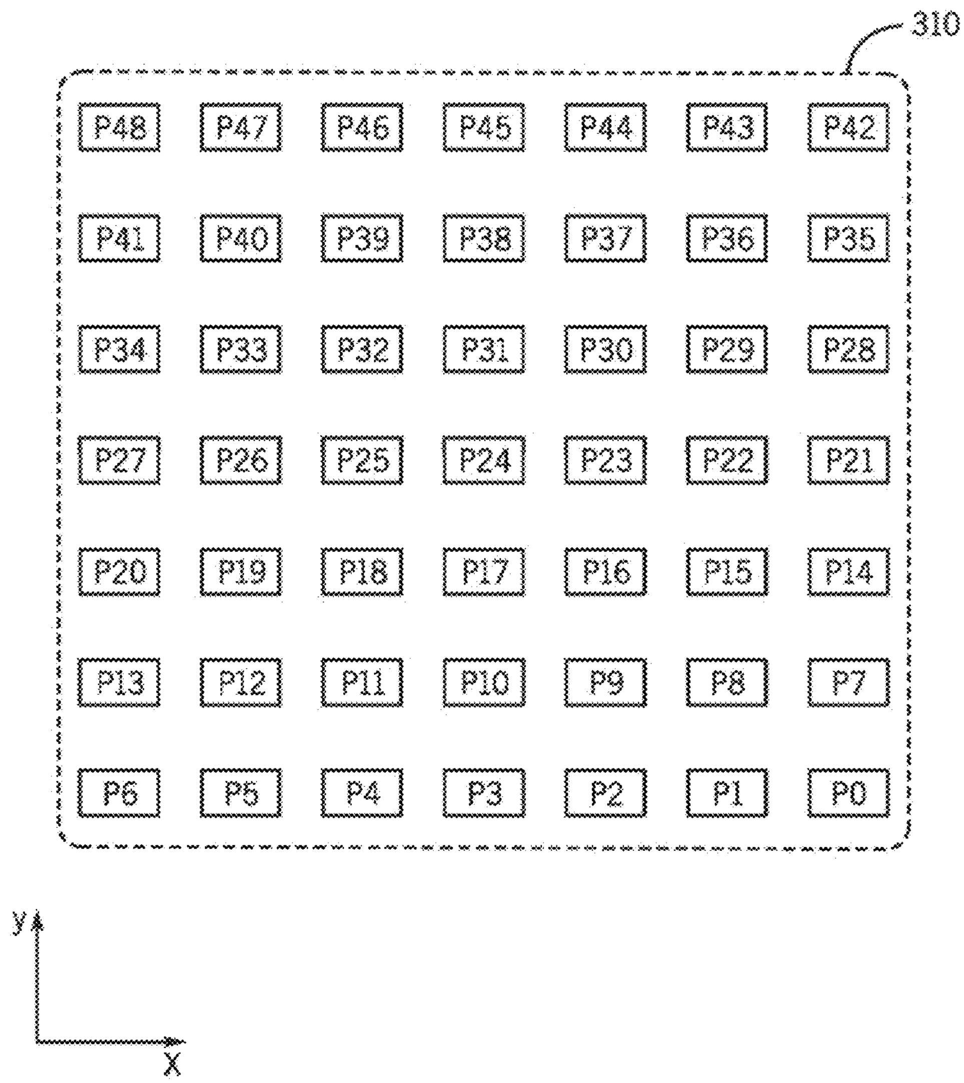
FIG. 108 is an illustration of a 7×7 block of same-colored pixels on which spatial noise filtering may be applied.

FIG. 108 shows a 7×7 block of same-colored pixels (P0-P48) on which spatial noise filtering may be applied by the SNF logic 1032, wherein the pixel designated by P24 may be the current input pixel at location (j,i) located at the center of the 7×7 block, and on which spatial filtering is being applied. For instance, assuming the raw image data is Bayer raw image data, all of the pixels in the 7×7 block may be of either red (R) pixels, green (either Gb or Gr) pixels, or blue (B) pixels. Further, while a 7×7 block is shown in the present embodiment, it should be appreciated that smaller or larger pixel block sizes may be used in conjunction with the presently disclosed techniques. For instance, in some embodiments, the SNF logic 1032 may include 9 filter taps and operate on a 3×3 block of same-colored pixels, 25 filter taps and operate on a 5×5 block of same-colored pixels, or may include 81 filter taps and operate on a 9×9 block of same-colored pixels.

Figure 109:
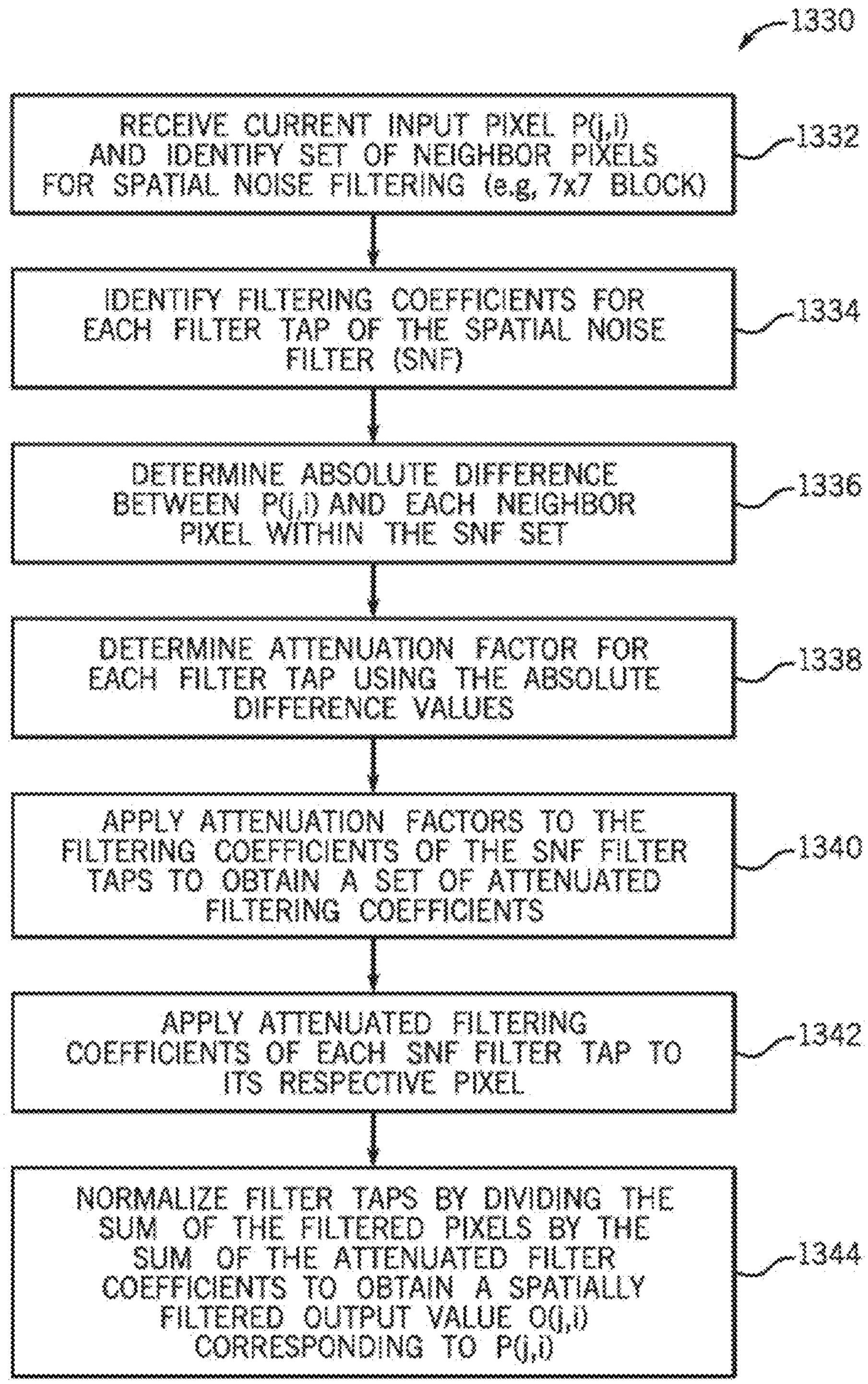
FIG. 109 illustrates a high level process overview of the spatial noise filtering process, in accordance with an embodiment.

To more clearly explain the spatial noise filtering process provided by the SNF logic 1032, a general description of the spatial noise filtering process will now be provided with reference to the process 1330 depicted in FIG. 109. The process 1330 is intended to provide an initial high level overview of the spatial noise filtering process, with more specific details of the spatial noise filtering process, including examples of equations and formulas that may be utilized in certain embodiments, being described further below.

The process 1330 begins at block 1334, at which a current input pixel P located at spatial location (j,i) is received, and a neighboring set of same-colored pixels for spatial noise filtering is identified. For example, a set of neighbor pixels may correspond to the 7×7 block 1328 and the input pixel may be the center pixel P24 of the 7×7 block, as shown above in FIG. 108. Next, at block 1334, filtering coefficients for each filter tap of the SNF logic 1032 are identified. In the present embodiment, each filter tap of the SNF logic 1032 may correspond to one of the pixels within the 7×7 block and may include a filtering coefficient. Thus, in the present example, a total of 49 filter coefficients may be provided. In certain embodiments, the SNF filtering coefficients may be derived based upon a Gaussian function with a standard deviation measured in pixels.

At block 1336, an absolute difference is determined between the input pixel P(j,i) and each of the neighbor pixels within the 7×7 block 1328. This value, delta (Δ) may then be used to determine an attenuation factor for each filter tap of the SNF logic 1032, as indicated by block 1338. As will be discussed further below, the attenuation factor for each neighbor pixel may depend on the brightness of the current input pixel P(j,i), the radial distance of the input pixel P(j,i) from the center of the raw frame 310 (FIG. 21), as well as the pixel difference between the input pixel P(j,i) and the neighbor pixel. Thereafter, at block 1340, the attenuation factors from block 1338 are applied to each respective filter tap of the SNF logic 1032 to obtain a set of attenuated filtering coefficients. At block 1342, each attenuated filtering coefficient is applied to its respective pixel within the 7×7 block. Finally, at block 1344, a spatially filtered output value O(j,i) that corresponds to the input pixel P(j,i) may be determined by normalizing the filter taps of the SNF logic 1032. In one embodiment, this may include dividing the sum of the filtered pixels from block 1342 by the sum of the attenuated filter coefficients from block 1340.

Having provided a general description of a spatial filtering process 1330 that may be performed by one embodiment of the SNF logic 1032, certain aspects of the process 1330 are now described in further detail. For instance with regard to block 1336 of the process 1330, the absolute difference values may be calculated when operating in the bilateral mode by determining the absolute difference between P(j,i) and each neighbor pixel. For instance, referring to FIG. 108, the absolute difference corresponding to pixel P0 may be the absolute value of (P0-P24), the absolute difference corresponding to pixel P1 may be the absolute value of (P1-P24), the absolute difference corresponding to pixel P2 may be the absolute value of (P2-P24), and so forth. Thus, an absolute difference value for each pixel within the 7×7 block 1328 may be determined in this manner to provide a total of 49 absolute difference values. Further, with regard to the 7×7 block 1328, if the current input pixel P(j,i) is located near an edge of the raw frame 310, such that there are not enough pixels in one or more directions to complete the 7×7 block, edge pixels of the current color component may be replicated. For instance, suppose a current input pixel is instead at location P31 in FIG. 108. In this scenario, an additional upper row of pixels may be needed to complete the 7×7 block, and this may be accomplished by replicating pixels P42-P48 in the y-direction.

Figure 110:
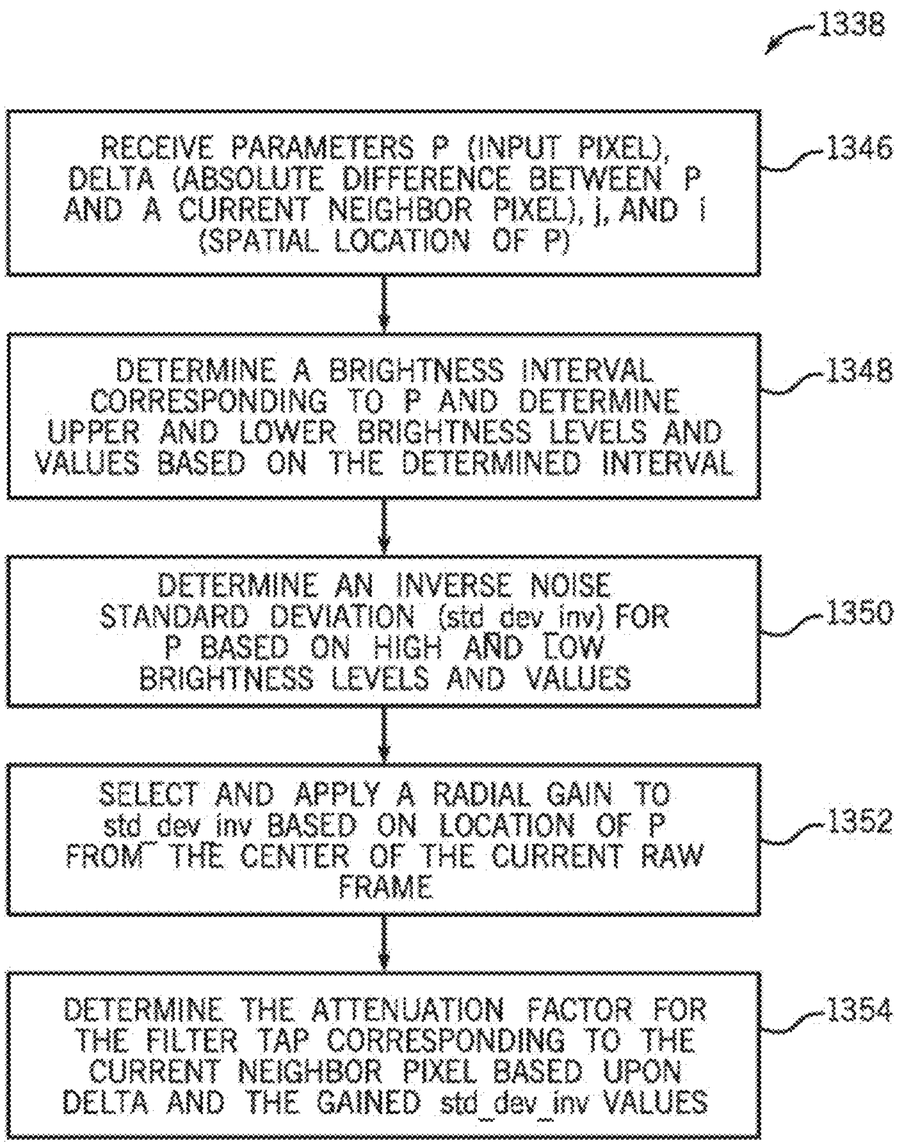
FIG. 110 illustrates a process for determining an attenuation factor for each filter tap of the SNF logic.

The block 1338 of the process 1330 for determining an attenuation factor for each filter tap of the SNF logic 1032 is illustrated in more detail as a sub-process shown in FIG. 110 and including sub-blocks 1346-1354, in accordance with one embodiment. As shown in FIG. 110, the sub-process 1338 may be performed for each pixel of the 7×7 block and begins at sub-block 1346, where the parameters delta (Δ) (representing the absolute difference between the input pixel P and a current neighbor pixel), P (representing the value of the input pixel), and the coordinates j and i (representing the spatial location of the input pixel P) are received. At sub-block 1348, the value of the input pixel (P) may be evaluated against multiple brightness intervals to identify an interval in which the value P lies. By way of example only, one embodiment may provide a total of 18 brightness intervals (defined by 19 brightness levels), with 17 brightness levels spanning the range of 0 to 2^15 (2048 interval in 16-bit) in equal intervals and with the last two ($18^{th}$ and $19^{th}$ brightness levels) being located at 2^15+2^14 and 2^16 (16384), respectively. For instance, a pixel P having a value of 13000 may fall in the interval defined between the $18^{th}$ and $19^{th}$ brightness levels. For the brightness lookup, negative pixel values are clipped to zero. As can be appreciated, such an embodiment may be employed when the raw pixel data received by the SNF logic 1032 includes 16-bit raw pixel data. If the received pixel data is less than 16-bits, it may be up-sampled, and if the received pixel data is greater than 16-bits, it may be down-sampled prior to being received by the SNF logic 1032. Further, in certain embodiments, the brightness levels and their corresponding brightness values may be stored using a look-up table.

In some embodiments, the low and high brightness values may be determined by the following logic:

```
for (i=0; i<16; i++)
{
        if (p < 2048*(i+1))
        {
                x0 = i; //determine lower brightness level
                x1 = i+1;        //determine upper brightness level
                x0_val = 2048*i
                x1_val = 2048*(i+1)
        }
    }
// the last two intervals
if (p > 2^15)
{
        if (p <=2^15 + 2^14)
            {
                    x0 = 16
                x1 = 17
                x0_val = 2^15
                x1_val= x0 + 2^ 14
        }
        else
        {
                x0= 17
                x1= 18
                x0_val = 2^15 + 2^14
```

-continued

```
            x1_val= 2^16
        }
    }
```

Once the brightness interval corresponding to P is identified, the upper and lower levels of the selected brightness interval from sub-block 1348, as well as their corresponding brightness values, may be used to determine an inverse noise standard deviation value (e.g., 1/std_dev) for P, as shown at sub-block 1350. In one embodiment, an array of inverse noise standard deviation values may be provided, wherein a standard noise deviation value defined for each brightness level and color component. For instance, the inverse noise standard deviation values may be provided as an array, std_dev_inv[c][brightness_level]:((0≤c≤3); (0≤brightness_level≤18)), wherein the first index element corresponds to a color components [c], which may correspond to four Bayer color components (R, Gb, Gr, B) in the present embodiment, and the second index element corresponds to one of the 19 brightness levels [brightness_level] provided in the present embodiment. Thus, in the present embodiment, a total of 19 brightness-based parameters for each of 4 color components (e.g., the R, Gb, Gr, and B components of Bayer raw pixel data) are provided. The inverse noise standard deviation values may be specified by firmware (e.g., executed by control logic 84).

Further, while the present embodiment depicts the determination of the brightness interval as being based upon a parameter equal to the value (P) of the current input pixel, in other embodiments, the parameter used to determine the brightness interval may be used on an average brightness of a subset of pixels within the 7×7 pixel block that are centered about the current input pixel. For instance, referring to FIG. 108, rather than determining the brightness interval using only the value of the current input pixel (P24), the average value ($P_{AVG}$) of the pixels forming a 3×3 block centered at pixel P24 may be used (e.g., pixels P32, P31, P30, P25, P24, P23, P18, P17, and P16). Accordingly, the determination of the brightness interval and the corresponding upper and lower brightness levels may be based upon $P_{AVG}$ in such embodiments. As can be appreciated, the use of an averaged brightness (e.g., $P_{AVG}$) may be more robust to noise compared to using only the value of the current input pixel (e.g., P24).

In certain embodiments, the std_dev_inv values may be specified using 22 bits, with a 6-bit signed exponent (Exp) and a 16-bit mantissa (Mant) as shown below:

std_dev_inv=Mant*(2^Exp);

wherein Exp has a range of −32<=Exp<=31 and wherein Mant has a range of 1.0<=Mant<2. Collectively, this may allow a range of:

2^−32<=std_dev_inv<2^32; or

2^−32<std_dev<=2^32;

Using the upper and lower brightness values from sub-block 1348, upper and lower inverse noise standard deviation values corresponding to P may be selected from the std_dev_inv array and interpolated to obtain an inverse noise standard deviation (std_dev_inv) value for P.

For instance, in one embodiment, this process may be performed as follows:

std_dev_inv0=snf_dev_inv[c][x0];

std_dev_inv1=snf_dev_inv[c][x1];

x_interval=x1_val−x0_val;

std_dev_inv=[((std_dev_inv0*(x1_val−P))+((std_dev_inv1*(P−x0_val))]/x_interval;

wherein std_dev_inv0 corresponds to the inverse noise standard deviation value of the lower brightness level, wherein std_dev_inv1 corresponds to the inverse noise standard deviation value of the upper brightness level, wherein x1_val and x0_val correspond to the brightness values of the upper and lower brightness levels, respectively, and wherein x_interval corresponds to the difference between the upper and lower brightness values. The value std_dev_inv represents the interpolation of std_dev_inv0 and std_dev inv1.

Figure 111:
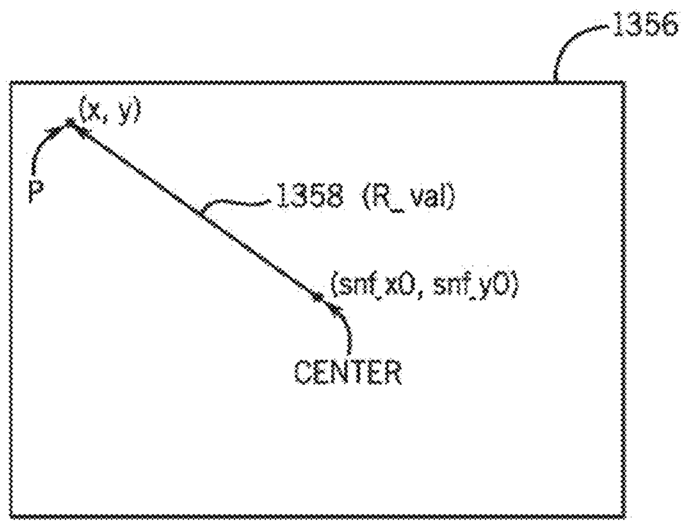
FIG. 111 is an illustration of a determination of a radial distance as the distance between a center point of an image frame and the current input pixel, in accordance with an embodiment.

Thereafter, at sub-block 1352, a radial gain is selected based upon the spatial location (e.g., radius) of the input pixel P relative to a center of the current image frame. For instance, referring to FIG. 111, a radial distance (R_val) 1358 may be determined as the distance between a center point of an image frame (e.g., raw frame 310) having the coordinates (snf_x0, snf_y0) and the current input pixel P with the coordinates (x, y). In one embodiment, the radial distance or radius, R_val, may be determined as follows:

$$R\_\text{val}=\sqrt{((x-\text{snf}\_x0)^2+(y-\text{snf}\_y0)^2}$$

Figure 112:
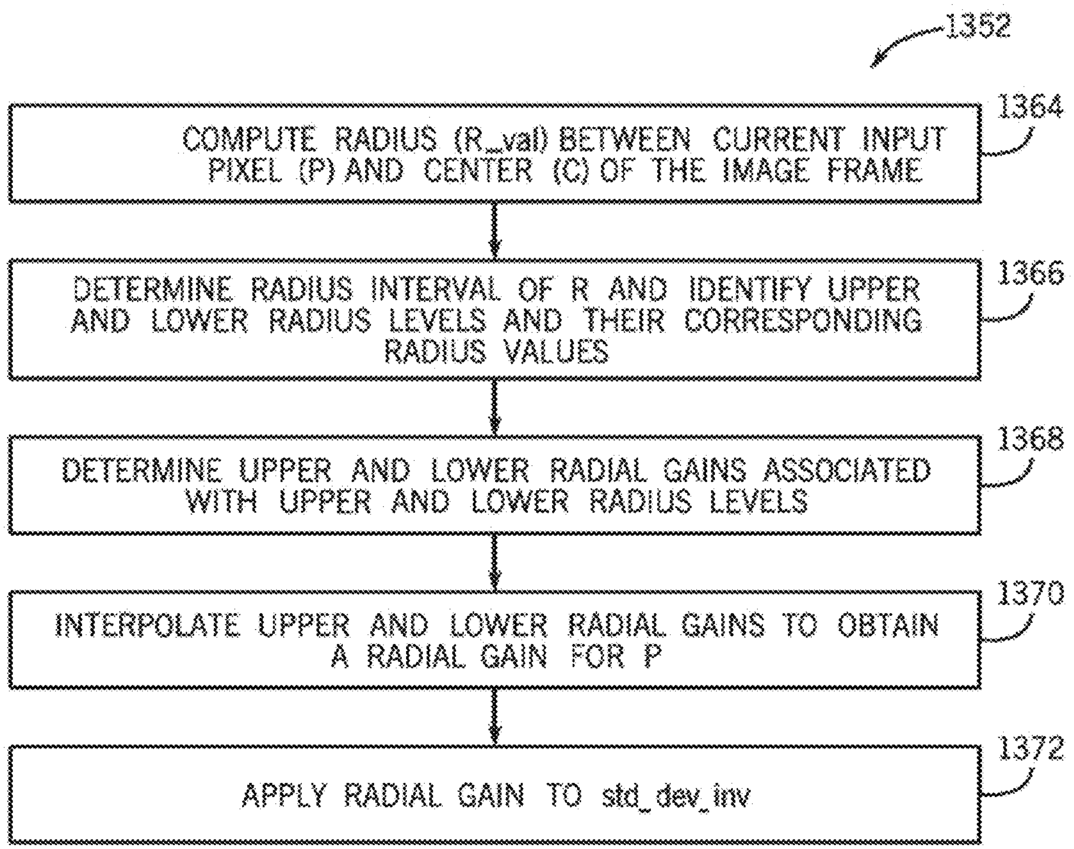
FIG. 112 is a flowchart illustrating a process to determine a radial gain to be applied to the inverse noise standard deviation value determined by the attenuation factor determination process, in accordance with an embodiment.

Once the R_val is determined, a sub-process corresponding to block 1352, which is represented by blocks 1364-1372 of FIG. 112, may be performed to determine a radial gain to be applied to the inverse noise standard deviation value std_dev_inv determined at block 1350 of FIG. 110.

As shown in FIG. 112, the blocks 1364-1372 of the sub-process 1352 begins at sub-block 1364, wherein a radius (R_val) from the center (C) of the image frame to the position of the current input pixel (P) is determined. In one embodiment, this determination may be based upon Equation 1, provided above. Next, at sub-block 1366, the value of R_val may be evaluated against multiple radius intervals to identify an interval in which R_val is located. By way of example only, one embodiment may provide a total of 3 radius intervals, which may be defined by a first radius of 0 (e.g., located at the center (snf_x0, snf_y0) of the frame) and second, third, and fourth radius points. In one embodiment, the radius points, which may be defined by an array snf_rad [r]:(1≤r≤3), may be used as exponential components to calculate a radius. For example, the first radius point, snf_rad[1], may define a radius equal to 2^snf_rad[1]. Thus, the first radius interval may have a range from 0 to 2^snf_rad [1], the second radius interval may have a range from 2^snf_rad[1] to 2^snf_rad[2], and so forth.

Once a radius interval corresponding to R_val is identified, the upper radius point (R1) and lower radius point (R0) and their respective values may be determined, as shown at block 1368. In one embodiment, this process may be performed as follows:

R0_val=0 if (R0==center); else 2^snf_rad[R0];

R1_val=2^snf_rad[R1];

R_interval=R1_val−R0_val;

wherein R0_val corresponds to radius value associated with the lower radius point, wherein R1_val corresponds to the radius value associated with the upper radius point, and wherein R_interval represents the difference between R1_val and R0_val.

While the above-discussed embodiment provides three radius intervals using the image frame center and three additional radius points, it should be appreciated that any suitable number of radius intervals may be provided in other embodiments using more or fewer radius points. Further, the above-discussed embodiment provides radius points that begin from the center of the image frame and progress outwards towards the edge/corners of the image frame. However, because the radius points are used as exponential components (e.g., 2^snf_rad[r]), the range of the radius intervals may increase exponentially as they get farther away from the image center. In some embodiments, this may result in larger radius intervals closer to the edges and corners of the image frame, which may reduce the resolution at which radius points and radial gains may be defined. In one embodiment, if greater resolution is desired at the edges/corners of the image, rather than defining radius intervals and radius points as beginning from the center of an image frame, radius intervals and radius points may be defined beginning from a maximum radius, $R_{max}$, and may progress inwards towards the center of the image frame. Thus, more radius intervals may be concentrated towards the edges of the image frame, thereby providing greater radial resolution and more radial gain parameters closer the edges. In a further embodiment, rather than using the radius points as exponential components for calculating radius intervals, multiple equally spaced intervals may be provided in higher concentration. For instance, in one embodiment, 32 radius intervals of equal ranges may be provided between the center of the image and a maximum radius ($R_{max}$). Further, in certain embodiments, radius points and their defined intervals may be stored in a look-up table.

Referring still to FIG. 112, the upper and lower radius points may then be used to determine upper and lower radial gains, as depicted by sub-block 1368. As can be appreciated, the image frame may be subjected to intensity drop-offs that generally increase as the radial distance from center of the image frame increases. This may be due at least in part to the optical geometry of the lens (e.g., 88) of the image capture device 30. Accordingly, the radial gains may be set such that they generally increase for and the radius values farther away from the center. In one embodiment, the radial gains may have a range of from between approximately 0-4 and may be represented as 16-bit values with a 2-bit integer component and a 14-bit fraction component. In one embodiment, the radial gains may be defined by an array snf_rad_gain[g]:(0≤g≤3), wherein radial gains corresponding to the upper and lower points may be determined as follows:

G0=snf_rad_gain[R0];

G1=snf_rad_gain[R1];

Thereafter, at sub-block 1370, the lower and upper radial gains, G0 and G1, may be interpolated using the below expression to determine an interpolated radial gain (G):

G=[((G0*(R1_val−R_val))+((G*(R_val−R0_val))]/R_interval;

The interpolated radial gain G may then be applied to inverse noise standard deviation value (std_dev_inv determined from block 1350 of FIG. 110), as shown at sub-block 1372, which may produce a gained inverse noise standard deviation value, referred to herein as std_dev_inv_gained. As will be appreciated, in certain embodiments, the radial gain values may be stored using a look-up table.

Then, returning to FIG. 110 and continuing to sub-block 1354, an attenuation function is used to determine an attenuation factor. In some embodiments, the attenuation function may be based upon a Gaussian function. For instance, since sensor noise (photon noise) is multiplicative, the variance of the noise increases with brightness. Accordingly, the attenuation function may depend on the brightness of the current input pixel, which is represented here by std_dev_inv_gained. Thus, the attenuation factor that is to be applied to the filter coefficient of the current neighbor pixel may be calculated using the gained inverse noise standard deviation value (std_dcv_inv_gained) and the absolute difference (Δ) between the current pixel P and the current neighbor pixel. For instance, in one embodiment, the attenuation factor (Attn) at each filter tap may be determined using the following equation:

$$\text{Attn}=e^{(-0.5(delta^2 \times std\_dev\_inv\_gained^2))}$$

wherein delta represents the pixel difference between the current input pixel (P) and each neighbor pixel. For the current input pixel P at the center, the attenuation factor may be set to 1 (e.g., no attenuation is applied at the center tap of the 7×7 block).

As shown in the present embodiment, the attenuation factors for all taps of the SNF logic 1032 may be determined using the same gained standard deviation inverse value for all filter taps (e.g., std_dev_inv_gained), which is based on the radial distance between the center pixel and the center of the image frame. In further embodiments, separate respective standard deviation inverse values could also be determined for each filter taps. For instance, for each neighboring pixel, a radial distance between the neighboring pixel and the center of the image frame may be determined and, using the radial distance between the neighboring pixel and the center of the image frame (instead of the radial distance between the center pixel and the center of the image frame), a radial gain may be selected and applied to the standard deviation inverse value determined at block 1350 of FIG. 110 to determine a unique gained standard deviation inverse value for each filter tap.

As will be appreciated, the determination of an attenuation factor (Attn) may be performed for each filter tap of the SNF logic 1032 to obtain an attenuation factor, which may be applied to each filtering coefficient. Thus, assuming a 7×7 filter is used, as a result of block 1354, 49 attenuation factors may be determined, one for each filter tap of the 7×7 SNF logic 1032. Referring back to FIG. 109, particularly to block 1340 of the process 1330, the attenuation factors from block 1338 (as determined by sub-block 1354 of FIG. 110) may be applied to each filter tap of the SNF logic 1032 to obtain a resulting set of attenuated filtering coefficients.

As discussed above, each attenuated filtering coefficient is then applied to its respective pixel within the 7×7 block on which the SNF logic 1032 operates, as shown by block 1342 of process 1330. For normalization purposes, a sum (tap_sum) of all the attenuated filtering coefficients as well as a pixel sum (pix_sum) of all the filtered pixel values may be determined. For instance, at block 1344, a spatially filtered output value O(j,i) that corresponds to the input pixel P(j,i) may be determined by dividing the sum of the filtered pixels (pix_sum) by the sum of the attenuated filter coefficients (tap_sum). Thus, the process 1330 illustrated in FIG. 109 provides an embodiment which details how spatial noise filtering may be applied to one input pixel. As will be appreciated, to apply spatial noise filtering to an entire raw frame of pixel data, the process 1330 may be repeated for each pixel within a current raw frame using the spatial filtering techniques discussed above. In a further embodiment, the determination of attenuation factors for the SNF logic 1032 filter taps may be performed using values obtained from a set look-up tables with interpolation of table values. For instance, in one embodiment, attenuation values may be stored in a three-dimensional look-up table, referred to herein as snf_attn[c][x][delta], wherein [c] represents a color component index having a range of 0-3 (e.g., representing the four color components of Bayer raw data), x represents a pixel brightness index having a range of 0-4, and delta represents a pixel difference index having a range of 0-32. In such an embodiment, the table snf_attn may store attenuation values having a range from 0.0 to 1.0, with a 14-bit fraction. An array snf_attn_max[c][x] may define a maximum pixel difference per color component (0-3) for each pixel brightness (x). In one embodiment, when pixel differences are greater than 2^snf_attn_max, the attenuation factor may be set to 0.

The snf_attn table may store attenuation factors that cover the pixel difference range from 0 to 2^[(snf_bright_thd)−1], where snf_bright_thd[c][thd] defines pixel brightness level thresholds (thd=0-2) per component (c=0-3), with thresholds being represented as 2^snf_bright_thd[c][i]. As can be appreciated, this may represent the pixel thresholds for the snf_attn pixel brightness index. For example, the first threshold may be equal to 0, and the last threshold may be equal to 2^14−1, thus defining 4 intervals. The attenuation factors for each filter tap may be obtained by linear interpolation from the closest pixel brightness (x) and pixel differences values (delta).

Figure 113:
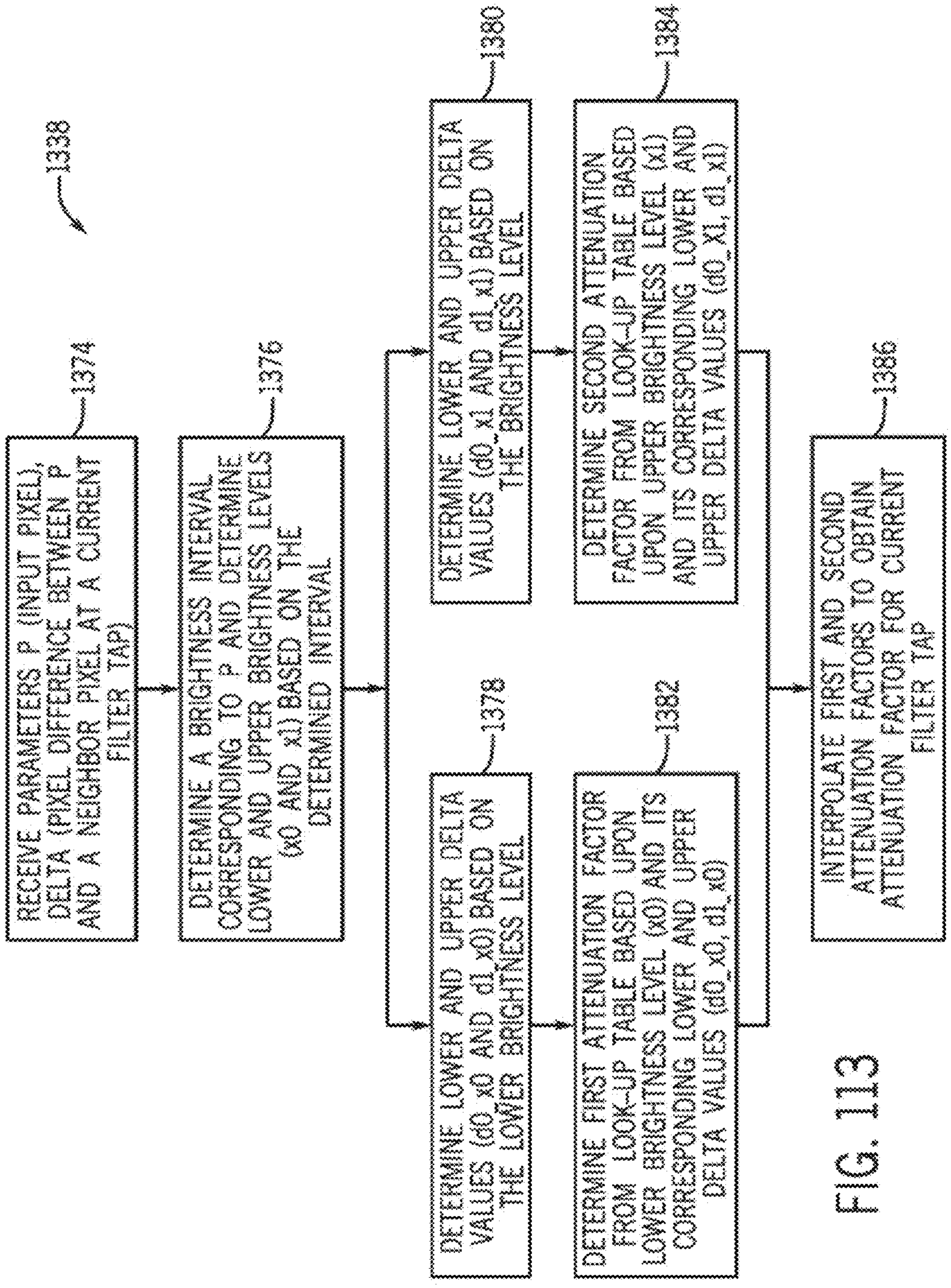
FIG. 113 is a flowchart illustrating a process for determining an interpolated green value for the input pixel, in accordance with an embodiment.

Referring now to FIG. 113, a flow chart showing another embodiment of sub-process 1338 is illustrated in accordance with the above-described embodiment. The sub-process 1338 illustrated in FIG. 113 includes sub-blocks 1374-286, and depicts a process for using a look-up table based approach for interpolating attenuation values to obtain an attenuation values for a current filter tap. As shown the sub-process 1338 of FIG. 113 begins at sub-block 1374, where parameters corresponding to the value of the current input pixel (P) and the pixel difference (delta) between P and the neighbor pixel corresponding to the current filter tap. As discussed above, in one embodiment, rather than providing just the value of the current input pixel, the brightness value P could also be provided as an average of brightness values of the pixels in a 3×3 pixel block centered at the current input pixel.

Next, the sub-process 1338 continues to sub-blocks 1378 and 1380. At these sub-blocks, lower and upper pixel difference levels based each of the lower and upper brightness levels (x0 and x1) are determined. For instance, at sub-block 1378, lower and upper pixel difference levels (d0_x0 and d1_x0) corresponding to the lower brightness level (x0) are determined, and at sub-block 1380, lower and upper pixel difference levels (d0_x1 and d1_x1) corresponding to the upper brightness level (x0) are determined. In one embodiment, the processes at sub-blocks 1378 and 1380 may be determined using the following logic:

```
interval_x0 = (2^snf_attn_max[comp][x0]/32); //size of interval
interval_x1 = (2^snf_attn_max[comp][x1]/32); //size of interval
shift_x0 = snf_attn_max[comp][x0]−5; //log2(interval)
shift_x1 = snf_attn_max[comp][x1]−5; //log2(interval)
//lower and upper deltas for x0
for (i=0; i<33; i++)
{
    if(delta < (i+1)*interval_x0)
    {
        d0_x0 = i;
        d1_x0 = i+1;
    }
}
//lower and upper delta for x1
for (i=0; i<33; i++)
{
    if (delta < (i+1)*interval_x1)
    {
        d0_x1 = i;
        d1_x1 = i+1;
    }
}
```

Thereafter, sub-block 1378 may continue to sub-block 1382, and sub-block 1380 may continue to sub-block 1384. As shown in FIG. 113, at sub-blocks 1380 and 1384, first and second attenuation factors corresponding to the upper and lower brightness levels, respectively, may be determined using the table snf_attn and the delta levels determined at sub-blocks 1378 and 1380. For instance, in one embodiment, the determination of the first and second attenuation factors (attn0 and attn1) at sub-blocks 1382 and 1384 may be performed using the following logic:

```
//attn (first attenuation factor) corresponding to x0
attn0 = (snf_attn[c][x0][d0_x0] * (d1_x0*interval_x0 − delta) +
            snf_attn[c][x0][d1_x0] * (delta − d0_x0*interval_x0))
        >> shift_x0;
//attn (first attenuation factor) corresponding to x1
attn1 = (snf_attn[c][x1][d0_x1] * (d1_x1*interval_x1 − delta) +
    snf_attn[c][x1][d1_x1] * (delta − d0_x1*interval_x1))
            >> shift_x1;
```

Thereafter, the first and second attenuation factors may be interpolated, as shown at sub-block 1386, to obtain a final attenuation factor (attn) that may be applied to the current filter tap. In one embodiment, the interpolation of the first and second attenuation factor may be accomplished using the following logic:

```
x0_value=2^snf_bright_thd[c][x0];
x1_value=2^snf_bright_thd[c][x1];
x_interval=x1_value−x0_value;
attn=(((attn0*(x1_value−P))+((attn1*(P−x0_value)))/
x_interval;
```

The sub-process 1338 may be repeated for each filter tap to obtain a corresponding attenuation factor. Once the attenuation factors for each filter tap have been determined, the sub-process 1338 may return to block 1350 of the process 1330 shown in FIG. 109, and the process 1330 may continue, as described above. As will be appreciated, the look-up table snf_attn may be programmed such that its attenuation values are modeled based upon a Gaussian distribution (e.g., a function similar to Equation 2 above). Further, while snf_attn is described as providing a range of attenuation values ranging from 0.0 to 1.0, in other embodiments, snf_attn may also provide values greater than 1.0 (e.g. from 0.0 to 4.0). Thus, if a factor greater than 1 is selected, this may implement image sharpening, where larger pixel differences (deltas) are amplified and/or increased.

The processes discussed above with respect to FIGS. 10-15 have been described in the context of a bilateral filtering mode that may be implemented by the SNF logic 1032 shown in FIG. 8. As mentioned above, in certain embodiments, the SNF logic 1032 may also be configured to operate in a non-local means filtering mode. The non-local means filtering mode may be performed in a similar manner as with the bilateral filtering mode, except that an absolute difference value between the current input pixel P(j,i) and each neighbor pixel within the 7×7 block (FIG. 108) is determined by taking the sum of absolute differences of a 3×3 window centered around the current pixel against a 3×3 window centered around each neighbor pixel, and then normalizing the result by the number of pixels (e.g., 9 pixels when a 3×3 window is used).

Figure 114:
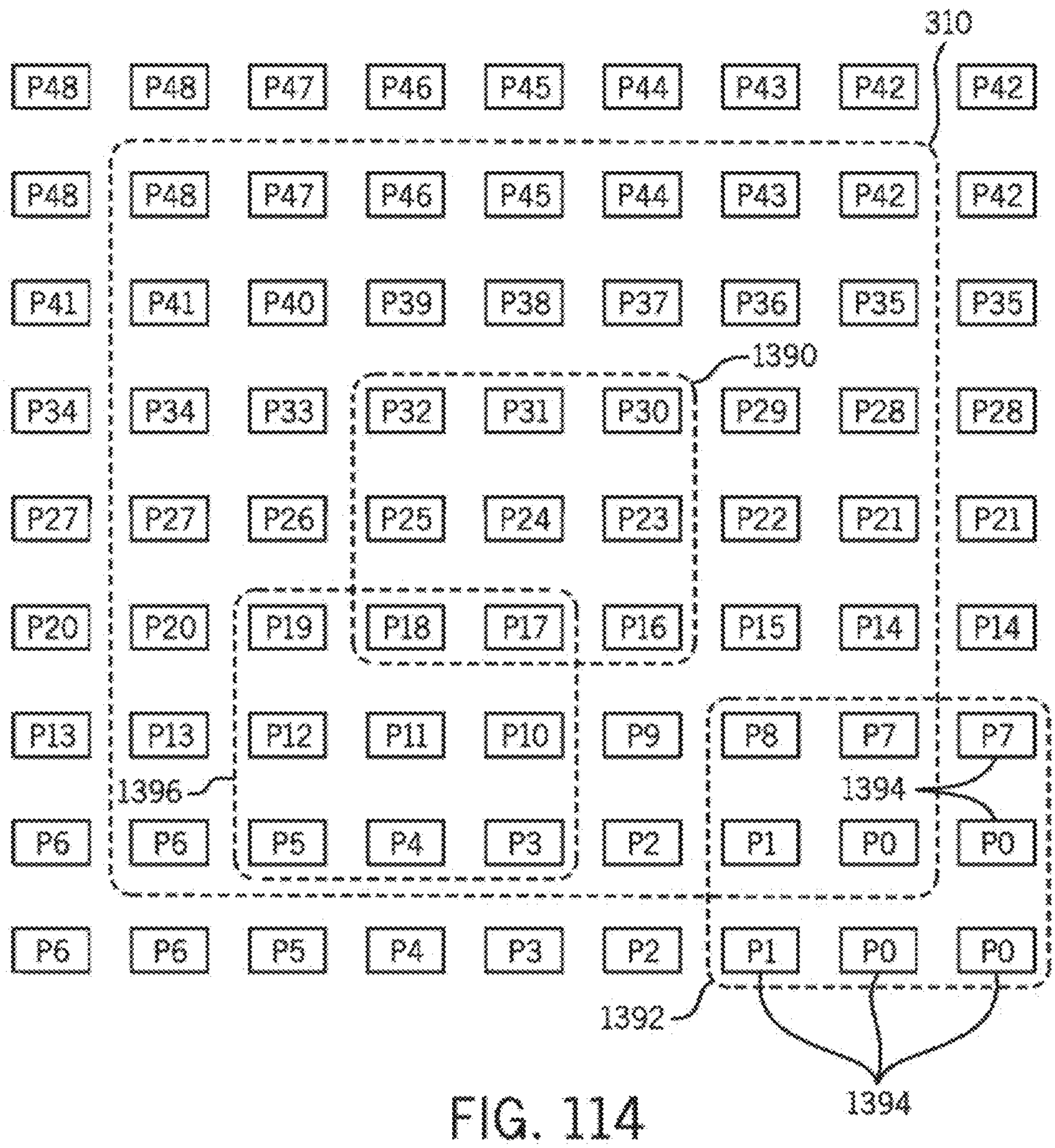
FIG. 114 illustrates an example of how pixel absolute difference values may be determined when the SNF logic operates in a non-local means mode in applying spatial noise filtering to the 7×7 block of pixels of FIG. 108.

FIG. 114 shows an example of how pixel absolute difference values may be determined when the SNF logic 1032 operates in a non-local means mode in applying spatial noise filtering to the 7×7 block of pixels 1328 (originally depicted in FIG. 108). When determining an absolute pixel difference between the input pixel P24 and P0, a 3×3 window 1390 of pixels centered about P24 is compared to a 3×3 window 1392 of pixels centered about P0. Since P0 is located at the edge of the 7×7 block 1328, the 3×3 window is obtained by replicating edge pixels P7, P0, and P1. The replicated pixels are depicted here by reference number 1394.

The absolute difference value is then calculated by obtaining a sum of the absolute differences between each corresponding pixel in the windows 1390 and 1392, and normalizing the result by the total number of pixels in a window. For instance, when determining the absolute difference value between P24 and P0 in the non-local means mode, the absolute differences between each of P32 and P8, P31 and P7, P30 and P7, P25 and P1, P24 and P0, P23 and P0, P18 and P1, P17 and P0, and P16 and P0 are summed to obtain a total absolute difference between the windows 1390 and 1392. The total absolute difference value is then normalized by the number of pixels in a window, which may be done here by dividing the total absolute difference value by 9. Similarly, when determining the absolute difference value between P24 and P11, the 3×3 window 1390 and the 3×3 window 1396 (centered about P11) are compared, and the absolute difference between each of P32 and P19, P31 and P18, P30 and P17, P25 and P12, P24 and P11, P23 and P10, P18 and P5, P17 and P6, and P16 and P7 are summed to determine a total absolute difference between the windows 1390 and 1396, and then divided by 9 to obtain a normalized absolute difference value between P24 and P11. As can be appreciated, this process may then be repeated for each neighbor pixel within the 7×7 block 1328 by comparing the 3×3 window 1390 with 3×3 windows centered about every other neighbor pixel within the 7×7 block 1328, with edge pixels being replicated for neighbor pixels located at the edges of the 7×7 block.

The absolute pixel difference values calculated using this non-local means mode technique may similarly be used in the process 1330 of FIG. 109 to determine attenuation factors and radial gains for applying spatial noise filtering to the input pixel (e.g. P24). In other words, the non-local means mode of filtering is generally similar to the bilateral mode discussed above, with the exception that the pixel differences are calculated by comparing summed and normalized pixel differences using 3×3 windows centered around a neighbor pixel and the input pixel within the 7×7 block 1328 rather than simply taking the absolute difference between a single neighbor pixel and the input pixel. Additionally, the use of a 3×3 window in the present embodiment is only intended to provide one example of a non-local means filtering technique, and should not be construed as being limiting in this regard. Indeed, other embodiments, may utilize 5×5 windows within the 7×7 block, or 5×5 or 7×7 windows within a larger pixel block (e.g., 11×11 pixels, 13×13 pixels, etc.), for example.

In some embodiments, the selection of either the bilateral or non-local means filtering mode by the SNF logic 1032 may be determined by one or more parameters set by the control logic 84, such as by toggling a variable in software or by a value written to a hardware control register. The use of the non-local means filtering mode may offer some advantages in certain image conditions. For instance, the non-local means filtering made may exhibit increased robustness over the bilateral filtering mode by improving de-noising in flat fields while preserving edges. This may improve overall image sharpness. However, as shown above, the non-local means filtering mode may require that the SNF logic 1032 perform significantly more computations, including at least 10 additional processing steps for comparing each neighbor pixel to the current input pixel, including 8 additional pixel difference calculations for each 3×3 window (for each of the eight pixels surrounding the input pixel and the neighbor pixel), a calculation to determine the sum of the pixel absolute differences, and a calculation to normalize the pixel absolute difference total. Thus, for 48 neighbor pixels, this may result in at least 480 (48*10) processing steps. Thus, in instances where processing cycles, power, and/or resources are limited, the SNF logic 1032 may be configured to operate in the bilateral mode.

Figure 115:
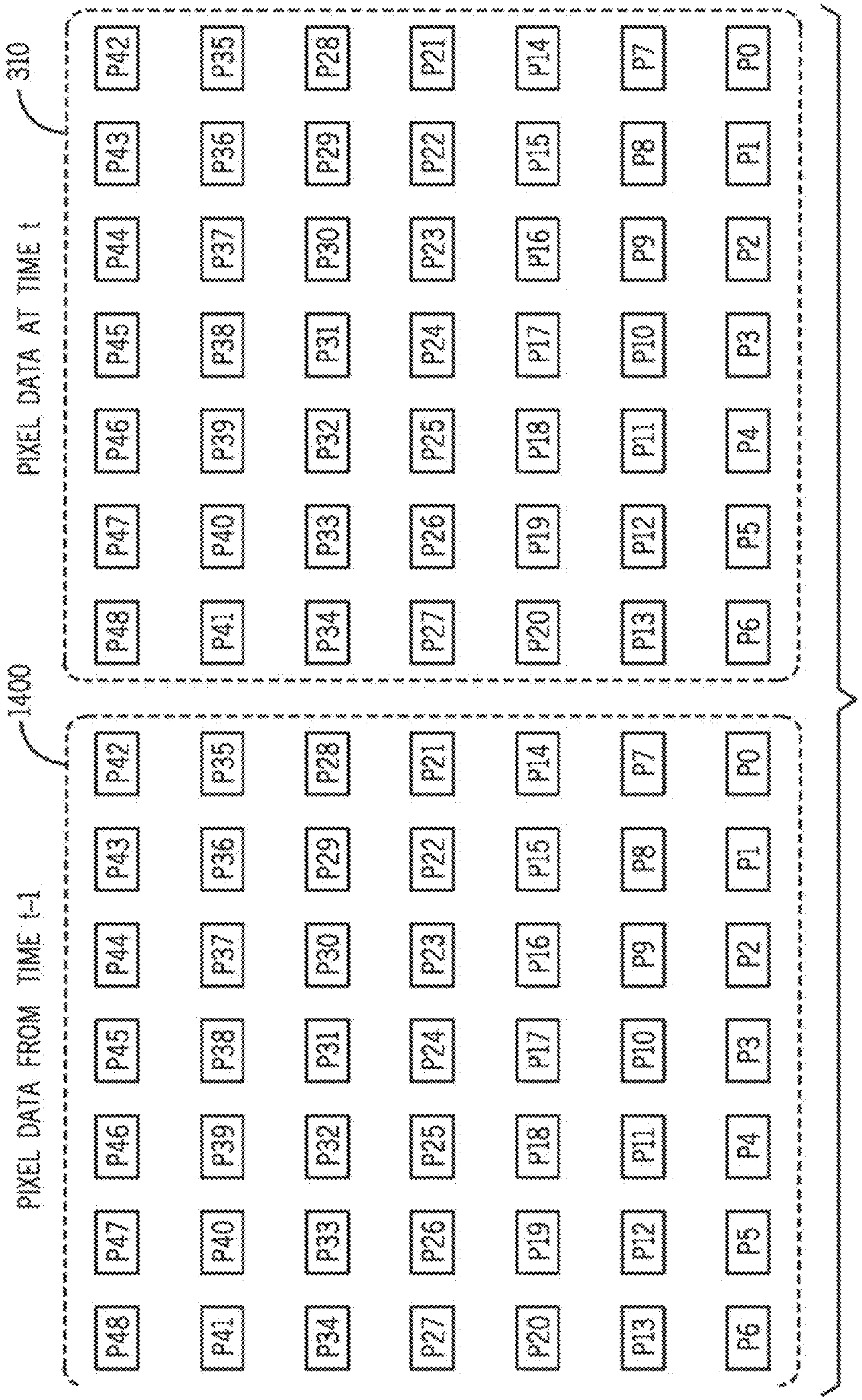
FIG. 115 illustrates an example of the SNF logic configured to operate in a three-dimensional mode, in accordance with an embodiment.

In the above-discussed embodiments, the SNF logic 1032 was described as operating as a two-dimensional filter. In a further embodiment, the SNF logic 1032 may also be configured to operate in a three-dimensional mode, which is illustrated in FIG. 115. In the three-dimensional mode, spatial noise filtering may be performed by further applying the spatial filtering process 1330 (FIG. 109) in the temporal direction. For instance, three-dimensional spatial filtering may include using a 7×7 block 1328 of neighbor pixels of a current frame of image data (at time t) to apply spatial filtering to a current input pixel ($P24_t$) to obtain a first spatially filtered output value corresponding to the current input pixel. Spatial filtering may also be applied to the current input pixel ($P24_t$) using co-located neighbor pixels from a 7×7 block 1400 in a previous frame of image data (at time t−1) to obtain a second spatially filtered output value corresponding to the current input pixel. The first and second spatially filtered values may be combined using weighted averaging to obtain a final spatially filtered output value corresponding to the current input pixel. As will be appreciated, three-dimensional spatial noise filtering may be performed using either the bilateral mode or the non-local means mode discussed above.

Figure 116:
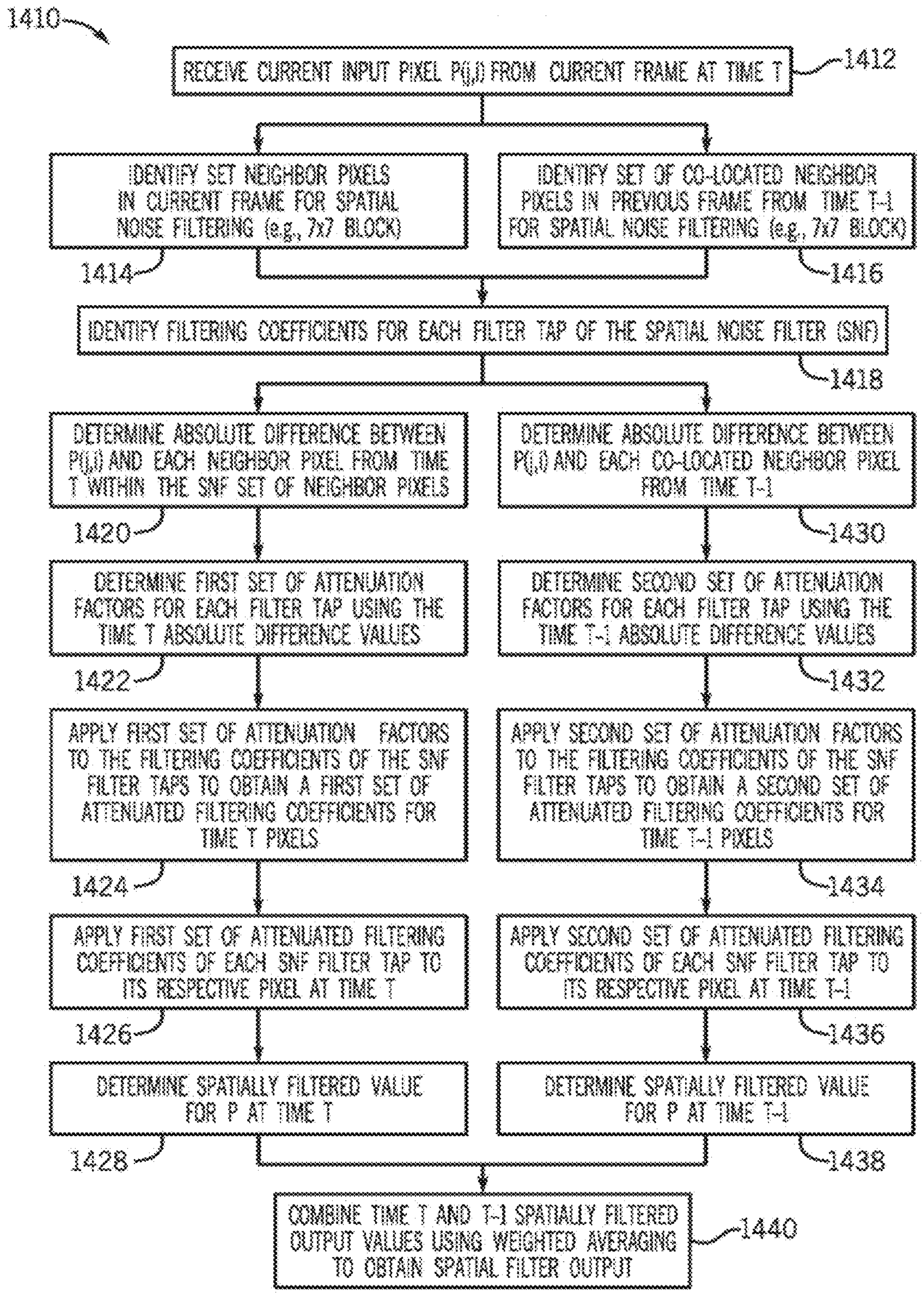
FIG. 116 is a flowchart illustrating a process for three-dimensional spatial noise filtering, in accordance with an embodiment.

A process 1410 depicting an embodiment for three-dimensional spatial noise filtering is depicted in more detail in FIG. 116. For instance, the process 1410 begins at block 1412 and receives a current input pixel P from a current from at time t. Referring concurrently to FIG. 115, the current pixel P may correspond to $P24_t$ from the 7×7 block 1328. Next, at block 1414, a set of neighbor pixels in the current frame (time t) on which the SNF logic 1032 may operate is identified. This set of neighbor pixels may be represented by the 7×7 block 1328 from time t, as shown in FIG. 115. Additionally, at block 1416, which may occur concurrently with block 1414, a set of neighbor pixels in a previous frame from time t−1, which are co-located with the pixels of the 7×7 block 1328 at time t, are identified. This set of co-located neighbor pixels may be represented by the 7×7 block 1400 from time t−1, as shown in FIG. 115.

Next, at block 1418, filtering coefficients for each filter tap of the SNF logic 1032 are determined. In the depicted embodiment, the same filtering coefficients may be applied to the pixel data from time t and from time t−1. However, as discussed below, the attenuation factors applied to the filtering coefficients may vary between the pixels at time t and at time t−1 depending on differences in the absolute difference values between the input pixel ($P24_t$) and the neighbor pixels of the current frame (at time t) and the neighbor pixels of the previous frame (at time t−1). Referring now to blocks 1420-1428, these blocks generally represent the process 1330 discussed above in FIG. 109. For instance, at block 1420, absolute difference values between the current input pixel P at time t and the neighbor pixel within the 7×7 block 1328 of time t are determined. As will be appreciated, the absolute difference values may be determined using either of the bilateral or non-local means techniques described above. Using the absolute difference values from block 1420, a first set of attenuation factors corresponding to the pixels at time t are determined at block 1422. At block 1424, the first set of attenuation factors may then be applied to the filtering coefficients of the SNF logic 1032 to obtain a first set of attenuated filtering coefficients for the pixels at time t. Then, the first set of attenuated filtering coefficients is applied to the pixels from time t within the 7×7 block 1328, as indicated by block 1426. Thereafter, a spatially filtered value for the input pixel P based on the neighbor pixel values at time t is determined at block 1428. For example, as discussed above, obtaining the spatially filtered value may include normalizing the sum of the filtered pixels from block 1426 by the sum of the first set of attenuated filter coefficients determined at block 1424.

Blocks 1430-1438 may occur generally concurrently with blocks 1420-1428, and represent the spatial filtering process 1330 of FIG. 109 being applied to the input pixel P using the co-located neighbor pixels (e.g., within the 7×7 block 1400) from time t−1. That is, the spatial filtering process is essentially repeated in blocks 1430-1438 for the current input pixel P, but with respect to the neighbor pixels from time t−1 instead of the current pixels from time t. For example, at block 1430, absolute difference values between the current input pixel P at time t and the neighbor pixel within the 7×7 block 1400 of time t−1 are determined. Using the absolute difference values from block 1430, a second set of attenuation factors corresponding to the pixels at time t−1 are determined at block 1432. At block 1434, the second set of attenuation factors may then be applied to the filtering coefficients of the SNF logic 1032 to obtain a second set of attenuated filtering coefficients for the pixels at time t−1. Subsequently, the second set of attenuated filtering coefficients is applied to the pixels from time t−1 within the 7×7 block 1400, as indicated by block 1436. Thereafter, a spatially filtered value for the input pixel P based on the neighbor pixel values at time t−1 is determined at block 1438.

Once the spatially filtered values for P at time t and time t−1 are determined, they may be combined using weighted averaging, as depicted by block 1440. For instance, in one embodiment, the output of the SNF logic 1032 may simply be determined as the mean of the spatially filtered values at time t and time t−1 (e.g., equal weighting). In other embodiments, the current frame (time t) may be weighted more heavily. For instance, the output of the SNF logic 1032 may be determined as being 80 percent of the spatially filtered value from time t and 20 percent of the spatially filtered value from time t−1, or 60 percent of the spatially filtered value from time t and 40 percent of the spatially filtered value from time t−1, and so forth. In a further embodiments, three-dimensional spatial filtering may also utilize more than one previous frame. For instance, in the SNF logic 1032 could also apply the spatial filtering processing using the current pixel P with respect to co-located neighbor pixels from the frame at time t−1, as well as one or more additional previous image frames (e.g., at time t−2, time t−3, etc.). In such embodiments, weighted averaging may thus be performed on three or more spatially filtered values corresponding to different times. For instance, by way of example only, in one embodiment where the SNF logic 1032 operates on a current frame (time t) and two previous frames (time t−1 and time t−2), the weighting may be such that the spatially filtered value from time t is weighted 60 percent, the spatially filtered value from time t−1 is weighted 30 percent, and the spatially filtered value from time t−2 is weighted 10 percent.

In another embodiment, rather than simply averaging the spatially filtered values corresponding to times t and t−1, normalization may be performed on all filter taps from the current and previous image data. For instance, in an embodiment where a 7×7 block of pixels is evaluated at times t and t−1 (e.g., 49 taps at time t and 49 taps at time t−1 for a total of 98 taps), attenuation may be applied to all of the taps and the resulting filtered pixel values at both times t and t−1 may be summed and normalized by dividing the sum by the sum of the attenuated filter coefficients at both times t and t−1. As will be appreciated, in some embodiments, this technique may offer improved accuracy compared to techniques that use either an equal or weighted average by excluding pixel-to-pixel variations. Additionally, this technique may be useful in implementations where it is difficult to select an appropriate/ideal weighting parameter.

Additionally, it should be noted that the pixels from time t−1 may be selected as either the original (e.g., non-filtered) pixels of the previous frame, in which case the SNF logic 1032 operates as a non-recursive filter, or as the filtered pixels of the previous frame, in which case the SNF logic 1032 operates as a recursive filter. In one embodiment, the SNF logic 1032 may be capable of operating in both recursive and non-recursive modes, with the selection of the filtering mode being determined by control logic 84.

In some embodiments, the SNF logic 1032 may be initialized using a calibration procedure. In one embodiment, the calibration of the SNF logic 1032 may be based upon measured noise levels in the image sensor at different light levels. For instance, noise variance, which may be measured as part of the calibration of the image capture device(s) 30 (e.g., a camera) may be used by the control logic 84 (e.g., firmware) to determine spatial noise filter coefficients, as well as standard deviation values for spatial noise filtering.

Simple Demosaicing (DEM) for Highlight Recovery (HR)

Figure 117:
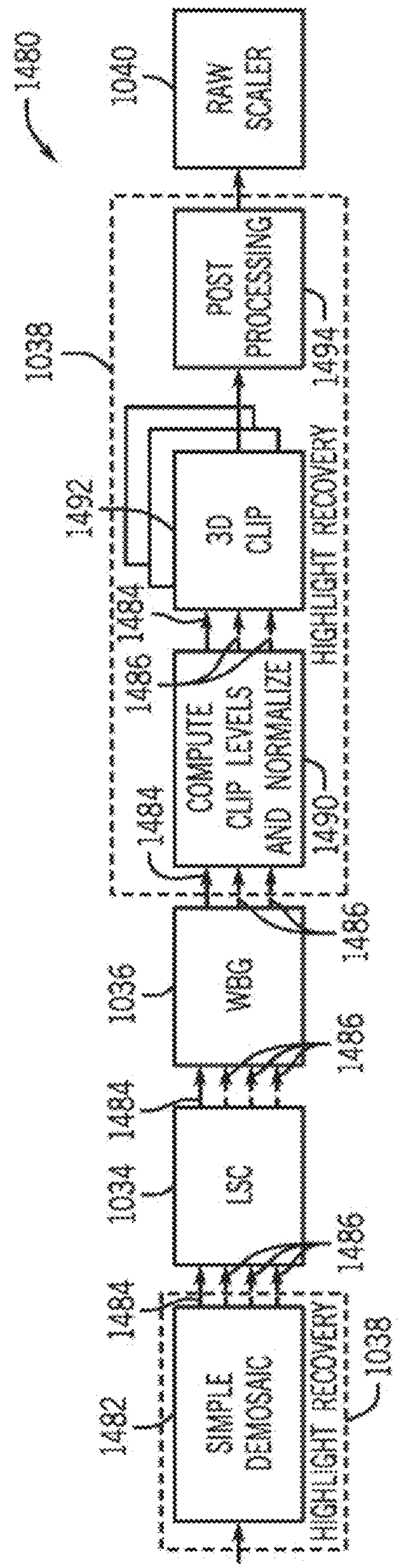
FIG. 117 is a block diagram illustrating a process path for pixel data in the ISP pipe, in accordance with an embodiment.

Having described the operation and various processing techniques associated with the spatial noise filter logic 1032, the present discussion will now turn to a discussion of the processing that may occur between the signal noise filter logic and raw scaler logic. Namely, as illustrated in FIG. 117, a simple demosaicing process 1482, lens shading correction logic 1034, white balance gains logic 1036, and highlight recovery logic 1038 may be applied to the outputs from the spatial noise filter logic 1032. When the highlight recovery logic 1038 is disabled, these missing color samples are not needed, and the simple demosaicing process 1482 may simply return 0 values for the interpolated color channels 1486, passing only the known color values 1484. However, as will be discussed in more detail below, the simple demosaicing process 1482 may be an optional step, useful when the highlight recovery logic 1038 is enabled. Hence, the simple demosaicing process 1482 is illustrated as part of the highlight recovery logic 1038.

Figure 118:
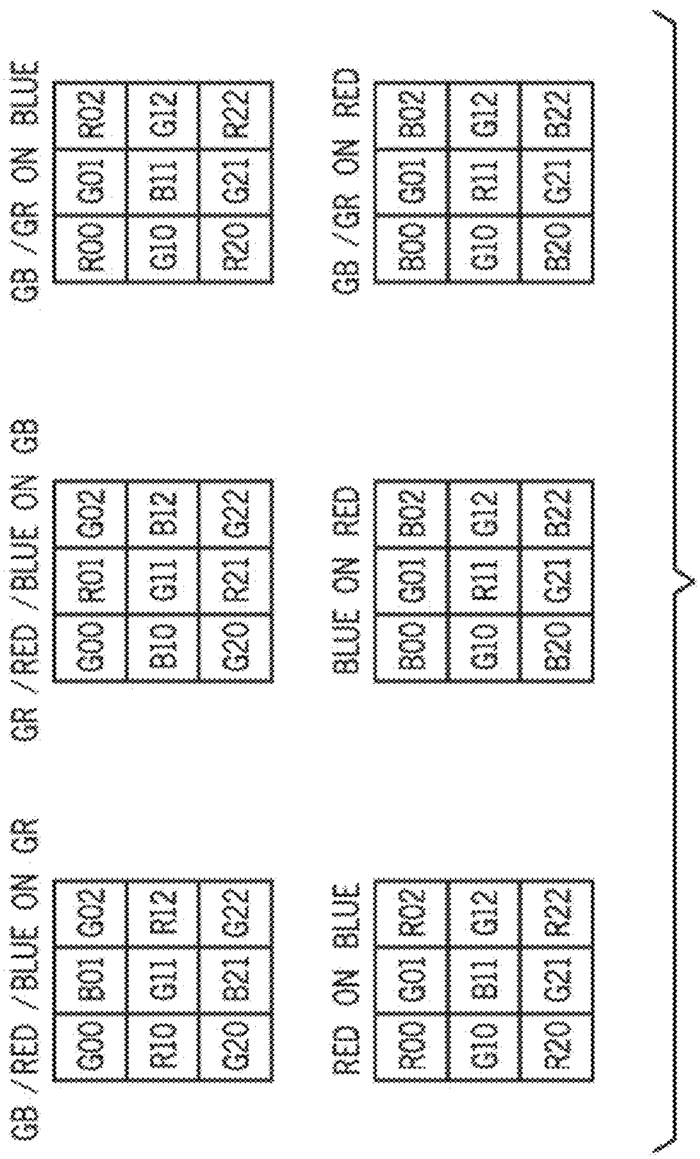
FIG. 118 illustrates examples of various combinations of pixels with missing color samples.

The simple demosaicing process 1482 may interpolate missing color samples (e.g., color channels) using bi-linear interpolation. For example, green-red, blue, and green-blue color channel values may be interpolated for a red pixel; red, blue and green-blue color channels may be interpolated for green-red pixels; green-red, red, and blue pixels may be interpolated for green-blue pixels; and green-red, green-blue, and red color channel values may be interpolated for blue pixels. To further illustrate the simple demosaicing process, FIG. 118 illustrates various combinations of pixels and the following formulas illustrate how the missing color samples may be interpolated from the combinations of pixels.

For Red on Green-red: R'11=(R10+R12)/2

For Red on Green-blue: R'11=(R01+R21)/2

For Red on Blue: R'11=(R00+R02+R20+R22)/4
For Blue on Green-red: B'11=(B01+B21)/2
For Blue on Green-blue: B'11=(B10+B12)/2
For Blue on Red: B'11=(B00+B02+B20+B22)/4
For Green-red on Red: Green-red'11=(G10+G12)/2
For Green-red on Blue: Green-red'11=G01+G21)/2
For Green-red on Green-blue: Green-red'11=(G00+G02+G20+G22)/4
For Green-blue on red: Green-blue'11=(G01+G21)/2
For Green-blue on blue: Green-blue'11=(G10+G12)/2
For Green-blue on Green-red: Green-blue'11=(G00+G02+G20+G22)/4

Once the interpolated color values have been calculated, the values along with the pre-existing pixel values are provided to the lens shading correction logic 1034 for further processing.

Lens Shading Correction (LSC)

Referring again back to the block diagram shown in FIG. 117, the output of the simple demosaic logic 1482 is subsequently sent to the lens shading correction (LSC) logic 1034 for processing. As discussed above, lens shading correction techniques may include applying an appropriate gain on a per-pixel basis to compensate for drop-offs in light intensity, which may be the result of the geometric optics of the lens, imperfections in manufacturing, misalignment of the microlens array and the color array filter, and so forth. Further, the infrared (IR) filter in some lenses may cause the drop-off to be illuminant-dependent and, thus, lens shading gains may be adapted depending upon the light source detected.

In the depicted embodiment, the LSC logic 1034 of the ISP pipe 82 may be implemented in a similar manner, and thus provide generally the same functions, as the LSC logic 476 of the ISP pipe processing logic 80, as discussed above with reference to FIGS. 54-62. Accordingly, in order to avoid redundancy, it should be understood that the LSC logic 1034 of the presently illustrated embodiment is configured to operate in generally the same manner as the LSC logic 476 and, as such, the description of the lens shading correction techniques provided above will not be repeated here. However, to generally summarize, it should be understood that the LSC logic 1034 may process each color component of the raw pixel data stream independently to determine a gain to apply to the current pixel. In accordance with the above-discussed embodiments, the lens shading correction gain may be determined based upon a defined set of gain grid points distributed across the imaging frame, wherein the interval between each grid point is defined by a number of pixels (e.g., 8 pixels, 16 pixels etc.). If the location of the current pixel corresponds to a grid point, then the gain value associated with that grid point is applied to the current pixel. However, if the location of the current pixel is between grid points (e.g., G0, G1, G2, and G3 of FIG. 74), then the LSC gain value may be calculated by interpolation of the grid points between which the current pixel is located (Equations 13a and 13b). This process is depicted by the process 612 of FIG. 58. Further, as mentioned above with respect to FIG. 56, in some embodiments, the grid points may be distributed unevenly (e.g., logarithmically), such that the grid points are less concentrated in the center of the LSC region 588, but more concentrated towards the corners of the LSC region 588, typically where lens shading distortion is more noticeable.

Additionally, as discussed above with reference to FIGS. 61 and 62, the LSC logic 1034 may also apply a radial gain component with the grid gain values. The radial gain component may be determined based upon distance of the current pixel from the center of the image (Equations 14-16). As mentioned, using a radial gain allows for the use of single common gain grid for all color components, which may greatly reduce the total storage space required for storing separate gain grids for each color component. This reduction in grid gain data may decrease implementation costs, as grid gain data tables may account for a significant portion of memory or chip area in image processing hardware.

White Balance Gain (WBG)

The outputs from the lens shading correction logic 1034 may be sent to the white balancing gains (WBG) logic 1036. The WBG logic 1036 provides digital gains for white balance, offset, and clip independently for each of the color components (e.g., Gr, R, B, and Gb). The lens shading correction logic 1034 provides an input including each for the color components at each pixel where one component is the original Bayer pixel value 1484 and the other three components are demosaiced or interpolated pixel values 1486. The WBG logic 1036 applies white balance gains to all four components at each pixel. First, the input value is offset by a signed value, multiplied by a gain in the range of 0 to 4×, offset by a second signed value and then clipped to a [min, max] range as follows:

$$Y[c]=((X[c]+O1[c])*G[c]+O2[c])$$

$$Y[c]=(Y[c]<min[c])?\ min[c]:\ Y[c]>max[c]:\ max[c]:\ Y[c]$$

where X[c] is the input pixel value (c=Gr, R, B, and Gb), O1[c] is a signed input offset for component c, G[c] is the gain value for component c, O2[c] is a signed output offset for component c, min[c] is a clip value for the minimum output values, and max[c] is a clip value for the maximum output values. The gains G[c] are 16-bit unsigned numbers with 14 fraction bits (e.g., a 2.14 representation). Gain may be applied with rounding.

The outputs from the WBG logic 1036 may include four components values at each pixel with a signed 17-bit representation. The number of pixels that were clipped above and below max and min for the component of the Bayer color of the pixel (e.g., the Gr components are counted for Gr pixels). These outputs of the WBG logic 1036 are provided to highlight recovery (HR) logic, which will now be discussed in detail.

Highlight Recovery (HR)

Image sensors have finite ranges of illuminance that may be captured. When the sensors for particular pixels receive an amount of light exceeding these finite ranges, the pixel values clip to the maximum pixel value. For example, with a 10-bit sensor, any illuminance larger than the one corresponding to the pixel value of 1023 is mapped to 1023 even though the brightness may be much higher. Previously, because the pixel values were limited by the sensor's range, some color information was lost because the pixel values were set to the maximum range values without compensating for values beyond the sensor's finite range. Thus, in many instances, the colors were incorrect since the clip level is different for each color channel and pixel location after white balancing and lens shading correction logic is applied. For example, a white cloud can appear as magenta if highlight recovery is not performed. In certain embodiments, when one color channel clips, ISP logic may clip each of the other color channels. However, such an embodiment may lead to an unnecessary loss of an effective dynamic range of pixel values.

The highlight recovery (HR) logic attempts to estimate pixel values that are clipped based upon the pixel values of other color channels that are not clipped. For example, when the green channel is clipped while the red and blue channels are not clipped, the highlight recovery logic may predict a value for the green channel using the unclipped values from the red and blue channels. Thus, as discussed above, the interpolated color channel values may be useful to aid in the highlight recovery pixel value estimations. While the examples described herein specifically discuss pixels arranged in a Bayer pattern (red, green-red, green-blue, and blue), other alternatives may be available. For example, color channels could each be treated separately, forming pixel color arrangements (e.g., red, green, blue, and white).

Figure 119:
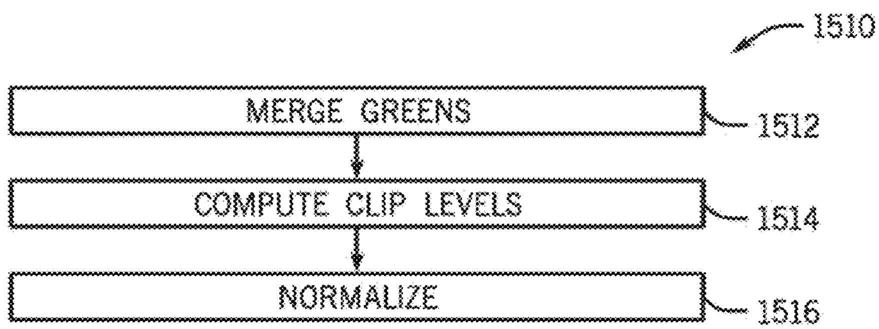
FIG. 119 is a flowchart illustrating a process for computing clip levels and normalizing pixel values for a highlight recovery process, in accordance with an embodiment.

As illustrated in FIG. 117 and will be discussed in detail below, the highlight recovery logic 1038 may include clip level computations and pixel intensity normalization logic 1490. FIG. 119 illustrates the clip level computations and pixel intensity normalization logic 1490 in more detail. First, the green-red and green-blue color values are merged into one green value at each pixel (block 1512). For a green-red pixel, the green-red value is used. For a green-blue pixel, the green-blue value is used. For a red or blue pixel, the green-red and green-blue pixel values are averaged (e.g., (Green-blue+Green-red)/2). Next, at block 1514, the clip levels for the pixels are computed. The clip level is computed from the maximum value of the sensor and the gains applied in the lens shading correction logic 1034. The clip level computations may be calculated solely for the color component related to the pixel. For example, for a red pixel, the red clip level is computed. The clip levels may be determined as follows:

The clip level of the red pixels=Maximum sensor level for the red pixels*Lens shading gain applied to the red pixel+a programmable offset to the red clip levels.

The clip level of the green-red pixels=Maximum sensor level for the green-red pixels*Lens shading gain applied to the green-red pixels+a programmable offset to the green-red clip levels.

The clip level of the green-blue pixels=Maximum sensor level for the green-blue pixels*Lens shading gain applied to the green-blue pixels+a programmable offset to the green-blue clip levels.

The clip level of the blue pixels=Maximum sensor level for the blue pixels*Lens shading gain applied to the blue pixels+a programmable offset to the blue clip levels.

Because the lens shading gains were computed by the LSC logic 1034, they do not need to be recalculated for highlight recovery. Instead, these gains are merely provided by the LSC logic 1034 to the highlight recovery logic 1038.

The calculated clip values may be represented by 17 bits of data. The pixel values may be normalized by these clip values of the pixel color (block 1516). Specifically, the color channel pixel values of a pixel (e.g., the red, green', and blue values) may be divided by the clip level associated with the Bayer color of the pixel. For example, the denominator for normalizing a red pixel would be the clip level of the red pixel. As discussed above, the green pixel values have been merged, and thus only three normalization values may need to be calculated for each pixel. In one example, the following formulas may be useful in normalizing the pixel values of a red pixel:

Red pixel normalization=red pixel value/calculated clip level of the red pixel

Green pixel normalization'=merged green pixel value'/calculated clip level of the red pixel Blue pixel normalization'=blue pixel value'/calculated clip level of the red pixel Further, the green-red pixels may be normalized according to:

Red pixel normalization'=red pixel value'/calculated clip level of the green-red pixel Green pixel normalization=merged green pixel value/calculated clip level of the green-red pixel Blue pixel normalization'=blue pixel value'/calculated clip level of the green-red pixel The green-blue pixels may be normalized according to:

Red pixel normalization'=red pixel value'/calculated clip level of the green-blue pixel Green pixel normalization=merged green pixel value/calculated clip level of the green-blue pixel Blue pixel normalization'=blue pixel value'/calculated clip level of the green-blue pixel.

The blue pixels may be normalized according to:

Red pixel normalization'=red pixel value'/calculated clip level of the blue pixel Green pixel normalization'=merged green pixel value'/calculated clip level of the blue pixel Blue pixel normalization=blue pixel value/calculated clip level of the blue pixel.

Figure 120:
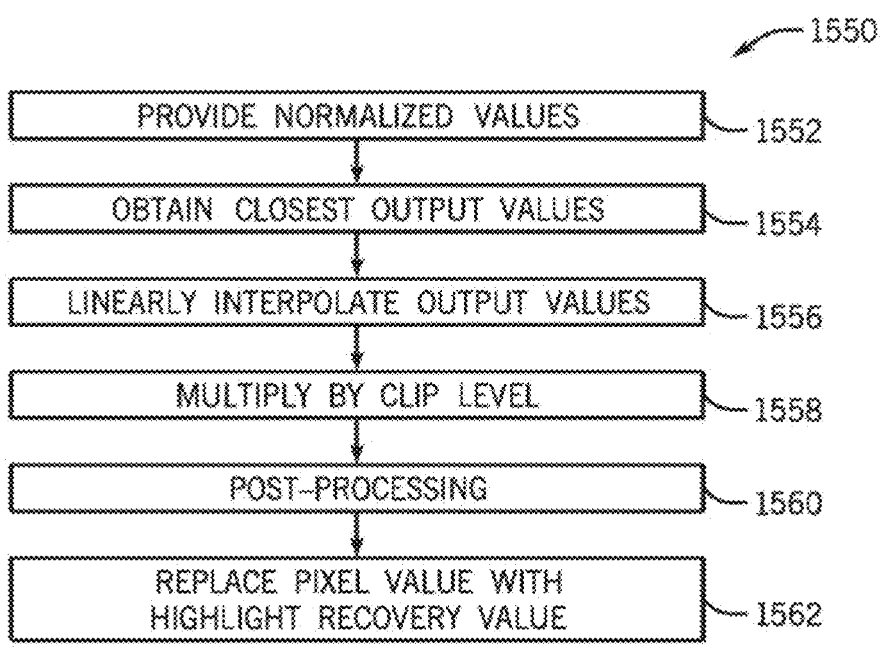
FIG. 120 is a flowchart illustrating a highlight recovery process, in accordance with an embodiment.

Once the normalized pixel intensity normalization values are calculated, they may be provided to the appropriate 3-d color lookup table 1492 (CLUT) to obtain the predicted highlight recovery logic values for the pixel. FIG. 120 illustrates a process 1550 for using the normalization values to obtain the appropriate highlight recovery values. First, the normalized values are provided to the appropriate CLUT 1492 (block 1552). In certain embodiments, there may be three CLUTs 1492 useful for the highlight recovery logic 1038. Each of the CLUTs 1492 may be associated with a particular color channel (e.g., Red, Green, or Blue).

The CLUTs 1492 may take in the pixel intensity normalization values for a pixel and output "recovered" normalized values that most closely relate to the normalized values (block 1554). The recovered normalized values may be derived from computer algorithms based upon any number of parameters. For example, the algorithms for determining the normalized values stored in the CLUTs 1492 may include preferred white balance settings, a time of day (e.g., sunset vs. noon, which may have different significance), and/or a subject of the captured image (e.g., a blue sky vs. a sunset). The CLUTs 1492 may include indices based upon the normalized color channel values where there are three equally spaced entries for the corresponding color of the CLUT 1492 and nine equally spaced entries for the colors not corresponding to the CLUT. For example, the red CLUT, represented by RLUT below, is indexed based upon normalized red, green, and blue values. The red CLUT may include three equally spaced red entries defined by the red minimum and maximum values, R_min and R_max, respectively. The green and blue indices may include nine equally spaced indices defined by the green and blue minimum and maximum values (minG_R, maxG_R, minB_R, and maxB_R). Further, the green CLUT may include three equally spaced green entries defined by the green minimum and maximum Values, G_min and G_max, respectively. The red and blue indices may include nine equally spaced indices defined by the red and blue minimum and maximum values (minR_G, maxR_G, minB_G, and maxB_G). Additionally, the blue CLUT may include three equally spaced blue entries defined by the blue minimum and maximum values, B_min and B_max, respectively. The red and green indices may include nine equally spaced indices defined by the red and green minimum and maximum values (minR_B, maxR_B, minG_B, and maxG_B).

As discussed above, the CLUTs may provide the closest output value based upon the 3×9×9 entries. However, this value may be linearly interpolated (block 1556), thus providing a more accurate recovery value. The linearly interpolated output, in some embodiments, may be represented by 14 fractional bits. To obtain the linear interpolation, one or more divide procedures may be implemented. However, because the minimum and maximum values are constant for a given frame, in some embodiments, software may program a reciprocal value for the differences between the maximum and minimum values, thus avoiding the divide (e.g., through multiplication of the reciprocal).

In alternative embodiments, the CLUTs used to determine the recovery values may not be 3-d, but instead, 4-d, 5-d, 6-d, etc. For example, in some embodiments, the green-blue and green-red values may not be merged as discussed in block 1512 of FIG. 119. Instead, the blue-green and blue-red values may be passed to the highlight recovery logic 1038. In such embodiments, the CLUTs may be 4-d CLUTs indexed by the four color pixel values (red, green-red, green-blue, and blue). Such embodiments may provide increased color accuracy, however, may be more expensive (e.g., use more storage) than 3-d CLUTs. Further, as discussed above, in embodiments that do not conform to a Bayer pattern (e.g., red, green, blue, and white pixel arrangements), 4-d CLUTs may be indexed by the individual color channels (red, green, blue, and white). In alternative embodiments, the 4-d CLUTs may be indexed by red, green, and blue values as well as a threshold value. In another alternative, in some embodiments, the CLUTs may be 5-d or 6-d. For example, a 5-d CLUT may be indexed based upon color pixel values (red, green, and blue) as well as coordinates for a particular pixel (e.g., X-coordinates and Y-coordinates). In 6-d CLUT embodiments, the CLUTs may be indexed based upon the color pixel values (red, green, and blue) as well as ceiling levels, or clip values, of the red, green, and blue color channels.

Once the normalized recovery value is determined, a final recovery value may be determined by multiplying the normalized recovery value by the clip level for the pixel discussed above. The final recovery value may be higher than the sensor clipping value. The only CLUT that may need to be accessed by highlight recovery for an individual pixel is the CLUT associated with Bayer color of the pixel. For example, a red pixel would access the red CLUT, a green-red pixel would access the green CLUT, and so forth. To further illustrate the portions of the process 1550, an example is provided. In the provided example, the final recovery value for a red pixel may be calculated as follows:

```
If R_norm < minR_R
    R_HR = R;
else
{
    G_norm' = min (maxG_R,max(minG_R, G_norm'));
    B_norm'= min (maxB_R, max(minB_R, B_norm'));
    R_HR = interp3 (
                RLUT
                R_norm, minR_R, maxR_R, RecipR_R
                G_norm', minG_R, maxG_R, RecipG_R
                B_norm', minB_R, maxB_R, RecipB_R
            ) * Cliplevel_R;
    }
```

Interp3 may represent the computation of the output values via tri-linear interpolation based on the normalized pixel values (represented by R_norm, G_norm', and B_norm'). RLUT represents the red CLUT that takes in normalized RGB triplet values and returns the closet output value based upon the 3×9×9 entries in the red CLUT. Cliplevel_R represents the calculated clip level for the red pixels, as discussed above.

Once the final recovery value is determined, post-processing may occur (block 1560). The post-processing logic may ensure that the final recovery value is not higher than the maximum value at the pixel, thus preventing excessive gains from being applied to the pixel. For example, for a red pixel, the pixel may be limited by a maximum threshold maxRGB_R. The post-processing logic may ensure that the final highlight recovery value of the pixel will not exceed this maximum threshold. In instances where the highlight recovery value of the pixel would exceed the maximum threshold, the highlight recovery value may be set to the maximum threshold. When the highlight recovery value does not exceed the maximum threshold, the highlight recovery value is set to the final recovery value. Once post-processing is complete, the highlight recovery logic 1038 may replace the value of clipped pixels with the highlight recovery value (block 1562), thereby applying the highlight recovery values for clipped pixels. Note that while in some embodiments the highlight recovery value may be representative of a replacement value for a clipped pixel value, in alternative embodiments, the highlight recovery logic may determine gains to be applied or added to the clipped pixel values rather than replacing the clipped pixel values.

Raw Scaler (RSCL)

The outputs of the highlight recovery logic 1038 may be passed to the raw scaler logic 1040. The raw scaler logic 1040 performs down-scaling in the RAW domain. Further, this logic may be used as a binning compensation filter, which may be configured to process the image pixels to compensate for non-linear placement (e.g., uneven spatial distribution) of the color samples due to binning by the image sensor(s) 90, such that subsequent image processing operations in the ISP pipe logic 82 (e.g., demosaicing, etc.) that depend on linear placement of the color samples can operate correctly. For example, referring now to FIG. 121, a full resolution sample 1693 of Bayer image data is depicted. This may represent a full resolution sample raw image data captured by the image sensor(s) 90.

As will be appreciated, under certain image capture conditions, it may be not be practical to send the full resolution image data captured by the image sensor **90*a* to the ISP circuitry 32 for processing. For instance, when capturing video data, in order to preserve the appearance of a fluid moving image from the perspective of the human eye, a frame rate of at least approximately 30 frames per second may be desired. However, if the amount of pixel data contained in each frame of a full resolution sample exceeds the processing capabilities of the ISP circuitry 32 when sampled at 30 frames per second, binning compensation filtering may be applied in conjunction with binning by the image sensor 90*a* to reduce the resolution of the image signal while also improving signal-to-noise ratio. For instance, various binning techniques, such as 2×2 binning, may be applied to produce a "binned" raw image pixel by averaging the values of surrounding pixels in the active region 312 of the raw frame 310**.

Raw scaler logic 1040 may be configured to apply binning to the full resolution raw image data to produce the binned raw image data, which may be provided to the ISP front-end processing logic 80 using the sensor interface **94*a* which, as discussed above, may be an SMIA interface or any other suitable parallel or serial camera interfaces. Further, the raw scaler logic 1040** may correct chromatic aberrations in the capture raw image data.

Figure 121:
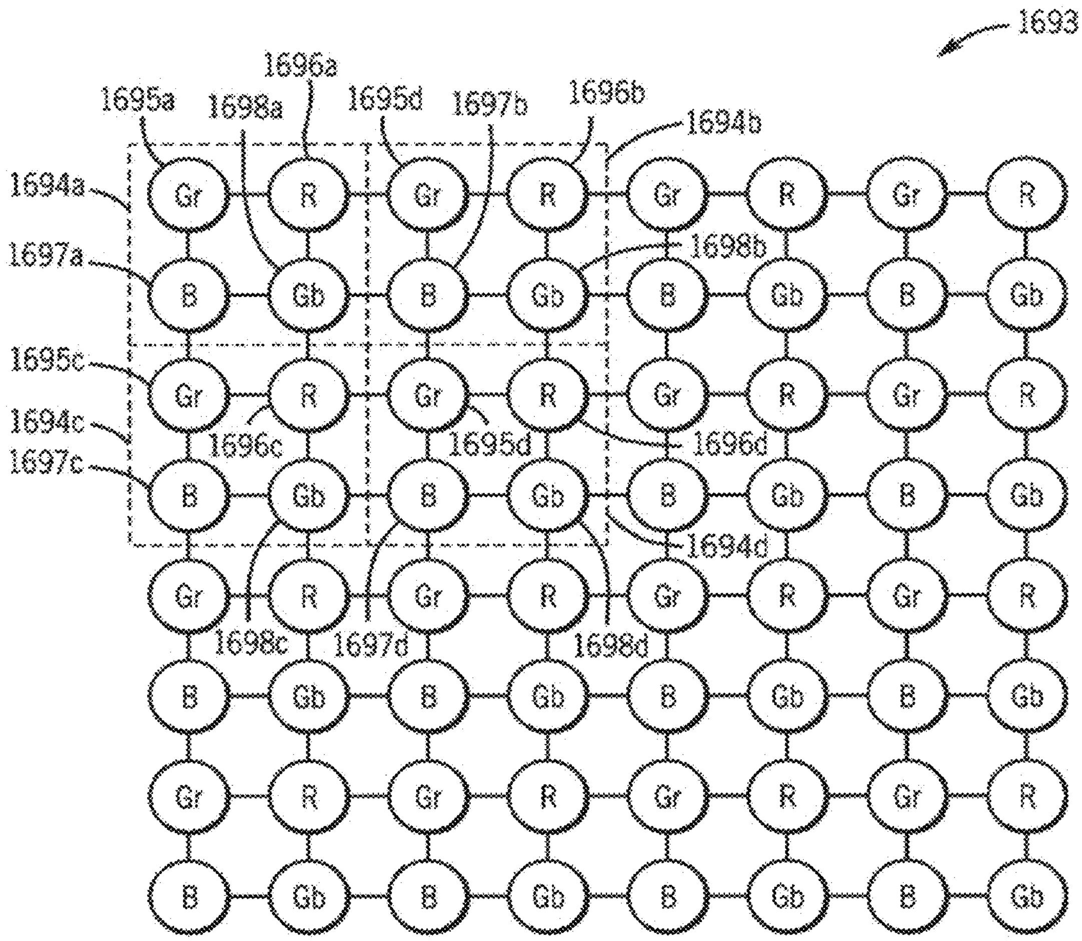
FIG. 121 is a full resolution sample of Bayer image data.
Figure 122:
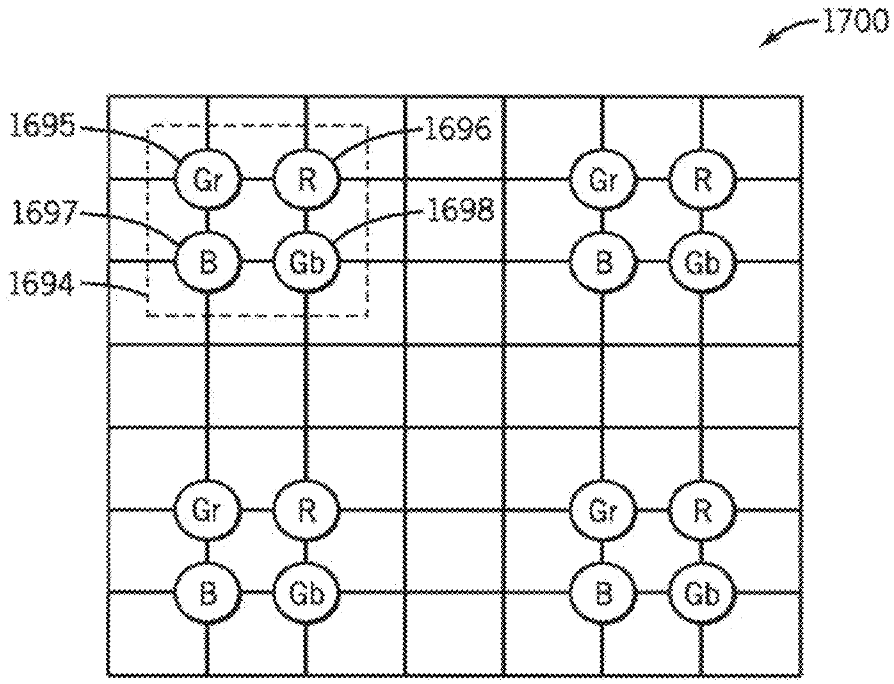
FIG. 122 is an example of the raw scaler logic applying 2×2 binning to the full resolution raw image data.

As illustrated in FIG. 122, the raw scaler logic 1040 may apply 2×2 binning to the full resolution raw image data. For example, with regard to the binned image data 700, the pixels 1695, 1696, 1697, and 1698 may form a Bayer pattern and may be determined by averaging the values of the pixels from the full resolution raw image data. For instance, referring to both FIGS. 121 and 122, the binned Gr pixel 1695 may be determined as the average or mean of the full resolution Gr pixels 1695*a*-1695*d*. Similarly, the binned R pixel 1696 may be determined as the average of the full resolution R pixels 1696*a*-1695*d*, the binned B pixel 1697 may be determined as the average of the full resolution B pixels 1697*a*-1697*d*, and the binned Gb pixel 1698 may be determined as the average of the full resolution Gb pixels 1698*a*-1698*d*. Thus, in the present embodiment, 2×2 binning may provide a set of four full resolution pixels including an upper left (e.g., 1695*a*), upper right (e.g., 1695*b*), lower left (e.g., 1695*c*), and lower right (e.g., 1695*d*) pixel that are averaged to derive a binned pixel located at the center of a square formed by the set of four full resolution pixels. Accordingly, the binned Bayer block 1694 shown in FIG. 122 contains four "superpixels" that represent the 16 pixels contained in the Bayer blocks 1694*a*-1694*d* of FIG. 121.

In addition to reducing spatial resolution, binning also offers the added advantage of reducing noise in the image signal. For instance, whenever an image sensor (e.g., 90*a*) is exposed to a light signal, there may be a certain amount of noise, such as photon noise, associated with the image. This noise may be random or systematic and it also may come from multiple sources. Thus, the amount of information contained in an image captured by the image sensor may be expressed in terms of a signal-to-noise ratio. For example, every time an image is captured by an image sensor 90*a* and transferred to a processing circuit, such as the ISP circuitry 32, there may be some degree of noise in the pixels values because the process of reading and transferring the image data inherently introduces "read noise" into the image signal. This "read noise" may be random and is generally unavoidable. By using the average of four pixels, noise, (e.g., photon noise) may generally be reduced irrespective of the source of the noise.

Thus, when considering the full resolution image data 1693 of FIG. 28, each Bayer pattern (2×2 block) 1694*a*-1694*d* contains 4 pixels, each of which contains a signal and noise component. If each pixel in, for example, the Bayer block 1694*a*, is read separately, then four signal components and four noise components are present. However, by applying binning, as shown in FIGS. 121 and 122, such that four pixels (e.g., 1695*a*, 1695*b*, 1695*c*, 1695*d*) may be represented by a single pixel (e.g., 1695) in the binned image data, the same area occupied by the four pixels in the full resolution image data 1693 may be read as a single pixel with only one instance of a noise component, thus improving signal-to-noise ratio.

Further, while the present embodiment depicts the raw scaler logic 1040 as being configured to apply a 2×2 binning process, it should be appreciated that the raw scaler logic 1040 may be configured to apply any suitable type of binning process, such as 3×3 binning, vertical binning, horizontal binning, and so forth. In some embodiments, the image sensor 90*a* may be configured to select between different binning modes during the image capture process. Additionally, in further embodiments, the image sensor 90*a* may also be configured to apply a technique that may be referred to as "skipping," wherein instead of average pixel samples, the raw scaler logic 1040 selects only certain pixels from the full resolution data 1693 (e.g., every other pixel, every 3 pixels, etc.) to output to the ISP front-end 80 for processing.

Figure 123:
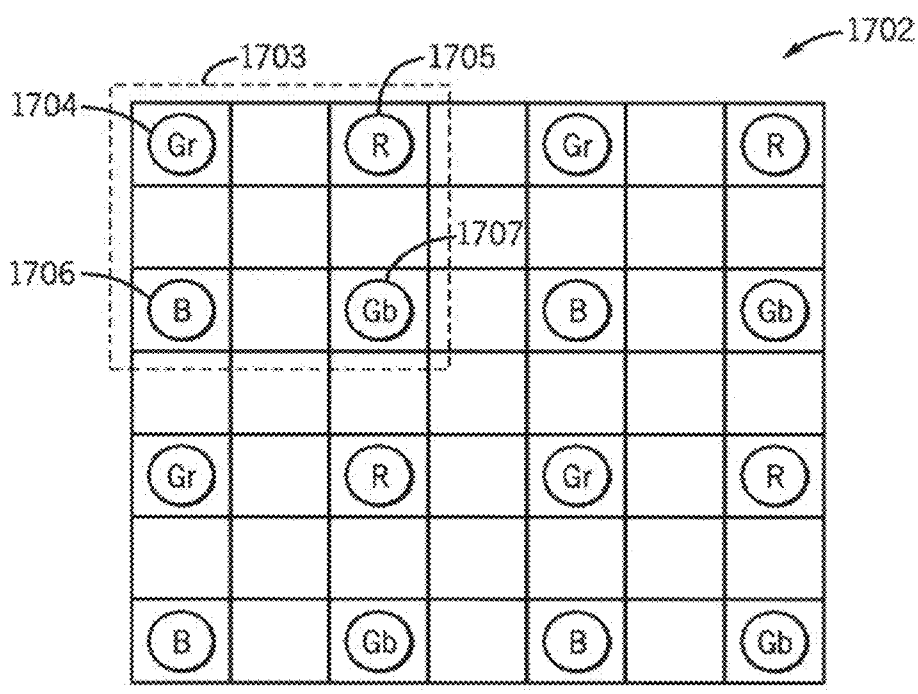
FIG. 123 is a re-sampled portion of binned image data after being processed by the raw scaler circuitry.

As also depicted in FIG. 122, one effect of the binning process is that the spatial sampling of the binned pixels may not be equally spaced. This spatial distortion may, in some systems, result in aliasing (e.g., jagged edges), which is generally not desirable. Further, because certain image processing steps in the ISP pipe logic 82 may depend upon on the linear placement of the color samples in order to operate correctly, the raw scaler logic 1040 may be applied to perform re-sampling and re-positioning of the binned pixels such that the binned pixels are spatially evenly distributed. That is, the raw scaler logic 1040 essentially compensates for the uneven spatial distribution (e.g., shown in FIG. 122) by re-sampling the position of the samples (e.g., pixels). For instance, FIG. 123 illustrates a re-sampled portion of binned image data 360 after being processed by the raw scaler circuitry 1652, wherein the Bayer block 1703 containing the evenly distributed re-sampled pixels 1704, 1705, 1706, and 1707 correspond to the binned pixels 1695, 1696, 1697, and 1698, respectively, of the binned image data 1700 from FIG. 122. Additionally, in an embodiment that utilizes skipping (e.g., instead of binning), as mentioned above, the spatial distortion shown in FIG. 122 may not be present. In this case, the raw scaler circuitry 1652 may function as a low pass filter to reduce artifacts (e.g., aliasing) that may result when skipping is employed by the image sensor 90*a*.

Figure 124:
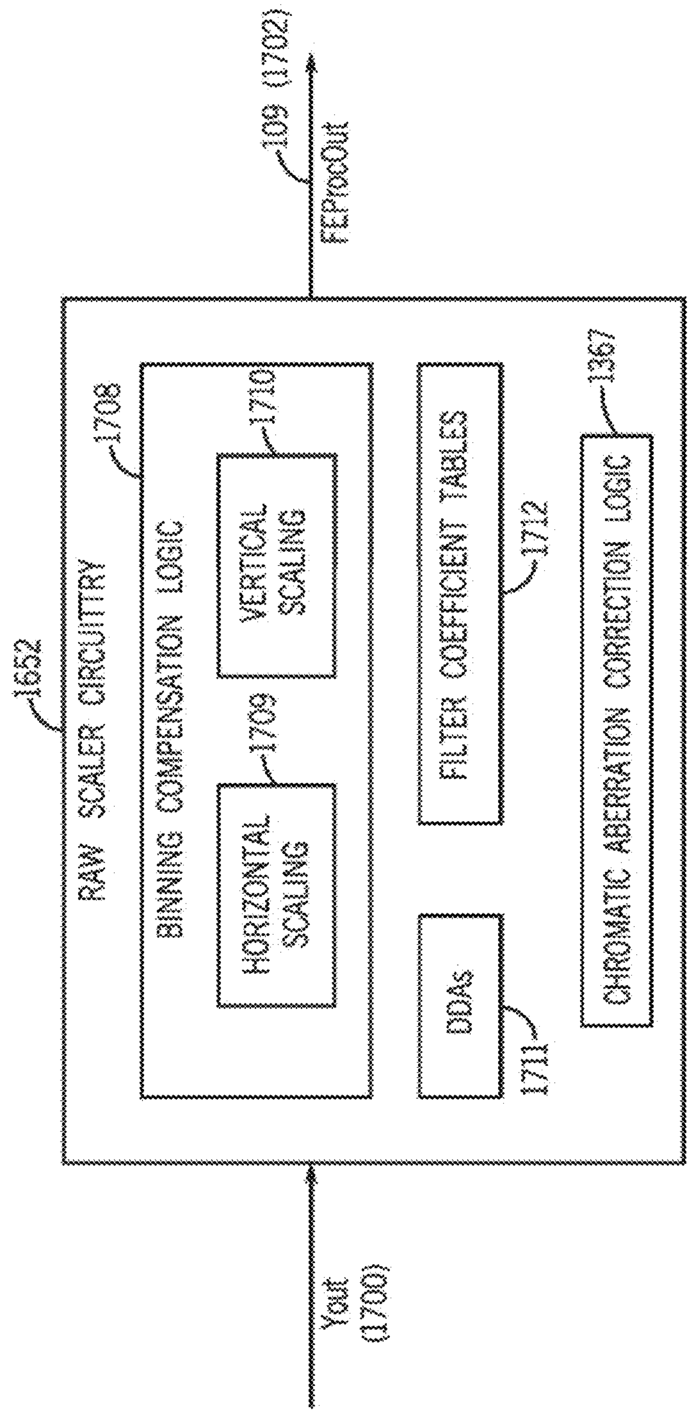
FIG. 124 is a block diagram of the raw scaler circuitry, in accordance with one embodiment.

FIG. 124 shows a block diagram of the raw scaler circuitry 1652 in accordance with one embodiment. The raw scaler circuitry 1652 may include binning compensation logic 1708 and chromatic aberration correction logic 1737. The binning compensation logic 1708 may process binned pixels 1700 to apply horizontal and vertical scaling using horizontal scaling logic 1709 and vertical scaling logic 1710, respectively, to re-sample and re-position the binned pixels 1700 so that they are arranged in a spatially even distribution, as shown in FIG. 123. In one embodiment, the scaling operation(s) performed by the raw scaler circuitry 1652 may be performed using horizontal and vertical multi-tap polyphase filtering. For instance, the filtering process may include selecting the appropriate pixels from the input source image data (e.g., the binned image data 1700 provided by the image sensor 90*a*), multiplying each of the selected pixels by a filtering coefficient, and summing up the resulting values to form an output pixel at a desired destination.

The selection of the pixels used in the scaling operations, which may include a center pixel and surrounding neighbor pixels of the same color, may be determined using separate differential analyzers 1711, one for vertical scaling and one for horizontal scaling. In the depicted embodiment, the differential analyzers 1711 may be digital differential analyzers (DDAs) and may be configured to control the current output pixel position during the scaling operations in the vertical and horizontal directions. In the present embodiment, a first DDA (referred to as 1711*a*) is used for all color components during horizontal scaling, and a second DDA (referred to as 1711*b*) is used for all color components during vertical scaling. By way of example only, the DDA 1711 may be provided as a 32-bit data register that contains a 2's-complement fixed-point number having 16 bits in the integer portion and 16 bits in the fraction. The 16-bit integer portion may be used to determine the current position for an output pixel. The fractional portion of the DDA 1711 may be used to determine a current index or phase, which may be based the between-pixel fractional position of the current DDA position (e.g., corresponding to the spatial location of the output pixel). The index or phase may be used to select an appropriate set of coefficients from a set of filter coefficient tables 1712. Additionally, the filtering may be done per color component using same colored pixels. Thus, the filtering coefficients may be selected based not only on the phase of the current DDA position, but also the color of the current pixel. In one embodiment, 8 phases may be present between each input pixel and, thus, the vertical and horizontal scaling components may utilize 8-deep coefficient tables, such that the high-order 3 bits of the 16-bit fraction portion are used to express the current phase or index. Thus, as used herein, the term "raw image" data or the like shall be understood to refer to multi-color image data that is acquired by a single sensor with a color filter array pattern (e.g., Bayer) overlaying it, those providing multiple color components in one plane. In another embodiment, separate DDAs may be used for each color component. For instance, in such embodiments, the raw scaler circuitry 1652 may extract the R, B, Gr, and Gb components from the raw image data and process each component as a separate plane.

In operation, horizontal and vertical scaling may include initializing the DDA 1711 and performing the multi-tap polyphase filtering using the integer and fractional portions of the DDA 1711. While performed separately and with separate DDAs, the horizontal and vertical scaling operations are carried out in a similar manner. A step value or step size (DDAStepX for horizontal scaling and DDAStepY for vertical scaling) determines how much the DDA value (currDDA) is incremented after each output pixel is determined, and multi-tap polyphase filtering is repeated using the next currDDA value. For instance, if the step value is less than 1, then the image is up-scaled, and if the step value is greater than 1, the image is downscaled. If the step value is equal to 1, then no scaling occurs. Further, it should be noted that same or different step sizes may be used for horizontal and vertical scaling.

Figure 125:
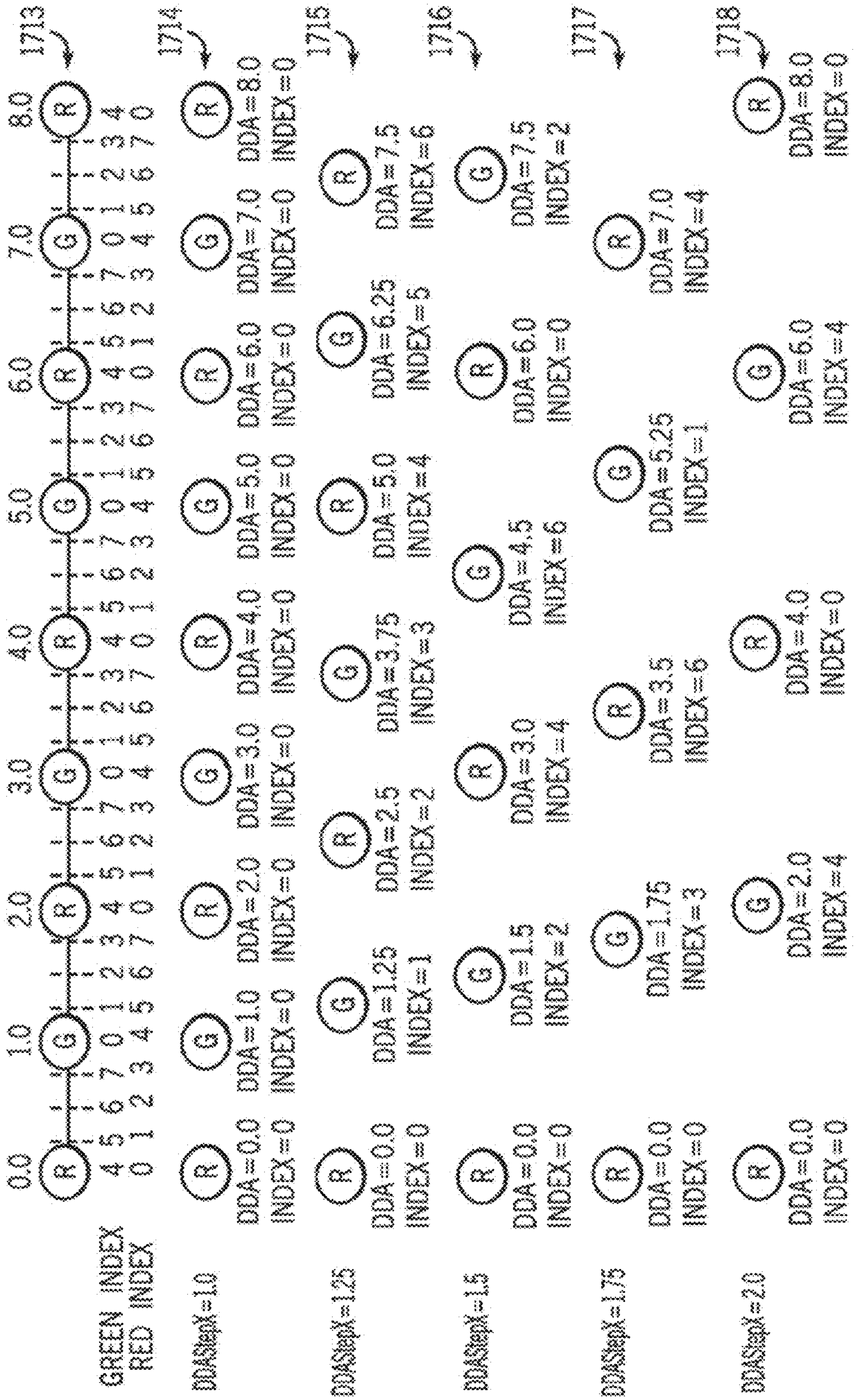
FIG. 125 is a graphical depiction of input pixel locations and corresponding output pixel locations based on various DDAStep values.

Output pixels are generated by the raw scaler circuitry 1652 in the same order as input pixels (e.g., using the Bayer pattern). In the present embodiment, the input pixels may be classified as being even or odd based on their ordering. For instance, referring to FIG. 125, a graphical depiction of input pixel locations (row 1713) and corresponding output pixel locations based on various DDAStep values (rows 1714-1718) are illustrated. In this example, the depicted row represents a row of red (R) and green (Gr) pixels in the raw Bayer image data. For horizontal filtering purposes, the red pixel at position 0.0 in the row 1713 may be considered an even pixel, the green pixel at position 1.0 in the row 1713 may be considered an odd pixel, and so forth. For the output pixel locations, even and odd pixels may be determined based on the least significant bit in the fraction portion (lower 16 bits) of the DDA 1711. For instance, assuming a DDAStep of 1.25, as shown in row 1715, the least significant bit corresponds to the bit 14 of the DDA, as this bit gives a resolution of 0.25. Thus, the red output pixel at the DDA position (currDDA) 0.0 may be considered an even pixel (the least significant bit, bit 14, is 0), the green output pixel at currDDA 1.0 (bit 14 is 1), and so forth. Further, while FIG. 125 is discussed with respect to filtering in the horizontal direction (using DDAStepX), it should be understood that the determination of even and odd input and output pixels may be applied in the same manner with respect to vertical filtering (using DDAStepY). In other embodiments, the DDAs 1711 may also be used to track locations of the input pixels (e.g., rather than track the desired output pixel locations). Further, it should be appreciated that DDAStepX and DDAStepY may be set to the same or different values. Further, assuming a Bayer pattern is used, it should be noted that the starting pixel used by the raw scaler circuitry 1652 could be any one of a Gr, Gb, R, or B pixel depending, for instance, on which pixel is located at a corner within the active region 312.

With this in mind, the even/odd input pixels are used to generate the even/odd output pixels, respectively. Given an output pixel location alternating between even and odd position, a center source input pixel location (referred to herein as "currPixel") for filtering purposes is determined by the rounding the DDA to the closest even or odd input pixel location for even or odd output pixel locations (based on DDAStepX), respectively. In an embodiment where the DDA 1711*a* is configured to use 16 bits to represent an integer and 16 bits to represent a fraction, currPixel may be determined for even and odd currDDA positions using Equations 6a and 6b below:

Even output pixel locations may be determined based on bits [31:16] of:

(currDDA+1.0) & 0xFFFE.0000

Odd output pixel locations may be determined based on bits [31:16] of:

(currDDA)|0x0001.0000 (6b)

Essentially, the above equations present a rounding operation, whereby the even and odd output pixel positions, as determined by currDDA, are rounded to the nearest even and odd input pixel positions, respectively, for the selection of currPixel.

Additionally, a current index or phase (currIndex) may also be determined at each currDDA position. As discussed above, the index or phase values represent the fractional between-pixel position of the output pixel position relative to the input pixel positions. For instance, in one embodiment, 8 phases may be defined between each input pixel position. For instance, referring again to FIG. 125, 8 index values 0-7 are provided between the first red input pixel at position 0.0 and the next red input pixel at position 2.0. Similarly, 8 index values 0-7 are provided between the first green input pixel at position 1.0 and the next green input pixel at position 3.0. In one embodiment, the currIndex values may be determined in accordance with Equations 7a and 7b below for even and odd output pixel locations, respectively:

Even output pixel locations may be determined based on bits [16:14] of:

(currDDA+0.125)

Odd output pixel locations may be determined based on bits [16:14] of:

(currDDA+1.125)

For the odd positions, the additional 1 pixel shift is equivalent to adding an offset of four to the coefficient index for odd output pixel locations to account for the index offset between different color components with respect to the DDA 1711.

Once currPixel and currIndex have been determined at a particular currDDA location, the filtering process may select one or more neighboring same-colored pixels based on currPixel (the selected center input pixel). By way of example, in an embodiment where the horizontal scaling logic 368 includes a 5-tap polyphase filter and the vertical scaling logic 1710 includes a 3-tap polyphase filter, two same-colored pixels on each side of currPixel in the horizontal direction may be selected for horizontal filtering (e.g., −2, −1, 0, +1, +2), and one same-colored pixel on each side of currPixel in the vertical direction may be selected for vertical filtering (e.g., −1, 0, +1). Further, currIndex may be used as a selection index to select the appropriate filtering coefficients from the filter coefficients table 1712 to apply to the selected pixels. For instance, using the 5-tap horizontal/3-tap vertical filtering embodiment, five 8-deep tables may be provided for horizontal filtering, and three 8-deep tables may be provided for vertical filtering. Though illustrated as part of the raw scaler circuitry 1652, it should be appreciated that the filter coefficient tables 1712 may, in certain embodiments, be stored in a memory that is physically separate from the raw scaler circuitry 1652, such as the memory 108.

Before discussing the horizontal and vertical scaling operations in further detail, Table 6 below shows examples of how currPixel and currIndex values, as determined based on various DDA positions using different DDAStep values (e.g., could apply to DDAStepX or DDAStepY).

TABLE 6

Binning Compensation Filter - DDA Examples of currPixel and currIndex calculation

| Output Pixel | DDA Step | 1.25 | | DDA Step | 1.5 | | DDA Step | 1.75 | | DDA Step | 2.0 | |
|---|---|---|---|---|---|---|---|---|---|---|---|---|
| (Even or Odd) | curr DDA | curr Index | curr Pixel | curr DDA | curr Index | curr Pixel | curr DDA | curr Index | curr Pixel | curr DDA | curr Index | curr Pixel |
| 0 | 0.0 | 0 | 0 | 0.0 | 0 | 0 | 0.0 | 0 | 0 | 0.0 | 0 | 0 |
| 1 | 1.25 | 1 | 1 | 1.5 | 2 | 1 | 1.75 | 3 | 1 | 2 | 4 | 3 |
| 0 | 2.5 | 2 | 2 | 3 | 4 | 4 | 3.5 | 6 | 4 | 4 | 0 | 4 |
| 1 | 3.75 | 3 | 3 | 4.5 | 6 | 5 | 5.25 | 1 | 5 | 6 | 4 | 7 |
| 0 | 5 | 4 | 6 | 6 | 0 | 6 | 7 | 4 | 8 | 8 | 0 | 8 |
| 1 | 6.25 | 5 | 7 | 7.5 | 2 | 7 | 8.75 | 7 | 9 | 10 | 4 | 11 |
| 0 | 7.5 | 6 | 8 | 9 | 4 | 10 | 10.5 | 2 | 10 | 12 | 0 | 12 |
| 1 | 8.75 | 7 | 9 | 10.5 | 6 | 11 | 12.25 | 5 | 13 | 14 | 4 | 15 |
| 0 | 10 | 0 | 10 | 12 | 0 | 12 | 14 | 0 | 14 | 16 | 0 | 16 |
| 1 | 11.25 | 1 | 11 | 13.5 | 2 | 13 | 15.75 | 3 | 15 | 18 | 4 | 19 |
| 0 | 12.5 | 2 | 12 | 15 | 4 | 16 | 17.5 | 6 | 18 | 20 | 0 | 20 |
| 1 | 13.75 | 3 | 13 | 16.5 | 6 | 17 | 19.25 | 1 | 19 | 22 | 4 | 23 |
| 0 | 15 | 4 | 16 | 18 | 0 | 18 | 21 | 4 | 22 | 24 | 0 | 24 |
| 1 | 16.25 | 5 | 17 | 19.5 | 2 | 19 | 22.75 | 7 | 23 | 26 | 4 | 27 |
| 0 | 17.5 | 6 | 18 | 21 | 4 | 22 | 24.5 | 2 | 24 | 28 | 0 | 28 |
| 1 | 18.75 | 7 | 19 | 22.5 | 6 | 23 | 26.25 | 5 | 27 | 30 | 4 | 31 |
| 0 | 20 | 0 | 20 | 24 | 0 | 24 | 28 | 0 | 28 | 32 | 0 | 32 |

To provide an example, let us assume that a DDA step size (DDAStep) of 1.5 is selected (row 1716 of FIG. 125), with the current DDA position (currDDA) beginning at 0, indicating an even output pixel position. To determine currPixel, the following equation may be $$currDDA = 0.0(\text{even})$$

$$\begin{array}{ll} & 0000\ 0000\ 0000\ 0001.0000\ 0000\ 0000\ 0000\ (currDDA + 1.0) \\ (\text{AND}) & 1111\ 1111\ 1111\ 1111.0000\ 0000\ 0000\ 0000\ (0 \times FFFE.0000) \\ = & \underline{0000\ 0000\ 0000\ 0000}.0000\ 0000\ 0000\ 0000 \end{array}$$

$$currPixel(\text{determined as bits } [31:16] \text{ of the result}) = 0;$$

Thus, at the currDDA position 0.0 (row 1716), the source input center pixel for filtering corresponds to the red input pixel at position 0.0 of row 1713.

To determine currIndex at the even currDDA 0.0, the following equation may be applied, as shown below:

$$currDDA = 0.0(\text{even})$$

$$\begin{array}{ll} & 0000\ 0000\ 0000\ 0000.0000\ 0000\ 0000\ 0000\ (currDDA) \\ + & 0000\ 0000\ 0000\ 0000.0000\ 0000\ 0000\ 0000\ (0.125) \\ = & 0000\ 0000\ 0000\ 000\underline{0.00}10\ 0000\ 0000\ 0000 \end{array}$$

$$currIndex(\text{determined as bits } [16:14] \text{ of the result}) = [000] = 0;$$

Thus, at the currDDA position 0.0 (row 1716), a currIndex value of 0 may be used to select filtering coefficients from the filter coefficients table 1712.

Accordingly, filtering (which may be vertical or horizontal depending on whether DDAStep is in the X (horizontal) or Y (vertical) direction) may applied based on the determined currPixel and currIndex values at currDDA 0.0, and the DDA 1711 is incremented by DDAStep (1.5), and the next currPixel and currIndex values are determined. For instance, at the next currDDA position 1.5 (an odd position), currPixel may be determined using Equation 6b as follows:

$$currDDA = 0.0(\text{odd})$$

$$\begin{array}{ll} & 0000\ 0000\ 0000\ 0001.1000\ 0000\ 0000\ 0000\ (currDDA + 1.0) \\ (\text{OR}) & 0000\ 0000\ 0000\ 0001.0000\ 0000\ 0000\ 0000\ (0 \times 0001.0000) \\ = & \underline{0000\ 0000\ 0000\ 0001}.0000\ 0000\ 0000\ 0000 \end{array}$$

$$currPixel(\text{determined as bits } [31:16] \text{ of the result}) = 1;$$

Thus, at the currDDA position 1.5 (row 1716), the source input center pixel for filtering corresponds to the green input pixel at position 1.0 of row 1713.

Further, currIndex at the odd currDDA 1.5 may be determined using Equation 7b, as shown below:

$$currDDA = 1.5(\text{odd})$$

$$\begin{array}{ll} & 0000\ 0000\ 0000\ 0001.1000\ 0000\ 0000\ 0000\ (currDDA) \\ + & 0000\ 0000\ 0000\ 0001.0010\ 0000\ 0000\ 0000\ (1.125) \\ = & 0000\ 0000\ 0000\ 001\underline{0.10}10\ 0000\ 0000\ 0000 \end{array}$$

$$currIndex(\text{determined as bits } [16:14] \text{ of the result}) = [010] = 2;$$

Thus, at the currDDA position 1.5 (row 1716), a currIndex value of 2 may be used to select the appropriate filtering coefficients from the filter coefficients table 1712. Filtering (which may be vertical or horizontal depending on whether DDAStep is in the X (horizontal) or Y (vertical) direction) may thus be applied using these currPixel and currIndex values.

Next, the DDA 1711 is incremented again by DDAStep (1.5), resulting in a currDDA value of 3.0. The currPixel corresponding to currDDA 3.0 may be determined using Equation 6a, as shown below:

$$currDDA = 3.0(\text{even})$$

$$\begin{array}{ll} & \text{0000 0000 0000 0100.0000 0000 0000 0000 } (currDDA+1.0) \\ (\text{AND}) & \text{1111 1111 1111 1110.0000 0000 0000 0000 } (0\times FFFE.0000) \\ = & \underline{\text{0000 0000 0000 0100}}\text{.0000 0000 0000 0000} \end{array}$$

$$currPixel(\text{determined as bits [31:16] of the result}) = 4;$$

Thus, at the currDDA position 3.0 (row 1716), the source input center pixel for filtering corresponds to the red input pixel at position 4.0 of row 1713.

Next, currIndex at the even currDDA 3.0 may be determined using the following equation, as shown below:

$$currDDA = 3.0(\text{even})$$

$$\begin{array}{ll} & \text{0000 0000 0000 0011.0000 0000 0000 0000 } (currDDA) \\ + & \text{0000 0000 0000 0000.0000 0000 0000 0000 } (0.125) \\ = & \text{0000 0000 0000 001}\underline{\text{1.00}}\text{10 0000 0000 0000} \end{array}$$

$$currIndex(\text{determined as bits [16:14] of the result}) = [100] = 4;$$

Thus, at the currDDA position 3.0 (row 1716), a currIndex value of 4 may be used to select the appropriate filtering coefficients from the filter coefficients table 1712. As will be appreciated, the DDA 1711 may continue to be incremented by DDAStep for each output pixel, and filtering (which may be vertical or horizontal depending on whether DDAStep is in the X (horizontal) or Y (vertical) direction) may be applied using the currPixel and currIndex determined for each currDDA value.

As discussed above, currIndex may be used as a selection index to select the appropriate filtering coefficients from the filter coefficients table 1712 to apply to the selected pixels. The filtering process may include obtaining the source pixel values around the center pixel (currPixel), multiplying each of the selected pixels by the appropriate filtering coefficients selected from the filter coefficients table 1712 based on currIndex, and summing the results to obtain a value of the output pixel at the location corresponding to currDDA. Further, because the present embodiment utilizes 8 phases between same colored pixels, using the 5-tap horizontal/3-tap vertical filtering embodiment, five 8-deep tables may be provided for horizontal filtering, and three 8-deep tables may be provided for vertical filtering. In one embodiment, each of the coefficient table entries may include a 16-bit 2's complement fixed point number with 3 integer bits and 13 fraction bits.

Further, assuming a Bayer image pattern, in one embodiment, the vertical scaling component may include four separate 3-tap polyphase filters, one for each color component: Gr, R, B, and Gb. Each of the 3-tap filters may use the DDA 1711 to control the stepping of the current center pixel and the index for the coefficients, as described above. Similarly, the horizontal scaling components may include four separate 5-tap polyphase filters, one for each color component: Gr, R, B, and Gb. Each of the 5-tap filters may use the DDA 1711 to control the stepping (e.g., via DDAStep) of the current center pixel and the index for the coefficients. It should be understood however, that fewer or more taps could be utilized by the horizontal and vertical scalers in other embodiments.

For boundary cases, the pixels used in the horizontal and vertical filtering process may depend upon the relationship of the current DDA position (currDDA) relative to a frame border (e.g., border defined by the active region 312 in FIG. 21). For instance, in horizontal filtering, if the currDDA position, when compared to the position of the center input pixel (SrcX) and the width (SrcWidth) of the frame (e.g., width 290 of the active region 312 of FIG. 21) indicates that the DDA 1711 is close to the border such that there are not enough pixels to perform the 5-tap filtering, then the same-colored input border pixels may be repeated. For instance, if the selected center input pixel is at the left edge of the frame, then the center pixel may be replicated twice for horizontal filtering. If the center input pixel is near the left edge of the frame such that only one pixel is available between the center input pixel and the left edge, then, for horizontal filtering purposes, the one available pixel is replicated in order to provide two pixel values to the left of the center input pixel. Further, the horizontal scaling logic 368 may be configured such that the number of input pixels (including original and replicated pixels) cannot exceed the input width. This may be expressed as follows:

StartX=(((DDAInitX+0x0001.0000) & 0xFFFE.0000)>>16)

EndX=(((DDAInitX+DDAStepX*(BCFOutWidth−1))|0x0001.0000)>>16)

EndX−StartX<=SrcWidth−1 wherein, DDAInitX represents the initial position of the DDA 1711, DDAStepX represents the DDA step value in the horizontal direction, and BCFOutWidth represents the width of the frame output by the raw scaler circuitry 1652.

For vertical filtering, if the currDDA position, when compared to the position of the center input pixel (SrcY) and the width (SrcHeight) of the frame (e.g., width 290 of the active region 312 of FIG. 21) indicates that the DDA 1711 is close to the border such that there are not enough pixels to perform the 3-tap filtering, then the input border pixels may be repeated. Further, the vertical scaling logic 1710 may be configured such that the number of input pixels (including original and replicated pixels) cannot exceed the input height. This may be expressed as follows:

StartY=(((DDAInitY+0x0001.0000) & 0xFFFE.0000)>>16)

EndY=(((DDAInitY+DDAStepY*(BCFOutHeight−1))|0x0001.0000)>>16)

EndY−StartY<=SrcHeight−1 wherein, DDAInitY represents the initial position of the DDA 1711, DDAStepY represents the DDA step value in the vertical direction, and BCFOutHeight represents the width of the frame output by the raw scaler circuitry 1652.

Figure 126:
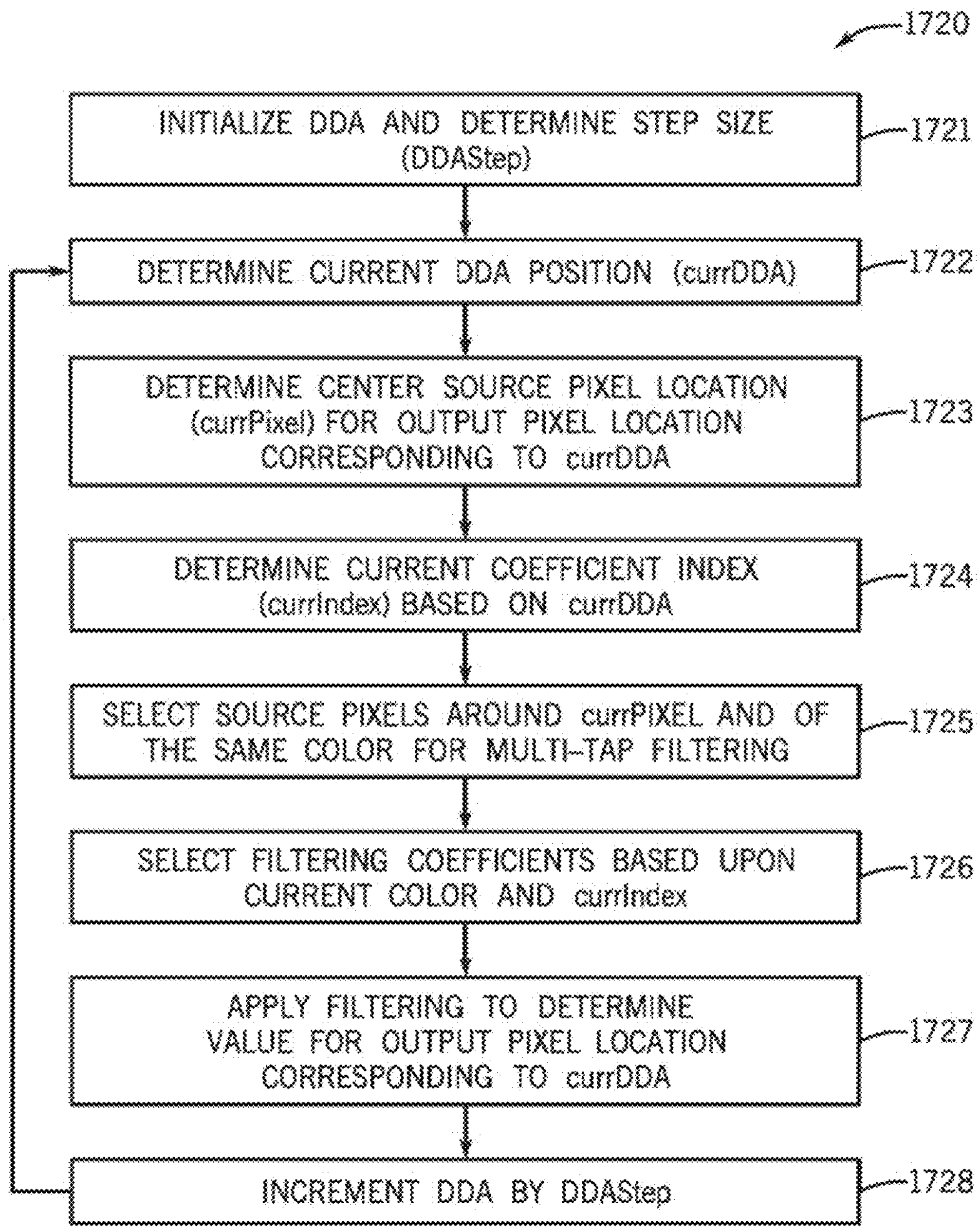
FIG. 126 is a flow chart depicting a method for applying binning compensation filtering to image data received by the front-end pixel processing unit 130 in accordance with an embodiment.

Referring now to FIG. 126, a flow chart depicting a method 1720 for applying binning compensation filtering to image data received by the front-end pixel processing unit 130 in accordance with an embodiment. It will be appreciated that the method 1720 illustrated in FIG. 126 may apply to both vertical and horizontal scaling. Beginning at step 1721 the DDA 1711 is initialized and a DDA step value (which may correspond to DDAStepX for horizontal scaling and DDAStepY for vertical scaling) is determined. Next, at step 1722, a current DDA position (currDDA), based on DDAStep, is determined. As discussed above, currDDA may correspond to an output pixel location. Using currDDA, the method 1720 may determine a center pixel (currPixel) from the input pixel data that may be used for binning compensation filtering to determine a corresponding output value at currDDA, as indicated at step 1723. Subsequently, at step 1724, an index corresponding to currDDA (currIndex) may be determined based on the fractional between-pixel position of currDDA relative to the input pixels (e.g., row 1713 of FIG. 125). By way of example, in an embodiment where the DDA includes 16 integer bits and 16 fraction bits, currPixel may be determined in accordance with the equations discussed above, and currIndex may be determined in accordance with the equations discussed above. While the 16 bit integer/16 bit fraction configuration is described herein as one example, it should be appreciated that other configurations of the DDA 1711 may be utilized in accordance with the present technique. By way of example, other embodiments of the DDA 1711 may be configured to include a 12 bit integer portion and 20 bit fraction portion, a 14 bit integer portion and 18 bit fraction portion, and so forth.

Once currPixel and currIndex are determined, same-colored source pixels around currPixel may be selected for multi-tap filtering, as indicated by step 1725. For instance, as discussed above, one embodiment may utilize 5-tap polyphase filtering in the horizontal direction (e.g., selecting 2 same-colored pixels on each side of currPixel) and may utilize 3-tap polyphase filtering in the vertical direction (e.g., selecting 1 same-colored pixel on each side of currPixel). Next, at step 1726, once the source pixels are selected, filtering coefficients may be selected from the filter coefficients table 1712 of the raw scaler circuitry 1708 based upon currIndex.

Thereafter, at step 1727, filtering may be applied to the source pixels to determine the value of an output pixel corresponding to the position represented by currDDA. For instance, in one embodiment, the source pixels may be multiplied by their respective filtering coefficients, and the results may be summed to obtain the output pixel value. The direction in which filtering is applied at step 1727 may be vertical or horizontal depending on whether DDAStep is in the X (horizontal) or Y (vertical) direction. Finally, at step 263, the DDA 1711 is incremented by DDAStep at step 1728, and the method 1720 returns to step 1722, whereby the next output pixel value is determined using the binning compensation filtering techniques discussed herein.

Figure 127:
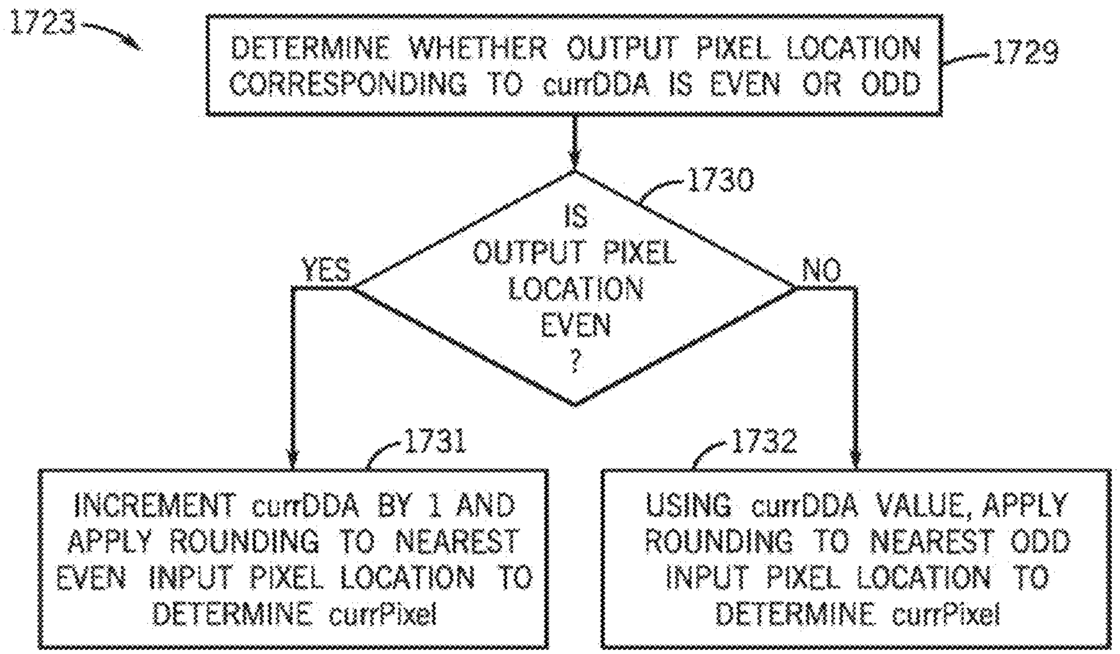
FIG. 127 is a flow chart depicting the step for determining currPixel from the method of FIG. 126, in accordance with one embodiment.

Referring to FIG. 127, the step 1723 for determining currPixel from the method 1720 is illustrated in more detail in accordance with one embodiment. For instance, step 1723 may include the sub-step 1729 of determining whether the output pixel location corresponding to currDDA (from step 1722) is even or odd. As discussed above, an even or odd output pixel may be determined based on the least significant bit of currDDA based on DDAStep. For instance, given a DDAStep of 1.25, a currDDA value of 1.25 may be determined as odd, since the least significant bit (corresponding to bit 14 of the fractional portion of the DDA 1711) has a value of 1. For a currDDA value of 2.5, bit 14 is 0, thus indicating an even output pixel location.

At decision logic 1730, a determination is made as to whether the output pixel location corresponding to currDDA is even or odd. If the output pixel is even, decision logic 1730 continues to sub-step 1731, wherein currPixel is determined by incrementing the currDDA value by 1 and rounding the result to the nearest even input pixel location, as represented by Equation 6a above. If the output pixel is odd, then decision logic 1730 continues to sub-step 1732, wherein currPixel is determined by rounding the currDDA value to the nearest odd input pixel location, as represented by Equation 6b above. The currPixel value may then be applied to step 1725 of the method 1720 to select source pixels for filtering, as discussed above.

Figure 128:
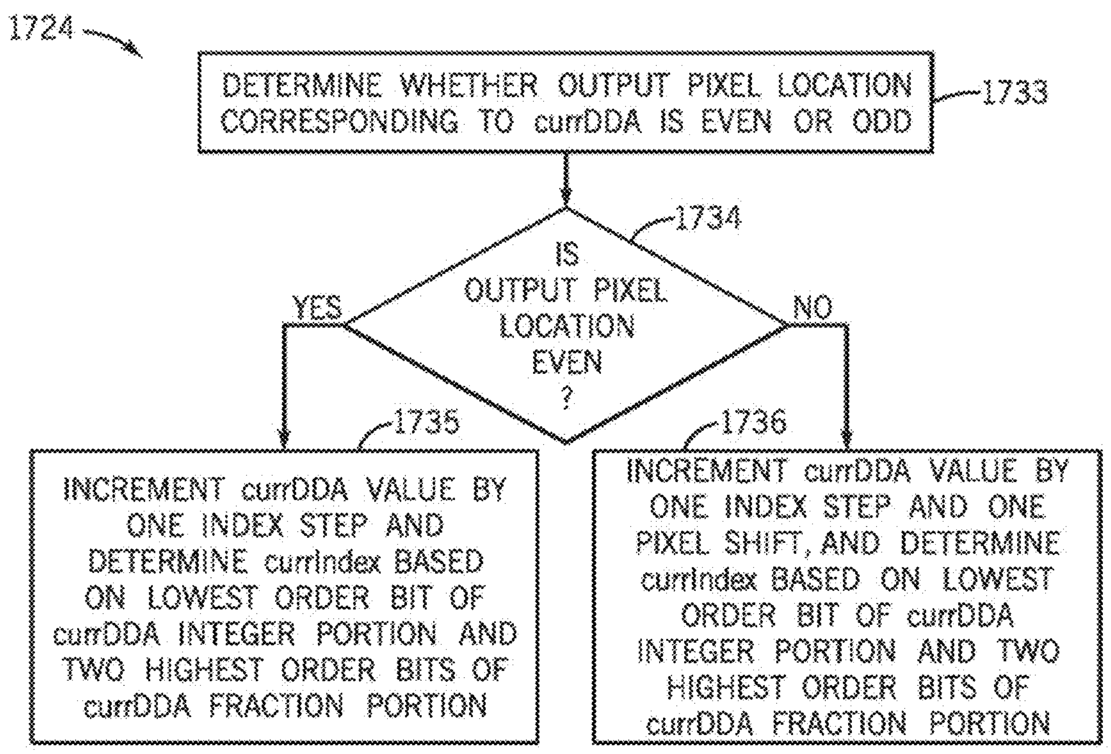
FIG. 128 is the step for determining currIndex from the method of FIG. 126, in accordance with one embodiment.

Referring also to FIG. 128, the step 1724 for determining currIndex from the method 1720 is illustrated in more detail in accordance with one embodiment. For instance, step 1724 may include the sub-step 1733 of determining whether the output pixel location corresponding to currDDA (from step 1722) is even or odd. This determination may be performed in a similar manner as step 1729 of FIG. 127. At decision logic 1734, a determination is made as to whether the output pixel location corresponding to currDDA is even or odd. If the output pixel is even, decision logic 1734 continues to sub-step 1735, wherein currIndex is determined by incrementing the currDDA value by one index step determining currIndex based on the lowest order integer bit and the two highest order fraction bits of the DDA 1711. For instance, in an embodiment wherein 8 phases are provided between each same-colored pixel, and wherein the DDA includes 16 integer bits and 16 fraction bits, one index step may correspond to 0.125, and currIndex may be determined based on bits [16:14] of the currDDA value incremented by 0.125 (e.g., Equation 7a). If the output pixel is odd, decision logic 1734 continues to sub-step 1736, wherein currIndex is determined by incrementing the currDDA value by one index step and one pixel shift, and determining currIndex based on the lowest order integer bit and the two highest order fraction bits of the DDA 1711. Thus, in an embodiment wherein 8 phases are provided between each same-colored pixel, and wherein the DDA includes 16 integer bits and 16 fraction bits, one index step may correspond to 0.125, one pixel shift may correspond to 1.0 (a shift of 8 index steps to the next same colored pixel), and currIndex may be determined based on bits [16:14] of the currDDA value incremented by 1.125 (e.g., Equation 7b).

As discussed above, the raw scaler circuitry 1652 may also provide chromatic aberration correction logic 1737. Chromatic aberration refers generally to the spatial shift of blue and red components with respect to green components. These shifts may be caused by the chromatic aberration of the lens used to capture the image data. As lenses become smaller and the price constraints dictate cheaper leans construction, these defects may become a barrier to further size and cost reduction, even for lenses with a normal focal length. Chromatic aberration is generally a result of the dependency of a lens' refractive index on wavelength. This dependency results in differing geometric distortion for red, green, and blue color components. Longitudinal chromatic aberration causes different colors of light to focus on different planes. Lateral chromatic aberration results in a radial shift between the red, green, and blue wavelengths.

Geometric distortion manifests as a radial variation in the magnification of the lens, resulting in barrel distortion if the magnification decreases radially or pincushion distortion if the magnification increases radially. Under certain circumstances, it may be possible for a lens to exhibit both barrel and pincushion distortion at the same time. For example, the magnification may first decrease radially and then increase near the edge of the lens. Such distortion may be referred to a moustache distortion. Both the geometric distortion and the chromatic aberrations may degrade the quality of the resultant image provided by the ISP. Thus, by either fully or partially correcting the geometric distortion, the chromatic aberration, or both, smaller, thinner, and cheaper lenses may be used while maintain sufficient visual quality in the video and still frames produced by the camera.

Figure 129:
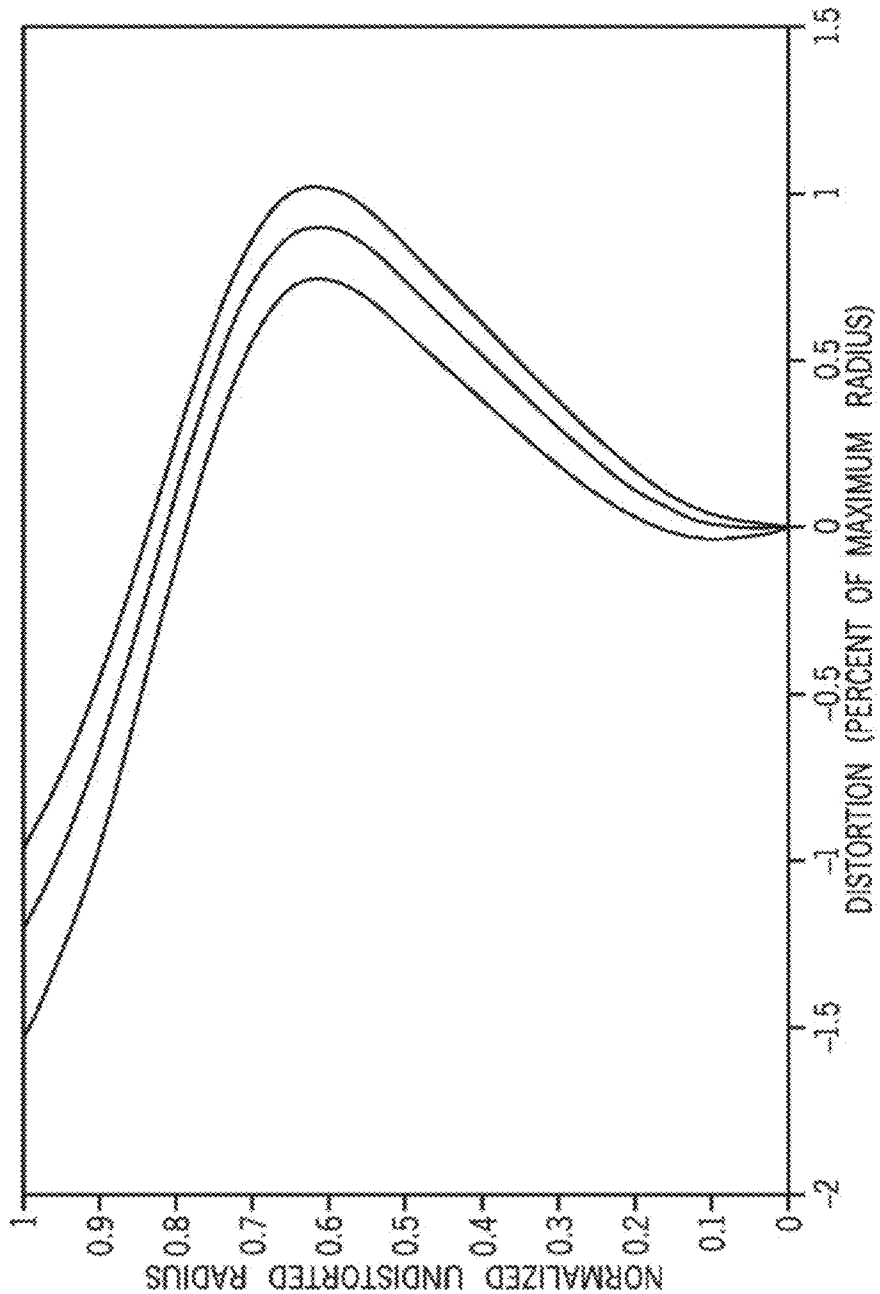
FIG. 129 is an illustration of typical distortion curves for red, green, and blue color channels.

FIG. 129 illustrates typical distortion curves for red, green, and blue color channels 1738, 1739, and 1740, respectively. As illustrated, the graph plots the distortion, sometimes referred to as displacement, versus an ideal undistorted radius. The distortion, as a percentage of the maximum radius, may be represented by the following equation:

Distortion=(Distorted Radius−Ideal Radius)*100/ Maximum Radius

Because the green wavelength is between the red and blue wavelengths, the green channel 1739 distortion may be approximated as the mean distortion between the red channel 1738 and blue channel 1740 distortions. Thus, chromatic aberrations may be reduced by warping the red channel 1738 and blue channel 1740 distortions inward towards the green channel 1739 distortions.

Figure 130:
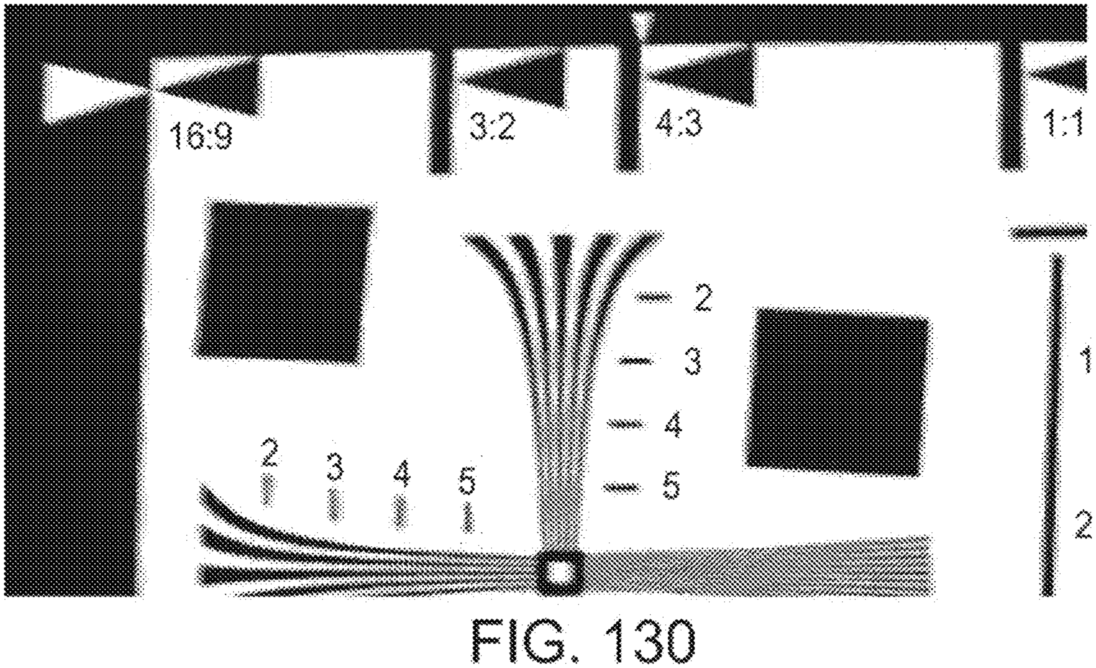
FIG. 130 is an illustration of a 1920×1080 resolution RAW frame that simulates the lens distortion of FIG. 129
Figure 131:
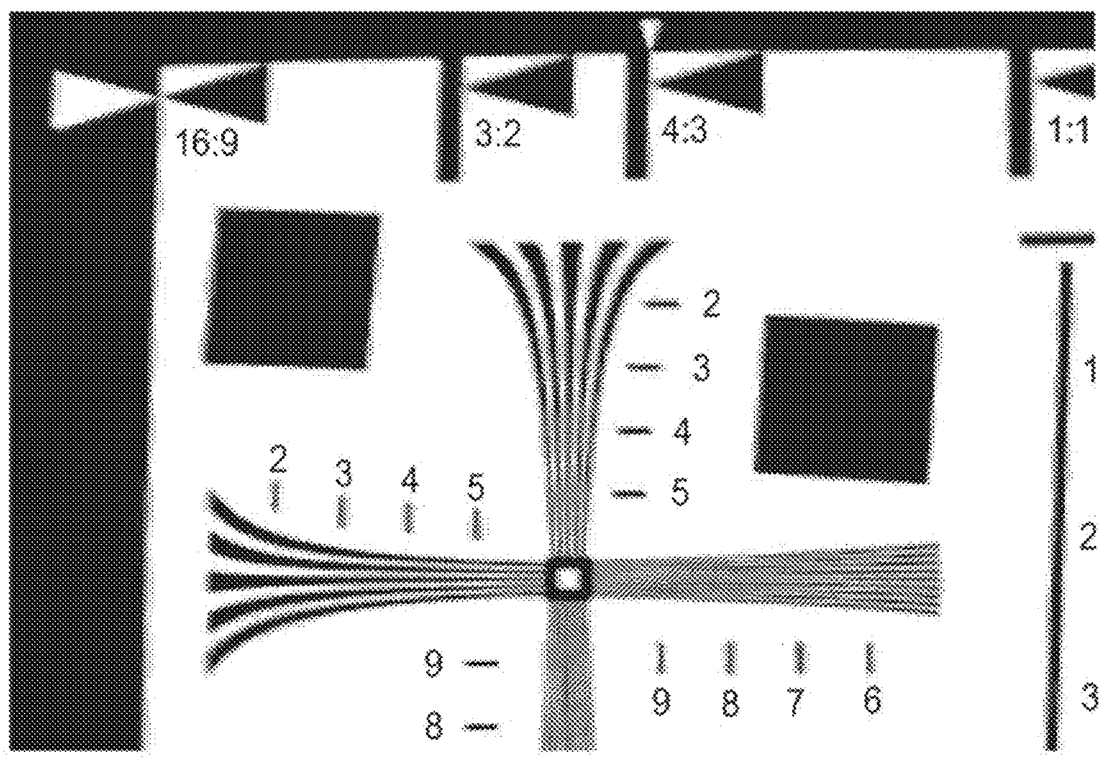
FIG. 131 is an image, illustrating the results of applying demosaic logic to a frame with chromatic aberrations.
Figure 132:
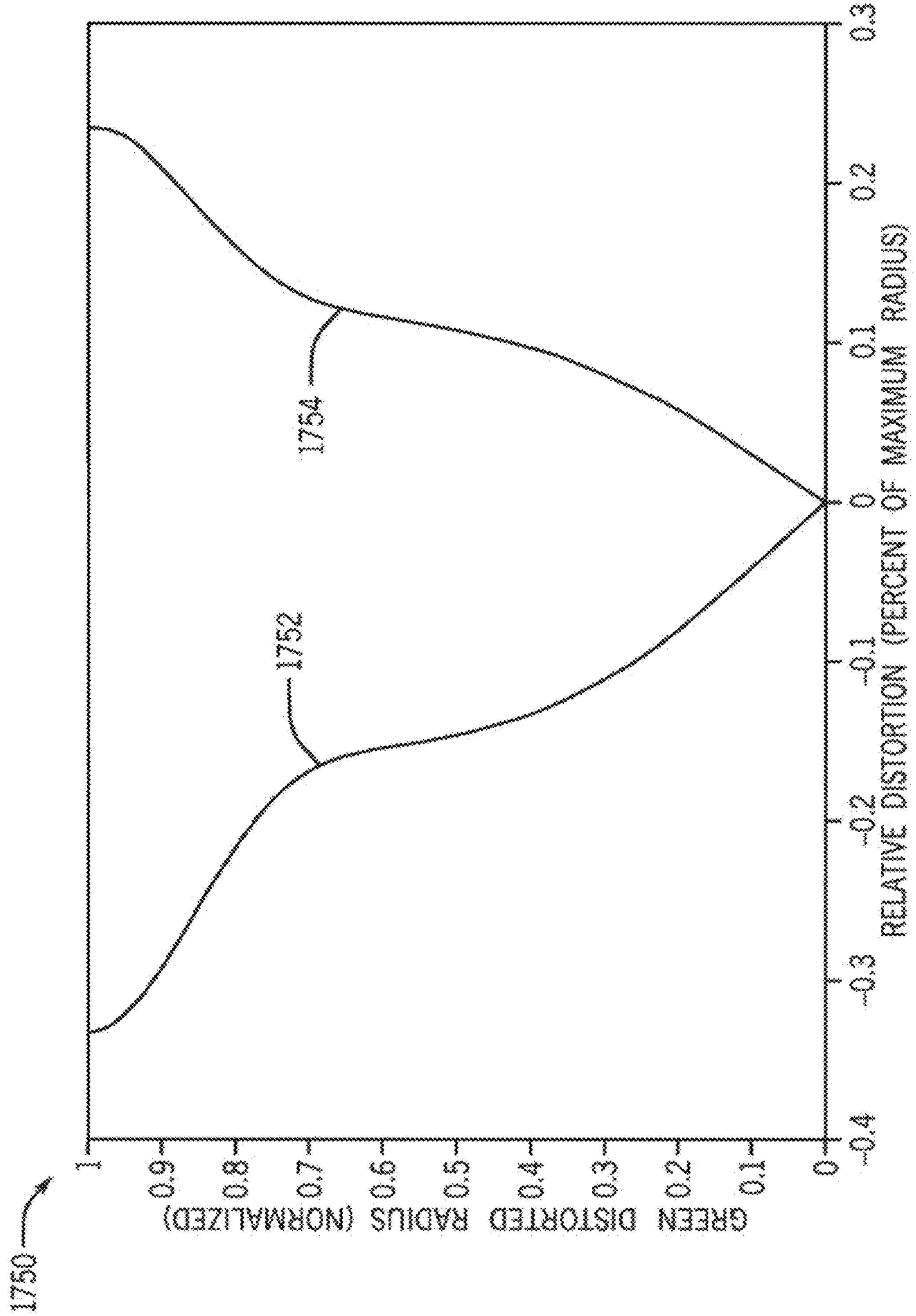
FIG. 132 is a graph illustrating the relative distortion for chromatic aberration correction.
Figure 133:
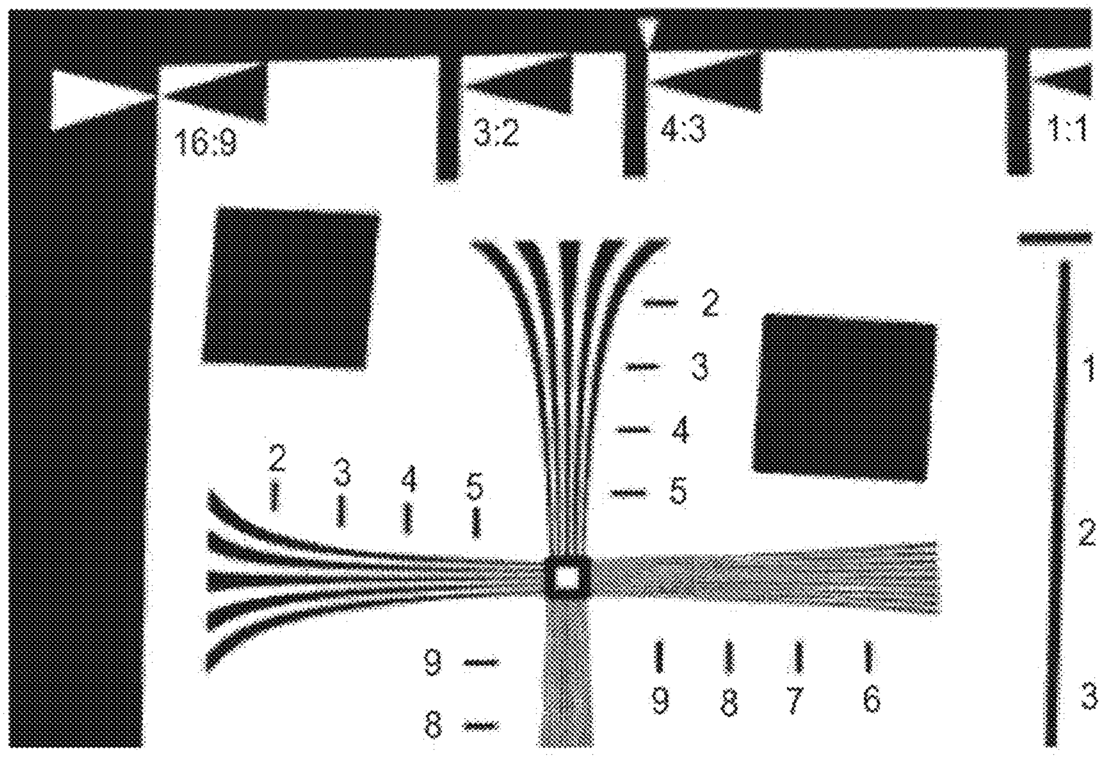
FIG. 133 is a simulated image where chromatic aberrations are removed prior to demosaicing the image.

FIG. 130 illustrates a 1920×1080 resolution RAW frame that simulates the lens distortion of FIG. 129. For example, as illustrated, the RAW frame may present red or blue hues in certain locations. By using the chromatic aberration correction logic 1737, these red or blue hues may be reduced. As will be discussed in more detail below, one primary function of the ISP pipe logic 82 is to convert Bayer CFA frames to RGB frames using a process known as "demosaicing." To obtain missing samples for each color channel, the demosaicing process uses the data from all channels in order to recover high-frequency detail and reduce aliasing in the resultant RGB frame. The demosaicing process may rely heavily on the correlation between the red, green, and blue channels. Chromatic aberration may disrupt these cross-color correlations, thus causing the demosaic procedure to generated less than optimal results. For example, FIG. 131 is an image, illustrating the results of applying demosaic logic to a frame with chromatic aberrations. As illustrated, portions 1741 of the image may present some "speckling" introduced by the demosaic logic due to the chromatic aberrations. In order to provide more optimal results, the chromatic aberration correction logic 1737 may be applied prior to the demosaic logic. Thus, the chromatic aberrations may be reduced, leading to more accurate demosaic logic results. The relative distortion for chromatic aberration correction may be more clearly illustrated by the graph 1750 of FIG. 132. This graph illustrates the relative distortion for the lens characteristics shown in FIG. 129 in relation to the green channel 1739 distorted radius. By warping the blue and red channel distortions towards the green channel 1739 distortion, the image quality may be greatly improved. For example, FIG. 133 illustrates a simulated image where the chromatic aberrations are removed prior to demosaicing the image. As may be appreciated, there may be significantly less "speckling" when the demosaicing occurs after the chromatic aberration correction logic 1737.

In embodiments where the aforementioned defective pixel detection/correction logic, gain/offset/compensation blocks, noise reduction logic, lens shading correction logic do not rely upon the linear placement of the pixels, the raw scaler circuitry 1652 may be incorporated with the demosaicing logic to perform binning compensation filtering and reposition the pixels prior to demosaicing, as demosaicing generally does rely upon the even spatial positioning of the pixels. Further, to provide a more accurate demosaicing, the chromatic aberration may be removed from the raw Bayer CFA frame before it reaches the demosaic logic. For instance, in one embodiment, the raw scaler circuitry 1652 may be incorporated anywhere between the sensor input and the demosaicing logic, with temporal filtering and/or defective pixel detection/correction being applied to the raw image data prior to the raw scaler logic 1040.

Having now discussed the optimal timing for the chromatic aberration correction logic, the discussion now turns to a detailed discussion of the process for removing the chromatic aberrations. Chromatic aberration removal involves relatively small radial displacements in the red and blue components where the benefits of removing the chromatic aberration outweigh any artifacts introduced by warping the red and blue components of the raw frame at their lower resolution. Generally speaking, the chromatic aberrations may be removed by warping the red and blue components of the raw frame to have the same geometric distortion as the green frame, thus aligning the colors. The green wavelength may remain unaltered by the chromatic aberration correction logic. First, as described above, the green wavelength is between the red and blue wavelengths, so the green distortions typically may be assumed to approximate the "mean" distortion. Further, the green component contributes most to the perceived brightness of the frame, Thus, artifacts from warping the green channel in the raw domain may be much more likely visible than artifacts caused by warping the red and blue channels.

As discussed previously, the raw scaler circuitry 1652 may be responsible for coordinate generation and image resampling. For example, for each output sample position, a coordinate generator of the raw scaler circuitry 1652 may produce an X/Y coordinate pair defining the source of the output sample within a specific color of the input frame. Further, for each output sample, a resampler of the raw scaler circuitry 1652 may use the X/Y coordinates within an input color frame to generate the output sample using multiphase finite impulse response (FIR) filters.

The raw scaling and binning correction functions will produce an input to output mapping which is separable, and thus may be performed independently in the horizontal and vertical dimensions. However, when the chromatic aberration correction function is added, the result is a function which is not strictly separable because the distortion (displacement) is a function of radius, thus utilizing both vertical and horizontal resampling. However, the chromatic aberration correction may be implemented as a separable function with little or no degradation in visual quality of the resultant raw image. In the separable implementation, vertical and horizontal resampling is performed independently for the chromatic aberration correction.

Figure 134:
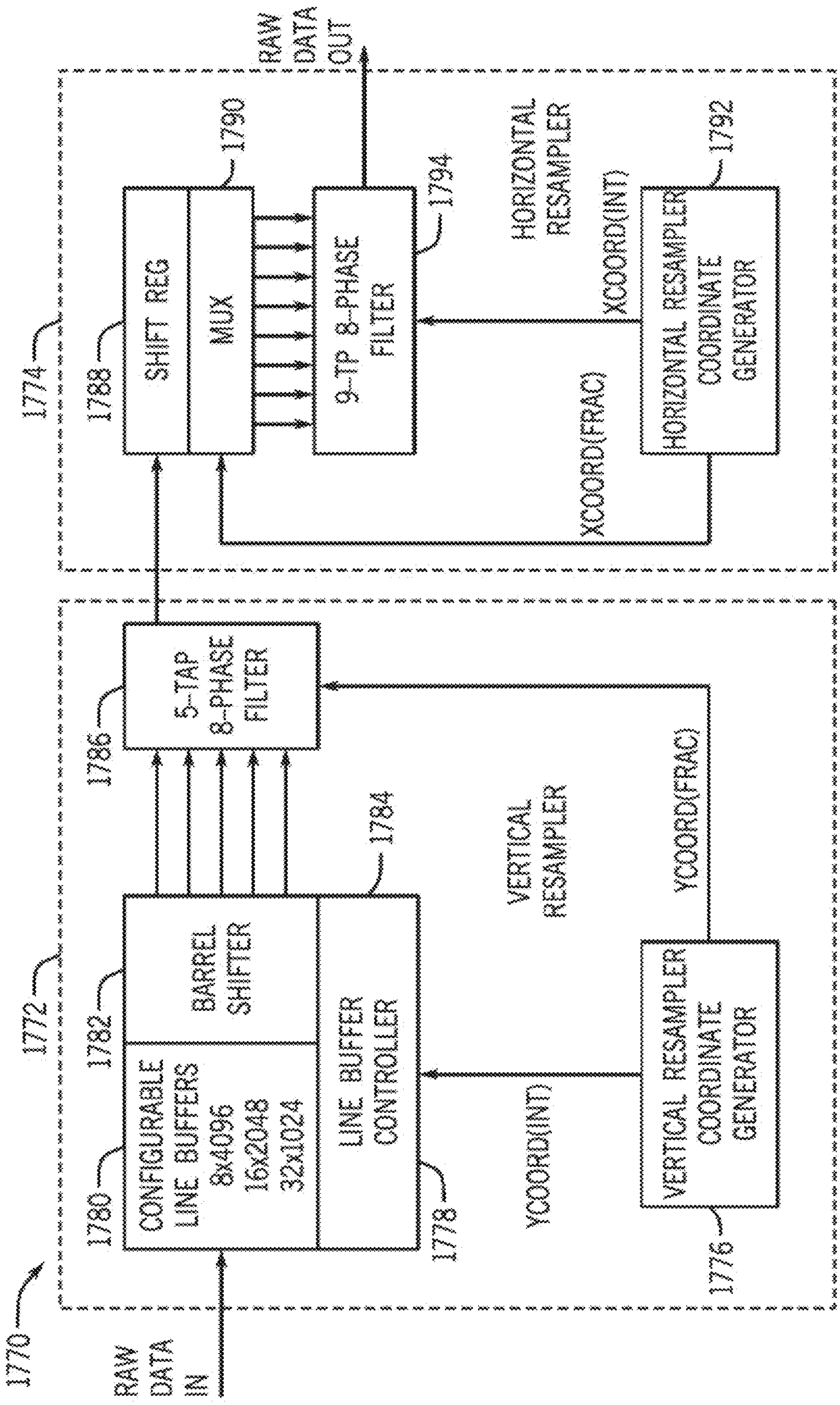
FIG. 134 is a block diagram of the raw scaler circuitry 1652, in accordance with an embodiment.

FIG. 134 is a block diagram of the raw scaler circuitry 1652, in accordance with an embodiment. As illustrated, the raw scaler circuitry 1652 may include a vertical resampler 1772 and a horizontal resampler 1774. The vertical resampler 1772 may include configurable line buffers 1780, a barrel shifter 1782, and a line buffer controller 1784 working with a coordinate generator 1776 to provide inputs for a 5-tap 8-phase filter 1786. The outputs from the 5-tap 8-phase filter 1786 may be fed as an input to the horizontal resampler 1774, which may include shift registers 1788 and one or multiplexers 1790 working together with a horizontal resampler coordinate generator 1792 to provide inputs for a 9-tap 8-phase filter 1794. The output of the 9-tap 8-phase filter 1794 may provide the resultant raw data output for the raw scaler circuitry 1652.

Figure 135:
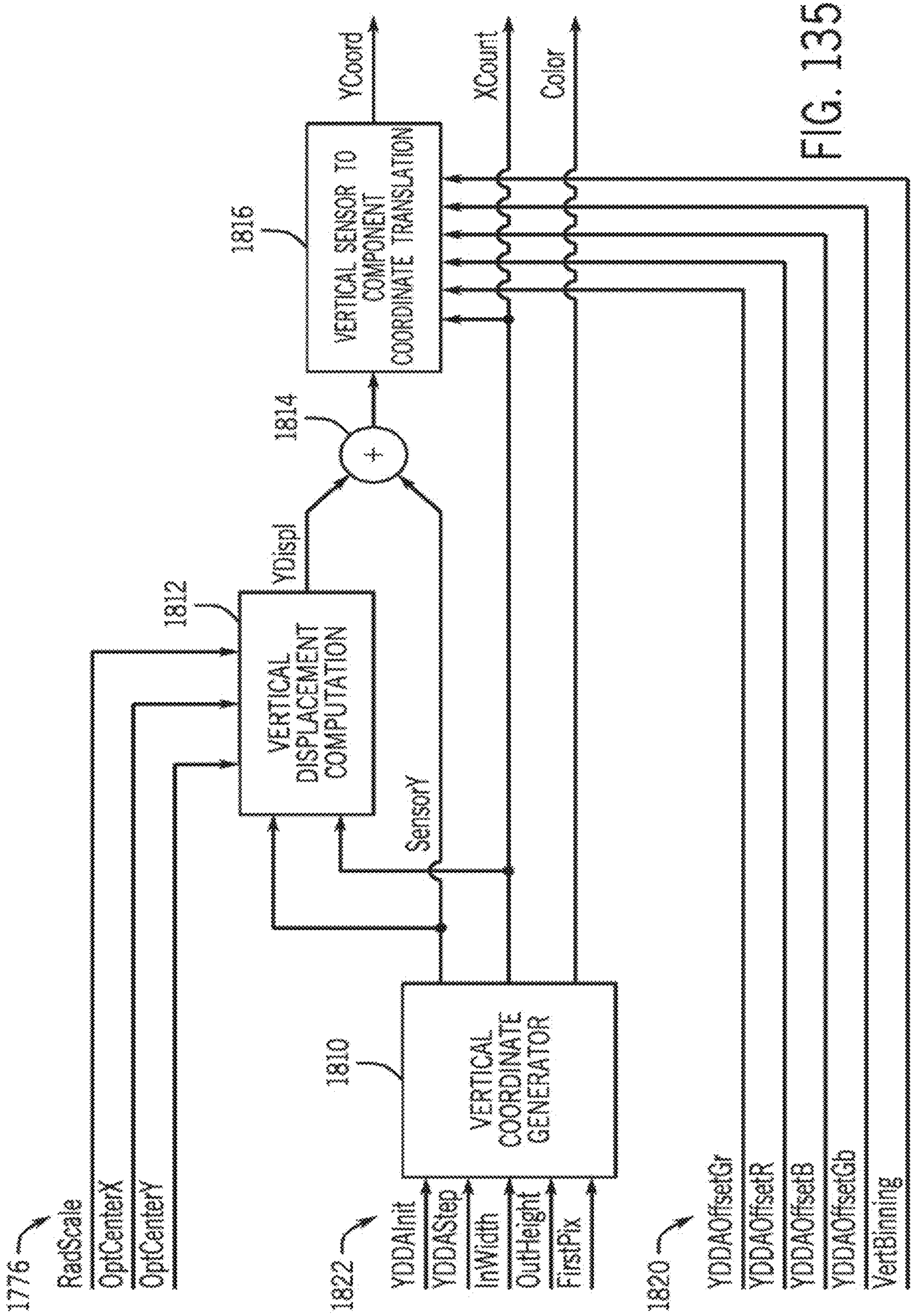

Having now summarized the components of the raw scaler circuitry 1652, the discussion now turns to a more detailed discussion of the individual components of the raw scaler circuitry 1652. FIG. 135 is a block diagram illustrating the vertical resampler coordinate generator 1776. The vertical resampler coordinate generator 1776 may include a vertical coordinate generator 1810, vertical displacement computation logic 1812, and vertical sensor to component coordinate translation logic 1816.

The vertical coordinate generator 1810 may compute the coordinates on the sensor for every output sample of the vertical resampler. This may be done, for example, through use of a Y digital differential analyzer (DDA) along with X and Y counters, as follows:

```
// Block Primary Inputs
int YDDAInit;   // Initial value for the YDDA (at the start of the frame)
                16.16 fp 2's comp
int YDDAStep;   // Step in YDDA value for each output line. 16.16 fp
int FirstPix;           // Specifys the color of the first pixel input from
                        sensor. 2-bit
                        // 0 - Gr, 1 - R, 2 = B, 3 - Gb
int InWidth;            // Input width. 13-bits. May be a multiple of 2.
int OutHeight;  // Output height. 13-bits. May be a multiple of 2.
// Block Primary Outputs
int XCount;             // X coordinate on sensor for current Vert Rescaler
                        output sample 13-bit
int SensorY;            // Y coordinate on sensor for current output sample
                        16.16 fp 2's comp
int Color;              // Color of current output sample. Same encoding
                        as FirstPix
// Internal Variables
int vcount;             // Vertical counter. Counts output lines. 13-bit
int YDDA;               // Y DDA value - input y coordinate for current
                        output sample.
// Pseudo-code
YDDA = YDDAInit;
for(vcount = 0; vcount < OutHeight; vcount++)
    {
    for(XCount = 0; XCount < InWidth; XCount++)
        {
        SensorY = YDDA;
        Color = (((vcount & 0x1) << 1) | (XCount & 0x1)) ^ FirstPix;
        }
    YDDA += YDDAStep;
    }
```

Figure 136:
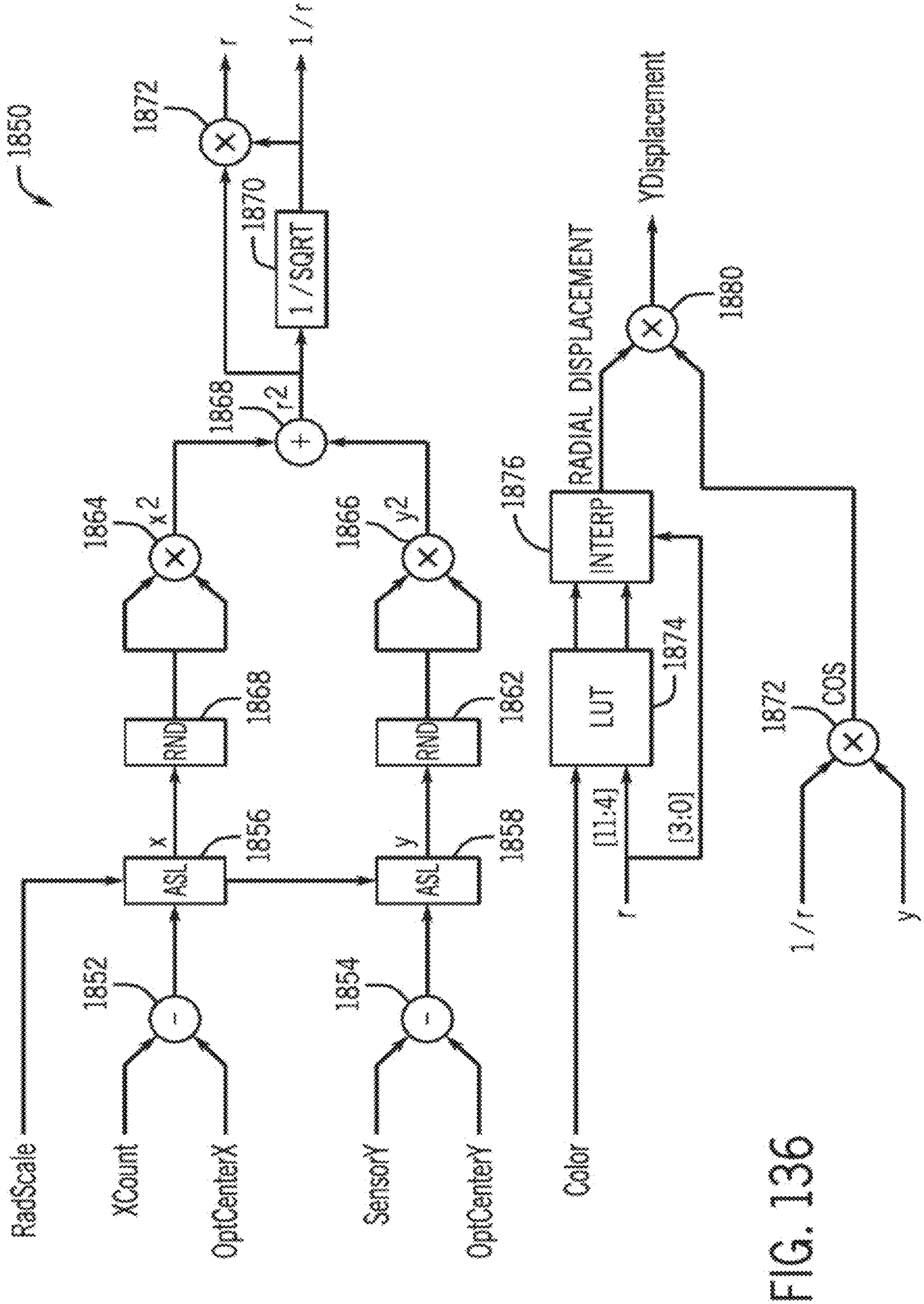

The vertical displacement computation logic 1812 may compute the X and Y displacements (e.g., distortions) for the current vertical resampler output sample. This logic may take the XCount and SensorY coordinates produced by the coordinate generator 1810, computes the radius, uses the radius to address one of a pair of lookup tables (one each for red and blue), retrieves the radial displacement from the look-up table and uses it to compute the vertical (Y) displacement. FIG. 136 illustrates the vertical displacement computation 1812, which may be implemented as follows:

```
// Block Primary Inputs
int XCount;         // Sensor X coordinate 13-bit comp
int SensorY;        // Sensor Y coordinate 16.16 fp 2's comp
int Color;          // Color of current sample
int OptCenterX;     // X coordinate of the optical center of the sensor
                    13-bit
int OptCenterY;     // Y coordinate of the optical center of the sensor
                    13-bit
int RadScale;       // X and Y coordinates are scaled by 2^RadScale before
                    being
                    // used to compute radius. Maintains constant
                    precision at
                    // output of radius computation for varying sensor
                    sizes. 2-bit
int                 // Chromatic Aberration correction LUTs
CACLut[2][256];
// Block Primary Outputs
int YDispl;         // Y Displacement. 6.8 fp 2's compl
// Internal Variables
int radX;           // X coordinate relative to optical center. 16.16
                    fp 2's comp
```

-continued

```
int radY;           // Y coordinate relative to optical center. 16.16
                    fp 2's comp
int sclX;           // X coordinate scaled prior to radius comp. 19.16
                    fp 2's comp
int sclY;           // Y coordinate scaled prior to radius comp. 19.16
                    fp 2's comp
int radsq;          // square of the radius
int radrecip;       // reciprocal of the radius 1.21 fp
int rad;        // radius. 13.3 fp
int cos;            // cosine of the angle between the line from the
                    //optical center to the sample and the vertical
                    (Y axis)
int displ;          // radial displacement. 6.8 fp 2's comp
// Pseudo-code
radX = XCount - OptCenterX;
radY = SensorY - (OptCenterY << 16);
sclX = radX * (2^RadScale);
sclY = radY * (2^RadScale);
radsq = (sclX^2) + (sclY^2);
radrecip = 1/sqrt(radsq);
rad = radsq * radrecip;
cos = sclY * radrecip;
lut_index = rad[14:7]; // integer bits [11:4]
lut_frac = rad[6:3]; // least significant 4 integer bits
lut_sel = color >> 1; // MSB of color
displ = ((16-lut_frac)*CACLut[lut_sel][lut_index] +
lut_frac*CACLut[lut_sel][lut_index+1] + 8) >> 4;
YDispl = cos * displ;
```

Figure 137:
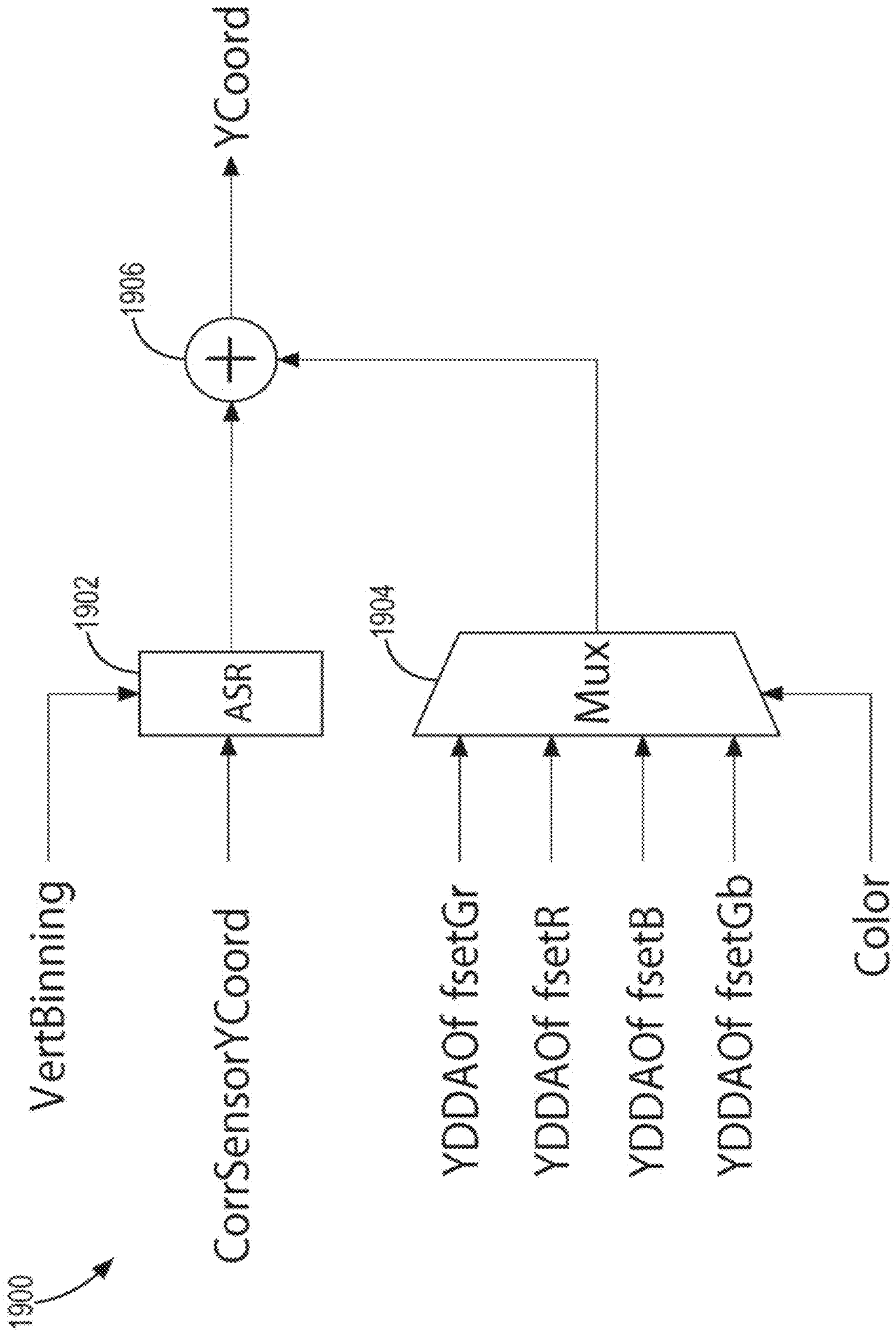

FIG. 137 is a block diagram illustrating the vertical sensor to component coordinate translation logic 1816. The vertical sensor to component coordinate translation logic 1816 may translate the corrected sensor Y coordinate to the Y coordinate within the appropriate input color frame. The YDispl values are added to the Sensor Y coordinates to produce a corrected coordinate that specifies the vertical position on the sensor corresponding to the output sample. These coordinates are at the sensor "raw" resolution and are relative to the top of the sensor. Thus, the vertical sensor to component coordinate translation logic 1816 may convert the coordinates to the resolution of the color components of the sensor output, where the coordinates are relative to the top of the appropriate color component. This functionality may be implemented as follows:

```
// Block Primary Inputs
int CorrSensorYCoord; // Corrected sensor Y coordinate. 16.3
                      fp 2's comp
int Color;                 // Color of current sample
int VertBinning;           // Amount of Vertical binning in the sensor
                           2-bit
int YDDAOffsetGr;          // Vertical offset from top edge for Gr 1.4
                           fp 2's comp
int YDDAOffsetR;           // Vertical offset from top edge for R 1.4
                           fp 2's comp
int YDDAOffsetB;           // Vertical offset from top edge for B 1.4
                           fp 2's comp
int YDDAOffsetGb;          // Vertical offset from top edge for Gb 1.4
                           fp 2's comp
// Block Primary outputs
int YCoord;                // Y Coordinate within color component
                           specified by Color.
                           //16.3 fp 2's comp
// Local Variables
int ScaledY;               // Scaled Y coordinate
// Pseudo-Code
ScaledY = CorrSensorYCoord >> VertBinning;
switch(Color)
    {
    case 0: ComponentY = (ScaledY + YDDAOffsetGr + 1) >> 1;
    break;
    case 1: ComponentY = (ScaledY + YDDAOffsetR + 1) >> 1;
    break;
```

-continued

```
case 2: ComponentY = (ScaledY + YDDAOffsetB + 1) >> 1;
break;
default: ComponentY = (ScaledY + YDDAOffsetGb + 1) >> 1;
}
```

Referring back to FIG. 134, as discussed above, the vertical resampler 1772 includes line buffers 1780, a line buffer controller 1784, a barrel shifter 1782 and a vertical filter 1786 (e.g., a 5-tap 8-phase filter). For each sample of each output line, the line buffers 1780 and the line buffer controller 1784 may provide up to five vertically adjacent samples from the appropriate color component of the input frame, depending on the vertical filter size. For example, if the raw scaler circuitry 1652 is producing Gr/R output lines and the vertical filter is five taps, the line buffers will provide five vertically adjacent samples from the Gr input color component followed by five vertically adjacent samples from the R input color component, etc. At each output sample position, the samples required at the input to vertical filter 1786 may be determined by: 1) the color of the sample being generated, 2) the value of the Y coordinate, 3) the horizontal position, and 4) the number of vertical filter taps. In one embodiment, this functionality may be implemented as follows:

```
// Block Primary Inputs
int YCoord;            // Y coordinate within the component defined by
                       Color
16.3
                       // fp 2's comp
int XCount;            // Horizontal position counter
int Color;             // The color of the current sample. Same encoding as
                       in
                       //coordinate generator
int VertNumTap;        // Number of vertical taps = VertNumTap+1. Field
                       has
                       //three bits.
int                    // input Bayer frame
inframe[inHeight][inWidth];
int inHeight;          // Input Height
// Block Primary Outputs
int vtap0;             // Tap holding oldest line
int vtap1;             // Tap holding older line
int vtap2;             // Tap holding current line
int vtap3;             // Tap holding newer line
int vtap4;             // Tap holding newest line
// Local varaibles
int line[5];           // line number for tap
int tapnum
// Pseudo-code
// If number of taps is odd, lines switch when ycoord is at at
mid-point
if(!(VertNumTap&0x1))
    YCoord += 4;   // Center tap is at closest integer line number
YCoord >>= 3;      // Throw away fractional part
// taps are centered on YCoord. Limit them to active area of component
for(tapnum=0; tapnum < 5; tapnum++)
    {
    line[tapnum] = YCoord − tapnum − 2;
    if(line[tapnum] < 0)
        line[tapnum] = 0;
    if(line[tapnum] >= InHeight/2;
        line[tapnum] = InHeight/2 − 1;
    }
// convert line number from component lines to Bayer lines
for(tapnum=0; tapnum < 5; tapnum++)
    line[tapnum] = (line[tapnum] << 1) | ((Color >> 1)^(FirstPix >> 1));
switch(VertNumTap)
    {
    case 0: vtap0 = inframe[line[2]][XCount];
        vtap1 = 0;
        vtap2 = 0;
```

-continued

```
        vtap3 = 0;
        vtap4 = 0;
        break;
    case 1: vtap0 = inframe[line[2]][XCount];
        vtap1 = inframe[line[3]][XCount];
        vtap2 = 0;
        vtap3 = 0;
        vtap4 = 0;
        break;
    case 2: vtap0 = inframe[line[1]][XCount];
        vtap1 = inframe[line[2]][XCount];
        vtap2 = inframe[line[3]][XCount];
        vtap3 = 0;
        vtap4 = 0;
        break;
    case 3: vtap0 = inframe[line[1]][XCount];
        vtap1 = inframe[line[2]][XCount];
        vtap2 = inframe[line[3]][XCount];
        vtap3 = inframe[line[4]][XCount];
        vtap4 = 0;
        break;
    default: vtap0 = inframe[line[0]][XCount];
        vtap1 = inframe[line[1]][XCount];
        vtap2 = inframe[line[2]][XCount];
        vtap3 = inframe[line[3]][XCount];
        vtap4 = inframe[line[4]][XCount];
    }
```

Figure 138:
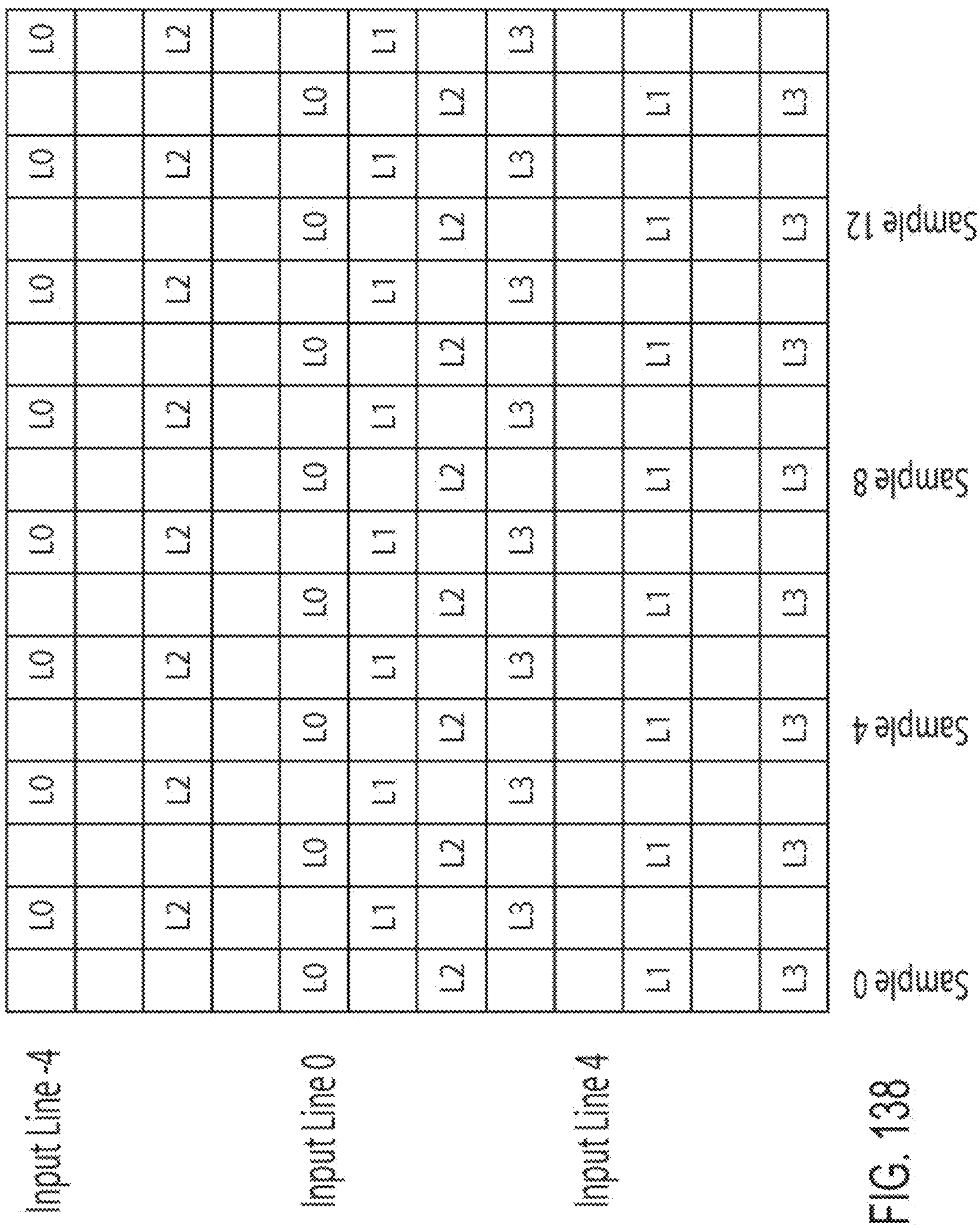

As illustrated in the preceding pseudo-code, during vertical resampling, the vertical coordinate of the center tap of the vertical filter 1786 is given by floor(ycoord+0.5). When performing downscaling, binning compensation, or both, the vertical coordinate will be constant during each output line and will step by >=1 between lines. If chromatic aberration correction is being performed, the y coordinate for the red (and blue) output samples may be different from that of the green sample, and the y coordinate of the red (or blue) samples may vary across the line. The difference between the red and green or blue and green coordinates may be more pronounced at the edges of the frame and may be very small, or zero towards the center of the frame. FIG. 138 illustrates an example of the Y coordinates of the center tap of the vertical filter 1786 for the first four output lines from the vertical resampler in a case with no vertical scaling or binning correction, and having a particularly bad case of chromatic aberration.

As illustrated in FIG. 138, since there is no vertical scaling or binning compensation, the green output samples are aligned with the green input samples. However, there is a large vertical offset (−4) between the red input and red output and between the blue input and the blue output (4). If a 5-tap vertical filter were to be used, in order to generate output line 0, the filter may access green lines (−4) to (4) and red lines (−8) to (0), which imply that input lines (−8) to (4) may be stored. In order to generate output line 1, the filter may access blue lines (1) to (9) and green lines (−3) to (5), which implies that input lines (−3) to (9) may be stored.

Figure 139:
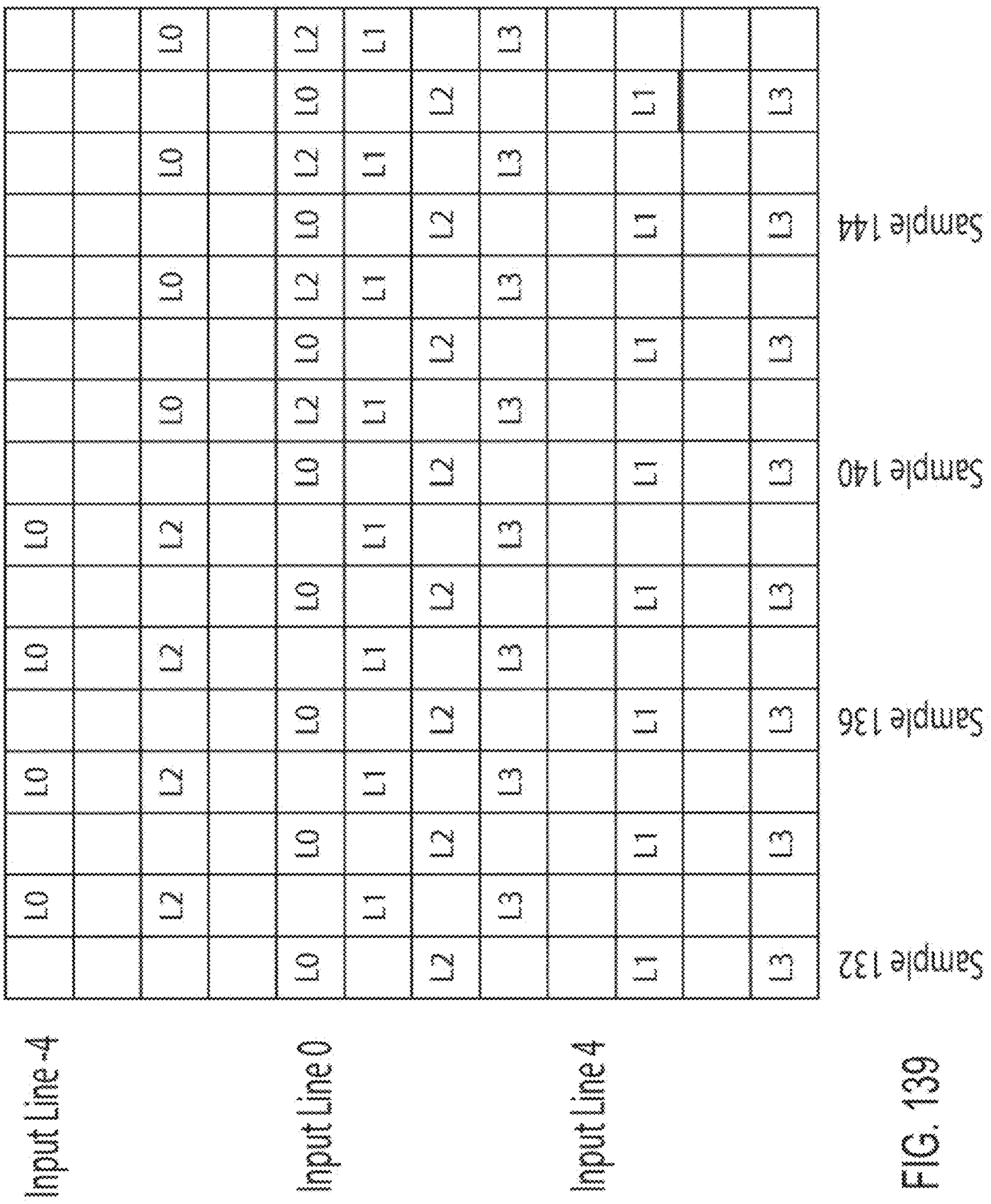

However, as illustrated in FIG. 139, if the Chromatic Aberration were a linear function of the radius, the offsets between red and green and between blue and green would be constant for each output line, but decreasing to zero near the vertical center of the frame. Since the Chromatic Aberration is not a linear function of the radius, variations in vertical offset can occur during a line.

Figure 140:
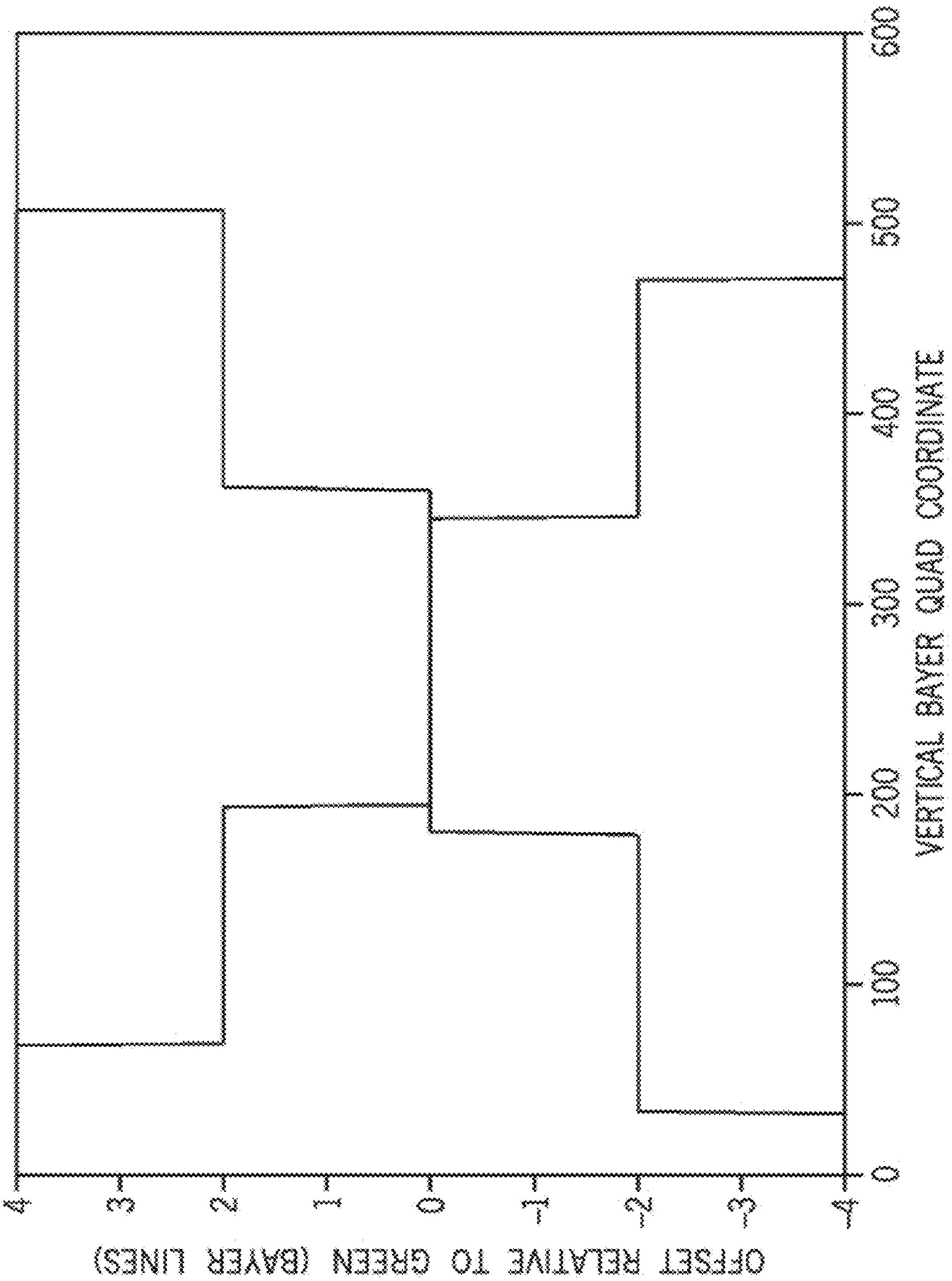

As illustrated in FIG. 139, the red vertical offset for output line 0 decreases to (2) at output sample 140 and the vertical offset for line 2 decreases to (2) at output sample 140. In general the offsets will decrease as radius decreases. This will tend to reduce line storage requirements towards the vertical center of the frame. FIG. 140 illustrates the offset between the vertical position of the center tap on the red (and blue) component and the corresponding green component. Note that this example is for a 1920×1080 frame with approximately 1% chromatic distortion.

FIG. 140 illustrates vertical offsets from the green channel. As illustrated, a decrease in the magnitude of a positive offset or an increase in the magnitude of a negative offset may indicate that more than one poutput line is generated for each input line, thus indicating that the same input lines are used when generating a pair of vertically adjacent output samples of the same color component (e.g., up-scaling).

Moving now to a more detailed discussion of the vertical filter 1786, the vertical filter 1786 may produce a weighted sum of the five input taps. The weights of these taps may be dependant on the phase input (e.g., the most significant three fractional bits of the Y coordinate). In some embodiments, the operation of the vertical filter may be implemented as follows:

```
// Block Primary Inputs
int vtap0;            // 16-bit sample value
int vtap1;            // 16-bit sample value
int vtap2;            // 16-bit sample value
int vtap3;            // 16-bit sample value
int vtap4;            // 16-bit sample value
int phase;            // 3-bit filter phase
int vfilter[8][5];    // 8x5 array of 3.13 2's comp filter
                      coefficients
// Block Primary Outputs
int vfilt;            // 16-bit sample output
// Local variables
int accum;            // 35-bit accumulator
// Pseudo-Code
accum = (vtap0*vfilter[phase][0]);
accum += (vtap1*vfilter[phase][1]);
accum += (vtap2*vfilter[phase][2]);
accum += (vtap3*vfilter[phase][3]);
accum += (vtap4*vfilter[phase][4]);
// round
accum += 0x1000;
accum >>= 13;
// limit to 16-bit unsigned output
if(accum < 0)
    vfilt = 0;
else if(accum > 65535)
    vfilt = 65536;
else
    vfilt = accum;
```

Figure 141:
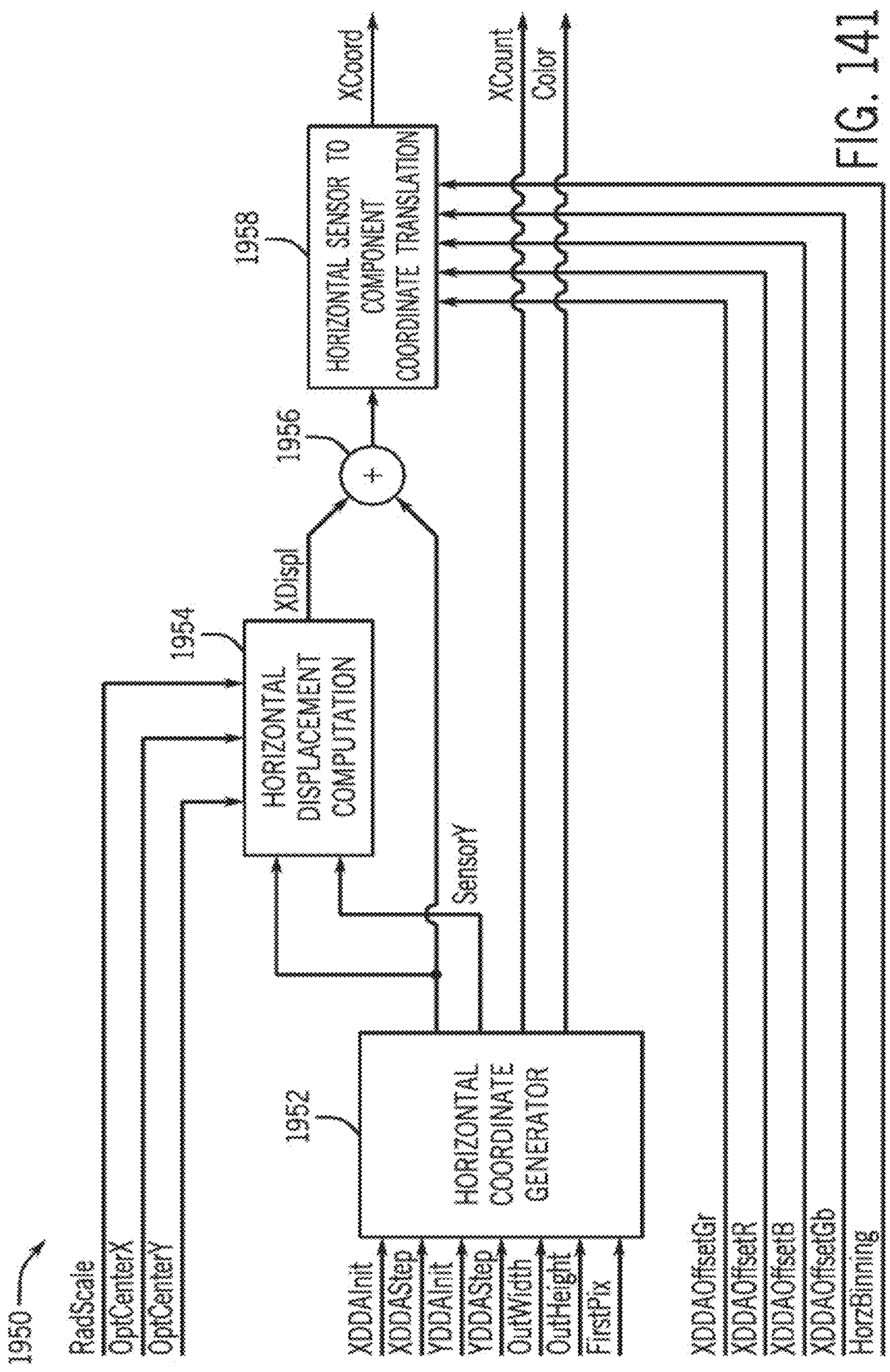

Having discussed the vertical resampler 1772 in depth, the discussion now turns to the horizontal resampler 1774. As discussed above, the horizontal resampler 1774 includes a horizontal resampler coordinate generator 1792. FIG. 141 is a block diagram illustrating one embodiment of the horizontal resampler coordinate generator 1792. Similar to the vertical coordinate generator 1776, the horizontal resampler coordinate generator 1792 may include a coordinate generator 1952, a displacement computation logic 1954, and sensor to component coordinate translation logic 1958.

The horizontal coordinate generator 1952 may compute the coordinates on the sensor for every output sample by using X and Y DDAs and the horizontal and vertical output sample/line counter. In one embodiment, the horizontal coordinate generator 1952 may be implemented according to:

```
// Block Primary Inputs
int XDDAInit;   // Initial value for the XDDA (at the start of the frame)
                16.16 fp 2's comp
```

-continued

```
int XDDAStep;   // Step in XDDA value for each output sample. 16.16 fp
int YDDAInit;   // Initial value for the YDDA (at the start of the frame)
                16.16 fp 2's comp
int YDDAStep;   // Step in YDDA value for each output line. 16.16 fp
int FirstPix;       // Specifies the color of the first pixel input from
                    sensor. 2-bit
                    // 0 - Gr, 1 - R, 2 = B, 3 - Gb
int OutWidth;       // Output width. 13-bits. May be a multiple of 2.
int OutHeight;  // Output height. 13-bits. May be a multiple of 2.
                    // Block Primary Outputs
int SensorX;        // X coordinate on sensor for current output sample
                    16.16 fp 2's comp
int SensorY;        // Y coordinate on sensor for current output sample
                    16.16 fp 2's comp
int YCount;         // Counts input lines to the horizontal rescaler
int Color;          // Color of current output sample. Same encoding as
                    FirstPix
                    // Internal Variables
int hcount;         // Horizontal counter. Counts output samples. 13-bit
int XDDA;           // X DDA value − input x coordinate for current
                    output sample.
int YDDA;           // Y DDA value − input y coordinate for current
                    output sample.
// Pseudo-code
YDDA = YDDAInit;
for(YCount = 0; YCount < OutHeight; YCount++)
    {
    XDDA = XDDAInit;
    for(hcount = 0; hcount < OutWidth; hcount++)
            {
            SensorX = XDDA;
            SensorY = YDDA;
            Color = (((YCount & 0x1) << 1) | (hcount & 0x1)) ^
            FirstPix;
            XDDA += XDDAStep;
            }
    YDDA += YDDAStep;
    }
```

Figure 142:
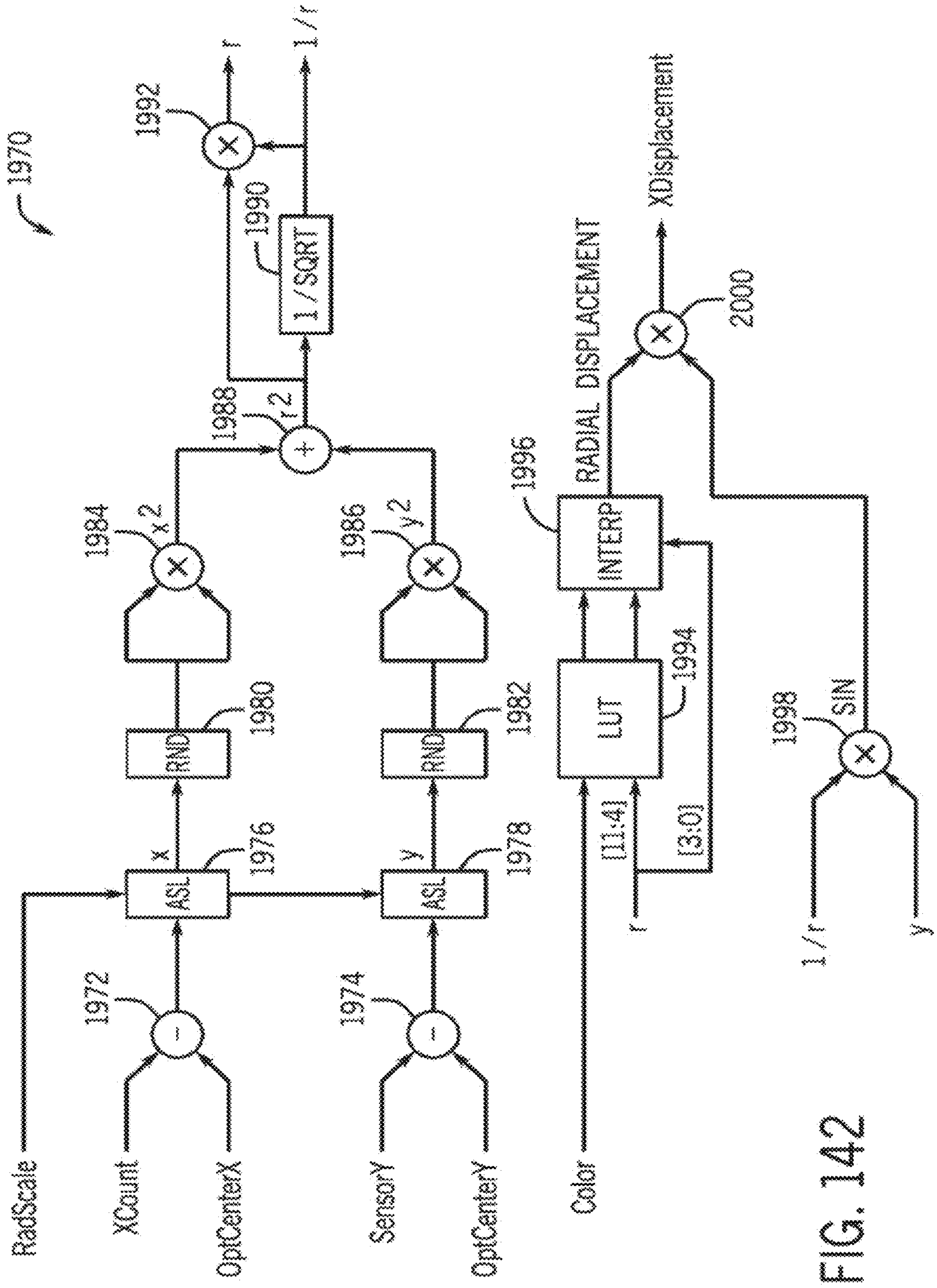

FIG. 142 is a block diagram illustrating the horizontal displacement computation logic 1954. The horizontal displacement computation logic 1954 may computer the X displacement (e.g., distortion) for each output sample. The horizontal displacement computation logic 1954 takes the sensor X and Y coordinates produced by the sensor coordinate generator, computes the radius, uses the radius to address one of a pair of lookup tables (one each for red and blue), retrieves the radial displacement from the look-up table and uses it to compute the horizontal displacement. In one embodiment, the horizontal displacement computation logic 1954 may be implemented according to:

```
// Block Primary Inputs
int SensorX;        // Sensor X coordinate 16.16 fp 2's comp
int SensorY;        // Sensor Y coordinate 16.16 fp 2's comp
int Color;          // Color of current sample
int OptCenterX;     // X coordinate of the optical center of the
                    sensor 13-bit
int OptCenterY;     // Y coordinate of the optical center of the
                    sensor 13-bit
int RadScale;       // X and Y coordinates are scaled by
                    2^RadScale before being
                    // used to compute radius. Maintains constant
                    precision at
                    // output of radius computation for varying
                    sensor sizes. 2-bit
int CACLut[2][256];  // Chromatic Aberration correction LUTs
// Block Primary Outputs
int XDispl;         // Y Displacement. 6.8 fp 2's compl
// Internal Variables
int radX;           // X coordinate relative to optical center.
                    16.16 fp 2's comp
int radY;           // Y coordinate relative to optical center.
                    16.16 fp 2's comp
```

-continued

```
int sclX;          // X coordinate scaled prior to radius
                   computation. 19.16 fp 2's comp
int sclY;          // Y coordinate scaled prior to radius
                   computation. 19.16 fp 2's comp
int radsq;         // square of the radius
int radrecip;      // reciprocal of the radius 1.21 fp
int rad;  // radius. 13.3 fp
int sin;  // sine of the angle between the line from the optical center to
          the sample
                   // and the vertical (Y axis)
int displ;         // radial displacement. 6.8 fp 2's comp
// Pseudo-code
radX = SensorX − (OptCenterX << 16);
radY = SensorY − (OptCenterY << 16);
sclX = radX * (2^RadScale);
sclY = radY * (2^RadScale);
radsq = (sclX^2) + (sclY^2);
radrecip = 1/sqrt(radsq);
rad = radsq * radrecip;
sin = sclX * radrecip;
lut_index = rad[14:7];      // integer bits [11:4]
lut_frac = rad[6:3];        // least significant 4 integer bits
lut_sel = color >> 1;       // MSB of color
displ = ((16-lut_frac)*CACLut[lut_sel][lut_index] +
lut_frac*CACLut[lut_sel][lut_index+1] + 8) >> 4;
```

Figure 143:
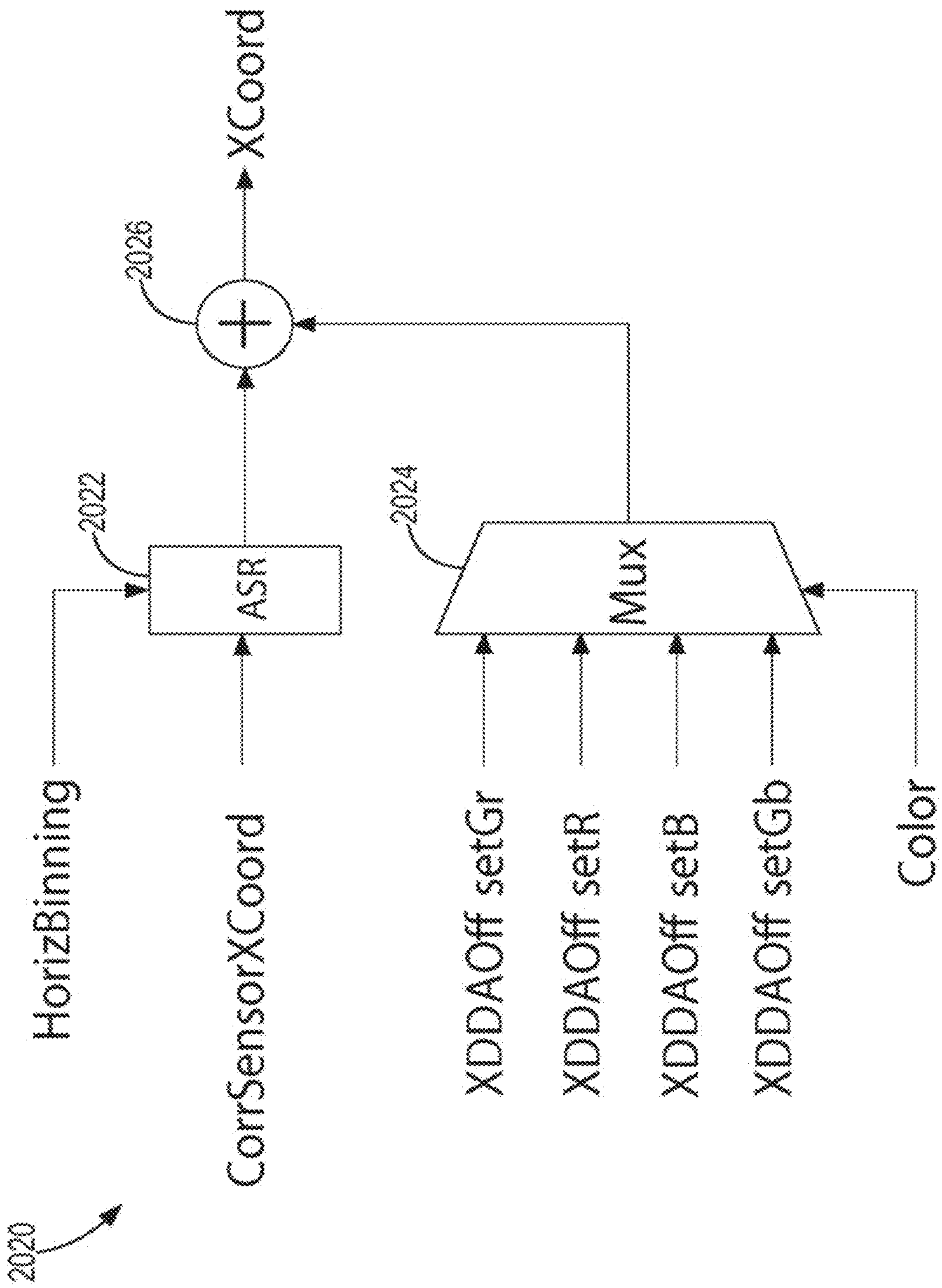

The horizontal sensor to component coordinate translation logic 1958 may translate the corrected sensor X coordinate to the X coordinate within the appropriate color frame. The XDispl values are added to the SensorX coordinate to produce a corrected coordinate that specifies the horizontal position on the sensor corresponding to the output sample. These coordinates are at sensor "raw" resolution and may be relative to the left side of the sensor. The horizontal sensor to component translation logic 1958 may convert the coordinates to the resolution of the color components of the sensor output, which may be relative to the left side of the appropriate color component. FIG. 143 is a block diagram illustrating the horizontal sensor to component coordinate translation logic 1958. In some embodiments, the horizontal sensor to component coordinate translation logic 1958 may be implemented according to the following pseudo-code:

```
// Block Primary Inputs
int CorrSensorXCoord; // Corrected sensor X coordinate. 16.3 fp 2's
                      comp
int Color;            // Color of current sample
int HorzBinning;      // Amount of Horizontal binning in the sensor
                      2-bit
int XDDAOffsetGr;     // Horizontal offset from left edge for Gr 1.4 fp
                      2's comp
int XDDAOffsetR;      // Horizontal offset from left edge for R 1.4 fp 2's
                      comp
int XDDAOffsetB;      // Horizontal offset from left edge for B 1.4 fp 2's
                      comp
int XDDAOffsetGb;     // Horizontal offset from left edge for Gb 1.4 fp
                      2's comp
// Block Primary outputs
int XCoord;           // X Coordinate within color component specified
                      by Color. 16.3 fp
                      //2's comp
// Local Variables
int ScaledX;          // Scaled X coordinate
// Pseudo-Code
ScaledX = CorrSensorXCoord >> HorzBinning;
switch(Color)
    {
    case 0: ComponentX = (ScaledX + XDDAOffsetGr + 1) >> 1;
        break;
    case 1: ComponentX = (ScaledX + XDDAOffsetR + 1) >> 1;
        break;
    case 2: ComponentX = (ScaledX + XDDAOffsetB + 1) >> 1;
        break;
    default: ComponentX = (ScaledX + XDDAOffsetGb + 1) >> 1;
    }
```

As discussed above, the horizontal resampler 1774 may include shift registers 1788 one or more multiplexers 1790, and a horizontal filter 1794 (e.g., a 9-tap 8-phase filter). For each sample of each output line, the shift registers 1788 and multiplexers 1790 provide nine horizontally adjacent samples from the appropriate color component of the vertically resampled frame. For example, if the raw scaler circuitry 1652 is producing a Gr/R output line, the shift registers 1788 and multiplexers 1790 will provide nine horizontally adjacent samples from the Gr input color component followed by nine horizontally adjacent samples from the R input color component, etc. At each output sample position, the samples required at the input to the horizontal filter may be determined by: 1) the color of the sample being generated, 2) the value of the X coordinate, 3) the vertical position, and 4) the number of horizontal filter taps. In certain embodiments, this functionality may be implemented according to:

```
// Block Primary Inputs
int XCoord;                          // X coordinate within the
                                     component defined by Color 16.3
                                     //fp 2's comp
int YCount;                          // Vertical position counter
int Color;                           // The color of the current sample.
                                     Same encoding as in
                                     //coordinate generator
int yresframe[OutHeight][InWidth];   // vertically resampled frame
int InWidth;                         // Input Width
// Block Primary Outputs
int htap0;                           // Tap holding sample (n−4)
int htap1;                           // Tap holding sample (n−3)
int htap2;                           // Tap holding sample (n−2)
int htap3;                           // Tap holding sample (n−1)
int htap4;                           // Tap holding sample (n)
int htap5;                           // Tap holding sample (n+1)
int htap6;                           // Tap holding sample (n+2)
int htap7;                           // Tap holding sample (n+3)
int htap8;                           // Tap holding sample (n+4)
// Local varaibles
int sample[9];                       // sample number for tap
int tapnum
// Pseudo-code
XCoord += 4; // Center tap is at closest integer line number, round
XCoord >>= 3;           // Throw away fractional part
// taps are centered on XCoord. Limit them to active area of component
for(tapnum=0; tapnum < 9; tapnum++)
    {
    sample[tapnum] = XCoord − tapnum − 4;
    if (sample[tapnum] < 0)
        sample[tapnum] = 0;
    if(sample[tapnum] >= InWidth/2;
        sample[tapnum] = InHWidth/2 − 1;
    }
// convert sample number from component samples to Bayer samples
for(tapnum=0; tapnum < 9; tapnum++)
    sample[tapnum] = (sample[tapnum] << 1) |
    ((Color & 0x1)^(FirstPix & 0x1));
// assign data to taps
htap0 = yresframe[YCount][sample[0]];
htap1 = yresframe[YCount][sample[1]];
htap2 = yresframe[YCount][sample[2]];
htap3 = yresframe[YCount][sample[3]];
htap4 = yresframe[YCount][sample[4]];
htap5 = yresframe[YCount][sample[5]];
htap6 = yresframe[YCount][sample[6]];
htap7 = yresframe[YCount][sample[7]];
htap8 = yresframe[YCount][sample[8]];
```

Figure 144:
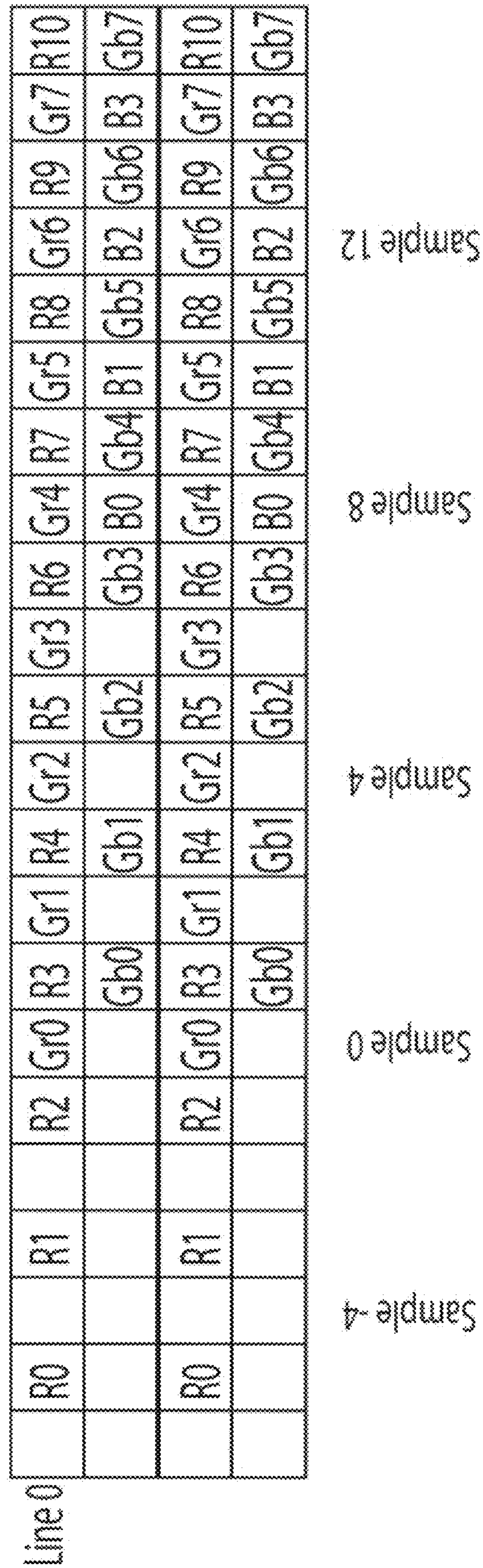

As illustrated above, during horizontal resampling, the horizontal coordinate of the center tap of the horizontal filter is given by floor(xcoord+0.5). When performing downscaling, binning compensation, or both, the horizontal coordinate of the red (or blue) sample will be numerically between the horizontal coordinates of the green samples on either side. If chromatic aberration correction is being performed, the x coordinates for the red (and blue) output samples may be offset from that of the green samples, and the offset may vary across the line. This offset may be more pronounced at the edges of the frame and may be very small, or zero towards the center of the frame. FIG. 144 illustrates the position of the center tap of the horizontal filter for the first four output lines from the horizontal resampler for a case with no vertical scaling or binning correction, but a particularly bad case of chromatic aberration.

As illustrated in FIG. 144, since there is no horizontal scaling or binning compensation, the green output samples are aligned with the green input samples. However, there is a large horizontal offset (−6) between the red input and red output and between the blue input and the blue output (8). If a 9-tap vertical filter were to be used, in order to generate output sample 0 on line 0, the filter may access samples (−8) to (8), sample 1 requires input samples (−13) to (3), sample 2 requires input samples (−6) to 10). The shift register may hold at least approximately 24 input samples in order to generate output line 0. In order to generate output line 1, the filter may access samples (0) to (16) for sample 0, (−7) to (9) for sample 1, (2) to (18) for sample 2 etc. In order to produce lines 1, the shift register may hold about 26 samples.

The horizontal offsets between input and output may decrease to zero at the vertical center of the frame (halfway across). FIG. 145 illustrates the offset for the blue channel decreasing by 2. Input sample 53 is the center tap for blue output sample 23 and blue output sample 24. This indicates that the same set of input samples are used to generate two output samples.

Figure 146:
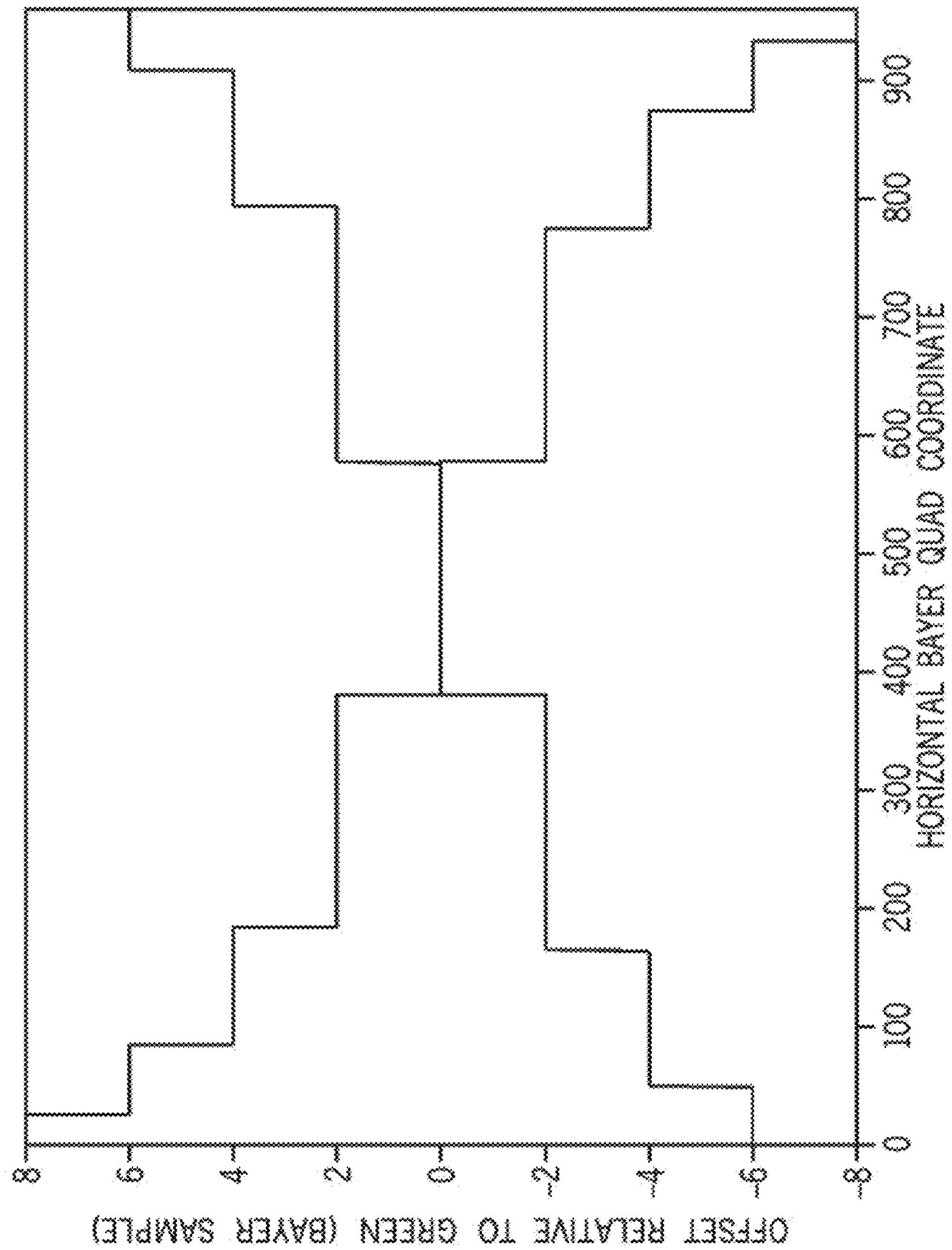

FIG. 146 illustrates the maximum offset between the vertical position of the center tap on the red (and blue) component and the corresponding green component. Note that this example is for a 1920×1080 frame with approximately 1% chromatic distortion. Further, a decrease in the magnitude of a positive offset or an increase in the magnitude of a negative offset indicates that more than one output sample is generated for each input sample, indicating that the same input samples are used when generating a pair of horizontally adjacent output samples of the same color component (e.g., up-scaling).

Turning now to a discussion of the horizontal filter 1794, the horizontal filter 1794 may produce a weighted sum of the nine input taps. The weights of the taps may be dependent on the phase input (e.g., the most significant three fractional bits of the X coordinate). For example, in certain embodiments, the operation of the horizontal filter may be implemented according to:

```
// Block Primary Inputs
int htap0;              // 16-bit sample value
int htap1;              // 16-bit sample value
int htap2;              // 16-bit sample value
int htap3;              // 16-bit sample value
int htap4;              // 16-bit sample value
int htap5;              // 16-bit sample value
int htap6;              // 16-bit sample value
int htap7;              // 16-bit sample value
int htap8;              // 16-bit sample value
int phase;              // 3-bit filter phase
```

-continued

```
int hfilter[8][9]; // 8x9 array of 3.13 2's comp filter coefficients
// Block Primary Outputs
int hfilt;              // 16-bit sample output
// Local variables
int accum;              // 37-bit accumulator
// Pseudo-Code
accum = (htap0*hfilter[phase][0]);
accum += (htap1*hfilter[phase][1]);
accum += (htap2*hfilter[phase][2]);
accum += (htap3*hfilter[phase][3]);
accum += (htap4*hfilter[phase][4]);
accum += (htap5*hfilter[phase][5]);
accum += (htap6*hfilter[phase][6]);
accum += (htap7*hfilter[phase][7]);
accum += (htap8*hfilter[phase][8]);
// round
accum += 0x1000;
accum >>= 13;
// limit to 16-bit unsigned output
if(accum < 0)
    hfilt = 0;
else if(accum > 0xffff)
    hfilt = 0xffff;
else
    hfilt = accum;
```

As discussed above, the output of the horizontal filter 1794 may be the chromatic aberration corrected raw data, which may be scaled to a desired size. When the image data is downscaled before exiting the raw processing logic 150, bandwidth can be preserved between the raw processing logic 150 and the memory 100 and/or the RGB processing logic 160.

RGB Processing Logic

Referring again briefly to FIG. 8, the RGB processing logic 160 may perform additional image processing after processing in the raw processing logic (RAWProc) 160 and before the image data is sent to the YCC processing logic 170. One example of the RGB processing logic 160 is shown in greater detail in FIG. 147. As seen in FIG. 147, the RGB processing logic 160 may receive image data from the raw processing block 154 or from the memory 100. When supplied by the DMA source S5 in the memory 100, the image data may be in Bayer raw or RGB format (e.g., raw8, raw10, raw12, raw14, raw16, RGB565, RGB888, or RGB16). When supplied by the raw processing logic 150, the image data may be in the raw format. Selection logic 162 may select the input to the RGB processing logic 160 as image data from the raw processing block 150 or from the memory 100.

The selected image data signal may enter selection logic 3000 and/or the demosaic (DEM) logic 3002, which may convert raw image data into RGB format. The selection logic 3000 may cause image data already in the RGB format to bypass the demosaic (DEM) logic 3002. Thus, the example of the RGB processing logic 160 shown in FIG. 147 can receive and process image data in either the raw or RGB format. Because the RGB processing logic 160 can receive either raw or RGB image data, the RGB processing logic 160 may be able to process the same image data in multiple passes, storing and retrieving the image data from the memory 100 any suitable number of times. In addition, the RGB processing logic 160 may be able to receive a raw or RGB image signal obtained from another source (e.g., a third-party camera or rgb image data generated by software running on the processor(s) 16). In this way, the RGB processing logic 160 may process RGB image data to be displayed on the display 28, which may include photo data, video data, or any other RGB-format image data deriving from a source other than the sensor(s) 90.

Before continuing further, it should be noted that the input image data in the RGB or raw formats may be signed image data. The scale and offset logic 82 (not shown in FIG. 147) may be implemented as a function of the direct memory access (DMA) input and output logic, and may convert unsigned image data in the memory 100 into signed 17-bit image data. The scaling and offsetting process to obtain signed 17-bit data is discussed in greater detail above with reference to FIGS. 40-43. In general, as mentioned above, the scale and offset logic 82 provides a programmable zero bias at the input and output of the RGB processing logic 160. The programmable zero bias may set the zero level in the 17-bit signed range. Namely, the DMA input source to the RGB processing logic 160 may subtract the zero bias to create negative inputs, and the zero bias may be added back at the output DMA destination (e.g., the memory 100) to bring the pixel data back into a positive form, before the pixel data is clipped to an unsigned 16-bit range. Since the range of the signed 17-bit pixel data on the negative side is anticipated to be much smaller than the range on the positive side, the zero bias approach used in generating the signed 17-bit image data allows for a greater range of the pixel data for processing through the RGB processing logic 160, as compared to using signed 16-bit pixels. Internally, the interface between various functional blocks of the RGB processing logic 160 is signed 17-bit. When line buffers are used by a functional block of the RGB processing logic 160, the zero bias may be temporarily subtracted from the input line buffers and added to the output line buffers after the pixel data has been clipped to a 16-bit unsigned range.

The RGB image data output by the demosaic (DEM) logic 3002 or provided by the memory 100 may be processed by several functional blocks of the RGB processing logic 160. These may include local tone mapping (LTM) logic 3004, first offset, gain, and clip (GOC1) logic 3006, RGB color correction matrix (CCM) logic 3008, color correction in a 3-D color lookup table (CLUT) 3010, second offset, gain, and clip (GOC2) logic 3012, RGB gamma logic 3014, and/or color space conversion (CSC) logic 3018. The RGB processing logic 160 may also generate histograms using data that can be selected via selection logic 3016 as image data before or after being processed in the RGB gamma logic 3014 using histogram generation logic 3018. The histograms generated by the histogram generation logic 3018 may be output to the memory 100. Although the 3D CLUT 3010 is shown as located before the RGB gamma logic 3014, in other embodiments these may be reversed.

Note also that the LTM logic 3004 occurs immediately after the demosaic (DEM) logic 3002 in the example of FIG. 147. The LTM logic 3004 may be more effective the closer it occurs to highlight recovery (HR) 1038. Moreover, the LTM logic 3004 may occur before the CCM logic 3008 because handling clipped pixels before the CCM logic 3008 may preserve more image information. Additionally, it may be recalled that the statistics logic 140*a* and 140*b* essentially calculate the image statistics in the raw domain. As discussed below, the local tone curves of the LTM logic 3004 is programmed using these statistics. Thus, if the LTM logic 3004 were placed after the CCM logic 3008, the local tone curves of the LTM logic 3004 would need to have been generated using in a manner that also accounted for (e.g., simulated) the effect of passing the pixels through the CCM logic 3008.

The color space conversion (CSC) logic 3020 may selectively convert the image data from the RGB gamma logic 3014 into the YCbCr format before the image data is saved to the memory 100 or output to the YCC processing logic 170. In some embodiments, the RGB image data may not be converted into the YCbCr format in the CSC logic 3020, but instead may be saved to memory in the RGB format. This image data may be reprocessed by the RGB processing logic 160 any suitable number of times. For example, software controlling the ISP pipe processing logic 80 may send the RGB image data through the RGB processing logic 160 multiple times with the same or variations of the control parameters. Under certain conditions (e.g., low-light conditions, high-noise conditions, or images with high dynamic ranges), reprocessing image data through the RGB processing logic 160 may produce more pleasing images. When the output pixels are sent to memory, a 16-bit-per-component image data can be sent in an 8-bit format by truncating the lower 8-bits, or the 16-bit image data can be written in 16-bit format.

Demosaicing (DEM) Logic and Green Non-Uniformity (GNU) Correction

Referring now to FIG. 148, a graphical process flow 3030 that provides a general overview as to how demosaicing may be applied to a raw Bayer image pattern 3032 to produce a full color RGB is illustrated. As shown, a 4×4 portion 3034 of the raw Bayer image 3032 may include separate channels for each color component, including a green channel 3036, a red channel 3038, and a blue channel 3040. Because each imaging pixel in a Bayer sensor only acquires data for one color, the color data for each color channel 3036, 3038, and 3040 may be incomplete, as indicated by the "?" symbols. By applying a demosaicing technique 3042, the missing color samples from each channel may be interpolated. For instance, as shown by reference number 3044, interpolated data G' may be used to fill the missing samples on the green color channel. Similarly, interpolated data R' may (in combination with the interpolated data G' 3044) be used to fill the missing samples on the red color channel 3046, and interpolated data B' may (in combination with the interpolated data G' 3044) be used to fill the missing samples on the blue color channel 3048. Thus, as a result of the demosaicing process, each color channel (R, G, B) will have a full set of color data, which may then be used to reconstruct a full color RGB image 3050.

Before demosaicing, however, it may be beneficial to correct any green non-uniformity (GNU). GNU may be characterized as a brightness difference between the Gr and Gb pixels over a uniformly illuminated and flat surface. When GNU is not corrected, it may lead to 'maze' artifacts upon applying the demosaic process 3042. Thus, GNU correction may be performed before the demosaic process 3042 on Green pixels only. A variety of GNU compensation modes may be supported. In the first mode, a simple thresholded average of green pixels may replace an original green value. In the second mode, a more advanced low pass filter with a high-frequency recovery filter may be used to correct the GNU. The second GNU mode may be include as part of the green interpolation filter that will be discussed in more detail below.

Referring now to the first GNU correction mode, FIG. 149 illustrates a 2×2 pixel grid configured in a Bayer CFA pattern. At each green pixel in the Bayer pattern, the absolute difference between the current green pixel, G1, and the green pixel to the right and below the current pixel, G2, is determined. If the determined value is smaller than a predetermined threshold (e.g., pre-programmed by software and defined as gnu_thd below), the green sample G1 is replaced by the average of G1 and G2. By using the thresholded average replacement method, averaging of pixel values for G1 and G2 across edges may be avoided. Thus, the current mode may result in a preserved sharpness of the resultant image (e.g., Full RGB image 3050). Accordingly, GNU mode one may be implemented according to the following:

if (abs(G1−G2)<=gnu_thd)

G1=(G1+G2+1)>>1

The second GNU correction mode may apply varying green pixel values on the green pixels as the red and blue pixel values are being interpolated through the demosaic process 3042. Thus, this second mode of GNU may make use of the demosaicing logic 404 and, thus, will be discussed in conjunction with the demosaicing process described below. While the current discussion illustrates the GNU correction integrated with the demosaicing logic 404 for a more efficient use of hardware (e.g., using the same line buffers as the demosaicing logic 404), in some embodiments, the GNU correction may be completely segregated from the demosaicing logic 404, and may be implemented in a stand-alone fashion, independent from the demosaicing logic 404.

A demosaicing technique that may be implemented by the demosaicing logic 404 will now be described in accordance with one embodiment. On the green color channel, missing color samples may be interpolated using a low pass directional filter on known green samples and a high pass (or gradient) filter on the adjacent color channels (e.g., red and blue). For the red and blue color channels, the missing color samples may be interpolated in a similar manner, but by using low pass filtering on known red or blue values and high pass filtering on co-located interpolated green values. Further, in one embodiment, demosaicing on the green color channel may utilize a 5×5 pixel block edge-adaptive filter based on the original Bayer color data. As will be discussed further below, the use of an edge-adaptive filter may provide for the continuous weighting based on gradients of horizontal and vertical filtered values, which reduce the appearance of certain artifacts, such as aliasing, "checkerboard," or "rainbow" artifacts, commonly seen in conventional demosaicing techniques.

During demosaicing on the green channel, the original values for the green pixels (Gr and Gb pixels) of the Bayer image pattern are used unless the GNU correction mode two is enabled. However, to obtain a full set of data for the green channel, green pixel values may be interpolated at the red and blue pixels of the Bayer image pattern. In accordance with the present technique, horizontal and vertical energy components, respectively referred to as Eh and Ev, are first calculated at red and blue pixels based on the above-mentioned 5×5 pixel block. The values of Eh and Ev may be used to obtain an edge-weighted filtered value from the horizontal and vertical filtering steps, as discussed further below.

By way of example, FIG. 150 illustrates the computation of the Eh and Ev values for a red pixel centered in the 5×5 pixel block at location (j, i), wherein j corresponds to a row and i corresponds to a column. As shown, the calculation of Eh considers the middle three rows (j−1, j, j+1) of the 5×5 pixel block, and the calculation of Ev considers the middle three columns (i−1, i, i+1) of the 5×5 pixel block. To compute Eh, the absolute value of the sum of each of the pixels in the red columns (i−2, i, i+2) multiplied by a corresponding coefficient (e.g., −1 for columns i−2 and i+2; 2 for column i) is summed with the absolute value of the sum of each of the pixels in the blue columns (i−1, i+1) multiplied by a corresponding coefficient (e.g., 1 for column i−1; −1 for column i+1). To compute Ev, the absolute value of the sum of each of the pixels in the red rows (j−2, j, j+2) multiplied by a corresponding coefficient (e.g., −1 for rows j−2 and j+2; 2 for row j) is summed with the absolute value of the sum of each of the pixels in the blue rows (j−1, j+1) multiplied by a corresponding coefficient (e.g., 1 for row j−1; −1 for row j+1). These computations are illustrated by the equations below:

Eh=abs[2((P(j−1,i)+P(j,i)+P(j+1,i))−(P(j−1,i−2)+P(j,i−2)+P(j+1,i−2))−(P(j−1,i+2)+P(j,i+2)+P(j+1,i+2)]+abs[(P(j−1,i−1)+P(j,i−1)+P(j+1,i−1))−(P(j−1,i+1)+P(j,i+1)+P(j+1,i+1)]

Ev=abs[2(P(j,i−1)+P(j,i)+P(j,i+1))−(P(j−2,i−1)+P(j−2,i)+P(j−2,i+1))−(P(j+2,i−1)+P(j+2,i)+P(j+2,i+1]+abs[(P(j−1,i−1)+P(j−1,i)+P(j−1,i+1))−(P(j+1,i−1)+P(j+1,i)+P(j+1,i+1)]

In some embodiments, the cross-color gradients or energies may be useful in the demosaic logic 404. When cross-color energy is enabled, horizontal and vertical cross-color energies, CEh and CEv, respectively, may be added to the Eh and Ev values. CEh and CEv may be calculated as follows:

CEh=abs(2*P(j,i−1)−P(j,i−2)−P(j,i))+abs(2*P(j,i+1)−P(j,i)−P(j,i+2));

CEv=abs(2*P(j−1,i)−P(j−2,i)−P(j,i))+abs(2*P(j+1,i)−P(j,i)−P(j+2,i));

A confidence coefficient may be calculated based upon the CEh and CEv values. The confidence coefficient may provide a weighting coefficient for the CEh or CEv values based upon which value (CEh or CEv) is lower. When CEh and CEv are equal, no confidence coefficient may be necessary. However, when CEh and CEv are not equal, the confidence coefficient may be determined as follows:

```
if (CEh == CEv)
    w = 0;
else {
    if (CEh < CEv) {
        w1 = 1 − CEh/(P(j, i−1) + P(j, i+1));
        w2 = 1 − (abs(P(j, i) − P(j, i−2)) + abs(P(j, i) − P(j, i+2)))/P(j,
        i);
        w3 = 1 − (abs(P(j−1, i) − P(j−1, i−2)) + abs(P(j−1, i) − P(j−1,
        i+2)))/P(j−1, i);
        w4 = 1 − (abs(P(j+1, i) − P(j+1, i−2)) + abs(P(j+1, i) − P(j+1,
        i+2)))/P(j+1, i);
    }
    else {
        w1 = 1 − CEv/(P(j−1, i) + P(j+1, i));
        w2 = 1 − (abs(P(j, i) − P(j−2, i) + abs(P(j, i) − P(j+2, i)))/P(j,
        i);
        w3 = 1 − (abs(P(j, i−1) − P(j−2, i−1)) + abs(P(j, i−1) − P(j+2,
        i−1)))/P(j, i−1);
        w4 = 1 − (abs(P(j, i+1) − P(j−2, i+1)) + abs(P(j, i+1) − P(j+2,
        i+1)))/P(j, i+1);
    }
    if (w1 < 0) w1 = 0;
    if (w2 < 0) w2 = 0;
    if (w3 < 0) w3 = 0;
    if (w4 < 0) w4 = 0;
    w = w1 * w2 * w3 * w4;
}
```

These confidence coefficients may be used to weigh the horizontal and vertical cross-color energies before applying the horizontal and vertical cross-color energies to the horizontal and vertical energies, respectively, as follows:

Eh=Eh+w*CEh;

Ev=Ev+w*CEv;

The total energy sum may be expressed as: Eh+Ev. Further, while the example shown in FIG. 150 illustrates the computation of Eh and Ev for a red center pixel at (j, i), it should be understood that the Eh and Ev values may be determined in a similar manner for blue center pixels.

Horizontal and vertical energies may also be computed on the Green pixels. These energies may be useful to disable the high frequency filter when interpolating the red and blue color channels. When interpolating red or blue values, a 3×3 filter is used. For simplicity, the same filter kernel size may be used. Thus, Eh and Ev calculations for the green samples may be performed with a 3×3 kernel. FIG. 151 illustrates the computation of Eh and Ev values for a Gr pixel, however, the same filter may be applied on any interpolated red or blue pixel. As illustrated, given a 5×5 array of CFA patterns with the center pixel P at row=j and column=i, the horizontal and vertical energies Eh and Ev, respectively, on interpolated red and blue positions may be computed as follows:

Eh=abs((P(j−1,i−1)+P(j,i−1)+P(j+1,i−1))−(P(j−1,i+1)+P(j, 1+1)+P(j+1,i+1))

Ev=abs((P(j−1,i−1)+P(j−1,i)+P(j−1,i+1))−(P(j+1,i−1)+P(j+1,i)+P(j+1,i+1))

Further, as discussed above, the total energy may be the summation of Eh and Ev.

Next, horizontal and vertical filtering may be applied to the Bayer pattern to obtain the vertical and horizontal filtered values Gh and Gv, which may represent interpolated green values in the horizontal and vertical directions, respectively. The filtered values Gh and Gv may be determined using a low pass filter on known neighboring green samples in addition to using directional gradients of the adjacent color (R or B) to obtain a high frequency signal at the locations of the missing green samples. For instance, with reference to FIG. 152, an example of horizontal interpolation for determining Gh will now be illustrated.

As shown in FIG. 152, five horizontal pixels (R0, G1, R2, G3, and R4) of a red line 3060 of the Bayer image, wherein R2 is assumed to be the center pixel at (j, i), may be considered in determining Gh. Filtering coefficients associated with each of these five pixels are indicated by reference numeral 3062. Accordingly, the interpolation of a green value, referred to as G2', for the center pixel R2, may be determined as follows:

$$G2' = \frac{G1+G3}{2} + \frac{2R2 - \left(\frac{R0+R2}{2}\right) - \left(\frac{R2+R4}{2}\right)}{2}$$

Various mathematical operations may then be utilized to produce the expression for G2' shown in the equations below:

$$G2' = \frac{2G1+2G3}{4} + \frac{4R2 - R0 - R2 - R2 - R4}{4}$$

$$G2' = \frac{2G1+2G3+2R2-R0-R4}{4}$$

Thus, with reference to FIG. 152 and the equations above, the general expression for the horizontal interpolation for the green value at (j, i) may be derived as:

$$Gh = Gh_{lp} + Gh_{hp}$$

$$Gh_{lp} = \frac{P(j, i-1) + P(j, i+1)}{2}$$

$$Gh_{hp} = \frac{2P(j, i) - P(j, i-2) - P(j, i+2))}{4}$$

Since the high pass filter can be disabled in some embodiments, the filters are defined as two separate components in the above equations. When the high pass filter is disabled, only the low pass portion of the filter is used.

The vertical filtering component Gv may be determined in a similar manner as Gh. For example, referring to FIG. 153, five vertical pixels (R0, G1, R2, G3, and R4) of a red column 3064 of the Bayer image and their respective filtering coefficients 3066, wherein R2 is assumed to be the center pixel at (j, i), may be considered in determining Gv. Using low pass filtering on the known green samples and high pass filtering on the red channel in the vertical direction, the following expression may be derived for Gv:

$$Gv = Gv_{lp} + Gv_{hp}$$

$$Gv_{lp} = \frac{P(j-1, i) + P(j+1, i)}{2}$$

$$Gv_{hp} = \frac{2P(j, i) - P(j-2, i) - P(j+2, i)}{4}$$

Once again, the high frequency and low frequency components have been separated in the above equations because the high pass filter may be disabled in some embodiments. When the high pass filter is disabled, only the low pass portion of the filter is used.

While the examples discussed herein have shown the interpolation of green values on a red pixel, it should be understood that the expressions set forth in the above equations may also be used in the horizontal and vertical interpolation of green values for blue pixels.

As discussed above, a second mode of GNU correction may be enabled in the demosaic logic 404. This mode of GNU correction may be applied while performing the green channel demosaicing. In other words, a correction amount may be determined while the interpolating green values for red and blue pixels. The correction amount may be added to the Gh and Gv values discussed above. In one embodiment, the second mode GNU correction logic may correct the Gb and/or Gr pixel values by half the difference between the low-pass filter (LPF) result of Gb and the LPF result of Gr. While the current discussion illustrates the GNU correction logic applied while performing the green channel demosaicing (e.g., for an increase efficiency in utilizing line buffers), in alternative embodiments, the GNU correction may be applied prior to and/or after the green channel demosaicing.

To calculate the GNU correction amount, GNUdelta(j,i), a sparse 5×5 filter using greens in the neighborhood where the filter coefficients are half the distance between the two low-pass filter coefficients may be used. FIG. 154 illustrates an embodiment of filter coefficients useful for computing the GNU correction amount.

To avoid excessive GNU correction and better control the correction term, the absolute value of GNUdelta may be capped to a maximum value for each pixel. In some embodiments, a 17-entry lookup table (GNUMaxLUT) may be used to define brightness dependent threshold values. The lookup table may be indexed by the current low pass value ($Gh_{lp}$+$Gv_{lp}$)/2. The 17 entries in the lookup table may be evenly distributed in a 16-bit input range. When the input value falls between intervals, the output values of the maximum threshold may be linearly interpolated. In one embodiment, this calculation may be implemented as follows:

maxCap1=interp1(GNUMaxLUT, (Ghlp+Gvlp)/2)

GNUdelta1=max(−maxCap1, min(maxCap1, GNUdelta))

where interp1 is the linear interpolation of the values in the GNUMax lookup table. Once the GNUdelta(j,i) is computed, it may be added or subtracted to Gh and Gv as follows:

Gh=Gh−GNUdelta1

Gv=Gv+GNUdelta1

The GNUdelta may represent a value that may be used to correct the green pixel above the current red/blue pixel. The green pixel, Grb may be determined as follows:

maxCap2=interp1(GNUMaxLUT,Grb(j−1,i))

GNUdelta2=max (−maxCap2, min(maxCap2, GNUdelta (j,i))

Grb (j−1,i)=Grb(j−1,i)+GNUdelta2

The GNU mode two correction may take place before interpolating the red and blue pixel values but after computing the green pixel values. Further, to avoid artifacts, the high pass filter output can be scaled or reset to zero using different local gradient filters. For example, in one mode, the green high frequency may be modified by resetting the high frequency to zero if the red/blue gradients are in a different direction compared to the green gradient. In a second mode, the high frequency may be scaled using the brightness ratio of a green low pass average to a red/blue low pass average. FIG. 155 illustrates a definition of local green gradient filters. FIG. 156 illustrates vertical and horizontal red/blue gradient filters.

As discussed above, in the first high frequency control mode, the high frequency component may be reset to zero when the red/blue gradients are in a different direction compared to the green gradient. Thus, this mode may be implemented as follows:

```
if ((f(HD0)>=−THDr && f(HD1)>=−THDr && f(GD1)
    <=THDg)||(f(HD0)<=THDr && f(HD1)<=THDr &&
    f(GD1)>=−THDg))
    Ghhp=0
if ((f(VD0)>=−THDr && f(VD1)>=−THDr && f(GD0)
    <=THDg)||(f(VD0)<=THDr && f(VD1)<=THDr &&
    f(GD0)>=−THDg))
    Gvhp=0
```

The variable f(x) may represent the filter output from filter x and THD is a positive threshold value to account for noise.

Further, as discussed above, in the second high frequency control method, the high frequency component may be scaled by the brightness ratio of the green low pass average to the red/blue low pass average as follows:

```
RBhlp=min((P(j,i−2)+P(j,i+2))/2), (P(j,i−2)+2*P(j,i)+P(j,
    i+2)/4))
if (RBhlp>Ghlp) Ghhp=Ghhp*Ghlp/RBhlp
RBvlp=min((P(j−2,i)+P(j+2,i))/2), (P(j−2,i)+2*P(j,i)+P
    (j+2,i))/4))
if (RBvlp<1) RBvlp=1
if (Gvlp<1) Gvlp=1
if (RBvlp>Gvlp) Gvhp=Gvhp*Gvlp/RBvlp
```

To prevent division by zero, if RBhlp or Ghlp are less than one, they may be set equal to one.

The final interpolated green value, Gi, may be obtained by weighting Gh and Gv by the corresponding horizontal and vertical energies Eh and Ev. In one embodiment, this may be implemented as follows:

```
if EnergyWeightLUTEn
    Wev=EnergyWeightLUT[2^10*Ev/Es];
else
    Wev=2^10*Ev/Es;
Gi=(Wev*Gh (1024−Wev)*Gv+512)>>10;
```

where EnergyWeightLUT may be a lookup table containing weight value. In some embodiments, floating point weight values may be utilized. However, floating point computations may be expensive. The number of fractional bits may be determined by looking beyond a precision lost from this one operation to an overall quality of change based upon the fractional bit precision. In some embodiments, the EnergyWeightLUT may be a 17 entry lookup table containing an 11-bit (1.10 representation) weight value as a fixed point representation of floating point weights between 0.0 and 1.0. The 17 input entries may be evenly distributed in the range of the 11-bit input values. When the input value falls between intervals, the output values may be linearly interpolated. The input bit depth may determine the amount of interpolated bits to calculate. The upper 5 bits may be used to index in the table and the lower 6 bits may be used for interpolation.

In some embodiments, the green channel interpolation may optionally be setup to bypass the gradient adaptive section. In such embodiments, when an edge adaptive threshold (e.g., edge_thd) is greater than or equal to the summation of the horizontal and vertical energies Ev and Eh, the edge adaptive section may not be used. Further, in some embodiments, an equal weight edge parameter may be provided. When the equal weight edge parameter (e.g., EqWeightEn) is enabled, the horizontal and vertical energies Ev and Eh are weighted equally (e.g., Eh=Ev=1). Further, when the edge adaptive threshold is greater than or equal to the summation of the horizontal and vertical energies or the equal weight edge parameter is enabled, the horizontal and vertical filtered pixels may be weighted equally (e.g., Gi=(Gh+Gv+1)>>1)

As discussed above, the energy components Eh and Ev may provide for edge-adaptive weighting of the horizontal and vertical filter outputs Gh and Gv, which may help to reduce image artifacts, such as rainbow, aliasing, or checkerboard artifacts, in the reconstructed RGB image. Additionally, the demosaicing logic 404 may provide an option to bypass the edge-adaptive weighting feature by setting the Eh and Ev values each to 1, such that Gh and Gv are equally weighted. For example, when the summation of the horizontal and vertical energies (e.g. Eh+Ev) is less than a high frequency threshold (e.g., demosaic_hf_thd), only the low pass portion of the filter may be used during the interpolation. FIG. 157 illustrates a summary of the green interpolation on both red and blue pixels. Note that while certain filter coefficients are illustrated in FIG. 157, these coefficients are merely a representation of potential starting filter coefficients. Over time, these filter coefficients may change.

After the green values are interpolated, the green pixels may be post-processed with 3×3 spatial support to mitigate any white/black dot artifacts that my occasionally appear on sharp diagonal edges and corners. Further, any original pixel values (e.g., non-interpolated pixel values) may be filtered, for example, to reduce noise or increase sharpness.

To provide the green post-processing, the 3×3 spatial support may be used to detect "popped" pixels and replace them with the pixel along the best gradient direction. In some embodiments, when the second mode of GNU is enabled, all green interpolated pixel values may have GNU correction applied except for G01 and G21. The center of the 3×3 spatial support may be one line above the center of the 5×5 support used to compute the interpolated green values.

Thus, the interpolated green values are readily available for the 3×3 post-processing. To more clearly illustrate the green-post processing, block 3084 of FIG. 1472 will be referenced. As illustrated, block 3084 represents a blue pixel, where green values may be interpolated. To determine whether the center pixel's interpolated green value, G'11, is a popped pixel, two determinations are made. First, the center pixel may be flagged as a popped pixel when a determination is made that the maximum of any of the green values (e.g., actual and interpolated green values) in the 3×3 spatial support is less than the center pixel's interpolated green value minus a pre-defined threshold. Second, the center pixel may be flagged as a popped pixel when a determination is made that the minimum of any of the green values is greater than the center pixel's interpolated green value plus the predefined threshold. Thus, the two conditions that may determine whether the center pixel's interpolated green value, G'11 is a "popped" value, may be implemented as follows:

max8(G10, G12, G01, G21, G'20, G'02, G'00, G'22) <G'11−Thr_p min8(G10, G12, G01, G21, G'20, G'02, G'00, G'22)>G'11+Thr_p Thr_p may represent the pre-defined threshold determined by polling a 17-entry lookup table (e.g., Thr_pLUT) indexed by the green interpolated value G'11. Thus, the pre-defined threshold value may correlate with a particular brightness defined by the interpolated green pixel value. The pre-defined threshold may be linearly interpolated based upon the applicable entries in the Thr_pLUT as follows:

Thr_p=interp1(Thr_pLUT, G'11)

When the center pixel is not marked as popped for interpolated green pixels, the value (e.g., G'11) remains untouched. However, when the center pixel is marked as popped, the center pixel, G'11, is replaced along the lowest gradient direction (e.g., horizontal, vertical, or diagonal gradients). The gradients may be determined according to:

GrH=(2G'11−G10−G12)/2

GrV=(2G'11−G01−G21)/2

GrD1=(2G'11−G'20−G'02)/2

GrD2=(2G'11−G'00−G'22)/2

Minimum absolute values of the four gradients may be determined and the interpolated green center pixel value, G'11, may be replaced by linear interpolation in the direction of the smallest gradient, as follows:

```
if (minAbsValue == abs(GrH)) {
// GrH's absolute value is the smallest
GrMinDirection = GrH;
}
else if (minAbsValue == abs(GrV)) {
// GrV's absolute value is the smallest
GrMinDirection = GrV;
}
else if (minAbsValue == abs(GrD1)) {
// GrD1's absolute value is the smallest
GrMinDirection = GrD1;
}
else {
// GrD2's absolute value is the smallest
GrMinDirection = GrD2;
}
G'11 = G'11 − GrMinDirection
```

Next, demosaicing on the red and blue color channels may be performed by interpolating red and blue values at the green pixels of the Bayer image pattern, interpolating red values at the blue pixels of the Bayer image pattern, and interpolating blue values at the red pixels of the Bayer image pattern. In accordance with the present discussed techniques, missing red and blue pixel values may be interpolated using low pass filtering based upon known neighboring red and blue pixels and high pass filtering based upon co-located green pixel values, which may be original or interpolated values (from the green channel demosaicing process discussed above) depending on the location of the current pixel. Further, the interpolated green post-processing may provide more accurate interpolated green values by reducing the number of "popped" pixel values. Thus, with regard to such embodiments, it should be understood that interpolation and post-processing of missing green values may be performed first, such that a complete set of green values (both original and interpolated values) is available when interpolating the missing red and blue samples.

The interpolation of red and blue pixel values may be described with reference to FIG. 158, which illustrates various 3×3 blocks of the Bayer image pattern to which red and blue demosaicing may be applied, as well as interpolated green values (designated by G') that may have been obtained during demosaicing on the green channel. Further, in some embodiments, a high frequency threshold may be defined. When the summation of the horizontal and vertical energies (e.g., Ev+Eh) is less than the predefined threshold, the interpolation may use only the low pass portion of the filter. Referring first to block 3080, the interpolated red value, $R'_{11}$, for the Gr pixel ($G_{11}$) may be determined as follows:

$$R'_{11} = \frac{(R_{10}+R_{12})}{2} + \frac{(2G_{11}-G'_{10}-G'_{12})}{2},$$

$$R'_{lp} = \frac{(R_{10}+R_{12})}{2}$$

$$R'_{hp} = \frac{(2G_{11}-G'_{10}-G'_{12})}{2}$$

where $G'_{10}$ and $G'_{12}$ represent interpolated green values, as shown by reference number 3086. Similarly, the interpolated blue value, $B'_{11}$, for the Gr pixel ($G_{11}$) may be determined as follows:

$$B'_{11} = \frac{(B_{01}+B_{21})}{2} + \frac{(2G_{11}-G'_{01}-G'_{21})}{2},$$

$$B'_{lp} = \frac{(B_{01}+B_{21})}{2}$$

$$B'_{hp} = \frac{(2G_{11}-G'_{01}-G'_{21})}{2}$$

wherein $G'_{01}$ and $G'_{21}$ represent interpolated green values (3086).

Next, referring to the pixel block 3082, in which the center pixel is a Gb pixel ($G_{11}$), the interpolated red value, $R'_{11}$, and blue value $B'_{11}$, may be determined as shown in the equations below:

$$R'_{11} = \frac{(R_{01}+R_{21})}{2} + \frac{(2G_{11}-G'_{01}-G'_{21})}{2}$$

$$R'_{lp} = \frac{(R_{01}+R_{21})}{2}$$

$$R'_{hp} = \frac{(2G_{11}-G'_{01}-G'_{21})}{2}$$

-continued $$B'_{11}=\frac{(B_{10}+B_{12})}{2}+\frac{(2G_{11}-G'_{10}-G'_{12})}{2}$$

$$B'_{lp}=\frac{(B_{10}+B_{12})}{2}$$

$$B'_{hp}=\frac{(2G_{11}-G'_{10}-G'_{12})}{2}$$

Further, referring to pixel block 3084, the interpolation of a red value on a blue pixel, $B_{11}$, may be determined as follows:

$$R'_{11}=\frac{(R_{00}+R_{02}+R_{20}+R_{22})}{4}+\frac{(4G'_{11}-G'_{00}-G'_{02}-G'_{20}-G'_{22})}{4},$$

$$R'_{lp}=\frac{(R_{00}+R_{02}+R_{20}+R_{22})}{4}$$

$$R'_{hp}=\frac{(4G'_{11}-G'_{00}-G'_{02}-G'_{20}-G'_{22})}{4}$$

wherein $G'_{00}$, $G'_{02}$, $G'_{11}$, $G'_{20}$, and $G'_{22}$ represent interpolated green values, as shown by reference number 3090. Finally, the interpolation of a blue value on a red pixel, as shown by pixel block 3086, may be calculated as follows:

$$B'_{11}=\frac{(B_{00}+B_{02}+B_{20}+B_{22})}{4}+\frac{(4G'_{11}-G'_{00}-G'_{02}-G'_{20}-G'_{22})}{4}$$

$$B'_{lp}=\frac{(B_{00}+B_{02}+B_{20}+B_{22})}{4}$$

$$B'_{hp}=\frac{(4G'_{11}-G'_{00}-G'_{02}-G'_{20}-G'_{22})}{4}$$

While the embodiment discussed above relied on color differences (e.g., gradients) for determining red and blue interpolated values, another embodiment may provide for interpolated red and blue values using color ratios. For instance, interpolated green values (blocks 3088 and 3090) may be used to obtain a color ratio at red and blue pixel locations of the Bayer image pattern, and linear interpolation of the ratios may be used to determine an interpolated color ratio for the missing color sample. The green value, which may be an interpolated or an original value, may be multiplied by the interpolated color ratio to obtain a final interpolated color value. For instance, interpolation of red and blue pixel values using color ratios may be performed in accordance with the formulas below, wherein the equations show the interpolation of red and blue values for a Gr pixel, show the interpolation of red and blue values for a Gb pixel, show the interpolation of a red value on a blue pixel, and show the interpolation of a blue value on a red pixel:

$$R'_{11}=G_{11}\frac{\left(\frac{R_{10}}{G'_{10}}\right)+\left(\frac{R_{12}}{G'_{12}}\right)}{2}$$

($R'_{11}$ interpolated when $G_{11}$ is a $Gr$ pixel)

$$B'_{11}=G_{11}\frac{\left(\frac{B_{01}}{G'_{01}}\right)+\left(\frac{B_{21}}{G'_{21}}\right)}{2}$$

($B'_{11}$ interpolated when $G_{11}$ is a $Gr$ pixel)

$$R'_{11}=G_{11}\frac{\left(\frac{R_{01}}{G'_{01}}\right)+\left(\frac{R_{21}}{G'_{21}}\right)}{2}$$

-continued ($R'_{11}$ interpolated when $G_{11}$ is a $Gb$ pixel)

$$B'_{11}=G_{11}\frac{\left(\frac{B_{10}}{G'_{10}}\right)+\left(\frac{B_{12}}{G'_{12}}\right)}{2}$$

$$R'_{11}=G'_{11}\frac{\left(\frac{R_{00}}{G'_{00}}\right)+\left(\frac{R_{02}}{G'_{02}}\right)+\left(\frac{R_{20}}{G'_{20}}\right)+\left(\frac{R_{22}}{G'_{22}}\right)}{4}$$

($R'_{11}$ interpolated on a blue pixel $B_{11}$)

$$B'_{11}=G'_{11}\frac{\left(\frac{B_{00}}{G'_{00}}\right)+\left(\frac{B_{02}}{G'_{02}}\right)+\left(\frac{B_{20}}{G'_{20}}\right)+\left(\frac{B_{22}}{G'_{22}}\right)}{4}$$

($B'_{11}$ interpolated on a red pixel $R_{11}$)

The high pass filter output can be scaled or reset to zero using different local gradient filters to avoid artifacts. Two methods for modifying the red/blue high frequency include: a) resetting the high frequency if the green gradients are in a different direction compared to the red/blue gradient and/or b) scaling the high frequency using the brightness ratio of the red/blue low pass average to the green low pass average.

In the first high frequency control method, the red/blue high frequency component may be reset to zero if the green gradients are in a different direction compared to the red/blue gradient. In some embodiments, this method may be implemented as follows:

Red on Gr if (((G'10–G11)>=–THDg && (G11–G'12)>=–THDg && (R10–R12)<=THDr)||((G'10–G11)<=THDg && (G11–G'12)<=THDg && (R10–R12)>=–THDr))

Rhp=0

Red on Gb:

if (((G'01–G11)>=–THDg && (G11–G'21)>=–THDg && (R01–R21)<=THDr)||((G'01–G11)<=THDg && (G11–G'21)<=THDg && (R01–R21)>=–THDr))

Rhp=0

Red on Blue:

if (((G'00–G'11)>=–THDg && (G'11–G'02)>=–THDg && (R00–R02)<=THDr && (G'20–G'11)>=–THDg && (G'11–G'22)>=–THDg && (R20–R22)<=THDr)||((G'00–G'11)<=THDg && (G'11–G'02)<=THDg && (R00–R02)>=–THDr && (G'20–G'11)<=THDg && (G'11–G'22)<=THDg && (R20–R22)>=–THDr)||((G'00–G'11)>=–THDg && (G'11–G'20)>=–THDg && (R00–R20)<=THDr && (G'02–G'11)>=–THDg && (G'11–G'22)>=–THDg && (R02–R22)<=THDr)||((G'00–G'11)<=THDg && (G'11–G'20)<=THDg && (R00–R20)>=–THDr && (G'02–G'11)<=THDg && (G'11–G'22)<=THDg && (R02–R22)>=–THDr))

Rhp=0

Blue on Gr (same as Red on Gb):

if (((G'01–G11)>=–THDg && (G11–G'21)>=–THDg && (B01–B21)<=THDb)||((G'01–G11)<=THDg && (G11–G'21)<=THDg && (B01–B21)>=–THDb))

Bhp=0

Blue on Gb (same as Red on Gr):

if (((G'10–G11)>=–THDg && (G11–G'12)>=–THDg && (B10–B12)<=THDb)||((G'10–G11)<=THDg && (G1–G'12)<=THDg && (B10–B12)>=–THDb))

Bhp=0

Blue on Red (same as Red on Blue):

if (((G'00–G'11)>=–THDg && (G'11–G'02)>=–THDg && (B00–B02)<=THDb && (G'20–G'11)>=–THDg &&

(G'11−G'22)>=−THDg && (B20−B22)<=THDb)||((G'00−G'11)<=THDg && (G'11−G'02)<=THDg && (B00−B02)>=−THDb (G'20−G'11)<=THDg && (G'11−G'22)<=THDg && && (B20−B22)>=−THDb)||((G'00−G'11)>=−THDg && (G'11−G'20)>=−THDg && && (B00−B20)<=THDb (G'02−G'11)>=−THDg && (G'11−G'22)>=−THDg && (B02−B22)<=THDb)||((G'00−G'11)<=THDg && (G'11−G'20)<=THDg && (B00−B20)>=−THDb && (G'02−G'11)<=THDg && (G'11−G'22)<=THDg && (B02−B22)>=−THDb))

Bhp=0

In the second high frequency control method, the high frequency component can be scaled by the brightness ratio of red/blue low pass average to green low pass average (minimum low pass values may be clipped to 1) as follows:

Red on Gr.
Glp=(G'10+G'12)/2
if (Glp<1) Glp=1
if (Rlp<1) Rlp=1
if (Glp>Rlp) Rhp=Rhp*Rlp/Glp

Red on Gb:
Glp=(G'01+G'21)/2
if (Glp<1) Glp=1
if (Rlp<1) Rlp=1
if (Glp>Rlp) Rhp=Rhp*Rlp/Glp

Red on Blue:
Glp=(G'00+G'02+G'20+G'22)/4
if (Glp<1) Glp=1
if (Rlp<1) Rlp=1
if (Glp>Rlp) Rhp=Rhp*Rlp/Glp Blue on Gr (same as Red on Gb):
Glp=(G'01+G'21)/2
if (Glp<1) Glp=1
if (Blp<1) Blp=1
if (Glp>Blp) Bhp=Bhp*Blp/Glp Blue on Gb (same as Red on Gr):
Glp=(G'1+G'12)/2
if (Glp<1) Glp=1
if (Blp<1) Blp=1
if (Glp>Blp) Bhp=Bhp Blp/Glp Blue on Red (same as Red on Blue):
Glp=(G'00+G'02+G'20+G'22)/4
if (Glp<1) Glp=1
if (Blp<1) Blp=1
if (Glp>Blp) Bhp=Bhp*Blp/Glp Once the missing color samples have been interpolated for each image pixel from the Bayer image pattern, a complete sample of color values for each of the red, blue, and green color channels (e.g., 3044, 3046, and 3048 of FIG. 148) may be combined to produce a full color RGB image. For instance, referring back FIGS. 27 and 28, the output 372 of the raw pixel processing logic 360 may be an RGB image signal in 8, 10, 12 or 14-bit formats.

Referring now to FIGS. 159-162, various flow charts illustrating processes for demosaicing a raw Bayer image pattern in accordance with disclosed embodiments are illustrated. Specifically, the process 3104 of FIG. 159 depicts the determination of which color components are to be interpolated for a given input pixel P. Based on the determination by process 3104, one or more of the process 3112 (FIG. 160) for interpolating a green value, the process 3150 (FIG. 161) for interpolating a red value, or the process 3200 (FIG. 162) for interpolating a blue value may be performed (e.g., by the demosaicing logic 404).

Beginning with FIG. 159, the process 560 begins at step 3102 when an input pixel P is received. Decision logic 3104 determines the color of the input pixel. For instance, this may depend on the location of the pixel within the Bayer image pattern. Accordingly, if P is identified as being a green pixel (e.g., Gr or Gb), the process 560 proceeds to step 3106 to obtain interpolated red and blue values for P. This may include, for example, continuing to the processes 584 and 598 of FIGS. 161 and 162, respectively. If P is identified as being a red pixel, then the process 560 proceeds to step 3108 to obtain interpolated green and blue values for P. This may include further performing the processes 3112 and 598 of FIGS. 160 and 162, respectively. Additionally, if P is identified as being a blue pixel, then the process 560 proceeds to step 3110 to obtain interpolated green and red values for P. This may include further performing the processes 3112 and 584 of FIGS. 160 and 161, respectively. Each of the processes 3112, 584, and 598 are described further below.

The process 3112 for determining an interpolated green value for the input pixel P is illustrated in FIG. 160 and includes steps 3114-3126. At step 3114, the input pixel P is received (e.g., from process 560). Next, at step 3118, a set of neighboring pixels forming a 5×5 pixel block is identified, with P being the center of the 5×5 block. Thereafter, the pixel block is analyzed to determine horizontal and vertical energy components at step 3120. For instance, the horizontal and vertical energy components may be determined in accordance with the equations disclosed herein for calculating Eh and Ev, respectively. As discussed, the energy components Eh and Ev may be used as weighting coefficients to provide edge-adaptive filtering and, therefore, reduce the appearance of certain demosaicing artifacts in the final image. At step 3124, low pass filtering and high pass filtering as applied in horizontal and vertical directions to determine horizontal and vertical filtering outputs. For example, the horizontal and vertical filtering outputs, Gh and Gv, may be calculated in accordance with the equations disclosed herein. Next the process 560 continues to step 3126, at which the interpolated green value G' is interpolated based on the values of Gh and Gv weighted with the energy components Eh and Ev, as shown in the above equations.

Next, with regard to the process 584 of FIG. 161, the interpolation of red values may begin at step 3152, at which the input pixel P is received (e.g., from process 560). At step 3154, a set of neighboring pixels forming a 3×3 pixel block is identified, with P being the center of the 3×3 block. Thereafter, low pass filtering is applied on neighboring red pixels within the 3×3 block at step 3156, and high pass filtering is applied on co-located green neighboring values at step 3158, which may be original green values captured by the Bayer image sensor, or interpolated values (e.g., determined via process 3112 of FIG. 160). The interpolated red value R' for P may be determined based on the low pass and high pass filtering outputs, as shown at step 3160. Depending on the color of P, R' may be determined in accordance with one of the equations discussed above.

With regard to the interpolation of blue values, the process 598 of FIG. 162 may be applied. The steps 3202 and 3204 are generally identical to the steps 3152 and 3154 of the process 584 (FIG. 161). At step 3206, low pass filtering is applied on neighboring blue pixels within the 3×3, and, at step 3208, high pass filtering is applied on co-located green neighboring values, which may be original green values captured by the Bayer image sensor, or interpolated values (e.g., determined via process 3112 of FIG. 160). The interpolated blue value B' for P may be determined based on the low pass and high pass filtering outputs, as shown at step 3210. Depending on the color of P, B' may be determined in accordance with one of the equations discussed above. Further, as mentioned above, the interpolation of red and blue values may be determined using color differences or color ratios, in accordance with the equations discussed above. Again, it should be understood that interpolation of missing green values may be performed first, such that a complete set of green values (both original and interpolated values) is available when interpolating the missing red and blue samples. For example, the process 3112 of FIG. 160 may be applied to interpolate all missing green color samples before performing the processes 584 and 598 of FIGS. 161 and 162, respectively.

Referring to FIGS. 163-166, examples of photographic images processed by the raw pixel processing logic 360 in the ISP pipe 82 are provided. FIG. 163 depicts an original image scene 3250, which may be captured by the image sensor 90 of the imaging device 30. FIG. 164 shows a raw Bayer image 3252 which may represent the raw pixel data captured by the image sensor 90. As mentioned above, conventional demosaicing techniques may not provide for adaptive filtering based on the detection of edges (e.g., borders between areas of two or more colors) in the image data, which may, undesirably, produce artifacts in the resulting reconstructed full color RGB image. For instance, FIG. 165 shows an RGB image 3254 reconstructed using conventional demosaicing techniques, and may include artifacts, such as "checkerboard" artifacts 3256 at the edge 3258. However, comparing the image 3254 to the RGB image 3260 of FIG. 166, which may be an example of an image reconstructed using the demosaicing techniques described above, it can be seen that the checkerboard artifacts 3256 present in FIG. 165 are not present, or at least their appearance is substantially reduced at the edge 3258. Thus, the images shown in FIGS. 163-166 are intended to illustrate at least one advantage that the demosaicing techniques disclosed herein have over conventional methods.

Local Tone Mapping (LTM) Logic

The output of the demosaic (DEM) logic 3002 may enter the local tone mapping (LTM) logic 3004. The LTM logic 3004 may apply different local tone curves to different areas of the image frame to preserve details in highlights and shadows that might otherwise be lost if the same global tone curve were applied across the entire image frame. The effect of the LTM logic 3004 may be bypassed by applying a unity gain or a global tone curve to all pixels of the image frame. When the LTM logic 3004 applies different tone curves to different areas of the image frame, the LTM logic 3004 may preserve highlight and shadow image information that might otherwise be lost when the image frame is ultimately processed into a final image.

In particular, although the ISP pipe processing logic 80 generally processes image data using a signed 17-bit format, many electronic displays 28 generally can only display fewer bits of image data (e.g., 6-bit or 8-bit image data). Moreover, sensors 90 may be high dynamic range (HDR) image sensors 90 that may capture a higher bit depth than can be shown on the display 28 (e.g., 14 bits). In fact, shadows and specular highlights can easily take up 14-16 bits of precision to capture the full dynamic range of a high-dynamic-range scene. Thus, by the time image compression techniques are ultimately used to obtain a final image or video frame, a tone curve may effectively compress the dynamic range of the higher-dynamic-range image data into a lower dynamic range that can be displayed on the display 28. Simply applying the same local tone curve to all areas of the image data, however, may cause image information in one area or the other to be lost. As such, the LTM logic 3004 may apply different tone curves to different areas of the image frame to bring the various areas into the same dynamic range before being compressed and/or displayed on the display 28.

A brief simplified example of the operation of the LTM logic 3004 is shown in FIGS. 167-170. As seen in FIGS. 167 and 168, an image 3500 represents an image with a bright area 3502 and a dark area 3504. If a global tone curve applied to the image 3500 preserves image information in the dark area 3504, as shown in FIG. 167, specular highlights in the bright area 3502 may be lost, causing the bright area 3502 to look washed-out in some areas. On the other hand, if a global tone curve is applied to preserve the specular highlights of the bright area 3502, as shown in FIG. 168, image information in the dark area 3504 may be lost in the shadows.

Accordingly, as will be discussed in greater detail below, the LTM logic 3004 may apply different tone curves to different areas of the image 3500 to preserve both specular highlights in the bright area 3502 and image information in the dark area 3504. To provide a very simplified example, a local tone map 3506 of FIG. 169 provides two different tone curves to be applied in a first area 3508 and a second area 3510. Namely, in the first area 3508 of the local tone map 3506, a tone curve may be applied that brings the specular highlights of the bright area 3502 into a dynamic range that can be stored when the image is ultimately compressed at the end of the ISP pipe processing logic 80. The second area 3510 of the local tone map 3506 may apply a tone curve to bring image information from the dark area 3504 into the dynamic range that can be preserved during image compression or display at the end of the ISP pipe processing logic 80. FIG. 170 represents such a final version of the image 3500, in which both specular highlights of the bright area 3502 and image information of the dark area 3504 are preserved.

Results such as these generally may be accomplished by the LTM logic 3004. A block diagram of the LTM logic 3004 appears in FIG. 171. As seen in FIG. 171, the LTM logic 3004 may receive RGB image data as an input, here represented as Rin, Gin, and Bin. The input RGB image data may enter luminance computation logic 3520, which may calculate a pixel luminance (Ylin) 3522. The luminance computation logic 3520 may operate in substantially the same way as the luminance computation logic 950 of the local statistics logic 488. The luminance computation logic 950 is discussed in greater detail above with reference to FIGS. 84 and 85, so the luminance computation logic 3520 is not discussed further here.

The input pixel luminance (Ylin) 3522 may enter a logarithmic computation block 3524 to produce logarithmic luminance (Ylog) 3526. In certain embodiments, the log computation of the block 3524 may permit better tone reproduction of dark areas, since more bits will be allocated to the shadows by global log mapping. The logarithmic luminance (Ylog) 3526 may serve as an index to a spatially varying luminance lookup table (LUT) 3528. As will be discussed below, the spatially varying luminance LUT 3528 provides variable gain at different spatial locations throughout the image frame to preserve image information in bright and dark areas of the image frame. The local tone map 3506 of FIG. 169 may represent a very highly simplified example of the spatially varying luminance LUT 3528. A more detailed explanation of the spatially varying luminance LUT 3528 will be provided below with reference to FIGS. 172 and 173.

The luminance output by the spatially varying luminance LUT 3528 is denoted as Ylut 3530, which may be transformed out of the logarithmic format by an exponent block 3532, which may output a luminance Yexp 3534. Comparing the output luminance (Yexp) 3534 to the input pixel luminance (Ylin) 3522 in gain computation logic 3536 may produce a pixel gain 3538. An example of the gain computation logic 3536 appears in FIG. 174 and will be discussed further below.

With continued reference to FIG. 171, it may be noted that bright and dark areas of an image scene may be illuminated by different illuminants. As such, simply applying the gain 3538 to the input pixels Rin, Gin, and Bin could result in disadvantageous color reproduction. Accordingly, the input pixels Rin, Gin, and Bin first may be converted to color-corrected values through a spatially varying color correction matrix (CCM) 3540. The spatially varying CCM may obtain the CCM values to apply to input pixels via a spatially varying lookup table (LUT) 3541. The resulting color-corrected image data (Rccm, Gccm, and Bccm) 3542 may be multiplied (block 3544) with the gain 3538 to produce gained image data (Rgain, Ggain, and Bgain) 3546. Based on the input image data Rin, Gin, and Bin and the gained image data (Rgain, Ggain, and Bgain) 3546, pin-to-white logic 3548 may pin saturated R, G, and B pixel values to white, such that under-clamping may be prevented and saturated pixels appear white rather than gray. A resulting output image data (Rout, Gout, and Bout) 3550 may represent pixels that, when arranged in the image frame, have been transformed into a common dynamic range that preserves image information in both the specular highlights and dark areas of the image.

The local tone curves applied to the image data in the LTM logic 3004 may be represented by a two-dimensional grid of tone curve values in the spatially varying luminance LUT 3528. One example of such a 2D grid of tone curves appears in FIG. 172 as a tone curve grid 3560. The tone curve grid 3560 defines particular values at various grid points in the tone curve grid 3560. The tone curve grid 3560 may be defined in part by a grid stride 3562 that extends across a subset of the raw frame width 314 and raw frame height 316. Each grid point is separated by a horizontal (X) interval 3564 and a vertical (Y) interval 3566. A processing region called the local tone mapping (LTM) region may be defined within the active area 312 (FIG. 21). The LTM region may have an LTM active region with 3568 and an LTM active region height 3570. The LTM region of the active area 312 may reside completely inside or at local tone curve grid 3560 boundaries. Otherwise, the results obtained from the local tone curve grid 3560 may be undefined. The start of the LTM active region of the active region 312 may be set off from the raw frame by a horizontal (X) LTM region offset 3572 and a vertical (Y) LTM region offset 3574. From a base grid point 3576, the LTM active region of the active region 312 may be denoted by a horizontal (X) grid offset 3578 and a vertical (Y) grid offset 3580.

The data for the local tone curve grid 3560 may be stored in the memory 100. The input from the memory 100 into the local tone mapping (LTM) logic 3004 appears in the block diagram overview of the RGB processing logic 160 of FIG. 147. Returning to consider FIG. 172, each grid point of the local tone curve grid 3560 may have any suitable number of control points that are represented by a lookup table (LUT). In one example, each grid point may have 33 control points represented by 33 entries of 16-bit values. In this example, the 16-bit values of the LUT representing each grid point may be evenly distributed in the range of 0-65535. In other words, the input entries may be 0, 2047, 4095, and so forth, to 65535. The memory stride value and the address for the start location of the local tone curve grid 3560 may also be defined. For instance, the memory stride may be a 64-bit increment that represents the distance in bits between to vertically adjacent tone curve grid points of the tone curve grid 3560. The spatial interval between the local tone curve grid points may generally be larger than or equal to 64 pixels and the total number of local tone curve grid points of the local tone curve grid 3560 in the horizontal dimension may be less than or equal to 65 curves. When both the spatially varying LUT 3528 and the spatially varying CCM 3540 are used, the horizontal interval between grid points of the local turn curve grid 3560 may be larger than or equal to 128 pixels. Under the same conditions, the total number of horizontal grid points may be less than or equal to 33. In one example, the spatial interval between the local tone curve grid points may be smaller than or equal to 511 pixels.

Values from the tone curves associated with each grid point of the tone curve grid 3560 may be applied to pixels based on their spatial relation to nearby grid points. For example, as shown in FIG. 173, for pixels inside the LTM region of the active region 312, the spatially varying LUT 3528 may be applied by linear interpolation of the four nearest local tone curve grid points, followed by a spatial interpolation of these interpolated values. The following equations may illustrate this process. First, given the logarithmic luminance value (Ylog) 3526 input to the spatially varying luminance LUT logic 3528, at the current position to the spatially varying luminance LUT logic 3528, two brightness indexes may be computed using data associated with each tone curve grid point of the local tone curve grid 3560:

L_idxLow=Ylog>>11

L_idxHigh=L_idxLow+1;

Next, values may be obtained for local tone curves L0, L1, L2 and L3, which respectively correspond to top-left, top-right, bottom-left, and bottom-right grid points of the local tone curve grid 3560 surrounding the current pixel spatial position. These values may be looked up in the spatially varying LUT 3528 at L_idxLow and L_idxHigh. Namely, values for L0[L_idxLow], L1[L_idxLow], L2[L_idxLow], L3[L_idxLow], L0[L_idxHigh], L1[L_idxHigh], L2[L_idxHigh] and L3[L_idxHigh] may be obtained from the spatially varying LUT 3528. Interpolation values for the tone curves may be computed by linear interpolation as described below:

rem=Ylog & 0x7ff

L0_interp=(L0[L_idxLow]*(2^11−rem)+L0[L_idxHigh]*rem+2^10)>>11 =((L0[L_idxLow]<<11)+(L0[L_idxHigh]−L0[L_idxLow])*rem+2^10)>>11

L1—interp=((L1[L_idxLow]<<11)+(L1[L_idxHigh]−L1[L_idxLow]*rem+2^10)>>11

L2—interp=((L2[L_idxLow]<<11)+(L2[L_idxHigh]−L2[L_idxLow])*rem+2^10)>>11

L3—interp=((L3[L_idxLow]<<11)+(L3[L_idxHigh]−L3[L_idxLow])*rem+2^10)>>11

The output value of the spatially varying LUT 3528 then may be bilinearly interpolated from L0_interp, L1_interp, L2_interp and L3_interp as follows:

normII=(ii*recipIntX+(1<<15))>>16 normJJ=(jj*recipIntY+(1<<15))>>16 interpVL=((L0_interp<<16)+(L2_interp−L0_interp)*normJJ+(1<<15))>>16 interpVR=((L1_interp<<16)+(L3_interp−L1_interp)*normJJ+(1<<15))>>16

Yout=((interpVL<<16)+(interpVR−interpVL)*normII+(1<<15))>>16 where int_x and int_y are the horizontal and vertical size of the interval, respectively, recipIntX and receipIntY are reciprocals of int_x and int_y, respectively, and ii and jj are respectively the horizontal and vertical pixel offsets in relation to the position of the top left tone curve L0. In some embodiments, the values normII and normJJ may be unsigned 16-bit numbers with 14 fractional bits (2.14), and the values interpVL and interpVR may be unsigned 16-bit numbers. The output value Y_out may be an unsigned 16-bit number. Note that 0<=ii<int_x and 0<=jj<int_y. Since the values int_x and int_y are constant for the frame, reciprocal values may be programmed by software to avoid the divide. Note also that values normII and normJJ may be shared with other spatial interpolation functions using the same grid (e.g., as performed by lens shading correction (LSC) logic 1034, which is discussed in greater detail above).

As mentioned above, the output of the spatially varying luminance LUT 3528, Yout 3530, may enter the exponential computation logic 3532. The exponential computation logic 3532 may transform the output luminance (Yout) 3530 into the exponential luminance (Yexp) 3534 according to the following equation:

Yexp=CoeffExp_ScaleOut*exp (CoeffExp_ScaleIn*(Ysvl+CoeffExp_OffsetIn))+CoeffExp_OffsetOut Thus, an exponential function (base 2) may be applied to the output of the spatially varying luminance LUT 3528. Since the spatially varying luminance LUT 3528 may index its values to the logarithmic luminance (Ylog) 3526, the output signal (Yout) 3530 may be defined in a logarithmic space. Thus, the exponential computation logic 3532 may bring the luminance values back to the linear space. Offset coefficients, CoeffExp_OffsetIn and (Ysvl+CoeffExp_OffsetIn), may be represented as signed 32-bit numbers with 15 fractional bits (17.15). CoeffExp_OffsetOut may be represented as signed 32-bit number with no fractional bit. Scale coefficients, CoeffExp_ScaleOut, CoeffExp_ScaleIn may be represented as Mantissa and Exponent as described above with reference to the logarithmic computation logic 3524. Note that the input to the exponential computation logic 3532 may be represented as a signed 21-bit number with 15 fractional bits and is clipped between the minimum and maximum values represented by the 21-bit number. In some embodiments, the logarithmic computation logic 3524 and the exponential computation logic 3532 may be bypassed—for such embodiments, the spatially varying luminance LUT 3528 may be indexed linearly. The exponential luminance (Yexp) 3534 may have unsigned 16-bit (u16) representation and may be clipped to a minimum of zero and maximum of 65535.

The gain computation logic 3536 may calculate the gain 3538 based at least in part on the exponential luminance (Yexp) 3534 and the input luminance (Ylin) 3522. FIG. 174 represents one example of a block diagram of the gain computation logic 3536. For example, the exponential luminance (Yexp) 3534 and the input pixel luminance (Ylin) 3522 may be processed by initial gain computation logic 3600 to obtain an initial gain referred to as Gain0 signal 3602. The initial gain computation logic 3600 may calculate the Gain0 signal 3602 as follows:

Gain0(x,y)=Yexp(x,y)/max(Ylin(x,y), minY);

where minY represents the minimum value of luminance (Y) in the denominator to maintain numerical stability. Gain0 represents the Gain0 signal 3602 gain term computed from the luminance pipe (Ylin→Ylog→Yout→Yexp) that may be applied to the R, G and B values. It is represented as unsigned 16-bit number with 12 fractional bits. The variables x and y refer to the horizontal and vertical spatial position of the pixel being processed through the local tone mapping (LTM) logic 3004.

Selection logic 3604 and 3606 may, depending on a selection signal HorzFiltEnable signal 3608, may determine whether the Gain0 signal 3602 is horizontally filtered in horizontal filtering logic 3610, or whether the horizontal filtering logic 3610 is bypassed. When the Gain0 signal 3602 under goes horizontal filtering in the horizontal filtering logic 3610, the effect will be to smooth the gain map over the image frame so as to enhance the high frequency components of the image content. The horizontal filtering logic 3610 may include two filter components: a bilateral filter 3612, which may output an interim Gain1 signal 3614, and linear filtering logic 3616, which may apply a linear filter to the Gain1 signal 3614. The ultimate output, either the Gain0 signal 3602 or the output of the horizontal filtering logic 3610, may enter clipping logic 3618 and output as the gain signal 3538.

In one example, the bilateral filtering logic 3612 of the horizontal filtering logic 3610 may include a 9Hx1V pixel bilateral filter in which a photometric similarity function employed by the bilateral filtering logic 3612 is a box function. Applying such a horizontal filter may reduce the need for line buffers, since only the nearby pixels of the same horizontal line may be considered. One example of a box function 3630 appears in FIG. 175. As seen in FIG. 175, the box function 3630 may output a value of 1 when a difference between two pixel luminances exceeds a bilateral threshold (BilatThres), and 0 otherwise.

When the bilateral filtering logic 3612 applies the bilateral filter to the current pixel in a 9Hx1V kernel of pixels, the luminance difference between the current pixel and each of the four previous pixels and each of the four subsequent pixels may be compared. For example, as shown in FIG. 176, a horizontal row of 9 pixels 3640 may include the pixel of interest $P_0$, in which subsequent pixels $P_1$, $P_2$, $P_3$, and $P_4$ previous the pixel of interest $P_0$, and in which subsequent pixels $P_{-1}$, $P_{-2}$, $P_{-3}$, and $P_{-4}$ follow the pixel of interest $P_0$. Essentially, the bilateral filtering logic 3612 may smooth the gain applied to the pixel of interest $P_0$ depending on the differences in luminance between the pixel of interest $P_0$ and the other surrounding pixels—namely, depending on whether the bilateral filtering logic 3612 detects an edge. When the pixel of interest $P_0$ is within the bilateral threshold (BilatThres) value of enough of the pixels $P_1$-$P_4$ or $P_{-1}$-$P_{-4}$, the Gain1 signal 3614 output by the bilateral filter 3612 may be unchanged from the Gain0 signal 3602. On the other hand, if the bilateral filter 3612 identifies that the luminance of the pixel of interest $P_0$ is sufficiently different (e.g., beyond the bilateral threshold value BilatThres) from enough of the pixels $P_1$-$P_4$ or $P_{-1}$-$P_{-4}$, such a difference may indicate that the pixel of interest $P_0$ is approaching an edge boundary, and the gain values may be adjusted so as to avoid certain artifacts associated with certain local tone mapping techniques (e.g., the "halo" effect).

One example of pseudo code to carry out the bilateral filtering 3612 appears below:

```
Box(a) = 1 (if −BilatThres <= a <= BilatThres)
        0 (otherwise)
Tap(x,y,k) = BilatFiltCoeff[k+4]*Box(Ylog(x+k,y) − Ylog(x,y));
TapSum(x,y) = Tap(x,y,−4)+Tap(x,y,−3)+Tap(x,y,−2)+ Tap(x,y,−1)+
Tap(x,y,0)+ Tap(x,y,1)+ Tap(x,y,2)+ Tap(x,y,3) + Tap(x,y,4);
If TapSum(x,y) >= minTapSum
     Gain1(x,y) = ( Tap(x,y,4)*Gain0(x+4,y) + Tap(x,y,3) *Gain0(x+3,y)
```

-continued

```
    + Tap(x,y,2) *Gain0(x+2,y) +
    Tap(x,y,1) *Gain0(x+1,y) + Tap(x,y,0) *Gain0(x,y) + Tap(x,y,−
    1)*Gain0(x−1,y) + Tap(x,y,−2) *Gain0(x−2,y) + Tap(x,y,−3)
    *Gain0(x−3,y) + Tap(x,y,−4) *Gain0(x−4,y) ) / TapSum(x,y);
else
    Gain1(x,y) = Gain0(x,y);
```

where BilatThres is the threshold used for the photosimilarity function in the bilateral filter and BilatFilt[9] are bilateral filter coefficients. The coefficients may be, for example, signed 16-bit numbers with 12 fractional bits. Tap(x,y,k) refers to the taps of the bilateral filter, TapSum (x,y) refers to the sum of the taps of the bilateral filter, and the value minTapSum represents the minimum tap sum for bilateral filtering, which may be programmable by the software controlling the ISP pipe processing logic 80. The variable Gain1 may be, for example, a signed 17-bit number with 12 fractional bits. The Gain1 signal 3614 may be linearly filtered in the linear filtering logic 3616 in any suitable manner. In one example, the linear filtering logic 3616 may filter the Gain1 signal 3614 as follows:

Gain2(x,y)=LinFiltCoeff[0]*Gain1(x,y)+LinFiltCoeff[1] *(Gain1(x−1,y)+Gain1(x+1,y))+LinFiltCoeff[2] (Gain1(x−2,y)+Gain1(x+2,y));

where LinFilter[3] represents the linear coefficients, which may be, for example, signed 16-bit numbers with 12 fractional bits. The variable Gain2 may represent the output of the horizontal filtering logic 3610 and may be, for example, a signed 17-bit number with 12 fractional bits. When the horizontal filtering logic 3610 is disabled by setting the HorzFiltEnable 3608 signal to zero, the Gain0 signal 3602 may be used instead:

```
if HorzFileEnable == 0
    Gain(x,y) = max( minGain, max(maxGain, Gain0(x,y) ) );
else
    Gain(x,y) = max( minGain, max(maxGain, Gain2(x,y) ) );
```

Referring again to FIG. 171, the gain signal 3538 output by the gain computation logic 3536 (e.g., the Gain1 signal 3656 or the output of the horizontal filtering logic 3610) may be multiplied (block 3544) with color-corrected pixel components Room, Gccm, and Bccm 3542 output by the spatial varying CCM 3540. The color-corrected pixel components Rccm, Gccm, and Bccm 3542 output by the spatial varying CCM 3540 may correct colors affected by different illuminants in the highlights and shadows. The spatially varying CCM 3540 may apply a color correction matrix value to the pixel that may vary depending on the location of the pixel in the image frame. Thus, the CCM 3540 may obtain the CCM values from the spatially varying matrix LUT 3541, which may represent a 2-dimensional grid of color correction matrixes that may be programmed by software (in some embodiments based, for example, on the local image statistics). Such a 2D grid may be arranged in substantially the same way as the local tone map grid 3560 of FIG. 172. Likewise, values from the grid may be spatially interpolated based on the spatial location of the pixel currently being processed through the local tone mapping (LTM) logic 3004 in the manner discussed above with reference to FIG. 173.

For each point in the grid of the spatially varying matrix LUT 3541, there may be three color-correction matrixes, where each matrix corresponds to dark, medium, or bright luminance levels. Having these intensity-varying color correction matrixes may allow the transformation of color as a function of luminance. For instance, shadow areas may have a different illuminant than bright areas. The shadows may be bluer owing to light from the blue sky, while highlights may be more yellow owing to direct illumination from the sun. The color transform of the spatially varying CCM 3540 can be designed to handle such mixed-illuminant cases so that, for example, the blue color component is attenuated more in the shadows.

Data for the color correction matrices of the spatially varying matrix LUT 3541 may be stored in external memory 100. Since there are three matrices for each grid point, each may have some number of entries (e.g., 27 entries) of 2s-complement numbers (e.g., 16-bits with 12 fractional bits (4.12)). Intensity-based interpolation may be employed, based on the three color-correction matrices located at each grid point, which may correspond to intensities of zero, a MidLuminance value, and 65536. The MidLuminance value may be programmable in some embodiments, while in others the MidLuminance value may be fixed. Reciprocals of the MidLuminance value (RecipMidDark) and 65536—MidLuminance (RecipMidBright) may be programmed by software to enable linear interpolation. The intensity used for intensity-based interpolation may be chosen from Ylin_avg, Ylin_max, Ylin, Ylog, minRGB, Rin, Gin and/or Bin by setting a selection signal. When intensity is negative, the dark CCM may be used without any intensity-based interpolation. Interpolating the coefficients based on intensity may be performed as shown by the following pseudo-code. Note that the elements of the color correction matrix may be interpolated independently. In the following pseudo code, the variables CoeffDark, CocffMid and Coefifright are CCM coefficients for dark, mid and bright tones, respectively.

```
if (luma >= MidLuminance) {
    L = CoeffMid;
    H = CoeffBright;
    portion = luma − MidLuminance;
    recip = RecipMidBright;
} else {
    L = CoeffDark;
    H = CoeffMid;
    portion = luma;
    recip = RecipMidDark;
}
normalizedLuma = (portion * recip + 2^15)>>16;
CoeffInterpolated = ( L<<16 + (H−L)*normalizedLuma + 2^15) >> 16;
```

In the pseudo code above, the value normalizedLuma may represent a 16×32 multiplier that can be shared amount 1D interpolation functions with other logical blocks of the ISP pipe processing logic 80. The value CoeffInterpolated may represent the interpolated color-correction matrix value for a given grid point, and may be a 17×16 multiplier. The spatial interpolation of the coefficients may be performed in substantially similar way to that discussed above with reference to FIGS. 172 and 173. That is, for each pixel color component (R, G, and B), the four values of CoeffInterpolated for the four grid points surrounding the spatial location of the pixel currently being processed by the local tone mapping logic 3004 may be determined. From these values, spatially interpolated values associated with the spatial location of the current pixel may be determined.

Alternatively, interpolation may occur only along the luminance intensities, and spatial interpolation may be skipped. In this case, spatially varying color-color correction matrices (CCMs) may not be loaded, but global CCMs may be used instead. The coefficients for the three global CCMs (GlobalCCM_dark, GlobalCCM_mid and GlobalCCM_bright) may be provided by the software. Thus, for such an embodiment, interpolation between the CCM coefficients may only be performed based on the luminance values for the pixel and no spatial interpolation of CCM coefficients may be performed.

Additionally or alternatively, CCMs may be applied based on a general hue of the area around the pixel. For instance, a CCM may be applied to a pixel generally located in a blue sky area. In another example, the spatially varying CCMs may be applied in conjunction with other known information about the image frame. For instance, in an area identified by face detection logic (e.g., in software or a back-end logic not necessarily of the ISP pipe processing logic 80) as having a face, the CCMs defined for this area may be more appropriate for skin tones. Thus, skin tones may be boosted in one area, while other colors may be boosted in other areas. This may be particularly valuable when people are present in an image scene, since boosting other colors (e.g., red) may be unflattering on skin.

The Rin, Gin, and Bin data may be transformed based on the interpolated color correction matrix (CCM) coefficients. The interpolated CCM coefficients may be applied to Rin, Gin and Bin values and may be clipped between a minimum RGB value (minRGBccm) and a maximum RGB value (maxRGBccm) as shown in the pseudo code below:

Rcm=max(minRGBccm[0], min(maxRGBccm[0], CCMCoeff[0]*Rin+CCMCoeff[1]*Gin+CCMCoeff[2]*Bin));

Gccm=max(minRGBccm[1], min(maxRGBccm[1], CCMCoeff[3]*Rin+CCMCoeff[4] Gin+CCMCoeff[5]*Bin));

Bccm=max(minRGBccm[2], min(maxRGBccm[2], CCMCoeff[6]*Rin+CCMCoeff[7]*Gin+CCMCoeff[8]*Bin));

where the variables CCMCoeff[0-8] refer to the color-correction coefficients from the spatially varying CCM 3540. The gain signal 3538 may be multiplied (block 3544) to the Rccm, Gccm, and Bccm signal 3542 as shown below:

Rgain(x,y)=max(minRGBgain[0], min(maxRGBgain[0], Rccm(x,y)*Gain(x,y)));

Ggain(x,y)=max(minRGBgain[1], min(maxRGBgain[1], Gccm(x,y)*Gain(x,y)));

Bgain(x,y)=max(minRGBgain[2], min(maxRGBgain[2], Bccm(x,y)*Gain(x,y)));

The gained pixel Rgain, Ggain, and Bgain signals 3546 may have a signed format (e.g., signed 17-bit) and may be pinned to white in the pin-to-white logic 3548. The pin-to-white logic 3548 may out the result as Rout, Gout, and Bout signals 3550. One example of a block diagram of the pin-to-white logic 3548 appears in FIG. 177. The pin-to-white logic 3548 may be employed to ensure that the highest pixel values resulting from saturated pixels remain pinned to the output levels. Namely, as will be discussed below, the pin-to-white logic 3548 may do so by blending the R, G, and B values of the Rgain, Ggain, and Bgain signal 3546 with a target value based on the Rin, Gin, and Bin signals, where the blending weight vary as a function of the input luminance values. Minimum calculation logic 3650 may generate a minimum value 3652 and maximum calculation logic 3654 may determine a maximum value signal (maxRGB) 3656. Using selection logic 3658, either the minimum (minRGB) signal 3652 or the maximum (maxRGB) 3656 may be selected to interpolate the blending weights for pinning to white.

It may be appreciated that the effect of pinning to white may only be performed for relatively bright pixel values. Specifically, the pin-to-white logic 3548 may prevent the occurrence of improper colors when a gain applied to a bright pixel in which one or more of the pixel channels is saturated. Under such conditions, pixels located near the optical center of the image frame—which were therefore not significantly gained in the LSC logic 1034—may become saturated at a lower level than those located farther from the central area of the image frame. Thus, at saturation, these pixels may appear to be gray rather than white. The pin-to-white logic 3548 may gain these saturated pixels so that they appear white instead of gray.

Compensation gain logic 3660 may receive either the minimum (minRGB) signal 3652 or the maximum (maxRGB) signal 3656, with which to use to interpolate weights for blending the white target value to pin the gained values 3546 to white. Specifically, the compensation gain logic 3660 may obtain a compensation gain value from a 2D compensation gain table 3662. In the example of FIG. 177, the compensation gain table 3662 is a 9×9 table, but other embodiments may employ a 2D table of any suitable size. Since the center of the image frame may have low lens-shading gains, the saturation levels of pixels in the center of the image may be lower than those spatially located in the corner of the image frame, and thus the compensation gain table 3662 may account for this differences in saturation in different spatial locations of the image frame. Namely, to determine how close the pixel value is to clipping, the input to the compensation gain logic 3660 may be adjusted depending on the spatial location of the pixel. The adjustment may be performed by a bilinear interpolation of the 9×9 compensation gain table 3662. The adjustment may be performed in substantially the same way as discussed above with reference to FIG. 173.

The compensation gains appearing in the compensation gain table 3662 may be derived from the lens-shading table, but the accuracy requirement for the gain compensation table 3662 may not be as critical as that used in the highlight recovery (HR) logic 1038. As such, the compensation gain table 3662 may employ a relatively smaller table of gains (e.g., a 9×9 table of gains) than other 2D tables used by the logic. The compensation gain table 3662 may have unsigned values (e.g., 16-bit unsigned values). In addition, the spatial location of the first sample of the compensation gain table 3662 may be the top left corner of the active region 312 (FIG. 21). The number of fractional bits of the compensation gain table 3662 may be programmable by the software controlling the ISP pipe processing logic 80.

Since the compensation gain table 3662 may be a relatively small table (e.g., a 9×9 table), in one example, intervals between the grid point values may be smaller than or equal to 2047 pixels. For individual pixels, a compensation gain value 3664 may be bilinearly interpolated, as in the example of FIG. 173 discussed above. Moreover, pixels located outside the grid defined by the compensation gain table 3662 may be undefined, so the intervals between the grid points of the compensation gain table 3662 may be chosen such that the grid covers the active region 312. The compensation gain logic 3660 may, in some embodiments, avoid the use of the compensation gain table 3662. When the compensation gain table 3662 is disabled, the compensation gain logic 3660 may apply a compensation gain signal 3664 of 0x1000.

In white pin adjustment logic 3666, the compensation gain signal 3664 may be used to compute an adjusted white pin luma value (shown as adjustedWhitePinLuma in the pseudo code discussed below). The adjusted white pin luma value may be used to obtain a weight for blending white into the Rgain, Ggain, and Bgain signal 3546 when the pixel might otherwise appear gray. The white pin adjustment logic 3666 may obtain a white pin blending value using a white pin lookup table (LUT) 3668 based on the adjusted white pin luma value. The white pin LUT 3668 may include, for example, 129 entries of unsigned 16-bit values with 15 fractional bits (e.g., 1.15), which may represent the weight used to determine whether to blend a target white value into the Rgain, Ggain, and Bgain signal 3546. The entries of the white pin LUT 3668 may be evenly distributed in the range of 2ˆ15 to 2ˆ16. When the input value of adjusted white pin luma signal falls between intervals in the white pin LUT 3668, the output values may be linearly interpolated. The range of the white pin LUT 3668 may be between 0 and 1, and any value larger than 1 may be considered to be a value of 1. The white pin adjustment logic 3666 thus may carry out the following logical operations:

```
adjustedWhitePinLuma = (minMaxRGB_WhitePin * compGain +
1<<(compGainFraction−1))
    >>compGainFraction;
if (adjustedWhitePinLum < 2ˆ15) {
    Rout = Rgain;
    Gout = Ggain;
    Bout = Bgain;
} else {
    BlendWeightWhite = interp1 (adjustedWhitePinLuma,
    LUT_WhitePin);
    Rout = (targetValueWhite[0] << 15 + (Rgain − targetValueWhite[0])
        * BlendWeightWhite + 2ˆ14 ) >> 15
    Gout = (targetValueWhite[1] << 15 + (Ggain − targetValueWhite[1])
        * BlendWeightWhite + 2ˆ14 ) >> 15
    Bout = (targetValueWhite[2] << 15 + (Bgain − targetValueWhite[2])
        * BlendWeightWhite + 2ˆ14) >> 15
};
```

where interp1 performs linear interpolation of weights the white pin LUT 3668 (e.g., LUT_WhitePin), which represent the weights used for determining whether to blend the target white value or not. A blending value from the white pin LUT 3668 of 1 may be considered equivalent to keeping the original values and bypassing the blending. When the white pin LUT 3668 is disabled, the BlendWeightWhite for blending white into the output pixel signal Rout, Gout, and Bout 3550 may be set to 0x8000. In conclusion, by processing the RGB image data through the local tone mapping (LTM) logic 3004, the image data may be gained up or down to preserve specular highlight information as well as image information contained in dark areas of the image scene. Moreover, local variations in color due to different illuminants in different areas of the scene may also ensure proper color reproduction. Even when applying certain gains could cause the pixel to appear gray when the pixel should appear white (e.g., for particularly bright areas of the image frame nearer to the optical center of the image frame), the pin-to-white logic may ensure that the output pixel is pinned to white to avoid such color distortions.

First Gain, Offset, Clip (GOC1) Logic

The output of the local tone mapping logic 3004 may enter the first gain, offset, and clip (GOC1) logic 3006. The GOC1 logic 3006 may provide similar functions and may be implemented in a similar manner with respect to the BLC logic 472 of the statistics logic 140 of the ISP pipe processing logic 80, as discussed above. For instance, the GOC1 logic 3006 may provide digital gain, offsets and clamping (clipping) independently for each color component-here, since the input image data is in the RGB format—R, G, and B of the input image data. Particularly, the GOC1 logic 3006 may perform auto-white balance.

In operation, the input value for the current pixel is first offset by a signed value and multiplied by a gain, and offset by a second signed value, before being clipped to a minimum/maximum range:

Y=((X+off_in[c])*G[c])+off_out[c]

where Y represents the calculated value, X represents the input pixel value for a given color component R, G, and B, off_in[c] and off_out[c] represent signed 16-bit input and output offsets for the current color component c, and G[c] represents a gain value for the color component c. The values for G[c] may be previously determined during statistics processing. In one embodiment, the gain G[c] may be a 16-bit unsigned number with 2 integer bits and 14 fraction bits (e.g., 2.14 floating point representation), and the gain G[c] may be applied with rounding. By way of example, the gain G[c] may have a range of between 0 to 4×, and may be applied with rounding. The computed pixel value Y (which includes the gain G[c] and offset O[c]) is then be clipped to a minimum and a maximum range:

Y=(Y<min[c])? min[c]: (Y>max[c])? max[c]: Y

The variables min[c] and max[c] may represent signed 16-bit "clipping values" for the minimum and maximum output values, respectively, for each color component c. In one embodiment, the GOC1 logic 3006 may also be configured to maintain a count of the number of pixels that were clipped above and below maximum and minimum ranges, respectively, for each color component.

Color Correction Matrix (CCM) Logic

The output of the GOC1 logic 3006 is then forwarded to the color correction logic 3008. The color correction logic 3008 may be configured to apply color correction to the RGB image data using a color correction matrix (CCM). In one embodiment, the CCM may be a 3×3 RGB transform matrix, although matrices of other dimensions may also be used in other embodiments (e.g., 4×3, etc.). Accordingly, the process of performing color correction on an input pixel having R, G, and B components may be expressed as follows:

R'=CCM_00*(R+off_in[0])+CCM_01*(G+off_in[1])+CCM_02*(B+off_in[2])+off_out[0]

G'=CCM_10*(R+off_in[0])+CCM_11*(G+off_in[1])+CCM_12*(B+off_in[2])+off_out[1]

B'=CCM_20*(R+off_in[0])+CCM_21*(G+off_in[1])+CCM_22*(B+off_in[2])+off_out[2]

The coefficients (CCM_[0:2 0:2]) are 16-bit 2s-complement numbers with 12 fraction bits (4.12). The maximum absolute gain is then 8×.

After the calculation, an offset is added and the result is rounded to the nearest integer value, and clipped to a programmable min and max.

R"=(R'<min[0])? min[0]: (R'>max[0])? max [0]: R'

G"=(G'<min[1])? min[1]: (G'>max[1])? max [1]: G'

B"=(B'<min[2])? min[2]: (B'>max[2])? max [2]: B'

The coefficients (CCM00-CCM22) of the CCM may be determined during statistics processing in the statistics logic 140*a* or 140*b*, as discussed above. In one embodiment, the coefficients for a given color channel may be selected such that the sum of those coefficients (e.g., CCM00, CCM01, and CCM02 for red color correction) is equal to 1, which may help to maintain the brightness and color balance. Further, the coefficients are typically selected such that a positive gain is applied to the color being corrected. For instance, with red color correction, the coefficient CCM00 may be greater than 1, while one or both of the coefficients CCM01 and CCM02 may be less than 1. Setting the coefficients in this manner may enhance the red (R) component in the resulting corrected R' value while subtracting some of the blue (B) and green (G) component. As may be appreciated, this may address issues with color overlap that may occur during acquisition of the original Bayer image, as a portion of filtered light for a particular colored pixel may "bleed" into a neighboring pixel of a different color. In one embodiment, the coefficients of the CCM may be provided as 16-bit two's-complement numbers with 4 integer bits and 12 fraction bits (expressed in floating point as 4.12). Additionally, the color correction logic 3008 may provide for clipping of the computed corrected color values if the values exceed a maximum value or are below a minimum value.

Three-Dimensional Color Lookup Table (3D CLUT)

Numerous image sensors from a variety of manufacturers exist on the market today. Each of these sensors may provide different color representation, and thus, provide differing resultant images. Further, the popularity of certain consumer electronic devices such as the iPhone® and the iPad® have surged resulting in a drastic increase in demand for these devices. As the demand for consumer electronic devices increase, imaging component suppliers may not be able to meet the demand for specific imaging components (e.g., an image sensor). Thus, the consumer electronic device manufacturers may rely on more than one imaging component suppliers to provide these components of the electronic devices. For example, these consumer electronic devices may rely upon a variety of sensor manufacturers to supply alternative camera sensors to meet the demand of the consumer electronic devices. However, as may be appreciated, the incorporation of varied components (e.g., components from a variety of manufacturers) may lead to varied camera results among the electronic devices. Further, these varied results may be seen by the variety of image sensors that may be attached external to the electronic device. Such varied results may be undesirable to an end-user experience. To counteract the variations that may be caused by using alternative components, the ISP pipe logic 80 may include a 3D color lookup table (3D CLUT) to adjust the colors of the pixels such that each of the electronic devices provide uniform results regardless of whether alternative components were incorporated into the electronic device. For example, the 3D CLUT may map two sensors with very different spectral responses to a uniform color pallet, thus resulting in uniform coloring despite the differing sensor manufacturers.

Indeed, even images from sensors of third-party cameras may be color-corrected using the 3D CLUT 3010. Software may program the 3D CLUT 3010 differently for image data of different sensors. For example, the 3D CLUT 3010 may be programmed to be a first 3D color lookup table for image data deriving from one sensor (e.g., one of the sensors of the electronic device 10), and to be a second 3D color lookup table for image data deriving from another sensor (e.g., a third-party camera). The precise values to be programmed into the 3D CLUT may be determined experimentally or through simulation by comparing data from the sensor(s) to a reference image.

Referring back to FIG. 147, the depicted embodiment illustrates the 3-D CLUT 3010 processing occurring prior to the RGB gamma logic 3014. By providing the 3-D CLUT 3010 processing prior to the RGB gamma logic 3014, better compensation may be had for multiple imaging sensors. However, in alternative embodiments, it may be beneficial for the RGB gamma logic 3014 to occur prior to the 3-D CLUT 3010 processing. For example, as will be described in more detail below, the RGB gamma logic 3014 may provide additional dark color samples, and thus may provide more detail in low-light or dark settings. Thus, in some embodiments, by providing the RGB gamma logic 3014 prior to the 3-D CLUT 3010 processing, enhancements to dark images may result. In other embodiments, the 3-D CLUT 3010 and the RGB gamma logic 3014 may be combined.

Having now discussed the placement of the 3-D CLUT logic 3010, FIG. 181 is a block diagram illustrating the 3D CLUT logic 3010. As illustrated in FIG. 181, an input 3680 is supplied to the 3D CLUT logic 3010. As illustrated, an offset 3684 may be applied to the input pixel values, such as by addition logic 3682. Next, when the offset pixel values are negative, the pixel values may be mirrored around zero or clipped to zero. For example, in some embodiments a clipping function 3685 may clip negative offset pixel values to zero. Further, in some embodiments, the absolute value of the offset pixel value may be determined, such as by an absolute value function 3686. As illustrated at numeral 3700, the 3D CLUT logic 3010 may retain the sign of the offset pixel value for later use. Thus, one implementation may be as follows:

```
If (ClipNegEn==1) {        //Clip to zero for negative values
    R' = max(0, R+OffsetIn_R);
    G' = max(0,G+OffsetIn_G);
    B' = max(0, B+OffsetIn_B);
    sgnR' = 0;
    sgnG' = 0;
    sgnB' = 0;
} else {                   //Mirror arund zero for negative values
    R' = abs(R+OffsetIn_R)
    G' = abs(G+OffsetIn_G)
    B' = abs(B+OffsetIn_B)
    sgnR' = R' < 0
    sgnG' = G' < 0
    sgnB' = B' < 0
}
```

In some embodiments, a gamma curve 3690 may be applied to the R', G', and B' pixel values. The proper output is provided from the absolute value function 3686 and/or the clipping function 3685 via the demultiplexer 3686 to a 1D lookup table (LUT) 3692 for a particular color component (e.g., red, green, or blue). The gamma curve 3690 may increase the precision of certain intensity levels (e.g., dark regions) by effectively adding more samples for the dark intensities. The gamma curve 1D LUTs 3692 may include a separate 1D lookup table for each color component (e.g., red, green, and blue). Each LUT 3692 may include, for example, 65 entries of 16-bit values representing the output levels. When the input values provided to the 1D LUT 3692 falls between intervals, the output values may be linearly interpolated. In one embodiment, the following implementation may be used:

R"=interp1(R', preGammaLUT_R)

G"=interp1(G', preGammaLUT_G)

B"=interp1(B', preGammaLUT_B)

where interp1 is a function that performs 1D linear interpolation. The table look-up is performed using the R', G', and B' values as indices for each of the 1D LUTs. Next, the output of the pixel values with applied gamma curve (e.g., R", G", and B") are sent to 3-D color transform logic 3696. The 3-D color transform logic 3696 may provide the pixel values with applied gamma curve to a 3D CLUT 3698 containing a 3D array of RGB triplet output values. The index into the 3D CLUT 3698 may be determined from the provided R", G", and B" triplet describe above. Each of the input indices into the 3D array are equally spaced in the input 16-bit range. The final output value from the 3D CLUT 3698 may be determined by performing tetrahedral interpolation to the closest table entries in the 3D CLUT 3698. For example, in one embodiment the following implementation may be used:

Rout=(−1)^sgnR'*interp3(R", G", B", coeff_R)+OffsetOutR

Gout=(−1)^sgnG'*interp3(R", G", B", coeff_G)+OffsetOutG

Bout=(−1)^sgnB'*interp3(R", G", B", coeff_B)+OffsetOutB where interp3 denotes a 3D interpolation function. Tetrahedral interpolation is used instead of tri-linear interpolation to generate smoother transitions at the input points of the grid.

To complete the tetrahedral interpolation, a hexahedron (cube) of 3D color LUT 3698 space may be divided into six tetrahedra, and the closest four points may be used to perform the interpolation. FIG. 182 illustrates this interpolation, in which a color point P is defined by vectors u, v, and w within a hexahedron representing the 3D color LUT 3698. The hexahedron representing the 3D color LUT 3698 may have outer points L, Lu, Lw, Luw, Lv, Luv, Lvw, and H. Each tetrahedron that subdivides the 3D color LUT 3698 may extend between point L and point H. The following equations may describe tetrahedral interpolation as shown in FIG. 182:

Tuvw u>v>w

L+(Lu−L) u+(Luv−Lu) v+(H−Luv) w(1−u) L+(u−v) Lu+(v−w) Luv+(w) H

Tuwv u>w>v

L+(Lu−L) u+(Luw−Lu) w+(H−Luw) v(1−u) L+(u−w) Lu+(w−v) Luw+(v) H

Twuv w>u>v

L+(Lw−L) w+(Luw−Lw) u+(H−Luw) v(1−w) L+(w−u) Lw+(v−u) Luw+(v) H

Tvuw v>u>w

L+(Lv−L) v+(Luv−Lv) u+(H−Luv) w(1−v) L+(v−u) Lv+(u−w) Luv+(w) H

Tvwu v>w>u

L+(Lv−L) v+(Lvw−Lv) w+(H−Lvw) u(1−v) L+(v−w) Lv+(w−u) Lvw+(u) H

Twvu w>v>u

L+(Lw−L) w+(Lvw−Lw) v+(H−Lvw) u(1−w) L+(w−v) Lw+(v−u) Lvw+(u)*H*

The results of the tetrahedral interpolation may be a 48-bit pixel value triplet. The sign stripped by the absolute value function 3686 may be re-applied to triplet results (e.g., by sign application logic 3702) and an output offset 3704 may be applied to the signed triplet values (e.g., by addition logic 3706). The triplet values may represent pixel color values that have been modified to provide consistent color regardless of the components used to capture the image data. Thus, these triplet values may be provided as an output to the ISP pipe logic 80 to provide consistent coloring across consumer electronic devices regardless of variances between the components used in the electronic devices.

Gain, Offset, Clip (GOC) Logic [2]

The output of the RGB color correction logic 3008 is then passed to the second GOC (GOC2) logic 3012. The GOC2 logic 3012 may be implemented in an identical manner as the GOC1 logic 3006 and, thus, a detailed description of the gain, offset, and clamping functions provided will not be repeated here. In one embodiment, the application of the GOC2 logic 3012 subsequent to color correction may provide for auto-white balance of the image data based on the corrected color values, and may also adjust sensor variations of the red-to-green and blue-to-green ratios.

Gamma (GAM) Logic

Next, the output of the GOC2 logic 3012 is sent to the RGB gamma adjustment logic 3014 for further processing. For instance, the RGB gamma adjustment logic 3014 may provide for gamma correction, tone mapping, histogram matching, and so forth. In accordance with disclosed embodiments, the gamma adjustment logic 3014 may provide for a mapping of the input RGB values to corresponding output RGB values. For instance, the gamma adjustment logic may provide for a set of three lookup tables, one table for each of the R, G, and B components. By way of example, each lookup table may be configured to store 257 entries of 16-bit values, each value representing an output level. The table entries may be evenly distributed in the range of the input pixel values, such that when the input value falls between two entries, the output value may be linearly interpolated. In one embodiment, each of the three lookup tables for R, G, and B may be duplicated, such that the lookup tables are "double buffered" in memory, thus allowing for one table to be used during processing, while its duplicate is being updated.

RGB Histogram Generation Logic

The output of the RGB gamma adjustment logic 3014 or the output of the GOC2 logic 3012 may enter the RGB histogram generation logic 3018. As mentioned above, Histograms are used to analyze the pixel level distribution in the picture. This is useful for implementing certain functions such as histogram equalization, where the histogram data is used to determine the histogram specification (histogram matching). Histograms are 256 bins for each color component. Since pixel data can be up to 17-bit signed, a scale factor and an offset can be specified to determine what range of the pixel data is collected. The bin number is obtained as follows:

idx=(hist_scale*(pixel+hist_offset))>>16

Where hist_scale is a 17-bit unsigned number, hist_offset is signed 17-bit value. hist_scale values allowed are in the range 0 to 2^16 to represent a floating point scale between 0 and 1.0. The color histogram bins are incremented only if the bin indices are in the range [0, 255]:

```
if (idx>=0&& idx<256)
StatsHist[idx]+=Count;
```

The histogram may be a three color component histogram. The three color components may be selected to be before or after the RGB gamma logic 3014. Since memory access to the histogram data is read-modify-write, only every other pixel may be added to the histogram, starting with the first pixel of the active region. The histogram bins may be any suitable number of bits (e.g., 23 bits in one embodiment). In one example, the histogram bins may allow for a maximum picture size of 4096 by 3120 (12 MP). In this example, the internal memory size may be 3×256×23 bits.

Color Space Conversion (CSC) Logic

The output of the gamma adjustment logic 3014 may also be sent to the memory 100 and/or to the color space conversion (CSC) logic 3020. The color space conversion (CSC) logic 3020 may be configured to convert the RGB output from the gamma adjustment logic 3014 to the YCbCr format, in which Y represents a luma component, Cb represents a blue-difference chroma component, and Cr represents a red-difference chroma component, each of which may be in a 10-bit format as a result of bit-depth conversion of the RGB data from 14-bits to 10-bits during the gamma adjustment operation. As discussed above, in one embodiment, the RGB output of the gamma adjustment logic 3014 may be down-sampled to 10-bits and thus converted to 10-bit YCbCr values by the CSC logic 3020, which may then be forwarded to the YCbCr processing logic 904, which will be discussed further below.

The conversion from the RGB domain to the YCbCr color space may be performed using a color space conversion matrix (CSCM). For instance, in one embodiment, the CSCM may be a 3×3 transform matrix. The coefficients of the CSCM may be set in accordance with a known conversion equation, such as the BT.601 and BT.709 standards. Additionally, the CSCM coefficients may be flexible based on the desired range of input and outputs. Thus, in some embodiments, the CSCM coefficients may be determined and programmed based on data collected during statistics processing in the ISP pipe processing logic 80.

The process of performing YCbCr color space conversion on an RGB input pixel may be generally expressed as follows:

$$[\,Y \quad Cb \quad Cr\,] = \begin{bmatrix} CSCM\ 00 & CSCM\ 01 & CSCM\ 02 \\ CSCM\ 10 & CSCM\ 11 & CSCM\ 12 \\ CSCM\ 20 & CSCM\ 21 & CSCM\ 22 \end{bmatrix} \times [\,R \quad G \quad B\,],$$

wherein R, G, and B represent the current red, green, and blue values for the input pixel in 10-bit form (e.g., as processed by the gamma adjustment logic 3014), CSCM00-CSCM22 represent the coefficients of the color space conversion matrix, and Y, Cb, and Cr represent the resulting luma, and chroma components for the input pixel. Accordingly, the values for Y, Cb, and Cr may be computed in accordance with the equations below:

$$r=(\mathrm{CSCM00}\times R)(\mathrm{CSCM01}\times G)+(\mathrm{CSCM02}\times B)$$

$$Cb=(\mathrm{CSCM10}\times R)+(\mathrm{CSCM11}\times G)+(\mathrm{CSCM12}\times B)$$

$$Cr=(\mathrm{CSCM20}\times R)+(\mathrm{CSCM21}\times G)+(\mathrm{CSCM22}\times B)$$

In addition, offset values may be incorporated into the calculation. One such example may be as follows:

Y=CSC_00*(R+off_in[0])+CSC_01*(G+off_in[1]+ CSC_02*(B+off_in[2])+off_out[0]

Cb=CSC_10*(R+off_in[0])+CSC_21*(G+off_in[1])+ CSC_12*(B+off_in[2])+off_out[1]

Cr=CSC_20*(R+off_in[0])+CSC_11*(G+off_in[1])+ CSC_22*(B+off_in[2])+off_out[2]

The coefficients CSC_[0:2 0:2] may be 16-bit 2s-complement numbers with 12 fraction bits (4.12). The resulting YCbCr values can be negative. An offset can be added after the color space conversion. The offsets may allow for values in the range −32768 to +32768. After the offset, output values may be clipped to a programmable min and max:

Y'=(Y<min[0])? min[0]: (Y>max[0])? max [0]: Y;

Cb'=(Cb<min[1])? min[1]: (Cb>max[1])? max [1]: Cb;

Cr'=(Cr<min[2])? min[2]: (Cr>max[2])? max [2]: Cr.

YCC Processing Logic

In addition to processing the image data in the raw and RGB formats, the ISP pipe processing logic 80 also may process the image data in an YCC (YCbCr) format in the YCC processing logic 170. As should be appreciated, a YCC image format such as YCbCr includes one luminance (luma) channel (Y) and two chrominance (chroma) channels (Cb and Cr). Luminance (Y) generally encodes brightness, while blue-difference chrominance (Cb) and red-difference chrominance (Cr) provides additional color information that can be subsampled to reduce bandwidth. The YCC processing logic 170 may receive RGB or YCC image data from the RGB processing logic 160 or from the memory 100 via the direct memory access (DMA) source S6. The input pixels to the YCC processing logic 170 may be one of the following formats: RGB565, RGB888, RGB16, YCC16 4:4:4 (1-plane), or YCC422 10/8-bit 4:2:2 (1-plane only). The YCC processing logic 170 may output destination pixels in the 10/8-bit 4:2:2 (1-plane or 2-plane) or 10/8-bit 4:2:0 (2-plane) YCC formats.

FIG. 183 provides a more detailed block diagram of an example of the YCC processing logic 170. In the example of FIG. 183, the selection logic 172 may select the input pixel signal from the memory 100 (e.g., the DMA source S6) or from the RGB processing logic 160. The input pixel format may be signed 17-bit. Color space conversion (CSC) processing logic 4000 may transform RGB pixels to YCC (e.g., YCbCr) pixels. The YCC image data output by the CSC logic 4000 may undergo luma sharpening and/or chroma suppression in Y sharpening-chroma suppression (YSH) logic 4002. In particular, at the output of the CSC logic 4000, the lower 12-bits of pixel data may be used as the input to the Y sharpening-chroma suppression (YSH) logic 4002 (e.g., unsigned 12-bit format). The resulting image data may remain 12 bits and may optionally enter dynamic range compression (DRC) logic 4004. The digital range compression (DRC) logic 4004 may include, for example, a dynamic range compression engine by Apical. Selection logic 4006 may provide either dynamically compressed or bypassed image data to brightness/contrast/color adjustment (BCC) logic 4008, YCbCr gamma (GAM) logic 4010, and/or horizontal chroma decimation (HDEC) logic 4012.

The output of the horizontal HDEC logic 4012 may undergo additional processing in any of a variety of different orders before being output to the back-end interface 180. For example, the output of the HDEC logic 4012 may be selected by selection logic 4014 and passed into a scaler 4016. The scaler 4016 may include geometric distortion correction logic 4018 and formatting and scaling logic 4020. Selection logic 4022 may pass the output of the scaler 4016 (in one or two different resolutions) to chroma noise reduction (CNR) logic 4024 or to exit the YCC processing logic 170. Thus the YCC processing logic 170 may provide the output of the horizontal decimation (HDEC) logic 4012 first to the scaler 4016 and then to the chroma noise reduction (CNR) logic 4024. Alternatively, the YCC processing logic 170 may provide the output of the horizontal chroma decimation (HDEC) logic 4012 first to the chroma noise reduction (CNR) logic 4024 and then to the scaler 4016.

It may be noted that the YCC processing logic 170 may accept either RGB or YCC image data formats. As such, the YCC processing logic 170 may process the same image data in multiple passes, if desired. That is, the software controlling the ISP pipe processing logic 80 may store the output of the YCC processing logic 170 in the memory 100. On a following frame, the software may reinput the stored image data into the YCC processing logic 100. The YCC processing logic 170 then may process the image data again, this time using the same or different processing parameters. It should be appreciated that multiple passes through the image data may help to eliminate especially stubborn noise that could appear in the image data under certain conditions (e.g., low-light or other high-noise circumstances).

Color Space Conversion (CSC) Logic

The color space conversion (CSC) logic 4000 of the YCC processing logic 170 may transform RGB-format image data into YCC-format image data. YCC-format image data may bypass the color space conversion (CSC) logic 4000 in some embodiments. The color space conversion (CSC) logic 4000 may operate in substantially the same way as the color space conversion (CSC) logic 3020, which is discussed above.

Y Sharpening—Chroma Suppression (YSH) Logic

As shown in FIG. 183, the output of the color space conversion (CSC) logic 4000 may enter Y sharpening-chroma suppression (YSH) logic 4002. The Y sharpening-chroma suppression (YSH) logic 4002 may ignore all but the 12 most significant bits of the output of the CSC logic 4000. As such, the Y sharpening-chroma suppression (YSH) logic may effectively convert the input pixels to an unsigned 12-bit depth. The Y sharpening-chroma suppression (YSH) logic 4002 includes a Y sharpening component and a chroma suppression component. The Y sharpening component operates on the luminance (Y) channel of the pixel image data and the chroma suppression component operates on the chrominance (Cb and/or Cr) channels of the pixel image data.

The Y sharpening component of the Y sharpening-chroma suppression (YSH) logic 4002 may perform picture sharpening and edge-enhancement processing to increase texture and edge details in the image. Image sharpening thus may improve perceived image resolution. Sharpening noise that may be present in the image, however, may produce undesirable image artifacts. As such, the Y sharpening-chroma suppression (YSH) logic 4002 may avoid detecting noise as texture and/or edges, and thus may not amplify such noise during the sharpening process.

The picture sharpening and edge-enhancement processing of the Y sharpening-chroma suppression (YSH) logic 4002 may involve applying a multiple-scale unsharp mask filter on the luma (Y) component of the YCbCr signal. In one embodiment, two or more low-pass Gaussian filters of different scale sizes may be provided. In addition, the Y sharpening-chroma suppression (YSH) logic 4002 may employ adaptive coring threshold comparison operations to vary the amount of sharpening depending on the likelihood that noise may be present. In particular, coring may cause the sharpening effects to be diminished in areas of the image frame of low luminance intensity, since dark areas may be more likely to contain noise. Likewise, the amount of sharpening that is applied to the pixel may be modulated based on the high-frequency component of the image data. Namely, when the high-frequency component is particularly high, thereby suggesting that the sharpness may be due at least in part to noise, the amount of sharpening may be modulated down to prevent substantially gaining noise.

A block diagram illustrating one example of Y sharpening logic 4500 of the Y sharpening-chroma suppression (YSH) logic 4002 appears in FIG. 184. Although previous image processing operations of the ISP pipe processing logic 80 may have removed much image noise, some noise dots may remain. In general, these dots represent the long tail of the noise distribution of the image, which may not have been filtered during previous denoising operations in the ISP pipe processing logic 80. Noise dots may also remain as defective pixels that were not filtered during the defective pixel correction (DPC) processing operations of the DPC logic 1030, which is described above.

As such, the Y sharpening logic 4050 of FIG. 184 may include dot detection logic 4052 and dot correction logic 4054. The dot detection logic 4052 may detect whether a center pixel in a neighborhood of pixels (e.g., a 3×3 neighborhood of pixels) represents a noise dot. The dot detection logic 4052 will be discussed further below with reference to FIG. 185. The output of the dot detection logic 4052 may be a selection signal 4055. The selection signal 4055 may cause selection logic 4056 to select either the Yin signal or a dot-corrected version of the Yin signal from the dot correction logic 4054. In some embodiments, the dot detection logic 4052 may not control the selection logic 4056. The operation of the dot correction logic 4054 may correct the presence of a noise dot by replacing the center pixel of the pixel neighborhood (e.g., a 3×3 pixel neighborhood) along the lowest gradient direction. The operation of the dot correction logic 4054 will be discussed in greater detail below.

The output of the selection logic 4056 represents an unsharpened input signal, referred to below as an Unsharp1 signal 4058. The Unsharp1 signal 4058 may enter a first Gaussian low pass filter (LPF) 4060 and a second Gaussian low pass filter (LPF) 4062. In the example of FIG. 185, the first Gaussian LPF 4060 may be a 3×3 filter and the second Gaussian LPF 4062 may be a 5×5 filter. In other embodiments, more than two filters may be used, and/or filters of different scales (e.g., 7×7, 9×9, and so forth). The first Gaussian LPF 4060 may output a first unsharp mask (Unsharp3) signal 4064 and the second Gaussian LPF 4062 may output an unsharp (Unsharp2) signal 4066. As may be appreciated, the low pass filtering process of the filters 4060 and 4062 may remove high-frequency components of the input Unsharp1 signal. The resulting Unsharp2 signal 4066 and Unsharp3 signal 4064 may be used as base images to provide noise reduction as part of the Y sharpening logic 4050.

In one example, the 3×3 Gaussian filter (G1) 4060 and the 5×5 Gaussian filter may be defined as follows:

$$G1 = \frac{\begin{bmatrix} G1_1 & G1_1 & G1_2 \\ G1_1 & G1_0 & G1_1 \\ G1_2 & G1_1 & G1_2 \end{bmatrix}}{256}$$

$$G2 = \frac{\begin{bmatrix} G2_5 & G2_4 & G2_3 & G2_4 & G2_5 \\ G2_4 & G2_2 & G2_1 & G2_2 & G2_4 \\ G2_3 & G2_1 & G2_0 & G2_1 & G2_3 \\ G2_4 & G2_2 & G2_1 & G2_2 & G2_4 \\ G2_5 & G2_4 & G2_3 & G2_4 & G2_5 \end{bmatrix}}{256}$$

The values of the Gaussian filters 4060 and 4062 may be any suitable low-pass filtering parameters. One example of these parameters is provided below:

$$G1 = \frac{\begin{bmatrix} 26 & 30 & 26 \\ 30 & 32 & 30 \\ 26 & 30 & 26 \end{bmatrix}}{256}$$

$$G2 = \frac{\begin{bmatrix} 8 & 9 & 10 & 9 & 8 \\ 9 & 11 & 13 & 11 & 9 \\ 10 & 13 & 16 & 13 & 10 \\ 9 & 11 & 13 & 11 & 9 \\ 8 & 9 & 10 & 9 & 8 \end{bmatrix}}{256}$$

Using unsharp signals of different scale (e.g., unsharp1 4058, unsharp2 4066, and unsharp3 4064), several different "sharp" signals may be determined. The different sharp signals represent sharp components of the luminance of the pixel currently being processed. For instance, subtracting the Unsharp2 signal 4066 from the Unsharp3 signal 4064 (block 4068) produces a Sharp1 signal 4070. Because Sharp1 is essentially the difference between two low pass filters, it may be referred to as a "mid band" mask, since the higher frequency noise components are already filtered out in the unsharp images. Subtracting the Unsharp2 signal 4066 from the Unsharp1 input signal 4058 (block 4072) produces a Sharp2 signal 4074. Finally, subtracting the Unsharp3 signal 4064 from the Unsharp1 signal 4058 (block 4076) produces a Sharp3 signal 4078. The Sharp2 and Sharp3 signals may be understood to represent sharp components of the luminance of the pixel that remain after going through the respective low pass filters 4062 and 4060.

The Sharp1 signal 4070, Sharp2 signal 4074, and Sharp3 signal 4078 may represent components of the image data that are either brighter or darker than the low-frequency components of the image. The absolute values of these signals thus may be of particular interest. As shown in FIG. 184, the absolute value (block 4080) of the Sharp1 signal 4070 may be a Sharp1Abs signal 4082, the absolute value (block 4084) of the Sharp2 signal 4074 may be a Sharp2Abs signal 4086, and absolute value (block 4088) of the Sharp3 signal 4078 may be a Sharp3Abs signal 4090.

Before continuing, it should be noted that the intensity of the luma (Y) value may cause more or less sharpening to take place. In the example of FIG. 184, this is done in part by selecting (e.g., via selection circuitry 4092 and CoringIndSelect signal 4094) a coring threshold value 4098 from a coring threshold lookup table (CoringThresLUT) 4096. The coring threshold value 4098 represents an amount of sharpness needed before sharpening takes place. By sharpening only when the sharp components of the pixel exceed the coring threshold, small amounts of sharpness that could be due to noise will not be needlessly amplified. Since the amount of noise that may be present in the pixel could vary depending on the brightness of the pixel or the neighborhood of the pixel—recalling that darker pixels may have a higher likelihood of noise—the coring threshold lookup table 4096 may have values programmed to provide a larger coring threshold when the pixel or neighborhood of the pixel is darker. To be able to select between whether the brightness of the pixel alone or the general brightness of the neighborhood of the pixel is used to obtain the coring threshold value, the index value to the coring threshold lookup table 4096 may be the unSharp1 signal 4058, the unSharp2 signal 4066, or the unSharp3 signal 4064. It may be appreciated that the coring threshold lookup table 4096 may be calculated to vary the amount of coring depending on the brightness level of the pixel. Namely, since the standard deviation of noise may vary significantly from one brightness level to another, it may be advantageous to apply coring based on the known behavior of the noise standard deviation. For example, the coring threshold lookup table 4096 may advantageously apply higher amounts of coring to dark areas if it is known that dark areas have higher noise.

The coring threshold lookup table 4096 may have any suitable number of entries. In one example, the coring threshold lookup table 4096 may include 65 entries, and the input levels may be 12-bits equally spaced at an interval of 64. The upper 6 bits of the intensity image (e.g., the unSharp1 signal 4058, the unSharp2 signal 4066, or the unSharp3 signal 4064) may be used to index the coring threshold lookup table 4096. Input values in between intervals may be linearly interpolated.

The output of the coring threshold lookup table 4096 thus may be a coring signal 4098. The coring signal 4098 may be subtracted from the absolute values of the Sharp1, Sharp2, and Sharp3 signals—Sharp1Abs 4082, Sharp2Abs 4086, and/or Sharp3Abs 4090. As shown in FIG. 184, the value may be subtracted (block 4100) from the Sharp3Abs signal 4090 to produce a cored Sharp3 value 4102. The coring signal 4098 may be subtracted (block 4104) from the Sharp2Abs signal 4086 to produce a cored Sharp2 signal 4106. The coring signal 4098 may also be subtracted (block 4108) from the Sharp1 Abs signal 4082 to produce a cored Sharp1 value 4110. It should be appreciated that the cored Sharp3 value 4102, the cored Sharp2 value 4106, and the cored Sharp1 value 4110 represent intensity-modulated values that may avoid unintentionally amplifying noise where the standard deviation for noise is high (e.g., in a dark pixel or in dark areas of the image).

In addition to sharpening, edge enhancement can be applied to the luma (Y) signals. As shown in FIG. 184, the Unsharp1 signal 4058 may be processed by a Sobel filter 4112 for edge detection. The Sobel filter 4112 may determine a gradient value Edge based on a pixel block of any suitable size (e.g., a 3×3 pixel block) of the original image. The gradient value is referred to as "G" below. The pixel block is referred to as a matrix "A." The input pixel may be the center pixel of the block. In one embodiment, the Sobel filter 4112 may calculate an Edge signal 4116 by convolving the original image data to detect changes in horizontal and vertical directions. This process is shown below:

$$S_x = \begin{bmatrix} 1 & 0 & -1 \\ 2 & 0 & -2 \\ 1 & 0 & -1 \end{bmatrix}$$

$$S_y = \begin{bmatrix} 1 & 2 & 1 \\ 0 & 0 & 0 \\ -1 & -2 & -1 \end{bmatrix}$$

$$G_x = \frac{(S_x * A)}{8}$$

$$G_y = \frac{(S_y * A)}{8}$$

$$G = \begin{cases} (\mathrm{abs}(G_x) + \mathrm{abs}(G_y)) & \text{MODE 0} \\ -(\mathrm{abs}(G_x) + \mathrm{abs}(G_y)) & \text{MODE 1} \\ (G_x + G_y) & \text{MODE 2} \end{cases}$$

where $S_x$ and $S_y$ are represent matrix operators for gradient edge-strength detection in the horizontal and vertical directions, respectively, and $G_x$ and $G_y$ represent gradient images that contain horizontal and vertical change derivatives, respectively. As seen in the equations above, the Sobel filter 4112 may have 3 modes of operation. In mode 0, the gradient G is the sum of absolute horizontal and vertical gradients. In mode 1, the gradient G is the negative of the sum of absolute horizontal and vertical gradients. In mode 2, the gradient G is sum of the horizontal and vertical gradients. Thus, in the example of FIG. 184, the Unsharp1 signal 4058 may enter the Sobel filter 4112, which may output the Edge signal (G) 4114 according to the logic discussed above. The absolute value (block 4116) of the Edge signal 4114 is EdgeAbs 4118. Subtracting the coring threshold value 4098 from the EdgeAbs 4118 signal (block 4120) produces a cored Edge signal 4122.

Using the cored Sharp3 signal 4102, cored Sharp2 signal 4106, cored Sharp1 signal 4110, and/or the cored Edge signal 4122, the Y sharpening logic 4050 of FIG. 184 may employ lookup tables to determine the degree to which the sharp component(s) of the signal may sharpen the image. Using lookup tables instead of fixed values may allow, in some circumstances, for some sharp signals—sharp signals that have a greater confidence of being true sharp signals and not just noise—to be sharpened to a greater degree than other sharp signals. In one embodiment, for example, software may program such lookup tables to sharpen pixels with sharp signals within a certain range more than others outside the range. For instance, relatively small sharp signals or extremely strong sharp signals could imply that sharpening may not be particularly useful, so sharpening may be relatively weak for these types of pixels. On the other hand, sharp signals falling within the range of weak and extremely strong sharp signals may imply that sharpening could improve the desirability of the image.

Thus, as shown in FIG. 184, the cored Sharp3 signal 4102 may enter a Sharp3 lookup table 4124, the output of which may be a Sharp3Out signal 4126. The cored Sharp2 signal 4106 may enter a Sharp2 lookup table 4128, which may output a Sharp2Out signal 4130. The cored Sharp1 signal 4110 may enter a Sharp1 lookup table 4132, which may output a Sharp1Out signal 4134. Finally, the cored Edge signal 4122 may enter an Edge lookup table 4136, which may output an EdgeOut signal 4138. Though not expressly shown in FIG. 184, the original sign of the sharp value of each signal (before the absolute value of each signal was determined) may be added back in to the output signals.

The lookup tables 4126, 4128, 4132, and 4136 may have any suitable number of entries (e.g., 257) of any suitable size (e.g., 12 bits) equally spaced at a suitable interval (e.g., 16 levels). The lookup tables 4126, 4128, 4132, and 4136 may be generated by software to include another form of coring threshold, which may effectively disable the filter when the sharp amount is small to avoid sharpening noise. In addition, the lookup table entries may be populated to include a maximum sharpening amount (e.g., maximum sharp signals output by the lookup tables 4126, 4128, 4132, and 4136), which may reduce ringing artifacts. Entries between the table coring threshold and the table maximum sharpening amount may be programmed to gain up the sharpness according to any suitable function. When the lookup tables 4126, 4128, 4132, and 4136 have 257 entries, the upper 8-bits of the absolute value of the respective Sharp input signals may be used as an index. Input values between intervals may be linearly interpolated. In effect, the lookup tables 4126, 4128, 4132, and 4136 may simulate the application of gains (up and/or down) to the sharp values while avoiding complex multiplication hardware. Moreover, because software may control the programming of the lookup tables, different coring thresholds and maximum sharpening amounts may be varied, even from frame to frame if desired.

Before the Sharp signals 4126, 4130, 4134, and 4138 are mixed and added to the output luma signal, a radial gain may be determined and applied. As noted above, the amount of gain already applied to a given pixel may vary depending on its distance from the optical center (e.g., see the discussion of the lens shading correction (LSC) logic 1034 discussed above). As such, a radial gain may scale the various output signals of the Sharp lookup tables 4124, 4128, 4132, and 4136 to avoid oversaturating pixels in the periphery of the image. Based on a pixel position 4140, radius computation logic 4142 may compute the radial distance of the pixel from the optical center. A radial gain lookup table 4144 may output a radial gain value 4150. The interval between radial for purposes of linear interpolation of the radial gain lookup table 4144 may be 2^rad_scale, a programmable value. The radial gain 4150 may be applied to the EdgeOut signal 4138 (block 4152), to the Sharp1Out signal 4134 (block 4154), the Sharp2Out signal 4130 (block 4156), and the Sharp3Out signal 4126 (block 4158). The resulting outputs may be summed together in block 4160, 4162, 4164, and 4166 to produce a Sharp signal.

Before adding this summed Sharp value to one of the unsharp signals, a modulation signal may modulate the application of the Sharp output up or down. The modulation may be based on one of the high-frequency signals 4102, 4106, 4110, or 4122. Which of these signals is used to use for modulation may be selected by selection logic 4168 based on a selection signal 4170. The resulting signal may enter a modulation lookup table (LUT) 4172, the output of which is multiplied (block 4174) with the sum of the Sharp signals output by block 4166. The modulation lookup table 4172 may have a variety of entries (e.g., 65 entries) containing an amount to modulate the signal depending on the value of the high-frequency signal serving as the index to the table. Each of the values of the entries may be unsigned 12-bit numbers with 8 fractional bits. In one example, the input levels of the modulation LUT 4172 may be 12-bit and may be equally spaced at an interval of 64. The upper 6 bits of the intensity image from the selection logic 4168 may be used to index the lookup table 4172. In-between values may be linearly interpolated.

One basis for modulating the summed Sharp signal based on the high-frequency signal is to reduce the sharpening of noise. For instance, certain noisy areas of an image may have certain characteristics (e.g., high sharpness values but low edge or gradient values) that may be used to modulate the application of the summed Sharp signal. There are any number of suitable ways of programming the modulation LUT 4172 so as to avoid amplifying noise. For instance, the sharp component of the pixel may be due to noise when the sharp component is particularly high. However, the sharp component may be much higher than would be expected of noise—in which case, the modulation LUT 4172 may be programmed so as to pass the sharp component because it is unlikely to be noise. In some embodiments, the modulation LUT 4172 may be programmed only to "trust" certain levels of sharpness that are less likely to be due to noise. Moreover, in the example of FIG. 184, the modulation LUT 4172 is indexed by one of the high-frequency signals 4102, 4106, 4110, or 4122. In other embodiments, however, the modulation LUT 4172 may be indexed by a combination of these various signals or other high-frequency signals. It should also be appreciated that, in some embodiments, the software controlling the ISP pipe processing logic 80 may program the coring threshold LUT 4096 and the modulation LUT 4172 with the same table.

The modulated output of block 4174, a modulated Sharp signal 4176, may be combined with one of the unsharp signals 4058, 4064, or 4066 (e.g., via selection logic 4178 and a selection signal 4180). This unsharp signal 4182 and the modulated Sharp signal 4176 may be added together (block 4184) to produce an output signal. However, when the dot detection logic 4052 has determined that the pixel value is "popped"—that is, noise—it may be disadvantageous to sharpen the pixel even after pixel correction. As such, selection logic 4186, based on the selection signal 4055 from the dot detection logic 4052, may output the unsharp signal 4182 unchanged as the output 4188 under such circumstances in one embodiment. In other embodiments, the corrected pixel may be processed and the selection signal 4055 from the dot detection logic 4052 may not be used.

As should be appreciated, when compared to conventional unsharp masking techniques, the image sharpening techniques set forth in this disclosure may provide for improving the enhancement of textures and edges while also reducing noise in the output image.

In particular, the present techniques may be well-suited to correct images that may exhibit poor signal-to-noise ratio, such as images acquired under low lighting conditions using lower resolution cameras integrated into portable devices (e.g., mobile phones). For instance, when the noise variance and signal variance are comparable, it is difficult to use a fixed threshold for sharpening, as some of the noise components would be sharpened along with texture and edges. Accordingly, the techniques provided herein, as discussed above, may filter the noise from the input image using multi-scale Gaussian filters to extract features from the unsharp images to provide a sharpened image that also exhibits reduced noise content.

Before continuing, it should be understood that the illustrated logic 4050 is intended to provide only one example. In other embodiments, additional or fewer features may be provided by the Y sharpening logic 4050. For instance, some embodiments may not include the selection logic. While such embodiments may not provide for sharpening and/or noise reduction features that are as robust as the implementation shown in FIG. 184, it should be appreciated that such design choices may be the result of cost and/or business related constraints.

As noted above, upon entry to the Y sharpening logic 4050, some pixels still may represent noise dots—the long tail of the noise distribution of the image that may not have been filtered up to this point in the ISP pipe processing logic 80. FIG. 185 illustrates one example of the dot detection logic 4052, which may identify whether a pixel P is a "popped" noise pixel from a pixel neighborhood 4200. In the example of FIG. 185, the pixel neighborhood 4200 is a 3×3 pixel neighborhood, but any suitable pixel neighborhood may be considered (e.g., 5×5, 7×7, 9×9, and so forth). The dot detection logic 4052 may determine a maximum pixel brightness (block 4202) and a minimum pixel brightness (block 4204), against which the center pixel P (numeral 4208) may be compared in dot detect logic 4206.

The center pixel P 4208 may also serve as an index to a dot threshold lookup table 4210. The dot threshold lookup table 4210 may have any suitable number of entries (e.g., 17 entries) evenly distributed in the range of the pixel bit depth (e.g., 12 bits). In-between values may be linearly interpolated. The dot threshold lookup table 4210 may be programmed with various possible noise thresholds (ThrDot) 4212 that may vary depending on the intensity of the luminance. For example, when darker areas of an image are expected to include more noise, darker pixels may cause the dot threshold lookup table 4210 to output a lower threshold ThrDot 4212 into the lookup table.

The dot detect logic 4206 may determine whether the luminance (Y) of the center pixel P 4208 differs from the maximum pixel (block 4202) or the minimum pixel (block 4204) of the neighborhood of pixels 4200 by more than the dot threshold (ThrDot) 4212. If so, the center pixel P 4208 may be deemed to be "popped" and should be corrected rather than sharpened. Thus, for such pixels, the dot detect logic 4206 may output the selection signal 4055 to cause the Y sharpening logic 4050 of FIG. 184 to pass a corrected version of the pixel from the dot correction logic 4052 rather than a sharpened version of the pixel.

The dot correction logic 4052 may correct a "popped" pixel using any suitable dot correction process. In one example, the dot correction logic 4052 may be replaced along a gradient direction from a neighborhood of surrounding pixels (e.g., the neighborhood of pixels 4200). For example, when the neighborhood of pixels is a 3×3 pixel neighborhood (e.g., numbered in the manner of the 3×3 pixel neighborhood of FIG. 185), the dot correction logic 4054 may carry out the following computations. First, four gradients may be determined:

$$GrH=(2P-P3-P4+1)/2$$

$$GrV=(2P-P1-P6+1)/2$$

$$GrD1=(2P-P5-P2+1)/2$$

$$GrD2=(2P-P0-P7+1)/2$$

where GrH is a horizontal gradient, GrV is a vertical gradient, GrD1 is an upwardly sloping diagonal gradient, and GrD2 is a downwardly sloping diagonal gradient. The minimum absolute values of the four gradients (e.g., minAbsValue=min([abs(GrH), abs(GrV), abs(GrD1), abs (GrD2)]) may also be computed, and P may be replaced by linear interpolation in the direction of the smallest gradient, as shown below:

```
if (minAbsValue == abs(GrH)) {
GrMinDirection = GrH;
}
else if (minAbsValue == abs(GrV)) {
GrMinDirection = GrV;
}
else if (minAbsValue == abs(GrD1)) {
GrMinDirection = GrD1;
}
else {
GrMinDirection = GrD2;
}
P = P - GrMinDirection
```

The chroma suppression component of the Y sharpening-chroma suppression logic 4002 may suppress chroma to reduce color aliasing artifacts from various filters of the ISP pipe processing logic 80 or in particularly high- or low-brightness areas. One example of the chroma suppression component of the Y sharpening-chroma suppression logic 4002 appears in FIG. 186 as chroma suppression logic 4230. The chroma suppression logic 4230 may determine an attenuation factor to apply to the chrominance components Cb and Cr depending on different values of the luminance component Y. Namely, the chroma suppression logic 4230 may derive the attenuation factor by determining a first attenuation factor based on the high-frequency component of the luminance and a second attenuation factor based on the overall luminance. One of these, or a combination, may be used as the attenuation factor by which to suppress the chrominance components.

The chroma suppression logic 4230 may determine the first attenuation factor—a chroma edge suppression attenuation factor—based on any suitable Sharp signal. Thus, selection logic 4232 may receive absolute values of the Sharp1 signal 4082, Sharp2 signal 4086, Sharp3 signal 4090, and/or Edge signal 4118, or any other suitable sharp signals (e.g., the Sharp1Out, Sharp2Out, Sharp3Out, and/or EdgeOut). The selected sharp signal, referred to as Ysharp in FIG. 186, may serve as an index to a first chroma attenuation lookup table (LUT) 4236. The first chroma attenuation LUT 4232 may output the first chroma attenuation factor (e.g., signal 4238) as a gain between 0 and 1. By way of example, the first chroma attenuation LUT 4236 may be programmed to generally approximate a curve shown in FIG. 187. In the curve of FIG. 187, the abscissa represents various Ysharp 4234 values, and the ordinate represents the first chroma attenuation factor 4238. Linear interpolation may be used to obtain the attenuation factor 4238 for in-between Ysharp 4234 values. As can be seen in FIG. 187, as sharpness increases, the likelihood of chroma artifacts may increase. Thus, when the sharpness is particularly high, the chroma components Cb and Cr may be suppressed. The attenuation of chroma may be relatively gradual until the Ysharp 4234 signal approaches a threshold 4260, after which the attenuation of chroma may increase more rapidly until chroma is attenuated completely.

The chroma suppression logic 4230 may determine the second attenuation factor—a chroma brightness suppression attenuation factor—based on the input pixel luminance Yin (or a corrected version of Yin). The input pixel luminance Yin may serve as an index to a second chroma attenuation lookup table (LUT) 4240. The second chroma attenuation LUT 4240 may output the second chroma attenuation factor (e.g., signal 4242) as a gain between 0 and 1. By way of example, the second chroma attenuation LUT 4220 may be programmed to generally approximate a curve shown in FIG. 188. In the curve of FIG. 188, the abscissa represents various Yin brightness values, and the ordinate represents the second chroma attenuation factor 4242. Linear interpolation may be used to obtain the attenuation factor 4242 for in-between Yin values. As can be seen in FIG. 188, in very low or very high brightness, when chroma noise is more likely, chroma may be completely suppressed. In other words, chroma substantially may not be suppressed, or may be relatively unsuppressed, as long as the Yin value remains between thresholds 4262 and 4264. Otherwise, the chroma may be suppressed to degrees that increase as the Yin value falls beneath the first threshold 4262 or above the second threshold 4264.

In some embodiments, the chroma suppression logic 4230 may attenuate the chroma components using only the first attenuation factor 4238 or only the second attenuation factor 4240. In the example of FIG. 186, the chroma suppression logic 4230 may attenuate the chroma components using a mix of the two attenuation factors 4238 and 4242, which may be multiplied in block 4244 and output as a combined attenuation factor 4246.

The chroma signal Cb may be filtered in a Cb filter 4248 to produce a filtered Cb value and the chroma signal Cr may be filtered in a Cr filter 4252 to produce a filtered Cr value 4254. The Cb filter 4248 and Cr filter 4252 may be any suitable filters (e.g., 5×5 chroma filters). Chroma suppression calculation logic 4256 may determine suppressed chroma signal 4258. Namely, the chroma may be attenuated to gray or to a filtered version of chroma, Cb' or Cr', using the first attenuation factor 4238 based on the sharpness signal (Attn_YSharp), and using the second attenuation factor 4242 based on brightness (Attn_Bright) as follows:

```
Attn_c = Attn_Sharp * Attn_Bright
if (Attenuate to filterted version of chroma)
{
Cbout = Cb' + (Cb - Cb') * Attn_c
Crout = Cr' + (Cr - Cr') * Attn_c
} else (attenuate to gray)
{
Cbout = Cboffset + (Cb - Cboffset) * Attn_c
Crout = Croffset + (Cr - Croffset) * Attn_c
}
```

where Cboffset and Croffset represent programmable values that may be set to gray (e.g., 2048 for a 12-bit pixel).

Brightness—Contrast—Color Adjustment (BCC) Logic

Enhancement of brightness, contrast, saturation and hue is a simple yet important part of YCbCr processing. Thus, the output of the Y sharpening-chroma suppression logic 4050 or the output of the DRC logic 4004 may enter the brightness, contrast, and color adjustment (BCC) logic 4008. As seen in FIG. 189, the BCC logic 4008 may process the luma (Y) and chroma (Cb and Cr) separately from one another. In general, the BCC logic 4008 may provide additional The presently illustrated embodiment provides for processing of the YCbCr data in 10-bit precision, although other embodiments may utilize different bit-depths.

Referring first to components of the luma processing components of the BCC logic 4008, a YOffset 4300 may initially be subtracted (block 4302) from the input Y value to set the black level to zero. This is done to ensure that the contrast adjustment does not change the black levels when the Y nominal range is 64 to 940 in 12-bit format (or 16 to 235 in 8-bit format). The offset may be programmable in case the luma values extend the full range. Since luma data may have negative values below the offset 4300, Y data 4306 should be signed after this point. In luma processing logic 4304, a Luma contrast is implemented by multiplying the Y data 4306 by a constant contrast value 4308 (block 4310). The Y contrast constant multiplier may be a 12-bit unsigned value with 10 fractional bits (2.10) for a contrast gain range of up to 4×. The resulting output value is denoted by numeral 4312. A brightness correction next may be implemented by adding or subtracting from the contrast-corrected luma signal 4312. Namely, a brightness offset 4314 may be added or subtracted to produce a luma value 4316. The brightness correction may be performed after the contrast correction to avoid varying the DC offset when changing contrast. The brightness offset 4314 may be an 11-bit two's complement value, which may provide an adjustment range of −1024 to +1023. In other embodiments, any other suitable offset values may be employed (e.g., 8-, 9-, 10-, or 12-bit). Finally, the YOffset 4300 may be added back to the Luma data (block 4318) to re-position the black level and saturate to a 10-bit unsigned range. The amount of chroma saturation may be programmed to the Y contrast value 4308 during CbCr processing to avoid color shift when contrast is adjusted.

Other components of the BCC logic 4008 provide for color adjustment based upon hue characteristics of the Cb and Cr data. As shown, a Cb offset 4322 may be subtracted (block 4324) from the input Cb value to bring a resulting offset Cb value 4326 black level to zero. Likewise, a Cr offset 4328 may be subtracted (block 4330) from the input Cr value to bring a resulting offset Cr value 4332 black level to zero. The hue then may be adjusted in global hue control logic 4334 in accordance with the following equations:

$$Cb_{adj}=Cb\cos(\theta)+Cr\sin(\theta),$$

$$Cr_{adj}=Cr\cos(\theta)-Cb\sin(\theta),$$

where cos(θ) value is shown as numeral 4336, the sin(θ) value is shown as numeral 4338, mathematical calculations are shown in blocks 4340, 4342, 4344, 4346, 4348, 4350, and 4354, and $Cr_{adj}$ and $Cb_{adj}$ represent adjusted Cr and Cb values shown respectively at numerals 4352 and 4356. The angle θ represents a hue angle, which may be calculated as follows:

$$\theta = \arctan\left(\frac{Cr}{Cb}\right)$$

The above operations are depicted by the logic within the global hue control block, and may be represented by the following matrix operation:

$$\begin{bmatrix} Cb_{adj} \\ Cr_{adj} \end{bmatrix} = \begin{bmatrix} Ka & Kb \\ -Kb & Ka \end{bmatrix} \begin{bmatrix} Cb \\ Cr \end{bmatrix},$$

where Ka=cos(θ) and Kb=sin(θ).

Next, saturation control may be applied to the $Cb_{adj}$ 4356 and $Cr_{adj}$ 4352 values via a two-dimensional chroma lookup table (LUT) 4358. Specifically, a flexible method for mapping colors may be desired to effectively improve the reproduction and/or mapping of colors in the BCC logic 4008. The 2D chroma LUT 4358 implements this functionality. By using the 2D chroma LUT 4358, which considers both Cb and Cr chroma channels instead of independent tables that consider only Cb or only Cr, the BCC logic 4008 may act to make corrections using both saturation and hue. The 2D chroma LUT 4358 thus may allow the BCC 4008 to adapt to specific applications of images. For instance, images with people may be adjusted to be more flattering to skin tones, while images without people may be adjusted to emphasize stronger colors that might be unflattering on skin.

Additionally or alternatively, the chroma LUT 4358 may be spatially varying. When the chroma LUT 4358 is spatially varying, different color mappings may be applied to different areas of the scene. In one example, the chroma LUT 4358 may be programmed such that areas having detected faces may have color mappings that are more favorable to skin tones. Likewise, the chroma LUT 4358 may be programmed to emphasize colors found in nature, such as rich reds associated with red flowers, when people are not expected to be present in the image (and emphasizing reds could have an unflattering effect on human faces). In still other embodiments, the chroma LUT 4358 may consider light levels and one or both of the color-difference channels. For instance, the chroma LUT 4358 may be indexed using luminance (Y) and one of the chrominance channels (e.g., Cb or Cr). The light levels indicated by luminance may provide additional information with which to base the adjustment of Cb and Cr.

When the 2D chroma LUT 4358 is indexed by Cb and Cr values, as illustrated in the example of FIG. 189, each entry may represent a Cb/Cr output level. In one embodiment, the 2D chroma LUT 4358 may be a 17×17 lookup table, which may saturation values at evenly distributed Cb and Cr indices. Other embodiments may use a lookup table of any suitable size. In one embodiment, the upper 4 bits of the 2D chroma LUT 4358 may be used as the indices into the 2D chroma LUT 4358. The output levels may be linearly interpolated from the four closest points in Cb/Cr space. At the input of the 2D chroma LUT 4358, the Cb offset 4322 and Cr offset 4328 are respectively added back into the Cb and Cr values. The result (Cr_out and Cb_out) may be clipped to a 10-bit range. This operation may be summarized by the pseudo-code below:

```
Cb_idx=(Cb>>6)
Cr_idx=(Cr>>6)
Cb0=CbCrLUT[Cb_idx][Cr_idx]·Cb
Cb1=CbCrLUT[Cb_idx][Cr_idx+1]·Cb
Cb2=CbCrLUT[Cb_idx+1][Cr_idx]·Cb
Cb3=CbCrLUT[Cb_idx+1][Cr_idx+1]·Cb
Cb_out=((0x40−(Cb&0x3f))*(0x40−(Cr&0x3f)) Cb0+
   (0x40−(Cb&0x3f))*((Cr&0x3f))*Cb1+((Cb&0x3f))*
   (0x40−(Cr&0x3f))*Cb2+((Cb&0x3f))*((Cr&0x3f))*
   Cb3+(1<<11))>>(6+6)
Cr0=CbCrLUT[Cb_idx][Cr_idx]·Cr
Cr1=CbCrLUT[Cb_idx][Cr_idx+1]·Cr
Cr2=CbCrLUT[Cb_idx+1][Cr_idx]·Cr
Cr3=CbCrLUT[Cb_idx+1][Cr_idx+1]·Cr
Cr_out=((0x40−(Cb&0x3f))*(0x40−(Cr&0x3f))*Cr0+
   (0x40−(Cb&0x3f))*((Cr&0x3f))*Cr1+((Cb&0x3f))*
   (0x40−(Cr&0x31))*Cr2+((Cb&0x3f))*((Cr&0x3f))*
   Cr3+(1<<11))>>(6+6)
```

At the output of the 2D chroma LUT 4358, the Cb offset 4322 may be subtracted again from the Cb value (block 4366) while a global saturation values is applied. Namely, in a multiplication block 4368, a global Cb saturation value 4370 may be applied. The Cb offset 4322 may be added back into the resulting value (block 4372) to produce an output Cb value 4374. Likewise, the Cr offset 4328 may be subtracted again from the Cr value (block 4376) while a global saturation values is applied. Namely, in a multiplication block 4378, a global Cr saturation value 4380 may be applied. The Cr offset 4328 may be added back into the resulting value (block 4382) to produce an output Cr value 4384. The global saturation values 4370 and 4380 may represent values that may independently control saturation in the Cb and Cr channels. In one embodiment, the global saturation values 4370 and 4380 may be 12-bit unsigned values with 10 fractional bits (2.10). The output values 4374 and 4384 may be clipped to a saturated unsigned 10-bit range.

Gamma (GAM) Logic

Thereafter, the output of the BCC logic 4008 may be passed to the YCbCr gamma adjustment logic 4010, as shown in FIG. 183. In one embodiment, the gamma adjustment logic 1185 may provide non-linear mapping functions for the Y, Cb and Cr channels. For instance, the input Y, Cb, and Cr values are mapped to corresponding output values. When the YCbCr data is processed in 10-bits, an interpolated 10-bit 256 entry lookup table may be used. Three such lookup tables may be provided, with one for each of the Y, Cb, and Cr channels. Each of the 256 input entries may be evenly distributed and, an output may be determined by linear interpolation of the output values mapped to the indices just above and below the current input index. In some embodiments, a non-interpolated lookup table having 1024 entries (for 10-bit data) may also be used, but may have significantly greater memory requirements. As will be appreciated, by adjusting the output values of the lookup tables, the YCbCr gamma adjustment function may be also be used to perform certain image filter effects, such as black and white, sepia tone, negative images, solarization, and so forth.

Horizontal Decimation (HDEC) Logic

Next, chroma decimation may be applied by the chroma horizontal decimation (HDEC) logic 4012 to the output of the YCC gamma adjustment logic 4010. In one embodiment, the HDEC logic 4012 may be configured to perform horizontal decimation to convert the YCbCr data from a 4:4:4 format to a 4:2:2 format, in which the chroma (Cr and Cr) information is sub-sampled at half rate of the luma data. FIG. 190 provides one brief example of a block diagram of the HDEC logic 4012, in which input YCbCr data in the 4:4:4 format is converted to YCbCr 4:2:2 after optional filtering. In the example of FIG. 190, selection logic 4400 and 4402 may pass the input pixel data though a first filter mode 4404, a second filter mode 4406, or may bypass the filters altogether before decimation logic 4408 decimates by a factor of 2×. Bypassing the horizontal filters may be useful when the source image was originally 4:2:2, but was previously upsampled to 4:4:4 for YCC processing. In that case, the resulting decimated 4:2:2 image is identical to the original image.

The first horizontal filter mode 4404 may operate, for example, in the manner of the block diagram shown in FIG. 191. As seen in FIG. 191, a 9-tap filter 4420 may operate effectively as a 15-tap horizontal filter when some of the coefficients (e.g., non-sampled pixels) are zeros. Other coefficients C0, C1, C2, C3, and C4 may be selected to operate as a lancsoz filter. Namely, the coefficient C0 4422 may be multiplied (block 4424) with the center pixel. Addition blocks 4426, 4428, 4430, and 4432 may sum pixels symmetric to the center pixel. The coefficients C1, C2, C3, and C4 may be applied to these values at blocks 4434, 4436, 4438, and 4440. All of these values may be summed together (block 4442) before being scaled (e.g., by 13 bits) (block 4444) to produce the pixel output to be decimated. In some embodiments, the coefficients may be signed 16-bit coefficients with a 13-bit fraction.

As mentioned above, the coefficients C0, C1, C2, C3, and C4 may be selected such that the first horizontal filter mode 4404 carries out a lancsoz filter. As seen in FIG. 192, an example of a plot 4450 of a lancsoz sinc function illustrates how these coefficients may be selected. In the plot 4450 of FIG. 192, an ordinate 4452 represents the coefficient values and an abscissa 4454 represents pixel positions. When the lancsoz sine function is overlaid across the pixels as shown, some of the pixel positions (e.g., −8, −6, −4, −2, 2, 4, 6, 8) have coefficient values of 0. Thus, to apply such a coefficient value, these pixels need not be sampled, as seen in FIG. 191. The remaining pixel coefficients C0, C1, C2, C3, and C4 may be selected as shown in FIG. 192.

The second horizontal filter mode 4406 may be carried out in the manner illustrated in FIG. 193. In the example of FIG. 193, a 9-tap filter 4460 may be used to implement, for example, a Gaussian filter. As such, a first coefficient C0 4422 (selected to implement a Gaussian or other filter rather than the lancsoz filter discussed above) may be multiplied (4462) with the center pixel. The other nearest four pixels symmetric to the center pixel may be summed in blocks 4464, 4466, 4468, and 4470, and coefficients C1, C2, C3, and C4 applied to the results in blocks 4472, 4474, 4476, and 4478. These totals may be summed (block 4480) and scaled (block 4480) (e.g., by 13 bits) to produce the pixel output to be decimated. In some embodiments, the coefficients may be signed 16-bit coefficients with a 13-bit fraction.

An example of the operation of the horizontal decimation logic 4408 appears in FIG. 194. As seen, for various horizontal pixel positions, chroma input 4502 may be decimated by a factor of 2. Thus, chroma output 4504 may have half as many chroma values (pixel chroma values may be collocated). It should be appreciated that the examples shown in FIGS. 190-194 are not intended to be exhaustive. Indeed, in other embodiments, the HDEC logic 4012 may include more or fewer components. For example, in other embodiments, only one filter may be employed, no filters may be employed, and/or all image data may be filtered (image data may not bypass the horizontal filtering).

Whether to use the first filter mode 4404 or the second filter mode 4406 may depend on the conditions of the image. For instance, a low-light and/or relatively high-noise image may benefit from a smoother filter. As such, the second filter mode 4406, which provides the smoothing Gaussian filter, may be applied. On the other hand, if the image is relatively bright and/or relatively low-noise, the lancsoz filter of the first filter mode 4404 may provide a greater sharpening effect.

The examples of the filters discussed above are symmetric. That is, in both the first filter mode 4404 and the second filter mode 4406, pixels symmetric to the pixel of interest are added together before the coefficients are applied. In other embodiments, however, other filter modes may include non-symmetric filters. A non-symmetric filter may involve individually sampling and applying a coefficient to each pixel tapped to enter the filter. Thus, a non-symmetric filter may permit some degree of in-between Cb/Cr sampling. A non-symmetric filter may be particularly of use when the chroma values of the ultimate decimated image should be shifted by some fractional amount from strict 2× downsampling.

YCC Scaling and Geometric Distortion Correction (SCL) Logic

Two of the most significant defects of camera lenses are known as geometric distortion and chromatic aberration. In sophisticated lens designs, such as lenses for SLR cameras, these defects are usually only noticeable in wide angle and zoom lenses. As camera lenses get smaller and price constraints dictate cheaper lens construction, these defects become a barrier to further size and cost reduction even for lenses of normal focal length.

Geometric distortion manifests as a radial variation in the magnification of the lens, resulting in barrel distortion if the magnification decreases radially or pincushion distortion if the magnification increases radially. It is possible for a lens to exhibit both types of distortion with magnification first decreasing radially then increasing near the edge of the lens. This combination is known as moustache distortion.

Chromatic aberration is a result of the fact that the refractive index of all lens materials is dependent on wavelength, resulting in differing geometric distortion for red, green and blue. There are two types of chromatic aberration: longitudinal chromatic aberration, which causes different colors of light to focus on different planes, and lateral chromatic aberration, which results in a radial shift between the red, green and blue wavelengths. Longitudinal chromatic aberration is not correctable.

The ability to either fully or partially correct geometric distortion and chromatic aberration in the ISP pipe processing logic 80 may allow for smaller, thinner and cheaper lenses while maintaining sufficient visual quality in the video and still frames produced by the imaging device 30, As discussed above, chromatic aberration may be removed from the raw Bayer image data before it reaches the demosiacing logic 3002 of the RGB processing logic 160, and thus may be part of the raw scaler logic 1040. The main geometric distortion correction, however, may be performed as part of the YCC Scaler 4016. Correcting these defects essentially involves a resampling operation using a mapping that varies as a function of the radius from the optical center of the frame (the point in the frame which is aligned with the optical center of the lens).

In the ISP pipe processing logic 80, the geometric distortion correction logic 4018 is combined with the YCC scaling logic 4020 into the scaling logic (SCL) 4016. Scaling and geometric distortion are performed essentially at the same time, though separably in the vertical and horizontal resamplers of the scaling logic 4016.

Generally speaking, image scaling produces an input to output mapping that is separable—it can be performed independently in the horizontal and vertical dimensions. When a geometric distortion correction function is added, however, the result is a function that is not strictly separable. This is because the distortion (displacement) caused by geometric distortion is a function of radius—that is, the distance of a pixel from the optical center of the sensor—and the radius is a function of both the horizontal and vertical position. Still, the geometric distortion correction logic 4018 can be implemented as a separable function with little or no degradation in visual quality. In the separable implementation, vertical and horizontal resampling is performed independently.

FIG. 195 represents a simplified top-level block diagram of the YCC scaler 4020, which includes separate functional logic for luma and chroma: luma correction logic 4550 and chroma correction logic 4552. Before continuing further, it should be noted that the implementation of the YCC scaler 4020 may be constrained by two concerns: (1) the YCC scaler 4020 may have two output channels that are different sizes from one another (i.e., the YCC scaler 4020 may output final image data in two different resolutions, shown as Res1 and Res2 in FIG. 183), and (2) each of these output channels may be in either the YCbCr 4:2:2 or YCbCr 4:2:0 formats. Thus, the YCC scaler 4020 may essentially include two scalers to scale to two different resolutions, divided among luma and chroma.

Namely, the luma correction logic 4550 may include configurable line buffers 4554 that receive the luma input data in 10-bit format. A line buffer controller 4556 may control the passage of the data through two barrel shifters 4558 and 4560. The two barrel shifters 4558 and 4560 may select a subset of the total number of lines to provide to circuitry that will obtain the geometric distortion correction described below. Before continuing further, it should be understood that the line buffers may be configurable to hold 12 lines of 4096 pixels (12×4096), 24 lines of 2048 pixels (24×2048), or 48 lines of 1024 pixels (48×1024). As will be discussed below, different configurations may benefit different image sizes and applications.

The respective lines selected by the barrel shifters 4558 and 4560 may be provided to a channel 0 vertical luma scaler 4562 and a channel 1 vertical luma scaler 4564. The vertical luma scalers 4562 and 4564 may correct for geometric distortion vertically, but not horizontally, in the image, while also scaling the image up or down. The respective outputs of these filters may be provided to a channel 0 horizontal luma scaler 4566 and a channel 1 horizontal luma filter 4568, which may correct for geometric distortion horizontally while also scaling the image up or down. The YCC scaler 4020 may output corrected and scaled luma image data in two different resolutions.

Likewise, the chroma correction logic 4552 may include similar configurable line buffers 4570 that receive the chroma input data in 10-bit format. The line buffer controller 4556 may control the passage of the data through two barrel shifters 4574 and 4576. The respective outputs of the barrel shifters 4574 and 4576 may be provided to a channel 0 vertical chroma scaler 4578 and a channel 1 vertical chroma scaler 4580. The respective outputs of the vertical scaler may be provided to a channel 0 horizontal chroma scaler 4582 and a channel 1 horizontal chroma scaler 4584. The YCC scaler 4020 thus may output corrected and scaled chroma image data in two different resolutions.

The various scalers 4562, 4564, 4566, 4568, 4578, 4580, 4582, and 4584 may include certain components that may determine proper, geometric-distortion-corrected coordinates for a given output pixel. The vertical luma scalers 4562 and 4564 may include respective coordinate generation (CG) logic 4586, which may determine, for a given output pixel, a vertical (y) coordinate in the input frame (which is uncorrected for vertical geometric distortion) that would produce an ouput pixel corrected for vertical geometric distortion. Respective resampling filters (RF) 4588 may resample the input frame at the determined coordinates to obtain an output pixel that would be corrected of vertical geometric distortion. Likewise, the horizontal luma scalers 4566 and 4568 may also include respective coordinate generation (CG) logic 4590 that may determine, for a given output pixel, a horizontal (x) coordinate in the input frame (which is uncorrected for horizontal geometric distortion) that would produce an ouput pixel corrected for horizontal geometric distortion. Respective resampling filters (RF) 4592 may resample the input frame at the determined coordinates to obtain an output pixel that would be corrected of both vertical and horizontal geometric distortion. Similar coordinate generation (CG) logic 4594 and 4598 and resampling filters (RF) 4596 and 4599 may be provided for the chroma correction logic 4552.

Since the two output frames are different sizes (e.g., Res1 and Res2 from channels 0 and 1), it may be difficult to closely synchronize the operation of the two scalers (e.g., of channels 0 and 1). Moreover, supporting the 4:2:0 output format makes it difficult to closely synchronize the luma and chroma scalers within channel 0 or channel 1. Both scalers may receive the same set of luminance and chrominance input lines, however, so the operation of the luma vertical scalers 4562 and 4564 may be synchronized, as may be the operation of the chroma vertical scalers 4578 and 4580. In addition, as seen in FIG. 191, the luma scalers for both channels share the same line buffers 4554, and hence the same line buffer controller 4556. Likewise, the chroma scalers for both channels use the same line buffers 4570 and line buffer controller 4572.

A simplified example of the operation of the YCC scaler 4020 is described in a flowchart 4600 of FIG. 196. The flowchart 4600 may begin when the radius from the optical center of the pixel that is to be output by the YCC scaler 4020 is determined (block 4602). The radius on the sensor may be mapped to the radius on the lens (block 4604). The displacement due to geometric distortion from the lens then may be obtained through a lookup table indexed by the radius (block 4604). Using the displacement indicated by the radius, pixel coordinates within the distorted (input) frame may be obtained (block 4606). Since the coordinates may be unlikely to be integer values, the output pixel may be generated by resampling the distorted frame at the determined coordinates (block 4608).

How the YCC scaler 4020 of FIG. 195 carries out the flowchart 4600 of FIG. 196 will be discussed below in relation to the various components of the YCC scaler 4020. Namely, generating corrected x and y coordinates when performing geometric distortion correction may be more complicated than simply scaling an image without geometric distortion correction. As such, line buffer management processes may be employed to efficiently provide the lines used by the YCC scaler 4020.

As mentioned above, to perform vertical scaling while correcting the vertical component of geometric distortion, the vertical coordinate (y) of each output sample (from the vertical resampling scalers 4562, 4568, 4578, and 4580)

may be mapped to a determined vertical (y) coordinate within the uncorrected input frame which would produce a vertically geometrically corrected output pixel. In the vertical resampling scalers 4562, 4568, 4578, and 4580, resampling the input frame at those coordinates generates the output pixel sample with corrected vertical (y) coordinate. The horizontal (x) coordinate within the input frame may be the same as the horizontal coordinate within the output—that is, no horizontal scaling or geometric distortion correction may be performed. However, the vertical (y) coordinate may, in general, be a non-integer value, and the input vertical coordinate may vary from one output sample to the next. This variation in the vertical input coordinate means that the vertical resampling scalers 4562, 4568, 4578, and 4580 have to traverse a number of input lines in the process of generating each output line.

The number of input lines that are traversed in the vertical resampling scaler 4562, 4568, 4578, and 4580 is a function of the geometric distortion. If the geometric distortion is zero, or a linear function of radius, there will be no variation in the vertical coordinate. If the distortion is large or non-linear, then many input lines may be traversed when generating each output line. It may be noted that, for a given lens, the number of lines that may be traversed is a linear function of the vertical resolution of the sensor. If the vertical resampling scalers 4562, 4568, 4578, and 4580 uses an odd number of filter taps, the input line number that is mapped to the center tap of the filter may be:

center tap line number=floor(ycoordinate+0.5)

In FIG. 197, a plot shows the vertical line buffer span for the luminance component. An ordinate represents the span in numbers of lines and the ordinate represents the vertical line number of the frame. In the plot of FIG. 197, the variation in the vertical position of the center tap of the luminance vertical scalers 4562 and 4564 is shown for a particular distortion example—the distortion shown in FIG. 131 with an HD video sensor (1920×1080). In this example, at the extreme top and bottom of the frame (the top and bottom lines), the position of the center tap varies by 11 lines. If the vertical luminance scalers 4562 and 4568 use five taps, the line buffers may contain 16 input lines to generate the output lines.

FIG. 198 illustrates a plot illustrating the vertical span for the chrominance component when generating a YUV 4:2:0 output frame. An ordinate represents the span in numbers of lines and the ordinate represents the vertical line number of the frame. The plot of FIG. 198 represents the variation in the vertical position of the center tap of the chrominance vertical filters 4578 and 4580 for the same particular example—the distortion shown in FIG. 131 with an HD video sensor (1920×1080). As in the plot of FIG. 197, the plot of FIG. 198 shows that, at the extreme top and bottom of the frame (the top and bottom lines), the position of the center tap varies by 11 lines. If the vertical chrominance filters 4578 and 4580 use five taps, the line buffers may contain 16 input lines to generate the output lines.

Returning briefly to FIG. 195, to provide flexibility for different modes of operation, the line buffers 4554 and 4570 may have three configurations:

1. Twelve line buffers of 4096 pixels per line (12×4096). This configuration may be particularly useful for providing a small amount of distortion correction for full resolution still images.
2. Twenty-four line buffers of 2048 pixels per line (24×2048). This configuration may be particularly useful for high-resolution video applications. This mode may also be useful for processing full resolution images with relatively large amounts of geometric distortion, in which case each image frame may be processed as a number of "stripes" or "tiles." A generalized discussion of processing with such vertical stripes is discussed above with reference to FIG. 22 and tiles FIG. 222.
3. Forty-eight line buffers of 1024 pixels per line (48×1024). This configuration may be particularly useful for low-resolution (VGA) sensors combined with lenses that exhibit large amounts of geometric distortion. This mode may also be used for processing high-resolution still images or HD video images with large amounts of geometric distortion, in which case each image frame may be processed as a number of "stripes" or "tiles."

In one example, FIG. 220 illustrates the use of the configurable line buffers 4554, 4570 in correcting for geometric distortion. In the example of FIG. 220, an uncorrected image frame 4612 (or partial image frame in the form of a tile or strip) is shown. The line buffers 4554, 4570 may hold a subset 4614 of the lines to avoid constantly retrieving lines from memory throughout the scaling process. As discussed above, the line buffers 4554, 4570 may be configurable and may hold, for example, 48 lines. A curve 4616 indicates coordinates within the uncorrected image frame that, when resampled to a corresponding output line 4617 in an output image frame, would be corrected for geometric distortion. Thus, the barrel shifters 4558, 4560, 4574, 4576 may provide a further subset 4618 of the lines 4614 held by the line buffers 4554, 4570 at each output pixel, to the various scalers 4562, 4564, 4566, 4568, 4578, 4580, 4582, 4584. This may allow the scalers 4562, 4564, 4566, 4568, 4578, 4580, 4582, 4584 enough lines to sample from the uncorrected image frame 4612 to develop the output line 4617 that will be at least partially corrected of geometric distortion.

FIG. 199 is a block diagram of one example of the configurable line buffers 4554 or 4570. Initially, input image data 4650 may enter pack and replicate logic 4652. The output of the pack and replicate logic 4652, along with line buffer write enable signals 4654, line buffer address signals 4656, and line buffer read enable signals may be provided to twelve 520×80 single-port RAMs 4660, 4662, 4664, 4666, 4668, 4670, 4672, 4674, 4676, 4678, 4680, and 4682. The respective read outputs of each of these single-port RAMs may couple to a shifter-multiplexer 4684, 4686, 4688, 4690, 4692, 4694, 4696, 4698, 4700, 4702, 4704, and 4706. Each RAM and shifter combination may be configured as a single 4096×10 buffer, two 2048×10 buffers or four 1028×10 buffers. Thus, the output may be linebuffers Linebuf0-Linebuf47. To maintain throughput, each RAM 4660, 4662, 4664, 4666, 4668, 4670, 4672, 4674, 4676, 4678, 4680, and 4682 may have four write enable ports—one per 20-bit word—and input samples may be written in pairs. Pairs of 10-bit input samples may be registered into a 20-bit field, and this field may be replicated four times to provide the correct input format for the RAMs 4660, 4662, 4664, 4666, 4668, 4670, 4672, 4674, 4676, 4678, 4680, and 4682. This format, in combination with the four write enables may allow samples to be written to the appropriate fields in the RAM data words.

Although the line buffer module 4554 or 4570 may be capable of delivering 12, 24 or 48 vertically adjacent samples, a maximum of two sets of five may be employed (e.g., one set of five per output channel). To conserve power, the requirements of each output channel may be analyzed and only the minimum number of RAMs 4660, 4662, 4664, 4666, 4668, 4670, 4672, 4674, 4676, 4678, 4680, and 4682 may actually be read.

Figure 200:
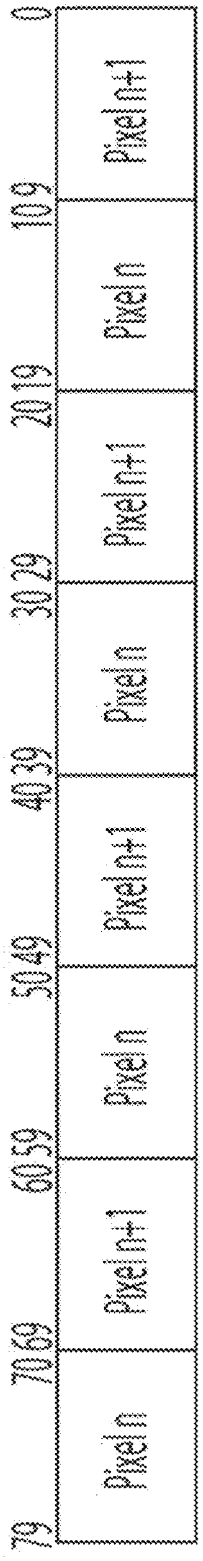
Figure 201:
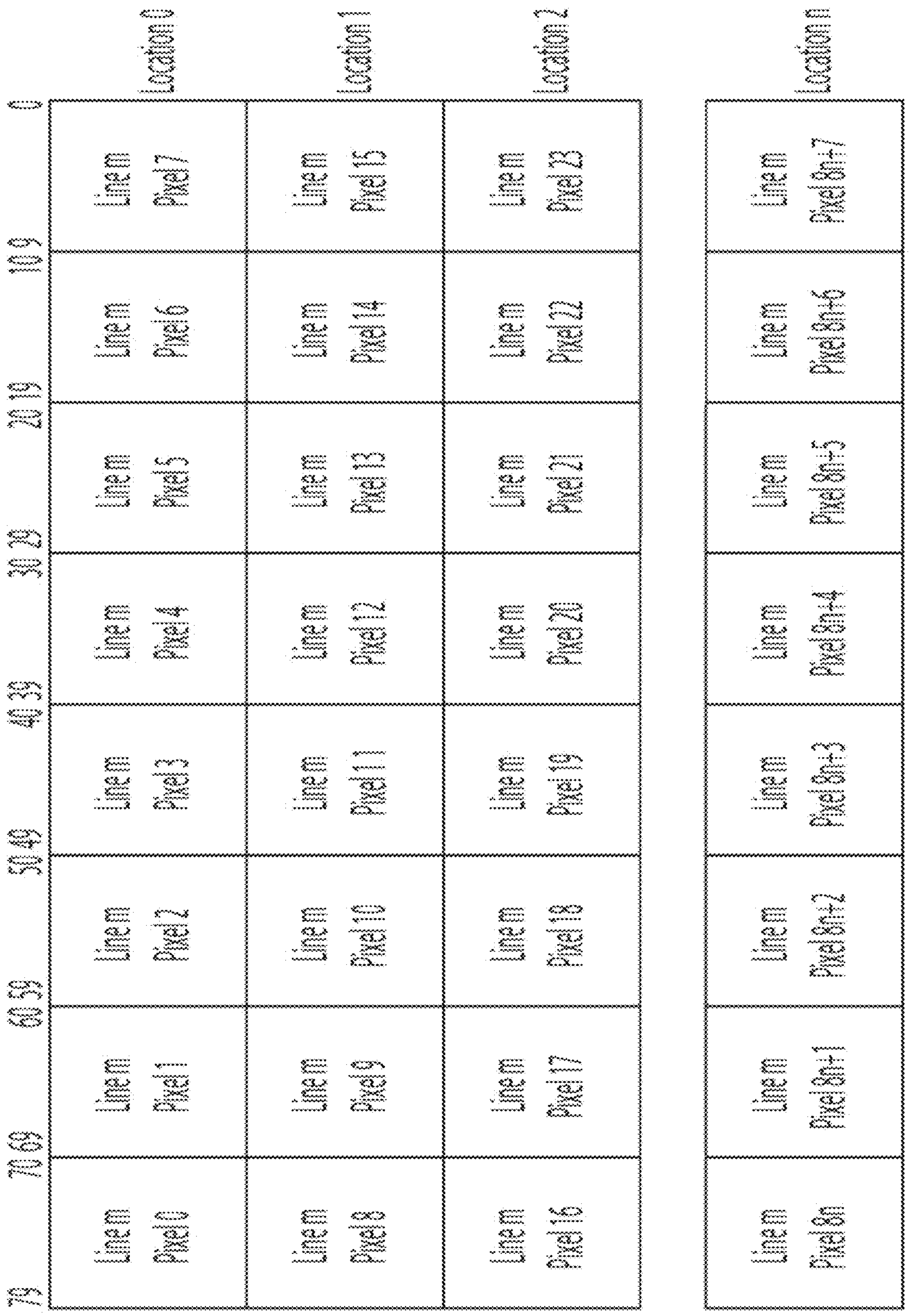
Figure 202:
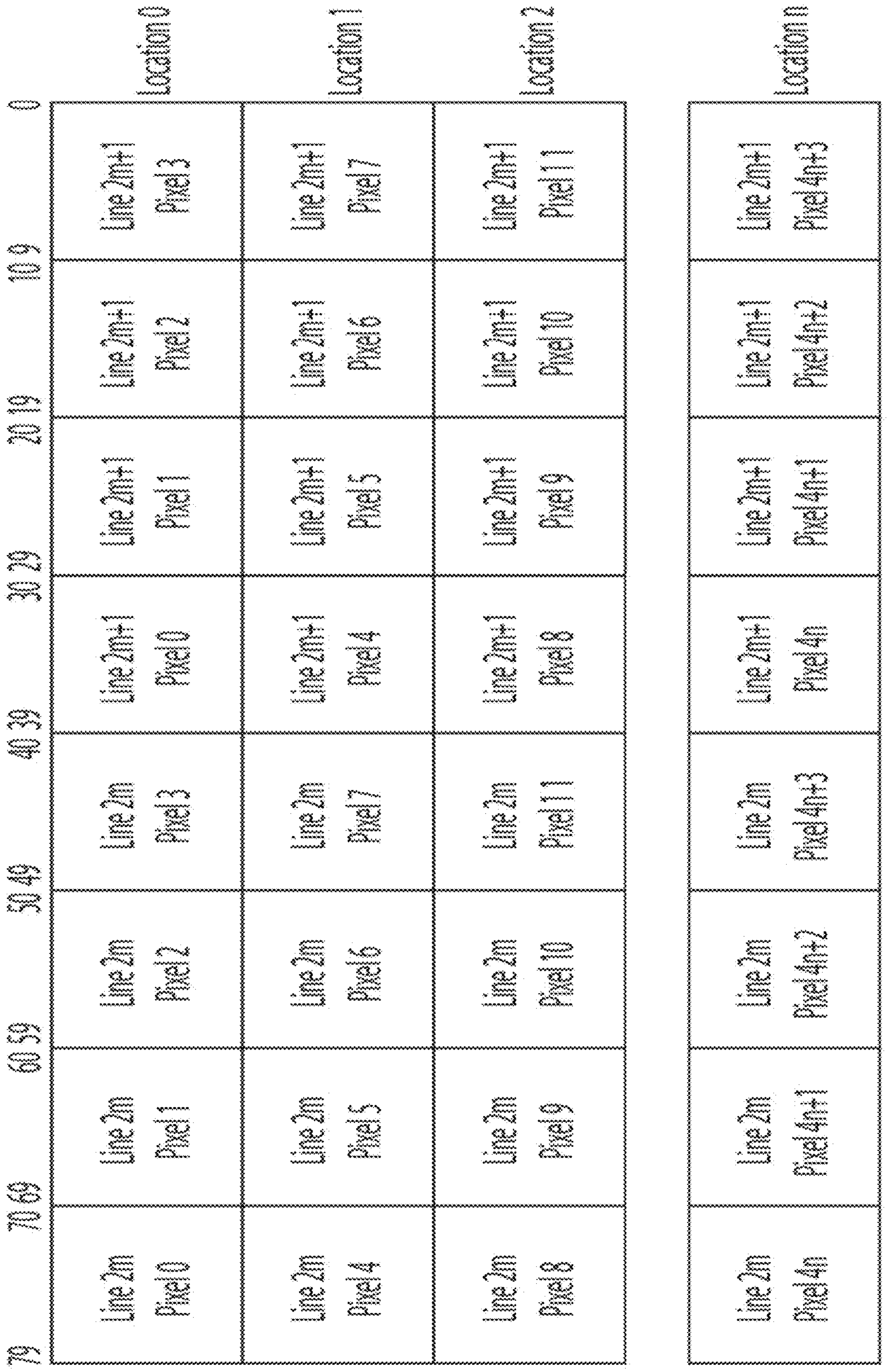
Figure 203:
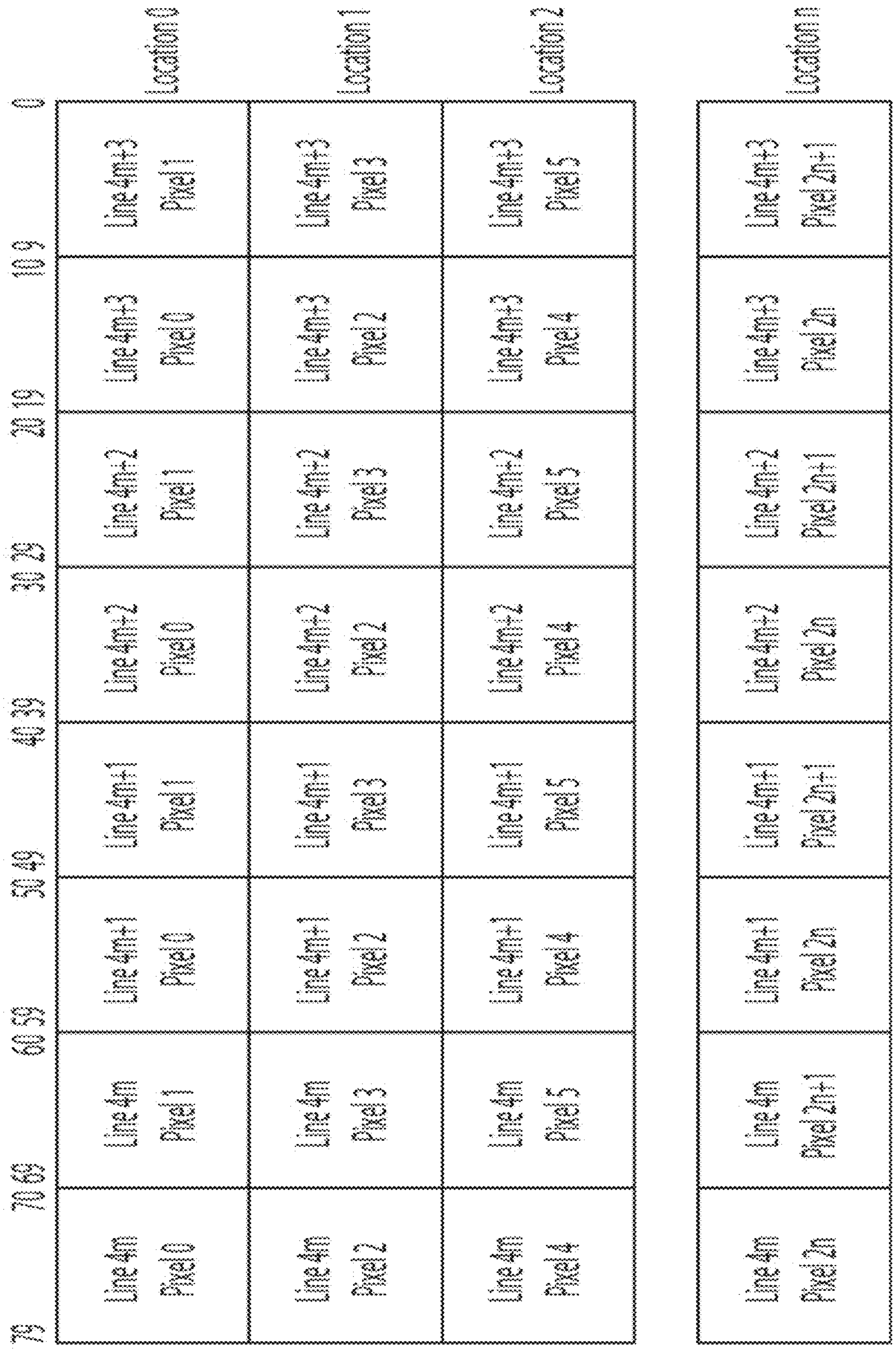

The format of the input data to the RAMs 4660, 4662, 4664, 4666, 4668, 4670, 4672, 4674, 4676, 4678, 4680, and 4682 appear in FIG. 200. It should be noted that only one of the four 20-bit fields for each pixel is written to the RAM on each write transfer. The output data format may vary depending on which configuration the line buffers 4554 and/or 4570 are operating in. In the 1×4096×10 configuration, each 80-bit RAM word contains eight 10-bit samples, as shown in FIG. 201. In this mode, each memory read yields 8 pixels from the corresponding line. By contrast, in the 2×2048×10 configuration, each 80-bit RAM word contains four 10-bit samples from two adjacent lines, as shown in FIG. 202. In this mode, each memory read yields four pixels from each of the two lines. Finally, in the 4×1024×10 configuration, each 80-bit RAM word contains two 10-bit samples from four adjacent lines, as shown in FIG. 203. In this mode, each read yields two pixels from each of the four lines.

To maintain maximum throughput to the output channels, the shifter-multiplexers 4684, 4686, 4688, 4690, 4692, 4694, 4696, 4698, 4700, 4702, 4704, and 4706 may contain a preload buffer. FIG. 204 provides one example of one of the output shifter-multiplexers 4684, 4686, 4688, 4690, 4692, 4694, 4696, 4698, 4700, 4702, 4704, and 4706. As seen in FIG. 204, a shifter-multiplexer may include control logic 4720 that may receive a shifter load signal and a shifter shift signal that signify when to load and shift the shifter of FIG. 204. The control logic 4720 may output a shiftin_empty signal and a shiftout_empty signal that signify there is no data to shift in or no data to shift out. The control logic 4720 may control a multiplexer 4722 to select new data or data output by a buffer 4724. The control logic 4720 may also control a multiplexer 4726 to select new data, the data output by the buffer 4724, or data output by a buffer 4728.

The shifter-multiplexer of FIG. 204 may operate as follows. When the line buffers 4554 and/or 4570 are configured as 4 line buffers per RAM, all outputs are valid and the shifter of FIG. 204 may be loaded every two cycles. When the line buffers 4554 and/or 4570 are configured as two buffers per RAM, outputs dout0 and dout2 are valid and the shifter of FIG. 204 may be re-loaded every four cycles. Finally, when the line buffers 4554 and/or 4570 are configured as one line per RAM, only dout0 is valid and the shifter of FIG. 204 may be reloaded every eight cycles.

Considering the line buffer controllers 4556 and/or 4572, it should be noted that the line buffers 4554 and/or 4570 contain a horizontal strip of the input frame, with the height of the strip being 12, 24 or 48 lines. The line buffer controllers 4456 and/or 4572 may cause lines to be written sequentially to the line buffers 4554 and/or 4570. For example, the lines of the input frame may be numbered 0 to (inHeight−1), the line buffers may be numbered 0 to buffers−1, where the value "buffers" is 12, 24, or 48 (depending on configuration), and the input line n will be written to the corresponding line buffer depending on these parameters.

As the output frame generation proceeds, when older lines are no longer required, newer lines may overwrite them. Moreover, after each line is written to the appropriate line buffer, a "write pointer" (WritePtr) may be updated with the line number of the line. This defines the "maximum" line number in the buffers. As each vertical scaler 4562, 4564, 4578, and/or 4580 completes an output line, a "minline" value may be updated with the line number of the oldest line used for generating the line. Since there are two vertical resampling scalers per color component—4562 and 4564 for luma and 4578 and 4580 for chroma—there may be two minline values per line buffer (e.g., 4554 and 4570) (Ch0_mem_minline and Ch1_mem_minline). The older of these two values (ReadPtr=min(Ch0_mem_minline, Ch1_mem_minline)) defines the oldest line number still in use. Any lines in the line buffers older than ReadPtr can be overwritten.

It may not be possible to predict when a line buffer will be freed up and overwrite it immediately (e.g., using write-after-read interlock). As a result, a line buffer may go unused for an output line period. This is a result of the difficulty in predicting the range of Y coordinates when performing geometric distortion correction. In the case where one of the output channels is performing up-scaling, there may be relatively long periods (up to several output line periods) when no new lines may be written to the line buffers. Consequently, it may be possible to stall the input data for relatively long periods.

An example of line buffer controller write control logic appears in FIG. 205. In the example of FIG. 205, a data signal (DIn), a data ready signal (DIn_rdy) to indicate that data is ready to be received, and a data request (DIn_req) signal to request data when it is ready may be received by pack and replicate logic 4740, which may be under the control of line buffer fullness logic 4742. The "Line Buffer Fullness" logic 4742 may determine whether the appropriate line buffer is available to write the next input line (as described above) based on a read pointer signal (ReadPtr), a write pointer signal (WritePtr), and a buffer count signal (BufCnt). If there is space, 10-bit input samples are packed into 20-bit fields in the pack and replicate logic 4740. This 20-bit field may be replicated to an 80-bit field, as shown in FIG. 200.

When there are two samples, the RAMWrite signal may initiate a RAM write operation. Specifically, the RAMWrite signal output by the pack and replicate logic 4740 may serve as an enable signal to horizontal count logic 4744, which may increment receiving an "end of line" signal from a comparator 4746. The comparator 4746 may obtain the end of line signal by comparing the output of the horizontal count logic 4744 to an input width (InWidth) signal. Line counting logic 4748 may also receive the RAMWrite signal as an increment input, as may buffer mod count logic 4750. Write enable logic 4752 may provide a write address to a multiplexer 4754, which may select the output of the write address, rather than the read address, based on the RAMWrite signal. Using this configuration, memory writes have priority over memory reads, and a memory write occurs immediately when RAMWrite is asserted.

The line buffer controllers 4556 and/or 4572 may initiate RAM read transfers in response to read requests that are sent to the line buffer controllers 4556 and/or 4572 by one or both of the coordinate generators of the vertical resamplers 4562 and 4564 or 4578 and 4580. In the process of generating the output frame, each coordinate generator of the vertical resamplers 4562 and 4564 or 4578 and 4580 will produce "output_height" lines worth of memory read requests (or "output_height/2" for chrominance if output is 4:2:0 format), and each line may be of either "in_width/8", "in_width/4" or "in_width/2" memory read requests, depending on the line buffer 4554 and/or 4570 configuration.

The vertical luminance scaler 4562, 4564 may perform vertical scaling and geometric distortion correction for a luminance frame. Each luminance frame is written sequentially to the line buffers 4554. The line buffers 4554 may be capable of storing a horizontal "strip" of the input frame or a "tile" as discussed above. The dimensions of the strip or tile are dependent on the configuration of the YCC scaler 4012. For an input frame width of 1028 samples or less, the strip may be 48 lines of "inWidth" samples. For frame widths of greater than 1028 but less than or equal to 2048 samples, the strip size may be 24 lines by "inWidth" samples. Finally, for frame widths of greater than 2048 but less than or equal to 4096 samples, the strip size may be 12 lines of "inWidth" samples. The height of this horizontal strip or tile determines the maximum amount of geometric distortion that can be corrected.

The vertical luminance scalers 4562, 4564, 4578, and/or 4580 access the lines stored in the line buffers 4554 and/or 4570 and generate vertically scaled luminance frames that have vertical geometric distortion corrected. The vertical luminance scaler generates an output frame whose dimensions are "outHeight" lines of "inWidth" samples—that is, the output height will be scaled and the width will remain the same, since only the vertical dimension is being corrected and/or scaled. The output frame may be generated in any suitable order, such as raster order: left to right, top to bottom. At each sample position in each output line, a vertical luminance scaler 4562, 4564, 4578, or 4580 will access the line buffers 4554 or 4570 to retrieve a group of vertically adjacent samples (between one and five, depending on the number of vertical filter taps) that are centered on the "ypointer" value produced by the vertical luminance coordinate generator (CG) 4586, which will be described in greater detail below. A "yphase" value from the coordinate generator 4586 may be used to address a coefficient lookup table, which may provide the appropriate coefficients to resample the pixels to achieve the corrected vertical pixel value. These coefficients cause the filter to sample the pixels such that fractional values can be interpolated when the "yphase" value is nonzero. The samples received from the frame buffer then may be multiplied by the corresponding coefficients and the results summed to produce the filter output, which may represent the output pixel corrected for geometric distortion.

The line buffer modules 4554 and/or 4570 may be capable of delivering one group of vertically adjacent samples per clock cycle, with potentially no gaps between lines. Consequently, the vertical scalers 4562 and/or 4564 may be able to process the incoming luminance frame at a rate of one set of input samples per clock, even across input line boundaries. However, because the vertical scalers 4562 and/or 4564 also may be capable of up-scaling, and because there are two output channels (e.g., one for 4562 and one for 4564), there are several reasons it may not be possible to maintain this throughput:

1. In certain circumstances, the luminance horizontal coordinate generator (discussed in greater detail below with reference to FIG. 212) of the luminance horizontal scaler 4566 and/or 4568 may generate multiple coordinates that are outside the active area at both sides of the frame. In this case, the start and/or end samples may be held in the luminance horizontal scaler 4566 and/or 4568 to provide the replication of the edge samples. This may stall the corresponding vertical scaler 4562 and/or 4564 at the start and/or end of each line.
2. If a horizontal luminance scaler 4566 or 4568 is programmed to scale up, there will be instances where the same set of samples is used to generate more than one output sample, in which case the input pipeline may be stalled, including the corresponding vertical scaler 4562 or 4564.
3. The line buffers 4554 for the luminance scaling logic may not contain the lines that are to be used by the vertical luminance scaler 4562 and/or 4564. This may stall the vertical luminance scaler 4562 and/or 4564.
4. Each vertical luminance scaler may have two output channels (e.g., the output of 4562 and the output of 4564). If both channels are enabled, and one channel is set up in such a way that it generates stalls, these stalls may affect both channels, since they share the same line buffer output data.

The vertical luminance scalers 4562, 4564 may contain two main sub-blocks, referred to as the vertical luminance coordinate generator 4586 and the vertical luminance resampling filter 4588. These sub-blocks are described in greater detail below. First, the vertical luminance coordinate generator 4586 of the vertical luminance scaling logic 4562 and/or 4564 may be considered. One example of the vertical luminance coordinate generator 4586 of the vertical luminance scaling logic 4562 and/or 4564 appears in FIG. 206. The vertical luminance coordinate generator 4586 of FIG. 206 computes the y-coordinate, within the source (input) frame, for every output sample to produce an image generally free of geometric distortion. The vertical luminance coordinate generator may generate one coordinate per clock, after an initial clock latency. Since the vertical luminance scaler 4562, 4564 may be subject to stalls, the vertical luminance coordinate generator 4586 of FIG. 206 may be stalled by de-asserting a "coord_req" input signal, which may be provided to vertical luma source coordinate generator logic 4760.

In general, there are two main sub-blocks of the vertical luminance coordinate generator 4586 of FIG. 206: the vertical luminance source coordinate generator logic 4760, and vertical luminance displacement computation logic 4762. The vertical luminance source coordinate generator logic 4760 may compute the y coordinate on the input (source) for every output sample. The vertical luminance source coordinate generator logic 4760 may include a Y digital differential analyzer (DDA) and X and Y counters. Thus, the vertical luminance source coordinate generator logic 4760 may receive an initial Y DDA signal, a Y DDA step signal, an "InWidth" signal, an "OutHeight" signal, and a Start signal in addition to the "coord_req" signal (which may signal when coordinates are requested or required). The vertical luminance source coordinate generator logic 4760 may output the y coordinate on the source frame to the vertical luminance displacement computation logic 4762, as well as an indication of when the y coordinate represents the end of a line (ycoord_eol) or the end of the frame (ycoord_eof). One example operation of the coordinate generator logic 4760 appears in the pseudo code below:

```
// Block Primary Inputs
int YDDAInit;     // Initial value for the YDDA (at the start of the
                  frame). May be 16.16 fp 2s comp int YDDAStep;
                  // Step in YDDA value for each output line. May be
                  5.16 fp
int InWidth;      // Input width. May be 13-bits and may be a multiple
                  of 2.
int OutHeight;    // Output height. May be 13-bits and may be a multiple
                  of 2.
// Block Primary Outputs
int SourceX;      // X coordinate on source for current Vert Rescaler
                  output sample 13-bit int
SourceY;          // Y coordinate on source for current output sample.
                  May be 16.16, 2s comp
int ycoord_eol;   // last y coordinate of the line
int ycoord_eof;   // last y coordinate of the frame
// Internal Variables
int vcount;       // Vertical counter. Counts output lines. May be 13-bit.
int YDDA;         // Y DDA value – input y coordinate for current output
                  sample.
```

-continued

```
// Pseudo-code
YDDA = YDDAInit;
for(vcount = 0; vcount < OutHeight; vcount++)
    {
    for(SourceX = 0; SourceX < InWidth; SourceX++)
    {
    SourceY = YDDA;
    }
    YDDA += YDDAStep;
    }
ycoord__eol = (SourceX == InWIdth−1);
ycoord__eof = (vcount == OutHeight−1) & ycoord__eol;
```

The vertical luminance displacement computation logic 4762 may compute the vertical luminance displacement (distortion) for each output sample. Thus, the vertical luminance displacement computation logic 4762 may receive the coordinates from the vertical luminance source coordinate generator logic 4760, an indication of the optical center (OptCenterX and OptCenterY), prescale values (PrescaleX and PrescaleY), and an indication of radial scale (RadScale). The vertical luminance source displacement computation logic 4762 may compute a Y displacement value YDispl in the manner described further below. This Y displacement value may be added (block 4764) to the source Y coordinate, which may be rounded (block 4766) to obtain a Y pointer signal (y_pointer) and a Y phase (y_phase) signal.

In essence, the vertical luminance displacement computation logic 4762 takes the SourceX and SourceY coordinates produced by the vertical luminance coordinate generator 4760, computes the radius, uses the radius to address a lookup table, retrieves the radial displacement from the lookup table and uses it to compute the Luminance vertical (Y) displacement. An example of the vertical luminance displacement computation logic 4762 appears in FIG. 207.

As seen in FIG. 207, the vertical luminance displacement computation logic 4762 may include radius calculation logic 4770 and displacement calculation logic 4772, which uses a radius and 1/radius value calculated by the radius calculation logic 4770. The difference between the source X coordinate and the optical center X coordinate may be obtained (block 4780). The output may be passed to arithmetic shift left (ASL) logic 4782, which may scale the value using the RadScale signal. This value (x) may be multiplied (block 4784) with a prescale value (PrescaleX) and then squared (block 4786) to produce an $x^2$ value. Likewise, the difference between the source Y coordinate and the optical center Y coordinate may be obtained (block 4788). The output may be passed to arithmetic shift left (ASL) logic 4790, which may scale the value using the RadScale signal. This value (y) may be multiplied (block 4792) to a prescale value (PrescaleY) and squared (block 4794) to produce a $y^2$ value. The $x^2$ and $y^2$ values may be added (block 4796) to produce an $r^2$ signal that may be multiplied (block 4798) by a 1/r signal obtained by 1/sqrt logic 4800.

The most significant bits (e.g., the upper 8 bits) of the r signal may index a lookup table (LUT) 4802, which may provide the two nearest displacement values to interpolation logic 4804. It should be appreciated that the LUT 4802 may be a lookup table that is programmed based on the lens used to generate the image data currently being processed. Thus, software may program the LUT 4802 with different values when the image data derives from different cameras. In some embodiments, geometric distortion from third-party cameras may be corrected by programming the LUT 4802 with values sufficient to correct geometric distortion from such third-party cameras and/or lenses (and/or camera and lens combinations). The exact values used in the LUT 4802 may be simulated and/or experimentally obtained by comparing uncorrected images from the imaging device(s) 30 and/or third-party cameras and lenses and determining an amount of horizontal and vertical shifting that may at least partially correct for the effect of geometric distortion.

The interpolation logic 4804 may interpolate the values from the LUT 4802 linearly based on the least significant bits (e.g., the lower 4 bits) of the r signal to produce a radial displacement value. Similarly, by multiplying the 1/r signal to y (block 4806), a Cos signal may be obtained that can be multiplied (block 4808) with the radial displacement value to obtain the vertical luma displacement value. The following pseudo-code may describe one example of the operation of the vertical luminance displacement computation logic 4762:

```
// Block Primary Inputs
int SourceX;            // Source X coordinate. May be 13-bit
int SourceY;            // Source Y coordinate. May be 16.16 fp 2's comp
int OptCenterX;         // X coordinate of the optical center of the Luminance input. May be
                        13-bit
int OptCenterY;         // Y coordinate of the optical center of the Luminance input. May be 13-bit
int RadScale;           // X and Y coordinates are scaled by 2^RadScale before being
// used to compute radius. Maintains constant precision at
// output of radius computation for varying sensor sizes. May be 2-bit.
int XPrescale;          // Compensates for any prior horizontal downscaling of the frame
// either in the RAW Scaler or by sensor binning. May be 3-bit. Scale factor may be (XPrescale+1)/8
int YPrescale;          // Compensates for any prior vertical downscaling of the frame
// either in the RAW Scaler or by sensor binning. May be 3-bit. Scale factor may be (YPrescale+1)/8
int GDCLut[256];        // Geometric Distortion correction LUTs. Entries may be 8.8 2's
complement
// Block Primary Outputs
int Luma YDispl;        // Y Displacement. 6.8 fp 2's compl
// Internal Variables
int radX;           // X coordinate relative to optical center. 16.16 fp 2's comp
int radY;           // Y coordinate relative to optical center. 16.16 fp 2's comp
int sclX;           // X coordinate scaled prior to radius computation. 19.16 fp 2's comp
int sclY;// Y coordinate scaled prior to radius computation. 19.16 fp 2's comp
int prsclX;         // X coordinate multipled by XPrescale. 19.16 fp 2's comp
int prsclY;         // Y coordinate mutiplied by YPrescale. 19.16 fp 2's comp
int radsq;          // square of the radius
int radrecip;       // reciprocal of the radius 1.21 fp
int rad;            // radius. 13.3 fp
```

-continued

```
int cos;                // cosine of the angle between the line from the optical center to the sample
// and the vertical (Y axis)
int displ;              // radial displacement. 8.8 fp 2's comp
// Pseudo-code
radX = XCount - OptCenterX;
radY = SourceY - (OptCenterY << 16);
sclX = radX * (2^RadScale);
sclY = radY * (2^RadScale);
prsclX = sclX * (XPrescale+1)/8;
prsclY = sclY * (YPrescale+1)/8;
radsq = (prsclX^2) + (prsclY^2);
radrecip = 1/sqrt(radsq);
rad = radsq * radrecip;
cos = sclY * radrecip;
lut__index = rad[14:7];         // integer bits [11:4]
lut__frac = rad[6:3];           // least significant 4 integer bits
displ = ((16-lut__frac)*GDCLut[lut__index] + lut__frac*GDCLut[lut__index+1] + 8) >> 4;
YDispl = cos * displ;
```

Reviewing again the vertical luminance coordinate generator 4586 of FIG. 206, the vertical displacement output by the vertical luma displacement computation logic 4762 may be added to the Source Y coordinate (block 4764) to yield the coordinate corrected for geometric distortion. This corrected coordinate may be rounded (block 4766) to, for example, the nearest 1/8 sample spacing, or any other suitable filter phase resolution, and the ypointer and yphase values may be extracted. One example of performing this procedure is described in the following pseudo code:

```
// Pseudo-code
int SourceY;            // Source Y coordinate. 16.16 tc
int vert__luma__displ;  // Vertical luma displacement 8.8
int yvtaps;             // vertical filter taps (actual number is yvtaps+1)
int ypointer;           // Output y pointer.14-bit 2's complement
int yphase;             // Phase of the sample to be generated
int SourceYCorr;        // Source Y coordinate with geometric distortion
                        applied
SourceYCorr = SourceY + (vert__luma__displ << 8;
// SourceYCorr has 16 fractional bits. Need to round to 1/8
SourceYCorr += 0x1000;
SourceYCorr >>= 13;
// Least significant 3 bits are phase
yphase = SourceYCorr & 0x7;
// if number of taps is odd, round so coordinate points to center tap of
filter
if(!(yvtaps&0x1))
    ypointer = SourceYCorr + 0x4;
ypointer >>=3;
//limit ypointer to 14-bits tc
if(ypointer > 8191)
    ypointer = 8191;
if(ypointer < -8192)
    ypointer = -8192;
ypointer = ypointer & 0x3fff;
```

The vertical luminance scaler 4562 or 4564 will then generate an output frame (to the horizontal luminance scaler logic 4566 or 4568) of dimensions “inWidth x outHeight”. For each output line generated, the vertical luminance generation logic of FIG. 206 may generate “inWidth” y coordinates. Each y coordinate represents the fractional vertical position within the input frame for that output sample. The horizontal coordinate within the input frame is the same as the horizontal coordinate within the output frame. The vertical resampling filter component of the vertical luminance scaler 4562 or 4564 then uses the y-coordinate values to perform at least the two following functions:

1. Determine parameters to transfer to the line buffer controller 4556 which are used to initiate a line buffer read transaction.
2. Compute values to control the shifter-multiplexers 4684, 4686, 4688, 4690, 4692, 4694, 4696, 4698, 4700, 4702, 4704, and/or 4706, thereby selecting one of the 12, 24 or 48 line buffer outputs for each of the five filter taps.

Depending on the configuration of the luminance line buffers 4554, a single read transaction will deliver either 2, 4, or 8 adjacent samples from each enabled one of the line buffers 4554. These adjacent samples start on a 2, 4, or 8 sample boundary. As a result, each line buffer read transaction may deliver samples corresponding to 2, 4, or 8 y-coordinates. Because of variation in the y-coordinate between adjacent output samples, all the y-coordinates corresponding to a line buffer read may be analyzed to generate the parameters for the frame buffer read. For this reason, the shifter-multiplexer control values and the phase of the filter may be stored in a queue for use when the data arrives from the line buffers 4554.

The parameters used by the line buffer read controller component of the line buffer controller 4556 may include, for example:

1. The maximum line number used by the block of 2, 4 or 8 output samples. This is used to determine whether the required lines are in the line buffer.
2. The minimum line number used by the block of 2, 4 or 8 output samples. This is used by the line buffer controller to determine when a line can be “retired” from the line buffer, making space for a new input line.
3. The memory address of the block of 2, 4 or 8 input samples. This is used by the line buffer read controller of the line buffer controller when synchronizing multiple resampling filters.
4. Read enable mask. Reduces power by reading only the line buffers associated with the current block of 2, 4 or 8 output samples.
5. End of frame.

FIG. 208 illustrates the vertical luminance resampling filter 4588 of the vertical luminance scaler 4562, 4564. As discussed above, the vertical luminance resampling filter 4588 filters the pixels around the displacement coordinates determined by the vertical luminance coordinate generator 4586 of FIG. 206.

In the example of FIG. 208, the vertical luminance resampling filter 4588 includes several multiplexers 4820 that receive image data from the line buffers. The multiplexers may be controlled by a first-in-first-out (FIFO) buffer 4822 (e.g., a 16×30 FIFO) supplied with multiplexer control signals by control and memory read request generator logic 4824. The control and memory read request generator logic 4824 may receive the signals ypointer, yphase, ycoord_eol, and ycoord_eof from the vertical luminance coordinate generator 4586 of FIG. 206. Using these variables, the control and memory read request generator logic 4824 may also send phase values (e.g., phfifo_push and phfifo_idata) to a FIFO buffer 4826 (e.g., a 16×3 FIFO). The FIFO buffer 4826 may pass the phase information to the coefficient RAM 4828, which may vary the coefficients provided to the filter accordingly. When flow control logic 4830 receives a signal requesting data from the vertical luminance resampling filter 4588 of FIG. 208, the flow control logic 4830 may cause the data to progress through the buffers of the vertical luminance resampling filter 4588 of FIG. 208.

As pixel data arrives at various filter taps represented by buffers 4832, the pixel data may be multiplied by the filter coefficient values from the coefficient RAM 4828 at blocks 4834. These values may be summed together and rounded at add and round logic 4836 before being output to a buffer 4838. The data from the buffer 4838 may be passed to clip and saturate logic 4840 before being provided to an output buffer 4842. The output buffer 4842 may output the sampled vertical pixel coordinate upon command by the flow control logic 4830. Although the example of FIG. 208 illustrates a 9-tap filter, filters of other sizes may be employed. For instance, the filter may be a 4-tap filter, a 5-tap filter, a 6-tap filter, a 7-tap filter, an 8-tap filter, a 10-tap filter, an 11-tap filter, or higher. In essence, the vertical luminance resampling filter 4588 may filter the pixels based on the y_pointer and y_phase signals—where the y_pointer signal may indicate the One example of the generation of the multiplexer control and memory read parameters by the control and memory read request generator logic 4824 of the vertical luminance resampling filter 4588 of FIG. 208, when the filter employs 5 taps, may be described in the following pseudo code:

```
#define limit(a,b) = a<0?0:a>=b?b-1:a
// Block Primary Inputs
int ypointer;            // Pointer to input line corresponding to center tap
int yvtaps;              // Number of vertical filter taps. Value is yvtaps+1. Max 4
int ycoord_eol;          // Last Y coordinate of the line
int ycoord_eof;          // last Y coordinate of the frame
int lbmode;              // Line buffer mode: 0 - 48 x 1040, 1 - 24 x 2080, 2 - 12 x 4160
int inheight;            // input frame height
int inwidth;             // input/output line width
// Block Primary Outputs
int men_maxline;         // maximum source line number required for current block 14-bit
int mem_minline;         // minimum souorce line number required for previous line 14-bit
int mem_xaddr;           // Line buffer address for current block. 10-bit
int mem_rde;             // read enable mask. 12-bit
int mem_eof;             // Transfer is last of frame
// Local variables
int lblines;             // number of lines in the line buffer
int blockwidth;          // width of each line buffer block read
int transfers;           // total number of read transfers per line
int lastwidth;           // width of last transfer
int blockcount;          // count of transfers within the line
int coordcount;          // count of y coordinates within a block
int blocksize;           // width of current block
int line[5];             // line number corresponding to each filter tap
int limline[5];          // line number limited to active image area (replicates top and bottom lines)
int modline[5];          // line number modulo number of line buffers. Gives line buffer number for
                         // the line
int maxblockline;        // maximum line number within the block
int maxblockmodline;     // modline corresponding to maxblockline
int minblockmodline;     // modline corresponding to minblockline
int mintap;    // tap using minimum line number
int maxtap;    // tap using maximum line number
int minline;   // minimum line number from start of line to current position
// Pseudo code
// determine tap numbers corresponding to min and max line numbers switch(yvtaps)
{
case 0: mintap = 2; maxtap = 2; break;
case 1: mintap = 2; maxtap = 1; break;
case 2: mintap = 3; maxtap = 1; break;
case 3: mintap = 3; maxtap = 0; break;
default: mintap = 4; maxtap = 0;
}
// determine block width and memory read transfers per line
switch(lbmode)
{
case 0: blockwidth = 2; transfers = (inwidth+1)>>1; lblines = 48; break;
case 1: blockwidth = 4; transfers = (inwidth+3)>>2; lblines = 24, break;
default: blockwidth = 8; transfers = (inwidth+7)>>3; lblines = 12;
}
// determine block width for last transfer of line
if(inwidth%blockwidth == 0)
    lastwidth = blockwidth;
else
    lastwidth = inwidth%blockwidth;
// determine parameters for each sample/transfer
for (blockcount == 0; blockcount < transfers; blockcount++)
{
if(blockcount == transfers−1)          // last block
```

-continued

```
      blocksize = lastwidth;
else                                    // normal block
      blocksize = blockwidth;
for(coordcount == 0; coordcount < blocksize; coordcount++)
      {
      // get ypointer value
      line[0] = ypointer + 2;
      line[1] = ypointer + 1;
      line[2] = ypointer;
      line[3] = ypointer − 1;
      line[4] = ypointer − 2;
      // limit lines to within active frame
      limline[0] = limit(line[0], inheight);
      limline[1] = limit(line[1], inheight);
      limline[2] = limit(line[2], inheight);
      limline[3] = limit(line[3], inheight);
      limline[4] = limit(line[4], inheight);
      // get line buffer number holding the line
      modline[0] = limline[0]%lblines << lbmode;
      modline[1] = limline[1]%lblines << lbmode;
      modline[2] = limline[2]%lblines << lbmode;
      modline[3] = limline[3]%lblines << lbmode;
      modline[4] = limline[4]%lblines << lbmode;
      // At this point modeline[0] to modline[4] are concatenated and written to the queue
      // controlling the input multiplexers
      // determine mimimum line number used so far
      if((blockcount == 0) && (coordcount == 0))          // jam first minimum value of line
                 minline = limline[mintap];
      else if(limline[mintap] < minline)    // compare to previous minimum value
      minline = linline[mintap];
      // now determine current minimum and maximum lines used and the corresponding buffers
      if(coordcount == 0)             // first coordinate = jam min/max
      {
      minblockmodline = modline[mintap];
      maxblockline = limline[maxtap];
      maxblockmodline = modline[maxtap];
      }
      else                            // compare to previous min/max
      {
      if(limline[mintap] < minblockline)
      {
      minblockmodline = modline[mintap];
      }
      if(limline[maxtap] > maxblockline)
      {
      maxblockline = limline[maxtap];
      maxblockmodline = modline[maxtap];
      }
      }
      }
      // determine read enable mask
      if(lbmode == 0)           // four line per physical RAM
      {
      minblockmodline >>= 2;
      maxblockmodline >>= 2;
      }
      else if(lbmode == 1)            // two lines per physical RAM
      {
      minblockmodline >>= 1;
      maxblockmodline >>= 1;
      }
      if(minblockmodline <= maxblockmodline)
      mem_rde = (0xfff << minblockmodline) & (0xfff >> (11−maxblockmodline));
      else
      mem_rde = (0xfff << minblockmodline) | (0xfff >> (11−maxblockmodline));
      mem_rde &= 0xfff;
      mem_maxline = maxblockline;
      mem_minline = minblockline;
      mem_xaddr = blockcount;
      mem_eof = ycoord_eof;
      if(ycoord_eol)   mem_minline = minline;
      }
```

The vertical chrominance scalers 4578, 4580 may operate in substantially the same way as the vertical luminance scalers 4562, 4564, with very few exceptions. The principal differences are:

1. The horizontal resolution of the chrominance input is half the resolution of the luminance. Since there are two interleaved chrominance components (Cb/Cr), the number of samples per chrominance line is the same as the number of samples per luminance line. Pairs of Cb/Cr components have the same x and y coordinates.

2. When the YCC 4:2:0 output mode is selected, the output of the vertical chrominance scaler will have half the number of lines of the luminance output scaler.

Since the vertical chrominance scalers 4578, 4580 may operate in substantially the same way as the vertical luminance scalers 4562, 4564, the vertical chrominance scaler 4578, 4580 is not discussed further.

Recalling again FIG. 195, the vertically corrected image data from the vertical luminance scalers 4562, 4564 next may continue to the horizontal luminance scalers 4566, 4568. The frame arrives as a stream of pixels and may be in raster order: left to right, top to bottom. In some embodiments, under certain circumstances, there may be no gap between lines. Consequently, the horizontal luminance scalers 4566, 4568 may be able to process the incoming luminance frame at a rate of one input sample per clock, even across input line boundaries. However, because the scalers 4566, 4568 may be capable of up-scaling and because there are two output channels, there are several reasons why it may be impossible to maintain a throughput of one input sample per clock, which are generally the same as those discussed above with reference to the vertical luminance scalers 4562, 4564.

Like the vertical luminance scalers 4562, 4564, the horizontal luminance scalers 4566, 4568 each contain two main sub-blocks, a horizontal luminance coordinate generator 4590 and a horizontal luminance resampling filter 4592. The horizontal luminance coordinate generator 4590 generally may operate in the same manner as the vertical luminance coordinate generator 4586 of FIG. 206, except that an X (horizontal) digital differential analyzer (DDA) may also be used in addition to a Y (vertical) DDA to generate the source X and source Y coordinates in the input frame. One example of pseudo code that may be used to generate the X and Y coordinates appears as follows:

```
// Block Primary Inputs
int XDDAInit;     // Initial value for the XDDA (at the start of the frame)
                  16.16 fp 2's comp
int XDDAStep;     // Step in XDDA value for each output sample. 16.16
                  fp
int YDDAInit;     // Initial value for the YDDA (at the start of the frame)
                  16.16 fp 2's comp
int YDDAStep;     // Step in YDDA value for each output line. 16.16 fp
int OutWidth;     // Output width. 13-bits. Must be a multiple of 2.
int OutHeight;    // Output height. 13-bits. Must be a multiple of 2.
int Start;        // Start pulse, when detected, triggers the generation
                  cordinates for one frame
int xcoord_req;   // When cleared, the operation of the coordinagte
                  generator is halted.
                  // Coordinate generation continues when this signal
                  set.
// Block Primary Outputs
int SourceX;      // X coordinate on source for current output sample 16.16
                  fp 2's comp
```

-continued

```
int SourceY;      // Y coordinate on source for current output sample 16.16
                  fp 2's comp
// Internal Variables
int vcount;       // Vertical counter. Counts output lines. 13-bit
int hcount;       // Horizontal counter. Counts output samples. 13-bit
int XDDA;         // X DDA value - input x coordinate for current
                  output sample.
int YDDA;         // Y DDA value - input y coordinate for current
                  output sample.
// Pseudo-code
YDDA = YDDAInit;
for(YCount = 0; YCount < OutHeight; YCount++)
{
XDDA = XDDAInit;
for(hcount = 0; hcount < OutWidth; hcount++)
{
SourceX = XDDA;
SourceY = YDDA;
XDDA += XDDAStep;
}
YDDA += YDDAStep;
}
```

Having obtained the SourceX and SourceY coordinates, the horizontal luma coordinate generator of the horizontal luminance scalers 4566, 4568 next may determine the horizontal (X) displacement value. In general, the horizontal luma coordinate generator of the horizontal luminance scalers 4566, 4568 may determine the X displacement in substantially the same way the vertical luminance scalers 4562, 4564 may determine the Y displacement, except that the direction will be horizontal (X) rather than vertical (Y). That is, the horizontal luma coordinate generator of the horizontal luminance scalers 4566, 4568 may compute the radius, use the radius to address a lookup table, retrieve the radial displacement from the lookup table, and use the displacement value to compute the horizontal (X) displacement. Thus, the horizontal luma coordinate generator of the horizontal luminance scalers 4566, 4568 may obtain the displacement generally in the manner of the vertical luminance displacement logic of FIG. 207, except that the x value from the optical center rather than the y value may be multiplied by the 1/r signal. One example of pseudo code that may describe this operation appears below:

```
// Block Primary Inputs
int SourceX;      // Source X coordinate 16.16 fp 2's comp
int SourceY;      // Source Y coordinate 16.16 fp 2's comp
int OptCenterX;   // X coordinate of the optical center of the source 13-bit
int OptCenterY;   // Y coordinate of the optical center of the source 13-bit
int RadScale;     // X and Y coordinates are scaled by 2^RadScale before being
                  // used to compute radius. Maintains constant precision at
                  // output of radius computation for varying sensor sizes. 2-bit
int XPrescale;    // Compensates for any prior horizontal downscaling of the frame
                  // either in the RAW Scaler or by sensor binning. 5-bit. Scale
                  // factor is (XPrescale+1)/8
```

-continued

```
int YPrescale;          // Compensates for any prior vertical downscaling of the frame
                        // either in the RAW Scaler or by sensor binning. 5-bit. Scale
                        // factor is (YPrescale+1)/8
int GDCLut[256];        // Chromatic Aberration correction LUT. Entries are 8.8 2's complement
// Block Primary Outputs
int Horiz Luma Displ; // Horizontal Luma Displacement. 8.8 fp 2's compl
// Internal Variables
int radX;               // X coordinate relative to optical center. 16.16 fp 2's comp
int radY;               // Y coordinate relative to optical center. 16.16 fp 2's comp
int sclX;               // X coordinate scaled prior to radius computation. 19.16 fp 2's comp
int sclY;               // Y coordinate scaled prior to radius computation. 19.16 fp 2's comp
int prsclX;             // X coordinate multipled by XPrescale. 19.16 fp 2's comp
int prsclY;             // Y coordinate mutiplied by YPrescale. 19.16 fp 2's comp
int radsq;              // square of the radius
int radrecip;           // reciprocal of the radius 1.21 fp
int rad;                // radius. 13.3 fp
int sin;                // sine of the angle between the line from the optical center to the sample
                        // and the vertical (Y axis)
int displ;              // radial displacement. 6.8 fp 2's comp
// Pseudo-code
radX = SourceX − (OptCenterX << 16);
radY = SourceY − (OptCenterY << 16);
sclX = radX * (2^RadScale);
sclY = radY * (2^RadScale);
prsclX = sclX * (XPrescale+1)/8;
prsclY = sclY * (YPrescale+1)/8;
radsq = (prsclX^2) + (prsclY^2);
radrecip = 1/sqrt(radsq);
rad = radsq * radrecip;
sin = sclX * radrecip;
lut_index = rad[14:7];        // integer bits [11:4]
lut_frac = rad[6:3];          // least significant 4 integer bits
displ = ((16-lut_frac)*GDCLut[lut_index] + lut_frac*GDCLut[lut_index+1] + 8) >> 4;
LumaXDispl = sin * displ;
```

The horizontal displacement may be added to the Source X coordinate to yield the coordinate corrected for geometric distortion. This corrected coordinate may be rounded to the resolution of the filter phase (e.g., the nearest 1/8 sample spacing, in one embodiment) and the xpointer and xphase values may be extracted. One example of this procedure is described in the following pseudo code:

```
// Pseudo-code
int SourceX;            // Source X coordinate. 16.16 tc
int horiz_luma_displ;   // Horizontal luma displacement 8.8
int xpointer;           // Output x pointe.14-bit 2's complement
int xphase;             // Phase of the sample to be generated
int SourceXCorr;        // Source X coordinate with geometric distortion
                        applied
SourceXCorr = SourceX + (horiz_luma_displ << 8;
// SourceXCorr has 16 fractional bits. Need to round to ⅛
SourceXCorr += 0x1000;
SourceXCorr >>= 13;
// Least significant 3 bits are phase
xphase = SourceXCorr & 0x7;
// round so coordinate points to center tap of filter
xpointer = SourceXCorr + 0x4;
xpointer >>=3;
//limit xpointer to 14-bits tc
if(xpointer > 0x1fff)
xpointer = 0x1fff;
if(xpointer < −8192)
xpointer = −8192;
xpointer = xpointer & 0x3fff;
```

For each input line to the horizontal luminance scalers 4566, 4568, a total of "inWidth" number of samples, the horizontal luminance coordinate generator 4590 logic will generate a total of "outWidth" number of X coordinates, one per output sample. These coordinates define the position of the output sample relative to the input samples, where the position of the input sample is implicit in their numbering (0−inWidth−1). The coordinate generator produces two output values, "xpointer" and "xphase". The xpointer defines the input sample corresponding to the center tap of the 9-tap filter, while xphase defines the position of the output sample relative to the center tap. Put simply, xpointer defines the nine samples which are used in the filter by specifying the center tap, and xphase defines the weighting of the samples (by selecting filter coefficients). It is possible for xpointer to indicate a sample off the left side of the frame (xpointer <0) or off the right side of the frame (xpointer >inWidth−1) and in these cases, the edge samples must be replicated as required to provide valid samples to the horizontal luminance resampling filter logic.

FIG. 209 represents an example of the horizontal luminance resampling logic. As seen in FIG. 209, input buffers 5020 may receive input data dIn. Control logic 5022 may send an enable signal to the input buffers 5020 based on an indication that the data is ready (din_rdy), the location within the line, and current and next xpointer signals. A counter 5024 may count the location within the line and a comparator may compare the count to the (inWidth−1) value to determine when an end of line has been reached. The control logic 5022 may also control the gating of the next xpointer signal into a buffer 5028 and the next xphase signal into a buffer 5030.

Coefficient RAM 5032 receives the xphase signal, which may be used to determine the sampling coefficients to sample the proper fractional amount of each pixel around the displaced coordinates, so as to correct for geometric distortion in the scaled version of the image after resampling. The xpointer signal may enter decode logic 5034, which may generate a signal to control a context extension multiplexer 5036. Based on the signal from the decode logic 5034, the context extension multiplexer 5036 may select the data to certain taps, which may be combined with the appropriate sampling filter coefficients (blocks 5038). The outputs of the blocks 5038 may be summed and rounded in block 5040 before entering a first output buffer 5042, clip and saturate logic 5044, and a second output buffer 5046.

Essentially, the vertically scaled/corrected frame from the vertical luminance scaler 4562, 4564 may be input to the horizontal luminance scaler 4566, 4568 in raster order: left to right, top to bottom, with potentially no gaps between samples or lines. These samples are fed into a 9-stage delay (buffers 5020) and the output of each delay stage may provide one of the taps to the filter. If the input data is not ready for some reason—for example, if the other channel has stalled—the signal din_rdy may not be assserted. If the resampler of FIG. 209 does not require new data (for example when upscaling) the signal din_req is not asserted. A new input is shifted into the pipeline (blocks 5020) when both din_rdy and din_req are asserted. When a new sample is shifted into the pipeline, the counter 5024 is incremented. This counter 5024 normally indicates the input sample number (0−inWidth−1) of the sample at the delay 4 position of the buffer 5020 pipeline (the center tap). The counter 5024 may initially be set to −5 at the start of the frame, indicating that there are no valid samples in the buffer 5020 pipeline. The counter 5024 wraps at the end of each input line—in other words, the counter 5024 will go from inWidth−1 to 0. An example operation of the counter 5024 may be described by the following pseudo code:

```
// Pseudo-code for shifting into pipeline
if(start)
{
counter = −5;
}
else if(din_rdy & din_req)
{
if(counter == inWidth−1)
counter = 0;
else
counter = counter + 1;
}
else
```

-continued

```
counter = counter;
if(din_rdy & din_req)
{
delay8 = delay7;
delay7 = delay6;
delay6 = delay5;
delay5 = delay4;
delay4 = delay3;
delay3 = delay2;
delay2 = delay1;
delay1 = delay0;
delay0 = din;
}
else
{
delay8 = delay8;
delay7 = delay7;
delay6 = delay6;
delay5 = delay5;
delay4 = delay4;
delay3 = delay3;
delay2 = delay2;
delay1 = delay1;
delay0 = delay0;
}
```

When the counter 5024 wraps around to 0, indicating the start of a new line, it occurs synchronously with the horizontal coordinate generator logic of the horizontal scaler 4566, 4568 producing the first xpointer value for the new line. All samples with xpointer <=0 will be generated while sample 0 is at the center position. Similarly, at the end of the line, all output samples with xpointer >inWidth−1 are generated while sample inWidth−1 is at the center tap position.

At the left side of the frame, sample replication will be necessary if xpointer <4, and at the right side of the frame, replication will be necessary if xpointer >inWidth−5. If xpointer <0, replication is performed assuming that sample 0 is at the delay 4 (center tap) position, and if xpointer >inWidth−1, sample replication is performed assuming that sample inWidth−1 is at the delay 4 (center tap) position. The mapping between delay elements and filter taps is defined in Table 5:

TABLE 6

Sample Replication at Edges of Luminance Frame

| xpointer value | Tap Number 0 | 1 | 2 | 3 | 4 | 5 | 6 | 7 | 8 |
|---|---|---|---|---|---|---|---|---|---|
| <=−4 | Delay 4 | Delay 4 | Delay 4 | Delay 4 | Delay 4 | Delay 4 | Delay 4 | Delay 4 | Delay 4 |
| −3 | Delay 3 | Delay 4 | Delay 4 | Delay 4 | Delay 4 | Delay 4 | Delay 4 | Delay 4 | Delay 4 |
| −2 | Delay 2 | Delay 3 | Delay 4 | Delay 4 | Delay 4 | Delay 4 | Delay 4 | Delay 4 | Delay 4 |
| −1 | Delay 1 | Delay 2 | Delay 3 | Delay 4 | Delay 4 | Delay 4 | Delay 4 | Delay 4 | Delay 4 |
| 0 | Delay 0 | Delay 1 | Delay 2 | Delay 3 | Delay 4 | Delay 4 | Delay 4 | Delay 4 | Delay 4 |
| 1 | Delay 0 | Delay 1 | Delay 2 | Delay 3 | Delay 4 | Delay 5 | Delay 5 | Delay 5 | Delay 5 |
| 2 | Delay 0 | Delay 1 | Delay 2 | Delay 3 | Delay 4 | Delay 5 | Delay 6 | Delay 6 | Delay 6 |
| 3 | Delay 0 | Delay 1 | Delay 2 | Delay 3 | Delay 4 | Delay 5 | Delay 6 | Delay 7 | Delay 7 |
| 3 < xpointer < iW − 4 | Delay 0 | Delay 1 | Delay 2 | Delay 3 | Delay 4 | Delay 5 | Delay 6 | Delay 7 | Delay 8 |
| iW − 4 | Delay 1 | Delay 1 | Delay 2 | Delay 3 | Delay 4 | Delay 5 | Delay 6 | Delay 7 | Delay 8 |
| iW − 3 | Delay 2 | Delay 2 | Delay 2 | Delay 3 | Delay 4 | Delay 5 | Delay 6 | Delay 7 | Delay 8 |
| iW − 2 | Delay 3 | Delay 3 | Delay 3 | Delay 3 | Delay 4 | Delay 5 | Delay 6 | Delay 7 | Delay 8 |
| iW − 1 | Delay 4 | Delay 4 | Delay 4 | Delay 4 | Delay 4 | Delay 5 | Delay 6 | Delay 7 | Delay 8 |
| iW | Delay 4 | Delay 4 | Delay 4 | Delay 4 | Delay 4 | Delay 4 | Delay 5 | Delay 6 | Delay 7 |
| iW + 1 | Delay 4 | Delay 4 | Delay 4 | Delay 4 | Delay 4 | Delay 4 | Delay 4 | Delay 5 | Delay 6 |
| iW + 2 | Delay 4 | Delay 4 | Delay 4 | Delay 4 | Delay 4 | Delay 4 | Delay 4 | Delay 4 | Delay 5 |
| >=iW + 3 | Delay 4 | Delay 4 | Delay 4 | Delay 4 | Delay 4 | Delay 4 | Delay 4 | Delay 4 | Delay 4 |

The filter taps output by the context extension multiplexer 5036 may contain the samples indicated by the value of xpointer as defined below:

```
taps_rdy =              (counter == xpointer) |                  // when xpointer is in active line
((xpointer < 0)         & (counter == 0))    |                   // xpointer < 0
((xpointer > inWidth−1) & (counter == inWidth−1));               // xpointer > inWidth−1
```

A sample will be available at the filter output two clock cycles after the taps have been ready, which may be indicated by dout_rdy being asserted. The horizontal luminance scalers 4566, 4568 indicates that it is ready to accept new input data (on Din) by asserting din_rdy as follows:

```
if(counter < 0)                                       // Start of Frame
din_req = 1;
else if(xpointer <= 0)                                // Off left of frame
din_req = xpointern > 0;
else if((xpointer > 0) & (xpointer < inWIdth−1)       // active line
din_req = (counter < xpointer) |
((counter == xpointer) & (xpointern > xpointer));
else                                                  // Off right of line and
                                                      EOL
din_req = xpointern < xpointer;
pipe_enable = din_rdy & din_req;
```

The horizontal chrominance scaling module is very similar to the horizontal luminance scalers 4566, 4568. The differences may be as follows:

1. The input to the horizontal chrominance scaler 4582, 4584 is interleaved Cb and Cr samples. Pairs of Cb/Cr samples are cosited and are cosited with the even luminance samples.
2. If one of the output channels is in 4:2:0 format, there will be half as many chrominance lines as luminance lines output by the channel.

The coordinate generation logic of the horizontal chrominance scaling logic 4582, 4584 may operate in substantially the same way as the coordinate generation logic of the horizontal luminance scalers 4566, 4568, with slight modifications to accommodate the differences discussed above. Namely, the corrected x-coordinate determined by comparing the displacement and the SourceX coordinate may be divided by 2 (since half as many chrominance samples may be present as luminance samples) to obtain the ultimate distortion-corrected x-coordinate.

Similarly, the horizontal chrominance resampling logic of the horizontal chrominance scaling logic 4582, 4584 may operate in substantially the same way as the horizontal luminance resampling logic of the horizontal luminance scalers 4566, 4568, with a few exceptions. FIG. 210 illustrates an example of the horizontal chrominance resampling logic of the horizontal chrominance scaling logic 4582, 4584. In the example of FIG. 210, elements 5122, 5124, 5126, 5128, 5130, 5132, 5134, 5136, 5138, 5140, 5142, 5144, and 5146 may respectively operate in the same general way as elements 5022, 5024, 5026, 5028, 5030, 5032, 5034, 5036, 5038, 5040, 5042, 5044, and 5046 of FIG. 209. The control logic 5122 may also differ in that it may control two pipelines of buffers rather than just one—buffers 5120 for Cb chrominance data and buffers 5121 for Cr chrominance data. Data from the two pipelines of buffers thus may be selected by a cr_select signal to multiplexers 5137.

Essentially, for each input line to the horizontal chrominance scaler 4582, 4584, consisting of "inWidth" samples (inWidth/2 Cb/Cr pairs), the horizontal chrominance coordinate generator component will generate "outWidth/2" X coordinates, one per Cb/Cr pair of output samples. These coordinates define the position of the (geometric-distortion-corrected) output sample relative to the (non-geometric-distortion-corrected, in the horizontal coordinate) input samples, where the position of the input sample is implicit in their numbering (0−inWidth/2−1). The horizontal chrominance coordinate generator produces two output values, "xpointer" and "xphase". The xpointer defines the input sample corresponding to the center tap of the 9-tap filter, while xphase defines the position of the output sample relative to the center tap. Put simply, xpointer defines the nine samples that are used in the filter by specifying the center tap, and xphase defines the weighting of the samples (by selecting filter coefficients).

It is possible for xpointer to indicate a sample off the left side of the frame (xpointer <0) or off the right side of the frame (xpointer >inWidth/2−1) and in these cases, the edge samples must be replicated as required to provide valid samples to the filter. The vertically scaled/corrected frame from the vertical chrominance scaler 4578, 4580 may be input to the horizontal chrominance scaler 4582, 4584 in raster order: left to right, top to bottom with potentially no gaps between samples or lines. These samples are fed into two 9-stage delays (buffers 5120 and 5121) and the output of each delay stage may provide one of the taps to the filter. If the input data is not ready for some reason (e.g., the other channel has stalled), din_rdy may not be assserted. If the horizontal chrominance resampler does not require new data—for example, when upscaling—the signal din_req is not asserted. A new input is shifted into either the Cb or Cr pipeline (depending on the state of Counter[0]) when both din_rdy and din_req are asserted. When a new sample is shifted into the pipeline, the counter 5124 is incremented. This counter 5124 normally indicates the input sample number (0−inWidth/2−1) of the sample at the delay 4 position of the pipelines (the center tap). The counter 5124 may initially be set to −9 at the start of the frame, indicating that there are no valid samples in either of the buffers 5120 or 5121. The counter 5124 wraps at the end of each input line. In other words, the counter 5124 may go from inWidth/2−1 to 0. The operation of the counter 5124 may be described by the following pseudo code:

```
// Pseudo-code for shifting into pipeline
int counter;          // 14-bit Counts input samples to both Cb and Cr
                      pipelines
                      // The Cb sample at the center tap of the Cb pipe is
                      given by counter[13:1]
                      // The Cr sample at the center tap of the Cr pipe is
                      given by
                      // counter[13:1] −~counter[0]
int pipe_enable;      // enable input pipelines
int cb_pipe_en;       // Cb pipeline enable
int cr_pipe_en;       // Cr pipeline enable
assign pipe_enable = din_req & din_rdy;
assign cb_pipe_en = pipe_enable & !counter[0];
assign cr_pipe_en = pipe_enable & counter[0];
if(start)
{
counter = −9;         // Cb sample 0 will be at center of Cb shifter when
                      counter = 0/1
```

-continued

```
                // Cr sample 0 will be at center of Cr shifter when
                counter = ½
}
else if(pipe_enable)
{
if(counter == inWidth−1)
counter = 0;
else
counter = counter + 1;
}
else
counter = counter;
if(cb_pipe_en)          // Cb input
{
cbdelay8 = cbdelay7;
cbdelay7 = cbdelay6;
cbdelay6 = cbdelay5;
cbdelay5 = cbdelay4;
cbdelay4 = cbdelay3;
cbdelay3 = cbdelay2;
cbdelay2 = cbdelay1;
cbdelay1 = cbdelay0;
cbdelay0 = din;
crdelay8 = crdelay8;
crdelay7 = crdelay7;
crdelay6 = crdelay6;
crdelay5 = crdelay5;
crdelay4 = crdelay4;
crdelay3 = crdelay3;
crdelay2 = crdelay2;
crdelay1 = crdelay1;
crdelay0 = crdelay0;
}
else if(cr_pipe_en)     // Cr input
{
cbdelay8 = cbdelay8;
cbdelay7 = cbdelay7;
cbdelay6 = cbdelay6;
cbdelay5 = cbdelay5;
cbdelay4 = cbdelay4;
cbdelay3 = cbdelay3;
cbdelay2 = cbdelay2;
cbdelay1 = cbdelay1;
cbdelay0 = cbdelay0;
crdelay8 = crdelay7;
crdelay7 = crdelay6;
crdelay6 = crdelay5;
crdelay5 = crdelay4;
crdelay4 = crdelay3;
```

-continued

```
crdelay3 = crdelay2;
crdelay2 = crdelay1;
crdelay1 = crdelay0;
crdelay0 = din;
}
else                    // Hold
{
cbdelay8 = cbdelay8;
cbdelay7 = cbdelay7;
cbdelay6 = cbdelay6;
cbdelay5 = cbdelay5;
cbdelay4 = cbdelay4;
cbdelay3 = cbdelay3;
cbdelay2 = cbdelay2;
cbdelay1 = cbdelay1;
cbdelay0 = cbdelay0;
crdelay8 = crdelay8;
crdelay7 = crdelay7;
crdelay6 = crdelay6;
crdelay5 = crdelay5;
crdelay4 = crdelay4;
crdelay3 = crdelay3;
crdelay2 = crdelay2;
crdelay1 = crdelay1;
crdelay0 = crdelay0;
}
```

When the counter 124 wraps around to 0, indicating the start of a new line, it occurs value for the new line. All samples with xpointer <=0 will be generated while Cb sample 0 and Cr sample 0 are at the center tap position. Similarly, at the end of the line, all output samples with xpointer >inWidth/2−1 are generated while Cb sample inWidth/2−1 and Cr sample inWidth/2−1 are at the center tap position.

At the left side of the frame, sample replication may be performed if xpointer <4, and at the right side of the frame, replication may be performed if xpointer >inWidth/2−5. If xpointer <0, replication is performed assuming that Cb sample 0 and Cr sample 0 are at the delay 4 (center tap) positions, and if xpointer >inWidth/2−1, sample replication is performed assuming that Cb sample inWidth/2−1 and Cr sample inWidth/2−1 are at the delay 4 (center tap) positions. This mapping between delay elements and filter taps is defined in Table 6.

TABLE 7

Sample Replication at Edges of Chrominance Frame

| | Tap Number | | | | | | | | |
|---|---|---|---|---|---|---|---|---|---|
| xpointer value | 0 | 1 | 2 | 3 | 4 | 5 | 6 | 7 | 8 |
| <=−4 | Delay 4 | Delay 4 | Delay 4 | Delay 4 | Delay 4 | Delay 4 | Delay 4 | Delay 4 | Delay 4 |
| −3 | Delay 3 | Delay 4 | Delay 4 | Delay 4 | Delay 4 | Delay 4 | Delay 4 | Delay 4 | Delay 4 |
| −2 | Delay 2 | Delay 3 | Delay 4 | Delay 4 | Delay 4 | Delay 4 | Delay 4 | Delay 4 | Delay 4 |
| −1 | Delay 1 | Delay 2 | Delay 3 | Delay 4 | Delay 4 | Delay 4 | Delay 4 | Delay 4 | Delay 4 |
| 0 | Delay 0 | Delay 1 | Delay 2 | Delay 3 | Delay 4 | Delay 4 | Delay 4 | Delay 4 | Delay 4 |
| 1 | Delay 0 | Delay 1 | Delay 2 | Delay 3 | Delay 4 | Delay 5 | Delay 5 | Delay 5 | Delay 5 |
| 2 | Delay 0 | Delay 1 | Delay 2 | Delay 3 | Delay 4 | Delay 5 | Delay 6 | Delay 6 | Delay 6 |
| 3 | Delay 0 | Delay 1 | Delay 2 | Delay 3 | Delay 4 | Delay 5 | Delay 6 | Delay 7 | Delay 7 |
| 3 < xpointer < iW/2 − 4 | Delay 0 | Delay 1 | Delay 2 | Delay 3 | Delay 4 | Delay 5 | Delay 6 | Delay 7 | Delay 8 |
| iW/2 − 4 | Delay 1 | Delay 1 | Delay 2 | Delay 3 | Delay 4 | Delay 5 | Delay 6 | Delay 7 | Delay 8 |
| iW/2 − 3 | Delay 2 | Delay 2 | Delay 2 | Delay 3 | Delay 4 | Delay 5 | Delay 6 | Delay 7 | Delay 8 |
| iW/2 − 2 | Delay 3 | Delay 3 | Delay 3 | Delay 3 | Delay 4 | Delay 5 | Delay 6 | Delay 7 | Delay 8 |
| iW/2 − 1 | Delay 4 | Delay 4 | Delay 4 | Delay 4 | Delay 4 | Delay 5 | Delay 6 | Delay 7 | Delay 8 |
| iW/2 | Delay 4 | Delay 4 | Delay 4 | Delay 4 | Delay 4 | Delay 4 | Delay 5 | Delay 6 | Delay 7 |
| iW/2 + 1 | Delay 4 | Delay 4 | Delay 4 | Delay 4 | Delay 4 | Delay 4 | Delay 4 | Delay 5 | Delay 6 |
| iW/2 + 2 | Delay 4 | Delay 4 | Delay 4 | Delay 4 | Delay 4 | Delay 4 | Delay 4 | Delay 4 | Delay 5 |
| >=iW/2 + 3 | Delay 4 | Delay 4 | Delay 4 | Delay 4 | Delay 4 | Delay 4 | Delay 4 | Delay 4 | Delay 4 |

The filter taps contain the samples indicated by the value of xpointer as defined below:

```
int cr_sel;          // selects the Cr taps to generate the output. Cr_sel
                     is initially set to
          // 0 and is toggled at the end of every clock cycle when
          taps_rdy is asserted
taps_rdy = (!cr_sel & (counter[13:1] == xpointer)) |
       ( cr_sel & (counter[13:1] == xpointer) & counter[0} | // when
       xpointer is in active line
       (!cr_sel & (xpointer < 0) & (counter == 0)) |
       ( cr_sel & (xpointer < 0) & (counter == 1)) | // xpointer < 0
       (!cr_sel & (xpointer > inWidth/2−1) & (counter[13:1] ==
       inWidth/2−1));
       ( cr_sel & (xpointer > inWidth/2−1) & (counter[13:1] ==
       inWidth/2−1) & counter[0]);
                                   // xpointer > inWdth−1
```

A sample may be available at the filter output two clock cycles after the signal taps_rdy, shown above, is asserted. This is indicated by dout_rdy being asserted. The horizontal luminance scalers 4566, 4568 may indicate that it is ready to accept new input data (on Din) by asserting din_req:

```
if(counter < 0)                          // Start of Frame
din_req = 1;
else if(xpointer <= 0)                   // Off left of frame
din_req = xpointern > 0;
else if((xpointer > 0) & (xpointer < inWIdth/2−1)   // active line
din_req = (counter < {xpointer,1}) |
((counter == {xpointer,1}) & (xpointern > xpointer));
else                                     // Off right of line and EOL
din_req = xpointern < xpointer;
pipe_enable = din_rdy & din_req;
```

The image data output by the YCC scaler 4012 thus may be scaled to one or two desired resolutions, while also correcting for geometric distortion. When the upper-left-hand portion of the input image data generally appears as in FIG. 131 (which has been corrected for chromatic aberration but not geometric distortion), the YCC scaler 4012 may produce an output image with the upper-left-hand image shown in FIG. 228. Comparing FIG. 228 to FIG. 131, the extent of the correction of geometric distortion may be appreciated. This may be especially noticeable at the farthest radii from optical center, here in the upper-left-hand of the image.

A few additional considerations regarding the YCC scaler 4012 may also be considered. First, considering flow control through the YCC scaler 4012, the YCC scaler 4012 may be capable of large amounts of up-scaling. When up-scaling, the YCC scaler 4012 may produce one cycle per clock at the output. This corresponds to much less than one sample per clock data consumption at the input. Thus, consumption may be approximately (1/(hscale*vscale)) samples per clock. Rather than put a huge FIFO—which could be nearly the size of the frame—at the input of the YCC scaler 4012, it may be more sensible to stall the entire YCC processing logic 170, and perform the data flow control in the memory read DMA controller that supplies the YCC processing logic 170.

Regarding the distortion correction lookup tables (LUTs), geometric distortion correction involves computing the radius of a coordinate, using the radius to address a lookup table which provides the displacement, computing the x and y components of the displacement and adding these components to the appropriate coordinates. To facilitate interpolation, each lookup table may employ two 128×16 RAMs (one for odd locations, one for even locations). As discussed above, there may be two output channels (channel 0 and channel 1), each of which may contain luminance and chrominance processing units. Each processing unit may contain both vertical and horizontal coordinate generator logic, for a total of eight coordinate generator logic blocks, each of which may use a copy of the LUT (or at least access to the LUT). There are several ways of implementing this:

i) A single pair of 128×16 RAMs each with one write port and eight read ports. This is probably impractical with real RAMs, but could be constructed using registers.

ii) Eight pairs of 128×16 RAMs—one per coordinate generator.

iii) Some combination of single-write, multiple-read port RAMs. Note that all RAMs may be loaded with identical data.

It should also be appreciated that, in lieu of a lookup table relating to displacement, a polynomial function (e.g., $P_0+P_1x+P_2x^2$, and so forth) of the radius may be used.

Moreover, in some embodiments, separate DDA parameters may be employed for luminance and chrominance. In other embodiments, chrominance parameters for the DDAs may be derived from luminance parameters for most desirable output formats. Finally, in some embodiments, there may be a "single buffer" luminance/chrominance output format. To do so, a large output first-in-first-out (FIFO) buffer may be employed, and/or flow control from an output synchronizer.

To summarize, the YCC scaler 4020 may generally carry out the correction process shown in a flowchart 5250 of FIG. 221. As should be appreciated, the luma scalers 4562, 4564, 4566, and 4568 may operate in a very similar manner to the chroma scalers 4578, 4580, 4582, and 4584. As such, the flowchart 5250 generally describes both luma and chroma channels, even though only luma logic is discussed below. For each output pixel at source coordinates, the coordinate generation logic 4586 of the vertical luma scalers 4562, 4564 may determine a vertical (y) coordinate of the input (uncorrected) frame that, when sampled, would vertically correct for geometric distortion (block 5252). As mentioned above, the coordinate generation logic 4586 may do so using a lookup table of displacement (e.g., the LUT 4802) that varies depending on the radius of the pixel from the optical center. The lookup table may be specific to the lens and sensor that obtained the image data now being processed. The vertical (y) coordinate of the pixel then may be sampled by the resampling filter 4588 of the vertical luma scalers 4562, 4564 (block 5254). Sampling the pixel at the determined vertical (y) coordinate may produce a partially corrected image frame. Namely, the output of the resampling filter 4588 of the vertical luma scalers 4562, 4564 may be a pixel that is vertically geometrically corrected.

This vertically geometrically corrected pixel data may be used by the horizontal luma scaler to obtain vertically and horizontally geometrically corrected pixel data. As above, for each output pixel at source coordinates, the coordinate generation logic 4590 of the horizontal luma scalers 4566, 4568 may determine a horizontal (x) coordinate of the input (partially corrected) frame that, when sampled, would horizontally correct for geometric distortion (block 5256). As mentioned above, the coordinate generation logic 4590 may do so using the lookup table of displacement (e.g., the LUT 4802) that varies depending on the radius of the pixel from the optical center. The lookup table may be the same one used in correcting vertical geometric distortion. The horizontal (x) coordinate of the pixel then may be sampled by the resampling filter 4592 of the horizontal luma scalers 4566, 4568 (block 5258). Sampling the pixel at the determined horizontal (x) coordinate may produce pixels for an image frame substantially fully corrected of geometric distortion.

Chroma Noise Reduction (CNR) Logic

For low light images, additional noise filtering in the chrominance (chroma) channels may be warranted. Namely, chrominance channels (e.g., Cb or Cr) typically have a much lower signal-to-noise ratio (SNR) than the luminance (luma) channel (e.g., Y). The chroma noise reduction (CNR) logic 4024 may provide additional noise filtering for high-noise images or high-noise areas of images that may occur, for example, under low-light conditions. Moreover, while the spatial noise filter (SNF) 1032 in the raw processing logic 150 removes noise in the RAW space, the residual noise after the SNF 1032 may be amplified through subsequent stages such as gamma correction, lens-shading correction, and color correction, such that another noise reduction stage may be very useful to reduce amplified residual noise. Since chrominance noise is more objectionable and problematic, the CNR logic 4024 may remove such noise aggressively. Note also that chrominance channels (especially towards the tail end of ISP) have large grains (i.e., that is, occur at relatively low frequency) and it may be valuable to have large spatial support to filter out noise with large grain sizes.

Before continuing further, it should be noted that the CNR logic 4024 may process image data before and/or after the YCC scaler 4016, as generally represented by FIGS. 211-213. In the example of FIG. 211, the CNR logic 4024 acts on a first resolution of image data output by the YCC scaler 4016. In the example of FIG. 212, the CNR logic 4024 acts on a second resolution of image data output by the YCC scaler 4016. In the example of FIG. 213, the CNR logic 4024 acts on the image data before it is processed by the YCC scaler 4016, and thus the noise-reduction effects of the CNR logic 4016 may propagate through to both resolutions output by the YCC scaler 4016.

Since the occurrence of noise near the output of the YCC processing logic 170 may depend in large part on whether the image is a low-light image (or a low-light area of an image), the CNR logic 4024 may vary the amount of chroma noise reduction based on the luminance. As seen in a simplified block diagram of the CNR logic 4024 of FIG. 214, the luminance channel (Y) may be subsampled (block 5160) and provided to luminance-guided chroma filter logic 5162. The luminance-guided chroma filter logic 5162 may receive the chrominance channels (Cb and Cr) in either 4:2:2 or 4:2:0 formats to be filtered based on the amount of corresponding pixel luminance. The luminance of the pixels output by the CNR logic 4024 will be unchanged, but the chrominance of the pixels output by the CNR logic 4024 may have substantially reduced noise. The luminance (Y) may be sub-sampled such that the resolution of the luminance matches that of the chrominance signals (Cb and Cr) as follows:

```
If format == 420 Y(x,y) = Y_fullres (2*x, 2*y);
else        // 422 format
Y(x,y) = Y_fullres (2*x,y);
```

The luminance-guided chrominance filtering logic 4162 may be applied to the chrominance channels while using the luminance (Y) to guide the filtering process. Since the filtering is applied to the image with half the spatial resolution (both in horizontal and vertical direction), the effective kernel size is twice the actual size. For example, an 11Hx9V kernel size for filtering at 4:2:0 resolution is equivalent to filtering with a 21Hx17V kernel in full resolution. Note that a large filter support is especially valuable in the CNR logic 4024 since the image has already gone through many filtering stages throughout the ISP pipe processing logic 80, such that the noise has significant spatial correlation and low frequency energy. Operating in 4:2:0 enables large effective support without the large hardware cost. In general, the luminance-guided chroma filter logic 5162 may employ a filter such as that described by the equations below:

$$Cb_{out}(x, y) = \frac{\sum_{i,j} h(i, j) g_{Cb}(\Delta_y, \Delta_{Cb}, \Delta_{Cr}, s(x, y)) Cb_{in}(x-i, y-j)}{\sum_{i,j} h(i, j) g_{Cb}(\Delta_y, \Delta_{Cb}, \Delta_{Cr}, s(x, y))}$$

$$g_{Cb}(\Delta_y, \Delta_{Cb}, \Delta_{Cr}, s(x, y)) = \text{box}\left(\frac{\lambda_y \text{abs}(\Delta_y) + \lambda_{Cb}\text{abs}(\Delta_{Cb}) + \lambda_{Cr}\text{abs}(\Delta_{cr})}{s(x, y)}\right)$$

$$s(x, y) = k(Y(x, y), Cb(x, y))$$

In these equations, h(i,j) represents the filter kernel coefficients, ΔY and ΔCb are the intensity differences between the center pixel (x,y) and the neighboring pixels (x−i, y−j), s(x,y) is a function of the noise standard deviation and gCb( ) is the photo-similarity function which reduces the filter kernel when the pixel differences are high. The function "box(a)" is a function whose value is 1 if $0<a<1$ and zero otherwise, and λY, λCb, and λCr are the weights that control whether the luminance (Y) drives the filter-tap computation or the chrominance (Cb and Cr) drives the filter-tap computation. A higher value of λY than λCb or λCr means the luminance-guidance component of the CNR logic 4024 is stronger than the self-guidance component. Note that s(x,y) is modeled as a function, k( ), of the luminance Y and the chrominance (Cb/Cr). Function k depends on the pixel values of the luminance and the chrominance to be filtered and is implemented with a 2D LUT followed by a 2D interpolation.

It may be desirable to have even larger filter support than may be provided by 11×9 filter at 4:2:0, since the image at the end of the ISP pipe processing logic 80 may high spatial correlation for noise. The noise may be visible as large grains in the image, and may be challenging to remove. To remove such spatially correlated low-frequency noise, the effective filter support may be increased using a sparse filter. As used herein, the term "sparse filter" refers to a filter with many zeros as filter coefficients, which allows the pixels that would be multiplied by the zero coefficients instead not to be sampled at all. The effect of the zero coefficients of the sparse filter is to allow some pixels of a kernel of pixels not to be evaluated at all, thereby allowing the sparse filter to obtain greater spatial support while using the same number of filter taps as would be used were the filter not sparse.

A general representation of forming a sparse filter from a non-sparse filter is shown in FIGS. 215 and 215. In FIG. 215, a 3×3 filter is shown. The 3×3 filter of FIG. 215 may be made into a sparse filter as shown in FIG. 216 by inserting "X"—that is, a point that is not sampled—between the kernel samples. This may enlarge the effective support. In essence, a sparse filter such as shown in FIG. 216 may be equivalent to having zeros in the filter tap, while no computational cost is spent for evaluating these pixels. In this manner, increasing the horizontal support for an 11Hx9V filter (having 99 taps) used in the luminance-guided chroma filter 5162 by a factor of two would effectively turn the 11×9 filter into a 21×9 filter (which would otherwise normally involve 357 taps).

As such, the luminance-guided chroma filter 5162 may employ such a sparse filter. Indeed, the luminance-guided chroma filter 5162 may employ a programmable sparse filter that may have a variable sparseness factor. For example, the sparseness factor may take values of 1, 2, 3, and 4 in the horizontal direction. For the vertical direction, the range of allowable sparseness factor may vary with the image resolution. For smaller resolutions, the line buffers may be reconfigured to give large vertical support. For example, in the manner discussed above, the line buffers may be configured for full size (max width of 4096), half size (max width of 2048), or quarter size (max width of 1024). Half size may be suitable for HD video at 1920×1080 resolution, where the maximal sparseness factor may be 2 in vertical direction. Quarter size may be suitable for SD/VGA video, where the maximal sparseness factor may be 4 in vertical direction. These various configurations of the line buffers are available because of "line buffer folding," in which line buffers may be used for more horizontal but less vertical support, or more vertical but less horizontal support. Thus, the vertical direction of the sparseness of the sparse filter may depend on the width of the line buffers. In one embodiment, the wider the line, the greater the vertical sparseness may be employed.

The amount of chroma noise reduction applied may vary depending on the luminance. The likelihood that noise may be present in the image may depend on the amount of luminance since, as noted above, low-light images may be more likely to have noise. Thus, the CNR logic 4024 may obtain a noise threshold that depends on the amount luminance and is based on the noise standard-deviation that is expected given the luminance of the pixel. A flowchart of FIGS. 217 and 218 generally illustrates one manner in which the luminance-guided chroma noise reduction logic 5162 may operate. The flowchart of FIGS. 217 and 218 may be understood to apply to either or both the Cb and Cr channels for noise reduction. Thus, the luminance-guided chroma noise reduction logic 5162 may perform the process described in FIGS. 217 and 218 twice—once for Cb and once for Cr.

The flowchart of FIGS. 217 and 218 may begin when a noise threshold is obtained based on the subsampled luminance (block 5170). One manner of doing so may involve using a lookup table of noise standard deviation values, as will be discussed further below with reference to FIG. 219. The luminance-guided chroma noise reduction logic 5162 subsequently may test the first of the various pixels of a relatively large filter kernel (e.g., an 11Hx9V filter kernel, which may be made sparse by a factor of 1, 2, 3, 4, or more) (block 5172). That is, the luminance-guided chroma noise reduction logic 5162 may compute the difference between the components of the input pixel and the components of the tested pixel of the filter (e.g., ΔY, ΔCb, and/or ΔCr) (block 5174). The luminance-guided chroma noise reduction logic 5162 may scale these values (block 5174). In one embodiment, these values may be scaled by multiplication by certain coefficients (e.g., λY, λCb, and λCr). In other embodiments, the scaling factors may be only multiples of two (e.g., 1/16, 1/8, 1/4, 1/2, 1, 2, 4, 8, and so forth), thereby simplifying the operation of the hardware. Specifically, in one embodiment, the hardware of the CNR logic 4024 may implement the scaling coefficients using bit-shifts rather than more complex multiplication. In addition, software controlling the ISP pipe processing logic 80 to select whether or not a component channel plays a role in the chroma noise reduction filtering process using a component channel enable signal. For instance, when a Cb enable signal is set to 0, the value ΔCb may not be considered.

The resulting scaled values of ΔY, ΔCb, and ΔCr may be summed (e.g., ΔTot) (block 5178). To simplify the operation of the CNR logic 4024, in one embodiment, the filter coefficients may be non-programmable or may be only programmable or non-programmable values of 0 or 1. Thus, if the filter coefficient value is 0 for the pixel currently being tested against the center input pixel, the value ΔTot may be ignored. Otherwise, the value ΔTot may be used to filter chroma noise. In other embodiments, the CNR logic 4024 may employ fractional coefficients. When the value ΔTot is less than the noise threshold obtained at block 5170 and the filter coefficient (e.g., for the pixel of the filter currently being tested against the center pixel) is set to 1 (decision block 5180), the process may flow to decision block 5186. Otherwise, the Δvalue of the chroma channel being tested (e.g., ΔCb) may be added to the numerator and a value of I may be added to the denominator of a stored value (block 5184). The value of the numerator over the denominator will be used further below.

As long as another pixel of the filter remains to be tested against the center pixel (decision block 5186), the process of the flowchart of FIGS. 217 and 218 may continue (block 5188) as the next pixel of the filter is tested. It should be appreciated that, although this is described as an iterative process in the flowchart of FIGS. 217 and 218, this process may be carried out in parallel by the CNR logic 4024. When all pixels of the filter have been tested against the center pixel (decision block 5186), the value of the denominator may be considered. (decision block 5190 of FIG. 218). Specifically, if the denominator is above a minimum count value, it may be likely that the variations in the pixel are due to noise, and so the output of the chroma channel currently processed by the CNR logic 4024 may be set equal to the original chroma channel value plus the numerator over the denominator to reduce the noise (block 5192). Specifically, since the value of the denominator corresponds to the number of tested pixels that exceeded the noise threshold of the filter, this operation may filter out noise from a pixel that is determined to have residual chroma noise.

On the other hand, if the denominator value is beneath the minimum count value, this may suggest that the pixel is not noise. Still, it may be valuable to provide an additional filter when the image may be especially noisy in general. As such, software may programmably set such a filter if desired. If such a filter (e.g., a 3×3 filter) is not set (decision block 5194), the output chroma channel (e.g., Cb) may be passed unchanged (block 5196). Otherwise, the output may be an average of a pixel neighborhood (e.g., a 3×3 pixel neighborhood) (block 5198).

In selecting the noise standard deviation in relation to the luminance, it may be useful to apply a radial gain (since some pixels may have been gained more during lens shading correction owing to their distance from the optical center). As shown in a flowchart 5210 of FIG. 219, the noise standard deviation—the noise threshold—initially may be obtained from a lookup table (block 5212). In some embodiments, the lookup table may be a 2D lookup table that considers luminance and the current chroma channel being corrected (e.g., Cb), luminance and the other chroma channel being corrected (e.g., Cr), and/or both of the chroma channels. This may be programmable by software based on a noise standard deviation obtained by the noise statistics logic 1031. In some embodiments, software may estimate the noise standard deviation that is expected to occur at the CNR logic 4024 by varying the noise standard deviation from the noise statistics logic 1031, taking into account the likely effect of the additional processing occurring since the noise statistics were obtained. The lookup table used may also vary depending on the chroma channel being tested. For instance, there may be one lookup table for the Cb channel and another for the Cr channel. Any suitable number of entries may be employed. The number of entries may be higher when the performance of the sensor differs more significantly in different light levels. In one embodiment, the 2D lookup tables may be tables with 9×9 entries. In-between values may be interpolated. The 2D interpolation of noise standard deviation may be set such that it uses both chrominance channels (i.e. Cb and Cr) rather than one chrominance and luminance. This is useful when the noise filter strength is tuned based on the color saturation rather than a noise model that depends on the luminance. For example, it may be desirable to clean chrominance noise for skin tones more aggressively.

The pixel spatial location next may be considered. Depending on the radius of the pixel from the optical center (block 5214), a radial gain value may be obtained from a radial gain lookup table (block 5216). The radial gain lookup table may be the same as used in other logical blocks described in this disclosure, or may be unique to the CNR logic 4024. In one example, the radial gain lookup table used in block 5216 may have 257 entries, and in-between values may be linearly interpolated. The radial gain value may be applied to the noise standard deviation (block 5218) to obtain the noise threshold (block 5220) used by the CNR logic 4024.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An image signal processing system, comprising:

a raw scaler block comprising logic circuits coupled to memory and configured to output raw image data comprising a plurality of samples each containing a single color component of multiple color components, wherein the raw scaler block comprises:

an input block configured to receive raw image data acquired by a digital image sensor and comprising a number of input samples; and one or more logic circuits configured to:

implement a vertical resampler and a horizontal resampler each comprising a plurality of configurations corresponding to respective colors of the multiple color components, wherein:

the vertical resampler and the horizontal resampler are configured to produce an X/Y coordinate pair defining a source input sample for a raw output sample within a specific color of the multiple color components of an input frame and another X/Y coordinate pair defining another source input sample for another raw output sample within another color of the multiple color components of the input frame where the other color is not the specific color;

each configuration of the plurality of configurations comprises one or more coefficients collectively providing both scaling and chromatic aberration correction for a respective color of the multiple color components;

the scaling provided by each configuration of the plurality of configurations provides a number of samples in the output raw image data different from the number of input samples; and the vertical resampler and the horizontal resampler use a different one of the respective plurality of configurations for the other color of the multiple color components of the input frame than for the specific color of the input frame in order to provide scaling and chromatic aberration correction; and use the X/Y coordinate pair defining the source input sample for the raw output sample within the specific color of the input frame to generate the raw output sample, the raw output sample comprising scaled and chromatic aberration corrected raw image data of the specific color;

wherein the number of samples in the output raw image data is different from the number of input samples.

2. The image signal processing system of claim 1, wherein the vertical resampler comprises:

a vertical coordinate generator configured to compute Y coordinates on the sensor for every output sample of the vertical resampler;

a Y displacement computation block, configured to compute X and Y displacements of a current vertical resampler output sample; and a vertical sensor to component coordinate translation block configured to translate a corrected sensor Y coordinate to the Y coordinate within an appropriate input color frame.

3. The image signal processing system of claim 2, wherein the vertical coordinate generator comprises:

a Y digital differential analyzer (YDDA) configured to indicate a position of a current output pixel based upon a step size; and X and Y counters.

4. The image signal processing system of claim 3, wherein the Y displacement computation block is configured to:

compute a radius based upon the X counter and the Y coordinates on the sensor;

obtain a radial displacement from a lookup table associated with a color of the pixel based upon the radius; and compute a vertical displacement based upon the radial displacement.

5. The image signal processing system of claim 4, wherein the vertical sensor to component coordinate translation block is configured to:

add the vertical displacement to the Y coordinates on the sensor to produce a corrected Y coordinate that specifies a vertical position on the sensor corresponding to the output sample.

6. The image signal processing system of claim 5, comprising line buffers and a line buffer controller configured to provide up to five vertically adjacent samples from an appropriate color component of the input frame based upon: a color of the sample being generated, the Y coordinates, a horizontal position, a number of vertical filter taps, or a combination thereof.

7. The image signal processing system of claim 6, comprising a vertical filter configured to produce a weighted sum of the up to five vertically adjacent samples, wherein the weights are based upon a phase input.

8. The image signal processing system of claim 1, wherein the horizontal resampler comprises:

a horizontal coordinate generator configured to compute X coordinates on the sensor for every output sample;

an X displacement computation block configured to compute an X displacement for each output sample; and a horizontal sensor to component coordinate translation block configured to translate a corrected sensor X coordinate to a X coordinate within an appropriate input color frame.

9. The image signal processing system of claim 8, wherein the horizontal coordinate generator comprises:

X and Y digital differential analyzers (DDA) configured to indicate a position of a current output pixel based upon a step size; and horizontal and vertical counters configured to count output samples and lines, respectively.

10. The image signal processing system of claim 8, wherein the X displacement computation block is configured to:

obtain X and Y coordinates of an output sample;

compute a radius;

retrieve a radial displacement from a lookup table based on the radius; and calculate a horizontal displacement based upon the radial displacement.

11. The image signal processing system of claim 10, wherein the horizontal sensor to component coordinate translation block is configured to:

add the horizontal displacement to the X coordinates on the sensor to produce a corrected X coordinate that specifies a horizontal position on the sensor corresponding to the output sample.

12. The image signal processing system of claim 11, comprising a shift register and a multiplexer, the shift register and the multiplexer configured to provide nine horizontally adjacent samples from an appropriate color component of a vertically resampled frame, based upon: a color of the sample being generated, the X coordinates, a vertical position, a number of horizontal filter taps, or a combination thereof.

13. The image signal processing system of claim 12, comprising a horizontal filter configured to produce a weighted sum of the nine horizontally adjacent samples, wherein the weights are based upon a phase input.

14. The image signal processing system of claim 1, comprising:

binning compensation logic configured to select a center input pixel and an index value using a position of a current output pixel; and scaling logic configured to apply multi-tap polyphase filtering to a set of source input pixels selected from the raw image data based upon a set of filtering coefficients selected using the index value and to determine an output value for the current output pixel based upon the filtering, wherein the center input pixel is positioned at the center of the set of source input pixels.

15. A method, comprising:

receiving, by an input block of a raw scaler block of an image signal processing system, raw image data acquired by a digital image sensor;

producing, by a vertical resampler and a horizontal resampler implemented in one or more logic circuits of the raw scaler block, an X/Y coordinate pair defining a source input sample from an input frame for a raw output sample of a specific color of multiple color components and another X/Y coordinate pair defining another source input sample from the input frame for another raw output sample within another color of the multiple color components, wherein:

the input frame comprises the raw image data acquired by the digital image sensor and comprises a number of input samples each containing a single color component of the multiple color components;

the vertical resampler and the horizontal resampler each comprise a plurality of configurations corresponding to respective colors of the multiple color components, wherein each configuration of the plurality of configurations comprises one or more coefficients collectively providing both scaling and chromatic aberration correction for a respective color of the multiple color components, and wherein the scaling provided by each configuration of the plurality of configurations provides a number of samples in output raw image data different from the number of input samples; and the vertical resampler and the horizontal resampler use a different one of the respective plurality of configurations for the other color of the multiple color components of the input frame than for the specific color of the input frame in order to provide scaling and chromatic aberration correction; and using the X/Y coordinate pair;

defining the source input sample for the raw output sample of the specific color of the input frame to generate the raw output sample, the raw output sample comprising scaled and chromatic aberration corrected raw image data of the specific color, and the number of samples of the output raw image data are different from the number of input samples.

16. The method of claim 15, the producing the X/Y coordinate pair defining the source input sample from the input frame for the raw output sample of the specific color of the multiple color components comprising:

computing, by a vertical coordinate generator, a Y coordinate of the input frame;

computing, by a Y displacement computation block, X and Y displacements;

translating, by a vertical component coordinate translation block, the Y coordinate of the input frame using the X and Y displacements to produce the X/Y coordinate pair.

17. The method of claim 16, the computing the Y coordinate of the input frame comprising:

indicating, by a Y digital differential analyzer (YDDA), a position of the input frame based upon a step size.

18. The method of claim 15, the producing the X/Y coordinate pair defining the source input sample from the input frame for the raw output sample of the specific color of the multiple color components comprising:

computing, by a horizontal coordinate generator, a X coordinate of the input frame;

computing, by an X displacement computation block, an X displacement;

translating, by a horizontal component coordinate translation block, the X coordinate of the input frame using the X displacement to produce the X/Y coordinate pair.

19. The method of claim 15, further comprising:

selecting, by binning compensation logic, a center input pixel and an index value using a position of the raw output sample;

applying, by scaling logic, multi-tap polyphase filtering to a set of source input samples selected from the input frame based upon a set of filtering coefficients selected using the index value;

determining an output value for the raw output sample based upon the filtering, wherein the center input pixel is positioned at the center of the source input samples.

20. An electronic device, comprising:

at least one digital image sensor;

at least one lens;

an interface configured to communicate with the at least one digital image sensor;

a memory device;

a display device configured to display a visual representation of one or more image scenes corresponding to raw image data acquired by the at least one digital image sensor; and an image signal processing system, comprising:

a raw scaler block comprising logic circuits coupled to memory and configured to output raw image data comprising a plurality of samples each containing a single color component of multiple color components, wherein the raw scaler block comprises:

an input block configured to receive raw image data acquired by the at least one digital image sensor and comprising a number of input samples; and one or more logic circuits configured to:

implement a vertical resampler and a horizontal resampler each comprising a plurality of configurations corresponding to respective colors of the multiple color components, wherein:

the vertical resampler and the horizontal resampler are configured to produce an X/Y coordinate pair defining a source input sample for a raw output sample within a specific color of the multiple color components of an input frame and another X/Y coordinate pair defining another source input sample for another raw output sample within another color of the multiple color components of the input frame where the other color is not the specific color;

each configuration of the plurality of configurations comprises one or more coefficients collectively providing both scaling and chromatic aberration correction for a respective color of the multiple color components;

the scaling provided by each configuration of the plurality of configurations provides a number of samples in the output raw image data different from the number of input samples; and the vertical resampler and the horizontal resampler use a different one of the respective plurality of configurations for the other color of the multiple color components of the input frame than for the specific color of the input frame in order to provide scaling and chromatic aberration correction; and use the X/Y coordinate pair defining the source input sample for the raw output sample within the specific color of the input frame to generate the raw output sample, the raw output sample comprising scaled and chromatic aberration corrected raw image data of the specific color;

wherein the number of samples in the output raw image data is different from the number of input samples.

* * * * *